US008706915B2

(12) United States Patent
Duchesneau

(10) Patent No.: US 8,706,915 B2
(45) Date of Patent: Apr. 22, 2014

(54) COMPUTING INFRASTRUCTURE

(71) Applicant: David D Duchesneau, Puyallup, WA (US)

(72) Inventor: David D Duchesneau, Puyallup, WA (US)

( * ) Notice: Subject to any disclaimer, the term of this patent is extended or adjusted under 35 U.S.C. 154(b) by 0 days.

(21) Appl. No.: 13/950,588

(22) Filed: Jul. 25, 2013

(65) Prior Publication Data

US 2013/0306276 A1 Nov. 21, 2013

Related U.S. Application Data

(63) Continuation of application No. 12/270,793, filed on Nov. 13, 2008, which is a continuation-in-part of application No. 12/108,482, filed on Apr. 23, 2008, now abandoned.

(60) Provisional application No. 60/913,502, filed on Apr. 23, 2007.

(51) Int. Cl.
    *G06F 15/16* (2006.01)
(52) U.S. Cl.
    USPC ............... 709/250; 709/226; 709/203
(58) Field of Classification Search
    USPC .................................................. 709/250
    See application file for complete search history.

(56) References Cited

U.S. PATENT DOCUMENTS

| 2005/0160278 | A1* | 7/2005 | Farquharson et al. ........ 713/189 |
| 2006/0184926 | A1* | 8/2006 | Or et al. ........................ 717/168 |
| 2006/0277305 | A1* | 12/2006 | Bernardin et al. ............ 709/226 |
| 2006/0277307 | A1* | 12/2006 | Bernardin et al. ............ 709/226 |
| 2007/0006294 | A1* | 1/2007 | Hunter ............................ 726/14 |
| 2007/0150584 | A1* | 6/2007 | Srinivasan ..................... 709/224 |
| 2007/0214355 | A1* | 9/2007 | Lamport ........................ 713/156 |
| 2007/0226756 | A1* | 9/2007 | Kubo et al. .................... 719/325 |
| 2007/0234356 | A1* | 10/2007 | Martins et al. .................... 718/1 |
| 2007/0239719 | A1* | 10/2007 | Cotner et al. ..................... 707/8 |
| 2007/0253627 | A1* | 11/2007 | Islam ............................ 382/232 |
| 2008/0059553 | A1* | 3/2008 | Dawson et al. ............... 709/201 |
| 2008/0222352 | A1* | 9/2008 | Booth et al. .................. 711/108 |
| 2009/0199177 | A1* | 8/2009 | Edwards et al. .................. 718/1 |
| 2011/0119748 | A1* | 5/2011 | Edwards et al. ................ 726/12 |

* cited by examiner

*Primary Examiner* — Hamza Algibhah
(74) *Attorney, Agent, or Firm* — Foster Pepper PLLC; Richard T. Black; P. G. Scott Born

(57) ABSTRACT

An affordable, highly trustworthy, survivable and available, operationally efficient distributed supercomputing infrastructure for processing, sharing and protecting both structured and unstructured information. A primary objective of the SHADOWS infrastructure is to establish a highly survivable, essentially maintenance-free shared platform for extremely high-performance computing (i.e., supercomputing)—with "high performance" defined both in terms of total throughput, but also in terms of very low-latency (although not every problem or customer necessarily requires very low latency)—while achieving unprecedented levels of affordability at its simplest, the idea is to use distributed "teams" of nodes in a self-healing network as the basis for managing and coordinating both the work to be accomplished and the resources available to do the work. The SHADOWS concept of "teams" is responsible for its ability to "self-heal" and "adapt" its distributed resources in an "organic" manner. Furthermore, the "teams" themselves are at the heart of decision-making, processing, and storage in the SHADOWS infrastructure. Everything that's important is handled under the auspices and stewardship of a team.

20 Claims, 115 Drawing Sheets

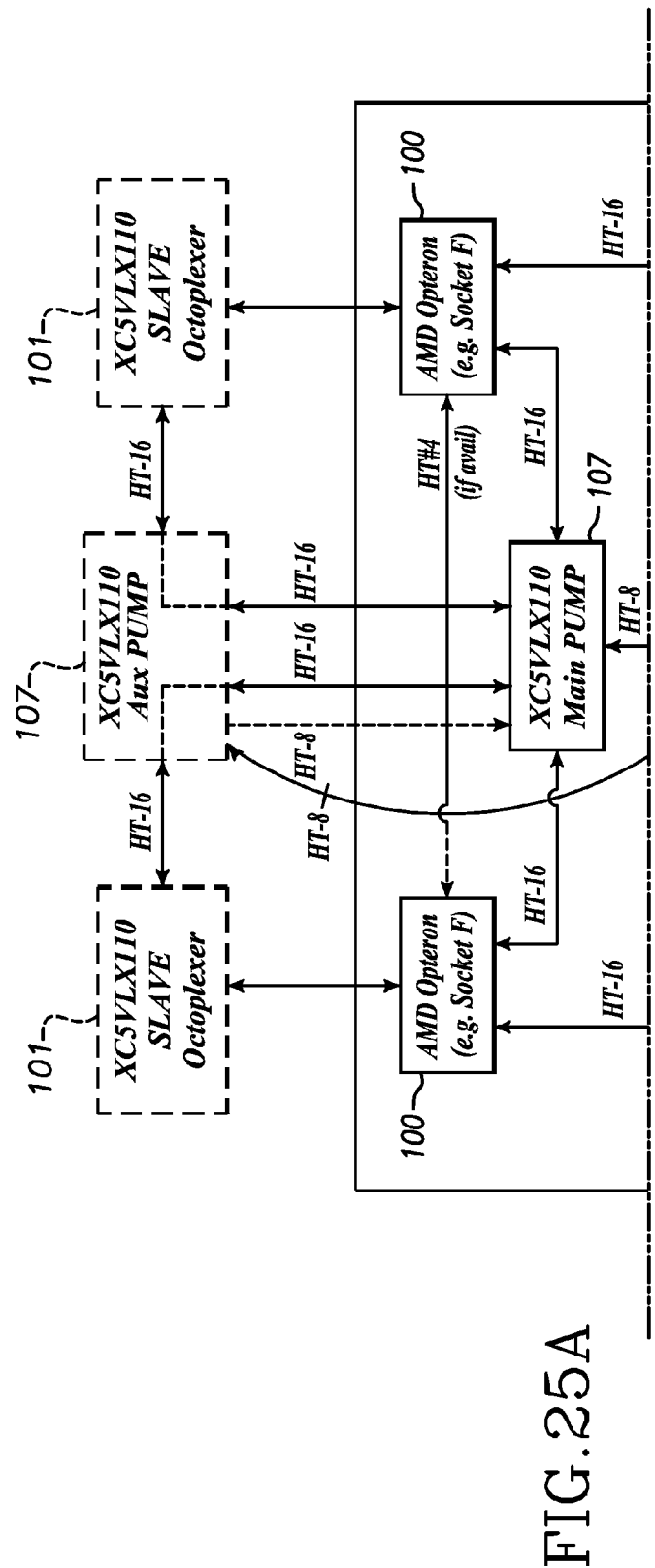

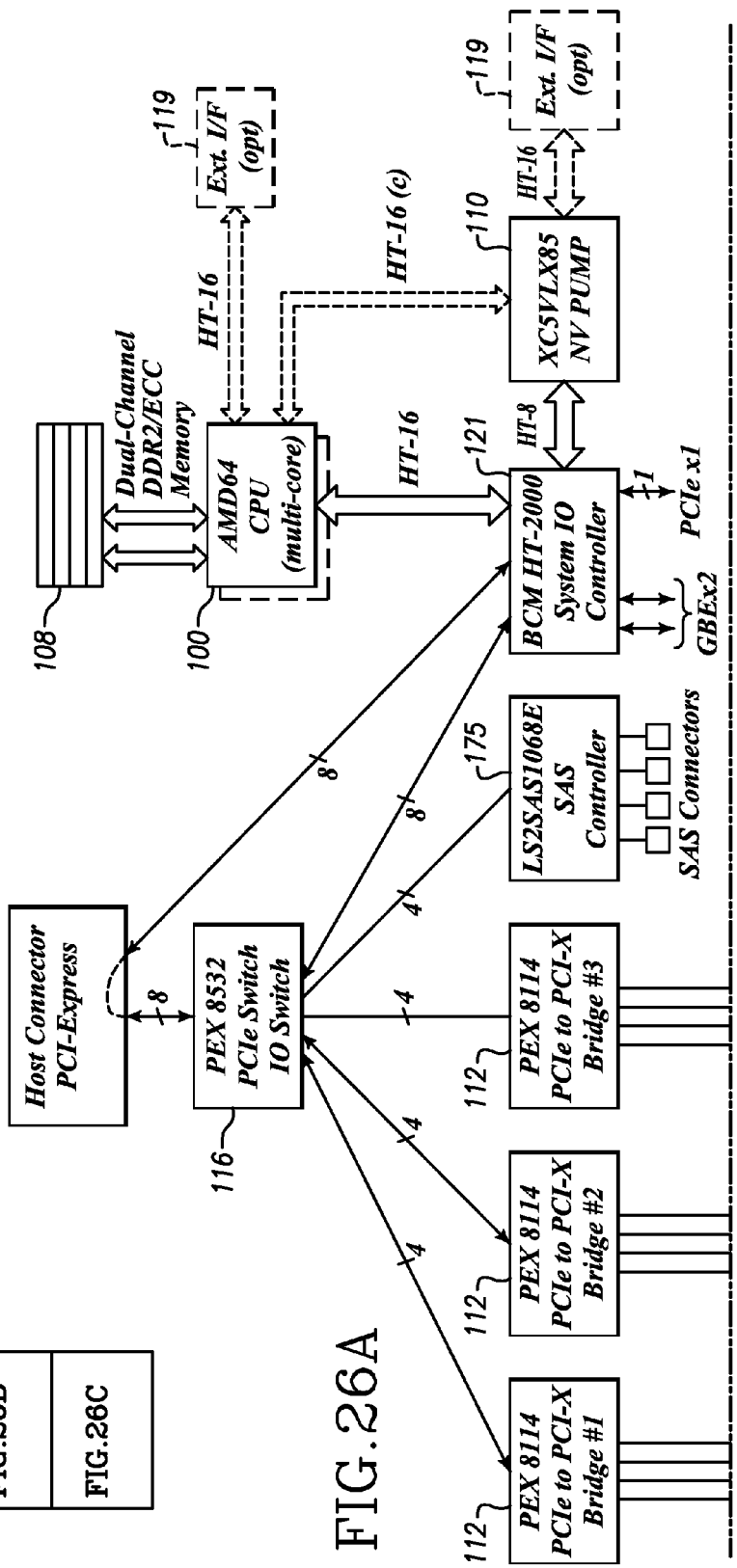

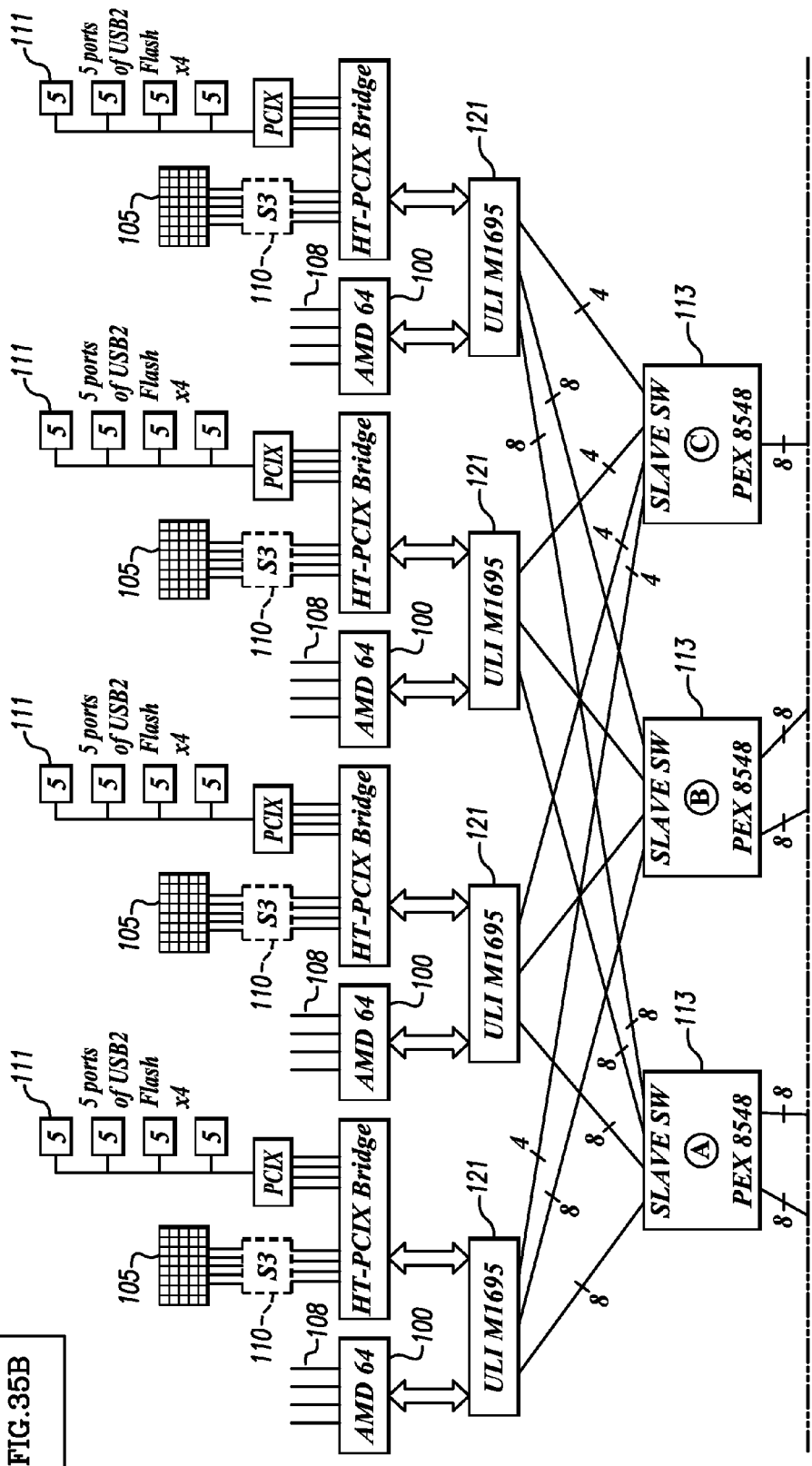

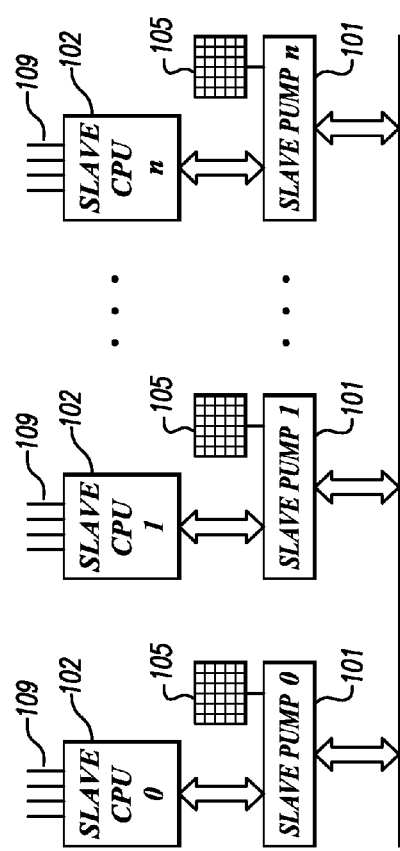
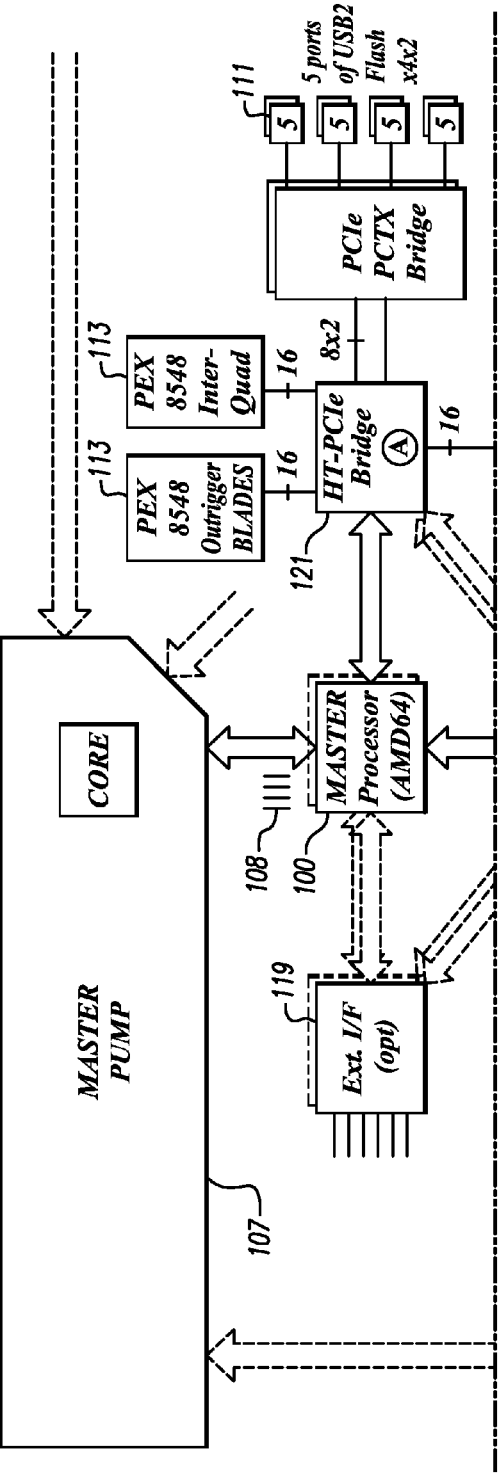
FIG. 37
FIG. 37A

⊙ DF ANTENNA
○ TARGET SIGNAL

ELEVATION                AZIMUTH
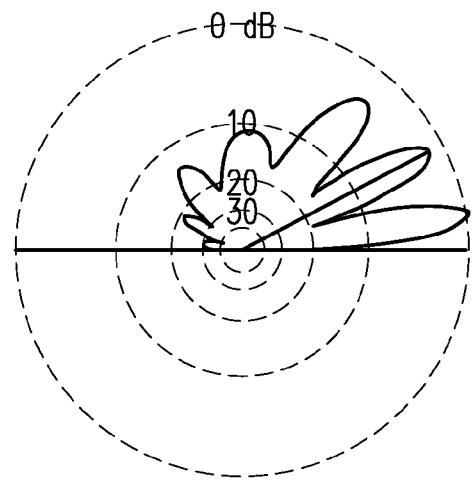 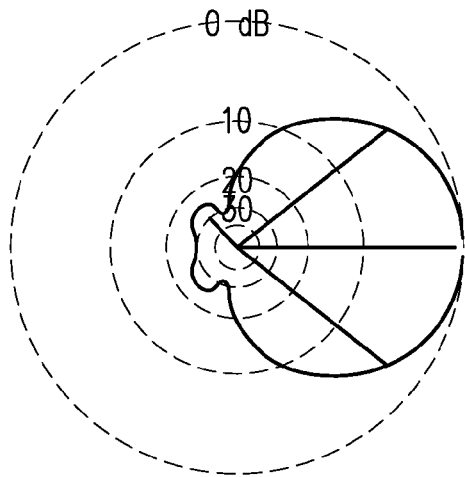
FIG.97
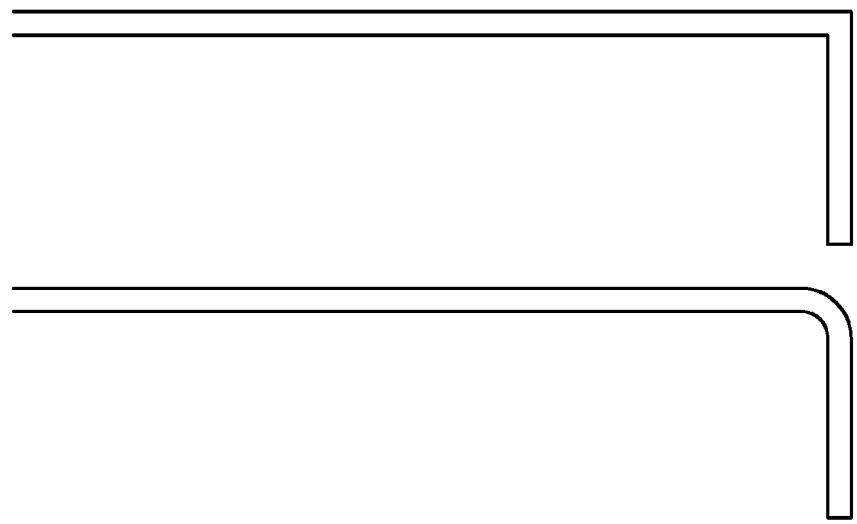
FIG.98

COMPUTING INFRASTRUCTURE

CROSS-REFERENCE TO RELATED APPLICATIONS

This application is a continuation of U.S. patent application Ser. No. 12/270,793 filed on Nov. 13, 2008 which is a continuation-in-part of U.S. patent application Ser. No. 12/108,482 filed on Apr. 23, 2008, which claims priority to U.S. Provisional Application 60/913,502 filed on Apr. 23, 2007, all of which are incorporated herein by reference in their entirety.

FIELD OF THE INVENTION

This invention relates generally to COMPUTING INFRASTRUCTURE and, more specifically, to NETWORKS OF SURVIVABLE COMPUTING SYSTEMS.

BACKGROUND OF THE INVENTION

There was a time when anything that could be done on a computer could be done faster on a supercomputer. However, because supercomputers could address challenges that were well beyond the capabilities of ordinary computers, they became increasingly specialized, with emphasis on compute-bound problems, making them somewhat less suitable for general purpose computing. Business computers also evolved, while retaining their general purpose nature, and also became faster. In order to address a broader range of high-performance computing (HPC) needs, supercomputers need to need become more general purpose, because the largest potential HPC markets are, by far, associated with business needs. Likewise, to address those large potential HPC markets, business computers need to gain much more performance. Finally, the largest potential HPC markets are likely to remain unaddressable until the associated needs can be met, and one of the key needs is affordability.

There is an ongoing and increasing demand, possibly an insatiable demand, for affordable computer processing power. Supercomputers—or alternatively, high-performance computing (HPC) systems—have historically been very expensive, and thus confined to a relatively small set of applications (e.g., weather modeling, academic and government-based research, etc.) paid for by well-funded customers and users, and thus have been out of reach of many potential customers. The customer set has been so limited that for many years the highest performing systems have been tracked on a list presently known as the "Top 500" (www.top500.org). Such a list would not be practical if even a reasonable fraction of the customers who could take advantage of supercomputers actually purchased and operated them.

The potential market for supercomputers is essentially untapped, primarily because it is mostly not addressable with the supercomputers available today (nor is it apparently addressable with today's business servers, including "mainframes").

Today's supercomputers and business servers not only miss the mark in terms of affordability, but also in terms of their fitness for purpose. While there are clearly a few enterprise applications that are a good fit for supercomputers as they are presently designed, the large majority of commercial applications are not a good fit at present, partly due to a requirements mismatch. While business servers are already better-suited to running today's commercial applications, they cannot provide the computer power needed for the next generation of HPC-class business applications. Ultimately, the vendors of supercomputers and business servers are both racing to address the same markets, but from different starting points....

Beyond the applications themselves, there are very real issues associated with achieving high levels of affordable system survivability, disaster recovery, and security (including data confidentiality integrity, availability, etc.), which (we assert) are not addressed well by any contender:

- The costs of electricity to power a datacenter exceeds the costs of the datacenter itself, and the cost of power is not only not going down, but is anticipated to rise sharply over the next few decades.
- Datacenters rarely store more than 72 hours worth of fuel, so they typically contract with local fuel suppliers to commence refueling deliveries within 24 hours of an extended power outage. In the event of a regional disaster that drops the utility power grids and renders key roads impassable, timely fuel delivery is unlikely. Of course, the contracted fuel sources may also be out of commission.
- The actual power densities of datacenters may, sooner or later, exceed their intended designs, due to increased electronics density (the trend toward smaller, lower-power chips is offset by the insatiable demand for computing power).
- There's an increased awareness of the need for the conservation of non-renewable resources, and vendors are striving to produce equipment that consumes less energy. The current reality is that heat energy rejected into the atmosphere by datacenters is simply wasted.
- Datacenters represent a high concentration of assets, and thus make excellent targets for thieves, espionage, and terrorists.
- With few exceptions, typical "manned" or "guarded" datacenters are designed to prevent the unauthorized admission of anyone who is not carrying a weapon. However, typical security staff present little deterrent to armed attackers, much less to well-organized, well-funded attackers with armed with inside information, tools, and automatic weapons—thus, the claimed security associated with typical hardened datacenters is illusory.
- Datacenters represent a single point of failure (the datacenter itself), regardless of the level of internal redundancy. Thus, a single regional disaster or terrorist attack may effectively destroy companies whose livelihood depends on a failed (or destroyed) datacenter. Of course, a datacenter may fail without actually being attacked.
- "There are two kinds of datacenters; those which have failed, and those that will."
- Despite a general awareness of Byzantine failure scenarios, disaster recovery preparedness rarely extends beyond having one or two backup datacenters, if any. Synchronously connected datacenters typically must be colocated relatively nearby (e.g., 10 to 60 miles is typical, with 300 miles or so as an upper limit), which means they may be subject to the same regional threats, and thus, simultaneous failures. Asynchronously connected datacenters may be geographically located at arbitrary distances, but may lag in data currency. Also, if Byzantine failures are considered, and a datacenter is taken as a single process, backed up by others coordinating asynchronously, then accommodating a single faulty datacenter would require a minimum of four data centers (i.e., 3f+1, where f is the number of faulty datacenters to be tolerated).

Collectively, these concerns bring us back to affordability, not only in terms of capital expense (i.e., the cost of asset acquisition), but more importantly, the operational expense. It is well-known in the industry that, despite the fact that the acquisition cost of supercomputing assets is very high, it is quickly surpassed by the cost of operating those assets. Together, these asset acquisition and operational costs comprise the total cost of ownership (TCO), which is a key factor in any return-on-investment (ROI) calculation. However, as we move forward, the trend toward an increased demand for supercomputing may not be merely to achieve a particular ROI, but rather, to survive. If done right, which includes affordability as a prerequisite, supercomputing may enjoy network effects and become indispensable (i.e., highly competitive companies may, in all likelihood, need access to supercomputing), and ROI may become far less relevant, making the buying decision a more obvious choice. Thus, for the addressable markets, affordable supercomputing may become a necessary component in the business survival kit.

Summary of Key Problems with Datacenters Today (all are addressed by SHADOWS and SUREFIRE):

High acquisition cost (space/real estate, construction, equipment, integration)

High and accelerating power consumption

Sprawling layouts, high space requirements

Physical security becoming less effective

Requires manpower, operational overhead

Mediocre survivability (many vulnerabilities)

Concentration of assets increases risk (makes datacenters an important target, etc.)

Heterogeneous, difficult-to-manage mix of everything (computers, network gear, power, cooling, etc.)

SUMMARY OF THE INVENTION

1 Systems and Methods for Self-Healing Adaptive Distributed Organic Working Storage

BRIEF DESCRIPTION OF THE DRAWINGS

Preferred and alternative examples of the present invention are described in detail below with reference to the following drawings.

1.2 DETAILED DESCRIPTION OF THE INVENTION

Figure 1A:
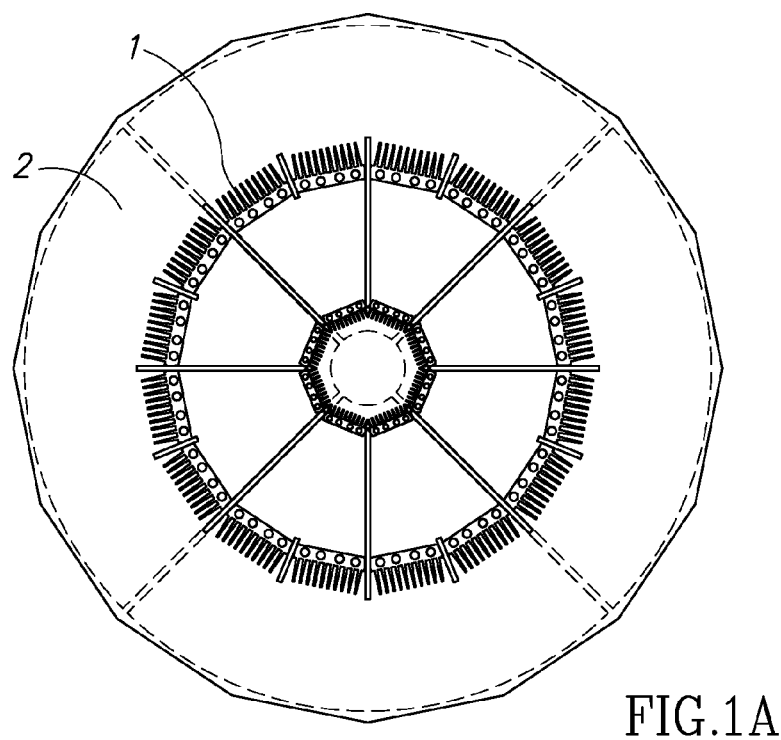
FIGS. 1A & 1B. SCRAM Supercomputer—Extruded Aluminum Chassis

"An affordable, highly trustworthy, survivable and available, operationally efficient distributed supercomputing infrastructure for processing, sharing and protecting both structured and unstructured information."

Over time, however, there has been increasing impetus to extend the applicability of supercomputers to a much broader range of commercial problem areas. In a preferred embodiment the system establishes a supercomputing platform that meets the needs of the broad but unaddressed market for high-performance computing—both in terms of total throughput, but also in terms of low-latency (although not every problem or customer necessarily requires low latency)—while achieving unprecedented levels of affordability (both capital and operational expense). Affordability, trustworthiness, survivability, and fault tolerance may be among the essential needs, yet these requirements have historically been in conflict with each other, and resolving them requires a new approach.

The design of the system began with a focus on built-in security, survivability, and trustworthiness—the key ingredients for business-critical/mission-critical computing—and the associated implications have permeated every aspect of the invention.

Recognizing that labor is a significant operational expense, and thus affects affordability from a TCO perspective, the system was intentionally designed to operate in a "lights-out," "hands-off", "unattended," "maintenance-free" environment. In a preferred embodiment, suitably configured, the system is designed to operate unattended, in low-cost remote locations—for years.

The system incorporates design concepts that address next-generation needs, so that supercomputer manufacturing and production can occur on a scale appropriate for a radically enlarged addressable market, resulting in the lowest possible cost structure, while maximizing production flexibility. This sort of quantum reduction in cost structure is preferred, if only to achieve the levels of affordability necessary to jumpstart the otherwise unaddressable broadest markets.

1.2.1 Invention Highlights

Due to the start-from-scratch system design approach, and the myriad details associated with that approach, the invention is best summarized by highlighting its extreme benefits. In a preferred embodiment, the system offers:

- Extremely affordable supercomputing (due to novel design and the novel use of commodity components)
- Extremely low power dissipation, achieved technologically (i.e., despite the use of commodity components)
- Extremely low dependence on utility power (renewable energy, self-contained multifuel power plant)
- Extremely low levels of system maintenance anticipated (i.e., upgrades only, no preventive maintenance)
- Extremely high performance per TCO dollar (i.e., in terms of both capital and operational expenses)
- Extremely high online and nearline internal storage capacity and throughput (without sacrificing scalability)
- Extremely high security (self-defense, resistance to cyber attack, physical attack, tampering, theft)
- Extremely high survivability expected (secured, hardened, designed to resist Byzantine failures)
- Extremely high levels of interoperability with other systems (generous and diverse IO capacity)
- Extremely useful ability to marshal external computing resources (further improving utilization and capacity)

1.2.2 Organization of the System Description

Although the system is relatively modular by design, there are many components, and thus a commensurate large number of potential interconnections, dependencies, and interactions. Nonetheless, for the purpose of teaching the aforementioned systems and methods, the Table of Contents beginning on the next page attempts to summarize and group the diverse components and their relationships, and to organize them in a somewhat linear way, despite their distinctly non-linear nature.

| | 2 Table of Contents |
|---|---|
| 1 | Systems and Methods for Self-Healing Adaptive Distributed Organic Working Storage |
| 1.1 | Background of the Invention |
| 1.2 | Detailed Description of the Invention |
| 1.2.1 | Invention Highlights |
| 1.2.2 | Organization of the System Description |
| 3 | Glossary of Terms |
| 4 | SHADOWS ™ - Architectural Overview & Motivations |
| 4.1 | The Goal, in No Uncertain Terms |
| 4.2 | Historically Conflicting Requirements |
| 4.3 | SHADOWS as a Distributed, Decentralized Centralized Architecture |
| 4.4 | SUREFIRE Sites as Survivable Mini-Datacenters |
| 4.5 | How Distributed Machines Are Organized at Multiple Sites |
| 5 | SERVANT (Service Executor, Repository, & Voluntary Agent - Non-Trusted) |
| 5.1 | MARSHAL (Multi-Agent Routing, Synchronization, Handling, & Aggregation Layer) |
| 5.2 | DELEGATE (Distributed Execution via Local Emulation GATEway) |
| 6 | SCRAM - Survivable Computing, Routing, & Associative Memory |
| 7 | SELF - Secure Emergent Learning of Friends |
| 7.1 | SELF Concepts |
| 7.1.1 | SELF - Resource Management Via Teams |
| 7.1.2 | SELF - Software Rejuvenation & Process-Port Combinations |
| 7.1.3 | BOSS - Asynchronous Byzantine Agreement |
| 7.1.4 | MASTER - Relationship of MASTER to BOSS |
| 7.2 | BOSS (Byzantine Object & Subject Security) |
| 7.2.1 | Minimum Redundancy for Byzantine Agreement |
| 7.2.2 | Byzantine Agreement Among Peers |
| 7.2.3 | Byzantine Agreement Among Peers, as Viewed by Third Parties |
| 7.3 | MASTER (Multiprocessor Adaptive Scheduler & Task Executor/Redirector) |
| 7.3.1 | Load-Balancing SHADOWS Native Processes |

-continued

| | 2 Table of Contents |
|---|---|
| 7.3.2 | Forces Influencing SHADOWS Adaptive Load-Balancing |
| 7.4 | SLAVE (Storage-Less Adaptive Virtual Environment) |
| 8 | CHARM - Compressed Hierarchical Associative & Relational Memory |
| 8.1 | CHARM Concepts |
| 8.1.1 | CHARM Object Characteristics |
| 8.1.2 | Storage & Communications - Slices and Slivers |
| 8.1.3 | CHARM - FEC Pseudo-Random Ordinals (PRO) Encoding Concept |
| 8.1.4 | CHARM - Representation of Infinite Precision Floating Point Numbers |
| 8.1.5 | CHARM - Word and Phrase Tables |
| 8.2 | PUMP - Parallel Universal Memory Processor |
| 8.3 | PEERS - Packet Engines Enabling Routing & Switching |
| 8.3.1 | Overview |
| 8.3.2 | Principle of Operation |
| 8.3.3 | Inter-Quadrant Connectivity |
| 8.3.4 | Inter-Lobe Connectivity |
| 8.4 | FLAMERouter - Firewall, Link-Aggregator/Multiplexer & Edge Router |
| 8.5 | FIRE - Fast Index & Repository Emulator |
| 8.6 | NEAR - Nearline Emulation & Archival Repository |
| 8.6.1 | CENTRAL CONCEPT |
| 8.6.2 | BASIC CONCEPTS |
| 8.6.3 | NEARdrive - Preferred Embodiments |
| 8.6.4 | NEARdrive Thermal Stabilization to Avoid Thermal Stress |
| 8.6.5 | NEARdrive Thermal Stabilization to Prevent Thermally Induced Read Errors |
| 8.6.6 | Periodic Analysis of Drive SMART Data |
| 8.6.7 | Predictive Statistical Properties of Disk Drive Failures |
| 8.6.8 | Load-Shifting Away from Failed and At-Risk Drives |
| 8.6.9 | Pre-Spin-Down Drive Analysis and Maintenance |
| 8.6.10 | On-The-Fly Drive Analysis and Maintenance |
| 9 | CORE - Computation, Optimization, & Reasoning Engines |
| 9.1 | CORE Concepts |
| 9.2 | FACTUAL - Frequency-Adaptive Computation Table & Use-Adaptive Lookup |
| 9.3 | FASTpage (Fast Associative Search Tree, pageable) |
| 9.3.1 | KEY DEFINITIONS |
| 9.3.2 | CENTRAL CONCEPT |
| 9.3.3 | BASIC CONCEPTS |
| 9.3.4 | KEY APPLICATION AREAS |
| 9.3.5 | APPLICATION CONSIDERATIONS |
| 9.3.6 | IMPLEMENTATION CONSIDERATIONS |
| 9.3.7 | EXAMPLE |
| 9.4 | RECAP - Reliably Efficient Computation, Adaptation, & Persistence |
| 9.4.1 | RECAP - Resource-Sharing Concepts |
| 9.5 | RUSH - Rapid Universal Secure Handling |
| 9.5.1 | CENTRAL CONCEPT |
| 9.5.2 | RUSH - Dynamic Inter-Site Path Characterization |
| 9.5.3 | RUSH - Energy Considerations for Routing |
| 9.5.4 | RUSH - Inter-Node Messaging Plan |
| 9.5.5 | RUSH - Pre-Validation of Session Traffic |
| 9.5.6 | RUSH - Using Bloom Filters to Pre-Validate RUSH Traffic |
| 9.5.7 | RUSH - Time Stamping & Synchronization, Effects of Congestion, Tampering & Attack |
| 9.5.8 | RUSH - Example RUSH Messages (subset) |
| 9.6 | VOCALE - Vocabulary-Oriented Compression & Adaptive Length Encoding |
| 9.6.1 | KEY DEFINITIONS |
| 9.6.2 | CENTRAL CONCEPT |
| 9.6.3 | BASIC CONCEPTS |
| 9.7 | UMA - UpdateMovingAverages(iValue) |
| 9.7.1 | UMA PSEUDOCODE |
| 10 | FRAME (Forced Recuperation, Aggregation & Movement of Energy) |
| 10.1 | SLAM - SCADA, Logging, Analysis & Maintenance |
| 10.2 | STEER - Steerable Thermal Energy Economizing Router |
| 10.2.1 | STEER - Latching Digital Flow Rate Control Valve |
| 10.2.2 | STEER - Parallel-Series Reconfigurator |
| 10.3 | RUBE - Recuperative Use of Boiling Energy |
| 10.3.1 | RUBE - Heat Energy Recuperation Cycle Overview |
| 10.3.2 | RUBE - Double Boiler |
| 10.3.3 | RUBE - Inner Boiler |
| 10.3.4 | RUBE Vapor Injector |
| 10.3.5 | RUBE Air-Cooled Subcooler |
| 10.3.6 | RUBE Liquid-Cooled Subcooler |
| 10.4 | PERKS - Peak Energy Reserve, Kilowatt-Scale |
| 10.4.1 | Electrical Power Conditioning and Electrical Energy Storage |
| 10.5 | FORCE - Frictionless Organic Rankine Cycle Engine |
| 10.5.1 | FORCE Turboalternator |
| 10.5.2 | FORCE Post-Turboalternator Recuperator |
| 10.6 | SOLAR - Self-Orienting Light-Aggregating Receiver |
| 10.6.1 | SOLAR Parabolic Dish for Concentrating Solar Power - Back-of-the-Envelope Calculations |
| 10.6.2 | Non-Concentrating Solar Power Considerations |

2 Table of Contents

| | |
|---|---|
| 10.6.3 | SOLAR Parabolic Dish for Concentrating Solar Power - Candidate Phase-Change Working Fluids |
| 10.6.4 | FORCE Nanoturbine Considerations |
| 11 | SUREFIRE - Survivable Unmanned Renewably Energized Facility & Independent Reconfigurable Environment |
| 11.1 | SUREFIRE Mini-Silo |
| 11.2 | SUREFIRE Single-Level Underground Vault |
| 11.3 | SUREFIRE Multi-Level Underground Vault |
| 11.3.1 | SUREFIRE Colocated with a Wind Turbine (Preferred Embodiment) |
| 12 | DEFEND - Deterrent/Emergency Force Especially for Node Defense |
| 13 | WARN - Weather & Advance Risk Notification |
| 13.1 | LISTEN - Locate, Identify, & Scrutinize Threats Emerging Nearby |
| 13.1.1 | Direction-Finding Options: The Moxon Rectangle, Doppler Arrays, & Adcock Arrays |
| 13.1.2 | Moxon Rectangle Directional Beams for 49, 52.25, and 59 MHz |
| 13.1.3 | A Set of Contingencies for the Use of Moxon Rectangles as Null-Based Direction-Finding Arrays |
| 13.1.4 | Basic Properties of the Lindenblad Omni-Directional Elliptically Polarized Dipole Array |
| 13.1.5 | Lindenblad Omni-Directional Elliptically Polarized Dipole Arrays With Full-Length & Shortened-Capped Elements |
| 13.2 | PODIUM - Pneumatically Operated Directional Intelligent Unmanned Masthead |

3 Glossary of Terms

ADSL. Asymmetric DSL. A DSL communications link characterized by its asymmetric download and upload rates (e.g., 1.5 Mbps download, 900 Kbps upload). See also: DSL.

AFR. Annualized Failure Rate. The percentage of disk drives in a population that fail in a test scaled to a per-year estimation. The AFR of a new product is typically estimated based on accelerated life and stress tests, or based on field data from earlier products (commonly on the assumption that the drives are 100% powered on). AFR estimates are typically included in vendor datasheets (e.g., 0.88%, 0.73%, 0.63%, etc., for high quality disks with MTTFs in the range of 1 million hours to 1.4 million hours). However, the datasheet AFR and the field AFR differ widely. According to a 2006 study of large-scale supercomputer clusters and ISPs that analyzed drives over a 5-year period, the field AFR exceeds 1%, with 2% to 4% common, and up to 12% observed on some systems. See also: ISP, NEAR, MTTF.

API. Application Programming Interface.

ASCII. American Standard Code for Information Interchange.

ASIC. Application-Specific Integrated Circuit. A hardware device containing fixed (not reconfigurable) logic and other circuitry. See also: FGPA.

Availability. Ability of a component or service to perform its required function at a stated instant or over a stated period of time. It is usually expressed as an availability ratio or percentage, i.e., the proportion of time that a system can be used for productive work. Availability over a particular period of time is calculated as ((Total_Time−Unavailable_Time)/Total_Time), where the Unavailable_Time is closely related to the MTTR. Availability goals are often expressed as 99.9% ("three nines" availability), or 99.99% ("four nines" availability), and so on. "Three nines" (99.9%) implies a maximum downtime of 8 hours and 46 minutes per year, whereas "four nines" (99.99%) limits the downtime to 53 minutes per year (based on 365.25 days per year, or 8766 hours per year.). Also: In the context of security, availability refers to the property of a system or a system resource that ensures it is accessible and usable upon demand by an authorized system user. Availability is one of the core characteristics of a secure system. See also: AFR, MTTF, MTTR.

BB-RAM. Battery-Backed RAM. A type of NVRAM implemented by combining a conventional RAM (e.g., SRAM or SDRAM) with a battery backup, in order to prevent data loss in case of power failure. Since the battery backup capability can typically sustain a relatively short period of operation, BB-RAM systems sometimes include low-cost secondary storage (such as one or more magnetic disk drives, depending on redundancy requirements). Alternative NVRAM implementations (e.g., MRAM, FeRAM, F-RAM, etc.) are available that do not require battery backup capability. The SHADOWS CHARM technology uses diverse NVRAM technologies, including BB-RAM. However, CHARM's primary rationale for using BB-RAM (in conjunction with the FIRE and NEAR technologies) is to be able to better control its secure erasure in case of intrusion, in addition to its traditional NVRAM use as non-volatile storage. See also: CHARM, FIRE, MRAM, NEAR, NVRAM, RAM.

BFT. Byzantine Fault Tolerance.

BLOB. Binary Large OBject.

Bloom Filter. A probabilistic algorithm to quickly test membership in a large set using multiple hash functions into a single array of bits. Bloom filters have a space-efficient set membership structure whose key characteristic is to never yield false negatives, although it may yield false positives. Bloom's algorithm lets one determine whether a value has been previously handled (e.g., processed, stored, etc.), although one must allow the possibility of a false positive when extracting this information. Given a Bloom bit array N bits long, and a numeric value (e.g., a high-quality hash) whose presence we wish to store, we take the first N bits from the result of the numeric value and set the index N in the bit array to TRUE. We repeat this about 5 to 20 times setting 5 to 20 bits, respectively, in the bit array using the next consecutive N bits from the numeric value. The N-bit array starts out reset (FALSE), before we start to populate it with data. As the bit array becomes more populated, sometimes we may set a bit that has already been set. This is the root of the false positive cases we examine later. When we wish to whether a numeric value has been previously handled, we proceed in almost the exact way, except that we read the bits from the bit array instead of setting them. As we read the bits, if any of them are zero (FALSE), the numeric value is guaranteed to have never been handled. If all of the bits are set (TRUE), the numeric value has probably been handled and other means must be used to obtain a definitive, authoritative answer. The saturation of a Bloom filter is defined to be the percent of bits set to TRUE in the bit array. The phase of a Bloom filter is defined to be the number of times we attempt to set a bit in the array (5 to 20 times in this example). Both of these variables can be modified to change the accuracy and capacity of the Bloom filter. Generally speaking, the larger the size of the bit array (N) and the higher the phase, the smaller the probability of false positive responses occurring. Statistically, the chance of a false positive can be determined by taking the saturation (which decreases with increasing filter size) and raising it to the power of the phase.

BLOOMER™. Banked & Layered Orthogonally Optimized Matrix of Energy Receivers. An apparatus for deploying and controlling a multiplicity of energy receivers in orthogonal banks and layers so as to maximize their ability to collect energy from their intended source (each is typically designed for a particular renewable or high capacity energy resource, such as the sun, the wind, a river, or the ocean). The basic idea is that, in lieu of deploying an array of one or more "large" receivers, to be able to deploy one or more arrays (possibly distributed geographically) of "smaller" receivers that can more easily be automatically repositioned and/or reconfigured. The goal of automatic repositioning and reconfiguration is at least two-fold: 1) to maximize each receiver's ability to collect energy and thereby maximize the collected energy in aggregate, and 2) to maximize the survivability of each receiver array and thereby maximize the survivability of the maximal energy collection capability. Conceptually, when "closed" the apparatus minimizes the exposure of the energy receivers to various primary and/or secondary threats, and when "bloomed" the apparatus maximizes the exposure of the energy receivers to their intended energy source.

BOSS™. Byzantine Object & Subject Security. A distributed, timely, trusted computing base (TCB) and object/subject security system that incorporates Byzantine agreement logic (from the classic "Byzantine generals" problem) in its decision-making process, and collectively makes security decisions in a "fail-silent" manner that provides survivability even in the face of multiple failures and/or corrupted nodes. BOSS is implemented and instantiated only in conjunction with a MASTER, and works in conjunction with CHARM to control who gets access to what, and when, while ensuring that unauthorized information is not exposed (not even to other internal systems). BOSS is designed to enable the SHADOWS infrastructure to support both classified and unclassified information processing and storage (e.g., to meet or exceed Common Criteria (CC) Protection Profiles (PP) such as the U.S. DoD Remote Access Protection Profile for High Assurance Environments Version 1.0, June 2000, nominally at EAL5, or potentially at EAL6 if implemented by a single, qualified development organization). Any BOSS node that fails or becomes corrupted may be restarted or replaced, and in any case should not be trusted until its trustworthiness can be re-established from scratch to the satisfaction of the surviving trusted nodes, including, at a minimum, other MASTERs with which it previously participated as a team member. See also: CC, CHARM, DoD, EAL, MASTER, PP, TCB.

Cache. A small fast memory (relative to a larger, slower memory) holding recently accessed data, designed to speed up subsequent access to the same data. Most often applied to processor-memory access but also used for a local copy of data accessible over a network, etc. See also: Cache Conflict, Direct Mapped Cache, Fully Associative Cache, Set Associative Cache.

Cache Conflict. A sequence of accesses to memory repeatedly overwriting the same cache entry. This can happen if two blocks of data, which are mapped to the same set of cache locations, are needed to be read or written simultaneously. See also: Cache Line.

Cache Line. (Or cache block). The smallest unit of memory than can be transferred between the main memory and the cache. Rather than reading from a larger but slower memory one word or byte at a time, each cache entry is usually holds a certain number of words, known as a "cache line" or "cache block," and a whole line is read and cached at once. This takes advantage of the principle of locality of reference—if one location is read then nearby locations (particularly following locations) are likely to be read soon afterwards. See also: Cache.

Caching. Caching is a useful general technique that sometimes makes programs run faster. It does this by exchanging space for time: Caching tries to save previously accessed or computed results in an attempt to reuse them later rather than recomputing them. Caching is useful in all kinds of situations, including, almost any kind of searching (cache the results of the search so that you can skip it next time), HTML generation (cache the results of the generation process so that you don't have to generate the page next time), and numeric computation (cache the results of the computation). See also: Cache, FACTUAL, Memoization.

CC. Common Criteria. Here, this refers to Common Criteria (CC) for Information Technology Security Evaluations, Version 2.1, August 1999. See also: PP.

CHARM™. Compressed Hierarchical, Associative, & Relational Memory. An associative memory system that provides high-capacity, highly available and survivable persistent storage, and secure, rapid recall of information. Incorporates local FIREblades and NEARblades (or FIREdrives and NEARdrives), and collaborates with CHARM systems of other local and remote SCRAM nodes. Unlike relational databases, all information is indexed, and, from a hardware perspective, all index storage is electronic (no latency due to spinning media), but without the expense associated with general-purpose SSD. Unlike relational databases, records or objects not meeting security constraints are never even accessed (e.g., in order to check security attributes). Hard disks store only fractional archival data. All geographically colocated equipment and data are expendable without information loss or disclosure. See also: FACTUAL, FIRE, NEAR, SCRAM, SSD.

CNC. Computer Numerical Control. A computer-aided manufacturing technology using computers to control cutting machines such as milling machines and lathes to cut specified three-dimensional shapes. CNC has been used since the early 1970s. Prior to this, machines were controlled by prepared tapes and the process was called simply Numerical Control (NC).

Codec. A complementary pair of functions comprising an encoder and a decoder, such that an input can be provided to the encoder, the output of which is fed to the decoder, the output of which is the original input. See also: FEC.

CORE™. Communications, Optimization, & Reasoning Engines. A collection of "engines" whose purpose is to encapsulate and securely execute high-performance and/or hardware-assisted general purpose implementations of critical compute-intensive processes, to minimize latency, maximize overall throughput, and reduce operational costs. These engines (e.g., FACTUAL, FASTpage) are typically closely associated with other systems, and are thus described in those contexts. See also: FACTUAL, FASTpage.

CPU. Central Processing Unit.

CRC. Cyclic Redundancy Check.

Critical Heat Flux. The heat flux beyond which boiling cannot be sustained because the liquid working fluid no longer wets the surface of the heat source. Since heat flux is typically given in of W/cm2, those skilled in the art may recognize that the critical heat flux can be extended by numerous means, including any that increase the effective surface area of the heat source (the denominator) for a given level of power (the numerator), but also including the use of increased turbulence, special coatings, etc. See also: Heat Flux, RUBE.

CWS. Chilled Water System.

DBMS. Data Base Management System. See also: DELEGATE.

DDoS. Distributed DoS. A DoS involving distributed attack sources, such as when multiple compromised systems cooperate to flood the bandwidth or resources of a targeted system, usually one or more web servers. The systems involved in a DDoS attack become compromised by the DDoS perpetrators via a wide variety of methods, and, depending on the nature and extent of the compromise, may contain relatively static hardcoded attack vectors (e.g., "MyDoom," which involved a hardcoding the IP address in advance of an attack), or may contain sophisticated control mechanisms such that the compromised systems collectively form one or more "botnets." Unlike hardcoded attacks, botnets can be controlled dynamically, and thus targeted at any IP address at any time. The DDoS strategy provides an attack perpetrator with numerous advantages: 1) orders of magnitude more attack traffic than a simple DoS, 2) increased stealth and detection avoidance, and 3) significant defense challenges for the targeted victims, since the aggregate bandwidth of a large botnet can easily exceed any practical amount of surplus bandwidth a defender might purchase to mitigate DDoS attacks (and perpetrators can always add more compromised systems to their botnets). In a preferred embodiment of the SHADOWS infrastructure, there are significant strong defenses against DDoS attacks, implemented primarily in the SHADOWS FLAMERouter technology (the essence of which is also in common with the SHADOWS RUSHrouter technology, and by inclusion, in the SHADOWS MARSHALs). The most important defenses include the ability to efficiently and accurately distinguish "self" (bona fide traffic) from "non-self," the ability to impose adaptive flow control, the ability to provide "hidden" services and stealthy interfaces, the ability to present a continually moving multi-point target (thus dividing and effectively decimating the attack resources), and significant means for load-shedding and adaptive redistribution of defensive resources. See also: DoS, FLAMERouter, MARSHAL, RUSHrouter, SELF.

DEFEND™. Deterrent/Emergency Force Especially for Node Defense.

DELEGATE™. Distributed Execution via Local Emulation GATEway. A distinguished SERVANT node having the responsibilities of fulfilling a DELEGATE role. The DELEGATE role implements secure client-side "proxy" agent that appears to locally implement a particular service which would normally be implemented elsewhere, such as on a local or remote server, but instead is actually implemented within the SHADOWS network cloud. The DELEGATE concept is described further in section 5.2. See also: API, DBMS, DNS, LDAP, MPI, POP3, RUSH, RUSHrouter, SIP, SLA, SMTP, VoIP.

Delta Compression. Whereas any object can always be expressed in terms of another object (the reference object) plus the set of differences or "deltas" between them, such expression is only beneficial if a suitable reference object can be found easily, and resulting expression (in terms of deltas) achieves useful a compression ratio. In the art, delta compression attempts to recognize the differences between successive or nearly successive versions of a file, in order to express one in terms of the other plus some differences (the "delta"). This works well in practice because the reference object (i.e., the earlier file version) is already known, and the relationship between the files is already established—the files are expected to be similar, so processing is straightforward and efficient. When differences are small, the compression ratio is excellent, such that storing two nearly identical files with delta compression would consume little more space than storing one of them (the ideal is reached when the files are identical). However, applying the technique much more widely—such that an arbitrary data sequence can be efficiently expressed in terms of some other arbitrary data sequence whose identity is unknown but must be efficiently discovered during the compression process—is a very challenging problem that is well beyond the state of the practice. The compression in CHARM directly addresses this broader challenge, by using its FASTpage search mechanisms and massively parallel implementation to efficiently locate fine-grained candidate components (i.e., sub-objects) of objects whose content is most similar to the various components of the object to be compressed. CHARM recognizes the differences between the similar content of any two objects or subjects, which trivially includes versions of the same object—an extremely frequent occurrence in CHARM because its objects are immutable, so every version is a new object. More importantly, however, CHARM's compression can take advantage of different objects with partially common content, such as objects having one or more shared vocabularies, or having similar components (sub-objects). CHARM allows multiple objects to be used as reference objects, so wherever commonality exists, any object can be efficiently expressed in terms of the selected reference object(s) plus a set of deltas. Note that prior to applying delta compression, CHARM applies other compression techniques, such as RLE-1, RLE-2, and RLE-3. While all the CHARM algorithms can be implemented in software, in a preferred embodiment they are implemented in hardware, in the CHARM PUMP. See also: CHARM, FASTpage, PUMP, RLE.

Demand Paging. In a virtual memory system, a technique to conserve relatively scarce physical memory by loading virtual memory pages into physical memory only as they are accessed. See also: Page Fault, Swapping.

Direct Mapped Cache. A cache where the cache location for a given address is determined from the middle address bits. If the cache line size is 2n then the bottom n address bits correspond to an offset within a cache entry. If the cache can hold 2m entries then the next m address bits give the cache location. The remaining top address bits are stored as a "tag" along with the entry. In this scheme, there is no choice of which block to flush on a cache miss since there is only one place for any block to go. This simple scheme has the disadvantage that if the program alternately accesses different addresses which map to the same cache location then it may suffer a cache miss on every access to these locations. This kind of cache conflict is quite likely on a multi-processor. See also: Cache, Fully Associative Cache, Set Associative Cache.

DMZ. De-Militarized Zone. In networking, this is a buffer zone situated between a protected LAN and a WAN, and occupied by bastion servers, firewalls, or other devices that are sufficiently hardened so as to safely withstand direct exposure to the Internet.

DNS. Domain Name System. See also: DELEGATE.

DoD. Department of Defense.

DoS. Denial of Service. In computer security, a denial-of-service attack (DoS attack) is an attempt to make a computer resource unavailable to its intended users. A DoS attack is characterized by an explicit attempt by attackers to prevent legitimate users of a service from using that service, typically via one of the methods: 1) consumption of computational resources, such as bandwidth, disk space, or CPU time; 2) disruption of configuration information, such as routing information; 3) disruption of physical network components. Attacks can be directed at any network device, including attacks on network routers and servers (e.g., web servers, email servers, DNS servers, etc.). Examples of DoS attacks include: 1) flooding a network, thereby preventing legitimate network traffic; 2) disrupting a server by sending more requests than it can possibly handle, thereby preventing access to a service; 3) preventing a particular individual from accessing a service; and 4) disrupting service to a specific system or person. See also: DDoS.

DRAM. Dynamic RAM. Volatile RAM that is characterized by its need to be continually refreshed, in order to prevent data loss, and by it relatively high storage density, relatively high performance, and relatively low cost. The dynamic nature of DRAM, in conjunction with its rapidly increasing storage density, creates a situation where there's a significant probability of multiple SEUs coinciding in the same access, resulting in data loss that may be detected by SECDED but nonetheless cannot be corrected, or worse yet, data loss that is simply undetectable. See also: CHARM, MRAM, NVRAM, RAM, SEU, SRAM.

DSL. Digital Subscriber Line. A half-duplex communications link typically superimposed on a standard telephone line pair, such that the ordinary analog voice signal (if present) on the same line is not affected. DSL links are normally considered to be "broadband," especially for download speeds of at least 256 Kbps. See also: ADSL.

DSSA. Direct Spread-Spectrum Addressing.

EAL. Evaluation Assurance Level. A package consisting of assurance components from the Common Criteria (CC), Part 3 that represents a point on the Common Criteria predefined assurance scale (e.g., EAL5 or EAL6).

EMP. Electro-Magnetic Pulse.

Emulate. Generally, to imitate exactly. Specifically, the capacity of one computer system to imitate another, or to imitate the interfaces and environment of another, such that relative to a particular set of expectations there is no difference between the emulator and that which it emulates. See also: Simulate.

Emulation. The situation in which one computer behaves like another, or imitates another's interfaces and environment. See also: Simulation.

FACTUAL™. Frequency-Adaptive Computation Table & Use-Adaptive Lookup. A process-oriented memoization ("memo table") capability that retrieves previously computed, "vetted" results for arbitrary deterministic processes and functions. All values that can affect the output (including the identification of the exact process and any parameters) may be provided as input, along with a timeout value and a list intended recipients, and a signed and certified result can be sent to them. FACTUAL implements a race ("looking up" vs. "recomputing" vetted results), but lookup typically starts before the request even reaches the head of the request queue for the target process. In the event a process starts due to timeout, if there's a "hit" and the looked-up result becomes available in time, it may be used as an oracle instead, to check the process. Misses cause no latency penalty. Unlike a memoized function (which is responsible for caching its own results), FACTUAL is a global, process-based capability that takes advantage of the persistent associative memory of the CHARM subsystem. See also: Cache, CHARM, Memoization, Memoize, Memoized Function.

FASTpage™. Fast Associative Search Tree, pageable. A fast, highly scalable, associative memory mechanism that can adapt to the information to be remembered, in order to optimize both time and space. FASTpage index size is limited only by the availability of system-wide resources. FASTpage is well-suited to both transient in-memory data (generally faster than hash-table searching) and persistent data (designed for extremely fast searches with indexes in flash memory). The FASTpage search mechanism is based on a hybrid comprising a novel "pageable" Ternary Search Tree (TST) (having compressed, variable-length nodes and exhibiting locality of reference) and a novel "pageable" digital search Trie (having vectored, compressed, variable-length off-page references). The FASTpage storage mechanism is optimal for flash-based storage, and intended for use in hierarchical memory systems such as those involving DRAM, NVRAM (e.g., BB-RAM, MRAM, FeRAM or F-RAM, etc.), flash-memory, and magnetic disk. In a preferred embodiment, DRAM is used for in-process or transient data/content, and for caching FASTpage pages and certain frequently accessed content; NVRAM is used for metadata and building new pages (FASTpage pages and content/data pages), flash-memory is used to store FASTpage pages and frequently used content (or possibly all of it, depending on capacity); and magnetic disk is used primarily to store referenced archival content, including less frequently accessed content whose storage requirements exceeds available flash memory capacity. Conceptually, in a preferred embodiment, lower tiers in the hierarchical memory system subsume (and therefore include) the content in higher tiers, notwithstanding security provisions that prevent the existence of directly usable data aggregations at any points in the system where content may be subject to attack. Each FASTpage implementation supports an arbitrary number of independent local search spaces, limited only by local storage capacity. Each FASTpage search space may be individually defined to be either transient or persistent, with individually specifiable survival requirements. In a preferred embodiment, the FASTpage process is implemented in hardware as a CORE engine, within one or more PUMP devices, and also in software that executes on MASTERs, SLAVEs, and SERVANTs. See also: CORE, DRAM, MASTER, MRAM, NVRAM, PUMP, SERVANT, SLAVE, TST.

FEC. Forward Error Correction. A form of error correction that encodes redundancy into data in order to recover the original (intended) data in the event of partial data loss or corruption. The "forward" nature of FEC stems from the fact that corrections can be applied while still making progress— i.e., without having to "go backward" by retrying a communication or retrieval operation. CHARM uses FEC for communications, and also for data distributed both locally and remotely on both transient media (e.g., in DRAM) and persistent media (e.g., flash or magnetic storage). Because CHARM's storage formats are already FEC-encoded, stored data can be transmitted without further FEC encoding, as appropriate. In a preferred embodiment of SHADOWS, the FEC codecs are implemented as part of the CORE functions embedded in the PUMP devices. In a preferred embodiment, the general purpose processors in SHADOWS also implement the FEC codecs. See also: CHARM, Codec, CORE, DRAM, ECC, FIRE, NEAR, PUMP.

FIRE™. Fast Index & Repository Emulator. The technology underlying a FIREblade™ or FIREdrive™, and used by CHARM as its primary online persistent storage. FIRE combines quickly securable DRAM and BB-RAM for high-speed storage of rapidly changing data, with the DRAM used for caching already-stored (and therefore expendable) in-the-clear data (this does not imply that the already-stored data is stored in the clear—it is not—but rather, that the in-the-clear data is allowed to exist only in DRAM, where it can be rapidly erased—via de-powering the DRAM, for example—in case of a security breach; de-powering DRAM is insufficient to prevent recovery of the most recent content by a sophisticated—e.g., state-sponsored—attacker, but it is the best available move against a powered-on probe attack), for example, and the BB-RAM used for buffering committed transactional data (in conjunction with a set of other suitably distributed instantiations of FIRE with which it communicates) not yet written to long-term, persistent data storage. FIRE uses flash-based storage (or its equivalent) rather than magnetic storage, and this provides high-performance all-electronic, long-term, persistent data storage that is immune to mechanical wear and vibration (including seismic events). The flash-based storage also operates at very low power (typically less than 1 microwatt per IOPS, vs. more than 20 to 40 milliwatts per IOPS for low-power and/or high-performance magnetic disk drives). The persistently stored data (whether in BB RAM or flash memory) is safe from intruders even if stolen. In the case of power failure, information secured in the BB-RAM can be written directly to its reserved locations in long-term (e.g., flash-based) storage. In a preferred embodiment, with hundreds of input/output channels, the number of read/write accesses per second, per FIRE channel, is orders of magnitude faster than the per-channel rate of hard disk drives. See also: BB-RAM, DRAM, CHARM, NEAR.

FIFO. First In, First Out. A queuing discipline intuitively equivalent to "first come, first served."

FLAMERouter™. Firewall, Link-Aggregator/Multiplexer & Edge Router. (aka FLAMER) A special MASTER that serves as a gateway and tunneling router between the LAN fabrics of a SHADOWS node and one or more wide-area networks (WANs). Automatically tunnels SHADOWS communications protocols (e.g., RUSH, RECAP, UNCAP) over existing LAN and/or WAN protocols as necessary. See also: HSLS, RUSHrouter, LAN, Tunneling Router, WAN.

FORCE™. Frictionless Organic Rankine Cycle Engine. A kilowatt-scale turboalternator (heat engine) consisting primarily of an efficient, low-temperature (130° C.), low-pressure (6-8 bar) vapor turbine connected to an alternator. The FORCE turboalternator has only one moving part (the shaft), which spins at very high speed (e.g., nominally at 62,000 RPM in a preferred embodiment) and rides on hydrodynamic "vapor bearings"—essentially a vapor layer created by its rotating foils, due to the Bernoulli effect. The vapor bearings are optimally advantageous to reduce friction losses to near zero during normal operation (there is still some residual friction due to colliding vapor molecules). A novel optional embodiment of the FORCE turbine also engages separate pneumatic-like vapor bearings during spin-up and spin-down (but not during normal operation), and thus completely avoids any wear-inducing friction within the turbo machinery. In the absence of separate spin-up/spin-down vapor bearings, the foils of such turbo-machinery incur friction (and thus, wear) during spin-up and spin-down (whenever the turbine drops below, say, for example, about 2500 RPM).

FPGA. Field-Programmable Gate Array. A type of reconfigurable logic, based in hardware, that may also include specialized, embedded devices to that provide enhanced functionality and/or performance while minimizing the use of reconfigurable logic gates. Contrast with ASIC. See also: ASIC.

FPSC. Free Piston Stirling Cooler.

FPSE. Free Piston Stirling Engine.

FRAME™. Forced Recuperation, Aggregation & Movement of Energy. A power production and/or peak-shaving energy management capability whose goal is to reduce operational costs and enhance or enable survivability. FRAME works by significantly reducing the energy required to operate a heat-dissipating system (such as a computing system), through the recuperative use of energy in general, and by time-shifting the generation and consumption of power to the most effective and/or efficient time-frames.

FSLS. Fuzzy Sighted Link State. A family of wireless routing algorithms (e.g., for a wireless mesh) that depends on the observation that changes in links which are far away (i.e., relative to the mesh) are less important than those links that are nearby. With FSLS, any changes in link states are propagated quickly to nearby nodes, and much less quickly to distant nodes (because the distant nodes don't directly use the nearby link state updates in their link state calculations). See also: HSLS.

Fully Associative Cache. A cache where data from any address can be stored in any cache location. The whole address must be used as the tag. All tags must be compared simultaneously (associatively) with the requested address and if one matches then its associated data is accessed. This requires an associative memory to hold the tags which makes this form of cache more expensive. It does however solve the problem of contention for cache locations (cache conflict) since a block need only be flushed when the whole cache is full and then the block to flush can be selected in a more efficient way. See also: Cache, Direct Mapped Cache, Set Associative Cache.

Gbps. Giga-bits per second. A measure that often refers to a serial communications rate, in billions of bits per second (i.e., one thousand Mbps). Although there are technically 8 bits per byte, in serial communications there is usually a synchronization overhead (e.g., 1 start bit and 1 stop bit for every 8 bits of data), resulting in a 10:1 ratio of bits to bytes when calculating raw throughput (i.e., ignoring compression and additional protocol overheads). Thus, for example a 10 Gbps link might yield only 1 GBps (10/10=1) rather than 1.25 GBps (10/8=1.25). See also: Mbps.

GWP. Global Warming Potential.

HANDLER™. Host Abstraction for Named Devices & Layered Executable Resources. In a preferred embodiment, a MASTER assigns virtualized computing, storage, and communications resources to a set of SLAVEs over which it has authority, and a HANDLER implements the physical interfaces of these resources. In a preferred embodiment, the HANDLER interfaces and logic are implemented within the SLAVE PUMP device(s) to which the SLAVE processors are attached, such that the HANDLER hardware provides functionality similar to a software-based isolation kernel. In a preferred embodiment, the HANDLER's hardware implementation supports dedicated per-process registers and FIFO devices that enable user-space input/output without system call overhead, within the security constraints set by the MASTER. See also: MASTER, PUMP, SELF, SERVANT, SLAVE.

Heat Flux. The flow rate of heat across or through a material, or the quantity of thermal energy transferred to a unit area per unit time, typically given in units of $W/cm^2$. See also: Critical Heat Flux, RUBE.

HMAC. Hashed Message Authentication Code. (Sometimes just MAC, although this can be confusing). A one-way hash computed from a message and some secret data, for the purpose of detecting whether a message has been altered. It is difficult to forge without knowing the secret data. See RFC 2402. See also: MAC.

HPC. High Performance Computing.

HSLS. Hazy-Sighted Link State. A routing algorithm (invented by researchers at BBN Technologies) in the family of wireless routing algorithms called FSLS. Its designers sought to minimize global network waste, the total overhead of which they defined as, "the amount of bandwidth used in excess of the minimum amount of bandwidth required to forward packets over the shortest distance (in number of hops) by assuming that the nodes had instantaneous full-topology information." The network overhead associated with HSLS is theoretically optimal, utilizing both proactive and reactive link-state routing to limit network updates in space and time, and on larger networks HSLS begins to exceed the efficiencies of the best-known other routing algorithms. Unlike traditional methods, HSLS does not flood the network with link-state information to attempt to cope with moving nodes that change connections with the rest of the network, nor does it require each node to have the same view of the network. In the SHADOWS infrastructure, a variant of HSLS may be used generally within any subsystems where distributed resource information is relevant to the distribution of resource flows (e.g., information, working fluids, energy, etc.), including specifically within the implementation of the FRAME subsystems (e.g., STEER) and the RUSH protocol (e.g., within each RUSHrouter) in particular. However, whereas HSLS chooses a single path such as within a wireless (radio) mesh network, the RUSH protocol chooses multiple paths, and is not limited to any particular types of networks (e.g., wired vs. wireless, mesh vs. point-to-point, etc.). Also, whereas HSLS chooses its path based on performance, the RUSH protocol views performance as only one of several indicators, and also considers resource consumption (e.g., channel types, bandwidth quotas, energy usage, energy reserves), service factors (e.g., type of service, SLAs, QoS), and security issues (e.g., risk posture, channel safety, stealth, visibility to traffic analysis), etc. See also: FLAMERouter, FSLS, QoS, RUSH, RUSHrouter, SLA.

HVAC. Heating, Ventilation, & Air Conditioning.

I2P. "Garlic Router". An open-source, anonymizing overlay network based on establishing secure, multi-hop connections among intentionally selected I2P nodes. Although I2P incorporates lessons learned from TOR, an alternative anonymizing network that predates it, I2P is fundamentally a packet switched network, while TOR is fundamentally a circuit switched one, allowing I2P to transparently route around congestion or other network failures, operate redundant pathways, and load-balance the data across available resources. TOR and I2P complement each other in their focus—TOR works towards offering high speed anonymous Internet outproxying, while I2P works towards offering a decentralized, resilient, low-latency network in itself. One goal of I2P is to achieve appropriateness for use in hostile regimes against state-level adversaries. I2P uses a technique called "garlic routing"—layered encryption of messages, passing through routers selected by the original sender. I2P sends messages by taking a message, encrypting it with the recipient's public key, taking that encrypted message and encrypting it (along with instructions specifying the next hop), and then taking that resulting encrypted message and so on, until it has one layer of encryption per hop along the path. Furthermore, at each layer, any number of messages can be contained, not just a single message. In addition to the "cloves" (individual messages), each unwrapped garlic message contains a sender-specified amount of padding data, allowing the sender to take active countermeasures against traffic analysis. I2P makes a strict separation between the software participating in the network (a "router") and the anonymous endpoints ("destinations") associated with individual applications. Any SHADOWS nodes that implement the RUSH protocol can participate in the I2P network both as one or more I2P routers and as one or more I2P endpoints or destinations. Although SHADOWS does not depend on I2P, participating in the I2P network provides a source of mix-in traffic that helps to prevent traffic analysis by a sophisticated attacker, while also helping the I2P network. See also: TOR, RUSH.

IEEE. Institute of Electrical and Electronic Engineers.

IGMP. Internet Group Management Protocol. A standard protocol for managing multicast groups.

Integrity. The quality of an information system reflecting the logical correctness and reliability of the operating system; the logical completeness of the hardware and software implementing the protection mechanisms; and the consistency of the data structures and occurrence of the stored data. In a formal security mode, integrity is interpreted more narrowly to mean protection against unauthorized modification or destruction of information.

Internet. The largest collection of networks in the world, interconnected in such a way as to allow them to function as a single virtual network. See also: IP.

IOPS. Input-output Operations Per Second. A measure of storage device random access performance. Storage devices such as magnetic disk drives support on the order of 100 IOPS, assuming one 512-byte sector for each IO (input-output) operation. Because the number of IOPS is partly determined by track-to-track latency and partly by rotational latency, and the latter is tied to the rotational rate of the drive, performance is much less than 100 IOPS for low-cost drives spinning at 4200 to 7200 RPM, and only slightly more than 100 IOPS for expensive top-of-the-line drives spinning at 15,000 RPM. In contrast, an inexpensive USB flash drive capable of read or writing at 20 MBps can achieve on the order of 40,000 IOPS (an improvement of 400×). Storage devices, however, are also rated in terms of sustained throughput (e.g., MBps), such as when streaming a large file with a single access, and in this context a single magnetic disk drive provides on the order of 60 MBps sustained vs. a USB flash drive throughput on the order of 20 MBps sustained. See also: MBps, USB.

IP. Internet Protocol. See RFC 791 and RFC 2460. See also: TCP, UDP.

ISP. Internet Service Provider.

LAN. Local Area Network.

LDAP. Lightweight Directory Access Protocol. See also: DELEGATE.

LEB128. Little Endian Base 128. A scheme (generally known in the art) for encoding integers densely that exploits the assumption that most integers are small in magnitude. This encoding is equally suitable whether the target machine architecture represents data in big-endian or little-endian order. It is little-endian only in the sense that it avoids using space to represent the "big" end of an unsigned integer when the big end is all zeroes or sign-extension bits. (Little Endian describes a processor architecture for which the least significant byte of a multibyte value has the smallest address).

MAC. Message Authentication Code. Used to validate information transmitted between two parties that share a secret key. Also: Media Access Control, the globally unique hardware address of an Ethernet network interface card. Also: Mandatory Access Control, a security criteria that contrasts with Discretionary Access Control (DAC). See also: DAC, HMAC.

MASTER™. Multiprocessor Adaptive Scheduler & Task Executor/Redirector. A distinguished capability that is responsible for participating in security decisions, including resource allocation, under the auspices of a trusted BOSS. A MASTER (or would-be MASTER, i.e., a "Candidate MASTER) maintains its distinguished bona fide MASTER status only under the auspices of other MASTERs (which is part of the function of the SELF system). Bona fide MASTERs self-organize into local and distributed teams that are collectively responsible for getting work done (including the computation and storage of data). In a preferred embodiment, a MASTER may have a number of dedicated, trusted, attached (and therefore local) SLAVE resources over which it enjoys complete control, via a HANDLER, and any number of "volunteer" SERVANT resources that are not trusted. See also: BOSS, HANDLER, SELF, SERVANT, SLAVE.

MARSHAL™. Multi-Agent Routing, Synchronization, Handling, & Aggregation Layer. A distinguished SERVANT node having the responsibilities of fulfilling a MARSHAL role. Any node, authenticated as having a MARSHAL role, that serves as a gateway for system users to access SHADOWS services via a network (e.g., the Internet). A MARSHAL may also communicate with other MARSHALs, under the auspices and control of a MASTER-led team, in order to implement one or more overlay networks and/or network fabrics whose purposes and characteristics are determined by the MASTER-led team (but are opaque to the MARSHALs). By design, a MARSHAL is not trusted, and the role is typically fulfilled by a SERVANT node (which is also inherently untrusted). Occasionally the MARSHAL role is fulfilled by a SLAVE (emulating a MARSHAL) that is operating under the auspices and control of a MASTER, through a HANDLER, and is therefore trusted, but this fact is never known to those communicating with the MARSHAL. A MARSHAL may reside virtually anywhere (e.g., at an ISP, on customer premises, at a telco central office, at a datacenter, on a utility pole, within a server or PC, etc.). See also: HANDLER, ISP, MASTER, PC, SELF, SERVANT, SLAVE.

Mbps. Mega-bits per second. A measure that often refers to a serial communications rate, in millions of bits per second. Although there are technically 8 bits per byte, in serial communications there is usually a synchronization overhead (e.g., 1 start bit and 1 stop bit for every 8 bits of data), resulting in a 10:1 ratio of bits to bytes when calculating raw throughput (i.e., ignoring compression and additional protocol overheads). Thus, for example a 10 Mbps link might yield only 1 MBps (10/10=1) rather than 1.25 MBps (10/8=1.25). See also: MBps.

MBps. Mega-Bytes per second. A measure that often refers to a storage device throughput rate, in millions of bytes per second, where 1 byte equals 8 bits. A storage device may have a peak rate that is constrained by its interface, and this rate is normally achieved only for short bursts, when the associated read or write request can be satisfied via the device's cache memory. A storage device also has a sustained rate that corresponds to the maximum rate at which the device can continuously read or write data, and this rate is tied to the accessibility of the underlying storage media (i.e., the media rate). See also: Mbps.

MDS. Maximum Distance Separable. Refers to a class of space-optimal erasure codes specified as (n,k), where n>k specially coded extra symbols are created from k original symbols, and any k out of n original and extra symbols is sufficient to reconstruct the original k symbols, which means that up to e erasures can be tolerated, where e=n−k. Such a code may also be equivalently represented as (n+m,m), where n specially coded extra symbols are created from m original symbols, and any m out of n+m original and extra symbols is sufficient to reconstruct the original m symbols, which means that up to e erasures can be tolerated, where e=n. By definition, erasures are symbols missing from known locations (i.e., the symbols are not known, but their position is). If, instead of e erasures, there are up to f faulty symbols, but their positions are unknown, then a system that can correct up to e erasures can correct at most f faulty symbols, where f=e/2 (intuitively, half the redundant codes are used to locate the errors, and the other half to correct them).

Memoization. A technique by which an existing function can be transformed into one that "remembers" previous arguments and their associated results. See also: FACTUAL, Memoize, Memoized Function.

Memoize. To modify a function such that re-computation of previously computed results is avoided in favor of retrieving and substituting the previously computed results themselves. Memoization essentially augments a computational function with a cache of previously computed results, indexed by the arguments of (i.e., inputs to) the previous computations. Memoization, since it is based on caching, therefore trades space for time. Memoization is only appropriate for pure functions (one with no side effects, whose return value depends only on the values of its arguments). Memoization is useful in all kinds of situations, including: almost any kind of searching (cache the results of the search so that you can skip it next time), HTML generation (cache the results of the generation process so that you don't have to generate the page next time), and numeric computation (cache the results of the computation). The word "memoize" was coined by Donald Michie in 1968. See also: Cache, Caching, FACTUAL, Memoization.

Memoized Function. A function that remembers which arguments it has been called with and the result returned and, if called with the same arguments again, returns the result from its memory rather than recalculating it. A memoized function (i.e., one with caching) may run faster than one without caching, but it uses up more memory. This same principle is found at the hardware level in computer architectures which use a cache to store recently accessed memory locations. See also: Cache, Caching, FACTUAL, Memoize.

MPI. Message-Passing Interface. See also: DELEGATE.

MRAM. Magnetic RAM. A relatively new type of NVRAM. See also: BB-RAM, NVRAM, RAM.

MTBF. Mean Time Before Failure. Older but synonymous term for MTTF. See also: MTTF, MTTR.

MTTF. Mean Time To Failure. When applied to disk drives, the MTTF is estimated as the number of power-on hours per year (usually assumed at 100% power on) divided by the AFR. Thus, a server-class disk drive with a manufacturer-specified AFR of 0.63% would have an estimated MTTF of about 1.4 million hours. PC-class disk drives typically have much lower AFR values, which are also calculated with a much lower number of power-on hours per year. Note, however, that even for server-class drives, observed AFR values in the field exceed 1%, with 2% to 4% common, and up to 12% observed in some systems, so the estimated MTTF needs to be carefully considered. See also: AFR, Availability, MTBF, MTTR.

MTTR. Mean Time To Repair. The average time (usually determined through empirical measurement) required to restore service after a breakdown or loss. See also: Availability, MTTF.

NaN. Not a Number. A value or symbol that is usually produced as the result of an operation on invalid input operands, especially in floating-point calculations. For example, most floating-point units are unable to explicitly calculate the square root of negative numbers, and may instead indicate that the operation was invalid and return a NaN result. In floating-point calculations, NaN is not the same as infinity, although both are typically handled as special cases in floating-point representations of real numbers as well as in floating-point operations. An invalid operation is also not the same as an arithmetic overflow (which might return an infinity) or an arithmetic underflow (which would return the smallest normal number, a denormal number, or zero). A NaN does not compare equal to any floating-point number or NaN, even if the latter has an identical representation. One can therefore test whether a variable has a NaN value by comparing it to itself (i.e. if x !=x then x is NaN). In the IEEE floating-point standard (IEEE 754), arithmetic operations involving NaN always produce NaN, allowing the value to propagate through a calculation (there are exceptions to this behavior in a proposed future standard). See also: IEEE.

NEAR™. Nearline Emulation & Archival Repository. Used by CHARM for nearline storage, NEAR is the technology underlying a NEARblade™ or NEARdrive™. It provides high-capacity, electronically assisted long-term data storage that is subject to minimal mechanical risk (including wear, vibration, and seismic events), due to significantly reduced mechanical duty cycle. The NEAR technology attempts to minimize the number of spinning disk drives while providing full accessibility to data. Prior to spin-down, the NEAR technology performs extensive analysis and maintenance, after which it may reconfigure the system as necessary in accordance with the analysis and maintenance results. Data stored in NEAR is safe from intruders even if stolen. As a fringe benefit of the NEAR storage approach, the number of read and/or accesses per second is orders of magnitude faster than unassisted hard disk drives. See also: CHARM, FIRE, SMART.

NVRAM. Non-Volatile RAM. Contrast with DRAM and SRAM, which are volatile. BB-RAM and MRAM are types of NVRAM. See also: BB-RAM, DRAM, MRAM, RAM, SRAM.

Object. An entity that contains or receives information and upon which subjects perform operations.

Packet. An ordered group of data and control signals transmitted through a network as a subset of a larger message.

Packet Switching. A communications paradigm in which packets (messages or fragments of messages) are individually routed between nodes, with no previously established communication path. Packets are routed to their destination through the most expedient route (as determined by some routing algorithm). Not all packets traveling between the same two hosts, even those from a single message, necessarily follow the same route.

Page Fault. The condition that occurs in a virtual memory system when there is an attempt to access a virtual memory page that is not currently present in physical memory. See also: Demand Paging, Swapping.

PC. Personal Computer.

PERKS™. Peak Energy Reserve, Kilowatt-Scale. A hybrid energy system combining UPS with a peak-shaving system that directly captures excess or low-cost energy from a multiplicity of sources (when it is cheapest or most readily available) and stores it for later reuse, such as during peak periods (when power is most expensive or less available). Unlike a UPS which remains charged "just in case," the PERKS capability continually captures and discharges stored energy "just in time," as needed, so as to reduce the overall energy cost and maximize full-processing availability. Depending on capacity and load, PERKS may also serve as an extended runtime UPS.

POL. Point-of-Load. Point-of-load (POL) DC-DC converters enable electronic developers to overcome the challenges caused by the high peak current demands and low noise margins of high-performance semiconductor devices, by placing individual, non-isolated, DC power sources near their point of use, thereby minimizing losses caused by voltage drops and ensuring tight voltage regulation under dynamic load conditions. POL devices also reduce noise sensitivity and EMI emissions by significantly shortening potential radiators and RF-susceptible conductors.

Policy-based Management. A method of managing system behavior or resources by setting "policies" (often in the form of "if-then" rules) that the system interprets.

POP3. Post Office Protocol, v.3. See also: DELEGATE.

PP. Protection Profile. An implementation-independent set of security requirements and objectives for a category of products or systems which meet similar consumer needs for IT security. A PP is intended to be reusable and to define requirements which are known to be useful and effective in meeting the identified objectives. Also: A reusable set of either functional or assurance components (e.g., an EAL), combined together to satisfy a set of identified security objectives. Information about Protection Profiles can be found on the Internet at http://www.iatf.net. See also: CC.

Priority Loads. In power plants where load management schemes are used, a priority is assigned to each load center. Loads with the highest priority are powered first and shed last.

PRNG. Pseudo-Random Number Generator. A mechanism for generating pseudo-random numbers on a computer. They're called pseudo-random, because you can't get truly random numbers from a completely non-random thing like a computer. A pseudo-random number generator is a computational or physical device designed to generate a sequence of numbers that does not have any easily discernable pattern, so that the sequence can be treated as being random. In reality, however, if a computer generates the number, another computer can reproduce the process. Random number generators have existed since ancient times, in the form of dice and coin flipping, the shuffling of playing cards, the use of yarrow stalks in the I Ching, and many other methods. See also: Pseudo-Random Number, Random Number Generator.

Protocol. A formal set of conventions governing the formatting and relative timing of message exchange between two or more communicating systems or devices.

Proxy. A software agent, often a firewall mechanism, that performs a function or operation on behalf of another application or system while hiding the details involved. See also: FLAMERouter, MARSHAL, RUSHrouter.

Proxy Server. A firewall component that manages Internet traffic to and from a LAN and that can provide other features, such as document caching and access control. A proxy server can improve performance by supplying frequently requested data, such as a popular Web page, and it can filter and discard requests that the owner does not consider appropriate, such as requests for unauthorized access to proprietary files.

Pseudo-Random Number. One of a sequence of numbers generated by some algorithm so as to have an even distribution over some range of values and minimal correlation between successive values. See also: PRNG.

PUMP™. Parallel Universal Memory Processor. See also: HANDLER, MASTER, SLAVE.

PV. Photo-Voltaic. A type of solar cell and produces electrical energy on exposure to sufficiently bright light sources.

QoS. Quality of Service. A term used in an SLA denoting a guaranteed level of performance (e.g., response times less than 1 second). Also: A group of service classes that define the performance of a given circuit.

RAM. Random Access Memory. A computer's direct access memory that can be accessed very quickly and overwritten with new information. With the exception of NVRAM (which is specifically non-volatile), RAM loses its content when power is turned off, but not so much that its cannot be reconstructed by a sophisticated (e.g., state-funded) adversary (the longer that a particular memory bit maintains its value, the more recoverable it is by an adversary that gains physical access, so powering off, or making a few passes of rewriting random data really has little effect). In a preferred embodiment of the CHARM PUMP subsystem, memory accessible by the PUMP (and via the PUMP), can be protected by the PUMP's ability to maintain complementary states in memory—a technique where memory locations are invisibly toggled to and from their complementary states such that each state has a duty cycle of approximately 50% (which means that an adversary gaining physical access cannot determine previous contents after a power-off). See also: BB-RAM, CHARM, DRAM, MRAM, NVRAM, PUMP, SRAM.

RECAP™. Reliably Efficient Computation, Adaptation, & Persistence. A proprietary asynchronous real-time protocol used by MASTERs to communicate with other MASTERs, and with any SLAVEs under their control. The RECAP protocol is never used in the clear, even locally, and it is assumed to be subject to Byzantine failures. RECAP may be safely tunneled via other protocols, especially RUSH, but such tunneling is performed only by a specially authorized device called a FLAMERouter (described elsewhere), which also contains a MASTER. RECAP is used for communication among what are "hoped" to be trusted parties, in contrast to UNCAP. See also: FLAMERouter, RUSH, Tunneling Router, UNCAP.

RF. Radio Frequency.

RLE. Run-Length Encoding. A very simple form of lossless data compression in which runs of data (that is, sequences in which the same data value occurs in many consecutive data elements) are stored as a single data value and count, rather than as the original run. This is most useful on data that contains many such runs; for example, simple graphic images such as icons and line drawings, but can provide compression as long as the encoded sequence is shorter than the original run. Compression in CHARM is augmented by RLE. CHARM uses a back-to-back encoding sequence RLE-1, RLE-2, and RLE-3, to first encode repeating single-byte runs (such as a string of blanks), then repeating double-byte runs (including pairs produced by RLE-1), then repeating triple-byte runs (including triplets produced by RLE-2). After CHARM does RLE-encoding, additional compression techniques are used. While all the CHARM algorithms can be implemented in software, in a preferred embodiment they are implemented in hardware, in the CHARM PUMP. See also: CHARM, Delta Compression.

RNG. Random Number Generator. A random number generator is a computational or physical device designed to generate a sequence of numbers that does not have a pattern. In theory, true random numbers only come from truly random sources, such as atmospheric noise and radioactive decay.

RUBE™. Recuperative Use of Boiling Energy. A system using a relatively low-temperature phase-change working fluid in conjunction with heat exchanger surfaces that promote heterogeneous nucleation, in order to separately recuperate heat energy ("boiling energy") from hot spots and warm spots for immediate or subsequent reuse. "Boiling energy" in this context refers to energy that can be used immediately (or stored for later use) to help effect a liquid/vapor phase-change, without approaching the critical heat flux. In a preferred embodiment, recuperated energy heats and expands the working fluid (causing a phase-change to vapor if the temperature is sufficiently high), which, in conjunction with optional vapor injection, creates a motive force that helps to circulate the working fluid among system components (in order to thermally stabilize the system, to further extract re-usable energy for immediate reuse or storage, and to efficiently exhaust waste energy without overly subcooling the working fluid). In a preferred embodiment, a small, continuous, positively pressurized liquid flow is maintained, ensured via a low-power pump means, in order to prevent dryout, eliminate local hot spots, and assure thermal stability—as an asset-protection mechanism that serves to reduce or eliminate dependency on thermal expansion, nucleation and vapor injection as the only motive forces (the pump may be optionally powered off when the required flow can be maintained without it, e.g., due to vapor injection or other means). In a preferred embodiment, the low-power pump means is doubly or triply redundant, due to its nature as an asset-protection mechanism. An overview of the RUBE Heat Energy Recuperation Cycle is depicted below, for a preferred embodiment. See also: Critical Heat Flux, Heat Flux, RUBE Double-Boiler, RUBE Inner Boiler, RUBE Vapor Injector.

RUBE Double-Boiler. The RUBE Double-Boiler apparatus is part of a closed-loop system, that, in a preferred embodiment is connected to other components as shown in the figure, "RUBE—Heat Energy Recuperation Cycle Overview." The RUBE Double-Boiler apparatus comprises an "inner boiler" and an "outer boiler," such that the former is fully enclosed within the latter, in order to maximize the recuperation of heat energy (thermal energy) dissipated by the aggregation of enclosed heat sources, and optionally, to separate the recuperated heat energy into two or more "grades" according to desired or observed temperatures. In a preferred embodiment, the "hot" heat sources (i.e., those components with a relatively higher heat flux, such as CPUs) are placed within the inner boiler (or at least have their "hot" surfaces within the inner boiler), and the "warm" heat sources (i.e., those components with a relatively lower heat flux, such as flash memory chips) are placed within the outer boiler. Both the inner and outer boilers are pressure vessels intended to withstand a maximum of 7-bar operating pressures (100 PSI) under normal conditions. Leaks within the inner boiler cause only a reduction in efficiency, but leaks in the outer boiler can cause a loss of working fluid and a subsequent reduction in local survivability. In a preferred embodiment, such as for electronics thermal stabilization applications, the working fluid may be an organic dielectric fluid with a boiling point between 20° C. and 40° C., such as 1-methoxy-heptafluoro-propane (C3F7OCH3). Other working fluids may also be suitable, some examples of which are listed in section 10.3. In a preferred embodiment, the RUBE Double-Boiler apparatus has an outer shell of cast aluminum (although other construction methods and materials are possible), and its external shape and form factor is such that it can mate with guide channels extruded into a vertically oriented cylindrical or partly cylindrical aluminum extrusion designed to contain a multiplicity of RUBE Double-Boiler units. Given the aforementioned vertically oriented extrusion, the intent is to be able to easily align and slide the RUBE Double-Boiler apparatus from the extrusion upper opening, downward into the extrusion until it reaches a bulkhead, where couplings and connectors on the bottom of the Double-Boiler apparatus mate with complementary couplings and connectors within the extrusion. In a preferred embodiment, the RUBE Double-Boiler apparatus is a pressure-sealed, field-replaceable unit having blind-mating, quick-disconnect inlet and outlet couplings with double EPDM seals (although other seal materials are possible, EPDM is preferred for its compatibility with the preferred working fluid), and capable of operating at 100 PSI, such as those available from Colder (the extrusion would contain mating couplings). In a preferred embodiment, the RUBE Double-Boiler apparatus is also electrically sealed and EMP-hardened, having blind-mating, quick-disconnect electrical connectors with a multiplicity of conductors appropriate for the ingress and egress of electrical power feeds and various high-frequency signals such as are common in computer and telecommunications devices. In a preferred embodiment, the RUBE Double-Boiler apparatus connects to a "bottom plane" or equivalent connector arrangement in the vertical extrusion by means of a proprietary, pin-free connector designed by Morgan Johnson, and having the property of providing an extremely high quality, nearly noise-free connection. See also: RUBE, RUBE Inner Boiler.

RUBE Inner Boiler. A means for recuperating the heat energy dissipated by the relatively high-heat-flux heat-producing devices so that, to the extent practical, it can be converted to usable mechanical and/or electrical energy. The inner boiler apparatus is colocated with the "hot" surfaces (the surfaces with the largest heat flux) of the "hottest" of the heat-producing devices, which are so arranged that such placement is possible with a minimum (or otherwise convenient) number of manifolds (one of the factors determining the maximum size of the manifolds is the desire to take advantage of "Rapid Injection Molding" techniques, in order to reduce the cost and lead times normally associated with injection-molded components). In a preferred embodiment, the inner boiler apparatus is oriented vertically (although it is often depicted horizontally for convenience) such that the vapor outlet is at the top, and the liquid inlet and outlet are at the top or bottom. Once normal steady-state operation is reached, working fluid vapor is expelled through the vapor outlet and the liquid outlet is not used. Liquid working fluid is forced into liquid inlet, where it is equitably distributed within the injection-molded manifold chamber, and to each heat exchanger's inlet check valve, which it can then enter, since the working fluid is under pressure. For each heat exchanger, once the working fluid passes the corresponding inlet check valve, it enters the heat exchanger, where it circulates among the heat exchangers fins, pins, or other heat exchange surfaces. Depending on the then-current temperature and pressure, the working fluid may acquire heat energy, causing all or part of it to evaporate. In a preferred embodiment, such as for electronics thermal stabilization applications, the working fluid may be an organic dielectric fluid with a boiling point between 20° C. and 40° C., such as 1-methoxy-heptafluoropropane ($C_3F_7OCH_3$). Other working fluids may also be suitable, some examples of which are listed in section 10.3. In a preferred embodiment, the working fluid expands substantially when heated. Since the inlet is check-valved, this expansion greatly pressurizes the heat exchanger and the working fluid is expelled through the outlet check-valve (where it makes its way to vapor outlet and/or liquid outlet), thereby creating a partial vacuum within the heat exchanger under discussion (which helps to pull in more liquid working fluid). The hotter the system gets, the higher the pressure at which it can operate, up to the maximum desired target temperature of the heat-producing devices, or the useful upper limit of the working fluid, whichever is lower. In a preferred embodiment, one set of manifolds operates in the 30° C. to 40° C. range for a particular class of heat-producing electronic chips, while another set operates simultaneously in the 90° C. to 110° C. range for a different class of heat-producing electronic chips. The same working fluid may be used for both—in fact, the cooler system can "feed" the hotter system (however, this would typically require a boost in pressure, which can be accomplished externally via pumps, or via the RUBE Vapor Injector. See also: Critical Heat Flux, Heat Flux, RUBE, RUBE Double-Boiler, RUBE Vapor Injector.

RUBE Vapor Injector. Inspired by the Gifford Steam Injector (invented in 1858), the RUBE Vapor Injector is a means to: 1) maintain a load (the "boiler") within a desired temperature range, and 2) recuperate as much energy as possible from the heat dissipated by the load, in order to convert the recuperated heat energy into mechanical energy (specifically, pressure energy) that can be used as motive force to reduce or eliminate the energy that would otherwise be needed for circulation pumps in a phase-change heating, cooling, and/or power generation system. In a preferred embodiment, such as for electronics thermal stabilization applications, the working fluid may be an organic dielectric fluid with a boiling point between 20° C. and 40° C., such as 1-methoxy-heptafluoropropane ($C_3F_7OCH_3$). Other working fluids may also be suitable, some examples of which are listed in section 10.3. In a preferred embodiment, the working fluid expands substantially when heated. See also: RUBE, RUBE Double-Boiler, RUBE Inner Boiler.

RUSH™. Rapid Universal Secure Handling. A multi-level proprietary communications protocol that has both asynchronous and synchronous characteristics and can stand alone or be tunneled over existing WAN protocols (whether synchronous or asynchronous). RUSH is used as the primary carrier protocol among FLAMERouters, MARSHALs, and client-side RUSHrouter software or hardware. RUSH can directly incorporate flows from the RECAP and UNCAP protocols, and also tunnels them, along with various industry-standard protocols. The RUSH protocol can take advantage of other protocols (e.g., I2P, TOR) as necessary to prevent (or reduce the threat of) traffic analysis, and can also tunnel other protocols, for the same reasons. A key characteristic of RUSH is its propensity for simultaneously utilizing multiple network channels, interfaces, gateways, routes, etc., such that a single conceptual source and destination pair effectively becomes multiple targets and destinations that tend not to be apparently related unless an adversary has truly global visibility (in which case, such an adversary still faces a multiplicity of overwhelming cryptographic and traffic analysis challenges). RUSH incorporates statistical information for resource management (load balancing, energy usage, QoS, etc.). See also: DoD, FLAMERouter, I2P, MARSHAL, RECAP, RUSH, RUSHrouter, TOR, Tunneling Router, UNCAP, WAN.

RUSHrouter™. An untrusted software or hardware tunneling router that implements only a subset of FLAMERouter capability, and in particular, can communicate with the SHADOWS infrastructure only via the RUSH protocol (which also embeds the UNCAP protocol). RUSHrouters are untrusted because of the lack of control over their environments, and has nothing to do with its inherent trustworthiness. Any computing system containing a SHADOWS non-trusted component (e.g., DELEGATE, SERVANT) must also include at least one RUSHrouter to facilitate communication with the SHADOWS infrastructure. In a preferred embodiment, each outbound channel interface (e.g., a physical network interface, wireless adapter, etc.) has a dedicated RUSHrouter operating in its own VM; a separate RUSHrouter, also in its own VM, serves as the default gateway for the host computer, interfacing any hosted applications to the SHADOWS infrastructure by appropriately routing communications through the RUSHrouters that control the channel interfaces. See also: DELEGATE, FLAMERouter, RUSH, SERVANT, Tunneling Router, UNCAP, VM.

SAS. Serial Attached SCSI. A disk drive interface standard that supersedes parallel SCSI and can accept either SAS or SATA disk drives. See also: SATA.

SATA. Serial ATA. A disk drive interface standard that supersedes parallel ATA. SATA disk drives be used with either SAS or SATA disk host adapters, but a SATA host adapter can communicate only with SATA drives. See also: SAS.

SBU. Sensitive-but-Unclassified. See also: Sensitive Information.

SCADA. Supervisory Control And Data Acquisition. A category of mechanisms for process control that includes hardware and software components. SCADA provides for the collection of data in real time from sensors and machines in order to control equipment and conditions, and typically includes transmitting the data to one or more central locations for logging and/or analysis.

SCRAM™. Survivable Computing, Routing, & Associative Memory. A SHADOWS network building block including computation, routing, and associative memory ("working storage") and implementing at least a particular minimum configuration of the CHARM, SELF, CORE, and FRAME technologies. An individual SCRAM machine is intended to be self-contained and capable of operating on or off the electrical grid for extended durations, and without human attention or maintenance. By design, a SCRAM machine is its own miniature datacenter that can be located in out-of-the way places such as underground, on a pole or roof, etc., as easily as in an office, warehouse, or datacenter. See also: CHARM, CORE, FRAME, SCRAMnet, SELF, SUREFIRE.

SCRAMnet™. A SCRAM-based network comprising any number of geographically proximate MASTERs, SLAVEs, and SERVANTs. On a WAN level, SCRAMnets are the basis of the SHADOWS infrastructure, but must always operate under the auspices of a distributed team that includes multiple MASTERs. Each SHADOWS node is a SCRAMnet, but not necessarily vice-versa. A SCRAMnet must meet specific requirements to become a SHADOWS node. Geographically proximate SERVANTs can organize themselves into SCRAMnets without having a local MASTER, but only for the purpose of establishing communication with the SHADOWS network, at which point they may be assigned to a MultiMASTER team (which always has multiple MASTERs, by definition). SERVANTs must be able to communicate with the SHADOWS network, either individually or collectively, and they may cooperate extensively to do so. Any "Candidate MASTER" that is unable to establish itself as a MASTER (i.e., a full peer with other MASTERs) retains its candidacy but is unable to fulfill any of the responsibilities of a MASTER. Rather than waste its resources, a "Candidate MASTER" may "volunteer" (or attempt to volunteer) to operate under the auspices of a team of MASTERs, in the role of SERVANT. See also: MASTER, SCRAM, SERVANT.

SEC-DED. Single Error Correction, Double-Error Detection. A form of ECC that can correct a single memory error or SEU, and detect two. See also: DRAM, ECC, SEU.

SELF™. Secure Emergent Learning of Friends. An automated identity- and role-oriented "immune system" that differentiates "self" and "non-self", "friend" and "foe"—i.e., between authorized and unauthorized objects, subjects, and interactions. The focus of SELF is on the recognition of a relatively small set of correct behaviors rather than the recognition of any of an infinitely large set of counterfeit behaviors (by definition, all non-self behavior is assumed malicious). SELF is the basis for establishing and maintaining trust among the interdependent systems, subsystems, and components in a SHADOWS infrastructure. SELF includes novel Byzantine agreement logic in its decision-making process. SELF is highly integrated with BOSS (which is the definitive authority on trust and correctness), and with the RECAP, UNCAP, and RUSH protocols. Any anomalous, "non-self" behavior activates an appropriate immune system response. See also: BOSS, MASTER, RECAP, RUSH, SCRAMnet, SERVANT, UNCAP.

Sensitive Information. Information that, as determined by a competent authority, must be protected because its unauthorized disclosure, alteration, loss, or destruction can at least cause perceivable damage to someone or something. (DoD 5200.28-STD). See also: SBU, Sensitivity Label.

Sensitivity Label. A piece of information that represents the security level of an object and that describes the sensitivity (e.g., classification) of the data in the object. Sensitivity labels are used by the TCB as the basis for mandatory access control decisions. (DoD 5200.28-STD). In the SHADOWS infrastructure, an object's sensitivity label (and other security properties) is available to CHARM (the SHADOWS associative memory system), and therefore to BOSS (the SHADOWS TCB), without having to retrieve the object itself, via its FASTpage index entries. See also: BOSS, CHARM, FASTpage, Sensitive Information, TCB.

SERVANT™. Service Executor, Repository, & Voluntary Agent—Non-Trusted. A cooperative computing and/or storage node that is untrusted (usually due to potential threat exposure). A MASTER that is not recognized as a MASTER by other MASTERS may operate as a SERVANT (but to do so, it must use the UNCAP protocol, tunneled via RUSH, rather than the RECAP protocol). See also: BOSS, MASTER, RECAP, RUSH, SCRAMnet, SELF, UNCAP.

Set Associative Cache. A compromise between a direct mapped cache and a fully associative cache where each address is mapped to a certain set of cache locations. The address space is divided into blocks of 2 m bytes (the cache line size), discarding the bottom m address bits. An "n-way set associative" cache with S sets has n cache locations in each set. Block b is mapped to set "b mod S" and may be stored in any of the n locations in that set with its upper address bits as a tag. To determine whether block b is in the cache, set "b mod S" is searched associatively for the tag. A direct mapped cache could be described as "one-way set associative" (i.e., one location in each set), whereas a fully associative cache is N-way associative (where N is the total number of blocks in the cache). Performance studies have shown that is generally more effective to increase number of entries rather than associativity and that 2- to 16-way set associative caches perform almost as well as fully associative caches at little extra cost over direct mapping. See also: Cache, Direct Mapped Cache, Fully Associative Cache.

SEU. Single Event Upset. A probabilistic, localized error in computer memory (e.g., DRAM) or logic, typically caused by cosmic rays or alpha particles striking a transistor or memory cell and causing it to change state. The primary goal of ECC mechanisms is to detect and/or correct the inevitable occurrence of one or more SEUs. Consumer computers rarely have ECC at all, but server computers often protect their main memory systems with SEC-DED ECC (which is capable of correcting a single error per access), and sometimes have a "Chipkill" type of ECC that can detect a single chip failure and some multiple SEU combinations. Because SEUs are probabilistic, however, as memory capacities and densities increase, and as average chip temperature increase, the likelihood of SEUs increases even more quickly than one might expect. SEU likelihood has now increased to the point that failure due to uncorrectable SEU is becoming a relatively common event, even when SEC-DED ECC is used. See also: CHARM, DRAM, ECC, FEC, SEC DED.

SFF. Small Form Factor.

SHADOWS™. Self-Healing Adaptive Distribute Organic Working Storage. A SHADOWS network consists of a combination of terrestrial and space-based SHADOWS nodes and singleton SCRAM machines (described later, along with SERVANTs and MARSHALs). In general, a geographically proximate collection of SCRAM machines may self-organize into a geographically proximate SCRAMnet comprising a SHADOWS node. SCRAM machines that are unable to join a SHADOWS node remain as singletons until they can join one, if ever. Singletons act as SERVANTs to bona-fide SHADOWS nodes, and as MARSHALs between SHADOWS nodes and system users (however, non-singletons also volunteer for these roles on a part-time basis).

Simulate. Representing the functions of one system by another (e.g., using a computerized system to represent a physical system). See also: Emulate.

Simulation. Generally, the process of representing one system by another (e.g., representing the real world by a mathematical model solved by a computer). See also: Emulation.

SIP. Session Initiation Protocol. See also: DELEGATE.

SLA. Service Level Agreement.

SLAVE™. Storage-Less Adaptive Virtual Environment. A trusted cooperative computing, memory, and/or storage capability under total control of a MASTER, which delegates authority and resources to the SLAVE as needed. Every SLAVE must be physically attached to and co-located with at least one local MASTER in order to operate at all.

SMART. Self Monitoring Analysis & Reporting Technology. Also: S.M.A.R.T. A monitoring system and signaling interface for magnetic disk drives to detect and report on various indicators of reliability. SMART enables a host processor to receive analytical information from the disk drive that may be useful for anticipating failures. See also: NEAR.

SOLAR™. Self-Orienting Light-Aggregating Receiver. In a preferred embodiment, a system using a relatively low-temperature phase-change working fluid to receive heat energy from the sun for immediate use (in which case it acts as a "boiler") or subsequent use, and especially for the primary purpose of generating electricity. In an alternative embodiment, a system using a relatively low-vapor-pressure working fluid (for example, an appropriate Paratherm thermal oil) to receive heat energy from the sun for immediate or subsequent use. The heat energy in this context refers to energy that can be immediately used immediately (or stored for later use) to effect or help effect a liquid/vapor phase-change, such as occurs, by design, in a "boiler." Received energy heats and expands the phase-change working fluid (which may have been preheated via RUBE, above), and which, in conjunction with optional vapor injection (see RUBE Vapor Injector, described elsewhere) in the "boiler" feed circuit, and in conjunction with a FORCE nanoturbine or FPSE (Free Piston Stirling Engine) in the "boiler" output circuit, can be used to accomplish work, and particularly, to generate electricity.

SRAM. Static RAM. A type of volatile RAM whose cells do not need to be continually refreshed, but which may lose data if power is removed. Contrast with DRAM and NVRAM. See also: DRAM, NVRAM, RAM.

SSD. Solid-State Disk. A general-purpose electronic storage device that emulates a traditional "spinning" disk drive, but actually contains no moving parts, and thus incurs no performance penalty due to rotational latency or track-to-track seek latency. Historically, SSDs have been expensive, and thus relegated to special purpose applications requiring the lowest possible disk access latency. Implementations based on NVRAM or SRAM are much more expensive per byte stored than those based on DRAM, largely due to their higher speed and lower storage density. It is generally accepted that SSD can comprise a battery-backed RAM (BB-RAM) with a backup disk drive, but there is less consensus as to whether "flash memory" on its own can constitute a general purpose SSD, due to the fact that flash memory technology currently supports only a finite number of write cycles (typically 10,000, or 100,000, or a million) to a particular location. Relatively new technologies such as MRAM hold promise, since they have the potential to be dense, fast, and relatively inexpensive. See also: BB-RAM, MRAM, NVRAM.

STEER™. Steerable Thermal Energy Economizing Router.

STP. Standard Temperature & Pressure. A temperature of zero degrees Celsius (0° C.) and a pressure of one atmosphere.

Subject. An entity that causes operations to be performed.

SUREFIRE™. Survivable Unmanned Renewably Energized Facility & Independent Reconfigurable Environment. A miniature, self-contained, unmanned, secure, outdoor (often underground) supercomputing datacenter designed to be physically visited for maintenance purposes at most only once or twice a year (and these may be combined with scale-up visits). SUREFIRE sites can be located on virtually any outdoors property, but also in basements or on rooftops, etc. SUREFIRE sites usually include one or more renewable energy systems, in addition to conventional energy sources. SUREFIRE sites are designed for maximal energy efficiency, and emit very little waste heat. All SUREFIRE sites may be expendable without data loss, and penetration can never yield useful information to an attacker. See also: SCRAM.

Swap File. A special file in a virtual memory system which is used to temporarily store "dirty" memory pages. Swap files, although typically disk-based, are often organized for relatively rapid access compared to writing dirty pages back to their original location. See also: Demand Paging, Swapping.

Swapping. In a virtual memory system, a technique to remove virtual pages from physical memory in order to replace them with others that are currently needed. "Dirty" pages (those which came from an executable image or data file and have been modified but not yet written back) are written to a "swap file" temporarily (unless they've been written previously and are unchanged, in which case they can simply be deleted). Non-dirty pages can simply be deleted, since they can be reread on demand. Pages are swapped out only if the data in them cannot be retrieved another way. See also: Swap File.

Tcase. The temperature of the case (package) enclosing an integrated circuit chip at a particular point in time.

TCB. Trusted Computing Base. The TCB is a useful concept because it identifies, within a system, the subsystem which owns the security (in the SHADOWS infrastructure, BOSS implements the TCB). The rest of the components may communicate with this TCB and rely on it to make correct security decisions. Thus, the TCB must exist and it must make 100% of the security decisions. The DoD defines the TCB as the totality of protection mechanisms within a computer system—including hardware, firmware, and software—the combination of which is responsible for enforcing a security policy. A TCB consists of one or more components that together enforce a unified security policy over a product or system. The ability of a trusted computing base to correctly enforce a security policy depends solely on the mechanisms within the TCB and on the correct input by system administrative personnel of parameters (e.g., a user's clearance)

related to the security policy. (DoD 5200.28-STD). TCSEC1983 defines the TCB as "the totality of protection mechanisms within a computer system, including hardware, firmware, and software, the combination of which is responsible for enforcing a security policy. Note: The ability of a TCB to enforce correctly a unified security policy depends on the correctness of the mechanisms within the TCB, the protection of those mechanisms to ensure their correctness, and the correct input of parameters related to the security policy." See also: BOSS, DoD, TCSEC.

TCP. Transmission Control Protocol. A set of IP-based networking protocols widely used on the Internet that provides communications across interconnected networks of computers with diverse hardware architectures and various operating systems. TCP over IP (TCP/IP) includes standards for how computers communicate and conventions for connecting networks and routing traffic. See RFC 793. See also: UDP.

TCS. Trusted Computer System. A system that employs sufficient hardware and software integrity measures to allow its use for processing simultaneously a range of sensitive or classified information. (DoD 5200.28-STD).

TCSEC. Trusted Computer System Evaluation Criteria.

TDP. Thermal Design Power. For power-hungry integrated circuit chips, there is sometimes an observable or even specified relationship between Tcase and TDP. See also: Tcase.

TLB. Translation Look-aside Buffer.

TOR. The Onion Router. An open-source, anonymizing overlay network based on establishing secure, multi-hop TCP connections among randomly selected TOR nodes. Any SHADOWS nodes that implements the RUSH protocol can participate in the TOR network as a TOR node. Although SHADOWS does not depend on TOR, participating in the TOR network provides a source of mix-in traffic that helps to prevent traffic analysis by a sophisticated attacker, while also helping the TOR network. See also: I2P, RUSH.

Trap Door. A hidden software or hardware mechanism that permits system protection mechanisms to be circumvented. It is activated in some non-apparent manner (e.g., special "random" key sequence at a terminal). (DoD 5200.28-STD).

Trojan Horse. A computer program with an apparently or actually useful function that contains additional (hidden) functions that surreptitiously exploit the legitimate authorizations of the invoking process to the detriment of security. For example, making a "blind copy" of a sensitive file for the creator of the Trojan Horse. (DoD 5200.28-STD).

Trusted. A Trusted system or component is one whose failure can break the security policy. See also: Trustworthy.

Trusted Path. A mechanism by which a person at a terminal can communicate directly with the TCB. This mechanism can only be activated by the person or the TCB and cannot be imitated by untrusted software. (DoD 5200.28-STD). See also: TCB, Trusted Software.

Trusted Software. The software portion of a TCB. (DoD 5200.28-STD). See also: TCB.

Trustworthy. A trustworthy system or component is one that won't fail. [R. J. Anderson, "Security Engineering: A Guide to Building Dependable Distributed Systems," Wiley (2001) ISBN 0-471-38922-6]. See also: TCB, TCG, Trusted, Trusted Path, Trusted Software.

Tunneling. Refers to the encapsulation of protocol A within protocol B, such that A treats B as though it were a data link layer. See also: Tunneling Router.

Tunneling Router. Router or system capable of routing traffic by encrypting it and encapsulating it for transmission across an untrusted network, for eventual de-encapsulation and decryption. The FLAMERouter and RUSHrouter are both tunneling routers. See also: FLAMERouter, RUSHrouter, Tunneling.

UDP. User Datagram Protocol. A Transmission Control Protocol (TCP) complement that offers a connectionless datagram service that guarantees neither delivery nor correct sequencing of delivered packets, much like Internet Protocol (IP) upon which it depends. See RFC 768. See also: TCP.

UNCAP™. Untrusted Node Computation, Adaptation, & Persistence. The secure, proprietary protocol used for communication between MASTER-led teams and the SERVANTs (i.e., untrusted nodes) that "belong" to them. UNCAP appears to be used for RUSHrouter-to-RUSHrouter communication also, but this is only coincidental, since every RUSHrouter comprises at least one SERVANT. UNCAP is always tunneled via the RUSH protocol, but unlike RECAP, there is no expectation of trustworthiness among its participants. See also: FLAMERouter, RECAP, RUSH, RUSHrouter, Tunneling Router.

Usability. The usability of a system involves three potentially conflicting factors: how quickly users can do what they want to do, how correctly they can do it, and how much they enjoy doing it. The underlying design of a computer system can affect its usability. Designing usability into a system involves analyzing users' needs, and then designing around those needs while optimizing the three factors.

USB. Universal Serial Bus. A tri-speed (high, full, low) signaling standard. High-speed USB 2.0 allows data transfer up to 480 Mbps, which is 40 times faster than full-speed USB. Due to signaling overhead, the USB 2.0 standard appears to have a throughput limitation of around 25 to 30 MBps, or is about half of what is implied by the raw data rate.

User. Any person who interacts directly with a computer system. (DoD 5200.28-STD). Also: Any entity (human user or external IT entity) outside of the computer system that interacts with it.

User Data. Data created by and for the user, that does not affect the operation of the system's security functions.

WAN. Wide Area Network.

WLAN. Wireless LAN.

VM. Virtual Machine. (In other contexts, "Virtual Memory").

VMM. Virtual Machine Monitor. Equivalent to hypervisor. Responsible for supervising virtual machines. In SHADOWS, the VMM is part of the BOSS role.

VLAN. Virtual LAN.

VoIP. Voice over IP. See also: DELEGATE.

VPN. Virtual Private Network.

4 SHADOWS™—Architectural Overview & Motivations

4.1 The Goal, in No Uncertain Terms

To achieve "An affordable, highly trustworthy, survivable and available, operationally efficient supercomputing infrastructure for processing, sharing and protecting both structured and unstructured information."

4.2 Historically Conflicting Requirements

A primary objective of the SHADOWS infrastructure is to establish a highly survivable, essentially maintenance-free shared platform for extremely high-performance computing (i.e., supercomputing)—with "high performance" defined both in terms of total throughput, but also in terms of very low-latency (although not every problem or customer necessarily requires very low latency)—while achieving unprecedented levels of affordability (both capital and operational expense)—that is capable of earning a deserved reputation for trustworthiness, survivability, and fault tolerance. These requirements have historically been in conflict with each other, and resolving them requires a new approach.

4.3 SHADOWS as a Distributed, Decentralized Centralized Architecture

At its simplest, the idea is to use distributed "teams" of nodes in a self-healing network as the basis for managing and coordinating both the work to be accomplished and the resources available to do the work. The SHADOWS concept of "teams" is responsible for its ability to "self-heal" and "adapt" its distributed resources in an "organic" manner. Furthermore, the "teams" themselves are at the heart of decision-making, processing, and storage in the SHADOWS infrastructure. Everything that's important is handled under the auspices and stewardship of a team.

Think: "The Borg" (a fictional being comprising life-like yet robot-like beings with a collective, distributed consciousness, from the science-fiction television show, "Star Trek"). The idea is to achieve an apparently centralized supercomputing infrastructure (SHADOWS), with all the advantages of centralization (but not the disadvantages), through the implementation of a highly distributed, decentralized organic network of cooperating nodes (working storage) that self-organize into teams, dynamically partition work and resources among the nodes and teams, and—importantly—hold each other accountable.

While it is straightforward to achieve high throughput via a large number of distributed nodes, it is not possible to do so with very low latency, and at very low cost. Thus, there must be collections of nodes that are sufficiently localized to reach a "critical mass" of computing power, in order to achieve the lowest possible latency for those problems and/or customers that require it, and to do so at the lowest possible cost (without sacrificing trustworthiness, survivability, and fault tolerance). A new kind of supercomputing machine—SCRAM—was conceived as the means to reconcile the conflicting requirements, including that of achieving low acquisition and operating costs. Each SCRAM machine is a self-contained supercomputer in its own right, but can be colocated with other SCRAM machines to multiply its capacity and performance without sacrificing latency, and SCRAM machines can be distributed to achieve arbitrary levels of survivability.

In SHADOWS terminology, "working storage" is not passive—it's active—the working storage actually does the work. A "node" is the smallest addressable unit of intelligent storage, or working storage. A node comprises at least one processor (to do computational work), along with some mix of volatile and non-volatile memory (to provide information storage).

SHADOWS nodes can be organized into "machines," and machines can be organized into "sites"—and these are the basis of the two primary conceptual SHADOWS building blocks:

Machines Comprise Nodes
Sites Comprise Machines

In a preferred embodiment, the subject machines are SCRAM machines, and the subject sites are SUREFIRE sites.

SCRAM machines are miserly in their energy usage and are self-contained (including computing, networking, persistent storage, power generation, etc.). SCRAM machines do not need computer-friendly environments (you could safely drop one into a lake without damaging it), so they can easily be distributed to multiple sites, which need not be data centers (any physically secure location may be appropriate). SCRAM machines are essentially very small, self-contained datacenters, except that they require external power and, to some degree (depending on the threat profile), physical protection.

In conjunction with SUREFIRE sites, SCRAM machines are designed for deployment to unmanned/unattended locations (e.g., underground) and require no routine maintenance.

4.4 SUREFIRE Sites as Survivable Mini-Datacenters

A SHADOWS "site" is defined as a group of SHADOWS machines (whether or not they are SCRAM machines) that share the same or approximately the same GPS coordinates (within some radius and/or margin of error) and are interconnected with a multiplicity of network switching and/or routing communications fabrics.

In a preferred embodiment, one or more SCRAM machines would be co-located at a site—in a particular kind of highly survivable facility referred to as a SUREFIRE site.

The are numerous SUREFIRE site configurations possible, in order to provide the basis of meeting a diverse set of needs. The four exemplary configurations described here are:

SUREFIRE Mini-Silo (preferred embodiment)
SUREFIRE Single-Level Underground Vault (alternate embodiment)
SUREFIRE Multi-Level Underground Vault (alternate embodiment)

The SUREFIRE Mini-Silo is a preferred embodiment, and by design its minimal configuration would enjoy the lowest cost of the three example underground configurations if deployed in volume, which would enable affordable, widespread deployment. The packaging of all of its major components is tailored especially to a silo configuration (a cylindrical shape approximately 3 feet in diameter). The SUREFIRE Mini-Silo can be configured to support various levels of performance in the sub-TFLOPS to 10 TFLOPS range, per silo.

The SUREFIRE Single-Level Underground Vault is an alternate embodiment—a larger diameter silo—that could be affordably produced in fairly low quantities (relative to the SUREFIRE Mini-Silo), and is able to accommodate a higher degree of conventional equipment than the SUREFIRE Mini-Silo. The SUREFIRE Single-Level Underground Vault is especially well-suited to supercomputing accompanied by significant radio communications (the silo itself serves as the base for relatively lightweight communications towers). The SUREFIRE Single-Level Underground Vault can be configured to support various levels of performance in the 0.5 TFLOPS to 10 TFLOPS range, per silo.

The SUREFIRE Multi-Level Underground Vault is an alternate embodiment—also in a silo configuration—that is likely to require a somewhat substantial level of site engineering and preparation prior to deployment. A typical deployment scenario would be underneath (literally) a commercial-class wind turbine (e.g., 100 KW or more). While the basic design is straightforward to replicate, its site preparation unlikely to be, due to the facility depth and likely permitting issues. The SUREFIRE Multi-Level Underground Vault can be configured to support various levels of performance in the 2 TFLOPS to 50 TFLOPS range, per silo.

4.5 How Distributed Machines are Organized at Multiple Sites

A SHADOWS "mesh" (which may also be a "neighborhood" and/or "community") is a group of SHADOWS sites in the same locale, sharing proximate GPS coordinates and interconnected with a meshed network of point-to-point and point-to-multipoint links, augmented by WAN links (in a preferred embodiment, a diverse multiplicity of terrestrial and satellite channels are used to achieve specific survivability goals).

A SHADOWS "region" is typically (but this may be defined by policy) the collection of WAN-connected (at least) SHADOWS sites supplied (or potentially supplied) by the same utility power grid (thus, in the U.S., for example, there are four regions under this definition, but other definitions are possible also). Adjacent regions may also enjoy mesh-like point-to-point or point-to-multipoint interconnections, which may have the effect of collapsing two or more physical (or policy-defined) regions into a single logical region.

A SHADOWS "theater" is a collection of WAN-connected sites which, for our purposes, is essentially distinguished by some combination of geographical, political, military, legal, and technical considerations that force special or self-similar treatment throughout the collection. Examples of theaters are North America, Western Europe, China, Japan, Australia, the stratosphere, the troposphere, LEO satellites, MEO, satellites, the moon, and Mars (this is clearly a non-exhaustive list).

Finally, the SHADOWS "universe" is the total collection of SHADOWS theaters, whether interconnected by any means whatsoever, or even disconnected.

Although traditional route optimizers and link-balancing devices can optimize for some combination of link performance and/or link cost, they generally consider the network only from the device's point of view, or with respect to a set of relatively local properties. This means, for example, that there is nothing to prevent such a device from choosing a low-cost outbound link that corresponds to a high-cost inbound link at the ultimate destination. This is usually the best that can be expected, especially when only the near end device is under local administrative control and responsibility.

In stark contrast, SHADOWS considers its entire network (i.e., the SHADOWS universe) as the basis for optimization. When optimizing for cost, for example, SHADOWS considers both the sending and receiving links for every SHADOWS node along a path.

Key SHADOWS drivers include the current and probable future availability of resources, and the maintenance of adequate reserves to ensure appropriate levels of survivability.

SHADOWS network routing is further complicated by the need to intentionally thwart traffic analysis by potential attackers. Thus, in addition to the functional boundaries, roles, and optimizations noted above, there are non-functional ones as well.

In particular, once communications exits the virtual world of SHADOWS, such that connection to the "real world" is required, new types of special capabilities are called for.

The Firewall, Link-Aggregator-Multiplexer, & Edge Router (FLAMERouter) capability lives at the interface between a SHADOWS supercomputing node and all external network connections (LAN and WAN). One of its primary responsibilities is to cooperate with the FLAMERouters of other SHADOWS nodes in order to transparently and logically connect each SHADOWS node to the others, optimally, using the Scrutiny RECAP (Reliably Efficient Computation, Adaptation, & Persistence) protocol over any and all channels available (private and public). A key goal is to handle traffic as though all the nodes were connected on an amalgam of VLANs and VPNs (but without the VLANs and VPNs), taking extraordinary measures as necessary to avoid partitioning of the "virtual network."

Another key role of the SHADOWS FLAMERouters is to safeguard the SHADOWS communications channels, not only to prevent denial of service (which includes resisting DDOS attacks), but also to prevent traffic analysis, so as to render the SHADOWS network opaque. FLAMERouters use active techniques, in conjunction with the SELF subsystem, to classify both inbound and outbound traffic as friendly, benign, or malicious. Friendly traffic (as determined by SELF) is granted the highest priorities. Benign and malicious traffic are both allowed, depending on the properties of the traffic itself, but are closely managed by the FLAMERouters so as to meet the specific needs of SHADOWS (non-self traffic is desirable for mixing purposes, as part of defending against traffic analysis by attackers, but must be limited to exactly the desired bandwidths, while ensuring that no malicious traffic is allowed to propagate).

As a fringe benefit of defending a SHADOWS network from DDOS attacks, a wide deployment of FLAMERouters is expected to have the ability to help mitigate the effects of "botnets" across the Internet in general. FLAMERouters can execute behavior-appropriate countermeasures.

The FLAMERouter processes can be implemented in software and/or hardware, but in a preferred embodiment are implemented primarily in reconfigurable hardware, under the auspices of dynamic configuration software, and under the control of the BOSS (Byzantine Object & Subject Security) and SELF (Secure Emergent Learning of Friends) subsystems.

The SHADOWS RUSHrouter behaves much like the FLAMERouter, but is designed for deployment to client locations, where it can serve as a host-resident proxy or default gateway, or live in the DMZ as a server, edge router, and default gateway. The primary role of the RUSHrouter is to enable and manage secure communications between client machines and RUSHrouters, between RUSHrouters and FLAMERouters (indirectly, because a RUSHrouter never knows when it is communicating with a FLAMERouter, which can emulate RUSHrouters), and among RUSHrouters, all under the auspices and control of the FLAMERouters.

RUSHrouters communicate natively using Scrutiny's RUSH and UNCAP protocols. The RUSH (Rapid Universal Secure Handling) protocol focuses on meeting the needs of clients (i.e., on the client-side of the RUSHrouters). The UNCAP (Untrusted Node Computation, Adaptation, & Persistence) protocol is a subset of RUSH and focuses on communications between the SHADOWS infrastructure and any SERVANTs that are implemented on client machines.

Because they are in essence client-side gateways and firewalls, with built-in proxy and server functions, RUSHrouters can also communicate (like a residential gateway/firewall) with arbitrary Internet destinations, including to and through overlay networks (e.g., the anonymizing networks TOR, I2P, etc.), and can do so by using any and all available connections (like a FLAMERouter). Client preferences (especially firewall and bandwidth preferences) can be set by authenticated clients, but all such configuration changes actually occur only at the behest of the FLAMERouters, based on client requests to configuration control processes in the SHADOWS infrastructure.

Although RUSHrouters are under the control of FLAMERouters, they technically do not actually communicate with them directly, since FLAMERouters are generally invisible except to specially privileged devices (and specifically, not to RUSHrouters). Instead, RUSHrouters communicate with a multiplicity of what they "think" are FLAMERouters, but are in actuality SHADOWS MARSHALs (Multiprocessor Adaptive Scheduler & Task Executor/Redirector).

A MARSHAL is much like a RUSHrouter, except that it lives not on the client side, but out in the Internet itself, typically in data centers or network hubs where multiple high-bandwidth connections are available. RUSHrouters and MARSHALs work together to route, mix, aggregate, and manage traffic, under the auspices and control of the FLAMERouters. Note that RUSHrouters and MARSHALs may be directed to send traffic to FLAMERouters (thinking they're sending it to another RUSHrouter or MARSHAL, because the destinations aren't recognizable as FLAMERouters). Only legitimate (i.e., authorized) traffic is ever directed to the FLAMERouters, although this may include both benign and malicious traffic (if desired by the FLAMERouters, but only to the extent so desired). A compromised RUSHrouter or MARSHAL that directs unwanted traffic (malicious or not) toward the FLAMERouters may face appropriate countermeasures.

The key differences among RUSHrouters, MARSHALs, and FLAMERouters are their roles, purposes, locations, location-induced vulnerabilities, configurations, and implementations. Otherwise, they are conceptually more alike than different, from a process point of view. RUSHrouters are oriented to client-side functions, MARSHALs are oriented to "middleman" functions, and FLAMERouters are oriented to server-side functions, yet they all can at least appear to emulate each other, to a point.

Note: Any FLAMERouter can emulate any number of RUSHrouters and MARSHALs, and so can communicate directly with them without revealing itself.

5.1 MARSHAL (Multi-Agent Routing, Synchronization, Handling, & Aggregation Layer)

MARSHAL™. Multi-Agent Routing, Synchronization, Handling, & Aggregation Layer. A distinguished SERVANT node having the responsibilities of fulfilling a MARSHAL role. Any node, authenticated as having a MARSHAL role, that serves as a gateway for system users to access SHADOWS services via a network (e.g., the Internet). A MARSHAL may also communicate with other MARSHALs, under the auspices and control of a MASTER-led team, in order to implement one or more overlay networks and/or network fabrics whose purposes and characteristics are determined by the MASTER-led team (but are opaque to the MARSHALs). By design, a MARSHAL is not trusted, and the role is typically fulfilled by a SERVANT node (which is also inherently untrusted). Occasionally the MARSHAL role is fulfilled by a SLAVE (emulating a MARSHAL) that is operating under the auspices and control of a MASTER, through a HANDLER, and is therefore trusted, but this fact is never known to those communicating with the MARSHAL. A MARSHAL may reside virtually anywhere (e.g., at an ISP, on customer premises, at a telco central office, at a datacenter, on

TABLE 1

SHADOWS - Major Technologies -- System Name & Summary Description

| | |
|---|---|
| SCRAM | A SHADOWS network building block including computation, routing, and associative memory ("working storage") and implementing at least a particular minimum configuration of the CHARM, SELF, CORE, and FRAME technologies. An individual SCRAM node is intended to be self-contained and capable of operating on or off the electrical grid for extended durations, and without human attention or maintenance. By design, a SCRAM is its own miniature datacenter that can be located in out-of-the way places such as underground, on a pole or roof, etc., as easily as in an office, warehouse, or datacenter. |
| SELF | An automated role-oriented "immune system" that differentiates "self" and "non-self", "friend" and "foe - i.e., between authorized and unauthorized objects, subjects, and interactions. Establishes and maintains trust among interdependent systems, subsystems, and components. Includes "byzantine generals" logic in its decision-making process. SELF is highly integrated with BOSS, and with the RECAP, UNCAP, and RUSH protocols. Any anomalous behavior activates an appropriate immune system response. |
| CHARM | An associative memory system that provides high-capacity, highly available and survivable persistent storage, and secure, rapid recall of information. Incorporates local FIREblades and NEARblades (or FIREdrives and NEARdrives), and collaborates with other local and remote SCRAM nodes. Unlike relational databases, all information is indexed, and all index storage is electronic (no latency due to spinning media). Unlike relational databases, records or objects not meeting security constraints are never even accessed (i.e., to check security attributes). Hard disks store only fractional archival data. All geographically co-located equipment and data are expendable without information loss or disclosure. |
| CORE | A collection of "engines" whose purpose is to encapsulate and securely execute high-performance and/or hardware-assisted general purpose implementations of critical compute-intensive processes, to minimize latency, maximize overall throughput, and reduce operational costs. |
| FRAME | An energy production and/or peak-shaving energy management capability whose goal is to reduce operational costs and enhance or enable survivability. FRAME works by significantly reducing the energy required to operate a heat-dissipating system (such as a computing system), through the recuperative use of energy in general, and by time-shifting the generation and consumption of power to the most effective and/or efficient time-frames. |

5 SERVANT (Service Executor, Repository, & Voluntary Agent—Non-Trusted)

SERVANT™. Service Executor, Repository, & Voluntary Agent—Non-Trusted. A cooperative computing and/or storage node that is untrusted (usually due to potential threat exposure). A MASTER that is not recognized as a MASTER by other MASTERS may operate as a SERVANT (but to do so, it must use the UNCAP protocol, tunneled via RUSH, rather than the RECAP protocol). See also: BOSS, MASTER, RECAP, RUSH, SCRAMnet, SELF, UNCAP.

a utility pole, within a server or PC, etc.). See also: HANDLER, ISP, MASTER, PC, SELF, SERVANT, SLAVE.

5.2 DELEGATE (Distributed Execution Via Local Emulation GATEway)

DELEGATE™. Distributed Execution via Local Emulation GATEway. A distinguished SERVANT node having the responsibilities of fulfilling a DELEGATE role. The DELEGATE role implements secure client-side "proxy" agent that appears to locally implement a particular service which would normally be implemented elsewhere, such as on a local or remote server, but instead may actually be implemented within the SHADOWS network cloud.

The DELEGATE proxy handles both stateless and stateful communication (the latter may be expected to be "chatty")

with the client-side software requesting service, such that the DELEGATE proxy translates requests to and from the RUSH protocol as needed. In one embodiment, for example, an open-source DBMS API like that of, say, MySQL or PostgresSQL is implemented as a DELEGATE; the MySQL or PostgresSQL DELEGATE can then be run locally on an arbitrary machine (e.g., a PC or server), and any software applications that expect the selected DBMS may run as though it were present.

Although the selected DBMS may appear to be local, its operations may actually be carried out on the SHADOWS supercomputing infrastructure; there is no need for database replication, because the survival and integrity of distributed data is intrinsic to the SHADOWS architecture.

Any number of authorized subjects at any authorized locations can similarly instantiate the selected DBMS DELEGATE, and they may all be sharing the same database (if that is what is called for), or diverse databases, as required. Furthermore, if one application requires one DBMS, say MySQL, and another requires a different DBMS, say PostgresSQL, and a third application requires an OpenLDAP server, and a fourth requires an Apache web server, then four appropriately selected DELEGATEs can be instantiated on the local machine. Each DELEGATE may implement the requisite local API, but can communicate (via the RUSH protocol) with a local set of virtual RUSHrouters, which can communicate (again, via the RUSH protocol) with the distributed SHADOWS infrastructure, where the actual computing operations can be carried out in accordance with an appropriate SLA.

In a preferred embodiment, the DELEGATE concept can be applied to common Internet-based services, including DNS, email (POP3, SMTP, etc.), VoIP (SIP), and so forth.

In a preferred embodiment, the DELEGATE concept is applied to HPC-class interprocessor communications by implementing an MPI API.

See also: API, DBMS, DNS, LDAP, MPI, POP3, RUSH, RUSHrouter, SIP, SLA, SMTP, VoIP.

6 SCRAM—Survivable Computing, Routing, & Associative Memory

A SHADOWS "machine" comprises one or more nodes sharing a common chassis or other container of some sort, without regard to specific packaging. In a preferred embodiment, "SCRAM" is one such machine; its extruded aluminum chassis 1 may be cylindrical in shape, comprising a set of Quadrants 30, each of which comprises a set of Lobes 31 and an optional set of Blades 4.

Figure 1B:
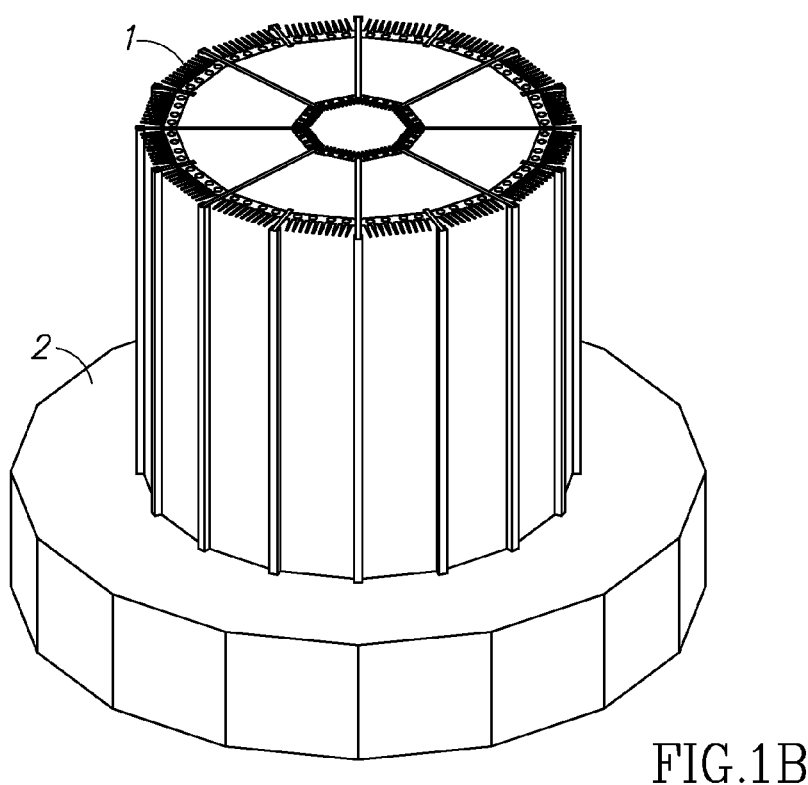

Refer to FIGS. 1A & 1B. SCRAM Supercomputer—Extruded Aluminum Chassis

Main Section. In a preferred embodiment, depicted in FIGS. 1 to 4, the main section 1 (i.e., the vertical upright portion) is a single large aluminum extrusion with an overall diameter of about 25" (including cooling fins not shown). However, there are only a handful of extruders in the world capable of handling a diameter approaching 25" (and the associated tonnage of press capacity required), so in an alternate embodiment, the main section is split into identical interlocking sections 30 (one per 90° quadrant), each of which has a maximum diameter of <20". In an alternative small-form-factor embodiment (not shown), the main section is a single aluminum extrusion with an overall diameter of about 12" to 13" (including cooling fins not shown), with the other dimensions and capacities scaled as needed (while maintaining similar aspect ratios). Faceplates and/or IO panels that attach via the quadrant interlocking mechanism are used to cover surfaces exposed by a "missing" quadrant.

Inner Diameter. The "inner" diameter is smaller than depicted in order to increase the interior room, and is assigned a cooling function.

Lower Section. The lower extruded section 2 comprises interlocking "outrigger" sections (one per quadrant) that are identical large extrusions 40 with a maximum "diameter" (cross-sectional length) of about 28" in a preferred embodiment (or somewhat less than 17" in an alternative small-form-factor embodiment not shown), or six interlocking "outrigger" sections (two per quadrant) that are identical large extrusions with a maximum "diameter" (cross-sectional length) of about 20" in a preferred embodiment (or about 12" in an alternative small-form-factor embodiment not shown, with values proportional to dimensions shown).

Figure 2:
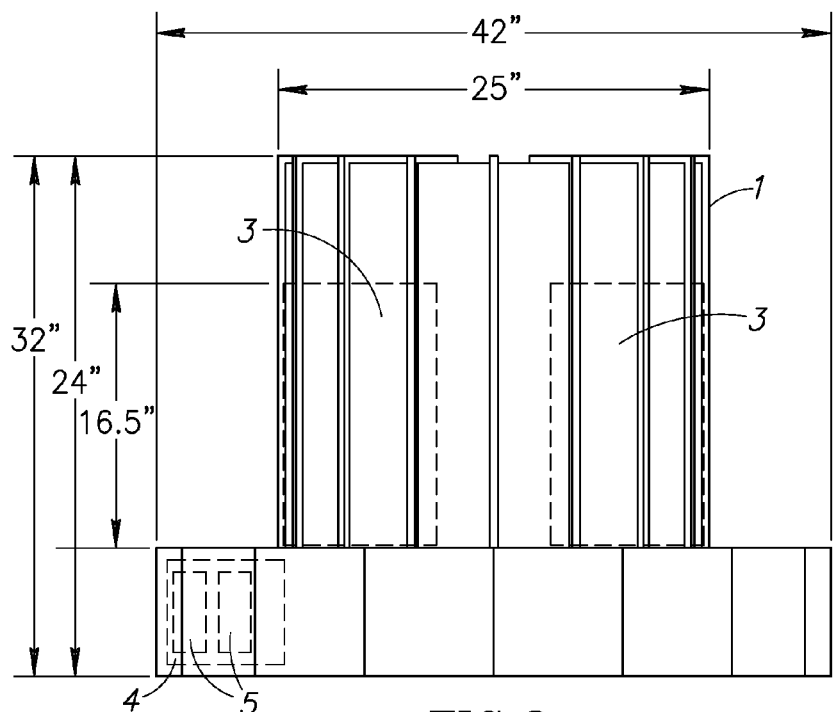
FIG. 2. SCRAM Supercomputer Chassis—Rough Space Allocation (Inches)

Refer to FIG. 2. SCRAM Supercomputer Chassis—Rough Space Allocation (Inches)

In a preferred embodiment, the coolant sump and pumps are accessed from the "open" side (where the missing quadrant is). In a alternate embodiment, the unit is serviced from the top. Note that the sump is normally dry, except in the rare case of accidental spills (all the working fluid couplings are blind-mating and self-sealing).

Depending on the selected pump, there may be as many as four high-reliability (>=50,000 hours MTBF) pumps in a quadruple modular redundant arrangement, where each such arrangement is responsible for a certain percentage of the necessary flow. Under normal loads, and depending on the ambient temperature (or other cooling temperature), only one pump is typically operating (some conditions require no pumps at all). In a preferred embodiment based on variable-voltage DC pumps, the pumps are small and nominally dissipate less than 25 watts each, while pumping up to 1200 LPH (~317 GPH, or ~5.3 GPM) or providing pressures up to 3.5 bar (50 PSI).

Figure 3:
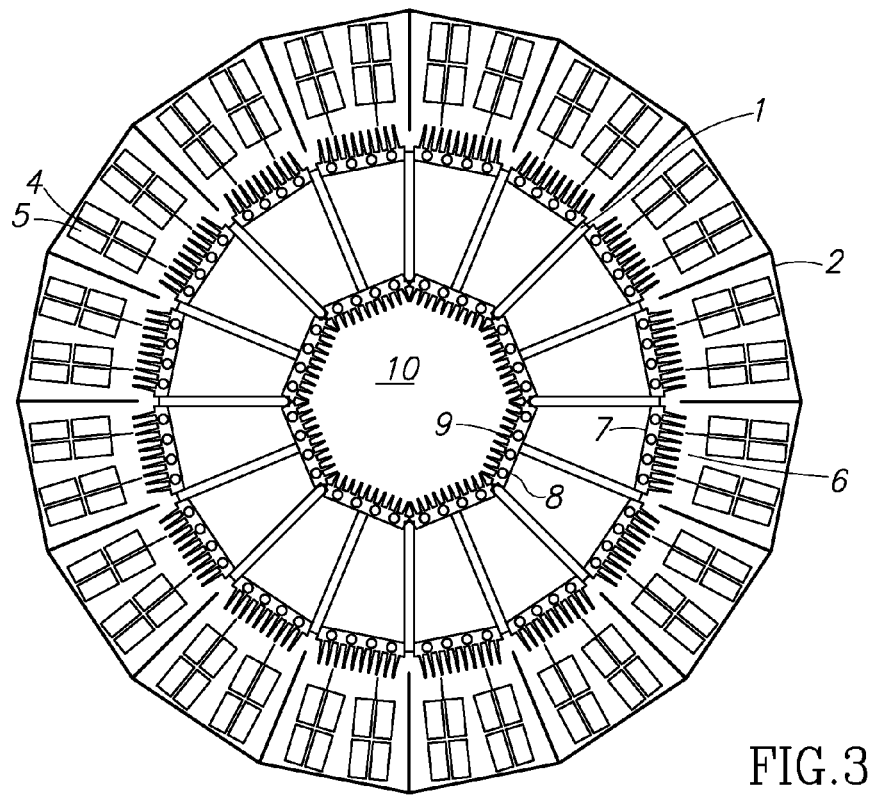
FIG. 3. SCRAM Supercomputer—NEARblade Nearline Storage Blades

Refer to FIG. 3. SCRAM Supercomputer—NEARblade Nearline Storage Blades

In a preferred embodiment, the SCRAM Supercomputer is designed to be self-contained storage-wise, with up to 32 full-size (3.5-inch) disk drives per quadrant, or (preferably) 128 small-form factor (2.5-inch) disk drives per quadrant. A limited edition might ship with 2 nearline outrigger blades, each populated with 16 drives of 80 GB, or 1.28 TB per blade, for a total of 2.56 TB. Although we could easily use higher-capacity drives, the selected 80 GB drives are at a sweet spot for price and performance. Given a fixed budget, far more performance can be had with the lower capacity drives, because many more drives can be purchased for the same amount of money, and more spindles means higher levels of parallel access.

For 2007, the highest density 2.5-inch SAS disk drive 5 has a raw (uncompressed) capacity of 146 GB, so the maximum hard disk storage capacity possible with 128 drives is 18.7 TB per quadrant (146 GB×128), or 56 TB for the chassis. With dual-ported SAS drives, however, there are 256 channels of access (300 MBps each), rather than 128 channels (all SATA drives are only single-ported).

In a preferred embodiment, each NEARblade 4 is a 16-drive SAS/SATA hybrid, consisting of 4 to 8 dual-ported SAS drives for speed and 8 to 12 single-ported SATA drives for high capacity and cost reduction. Note that despite the fact that typical SAS drives (10K RPM) are much faster than high-capacity SATA drives (5400 or 7200 RPM), both are considered "only" nearline storage in a SCRAM Supercomputer.

A 4-SAS, 12-SATA hybrid with the drives noted above would have 572 GB of high-performance drives (via 8 channels) and 3.6 TB of high-capacity drives (via 12 channels), for a maximum total capacity of just over 4 TB per NEARblade (via 20 channels). A full complement of 24 such blades would yield 96 TB of hybrid storage (13.7 TB SAS, 86.4 TB SATA) with 2007 technology.

An 8-SAS, 8-SATA hybrid with the drives noted above would have almost 1.2 TB (via 16 channels) of high-performance drives, plus 2.4 TB (via 8 channels) of high-capacity drives, for a total capacity of 3.6 TB per NEARblade (via 24 channels). A full complement of 24 such blades would yield 86.4 TB of hybrid storage (28.8 TB SAS, 57.6 TB SATA).

Each storage blade 4 is likely to weigh 15 to 20 pounds (16 drives plus frame, thermal conductors and coolant). If all the drives in a bay were spinning at once, they would require 160 to 300 watts of power, depending on the mix of SATA and SAS drives.

In a typical configuration, much less than 20% of the drives would normally be spinning, reducing the power load to the neighborhood of 32 to 60 watts maximum.

In a preferred embodiment, blades are either top-loaded or front-loaded, but must be selected for maintenance and powered down before removal. This is a matter of authenticating, making a menu selection, and waiting for a light to indicate that the blade is ready to be removed, and that the solenoid-controlled blade-latching mechanism is unlocked. An outrigger blade such as a drive bay can be removed without shutting down the SCRAM lobes in the corresponding quadrant.

Because a phase-change coolant is in use, removing a SCRAM lobe requires an authorized power-down of the quadrant containing it, and likewise waiting for a light to indicate that the quadrant is ready to be opened, and that its solenoid-controlled module latching mechanism is also unlocked. The same solenoid control may prevent tampering and other unauthorized access.

Figure 4A:
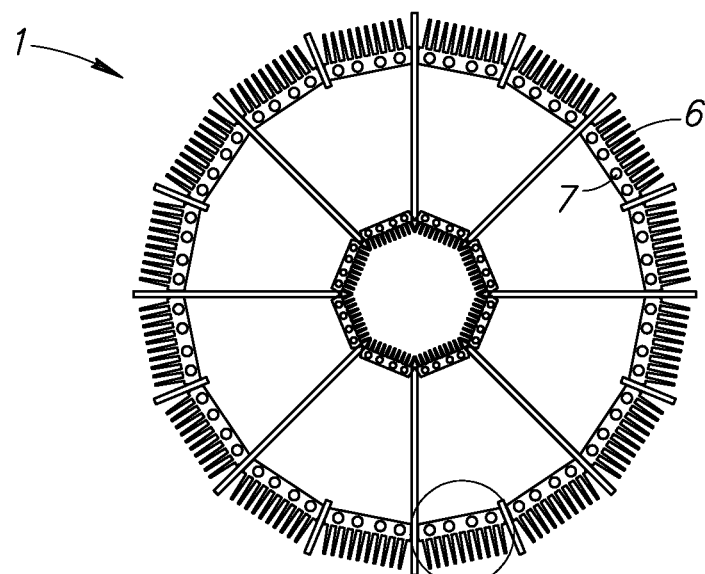
FIGS. 4A & 4B. SCRAM Main Extrusion—Conceptual Cutaway View
Figure 4B:
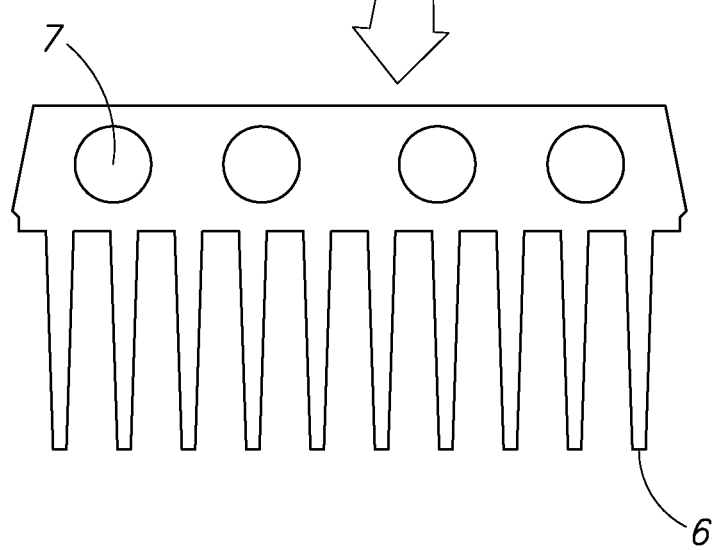

Refer to FIGS. 4A & 4B. SCRAM Main Extrusion—Conceptual Cutaway View

Due to the very large surface area, the outer fins provide substantial cooling even in the absence of data center-style air conditioning. Phase-change working fluid is circulated in the outer walls, causing the vapor to condense under normal circumstances.

The walls containing the optional inner fins also incorporate fluid circulation channels, and can provide cooling when forced air is available (say, from a data center underfloor air conditioning system). A high-reliability, low-noise blower is also contained in the base (as a backup) to supplement other means of cooling during over-temperature conditions.

Note 1: The fluid channels in the inner walls are distinct from the fluid channels in the outer walls, and may be used separately, although there is a relatively low-resistance conduction path in the current design because they're contained in the same all-aluminum extrusion.

Note 2: Although it is not shown here (because it's not related to the extrusion), there is also a heat exchanger and couplings for connecting with a building or datacenter chilled water system. In most cases, the already-hot return water is sufficient for cooling a SCRAM node, which has substantial economic implications, especially for overloaded datacenters.

Figure 5:
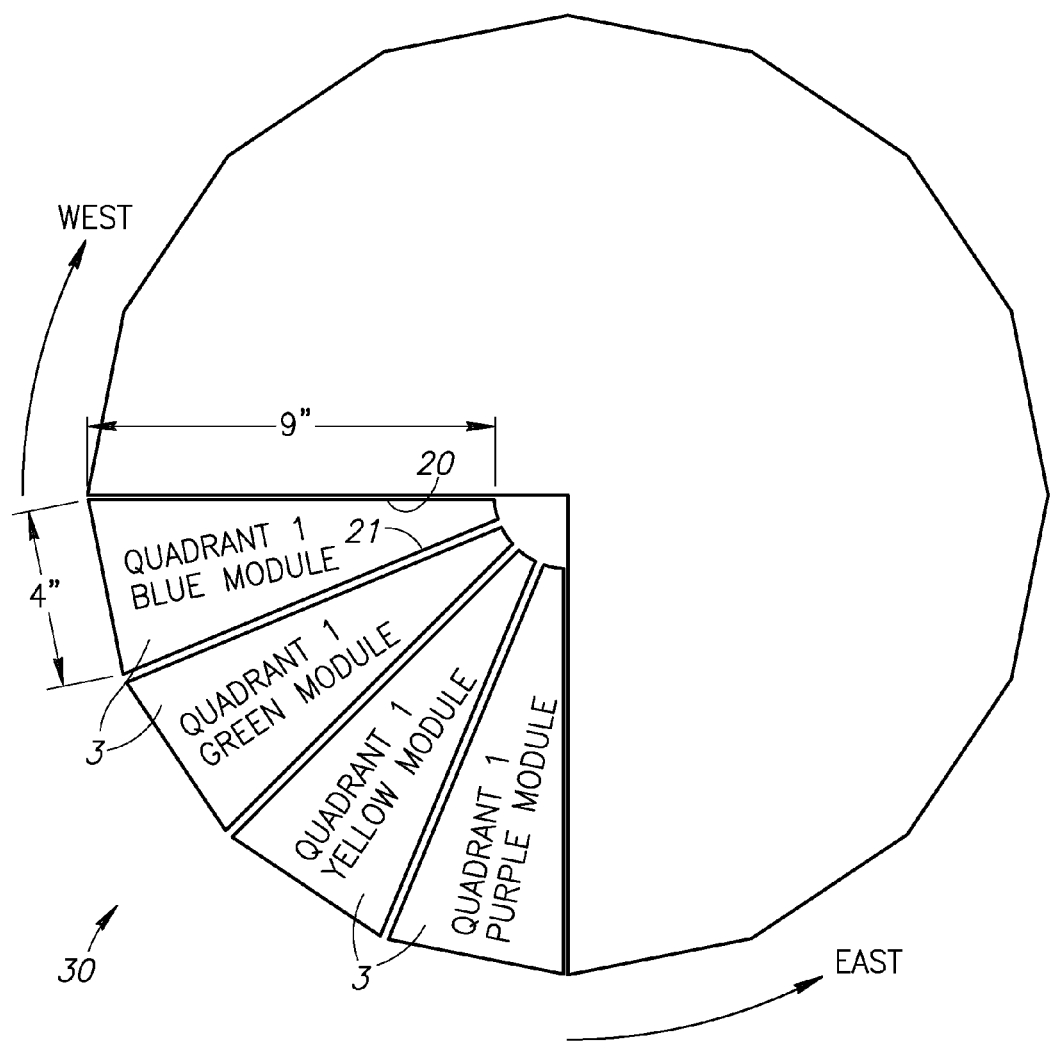
FIG. 5. SCRAM—CHARM Lobes—Four per Quadrant (Alternate Embodiment)

Refer to FIG. 5. SCRAM—CHARM Lobes—Four per Quadrant (Alt. Embodiment)

Figure 6:
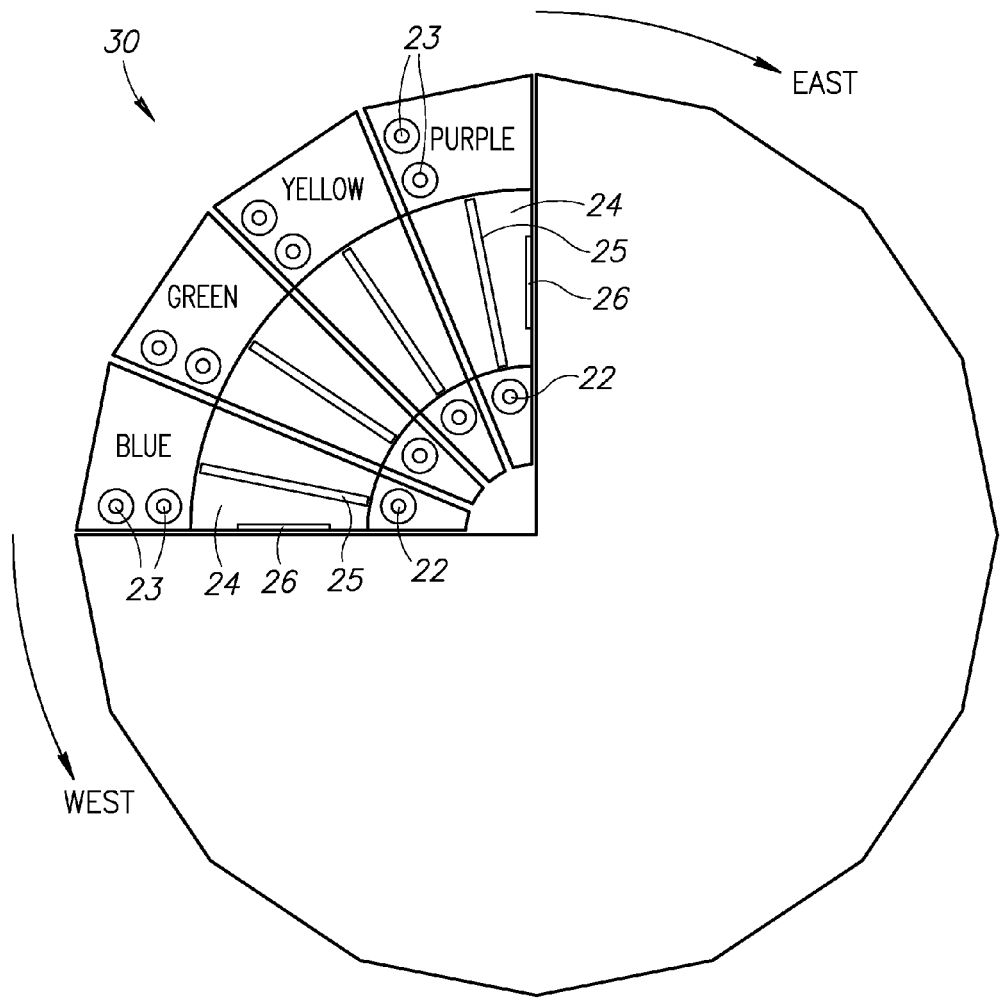
FIG. 6. SCRAM—CHARM Modules—Bottom View (Alternate Embodiment)

Refer to FIG. 6. SCRAM—CHARM Modules—Bottom View (Alternate Embodiment)

Figure 7:
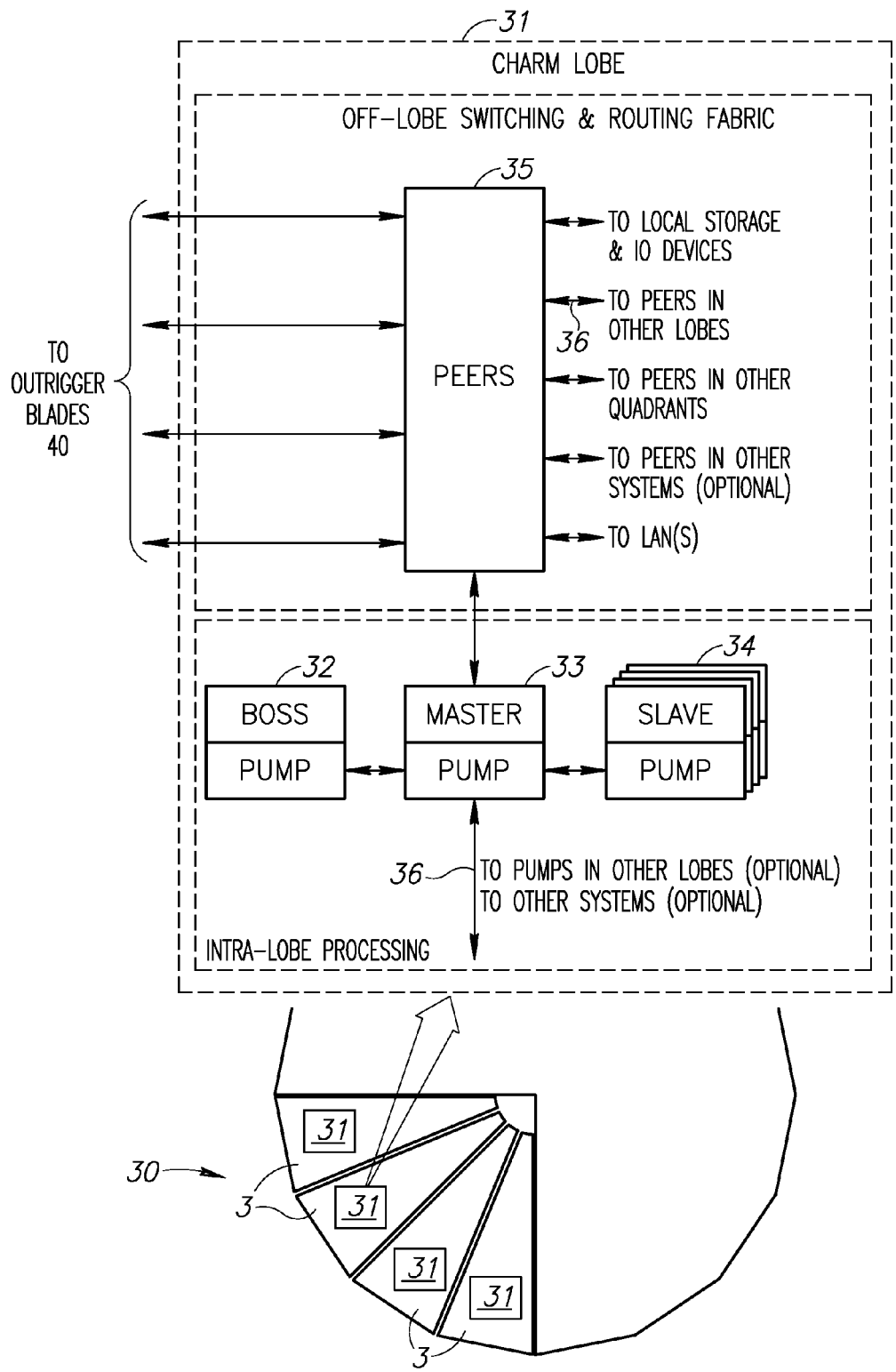
FIG. 7. SCRAM Configuration Overview—Lobes

Refer to FIG. 7. SCRAM Configuration Overview—Lobes

Figure 8:
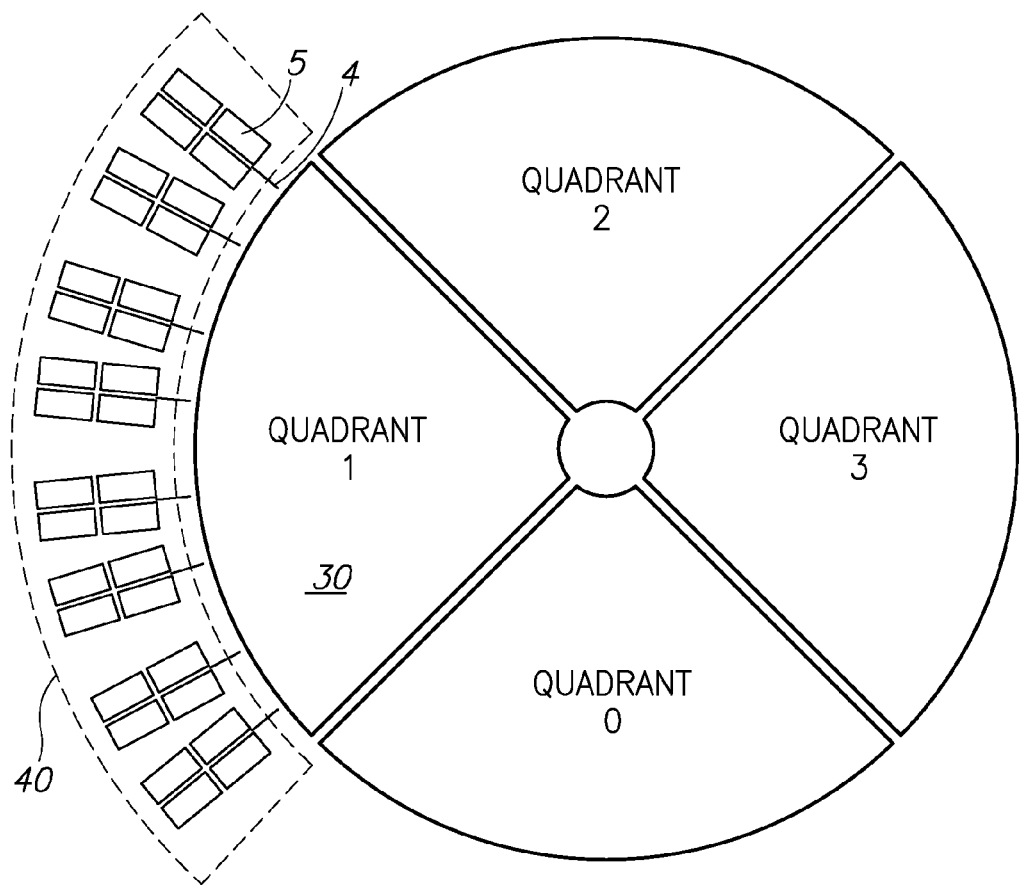
FIG. 8. SCRAM Configuration Overview—Blades

Refer to FIG. 8. SCRAM Configuration Overview—Blades

In a preferred embodiment, a SCRAM node is composed of 1 to 4 quadrants 30. Each quadrant contains 4 lobes 31 that are fully connected to each other and to the lobes in the other quadrants. Each quadrant controls up to 8 optional "outrigger blades" 4 (discussed elsewhere), in any combination, and each blade is fully connected to each lobe 31 in the corresponding quadrant 30.

Note: In the illustration above, the particular internal configuration details of each of the individual lobes are not significant, except that the PEERS fabric 35 local to each lobe connects with the PEERS fabric 35 in the other lobes, and also with the "outrigger blades" 4.

Figure 9:
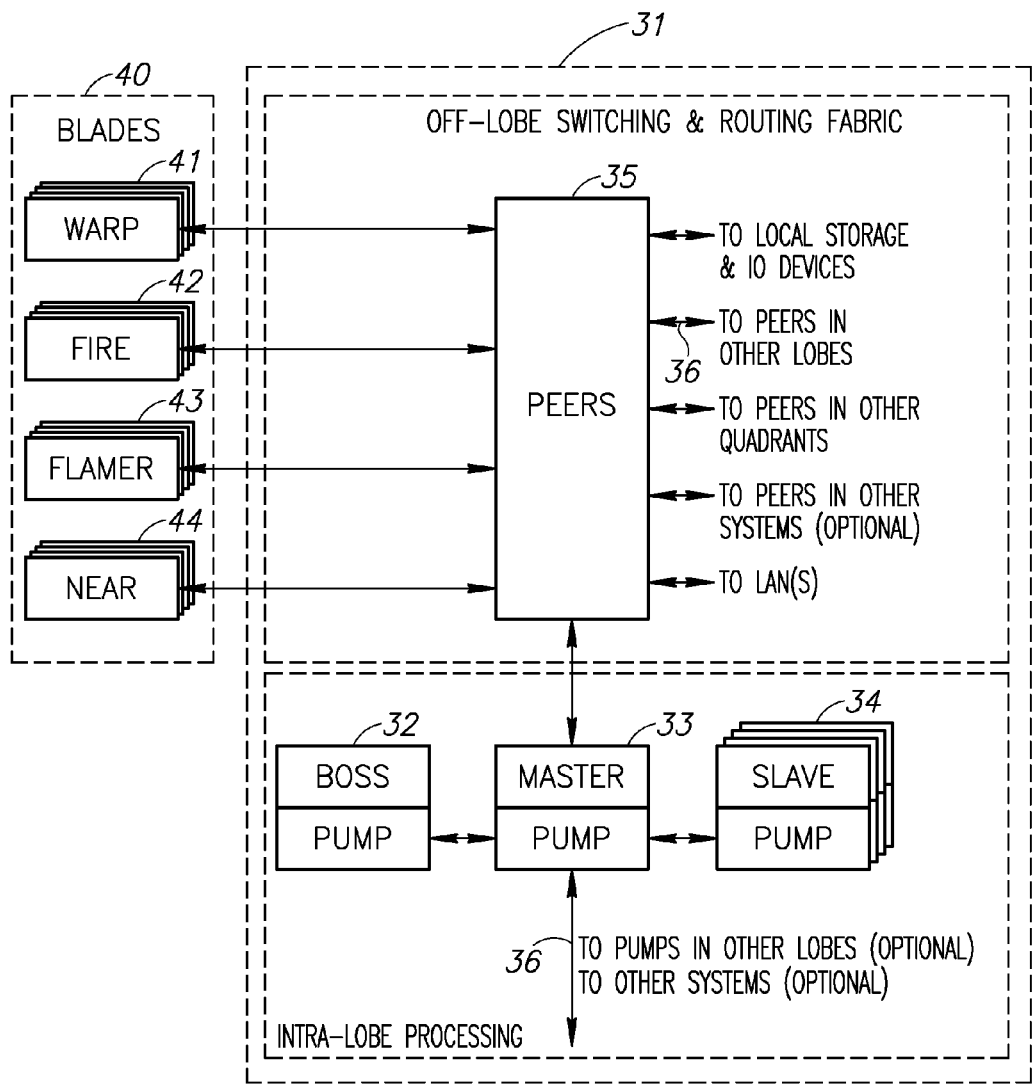
FIG. 9. SCRAM "Lobe"—Logical Connectivity

Refer to FIG. 9. SCRAM "Lobe"—Logical Connectivity

In a preferred embodiment, one or more of the blocks depicted above as (optional) "outrigger blades" also are implemented internally (i.e., within a lobe) in a non-bladed manner, so that the specific means are also built into the lobe and provide the corresponding capability inherently (i.e., without the need for optional outrigger blades), in order to reduce the cost of a basic configuration.

Each lobe's workload is handled by SELF/CHARM blocks that function symbiotically to securely store, retrieve, and process information using an associative memory hierarchy. In particular, the SELF roles of BOSS, MASTER, and SLAVE are each paired with a CHARM PUMP capability that is tailored for the particular role. In the diagram above, the pairings (BOSS & PUMP 32, MASTER & PUMP 33, and multiple SLAVEs with multiple PUMPs 34) are depicted without arrows to emphasize the symbiotic coupling. Each pairing includes one or more means for processing, along with one or more levels of local memory and/or cache. Note that, in a preferred embodiment, the multiple SLAVEs with multiple PUMPs 34 in a one-to-one configuration are replaced with one or more PUMPs 34, each having a multiplicity of SLAVEs 34.

In each SELF/CHARM pairing, the SELF means and the CHARM means may each be implemented via one or more traditional CPUs (SMP or not), programmable and/or reconfigurable logic (e.g., FPGAs, ASICs, etc.), or even discrete logic, or any combination thereof, including implementation of a pairing or multiple pairings on a single chip using any combination of means.

In a preferred embodiment, the BOSS/PUMP 32 and MASTER/PUMP 33 pairings are implemented via a single CPU handling the BOSS & MASTER functionality, and a single FPGA or Structured ASIC handling both their respective PUMP functionalities. The SLAVE/PUMP 34 pairings are each implemented via a single CPU handling the SLAVE functionality and a single FPGA or Structured ASIC handling the corresponding PUMP functionality.

Logically, each lobe has a PEERS 35 switching & routing fabric, but in a preferred embodiment there are actually at least two redundant fabrics working together in an active/active configuration.

Figure 10:
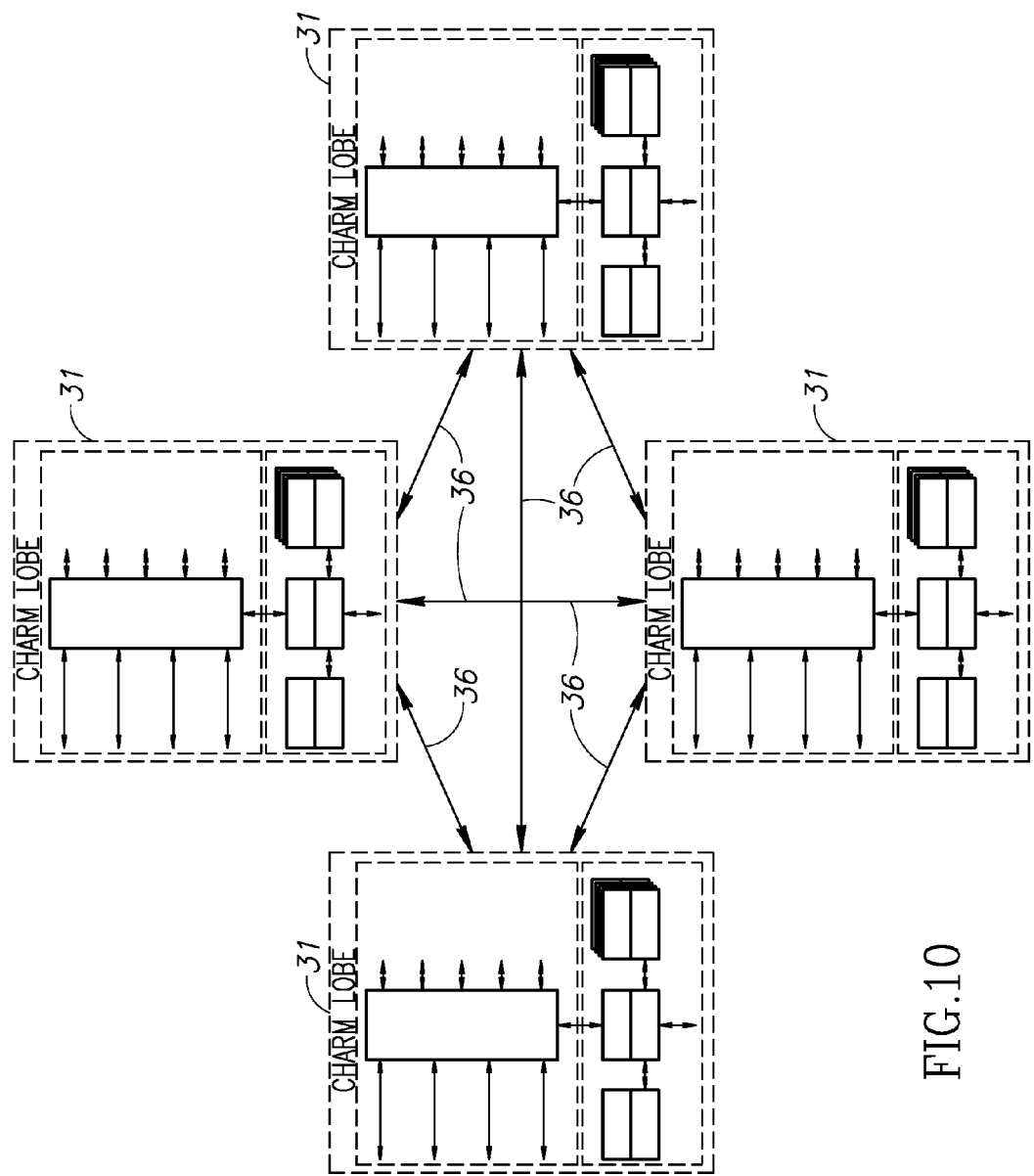
FIG. 10. SCRAM Quadrant Comprises Four (4) "Lobes"

Refer to FIG. 10. SCRAM Quadrant Comprises Four (4) "Lobes"

SCRAM machines provide a solid foundation for the SHADOWS infrastructure, which is highly distributed, with inter-node communications occurring globally over WANs, quasi-locally within a locale via WLANs, and locally (within a site) via a multiplicity of LAN switch fabrics and/or meshes. Nonetheless, the SHADOWS infrastructure is designed to "play nice," which allows it to safely participate in other networks, in various roles (e.g., supercomputer, NAS appliance, a complete SAN deployment, etc.)—all as a first-class citizen. Furthermore, the SHADOWS infrastructure is designed to take advantage of idle or unused computing, storage, and communications resources associated with the networks to which it is attached, as authorized, in order to maximize its supercomputing throughput while minimizing the cost of doing so. The SCRAM machines provide the magic that makes it possible.

Regardless of the physical implementation, a SCRAM machine comprises four major logical functions, and thus four major types of means: SELF, CHARM, CORE, and FRAME.

- The SELF means defines roles for key architectural entities and enables secure, trustworthy, high-performance cooperation among those entities in the SHADOWS infrastructure.
- The CHARM means comprises a local hardware implementation of a secure, distributed (i.e., local node plus multiple remote nodes) hierarchical and associative memory processing system, with overlaid relational capabilities and a compressed persistent store.
- The CORE means comprises the processes and protocols related to the implementation of an associative memory, reasoning and belief systems, and cooperative processing and communications protocols.
- The FRAME means comprises the hardware and processes for survivably and securely energizing and maintaining the system.

Figure 11:
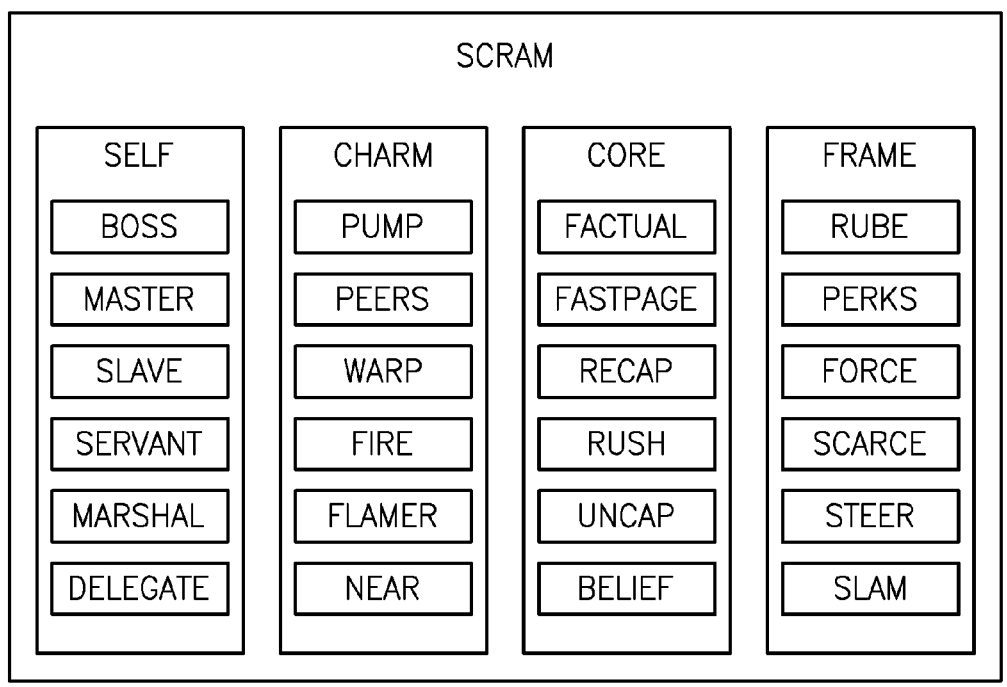
FIG. 11. High-Level Logical Building Blocks of a SCRAM Machine

The high level logical building blocks of a SCRAM machine are depicted below:

Refer to FIG. 11. High-Level Logical Building Blocks of a SCRAM Machine

Internally, each of a SCRAM machine's Lobes (and optionally any Blade) comprises at least one MASTER and typically at least one SLAVE, and both MASTERs and SLAVEs typically comprise multi-core general purpose processors, but may optionally comprise special-purpose processors, including without limitation, devices or modules comprising fixed or reconfigurable logic such as ASICs, FPGAs, and so forth.

Each MASTER is further distinguished by its isomorphic association with unique instantiations of BOSS and SELF (which are implemented at least partly in secure, immutable hardware). Thus, in this aforementioned embodiment, a "node" could refer to the SCRAM machine itself, or any of the Quadrants, Lobes, Blades, MASTERs or SLAVEs, or even the processors, whereas they collectively determine the Machine.

7 SELF—Secure Emergent Learning of Friends

In a preferred embodiment, SELF is an automated role-oriented "immune system" that differentiates "self" and "non-self", "friend" and "foe"—thus, said system may distinguish between authorized and unauthorized objects, subjects, and interactions.

In a preferred embodiment, SELF may establish and maintain trust among interdependent systems, subsystems, and components.

In a preferred embodiment, SELF may integrate with BOSS (see section 7.1.3) to incorporate Byzantine agreement logic (from the classic "Byzantine generals" problem) into its decision-making process, so that it may make correct decisions in the face of overt or covert attack, collusion, and corruption.

In a preferred embodiment, SELF may be highly integrated with BOSS, and with the RECAP, UNCAP, and/or RUSH protocols.

In a preferred embodiment, any anomalous behavior detected by SELF, or of which SELF becomes aware, may trigger an appropriate "immune system" response.

TABLE 2

Major SELF Technologies - Technology Name & Summary Description

| | |
|---|---|
| BOSS | A distributed, timely, trusted computing base and object/subject security system that uses "byzantine generals" logic in its decision-making process, and collectively makes security decisions in a "fail-silent" manner that provides survivability even in the face of multiple failures and/or corrupted nodes. BOSS works in conjunction with CHARM to control who gets access to what, and when, while ensuring that unauthorized information is not exposed (not even to other internal systems). BOSS is designed to meet DoD "Orange Book" requirements for level "A", and to support both classified and unclassified information processing and storage. Any BOSS node that fails or becomes corrupted will be restarted or replaced, and in any case will not be trusted until its trustworthiness can be re-established to the satisfaction of the surviving nodes. |
| MASTER | A distinguished capability that is responsible for participating in security decisions, including resource allocation. A MASTER (or would-be MASTER) maintains its distinguished bona fide MASTER status only under the auspices of other MASTERs (which is part of the function of the SELF system). Bona fide MASTERs self-organize into local and distributed teams that are collectively responsible for getting work done (including the computation and storage of data). Each SCRAM node must have at least one MASTER. |
| SLAVE | A trusted cooperative computing, memory, and/or storage capability under total control of a MASTER, which delegates authority and resources to the SLAVE as needed. Every SLAVE must be physically attached to and co-located with at least one local MASTER in order to operate at all. |
| SERVANT | A cooperative computing and/or storage node that is untrusted (usually due to potential threat exposure). A MASTER that is not recognized as a MASTER by other MASTERS may operate as a SERVANT (but to do so, it must use the UNCAP protocol rather than the RECAP protocol). |
| MARSHAL | Typically a SERVANT node (untrusted), but may occasionally be a SLAVE. Any node that serves as a gateway for system users to access Scrutiny services via a network (e.g., the Internet). May reside virtually anywhere (customer premises, datacenter, SCRAM node, etc.). |
| DELEGATE | A secure client-side "proxy" agent that appears to locally implement a particular service which would normally be implemented elsewhere, |

TABLE 2-continued

Major SELF Technologies - Technology Name & Summary Description such as on a local or remote server, but instead is actually implemented by SHADOWS. The DELEGATE proxy statefully handles all communication (which is often chatty) with the client-side software requesting service, such that the DELEGATE proxy translates requests to and from the RUSH protocol as needed.

7.1 SELF Concepts
7.1.1 SELF—Resource Management Via Teams
Central Concept At its simplest, the idea is to use distributed "teams" of nodes in a self-healing network as the basis for managing and coordinating both the work to be accomplished and the resources available to do the work. The SHADOWS concept of "teams" is responsible for its ability to "self-heal" and "adapt" its distributed resources in an "organic" manner. Furthermore, the "teams" themselves are at the heart of decision-making, processing, and storage in the SHADOWS infrastructure. Anything that may be important may be handled under the auspices and stewardship of a team.

The purpose of having teams is at least five-fold: 1) to distribute the automated resource management overhead, 2) to partition, parallelize, and distribute the actual processing load and improve overall performance, 3) to increase the fault-tolerance of the system, 4) to increase the inherent survivability of the system, and 5) to increase the difficulty of successfully attacking the system.

Basic Concepts
1. Every MASTER Leads a Team.
2. Not Every Potential MASTER Becomes a MASTER.
3. All Stored Information is Immutable and has an Identity
4. Almost Everything has an Identity, and Anything with an Identity "Belongs" to a Team
5. A SHADOWS Team Comprises Members with No Common Regional Threats
6. Teams are Stewards of Information to be Stored or Handled
7. Teams are Stewards of Processes, including Memoized Results Although distributed, the SHADOWS infrastructure cannot be correctly described as strictly centralized or strictly decentralized. It is definitely not centralized in the sense that a traditional mainframe or supercomputer is intentionally centralized. Neither is it decentralized, in the sense that a peer-to-peer network, or perhaps a grid network, is intentionally decentralized (so as to avoid centralized functionality, which often requires significant trade-offs). Rather, SHADOWS is a little of both, in a "Borg"-like way. SHADOWS might best be described as having a conceptually centralized function that happens to have local representation, but a highly decentralized implementation. (The SHADOWS "Borg-like" operational team concept may be vaguely reminiscent of the physics concept of "quantum entanglement"—a quantum mechanical phenomenon in which the quantum states of two or more objects have to be described with reference to each other, even though the individual objects may be spatially separated).

7.1.1.1 Every MASTER Leads a Team

In the SHADOWS infrastructure, every MASTER is the leader of at least one team to which other MASTERs, both local and remote, are also assigned. Depending upon the nature of a particular team, there may also be non-MASTER participants, and these may be voluntary (SERVANTs) or non-voluntary (SLAVEs).

Given a set of MASTERs cooperating as a team, a specific MASTER is always the team leader (if present and functioning correctly), and each of the other MASTERs has a specific (but potentially dynamic) role relative to the current team leader. There are at least as many teams has there are MASTERs, so that every competent MASTER leads at least one team, and also participates in subordinate roles in other teams. The more MASTERs there are, the more powerful the system is.

7.1.1.2 Not Every Potential MASTER Becomes a MASTER

Although every MASTER leads a team, not every "potential" MASTER may actually become a MASTER. The state of being a MASTER is neither automatic nor assured—it requires establishing identities and relationships with other potential MASTERs, and/or with actual MASTERs, until a sort of "critical mass" of relationships, qualifications, trustworthiness and "actual trust" is reached—enabling the state of being a MASTER to be achieved. Until then, a potential MASTER can be a SERVANT (i.e., it can "volunteer"), but cannot lead a team. A SERVANT is a useful, but untrusted, "working storage" resource—it is capable of storing, retrieving, and forwarding encoded, encrypted information (but not decrypting or decoding it). In general, a SERVANT doesn't possess enough information to make decrypting and decoding possible, regardless of the computing resources available to a would-be attacker. A SERVANT is also capable of executing in-memory processes against information securely received but not stored, under the auspices of a MASTER-led team.

Some SERVANTs are assigned a MARSHAL role, which adds to their responsibilities, but not to their trustworthiness (like the SERVANT, the MARSHAL role is inherently untrusted).

7.1.1.3 All Stored Information is Immutable and has an Identity

In the SHADOWS infrastructure, by design, any information that is intentionally stored is deemed immutable (this does not apply to transient information existing only in memory). Immutable data content can never be changed (note however, that the internal storage format of the information may be modified without changing the content, and thus, without changing the identity), and has an identity that is determined by the content itself—a cryptographic digest that is somewhat like a DNA signature. This digest, or content-based identity, is known by various names, but in this document may be referred to as simply the "ContentDigest." The ContentDigest is calculated with a cryptographic one-way function and is sufficiently random that it is useful for quasi-randomly assigning the content to the team currently responsible for the logical "universal partition" to which the subject ContentDigest belongs. In addition to the ContentDigest, all stored information is also given a universally unique "ContentAlias" that can remain forever associated with the ContentDigest, and is more convenient and efficient to use. The ContentAlias is permanently assigned by the same team that is responsible for the logical "universal partition" to which the subject ContentDigest belongs, and the team's identity is embedded in the ContentAlias. Thus, both the ContentDigest and the ContentAlias implicitly or explicitly identify the same team, which essentially becomes the "ContentStewardTeam" that is accountable for knowing "about" the content (its logical whereabouts and other potentially privileged information may not actually be known by the team acting as content steward, but it serves as the focal point), but especially the bidirectional mapping of ContentDigest and ContentAlias.

7.1.1.4 Almost Everything has an Identity, and Anything with an Identity "Belongs" to a Team Every SHADOWS resource, task, and identifiable entity of any virtually kind (including, without limiting the generality of the foregoing, processes, objects, subjects, and records), is assigned to a team, as are all users and/or actors that exhibit any kind of producer and/or consumer behavior with respect to the SHADOWS infrastructure or its mission.

7.1.1.5 A SHADOWS Team Comprises Members with No Common Regional Threats

From a rudimentary viewpoint, in a preferred embodiment, a SHADOWS team comprises, for example, at least five active MASTERs: two colocated MASTERs, say, LocalMASTER_1 (the team leader) and LocalMASTER_2, and three non-colocated MASTERs, say, RemoteMASTER_1, RemoteMASTER_2, and RemoteMASTER_3. This minimal team is sufficient to maintain Byzantine agreement in the face of one Byzantine fault (e.g., a single corrupt MASTER) or one failed site (e.g., due to a regional disaster). In the event of a failed site, individual subsystems may still function sufficiently as to be able to "call home" and contact remaining portions of the SHADOWS infrastructure. In such a scenario, the surviving resources will be assimilated back into the infrastructure as SERVANTs if they cannot qualify or re-qualify as MASTERs.

Minimum Redundancy for Byzantine Agreement

It is accepted in the art that the minimum number n of team members required for Byzantine agreement is $3f+1$, where f is the number of faults to be tolerated, and no more than one-third of the team members are faulty (whether benign or malicious). (The SHADOWS architecture acknowledges this as a starting point, although there is reason to believe that $3f+1$ may be overly conservative. However, because survivability and trust are key to SHADOWS, conservatism is quite acceptable. In any case, if $3f+1$ is too conservative, then achieving $3f+1$ means that a larger number of faults may be tolerated with no actual changes. On the other hand, SHADOWS uses a linear MDS code (e.g., a variant of Reed-Solomon) to achieve Byzantine agreement.). However, SHADOWS uses coding theory rather than voting to implement Byzantine agreement. Thus, Byzantine agreement among k out of n MASTERs on the same SHADOWS team is sufficient to tolerate f faults, where $f=(n-k)/2$ and $n>k$ in the general case of f faulty and/or malicious team members, assuming that it is not known which f of the n MASTERs are faulty and/or malicious. This means that for the case when $f=1$, then $n=2+k$.

If, instead, it is allowed that up to c MASTERs have simply crashed or failed to respond, and it is known which ones these are, then SHADOWS may tolerate a combination of up to c known crashed or unresponsive MASTERs and up to f faulty or malicious (but unknown) MASTERs, where $(c+2f)<(n-k)$. The mechanisms for accomplishing this are further explained in section 7.1.

Colocated Vs. Remote MASTERs

In general, there must be at least two colocated MASTERs (both of which must have already qualified to lead teams), such that one of them can lead the team, and the other can serve as local backup (simultaneous failure of both is equivalent to failure of that team in the local geographic region).

There must also be at least three MASTERs that are remotely located (not in the same geographic region as the local MASTERs, and not in the same geographic region as each other), such that at least three additional geographic regions are represented, none of which shares any regional threats with the others. This can be considered as a special case of Byzantine agreement, except that agreement is among regions, and at least n regions are required for Byzantine agreement, where $n=3f+1$, and where f is the number of faulty (or failed) regions to be tolerated. Once the basic requirements of geographic diversity are met, any number of additional MASTERs, whether colocated or remote, can be added to any team as needed.

The definitions of "geographic regions" and "regional threats" as used here are determined by policy decisions that are outside the scope of this document. There may also be other team membership requirements that are likewise determined by policy.

Once the minimum team membership requirements have been met, a SHADOWS team can form and begin "rounding itself out," by virtue of extending its membership as the SHADOWS infrastructure grows. In particular, potential MASTERs that cannot yet participate in a MASTER role (for whatever reason) may volunteer as SERVANTs, and thus become immediately usable by any and all existing SHADOWS teams. At some point, potential MASTERs may qualify to become MASTERs, in which case they can be assigned to one or more SHADOWS teams in subordinate (non-team-leader roles), and can also be assigned teams of their own as new teams are formed. Note that non-team-leader roles can become "acting" team leaders at any time, if their superiors are unable to perform their roles.

Whenever a team's leadership capacity becomes diminished, either in absolute terms (e.g., diminished capacity, fewer team members through attrition, failure, eviction, etc.), or in relative terms (e.g., team member overload, unacceptable risk profile, etc.), then additional team members are aggressively recruited as necessary (without "lowering the bar" for qualifications, however).

7.1.1.6 Teams are Stewards of Information to be Stored or Handled

When any team (here, the "SubmittingTeam") receives an artifact containing information to be stored or handled, say from another team, or an external source, it is analyzed at least sufficiently to classify the information boundaries if not already known (for example, it is helpful to know the granularity of the object, such as whether it is a file, database record, or email message, etc.). Conceptually, the artifact's ContentDigest is computed at the coarsest granularity, and then looked up in a local "RecognizedContentIndex" to find out if the artifact or its content has been previously handled. The actual lookup occurs by first checking the SubmittingTeam's "local copy" of the RecognizedContentIndex, and if not found, sending a lookup request message containing the ContentDigest to the accountable ContentStewardTeam. (Typically, the SubmittingTeam is actually part of a computing cluster of some sort, so the "local copy" of the RecognizedContentIndex is most likely distributed over the local cluster, meaning that even a local lookup entails sending a message to the appropriate local team responsible for that particular slice of the RecognizedContentIndex). If found either way, then the ContentAlias is now known, and, from a simplistic viewpoint, the storage request has essentially been "fulfilled," since the content has already been stored (of course, there's a little more to it, in terms of tracking accessing parties, etc., but that sort of detail is well known in the art and out of scope for this document).

If the ContentDigest is neither in the RecognizedContentIndex (which may not be completely up-to-date) nor the ContentStewardTeam's RecognizedContentIndex, then the information to be stored is "new" by definition. Note that although the ContentStewardTeam may eventually be responsible for assigning a ContentAlias to the information to be stored, pairing it with the associated ContentDigest, and "publishing" it to the SHADOWS infrastructure. However, such assignment cannot occur until the artifact and its information content is received and vetted according to the ContentStewardTeam's rules, because the assignment of a ContentAlias is both automatic and permanent, and thus, by design, cannot be changed later.

Once it has been determined that the information to be stored is actually new, then it is further analyzed to determine if there are any recognizable finer granularities (this can occur in parallel with the initial lookups, if there are sufficient processing resources, and simply aborted if the coarser-grained artifact is subsequently recognized as having been stored already). Because changing even a single bit of an artifact's information content results in a different ContentDigest, by design this means that the resulting artifact is a different artifact, from the SHADOWS viewpoint. However, given the high degree of overlap between two artifacts that differ in as little as one bit, this fact can be revealed (if not already known) by performing successively finer-grained analyses, and any discovered overlap in content can be used to great advantage by SHADOWS.

By way of explanation, consider an artifact such as a book, which contains unstructured information from the viewpoint of a DBMS (database management system), for example, but yet clearly has some sort of structure based on its inherent natural boundaries and granularities (e.g., entire book, chapters, pages, paragraphs, sentences, etc.). In this example, the entire book has a single identity. Each of the chapters also has an identity, as do each of the pages, each of the paragraphs, each of the sentences, and so on. At some point, the difference in identities between the content of two editions of a particular book, for example, may boil down to the specific areas where they differ in content, and this may occur anywhere along the granularity spectrum. This is likewise true for artifacts that are purported to be different—their actual differences can be discovered and revealed.

The problem (and process) of analyzing content in order to identify it is well-suited to the SHADOWS infrastructure, and in fact was one of its architectural drivers. From the outset, such analysis lends itself well to a cooperative parallel processing configuration, and the more fine-grained the analysis, the more "embarrassingly parallel" the problem becomes. In the SHADOWS infrastructure, each problem to be solved is assigned to a team, and highly parallel problems natural involve the use of teams operating in a highly parallel fashion.

7.1.1.7 Teams are Stewards of Processes, Including Memoized Results

Every SHADOWS process is an artifact, and thus has an identity, and thus is assigned to one or more teams, each of which has a particular role with respect to that process. In simplistic terms, SHADOWS teams cooperatively share the management responsibilities of each artifact, and process artifacts are no exception. One SHADOWS team is responsible for storing a particular process (i.e., its executable image is an artifact), another for verifying it prior to distribution or execution, another for executing it, another for monitoring its execution, etc. Thus, when "software rejuvenation" is called for, multiple SHADOWS teams are involved on a cooperative basis.

Another area of process-specific cooperation among teams is in the area of "memoization," which is essentially the capability of looking up known results of deterministic processes and/or functions rather than recomputing them from scratch. We've already noted that each artifact and each process (down to the bit-level) has its own identity, and that each existent combination of artifacts also has its own identity (within the limitation of acceptable granularity). Accordingly, whenever a deterministic process or function accepts a particular set of input values and produces a deterministic set of output values, we can treat the set of input values—in conjunction with the specific process—as a new "input/process" artifact, with an identity. We can also treat the set of output values as an artifact, with an identity. This done, "memoization" is a conceptually simple matter of establishing a "pairing" between the input/process identity and the output identity, such that any already-known output can be looked up and identified. Thus, given any input/process identity, it can be determined (through a lookup) whether the result has been previously computed, and if so, what its identity is. Conversely, it can be directly determined which input/process identities, if any, have generated a particular output identity.

The SHADOWS FACTUAL capability is conceptually "just" a memoization system, but one that is designed to operate at global scale and supercomputing speed, with the high levels of security and survivability commensurate with the SHADOWS infrastructure. Teams are used to perform the processing required to arrive at previously unknown results, and to reach consensus on "vetted" results prior to memoization (which is particularly important for FACTUAL, because memoized results can be reused as authoritative results that sidestep process execution). As with any artifact, the various content and identities associated with memoized results need to be stored, which involves teams on a SHADOWS-wide basis, as does the lookup of memoized results. If it cannot be readily determined (on a local basis) whether a memoized result exists, the problem to be solved is queued for processing, but can normally be dequeued if a vetted, memoized result is obtained prior to the start of execution. A memoized result that is obtained after execution has already started can be used as a test oracle to verify the result, thereby serving as a built-in system integrity check. Memoization of results, and whether to use lookup of memoized results, is context-specific and configurable at the process level or process-family level. In general, lookups of memoized results may not be utilized when such lookups consume more resources than would be required to simply recompute the results, unless such lookups reduce a local processing load by shifting the lookup elsewhere. The lookups of memoized (and therefore already-known) results are also vetted, by virtue of the fact that lookups (like other operations) are handled by geographically distributed teams that are difficult to attack. Not only must a distributed team reach consensus on the identity of the memoized result, but other distributed teams are typically involved in moving a copy of the content of the identified result to where it is needed, and in all cases the recipient(s) can determine the degree to which consensus was reached in each step. The availability of memoized results is also very helpful in cases of Byzantine failure that would otherwise hamper the achievement of vetted results.

7.1.2 SELF—Software Rejuvenation & Process-Port Combinations

Software rejuvenation coordinates heartbeat rekeying and process-port changes with process version updates and restarts. Actual rejuvenation is managed by each MASTER's BOSS role, which comprises a virtual machine (VM) with special privileges and responsibilities as a "timely, trusted supervisor," one of which is starting a new VM/process pair and migrating its essential state to it through the hypervisor/VMM.

Rejuvenation can include a new version of executable from the same source, with no functional changes (using one-way translation to deter reverse-engineering).

Globally Active Process-Port Combinations

Each node maintains a bitmap of globally active process-port combinations, including ports in transition (e.g., due to version update). Assuming one bit per process-port, this requires at most 64 Kbits or 8 KB. An encrypted, authenticated bitmap is distributed periodically and upon request via RECAP. Active process-port updates are also distributed periodically via RECAP, as are periodic authentication requests to verify a non-corrupted image at each node. Incorrect or missing responses may trigger SELF reporting and escalation.

Any message received on a globally non-active port constitutes behavior that is both a diagnostic clue and/or a SELF clue, as is any message received on an active but not-ready port at a particular node. The latter could be legitimate within a short window corresponding to propagation delay, if the sender did not receive a not-ready update in time to prevent message transmission. In the latter case, the sender must immediately follow up with a retraction message within a specific time period if the difference in message timestamps (request time minus not-ready time) exceeds the allowable maximum (which is designed to accommodate propagation and update delay). The timely receipt of an authenticated retraction message (say, within a second, or some other policy-specified threshold) prevents escalation.

Site-Local Active Volunteer Nodes (SERVANTs)

Each node maintains a map (e.g., a bitmap) of site-local volunteer nodes—nodes whose load is sufficiently light (both absolutely and relatively) that they can accommodate a higher-than-average load (which means that "ready" virtual SERVANT processes and/or SERVANT VMs, possibly running on some combination of MASTERs and SLAVEs, can be granted execution resources).

Given, for example, a maximum of 8K nodes at a particular site, this bitmap of site-local volunteer nodes can be represented in only 1 KB. Each node on a multi-node "street" updates others on its street via street-local multicast, and they take turns updating their neighborhood. Each node in a neighborhood takes its turn updating its community, and each node in a community takes its turn updating the other communities in the site.

When aggregated updates are applied, overwriting of newer data is avoided (the part to be avoided is simply skipped over). Local data (one bit) is always most up-to-date, then street-local, neighborhood-local, community-local, and site-local.

The site-local volunteer bitmap can be ANDed with the site-local process-port bitmap for a particular process-port combination (which is updated in the same manner) in order to find volunteer nodes for the process-port. Volunteers are typically sought at a higher rate than draftees (which can be any node with a ready process-port).

Typically, a random or pseudo-random number is generated to find a starting bitmap offset, and the next available bit is selected (or next N bits if more are needed). A full word size of bits can be read at once. Compressed bitmaps are also possible (see bit-sliced index manipulation).

No Default Route
Eliminate default route
Change pseudo default route periodically with key changes, etc.
CSP must specify pseudo default route.

7.1.3 BOSS—Asynchronous Byzantine Agreement

BOSS is a distributed, timely, trusted computing base (TCB) and object/subject security system that incorporates Byzantine agreement logic (from the classic "Byzantine generals" problem) in its decision-making process, and collectively makes security decisions in a "fail-silent" manner that provides survivability even in the face of multiple failures and/or corrupted nodes. BOSS is implemented and instantiated only in conjunction with a MASTER, and works in conjunction with CHARM to control who gets access to what, and when, while ensuring that unauthorized information is not exposed (not even to other internal systems).

In the SHADOWS infrastructure, BOSS implements the TCB, and thus owns the security of the system. The rest of the components rely on BOSS to make correct security decisions—and it must make 100% of the security decisions.

Any BOSS node that fails or becomes corrupted can be restarted or replaced, and in any case cannot be trusted until its trustworthiness can be re-established from scratch to the satisfaction of the surviving trusted nodes, including, at a minimum, other MASTERs with which it previously participated as a team member. Keeping in mind that every MASTER is associated with a BOSS component (and that BOSS is a distributed function), refer back to "A SHADOWS Team Comprises Members with No Common Regional Threats" in 7.1.1.5 for more information on Byzantine agreement.

BOSS is designed to enable the SHADOWS infrastructure to support both classified and unclassified information processing and storage (e.g., to meet or exceed Common Criteria (CC) Protection Profiles (PP) such as the U.S. DoD Remote Access Protection Profile for High Assurance Environments Version 1.0, June 2000, nominally at EAL5, or potentially at EAL6 if implemented by a single, qualified development organization).

The DoD defines the TCB as the totality of protection mechanisms within a computer system—including hardware, firmware, and software—the combination of which is responsible for enforcing a security policy. A TCB consists of one or more components that together enforce a unified security policy over a product or system. The ability of a trusted computing base to correctly enforce a security policy depends solely on the mechanisms within the TCB and on the correct input by system administrative personnel of parameters (e.g., a user's clearance) related to the security policy. (DoD 5200.28-STD). TCSEC1983 defines the TCB as "the totality of protection mechanisms within a computer system, including hardware, firmware, and software, the combination of which is responsible for enforcing a security policy.

Note: The ability of a TCB to enforce correctly a unified security policy depends on the correctness of the mechanisms within the TCB, the protection of those mechanisms to ensure their correctness, and the correct input of parameters related to the security policy.

7.1.4 MASTER—Relationship of MASTER to BOSS

See also: 7.1.3 and 7.2

In the beginning, "Candidate MASTERs" in a system seek to establish trust relationships with existing MASTERs, and failing that, with other "Candidate MASTERs," and if successful, self-organize to become full-fledged MASTERs.

Any "Candidate MASTER" that is unable to establish itself as a MASTER (i.e., a full peer with other MASTERs) may retain its candidacy but is unable to fulfill any of the responsibilities of a MASTER. Rather than waste the resources of such a candidate, it may "volunteer" (or attempt to volunteer) to operate under the auspices of a team of MASTERs, in the role of SERVANT (Service Executor, Repository, & Volunteer Agent—Non-Trusted).

7.1.4.1 Prerequisites for being a MASTER

Each MASTER is distinguished from other MASTERs and from non-MASTERs by a set of inherent traits and capabilities possessed only by MASTERs and "Candidate MASTERs" (which are singleton, would-be MASTERs that have not been accepted and deemed trustworthy by a sufficient quorum of other MASTERs and/or Candidate MASTERs, and thus have not yet attained "MASTER-hood").

Conceptually, one could think of MASTERs and "Candidate MASTERs" as being genetically and behaviorally related in ways that are mutually detectable.

Genetics. At the hardware level, each MASTER has a one-to-one correspondence with, and physical attachment to: 1) a BOSS device or subsystem that has a universally unique cryptographic identity, and 2) a SELF device or subsystem that can cryptographically establish whether the BOSS device or subsystem and any other arbitrary entity claiming to be part of the same system are indeed parts of the same "self." In a preferred embodiment, "self" in this context refers to a bona fide SHADOWS infrastructure. This test is somewhat like a DNA-based identification test where parts of the same "self" share a common DNA sequence, so that in concept, your nose and your right hand could both "claim" to be part of the same self (e.g., "you")—and the claim could be definitively verified.

Behaviors. A MASTER or "Candidate MASTER" is also behaviorally related to other MASTERs and "Candidate MASTERs" that are part of the same SHADOWS infrastructure, and these behaviors are intended to be collectively inimitable. By way of analogy, there's a helpful saying, "If it walks like a duck and quacks like a duck, it's a duck." However, in the SHADOWS infrastructure an ability to imitate behavior intended to be inimitable is merely inconclusive—only the converse is true: "If it does not walk exactly like a duck, OR it does not quack exactly like a duck, then it is not a duck!" As a consequence, any non-self behavior by a MASTER or "Candidate MASTER" is taken as evidence of counterfeit. (Note that non-self behavior by a MASTER is distinguished from the misbehavior of, for example, a communication channel used for MASTER-to-MASTER communication. The SHADOWS infrastructure attempts to determine and isolate the actual source(s) of misbehavior—not doing so would render it much more vulnerable to denial-of-service (DoS) attacks). There is no concept of "once trusted, always trusted"—a trusted MASTER can become untrusted and therefore shunned at the first sign of misbehavior. In a preferred embodiment, a shunned MASTER can be rejuvenated, put "on probation" as a closely watched "Candidate MASTER," and rehabilitated to the extent possible. During rehabilitation, it may fulfill roles typically assigned to a SERVANT (which is inherently non-trusted), or possibly, the roles of a "Probationary MASTER" (whereby it "thinks" it's a MASTER and is apparently allowed a voice in decisions, without being able to actually affect their outcomes, and its decisions are closely monitored for correctness). In a preferred embodiment, a shunned MASTER (now a closely watched "Probationary MASTER") that fails to rehabilitate fully may either be shut down (turned off) or continue to be shunned, but in the latter case may not recognize that it has been shunned (a context is created (somewhat like a "honeypot" or "honeynet"—configurations used by researchers and system administrators to monitor attackers), as part of putting it on probation, that "keeps up appearances" in such a way as to marginalize the shunned MASTER while consuming minimal resources).

7.1.4.2 Resources

All system resources are partitioned in such a way as to allocate the management of them among all the MASTERs in the system. Every MASTER leads at least one team, and also participates on multiple teams led by other MASTERs.

Each MASTER is the primary steward of several sets of resources, and for each such set, leads a team of MASTERs that is collectively responsible for that set of resources, despite the simultaneous failure or corruption of any number of MASTERs (up to a policy-specified threshold). Failed and/or corrupted MASTERs (including the team leader) are adaptively tolerated until detected, at which point they are replaced.

A system's resources essentially refer to its capacity as a network of "working storage" comprising the areas of communications, processing, storage, and energy. Each of these resource areas can be further refined in terms of understanding their capacities as resources, constraints on their use (or non-use), and other resource-specific aspects. For example, the communications resource area comprises connectivity and bandwidth, as well as quantitative quality levels for each (connectivity comprises availability and reliability, for example, and bandwidth comprises rate, latency, and jitter, among others). Similarly, the processing resource area comprises the ability and readiness to accomplish particular tasks (with accompanying arrival rates, service rates, etc., as well as quantitative quality levels). The storage resource area comprises the ability and capacity to store information to transient and/or persistent memory and subsequently retrieve it (further comprising various addressing means and rates, with accompanying quantitative quality levels). The energy resource area comprises the various energy sources and sinks (for example, having sufficient energy to power a combination of system components during a particular time window, and to absorb, store, or reject any waste energy produced during that same window), with accompanying quantitative quality levels.

Each MASTER maintains a viewpoint of the resources claimed to be available in the system, both locally and elsewhere, including its own, in a radial fashion. In a preferred embodiment, each resource claim is associated with a reputation that can be used to weight that resource claim. Relative proximity to the center (as represented by distance from a set of local MASTERs) determines relative update detail and frequency. (The notion of radial proximity can be substituted with a hierarchical notion based on fixed granularity—e.g., neighborhood/town/state/country). For example, local resources (those comprising the center) are the most detailed and frequently updated, whereas nearby (but non-local) resources are less detailed and less frequently updated, and remote resources are the least detailed and least frequently updated.

Locally, each MASTER summarizes the resources for which it is responsible, normalizes the summary to a format that is standardized among the local MASTERs, and shares it with its immediate peers (i.e., the other local MASTERs) on a mutually agreeable schedule. In a preferred embodiment, the schedule of local updates is both event-driven and periodic, but the period is actually time-varying on a prearranged basis, as agreed among the local MASTERs (failure to meet the time-varying requirements provides a hint to SELF that may trigger an "auto-immune" response).

In a preferred embodiment, each MASTER also uses the local resource summaries provided to it by its immediate peers (the same set of peers referred to in the previous paragraph) and creates a further summary comprising their collective local resources, then normalizes the collective summary to a format that is standardized among those peers, and shares the collective summary with non-local-but-nearby MASTERs on a mutually agreeable schedule. (Conceptually, in a set of concentric rings centered on the local MASTERs, these non-local-but-nearby MASTERs would correspond to the nearest larger ring). In a preferred embodiment, the schedule of next-ring updates is both event-driven and periodic, but the period is actually time-varying on a prearranged basis, as agreed among the local MASTERs (failure to meet the time-varying requirements provides a hint to SELF that may trigger an "auto-immune" response).

7.1.4.3 Reputation

In a preferred embodiment, Byzantine agreement via BOSS is used locally by the BELIEF (Bayesian Emergent Learning & Intelligent Evaluation of Facts) subsystem to create a 4-bit reputation estimate for each process at each node, including its own, based on its belief in reputation estimates proffered by others, which are weighted by their own reputations and normalized to a 4-bit result. The local BOSS subsystem maintains its own view of the 4-bit reputation estimate for each process at each node, including its own, as a rolling average that can be queried at a rate independent of its update rate.

A reputation vector of length ($2^b$) bits contains the last ($2^{(b-r)}$) r-bit reputation estimates. Thus, if b=128 and r=8, the vector is (b/8)=16 bytes long and contains (b/r)=16 reputation estimates. If r=4, then the same vector would contain the last (b/r)=32 reputation estimates. Alternatively, with r=4, then 16 reputation estimates could be stored in only 8 bytes.

7.1.4.4 Weighting Claims by Reputation

Given a c-bit ClaimedValue and an r-bit ReputationForClaimedValue proportional to the confidence in the claimant with respect to such claims (or perhaps overall), where 0 is worst-case, and ($2^c$)−1 and ($2^r$)−1 are the respective best-case values for each variable, the w-bit ClaimWeightedByReputation value can be calculated as:

ClaimWeightedByReputation=
(ClaimedValue*ReputationForClaimedValue)/($2^{(c+r-w)}$)

where all variables are integer, w<(c+r), and (c+r−w) is usually a constant. The division by a power of 2 can be accomplished with a simple right-shift of its exponent, yielding ClaimWeightedByReputation=
(ClaimedValue*ReputationForClaimedValue)>>(c+r−w)

For example, given a 4-bit ClaimedValue (c=4) and a 4-bit ReputationForClaimedValue (r=4) proportional to the confidence in the claimant with respect to such claims (or perhaps overall), where 0 is worst-case and 15 is best-case for each variable, their 4-bit weighted product, ClaimWeightedByReputation, can be calculated as:

ClaimWeightedByReputation=
(ClaimedValue*ReputationForClaimedValue)>>(4+4−4)

Although the interim product is (c+r) bits wide (4+4=8 in this case), shifting it right by (c+r−w) bits normalizes it back to the desired w-bit result, where, in this case, w=4.

See also:
CORE—MOVING AVERAGE CALCULATIONS—UpdateMovingAverages(iValue) in section 9.7.

7.1.4.5 Central Concept

The idea is to complement—but avoid the necessity of—conventional synchronous (lockstep) execution of identical instruction on identical CPUs at exactly the same time, in a high-availability (HA), duplicate modular redundancy (DMR) or triple modular redundancy (TMR) configuration with voting logic to determine the correct outcome.

The lockstep approach is useful for quickly detecting and handling transient errors and hardware problems, and even associated software errors (by masking such errors when possible). This approach can greatly improve the availability of a particular machine in a friendly environment, but it does nothing for the availability in a hostile one. Thus, if the HA server or site is compromised or taken down, the system immediately becomes either untrustworthy or unavailable.

Note that being untrustworthy—but still available—is the worst possible outcome, unless the system is specifically designed to assume the presence of untrustworthy nodes.

In contrast, the SHADOWS "Asynchronous Byzantine Agreement" approach removes the need for lockstep execution (although it can still be used, but with less benefit, since the ROI would be greatly diminished). The need for maximal asynchronous operation cannot be underestimated in a high-survivability system, since all manner of network traffic problems (and corresponding mitigations) can occur due to anticipated or actual attacks, or even just normal congestion.

Instead of fine-grained, instruction-level voting, SHADOWS assumes that there are no completely trustworthy individual nodes, but that consensus among a policy-determined quorum is sufficient to warrant trust. In particular, consensus is reached on the final result rather than on each instruction involved in its calculation.

This approach has the significant advantage of being able to incorporate arbitrary levels of diversity in multiple dimensions, such as geographic locations, political environments, security mechanisms, algorithms, software versions (e.g., differentiating among authors, skill levels, code versions, programming languages, build environments, certification levels, etc.), CPUs, memory systems, EMP/radiation hardening, physical access controls, etc.).

By comparing only the results (or more precisely, a representation of the results) through the use of a Byzantine agreement algorithm (from the classic "Byzantine generals" problem), this approach can minimize the overhead associated with voting logic while still establishing a nearly arbitrary level of trust. Even nodes with intermittent hardware and/or error-prone or corrupted software can contribute useful results.

In a SHADOWS or SCRAM network, voters may actually be data consumers not involved in the calculation (that is, they're not the "Byzantine generals"). In this scenario, the voters do not have the actual results, and must first receive results from the producers (i.e., from the Byzantine generals). First, the producers can each calculate the appropriate result (including compression, encryption, and a CRC or message digest as appropriate). However, rather than each producer transmitting the entire result to each consumer, the producer then computes an FEC-encoding of the result message (with a suitable rate code) and extracts its "share" of the FEC-encoded message, which it also encrypts, and to which it may add a MAC (message authentication code) and/or digital signature. The "share" is then transmitted to any consumers that need it, along with identifying information as appropriate for the communications protocols in use. The code rate (n,k) used determines the number of uncorrupted "shares" (i.e., k of n) that must be received in order to decode a result and determine its validity.

Data consumers may be addressed individually via unicast, or collectively via multicast, but in both cases the ability of a group of authorized (but not necessarily trusted) producers to send FEC-encoded slices (or "slivers") to the consumers greatly increases the likelihood that each consumer receives the correct desired data at the maximum rate it can be received (such as when limited by the consumer's aggregated inbound bandwidth, which may be greater than the individual outbound rates of the individual senders).

7.2 BOSS (Byzantine Object & Subject Security)

The BOSS subsystem is built on the principles of a Trusted Computing Base (TCB) as are known by those skilled in the art. In addition, however, BOSS is further constructed with accurate time-keeping mechanisms and hardware support for the logic and processing required to implemented a Timely TCB, (TTCB), whose principles are also known in the art, but to a lesser degree, and are well described elsewhere. The BOSS subsystem may also be implemented (or emulated) in software, given an environment sufficient to meet the particular set of needs.

The novel BOSS hardware is tamper-proof or tamper-resistant and enables synchronization and reconciliation of multiple time-keeping sources that are authoritative to varying degrees (e.g., local atomic clocks, local crystal-controlled oscillators, terrestrial radio or satellite-based signals such as WWV, GPS, etc.).

The BOSS hardware also securely implements various cryptographic processes and provides secure encrypted storage of associated variables, keys, and so forth. The BOSS hardware also securely implements the error and/or erasure coding mechanisms described below, that enable the use and application of forward error correction (FEC) as described below.

7.2.1 Minimum Redundancy for Byzantine Agreement

It is accepted in the art that the minimum number n of team members required for Byzantine agreement is $3f+1$, where f is the number of faults to be tolerated, and no more than one-third of the team members are faulty (whether benign or malicious). (The SHADOWS architecture acknowledges this as a starting point, although there is reason to believe that $3f+1$ may be overly conservative. However, because survivability and trust are key to SHADOWS, conservatism is quite acceptable. In any case, if $3f+1$ is too conservative, then achieving $3f+1$ means that a larger number of faults may be tolerated with no actual changes. On the other hand, SHADOWS uses a linear MDS code (e.g., a variant of Reed-Solomon) to achieve Byzantine agreement.). However, SHADOWS uses coding theory rather than voting to implement Byzantine agreement. Thus, Byzantine agreement among k out of n MASTERs on the same SHADOWS team is sufficient to tolerate f faults, where $f=(n-k)/2$ and $n>k$ in the general case of f faulty and/or malicious team members, assuming that it is not known which f of the n MASTERs are faulty and/or malicious. This means that for the case when $f=1$, then $n=2+k$.

If, instead, it is allowed that up to c MASTERs have simply crashed or failed to respond, and it is known which ones these are, then SHADOWS can tolerate a combination of up to c known crashed or unresponsive MASTERs and up to f faulty or malicious (but unknown) MASTERs, where $(c+2f)<(n-k)$.

7.2.2 Byzantine Agreement Among Peers

In a preferred embodiment, a multiplicity of peers (say, n of them) representing only a portion of the peers that are competent, ready, and willing to perform, is responsible for a particular computation, and consensus is required among at least k of them (where $k<=n$). Each of the n peers uses the same information basis to independently perform the computation (which should be identical to those created by the other $n-1$ participating peers). The computational result is then compressed, encrypted, sliced, and FEC-encoded with a systematic (n,k) code, such that any k of the slices (where $k<=n$) is sufficient to correctly retrieve the consensus result.

Each of the n peers shares only one slice, which means that the threshold value k (which may vary with context) determines how many correct slices—and thus, how many correct peers—are required to reconstruct the consensus result. This technique (which, in a preferred embodiment, is also used in other contexts) contributes to Byzantine fault-tolerance, since up to $(n-k)$ faulty contributors can be ignored (however, the SELF and BOSS subsystems may take note of such failures).

In the case of each of the peers needing to know the consensus result, each peer can simply share a single slice with the others, and the specific slice to be shared is tied to the relative ordinal number of each peer within the set of n collaborating peers (e.g., peer 1 shares slice 1, peer 2 shares slice 2, and so on, up to peer n, which shares slice n). Each peer digitally signs its slice so that recipients can verify whose it is (i.e., that it was actually provided by the peer with which it is identified). Any peer that shares the "wrong" slice, or a "corrupted" slice, or fails to share a slice, becomes included in the set of up to $(n-k)$ faulty contributors whose slice can be ignored during this round of computation (but the responsible peer is noted, of course). Once a peer has received at least $(k-1)$ of the possible n slices from the other peers (or k slices if the peer doesn't have its own slice), then the consensus result can be independently reconstructed locally without further communication.

The use of this method, while not avoiding the intended redundancy of computation, does eliminate unnecessary communications overhead. Instead of each peer sharing a copy of the computational result, or alternatively, a copy of a digest of the computational result, for a total of n copies—each peer shares only a fraction (1/n) of a copy that has been enlarged slightly (to n/k of its original size), so that in the aggregate only one copy is shared at most, and that copy is n/k of its original size (where $n>=k>=1$). Each slice is appropriately encrypted and digitally signed by each sending peer prior to distributing it to the other peers, in order to assure accountability. Consensus can be reached despite the Byzantine failure of up to $(n-k)$ peers.

7.2.3 Byzantine Agreement Among Peers, as Viewed by Third Parties

The use of this method is a tremendous benefit where one or more authorized third-party entities needs a consensus result from, say, n peers that are collectively providing a service, and the third-parties not only need to know that consensus is reached, but also what the actual result is. The particulars of the method are the same as those stated above, except that each peer also sends one or more suitably encoded (encrypted, etc.) slices of the consensus result to the authorized third parties.

In cases involving non-local communications, the communications mechanisms and current operational profile are fundamentally tied to the level of redundancy required, as are the encryption mechanisms, so the same exact slice used for consensus is not sent to the third party, but rather, each peer creates a new set of n' slices from its own unencrypted slice of the consensus result, and these are FEC-encoded with a systematic (n',k') code, such that any k' of the n' slices (where $k'<=n'$) is sufficient for third-party entities to correctly reconstruct a single slice of the k slices needed to reconstruct the original consensus result. (Each peer represents a single potential Byzantine fault or failure, and thus gets only one vote in the original consensus result.). In this scenario, each sending peer's values for n' and k' are independent of those used by the other peers, and may be heavily influenced by the properties of this communications channels, since extra redundancy may be appropriate.

For example, based on the current levels of network congestion between itself and the destination third-parties, one peer may independently decide to send 20 slices to a third party, such that any 15 slices is sufficient to reconstruct the sender's original slice of the consensus result. If there are 4 channels to be used for the transmission, for example, the sender may opt to split the slices up among the available channels such that each channel handles a few of the slices, according to its individual data rate, congestion, reliability, etc. The same principles apply, however, and consequently, the authorized third-party entities need only to receive any legitimate k' of n' slices from a given sender to reconstruct that sender's single slice of the consensus result. Further, the authorized third-party entities need only to reconstruct legitimate slices from any k of n senders to reconstruct the original consensus result.

7.3 MASTER (Multiprocessor Adaptive Scheduler & Task Executor/Redirector)

7.3.1 Load-Balancing SHADOWS Native Processes

Figure 12:
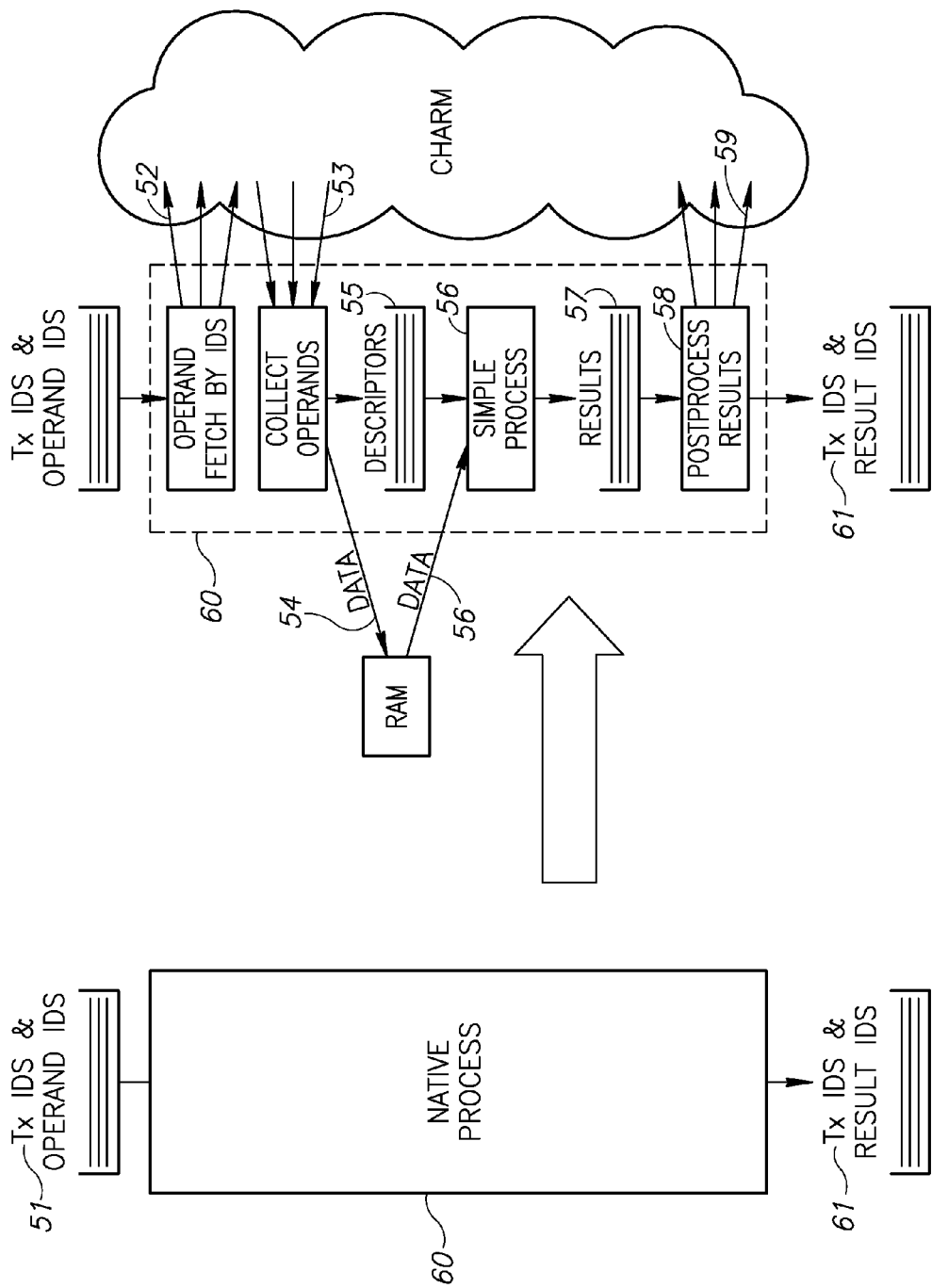
FIG. 12 MASTER—Under the Covers of a Native Process

Refer to FIG. 12 MASTER—Under the Covers of a Native Process

In general, SHADOWS native processes do not push data around as loads are shifted and requests are made, etc. Instead, IDs are pushed around, and if a process actually needs the associated data, it can request it (on a "pull" basis), or, if there are no other operands, just forward the request to the team that owns the data (resources permitting). The act of pushing an ID, however, has the effect of putting the team owning the associated data on notice that it may be needed soon, essentially identifying the ID as a speculative prefetch opportunity.

In its simplest form, a SHADOWS native process 60 has an input queue 51 and an output queue 61, as depicted in FIG. 12, one the left. Ignoring security issues, the input queue 51 accepts tuples of the form {TxID, Operand ID List}, performs the work of the process which is to generate one or more Result IDs, then enqueue them into output queue 61 for distribution. The transaction id (TxID) ties the Operand IDs (received as input) to the Result IDs associated with the processing results.

Under the covers of a SHADOWS native process, however, there are actually a number of latency-hiding, asynchronous parallel processes whose purpose is to keep a "simple process" busy doing actual work for as long as there are queued up requests. This is depicted in FIG. 12, one the right.

In a preferred embodiment, as depicted in FIG. 12, the input queue 51 accepts tuples of the form {TxID, Operand ID List}. An interior process immediately fires off requests 52 for the actual data associated with the Operand IDs, requesting the teams that have the specific data to send it along to a specific destination team (which may be the current team or some other one). A message may also sent to the specified destination team to put it on notice that data for the particular TxID may soon be arriving (since unexpected data may trigger defensive behavior).

When the data is retrieved by the team that owns it, it may be sent to the specified destination team 53, thus, for a given TxID, the outbound message 52 and the inbound message 53 are unlikely to occur on the same machine, unless the sender of 52 specifically wishes to receive and process the data 53 within its own team for some reason. When the specified destination team collects the operands 53 and stores them in RAM 54, it may then enqueue process descriptors 55 (including pointers to the operand data in RAM) into the input queue of the embedded "simple process." The simple process may later dequeue the process descriptor 56 and associated data, perform its process and enqueue the "raw" results 57 to its output queue. A postprocessor may dequeue the raw results 58 in order to create one or more digests of the results, thereby generating one or more Result IDs. The Result IDs and raw data may be "pushed" to the appropriate teams 59 (i.e., to the owners/stewards, based on the Result IDs), and then a tuple {TxID, Operand ID List, Result ID List} (or equivalent) may be enqueued to the output queue 61.

7.3.2 Forces Influencing SHADOWS Adaptive Load-Balancing

Each MASTER may have its own viewpoint of the entire system based on its own local statistics and a global (i.e., non-local) statistical summary of the rest of the system, so that it may "think globally, but act locally." Statistics may be summarized into simple percentiles (a preferred embodiment may use quartiles, such that any statistic may be summarized in just four states—requiring just two bits—for the purpose of decision-making). Each MASTER may communicate its local statistics to its immediate neighbors, both periodically and whenever a state-change occurs. In a preferred embodiment, the neighboring MASTERs may individually calculate the statistics for their "neighborhood" and communicate them upward to a higher aggregation level. In an alternate embodiment, the neighboring MASTERs may "take turns" rolling up the statistics for their "neighborhood" and communicating them upward to a higher aggregation level.

Figure 13:
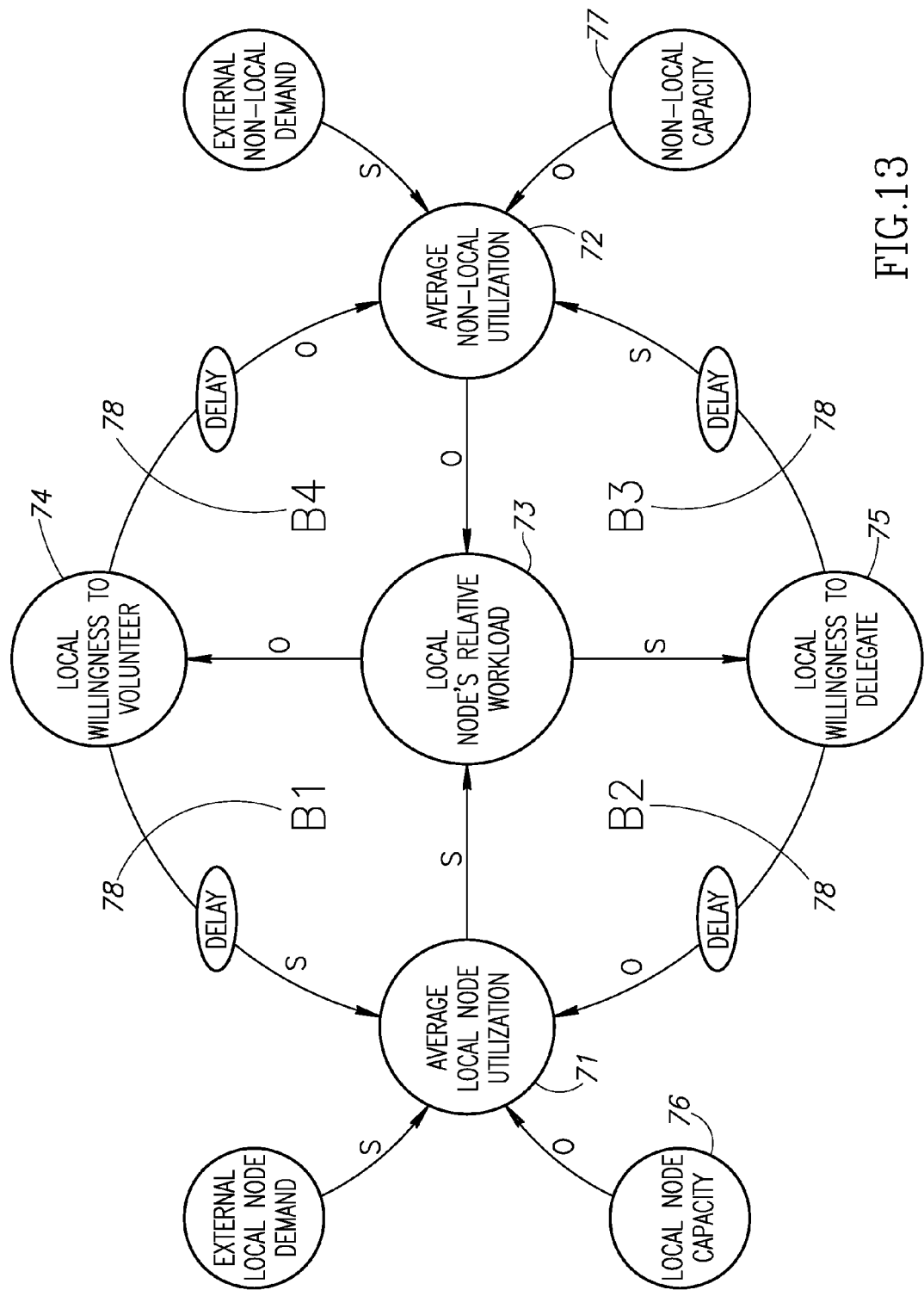
FIG. 13. Forces Influencing SHADOWS Adaptive Load-Balancing

A systems thinking diagram as depicted in FIG. 13 may help teach how each MASTER's work-scheduling decision-making may be influenced by the "forces" associated with the current values of the key system variables involved in load-balancing decisions. In the diagram, the arrows marked with "S" represent forces or trends that may cause one system variable to affect another in the same direction (i.e., the pointed-to variable may be influenced to go up or down as the other one does). Likewise, the arrows marked with "O" represent forces or trends that may cause one system variable to affect another in the opposite direction (i.e., the pointed-to variable may tend to go down if the other one goes up, or up if the other one goes down). Systems thinking diagrams are often characterized by the presence of "loops," each of which may be either a "balancing" loop (which tends to be very stable, like the way a thermostat works) or a "reinforcing loop" (which tends to result in runaway behavior, like the unwanted feedback in a public address system). In the figure, the four quadrants each comprise a self-stabilizing balancing loop 78 (B1, B2, B3, and B4). By design, there are no reinforcing loops that could cause runaway behavior.

In understanding the operational description that follows, it may be useful to know that cooperating MASTERs in the SHADOWS infrastructure may volunteer to do work, thus making themselves eligible to be delegated to by other MASTERs. Any MASTER may delegate work to any volunteer without requiring further permission. Volunteers who receive temporary overloads may re-delegate the work (if authorized), or push it back, or ignore it (which is effectively equivalent to "crashing," which may be noticed by the delegator).

MASTERs may also delegate work to SLAVEs and/or SERVANTs, but only those for which they are responsible.

Refer to FIG. 13. Forces Influencing SHADOWS Adaptive Load-Balancing

Given any resource capacity of interest (e.g., processing capacity, memory capacity, storage capacity, energy capacity, etc.), two of the system variables driving resource-balancing are the AverageLocalNodeUtilization 71 and the AverageNonLocalUtilization 72 (which are themselves driven in the same direction as the level of local or non-local resource demands, respectively—i.e., if demand increases, utilization tends to increase also, and vice-versa). Utilization Examples: A utilization of 100% means that the node is operating exactly at the desired utilization goal (which may be somewhat less than its raw capacity), whereas 70% means that its capacity is underutilized by 30%. Likewise, 150% means that 50% more work is queued at the node than it was intended to handle all at once. It could still be accomplished eventually, but service level agreements (SLAs) might not be met, and customer satisfaction might suffer. An average utilization that continually exceeds 100% is one indication that system capacity should be increased.

For simplicity, in the following discussion we'll conceptually aggregate all of a node's resources into the concept of a relative workload capacity—the ratio of the local node's capacity to accomplish requested work compared to the average capacity of the other nodes. The capacity of the local node and/or any combination of other nodes can be increased by "scaling up" (i.e., increasing the capacity of an individual node). The aggregate capacity of the other nodes (i.e., any nodes other than the local one under consideration) can also be increased by "scaling out" (i.e., by adding more nodes). Changes in local and/or nonlocal capacity tend to drive the their node utilizations in the opposite direction (e.g., increasing local node capacity tends to decrease local node utilization). We'll use the AverageLocalNodeUtilization 71 and the AverageNonLocalUtilization 72 variables to represent their respective resource utilizations. We can then define an important dependent variable we'll call LocalNodeRelativeWorkload 73 (i.e., the node's workload, as a percentage, compared to what other nodes are currently experiencing, on average). The LocalNodeRelativeWorkload 73 is calculated as:

((AverageLocalNodeUtilization/AverageNonLocalUtilization)−1)*100

Thus, a LocalNodeRelativeWorkload 73 value of +20% means that the local workload is 20% above the average workload of the other nodes (i.e., excluding itself), whereas −20% means that the local workload is 20% below the average of the other nodes. This percentage can then be compared to the current percentile (or quartile, etc.) thresholds, in order to classify the workload of the local node relative to the other nodes. In a preferred embodiment, one goal is to determine which "load category" the local node fits best, such that one of four values (which requires 2 bits to represent) can be assigned for classification purposes, e.g.: Very Heavily loaded (3), Heavily Loaded (2), Lightly Loaded (1), Very Lightly Loaded (0). While any eligible node can be delegated to, those with the lightest load may receive a statistically larger fraction of any delegated work, and those with the heaviest load may receive the smallest fraction (and possibly zero). Workload adaptation is continuous, but enjoys relatively low overhead due to the hysteresis induced by basing local adaptation decisions on relative workload, and by classifying the relative workload into a small number of statistical categories that correlate well with the actions to be taken.

Two additional dependent variables are the LocalWillingnessToVolunteer 74 and the LocalWillingnessToDelegate 75, both of which are intuitively related to the relative workload.

Volunteering: The trend of the local node's willingness to "volunteer" to take on additional load (LocalWillingnessToVolunteer 74) is opposite the trend of LocalNodeRelativeWorkload 73. Thus, if a local node's relative workload increases, then its willingness to volunteer decreases, and vice-versa. Over time (i.e., there's a delay), any change in the local node's volunteer efforts may also drive its average utilization (AverageLocalNodeUtilization 71) in the same direction (increased volunteering may increase its own utilization, and vice-versa). However, over time, the local node's volunteer efforts may also drive the utilization of the other (i.e., non-local) nodes in the opposite direction. The more that the local node volunteers to do the work of other nodes, the less work the other nodes have to do, which decreases their utilization, and vice-versa.

Delegation: The trend of the local node's willingness to "delegate" part of its workload is in the same direction as the trend of LocalNodeRelativeWorkload 73. Thus, if a local node's relative workload increases, then its willingness to delegate increases, and vice-versa. Over time (i.e., there's a delay), any change in the local node's delegation efforts may also drive its average utilization in the opposite direction (increased delegation may decrease its own utilization, and vice-versa). However, over time, the local node's volunteer efforts may also drive the utilization of the other (i.e., non-local) nodes in the same direction. The more that the local node delegates its work to other nodes, the more work the other nodes have to do, which increases their utilization, and vice-versa.

7.4 SLAVE (Storage-Less Adaptive Virtual Environment)

Figure 14:
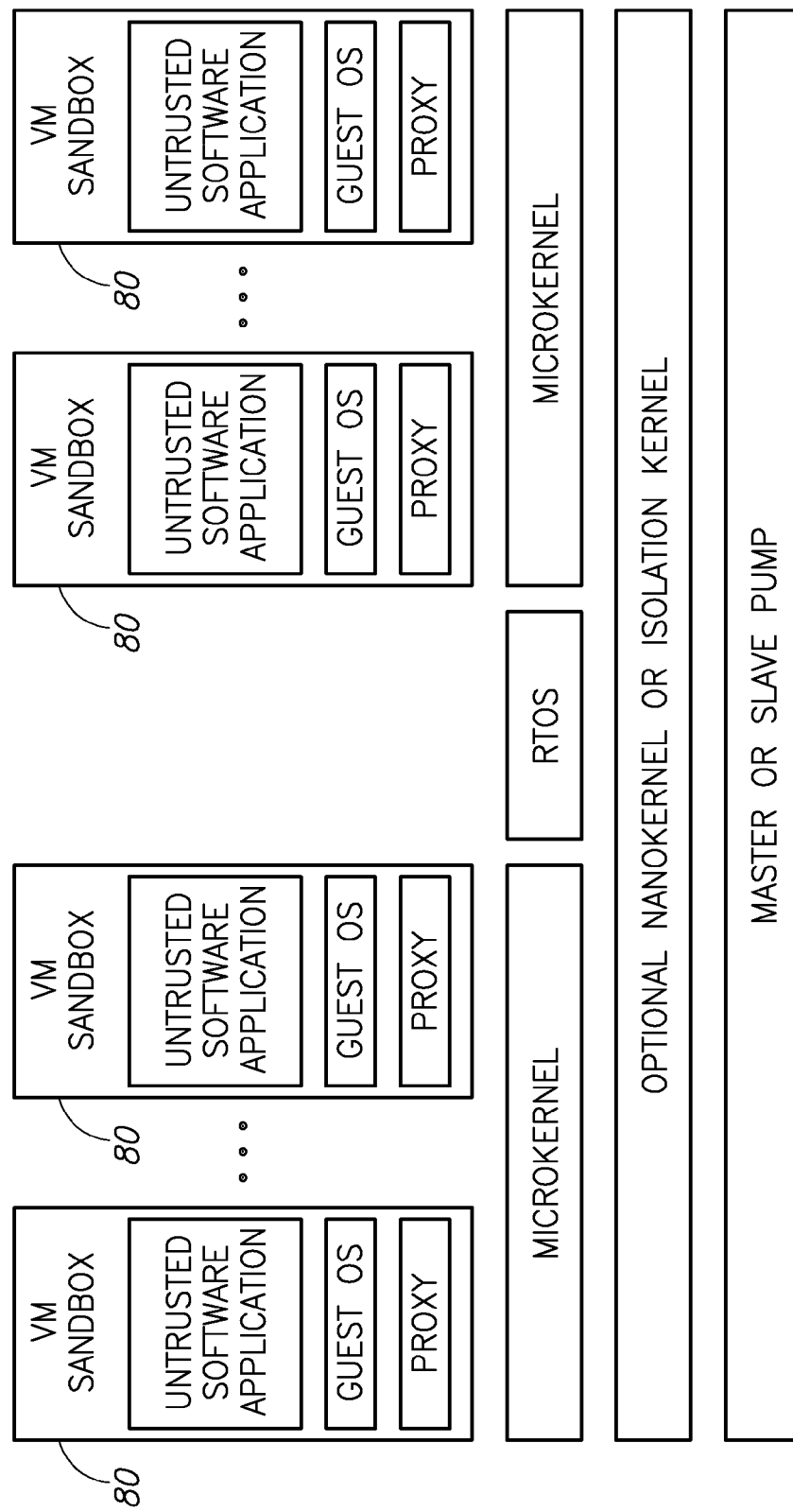
FIG. 14. SLAVE Sandboxes for Executing Untrusted Software

Refer to FIG. 14. SLAVE Sandboxes for Executing Untrusted Software

The virtual machine (VM) sandboxes 80 and software layers depicted in FIG. 14 have been or could be implemented in any of several open source and/or commercially available virtual memory environments. Types of Software to Execute: Contributed/open source services; outsourced services; experimental services; customer applications; applications under test; commercial and other third-party applications. (Note: Each VM sandbox 80 is configured to exactly meet the approved resource needs of a particular application, which may vary according to function, level of trust, priority, etc. The working set of a typical VM sandbox 80 ranges from 50 KB to 100 MB, but will normally be well under 1 MB. Thousands of sandboxes can be supported on each host CPU, e.g., on each MASTER CPU 100 or SLAVE CPU 102 in FIG. 18.).

Examples of systems that may be tailored to the SLAVE PUMP 101 or 107 in a straightforward manner include the open source software "Xen" (now a part of Linux), "OpenVZ," and others, as well as the experimental software "Denali" (and its variants, from the University of Washington), both of which are well-suited to Unix, Linux, and various BSD environments.

The key novel capabilities introduced by interfacing to the SLAVE PUMP 101 or 107 rather than to traditional computer hardware, include:

- A dedicated set of memory-mapped, "user-space" registers, per SLAVE CPU process
- Direct, user-space access to dedicated "phantom" peripherals as projected by the PUMP 101 or 107
- Direct, user-space access to system time, timers
- Direct, user-space access to process accelerators implemented in hardware by PUMP 101 or 107
- Reduction in hypervisor overhead (shifts away from CPU 100 or 102 to hardware 101 or 107 and/or specialized processors)
- Absolute control over the software and hardware operating environment (including BIOS)

Figure 15:
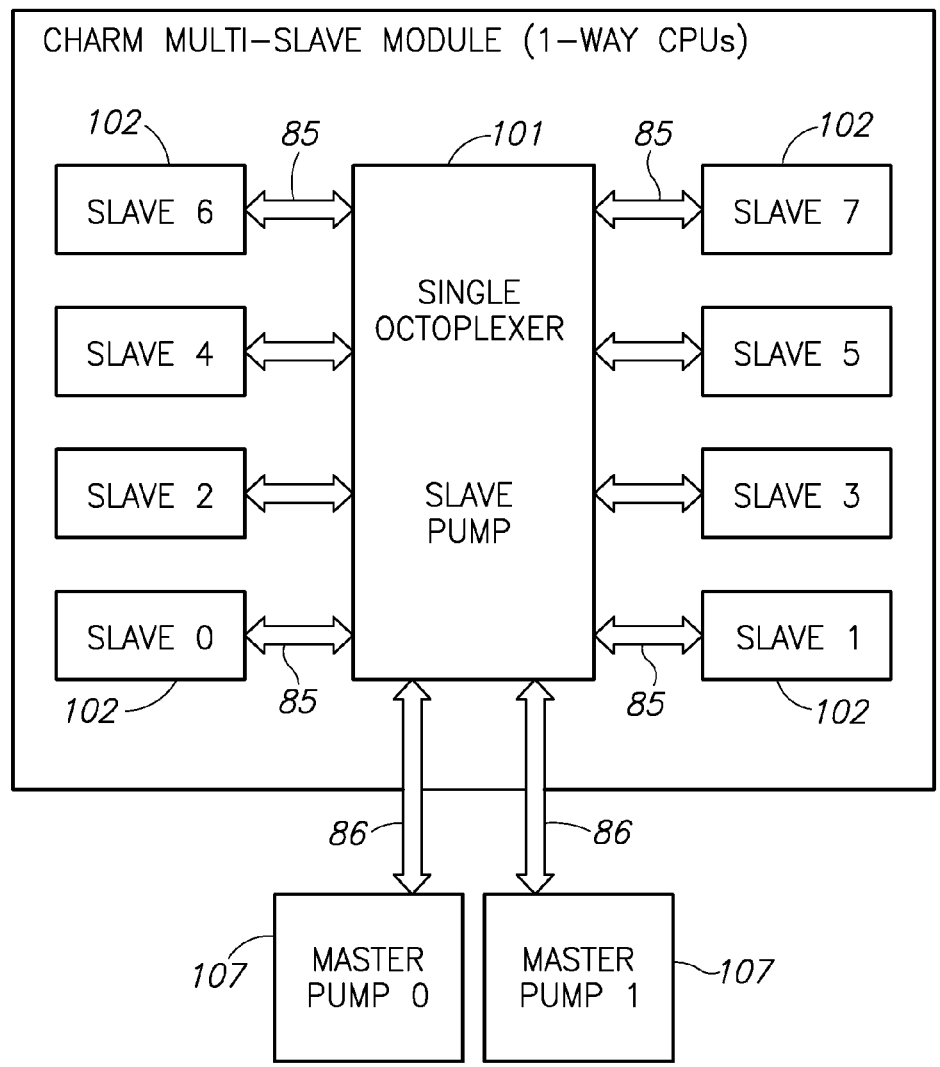
FIG. 15 Multi-SLAVE Module (1-way CPUs)
Figure 16:
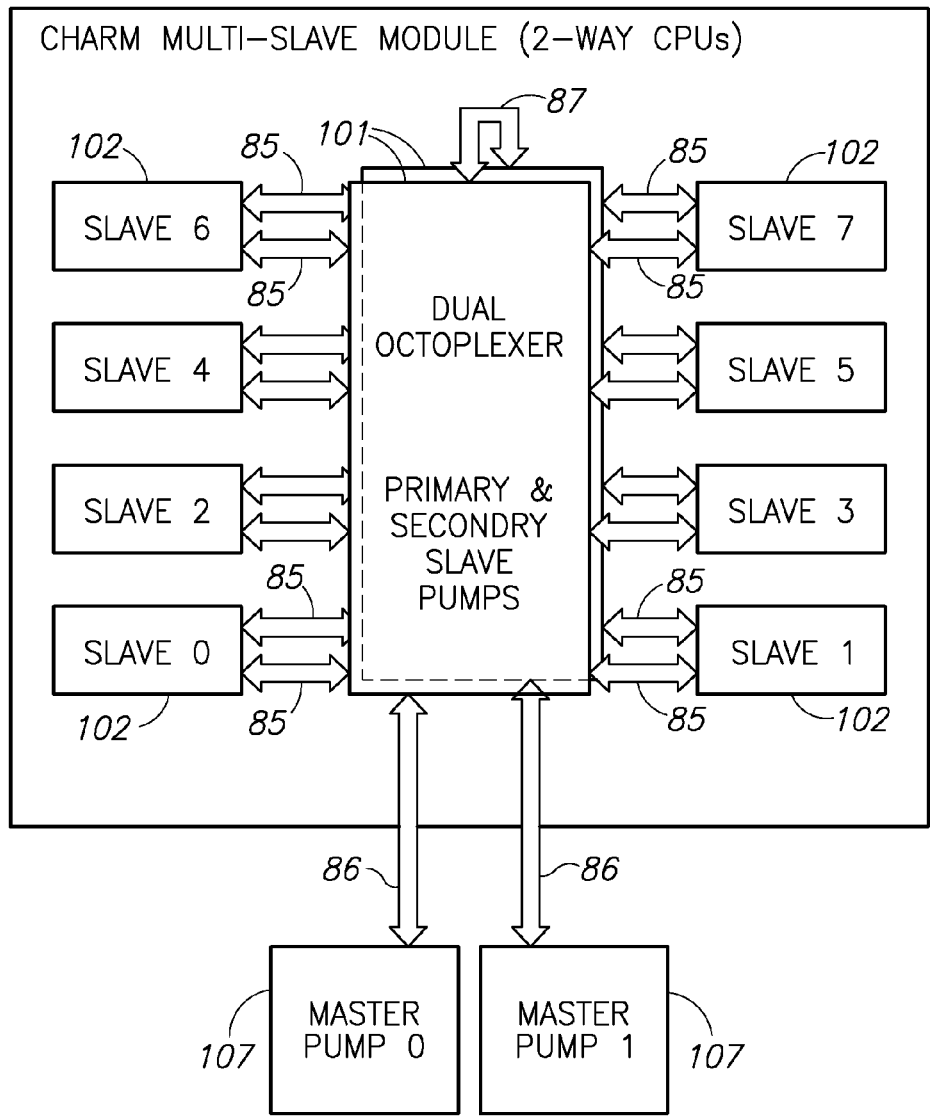
FIG. 16. Multi-SLAVE Module (2-way CPUs)

Refer to FIG. 15 Multi-SLAVE Module (1-way CPUs)
Refer to FIG. 16. Multi-SLAVE Module (2-way CPUs)
Refer to FIG. 17. MASTER & PUMP Module (Alternate Embodiment)
Refer to FIG. 18. CHARM Internal Module Connections (Alternate Embodiment)
Refer to FIG. 19. CHARM Module HyperTransport Interfaces (Alt. Embodiment)

Figure 17:
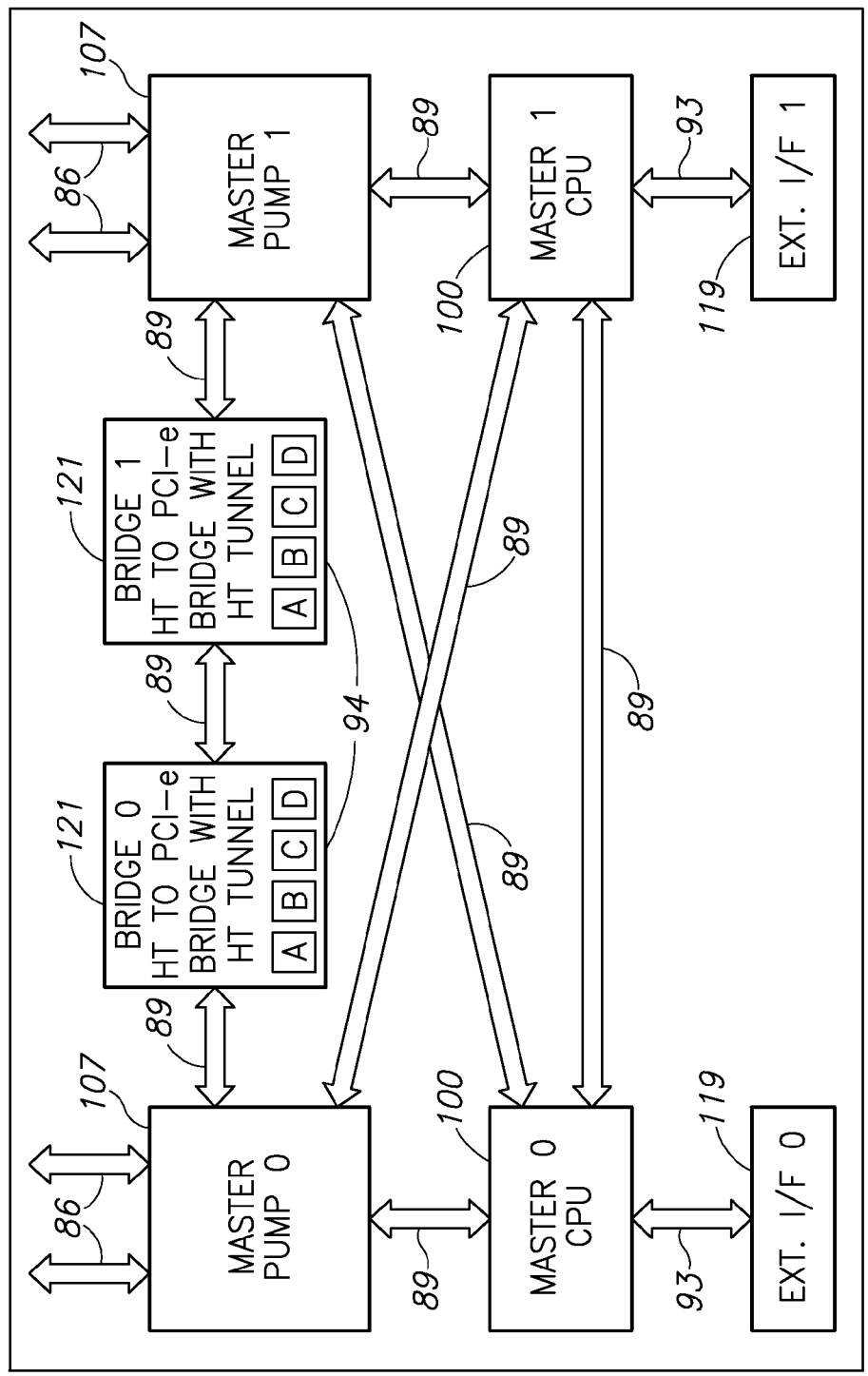
FIG. 17. MASTER & PUMP Module (Alternate Embodiment))
Figure 18:
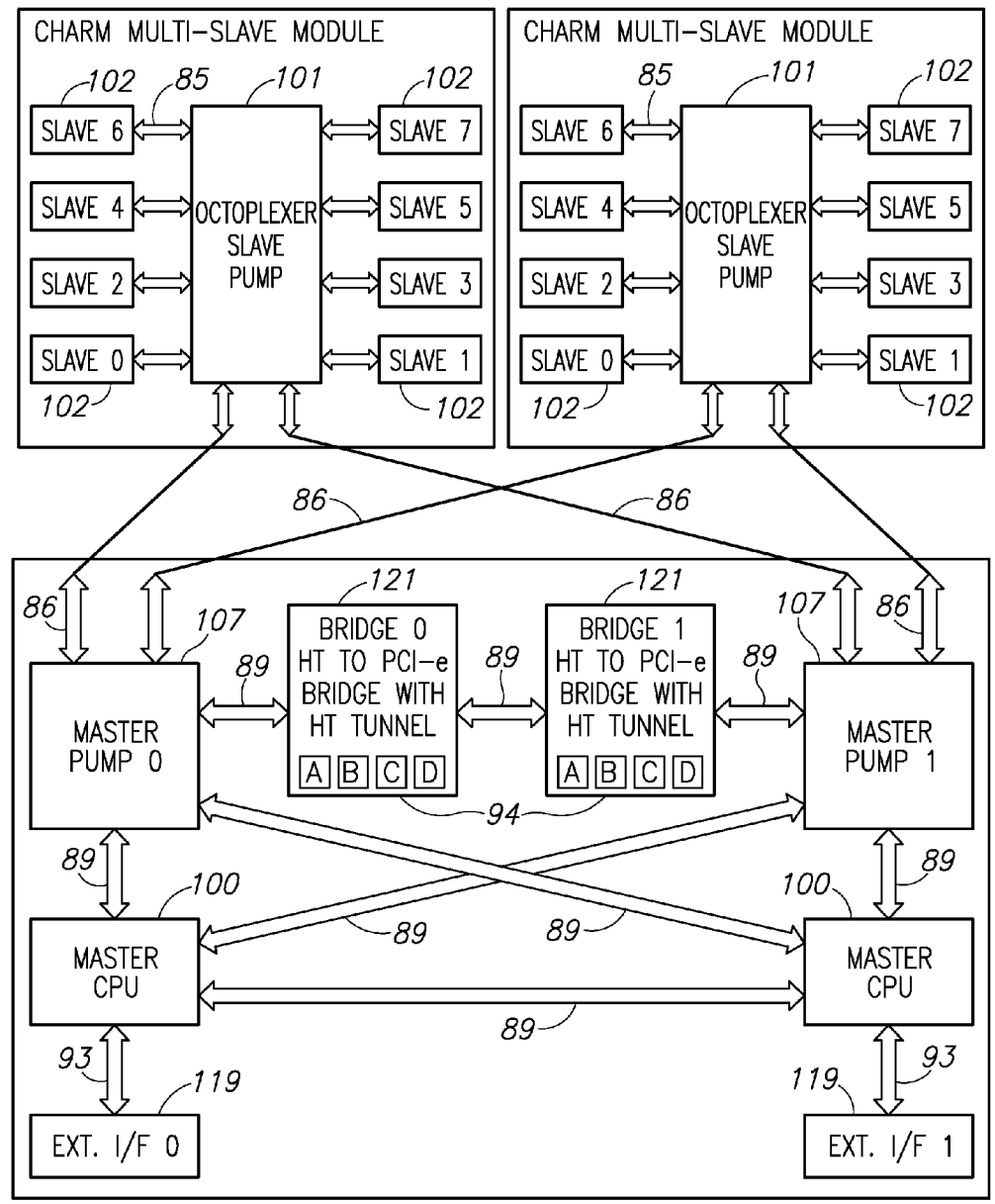
FIG. 18. CHARM Internal Module Connections (Alternate Embodiment))

In FIG. 15, each OctoPlexer 101 has ten 16-bit HT channels 85, 86 (8-bit channels are optional for SLAVEs 101). HT SLAVE I/O 85 is 8-bit or 16-bit. HT MASTER I/O 86 is 16-bit. In FIG. 16, dual OctoPlexers 101 use 1 channel 87 to connect to each other. Dual 8- or 16-bit SLAVE I/O HT channels (one per OctoPlexer 101) link each SLAVE CPU 102 to the OctoPlexers 101. A 16-bit HT channel 86 connects each MASTER PUMP 107 to an OctoPlexer 101. FIG. 17 and FIG. 18 depict an embodiment with each HT-to-PCIe bridge 121 having four ports (A,B,C,D) of 4-channel PCI-Express 94, connected via 16-bit HT channel 89 to a MASTER PUMP 107 having 16-bit HT channels 86 connecting it to OctoPlexers 101 (one per OctoPlexer).

Figure 19:
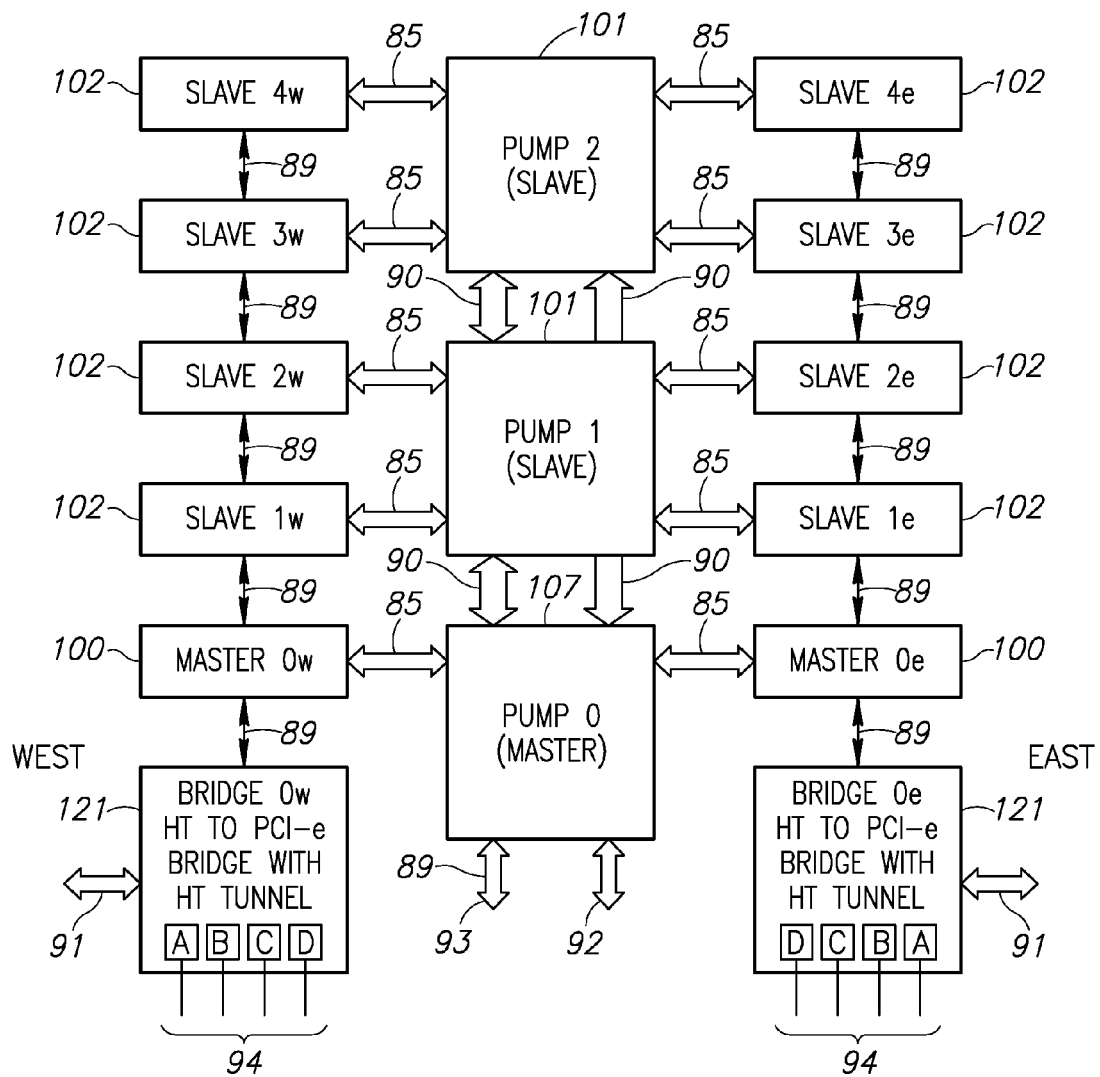
FIG. 19. CHARM Module HyperTransport Interfaces (Alternate Embodiment))

Each PUMP 101 or 107 typically implements at least two inter-PUMP HT links 86. Ideally, these are 32-bit HT links, but may be 16-bit or 8-bit if PUMP 101 I/O pins are insufficient. In FIG. 19, PUMP 0 107 is distinguished in that it terminates both ends of the PUMP 0/PUMP 1/PUMP 2 daisy chain, while the other PUMPs 101 each implement an HT tunnel (with a cave for each PUMP's local functions). Thus, for example, in the diagrams of FIG. 18 and FIG. 19, one of PUMP 0's links 86 connects to PUMP 1 and the other to PUMP 2. PUMP 1 and PUMP 1 also connect to each other. In theory, the number of unbridged PUMPs 101 or 107 is limited primarily by requirements of the type of bus/daisy-chain chosen (e.g., HT is currently limited to 31 devices).

Each of PUMPs 101 or 107 also emulates at least one HT tunnel (with a cave for PUMP functions) between a pair of HT links connected to pairs of corresponding processors (represented in FIG. 19 as a pair of MASTERs 100 and multiple pairs of SLAVEs 102). (In FIG. 19, HT links 85 are "Coherent HT" of 16-bit width, with 8-bit width optional; links 89 are "Non-Coherent HT" with "Coherent HT" optional, and of 16-bit width with 8-bit width optional; links 90 are "Non-Coherent HT" with "Coherent HT" optional, and of 32-bit width with 16-bit width optional; links 91 are like links 89, but targeted to optional on-board devices; links 92 are proprietary CCB/ClearSpeed ClearConnect Bus; HT links 93 are to external interfaces (possibly vendor-specific and/or proprietary) such as proprietary CRAY SeaStar communications devices; links 94 implement 4 independent PCIe switch fabric links, each with a channel of 4 PCIe lanes, with each fabric having dual-redundant switches ("North-West" and "North-East"). Here, PUMP 0 107 is shown with only one pair of processor-to-PUMP HT links 85 for the MASTER processors 100 (plus a ClearSpeed ClearConnect Bus interface 92), whereas the other PUMPs 101 are depicted with two pairs of processor-to-PUMP HT links 90 (two pairs of SLAVE CPUs 102 per PUMP 101 are hoped for). Ideally, these processor-to-PUMP HT links 85 are 16-bit, but could be 8-bit if PUMP 101 I/O pins are insufficient (16-bit processor-to-PUMP HT links 89 are more important to PUMP 0 107 than to the other PUMPs 101).

In general, when only one coherent (i.e., cache-coherent) inter-processor HT link 85 is available on each processor (such as in a 2-way Opteron configuration, depicted in FIG. 16), that link is connected directly to a PUMP 101 or 107 (rather than to its mating processor). The PUMP 101 or 107 may then emulate each processor's 100 or 102 mating processor 100 or 102. This allows each processor 100 or 102 to see all of the PUMP's 101 or 107 memory as belonging to the other processor 100 or 102. Since the PUMPs 100 or 107 collaborate, their collective memory is sharable among all the connected processors 100 or 102, regardless of which PUMP 101 or 107 each processor 100 or 102 connects to. "Local" (non-PUMP) processor memory is sharable between directly connected processors only if the links 85, 86, or 89 connecting them are coherent; otherwise, such processors 100 or 102 are connected only for I/O and inter-processor message-passing.

Note: Given a pair of SLAVE CPUs 102 (say, such as 1w and 1e of FIG. 19, for example), one of the processors 102 could be replaced by a specialized processor adhering to the processor's bus 85 protocol. Examples may include replacing an AMD Opteron processor with a DRC or XtremeData coprocessor. Such a coprocessor would have the same access to memory as the replaced processor.

Ideally, all PUMP devices 101 or 107 within a node or module are identical—at least in hardware part number, if not design. Failing that, PUMP 0 (MASTER 100) may be unique and all others (SLAVE CPUs 102 1 . . . n) must be identical.

In a preferred embodiment, PUMP 0 (MASTER PUMP 107) is associated with the MASTER processors 100, which are responsible for module initialization, etc.

8 CHARM—Compressed Hierarchical Associative & Relational Memory

TABLE 3

| Major CHARM Technologies - Technology Name & Summary Description | |
| --- | --- |
| PUMP | Part of CHARM. A device that provides controlled memory access to diverse processing units (e.g., CPUs, DSPs, and FPGAs) simultaneously in such a way that it significantly improves the performance, integrity, and economics of a much larger memory array than is traditionally deployed in a small-but-scalable system. |
| PEERS | The local switching and routing interconnectivity fabric comprising the collection of packet-handling components that enables communication among the various processors and devices within a SCRAM node, or between directly attached SCRAM nodes, or between a SCRAM node and a directly attached trusted client machine (such as when a SCRAM node is serving as an accelerator or SAN to a client machine). |
| WARP | A general or purpose-built processor/memory array, possibly optimized to accelerate the throughput for a particular class of work, with a PUMP for fast bulk memory. May implement FACTUAL for results caching and reuse. Expected to be implemented as a WARP blade. |
| FIRE | The technology underlying a FIREblade or FIREdrive. Provides high-performance all-electronic, long-term data storage that is immune to mechanical wear and vibration (including seismic events). The stored data is safe from intruders even if stolen. The number of R/W accesses per second is orders of magnitude faster than hard disk drives. |

TABLE 3-continued

| Major CHARM Technologies - Technology Name & Summary Description | |
|---|---|
| FLAMER | a.k.a. FLAMERouter. A MASTER that serves as a gateway between a SHADOWS node and one or more wide-area networks (WANs). Automatically tunnels SHADOWS communications protocols (e.g., RUSH, RECAP, UNCAP) over existing WAN protocols as necessary. |
| NEAR | The technology underlying a NEARblade or NEARdrive. Provides high-capacity, electronically assisted long-term data storage that is subject to minimal mechanical risk (including wear, vibration, and seismic events), due to significantly reduced mechanical duty cycle. The stored data is safe from intruders even if stolen. The number of read and/or accesses per second is orders of magnitude faster than unassisted hard disk drives. |

Figure 20:
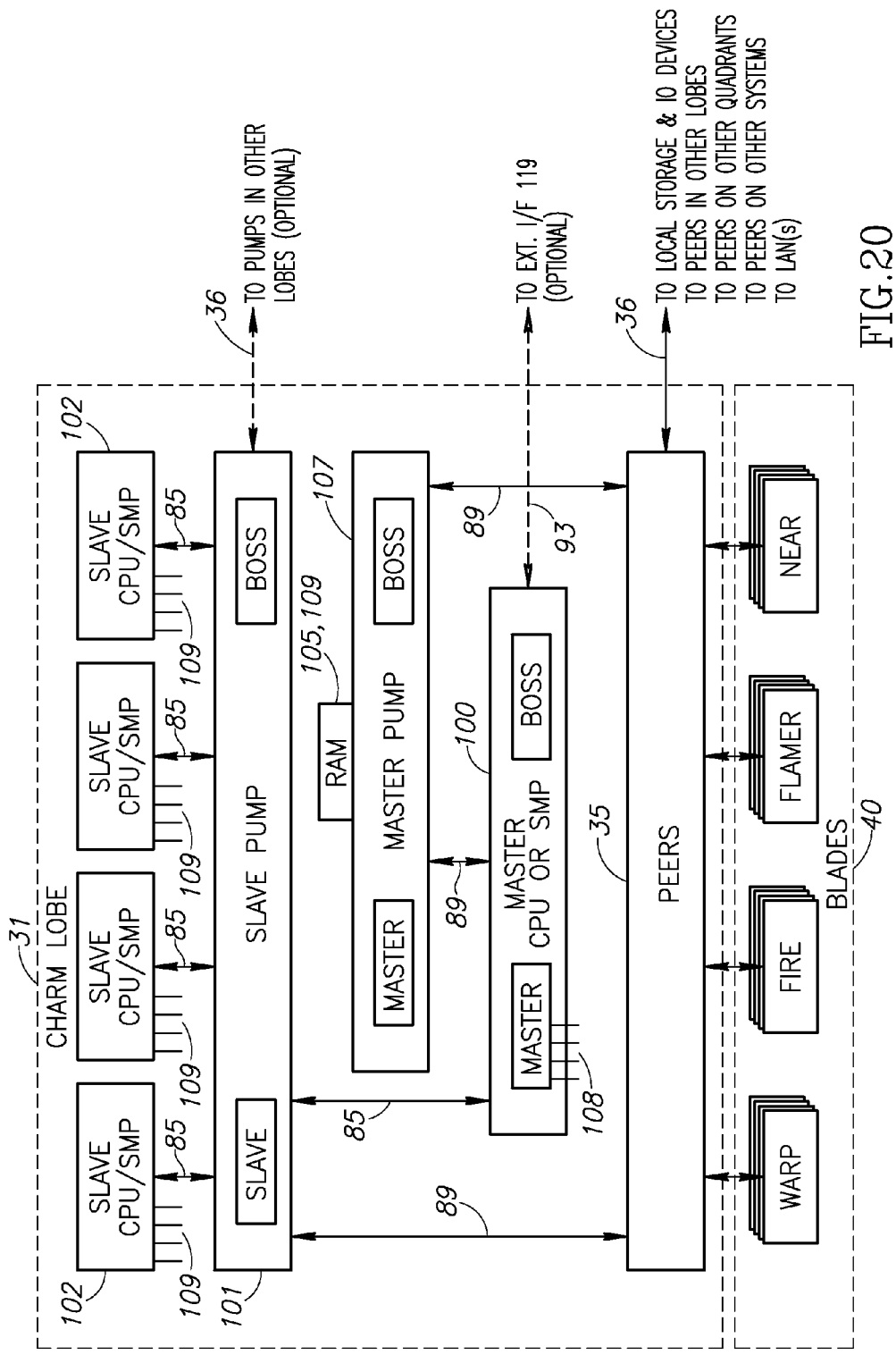
FIG. 20. SCRAM "Lobe"—Conceptual Interaction Diagram #1

Refer to FIG. 20. SCRAM "Lobe"—Conceptual Interaction Diagram #1

In a preferred embodiment, a SCRAM node is composed of 1 to 4 fully connected quadrants; each quadrant contains 4 lobes 31 and controls up to 8 optional "blades" 40 (discussed elsewhere), in any combination, and each blade is fully connected to each lobe in the corresponding quadrant. Each lobe 31 comprises a number of means whose conceptual interaction is depicted in FIG. 20. In a preferred embodiment, one or more of the blocks depicted as (optional) "blades" 40 also are implemented internally (i.e., within a lobe 31) in a non-bladed manner, so that the specific means are also built into the lobe 31 and provide the corresponding capability inherently.

In a preferred embodiment, as depicted in FIG. 20, a MASTER CPU or SMP 100 works cooperatively and symbiotically with a MASTER PUMP 107 via a direct communication path 89 (for example, HyperTransport). The MASTER role assigned to the MASTER PUMP 107 differentiates it from any SLAVE PUMPs 101. The MASTER PUMP 107 transparently communicates with the SLAVE PUMP 101 by way of the CPU/SMP 100 or the PEERS fabric 35 (i.e., transparent to both of them). The MASTER CPU or SMP 100 typically has a multiplicity of volatile DRAM memory channels 108 (preferably SECDED or Chipkill ECC) that it makes partly available to the MASTER PUMP 107 (e.g., some memory is set aside for local use, and some is allocated to the MASTER PUMP 100). The MASTER PUMP 100 has a multiplicity of non-volatile, high-reliability low-power local memory channels 109 that it makes partly available (e.g., as a block device) to the MASTER CPU or SMP 100. The multi-channel memory controllers in the MASTER CPU/SMP 100 also "belong" to the PUMP 107, which allocates capacity and bandwidth between CPU and PUMP memory.

In a preferred embodiment, a MASTER CPU or SMP 100 works cooperatively and symbiotically with one or more SLAVE PUMPs 101 via a direct communication path (for example, HyperTransport). The SLAVE role assigned to the SLAVE PUMP 101 differentiates it from the MASTER PUMP 107. Each SLAVE PUMP 101 typically has a multiplicity of SLAVE CPU/SMP devices 102 associated with it, and that are entirely dependent on the SLAVE PUMP 101 for all non-local input/output. In a preferred embodiment, each SLAVE PUMP 102 emulates any devices required to bootstrap each of its dependent SLAVE CPU/SMP devices 101, and well as all communications and storage devices, so that all aspects of the software execution environment for the SLAVE CPU/SMP devices 102 are under control of the SLAVE PUMP 101, which is acting on behalf of the cooperative pairing of MASTER CPU or SMP 100 and MASTER PUMP 107. Each SLAVE CPU/SMP device 102 typically has a multiplicity of volatile DRAM memory channels 109 (preferably SEC-DED or Chipkill ECC) that is entirely available to the SLAVE PUMP 101, which is acting on behalf of the cooperative pairing of MASTER CPU or SMP 100 and MASTER PUMP 107. The multi-channel memory controllers 109 of the SLAVE CPU/SMPs 102 "belong" to the SLAVE PUMPs 101 (the MASTER PUMP 107 delegates to the SLAVE PUMPs 101), which allocate capacity and bandwidth between local (CPU) memory and PUMP memory. Some memory is set aside for local use by SLAVE CPU/SMP devices 102, and some is allocated to the MASTER PUMP 107, which may delegate it back to its various SLAVE PUMP devices 101 in any allocation. In general, the various CPU/SMP devices 100 and 102 use local memory (108 and 109, respectively) in traditional ways. However, because the local memory is limited to SECDED or Chipkill ECC (and the latter is costly), it is well known in the art that high-density DRAM cannot be relied upon for data held in memory long term (if even there is no risk of power failure), due to the relatively high single-event upset (SEU) probability leads to an accumulation of uncorrectable errors. Thus, in a preferred embodiment, only a portion of the potentially large DRAM capacity is allocated for local memory use, and only to processors whose processes are fault-tolerant to an appropriate degree (e.g., checkpointed and/or executed redundantly). The remainder of the DRAM capacity is allocated to the various PUMP devices 107 and 101, which construct a multiplicity of very high speed virtual block storage devices 140 (see FIG. 43) from aggregations of the corresponding memory channels 105, 108, 109, using a suitable (n,k) FEC to encode and decode block data stored into (and retrieved from) the virtual block storage devices. For example, if commodity AMD64 CPUs are used for all CPU/SMP devices 100 and 102, and if there is one MASTER CPU or SMP 107, and four SLAVE CPU/SMP devices 102, and each CPU has dual-channel memory configuration, then there are ten (10) memory channels 108, 109 (averaging 3.2 GB/second each, with low-end memory devices), for a maximum aggregate rate of about 32 GB/second. In this configuration, for example, an with (n,k) FEC code where n=10 and k=8 would yield an effective throughput of about 25 GB/second (80% of 32 GB/second), and any 8 of 10 channels would be adequate to preserve data integrity (in other words, any two memory channels—or an entire CPU with both its channels—could fail entirely, and yet no data loss would occur in the virtual block device). For performance, all FEC encoding and decoding would occur in the various PUMP devices 107 and 102, which would be typically implemented in reconfigurable logic, structured ASICs, or other hardware implementation. In a preferred embodiment, FEC encoding is similarly applied to remote (non-colocated) memory systems, such that communications can be used to combine (n,k) FEC codes advantageously (for example, a local (10,8) code could combine with a remote (10,8) code to create a (20,16) code that would preserve data integrity as long as any 16 of the 20 channels were available). In a preferred embodiment, FEC encoding is similarly applied to the hard disk storage devices in the system, as well as to the non-hard disk storage devices in the system (for example, a large number of USB flash memory or SD flash memory devices), such as those accessible via PEERS 35 (Packet Engines Enabling Routing & Switching) and via the various "outrigger blades" 40.

Figure 21:
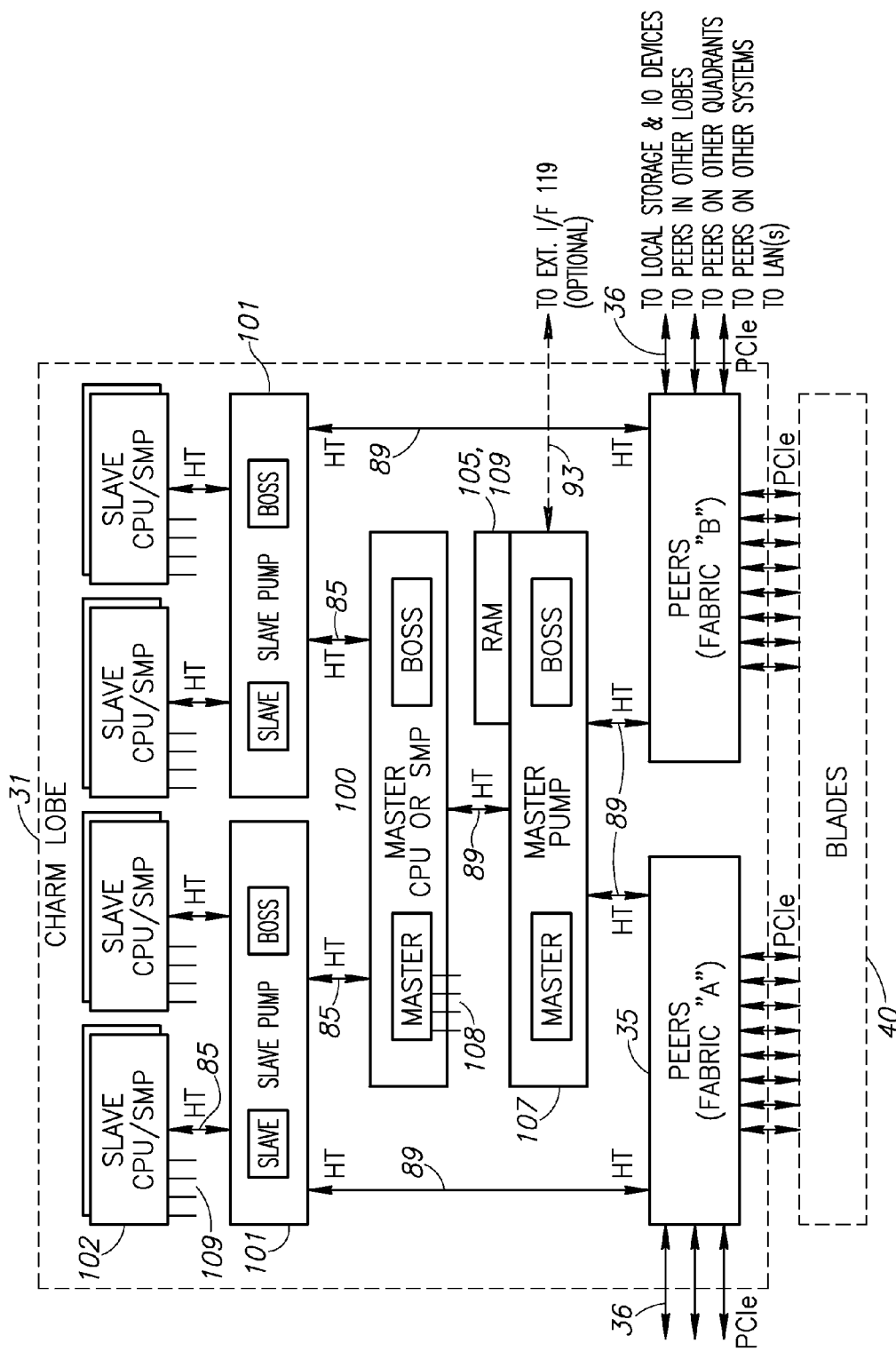
FIG. 21. SCRAM "Lobe"—Example Implementation (Partial)

Refer to FIG. 21. SCRAM "Lobe"—Example Implementation (Partial)

In a preferred embodiment of a CHARM "Lobe," 31 one or more of the means collectively labeled here as "Blades" 40 also are implemented internally (i.e., within a lobe 31) in a non-bladed manner, so that the specific means are also built into the lobe and provide the corresponding capability inherently.

In a preferred embodiment, as depicted in FIG. 21, HyperTransport (HT) is used to create a system bus 89 for connecting a MASTER CPU or SMP 100 (comprising at least 3 HT links) with a MASTER PUMP 107 and two SLAVE PUMPs 101. The MASTER CPU or SMP 100 is responsible for initializing the various HT devices it can reach, up to any non-transparent bridges, as well as any bridged non-HT devices such may be attached to or reached via the PEERS fabrics 35, up to any non-transparent bridges. The PEERS fabrics 35 depicted in FIG. 21 comprise a multiplicity of HyperTransport (HT) and PCI Express (PCIe) packet engines implementing HT tunnels, HT/PCIe bridges, and PCIe switches. In this embodiment, each fabric includes 96 PCIe lanes for I/O to PEERS in other lobes 31, plus non-PCIe channels to local storage, I/O devices, and LANs. Each fabric 35 of each lobe 31 connects to each of 8 blades with 4 PCIe links, so each blade is connected via 32 PCIe links (4 links to each of 4 lobes, over 2 separate fabrics). In a preferred embodiment, the MASTER CPU or SMP 100 has a multiplicity of volatile DRAM memory channels (preferably with SECDED or Chipkill ECC) that can be accessed by the PUMP devices 107 and 101 as appropriate, via the HT links. The MASTER PUMP 107 has a multiplicity of non-volatile, high-reliability low-power DRAM memory channels 109 that it makes partly available (e.g., as a block device) via any of its HT links (in a preferred embodiment, the MASTER PUMP 107 has includes at least four such links—2 tunneled and 2 bridged). Each SLAVE PUMP 101 implements an HT tunnel, plus 5 extra non-transparent (bridged) HT links for communicating with SLAVE CPUs 102, additional PUMPs, and other I/O devices. Assuming each SLAVE CPU/SMP 102 has a dual-channel memory controller 109, there are 16 SLAVE memory controllers whose capacity and bandwidth are allocated between local (CPU) memory and PUMP memory by the MASTER PUMP 107 (via the SLAVE PUMPs 101). Assuming the MASTER CPU/SMP 100 also has a dual channel memory controller 108, there would be a total of 18 such channels. Although only a single MASTER PUMP 107 is shown in FIG. 21, each MASTER PUMP 107 implements an HT tunnel plus one or two non-transparent (bridged) HT links, so multiple PUMPs can be easily deployed as needed.

In a preferred embodiment, various combinations of single or multiple MASTER CPU or SMPs 100, MASTER PUMPs 107, SLAVE PUMPs 101, and HT-bridges (which are implicit in the PEERS fabrics 35 and "Blades" 40, due to the presence of PCI Express), up to the maximum number of addressable HT devices (note that, by design, the number of SLAVE CPU/SMP devices 102 is not included in this count), can be coupled together in a double-ended daisy-chain fashion. In the embodiment of FIG. 21, there are four SLAVE CPU/ SMPs 102 associated with each of the two SLAVE PUMPs 101, for a total of eight SLAVE CPUs 102. The HT connection 93 from MASTER PUMP 107 to external interface 119 (optional) is exemplary of a connection to a possibly vendor-specific and/or proprietary external interface, such as any of a family of CRAY-specific communications chips (SeaStar, SeaStar2, etc.) designed to provide high-performance communications between components of a supercomputing system. Note that the HT connection to external interface 119 (e.g., a CRAY SeaStar or some other bridged interface) could alternatively originate at either (or both) of the SLAVE PUMPs 101 rather than the MASTER PUMP 107 (any combination of "available" PUMP interfaces is feasible); it could also alternatively originate at the MASTER CPU or SMP 100 if a processor with 4 HT links is used, or an SMP comprising at least a pair of 3-link CPUs is configured (leaving at least one HT link free).

In a preferred embodiment, a MASTER CPU or SMP 100 works cooperatively and symbiotically with one or more SLAVE PUMPs 101 via its direct HT paths, for the primary purpose of implementing high-performance computing cluster using "slaved" commodity processors (e.g., the SLAVE CPU/SMP devices 102), which need not be homogeneous. Each of the SLAVE CPU/SMP devices 102 typically has (or in any case, is required to have) only a single HT link, if any (and if none, then is interfaced to a device that can supply at least one). Thus, a key aspect of the SLAVE PUMP 101 is its ability to directly interface to a multiplicity of HT devices having only singleton HT links, and to provide communications with and among them and with other devices in the system as authorized, without requiring the attached devices to have multiple HT links of their own (which is normally required for HT-based multiprocessor communication).

In a preferred embodiment, the SLAVE PUMPs 101 implement external interfaces comprising a 16-bit HT tunnel pair, and at least five 16-bit non-transparent bridged HT device ports (which can either be internally switched, such as with a crossbar switch, or implemented internally as a set of connected HT tunnels, where each non-transparent HT device is simply an HT bridge with a tunnel, and the tunnels are connected in series). In addition to the bridged HT device ports, the SLAVE PUMP 101 also implements an HT cave with its own functionality comprising logic, internal local memory, and input/output queues, all operating under the auspices of the cooperative pairing of MASTER CPU or SMP 100 and MASTER PUMP 107.

In a preferred embodiment, at least four of the five 16-bit non-transparent bridged HT device ports can be alternatively implemented as eight 8-bit non-transparent bridged HT device ports. In a preferred embodiment, any internal HT tunnels and paths within the SLAVE PUMPs 101 are of maximum width (as of this writing, the HT standard specifies a maximum width of 32 bits).

In a preferred embodiment, the MASTER PUMP 107 implements external interfaces comprising a 16-bit HT tunnel pair, and at least one 16-bit bridged HT device port that can be configured as either a transparent or non-transparent bridge, depending on the intended use. In addition to the bridged HT device port, the MASTER PUMP 107 also implements an HT cave with its own functionality comprising logic, internal local memory, external local memory, and input/output queues, all operating under the auspices of its cooperative pairing with the MASTER CPU or SMP 100.

In a preferred embodiment, its adaptive transparent/non-transparent bridged HT device port can be alternatively implemented as two 8-bit adaptive transparent/non-transparent bridged HT device ports. In a preferred embodiment, any internal HT tunnels and paths within the MASTER PUMP 107 are of maximum width (as of this writing, the HT standard specifies a maximum width of 32 bits).

Figure 22:
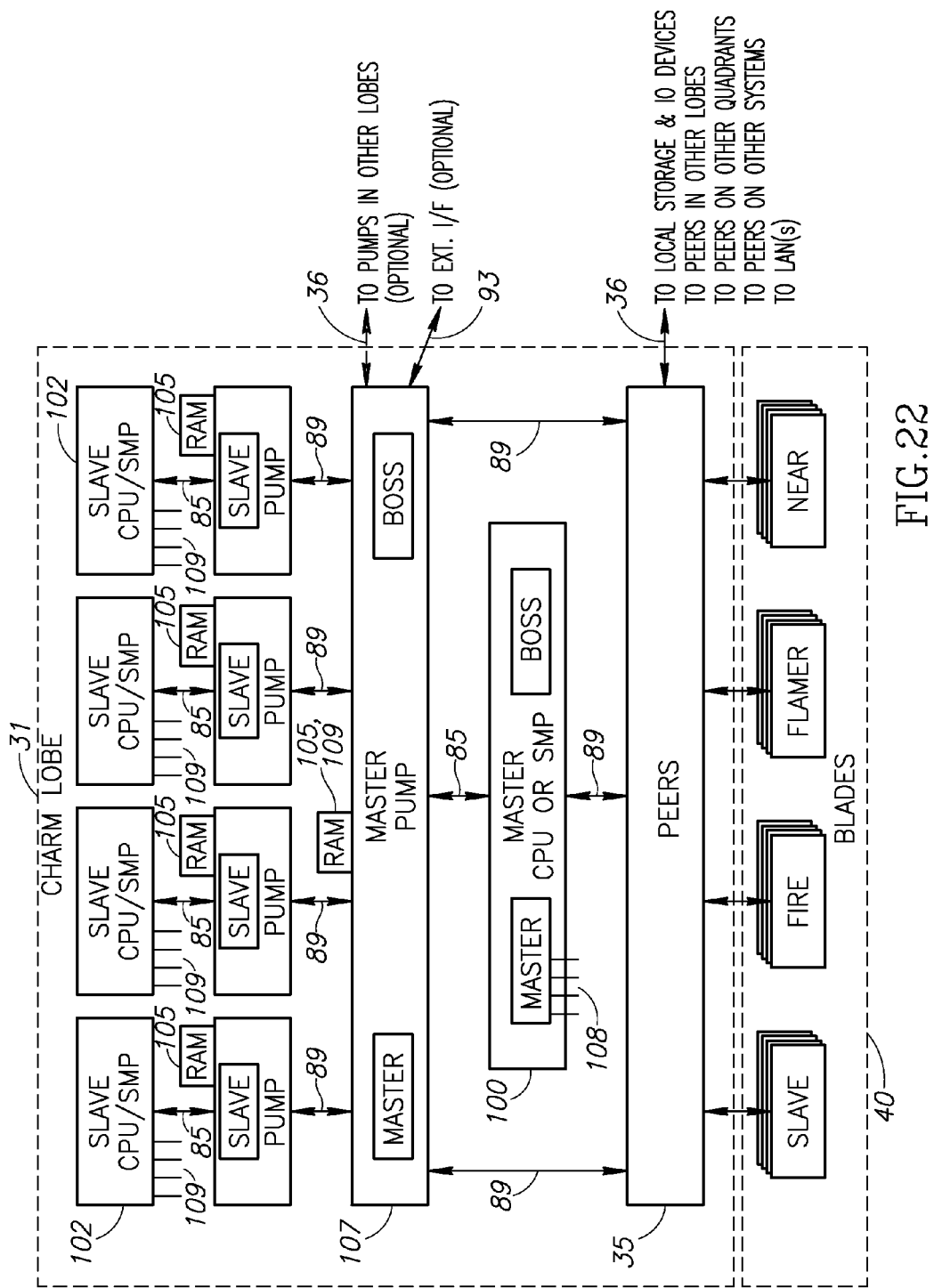
FIG. 22. SCRAM "Lobe"—Conceptual Interaction Diagram #2

Refer to FIG. 22. SCRAM "Lobe"—Conceptual Interaction Diagram #2

In an alternative embodiment (relative to that depicted in Conceptual Interaction Diagram #1), the BOSS/PUMP and MASTER/PUMP pairings are implemented via a single CPU 100 handling the BOSS & MASTER functionality, and a single FPGA or Structured ASIC 107 handling both their respective PUMP functionalities. The SLAVE/PUMP pairings are each implemented via a single CPU 102 handling the SLAVE functionality and a single FPGA or Structured ASIC 101 handling the corresponding PUMP functionality. In the embodiment of FIG. 22, each SLAVE PUMP 101 has ultra-low-power, multi-channel memory 105 (local to itself), and each SLAVE CPU/SMP 102 is associated with its own SLAVE PUMP 101. The MASTER PUMP 107 has ultra-low-power multi-channel bulk non-volatile memory 105 (local to the MASTER PUMP). The multi-channel memory controllers of all the SLAVE CPU/SMPs 102 "belong" to the PUMP (the MASTER PUMP 107 delegates to the SLAVE PUMPs 101), which allocate capacity and bandwidth between local (CPU) memory and PUMP memory.

Figure 23:
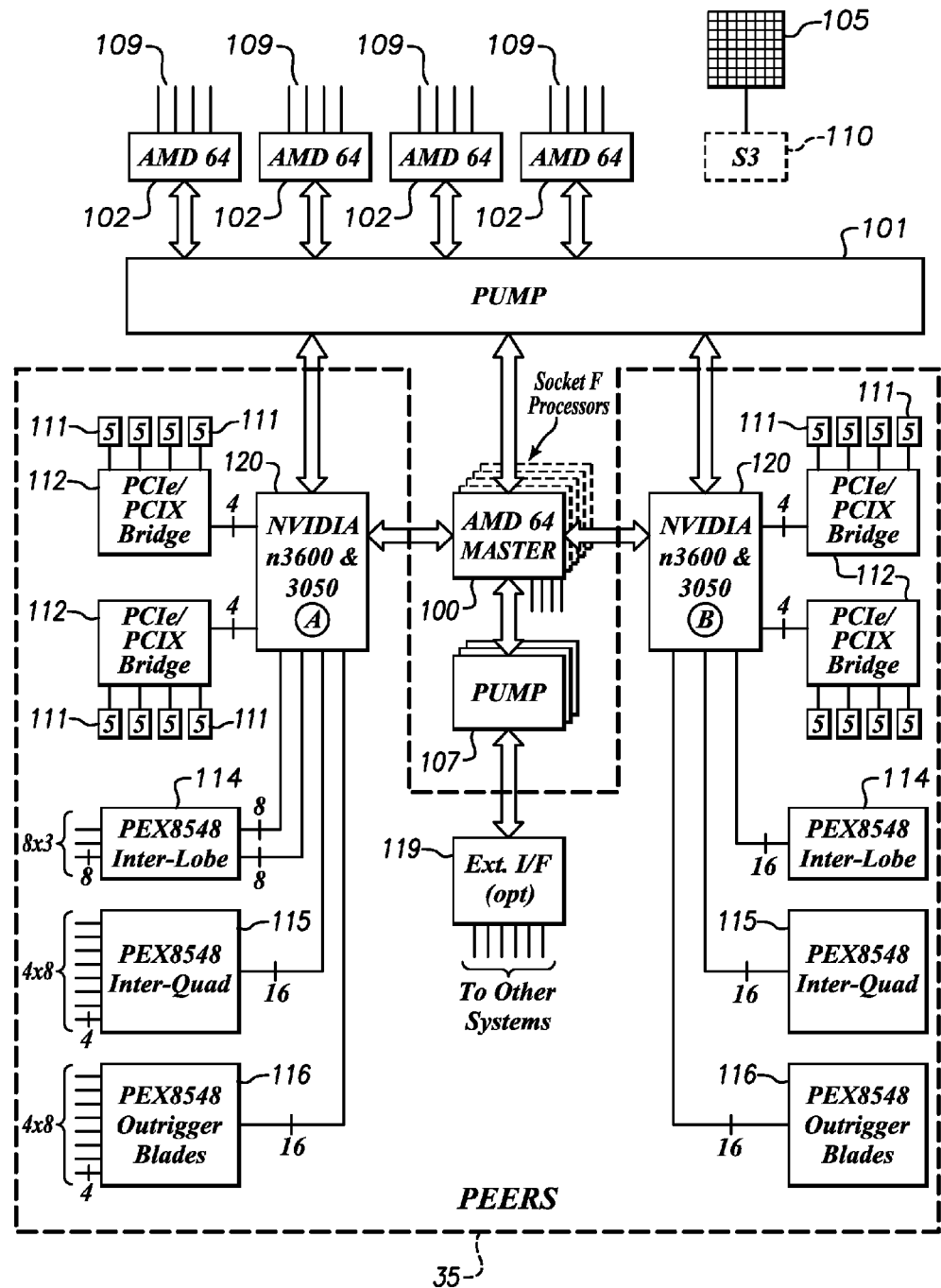
FIG. 23. CHARM Lobe—Alternate Embodiment with NVIDIA n3600 & 3050

Refer to FIG. 23. CHARM Lobe—Alternate Embodiment with NVIDIA n3600 & 3050

Figure 24:
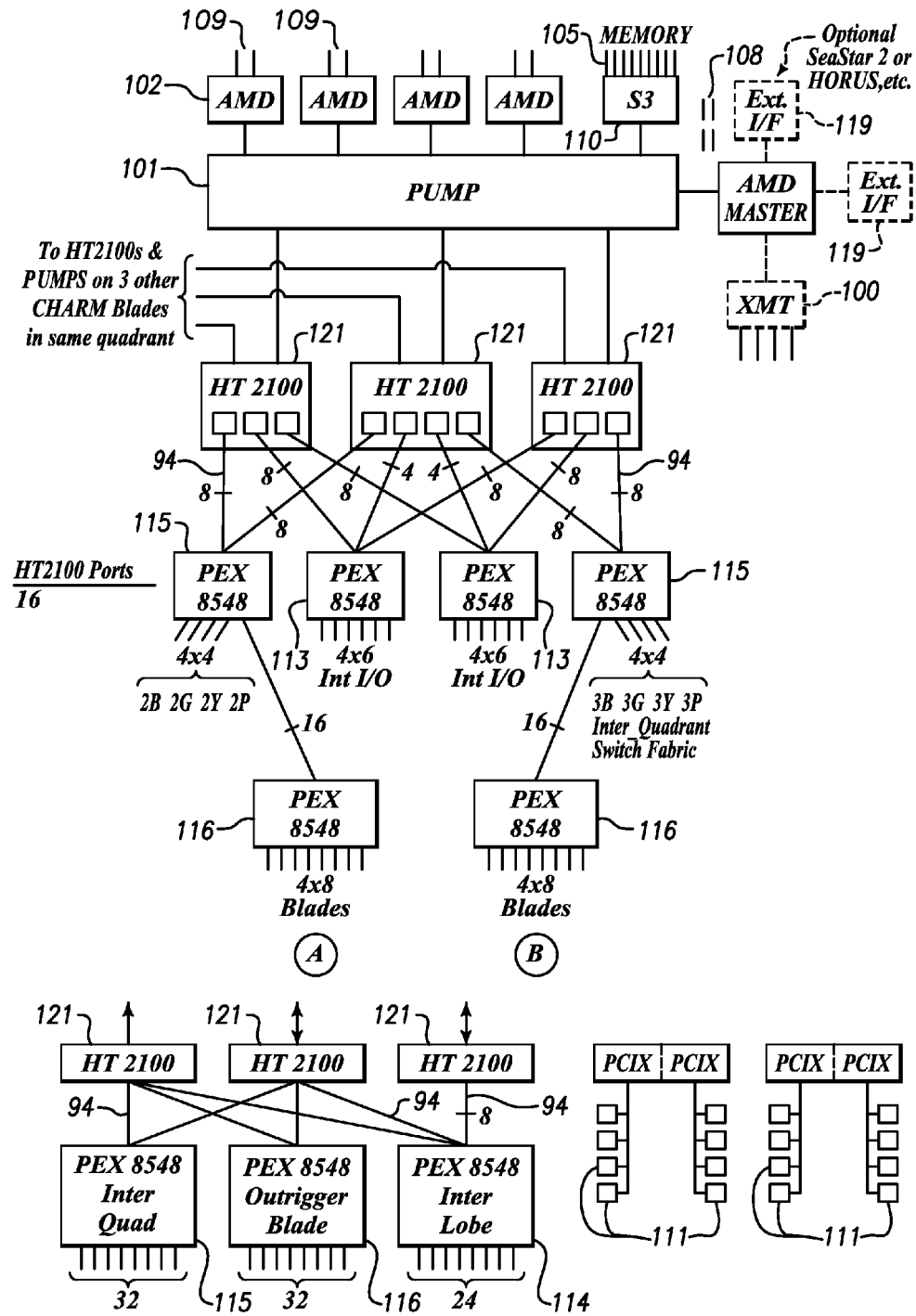
FIG. 24. CHARM Lobe—Alternate Embodiment with Broadcom HT2100

Refer to FIG. 24. CHARM Lobe—Alternate Embodiment with Broadcom HT2100

Figure 25B:
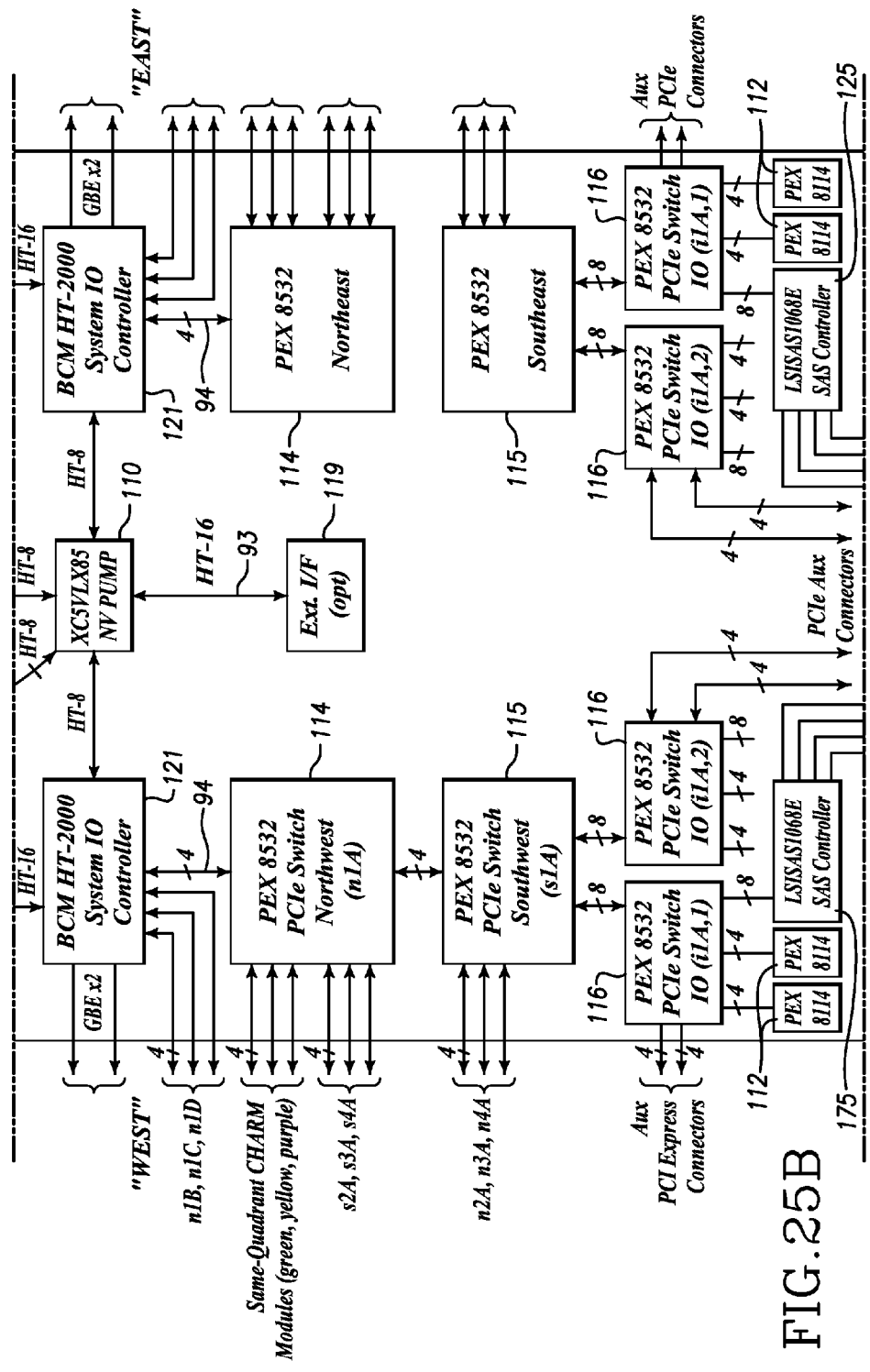
FIGS. 25A & B. CHARM Lobe—Alternate Embodiment with Broadcom HT2000 & Xilinx XC5VLX110 Main PUMP & Octoplexers FIGS. 26A, B, & C, CHARM Lobe—Alternate Embodiment with Broadcom HT2000 & Xilinx XC5VLX85 NV PUMP FIGS. 27A & B. CHARM Lobe—Alternate Embodiment with Broadcom HT2000 & ClearSpeed CSX6000 Chain FIG. 28. CHARM Lobe—Alternate Embodiment with Broadcom HT2000-Conceptual-Main PUMP with Gang of 3 Aux PUMPs, 6 Octoplexers FIG. 29. CHARM Lobe—Alternate Embodiment with Aux PUMP Daughterboards in Board Hierarchy FIG. 30. CHARM Lobe—Alternate Embodiment with Aux PUMP Daughterboards & ClearSpeed CSX6000 Chain FIG. 31. CHARM Lobe—Alternate Embodiment with MASTER PUMP & 4 SLAVE PUMPs with 1+SLAVE Each FIG. 32. CHARM Lobe—Alternate Embodiment with MASTER PUMPs & SLAVE PUMPs with 4 SLAVEs Each FIG. 33. CHARM Lobe—Alternate Embodiment with ULI M1695—#1
Figure 26B:
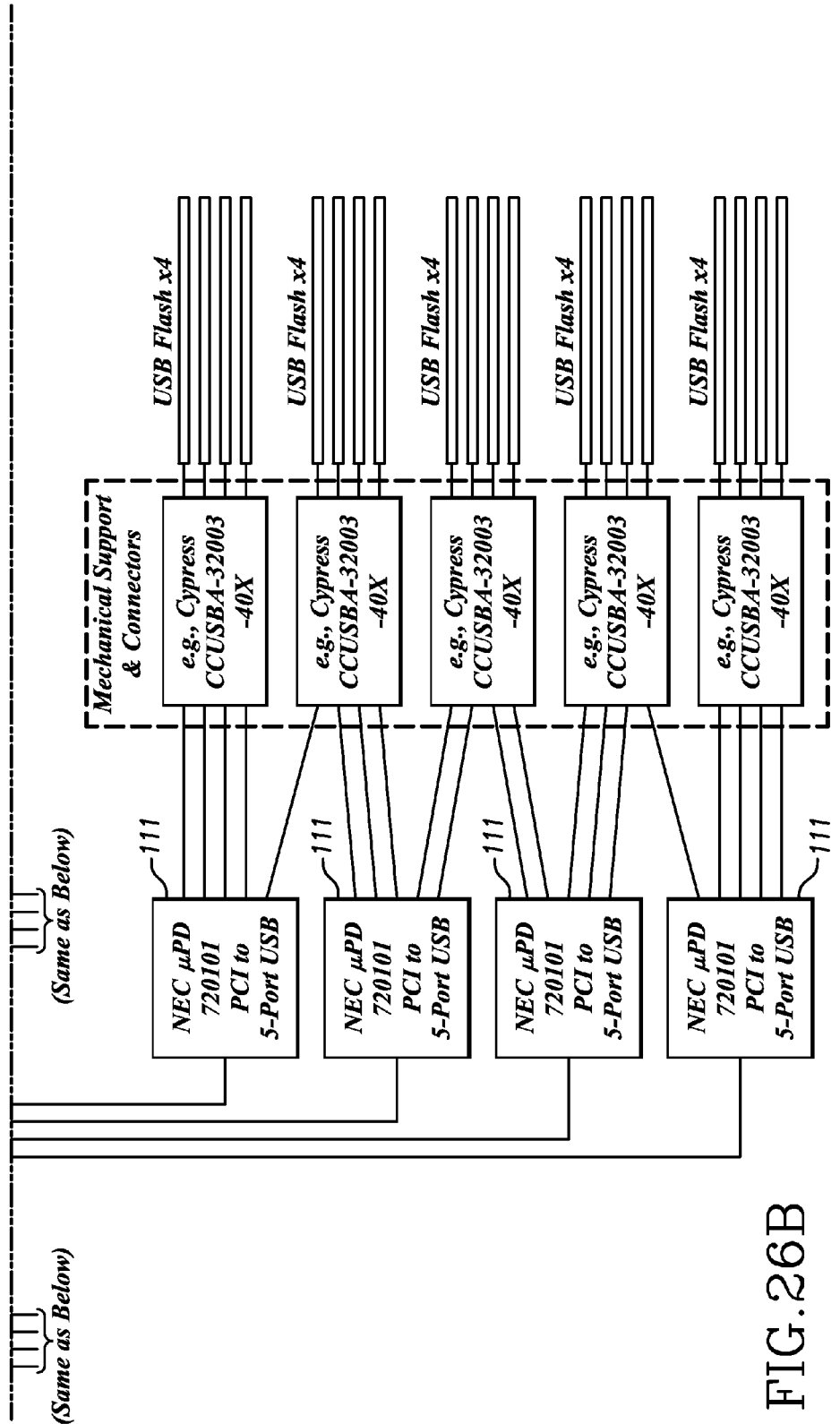
Figure 26C:
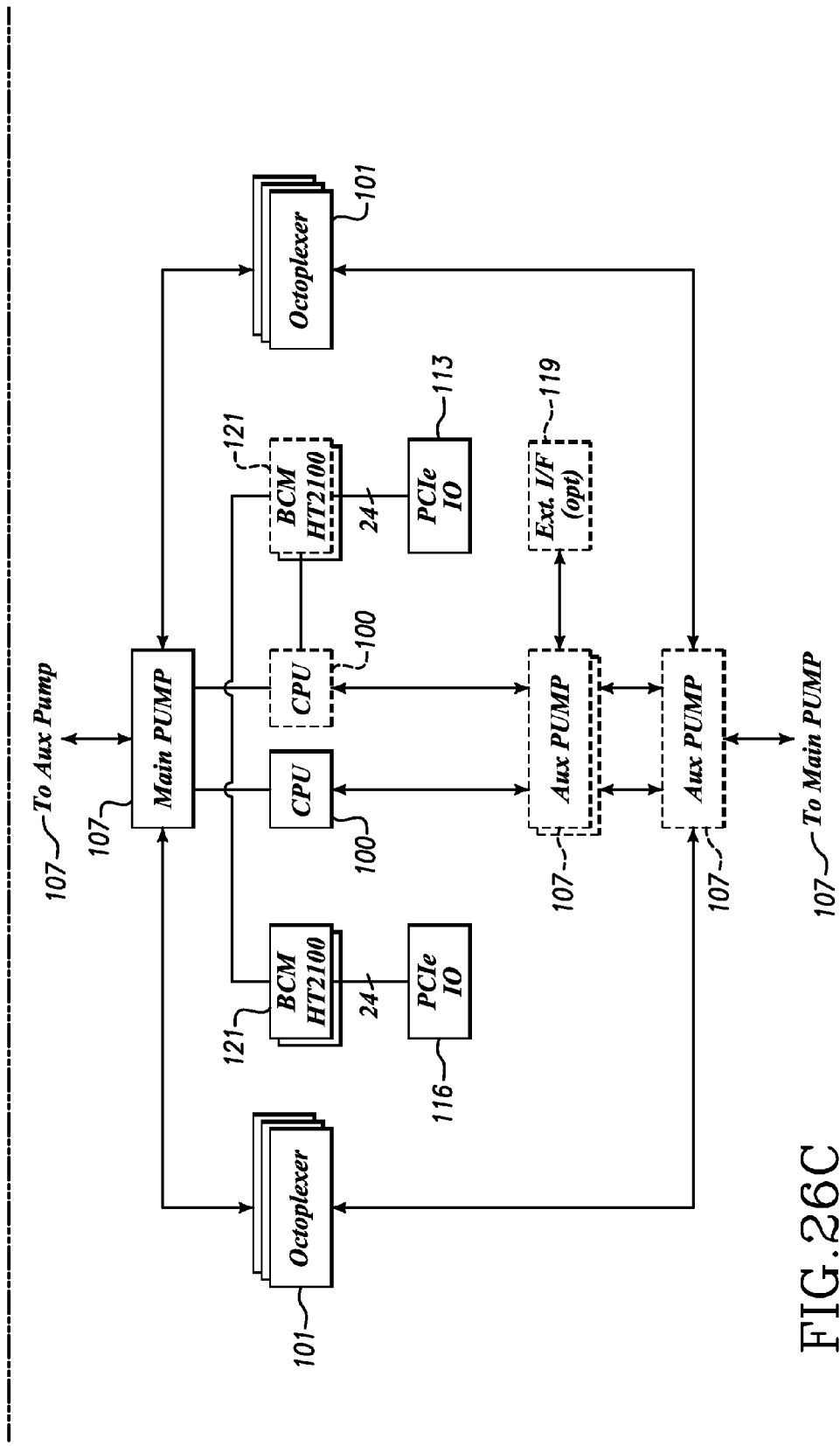
Figure 27:
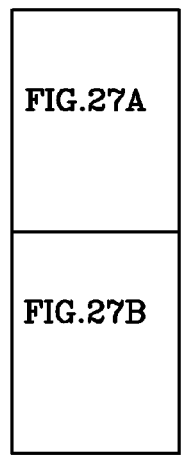
Figure 27A:
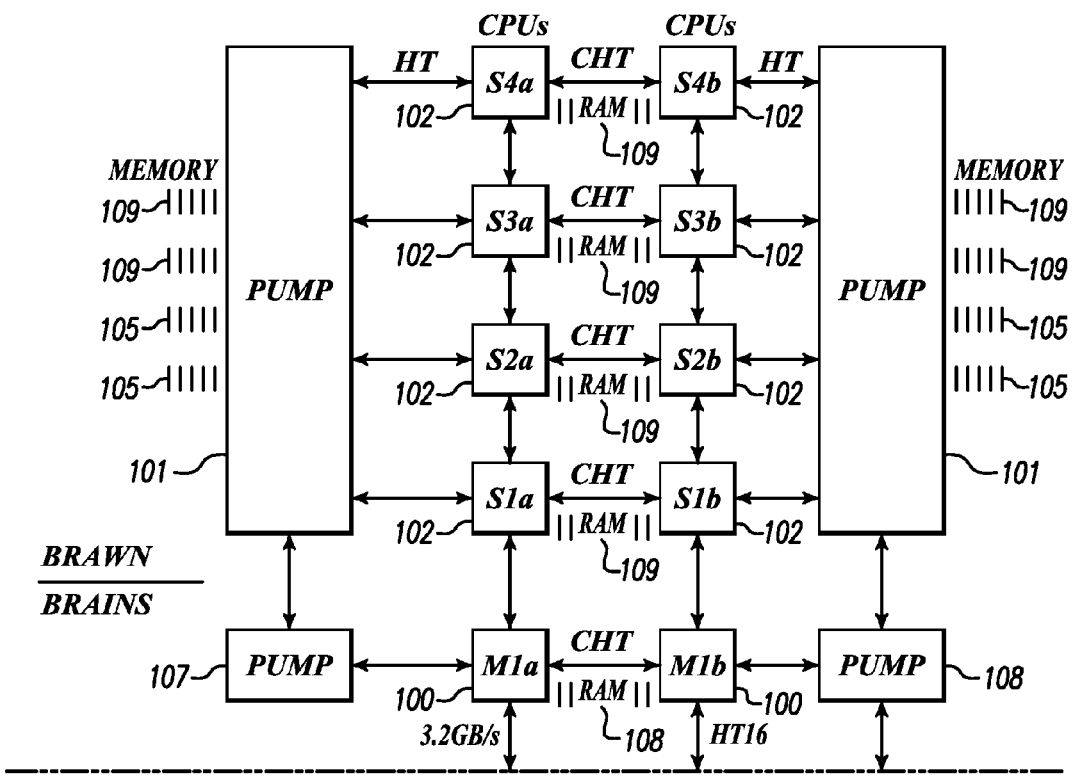
Figure 28:
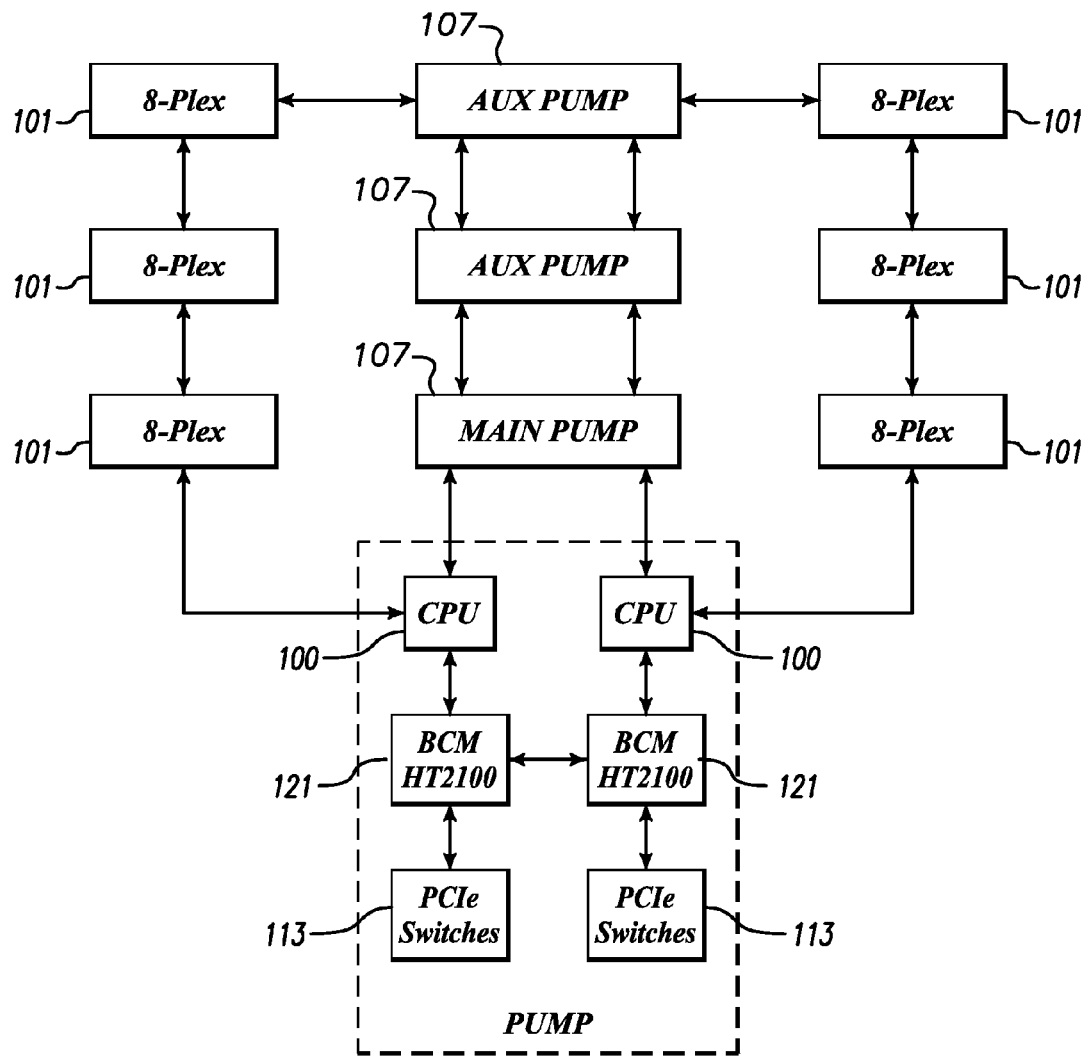
Figure 29:
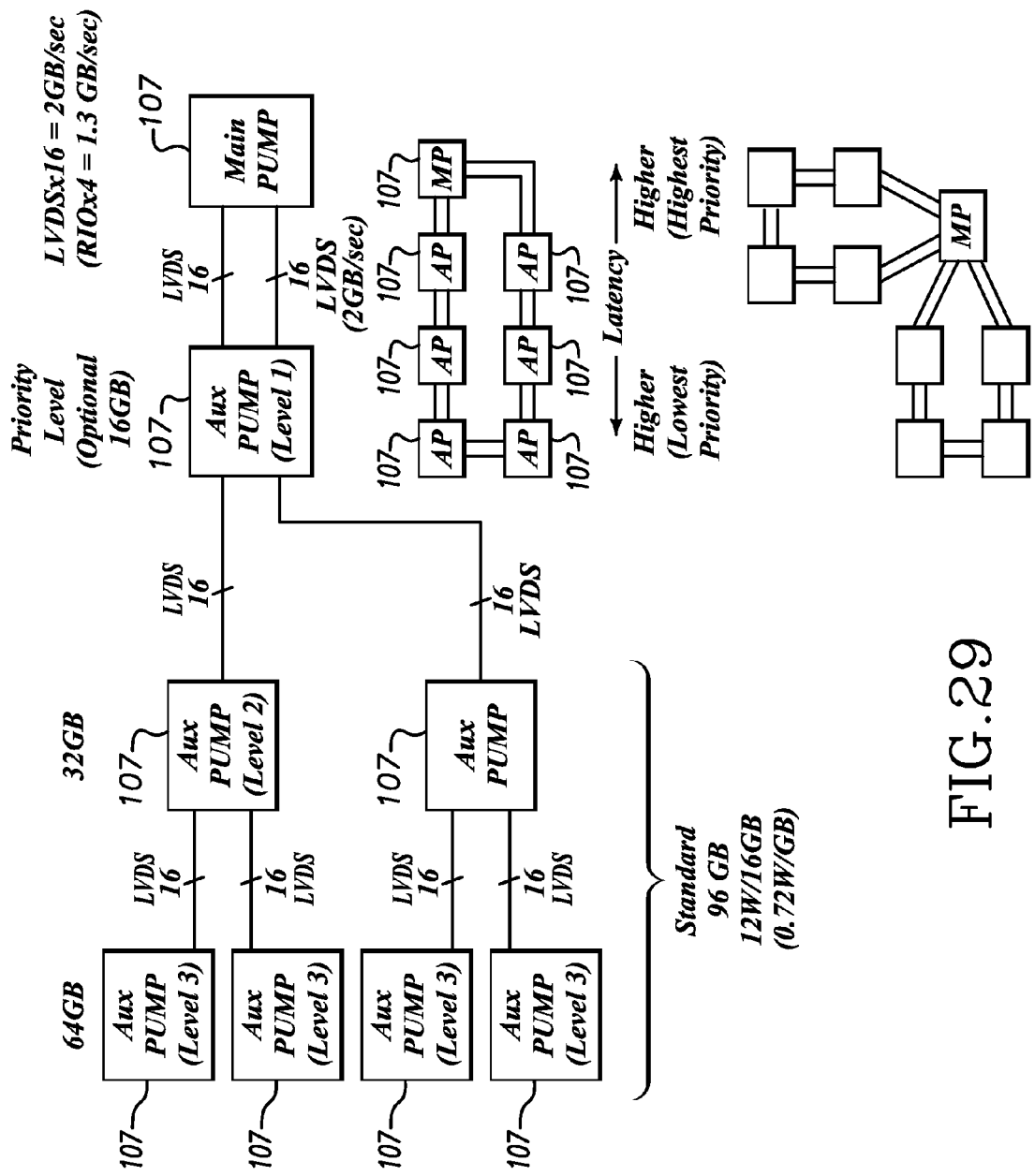
Figure 30:
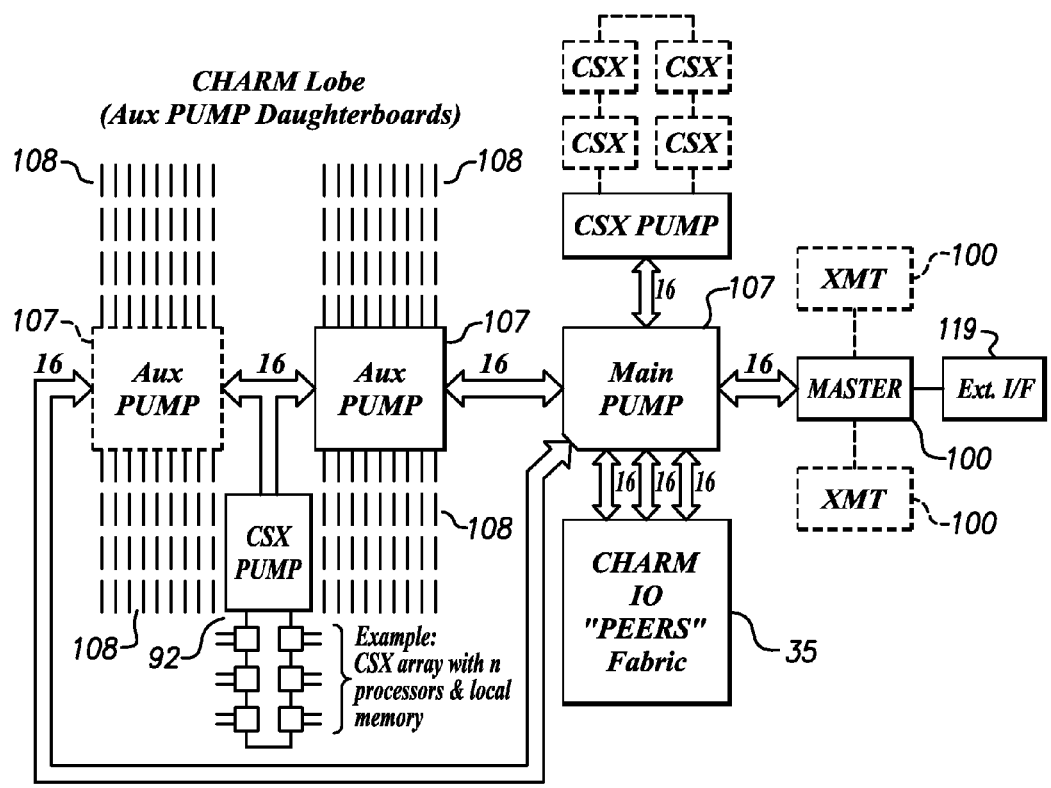
Figure 32:
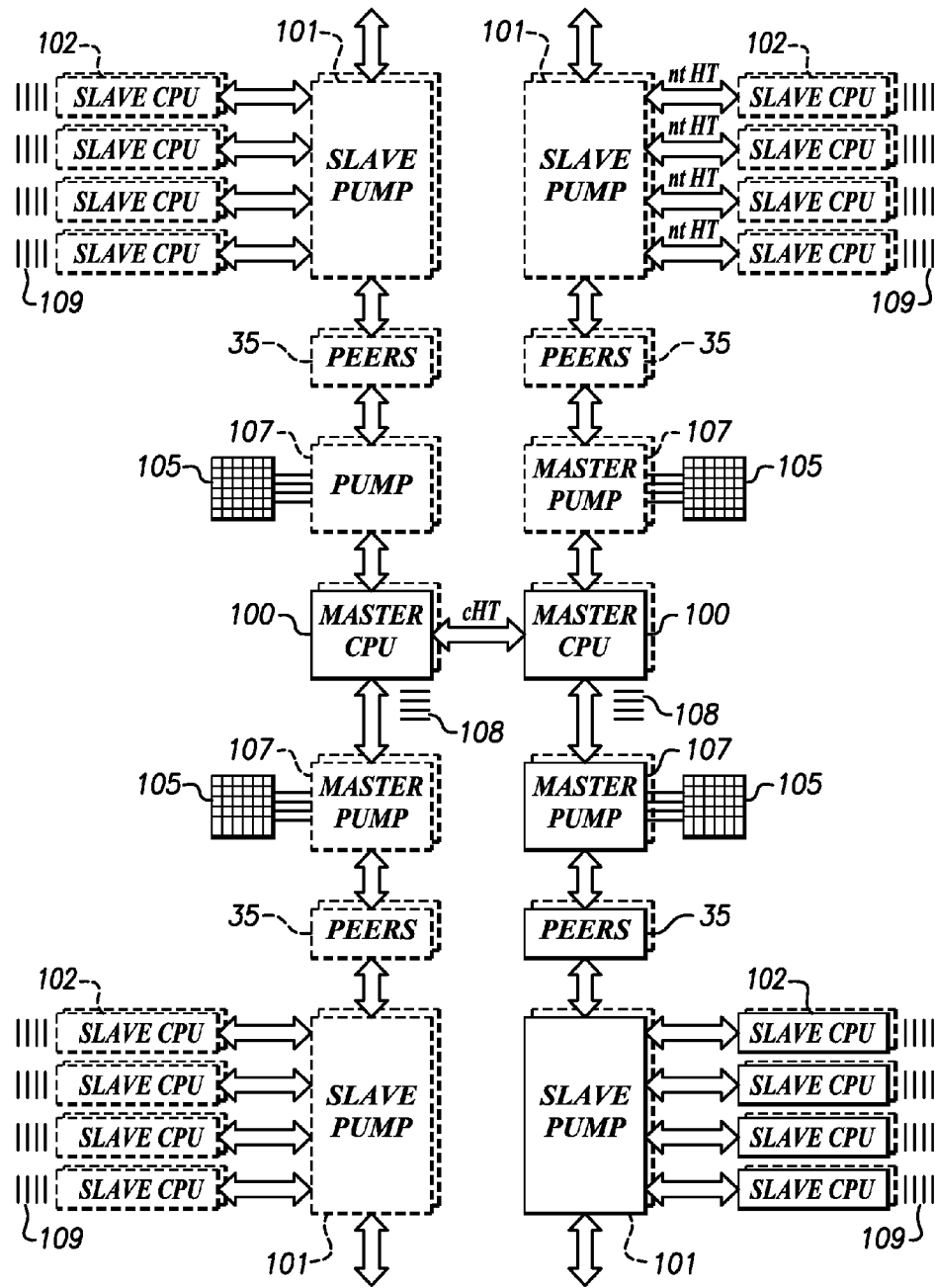
Figure 33:
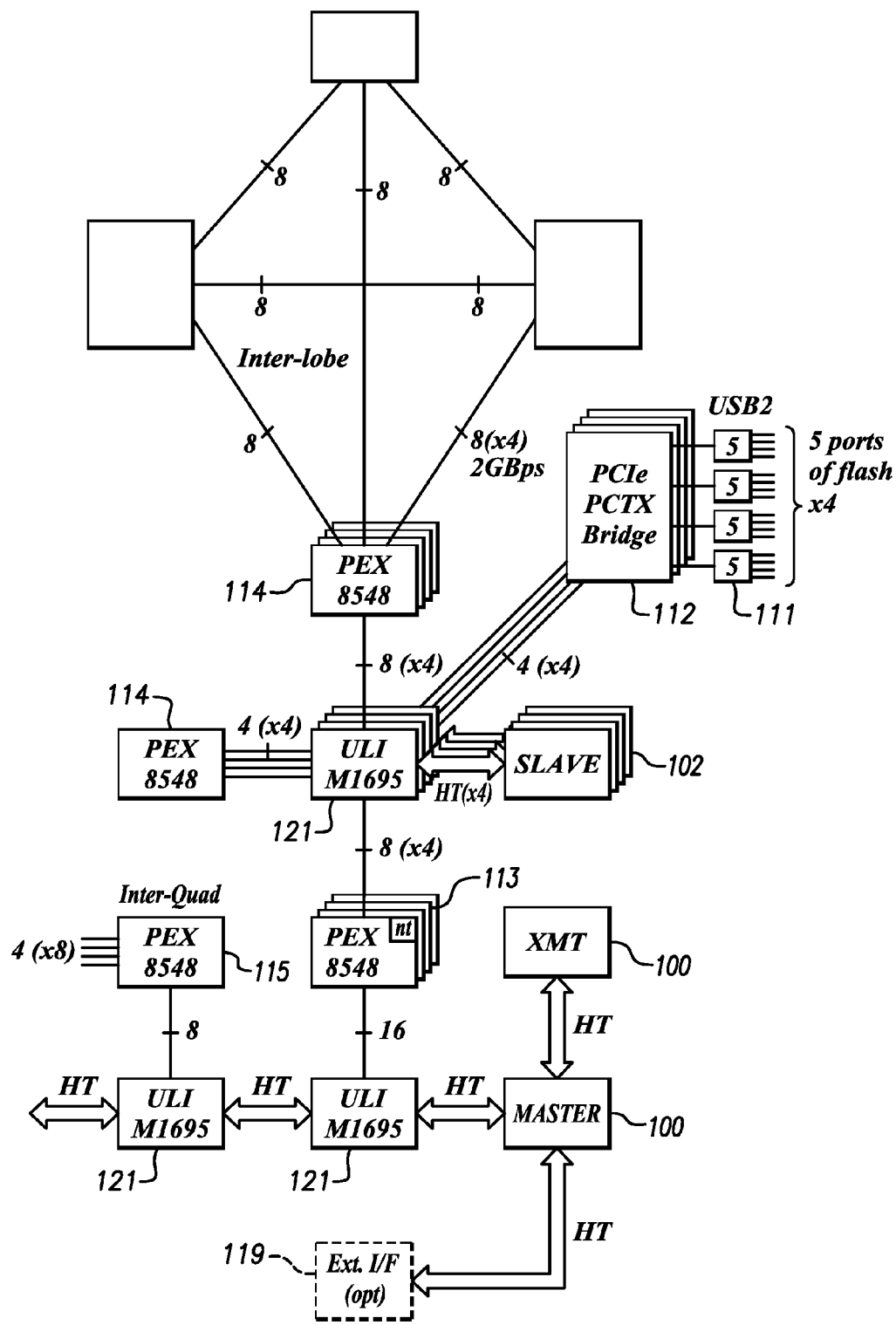

Refer to FIGS. 25A & B. CHARM Lobe—Alternate Embodiment with Broadcom HT2000 & Xilinx XC5VLX110 Main PUMP & Octoplexers Refer to FIGS. 26A, B, & C, CHARM Lobe—Alternate Embodiment with Broadcom HT2000 & Xilinx XC5VLX85 NV PUMP Refer to FIGS. 27A & B. CHARM Lobe—Alternate Embodiment with Broadcom HT2000 & ClearSpeed CSX6000 Chain Refer to FIG. 28. CHARM Lobe—Alternate Embodiment with Broadcom HT2000—Conceptual—Main PUMP with Gang of 3 Aux PUMPs, 6 Octoplexers Refer to FIG. 29. CHARM Lobe—Alternate Embodiment with Aux PUMP Daughterboards in Board Hierarchy Refer to FIG. 30. CHARM Lobe—Alternate Embodiment with Aux PUMP Daughterboards & ClearSpeed CSX6000 Chain Refer to FIG. 31. CHARM Lobe—Alternate Embodiment with MASTER PUMP & 4 SLAVE PUMPs with 1+SLAVE Each Refer to FIG. 32. CHARM Lobe—Alternate Embodiment with MASTER PUMPs & SLAVE PUMPs with 4 SLAVEs Each Refer to FIG. 33. CHARM Lobe—Alternate Embodiment with ULI M1695—#1

Figure 34:
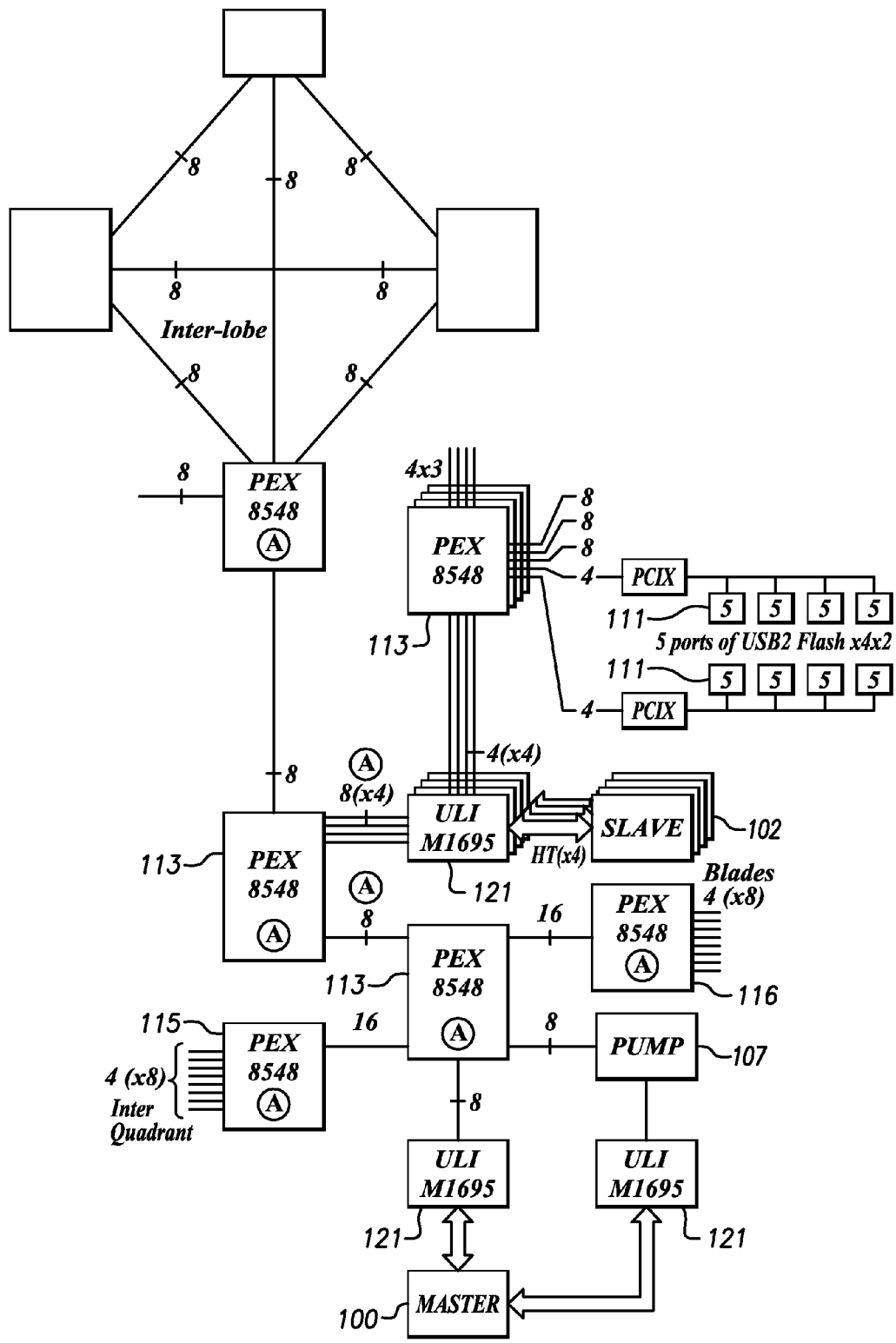
FIG. 34. CHARM Lobe—Alternate Embodiment with ULI M1695—#2

Refer to FIG. 34. CHARM Lobe—Alternate Embodiment with ULI M1695—#2

Figure 35B:
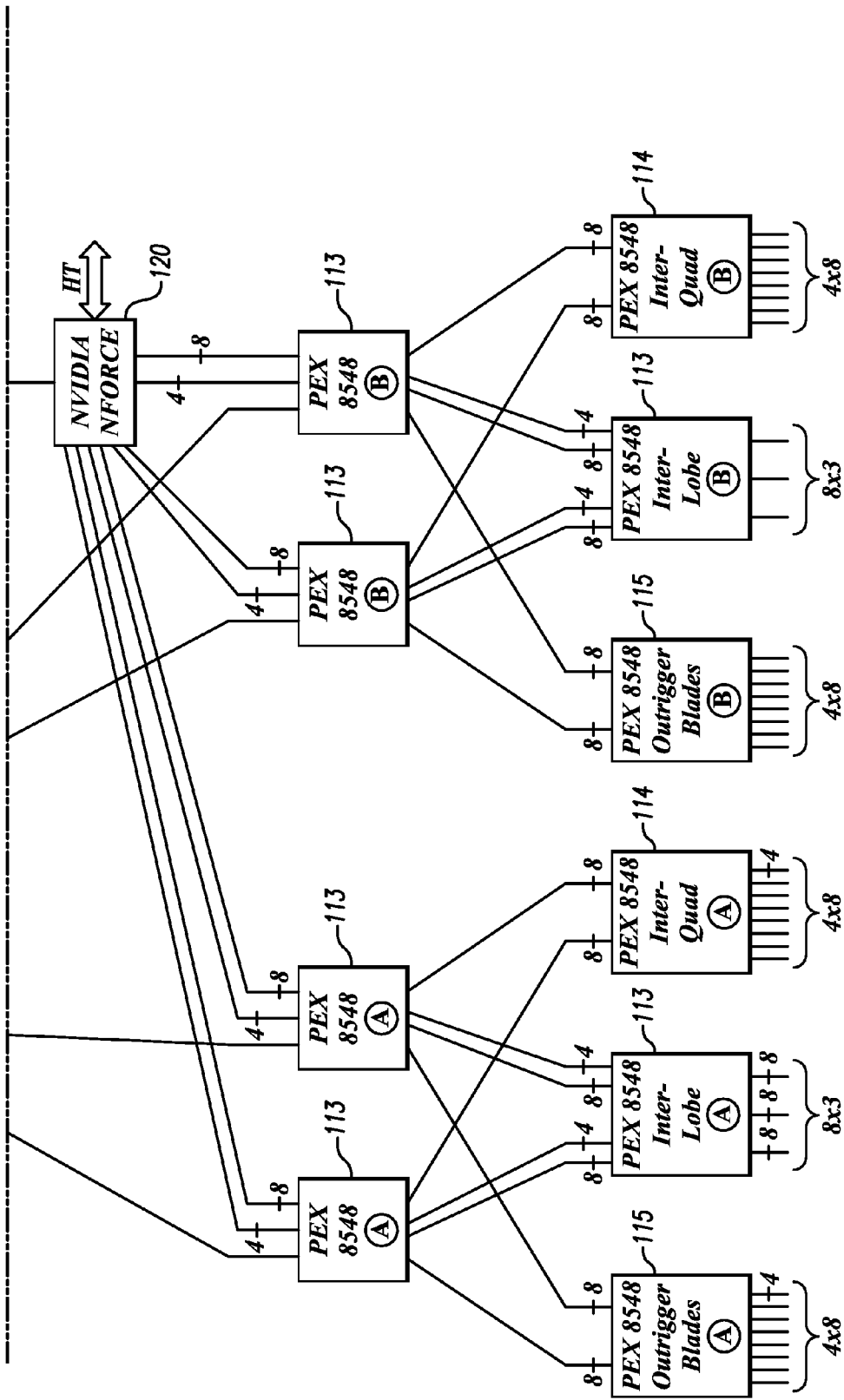
FIGS. 35A & B. CHARM Lobe—Alt. Embodiment with ULI M1695—#3

Refer to FIGS. 35A & B. CHARM Lobe—Alternate Embodiment with ULI M1695—#3

Figure 36:
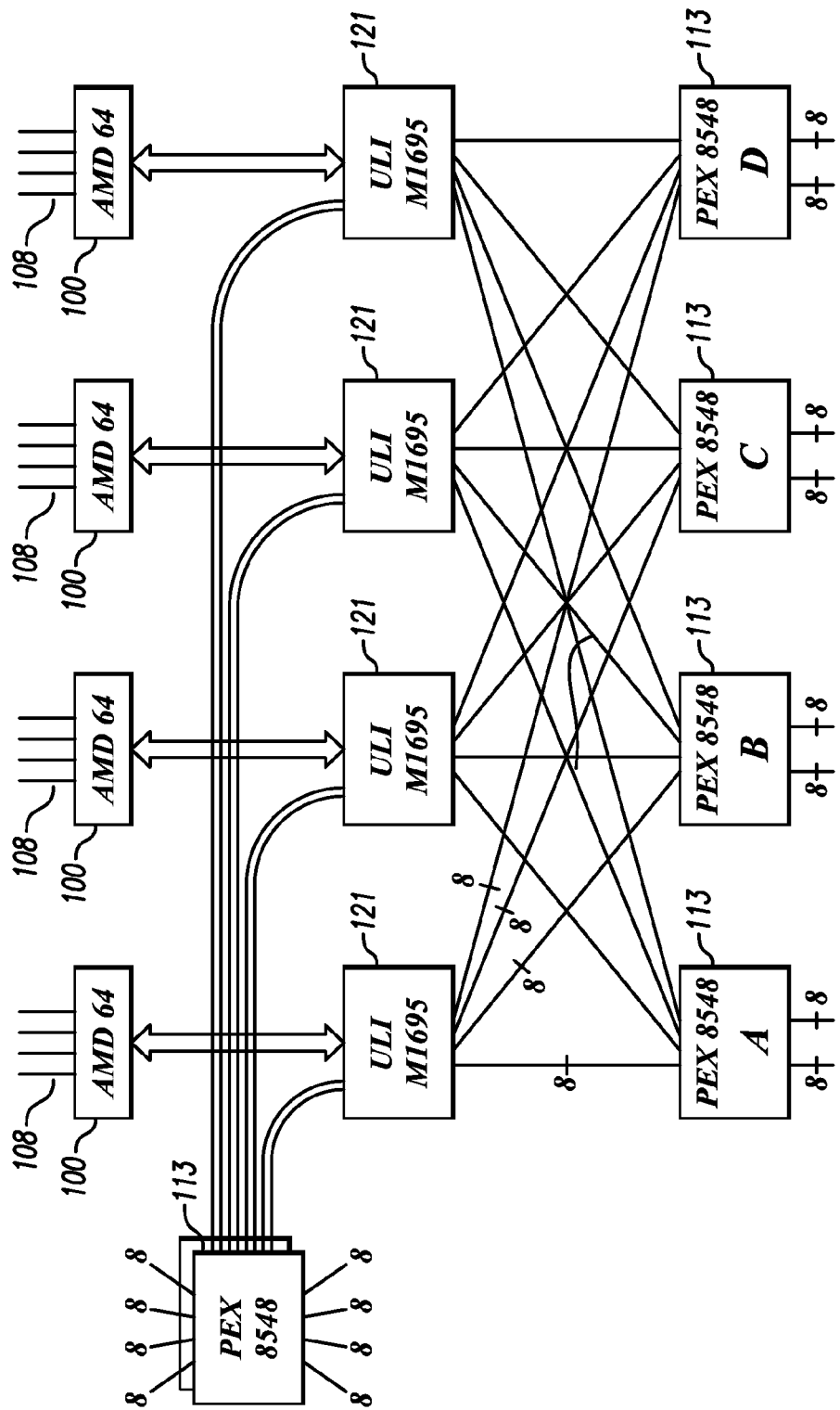
FIG. 36. CHARM Lobe—Alternate Embodiment with ULI M1695—#4

Refer to FIG. 36. CHARM Lobe—Alternate Embodiment with ULI M1695—#4

Figure 37B:
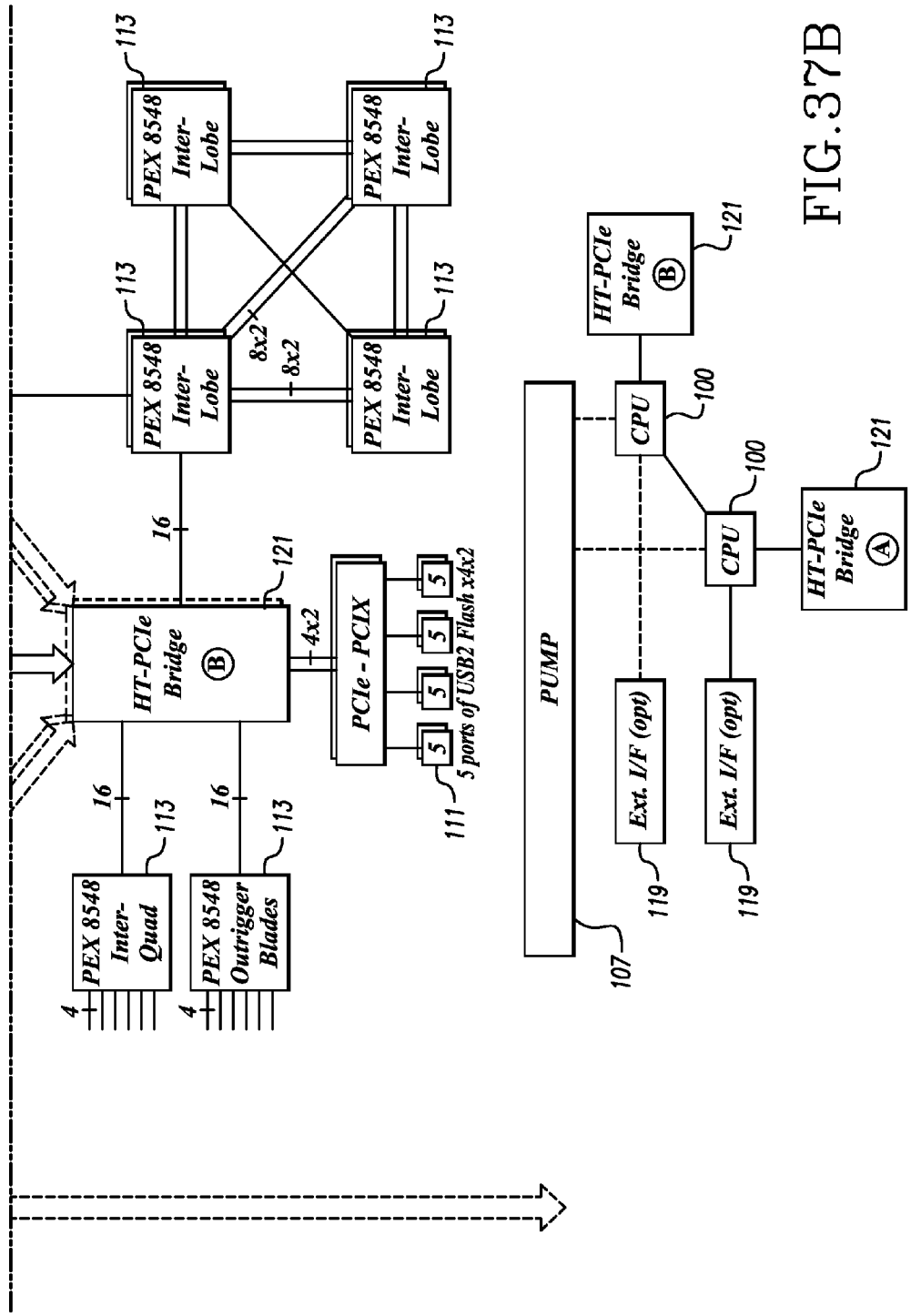
FIGS. 37A & B CHARM Lobe—Alternate Embodiment with Unspecified HT-to-PCIe Bridge FIG. 38. CHARM Lobe—Alternate Embodiment with VIA (PCIe-centric)
Figure 38:
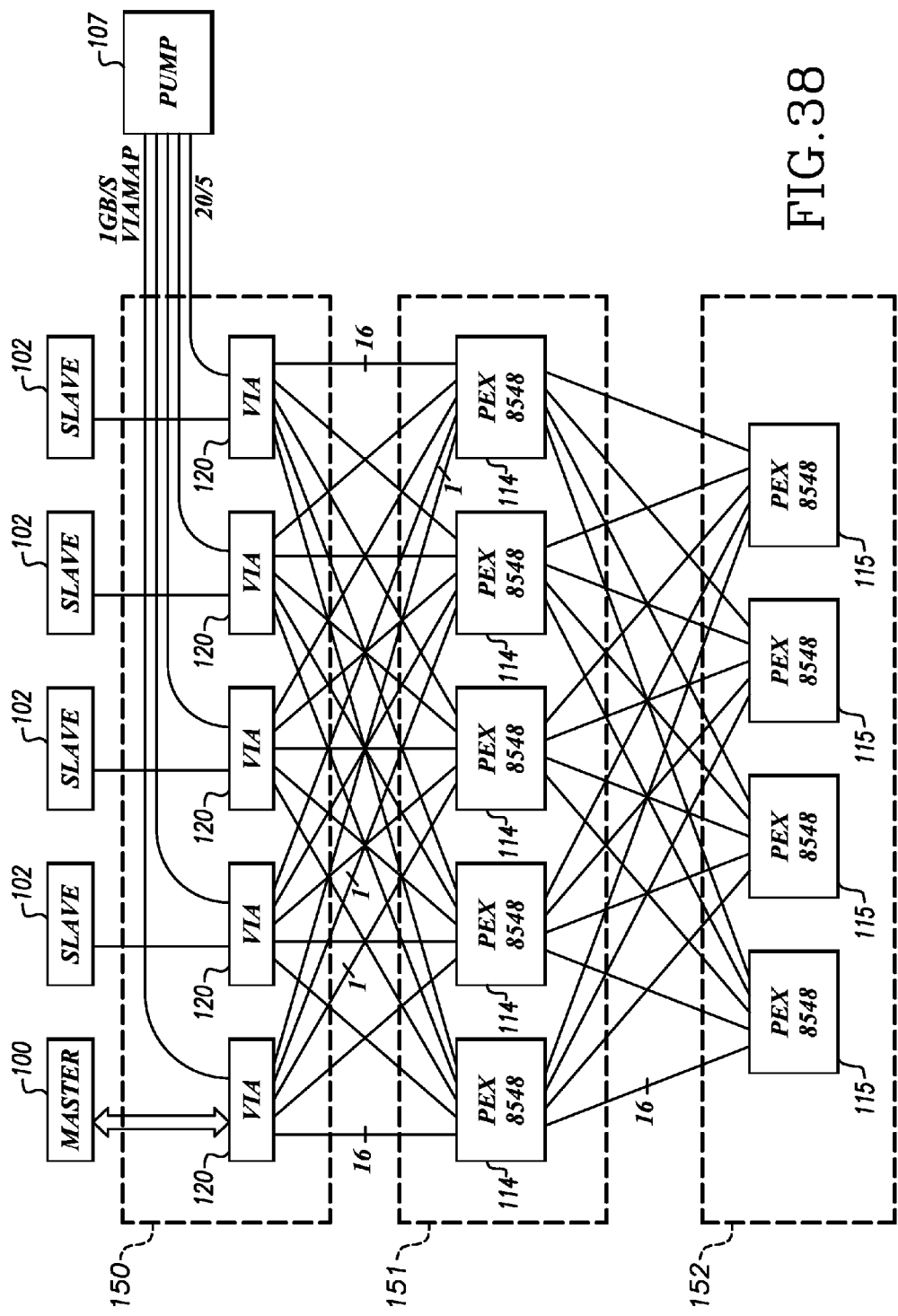

Refer to FIGS. 37A & B CHARM Lobe—Alternate Embodiment with Unspecified HT-to-PCIe Bridge Refer to FIG. 38. CHARM Lobe—Alternate Embodiment with VIA (PCIe-centric)

Figure 39:
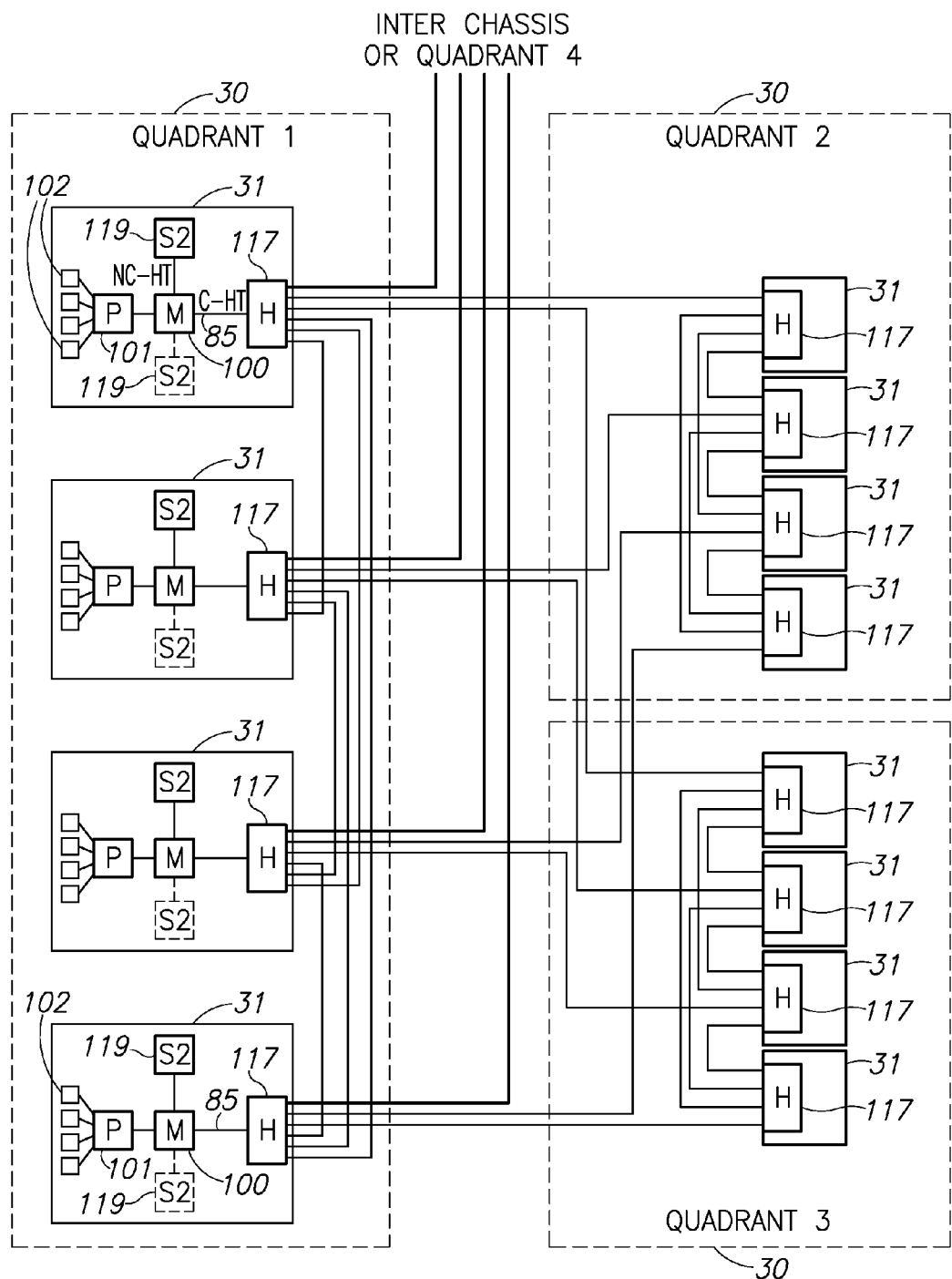
FIG. 39. CHARM Lobe—Alternate Embodiment with HORUS (ExtendiScale) & Cray Seastar2 External I/F FIG. 40. CHARM Lobe—Preferred Embodiment—Interfaces to Outrigger Blades FIG. 41. CHARM Module Primary Memory Interfaces (Alternate Embodiment)
Figure 40:
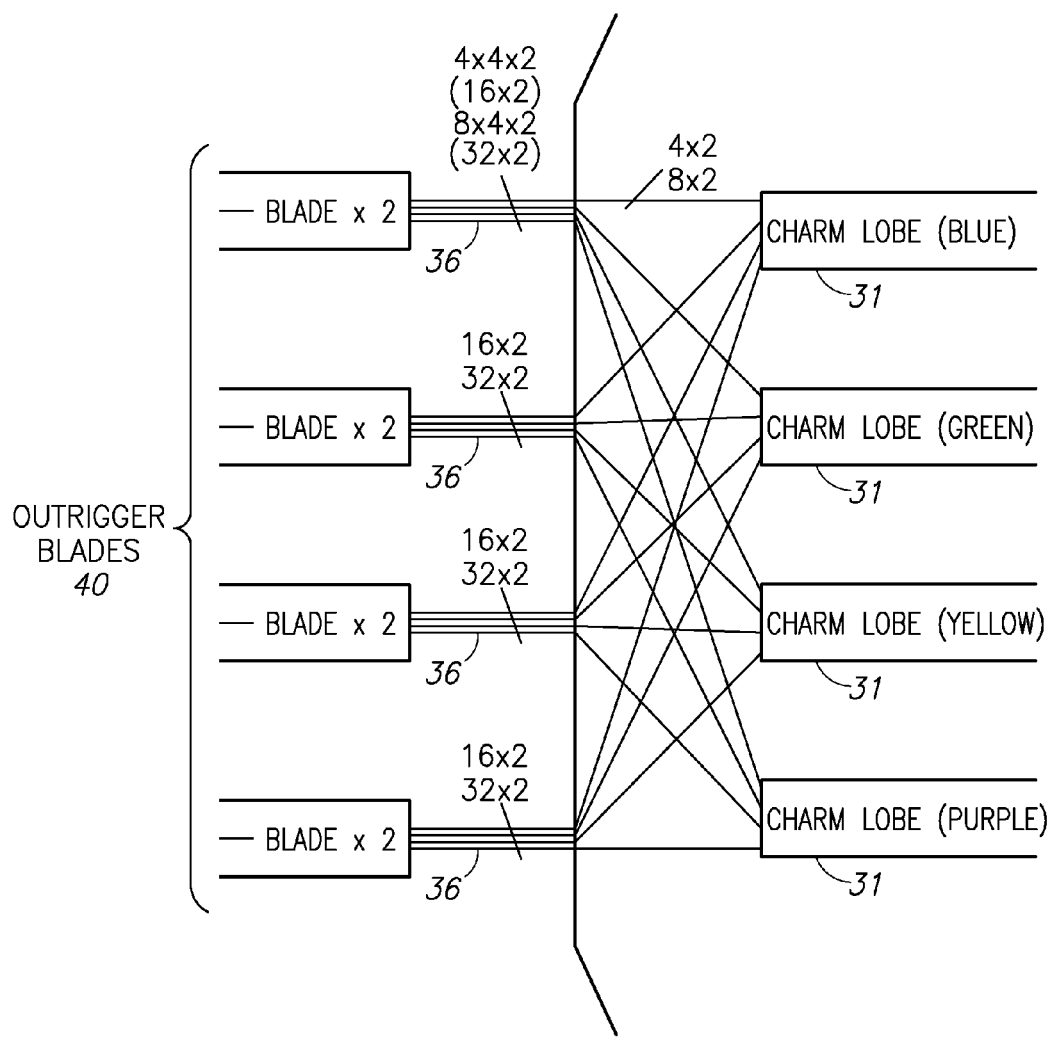

Refer to FIG. 39. CHARM Lobe—Alternate Embodiment with HORUS (ExtendiScale) & Cray Seastar2 External I/F Refer to FIG. 40. CHARM Lobe—Preferred Embodiment—Interfaces to Outrigger Blades FIGS. 23 through 40 use the same device and interface numbering scheme as the earlier figures to teach alternate embodiments of CHARM Lobe 31. PUMP devices 101 and 107 are preferably implemented with structured ASICs (90% power reduction over FPGAs, and lower cost per pin). The MASTER CPU 100 embodiments depicted with multiple HT links are preferably implemented with a fast, multicore CPU (e.g., AMD Opteron; in an AMD "Torrenza" configuration, an Opteron CPU may be replaced with an alternative compatible processor). SLAVE CPU/SMPs 102 are preferably implemented with multicore CPUs (e.g., commodity "high-end" gaming or specialty processor; in a preferred embodiment the CPU 102 is fast and possibly targeted for "gamers'" personal computers rather than servers, and might have only one HT link 85, therefore making it cheaper). Any CPU-native interface link is okay (including non-HT), since the SLAVE PUMP 101's interface 85 with the SLAVE CPU 102 can be adapted.

Figure 31:
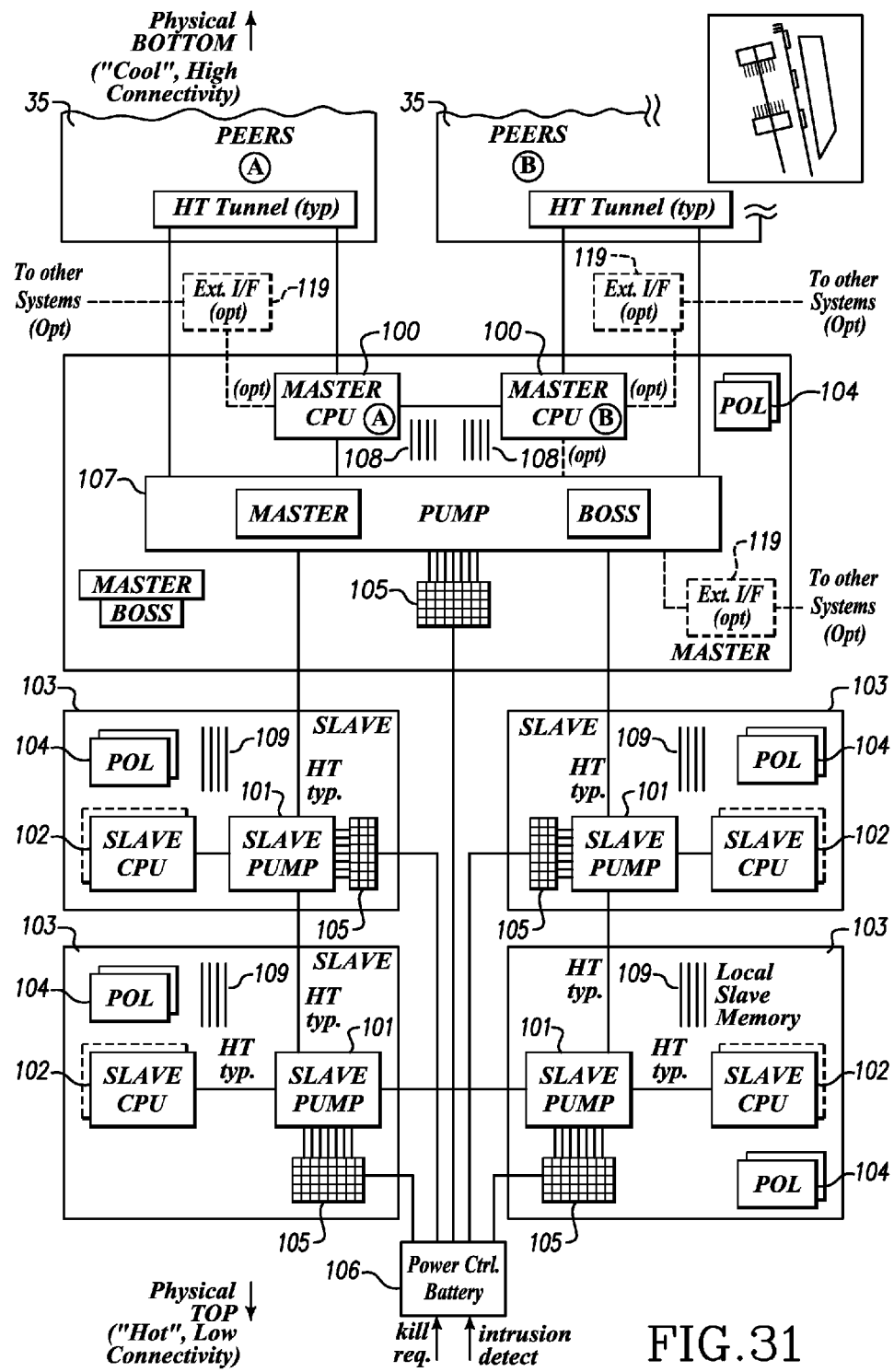

In the particular embodiment of FIG. 31, the CHARM Lobe includes four SLAVE modules 103. Each SLAVE module 103 has one SLAVE PUMP 101 and at least one SLAVE CPU 102 or accelerator with at least two local DRAM channels 109 (comprising COTS SECDED or Chipkill ECC memory DIMMs, typically 4 of them) on the CPU 102 and two ultra-low-power NVRAM channels 105 (comprising a non-COTS CHARM array of F-RAM/MRAM and BB-DRAM, typically) on the PUMP 101. An example F-RAM/MRAM configuration comprises a minimum of 18 F-RAM and/or MRAM devices (two channels at a minimum of 9 devices per channel if SECDED ECC is used). An example BB-DRAM configuration based on 8 GB increments with orthogonal ECC uses 72-device multiples of 128 MB mobile SDRAM. In the embodiment of FIG. 31, the MASTER module and SLAVE modules 103 each have dual-redundant point-of-load (POL) DC power supplies 104, typically from a −48 VDC (nominal) source. The memory power control (106) and battery may be incorporated in the lobe or off-board, but the DRAM array of each SLAVE module 104 is individually switchable, with the ability to "zap" or "kill all" memory devices and/or content on demand, for security.

Figure 41:
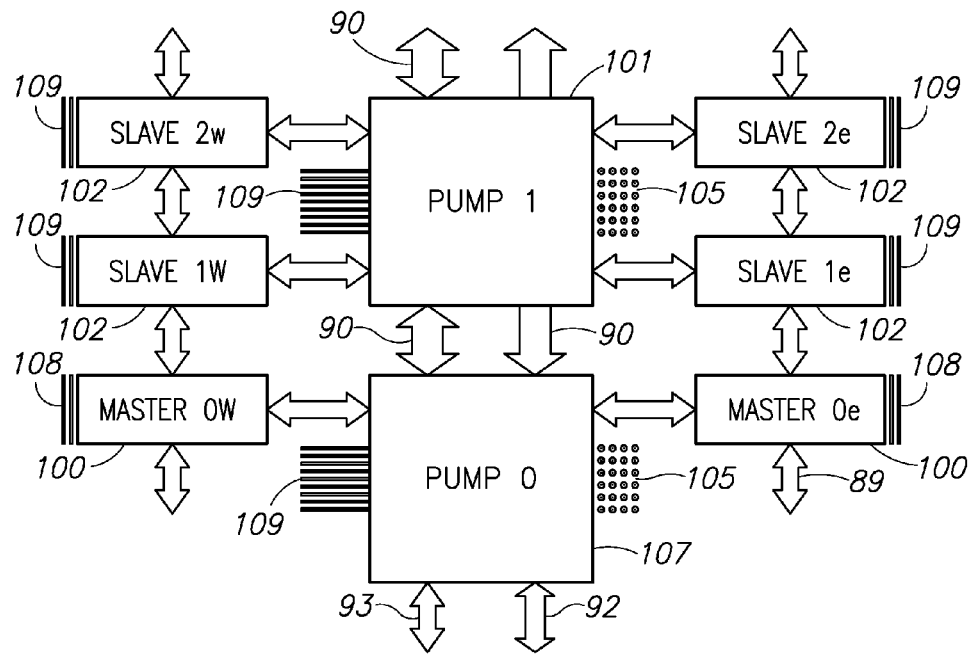

Refer to FIG. 41. CHARM Module Primary Memory Interfaces (Alt. Embodiment)

In FIG. 41, each processor (each is designated here as either a MASTER 100 or SLAVE 102) has a relatively small, but dedicated, "local" memory 109 that is closely matched to the needs of the specific processor 100 or 102. For an Opteron processor, a pair of dual-channel DIMMs well-matched to the clock rate would be anticipated.

Each PUMP 101, 107 has nine (9) parallel 72-bit ECC-protected memory channels 109, typically implemented with commodity DIMMs that lie at the economic sweet spot of performance, capacity, and price. When possible, each PUMP supports at least a second bank 109, for a total of 18 DIMMs accessible 9 at a time. On each access, the 72 bits from each of the 9 DIMMs is corrected to 8 bytes (64 bits) of data per DIMM. One bit from each such byte is used to form a second 72-bit ECC word (1 bit/byte×8 bytes/DIMM×9 DIMMs=72 bits), which is then corrected to a 64-bit data word, and this is done 8 times per access, yielding a total of eight (8) orthogonally error-corrected 64-bit words (64 bytes total) per access. Note that 64 bytes is both the size of an Opteron cache line and the minimum payload in an HT packet. The internal PUMP buffers must handle blocks of at least 648 bytes (8 accesses of 9 channels at 9 bytes per channel), netting out to 512 bytes of orthogonally error-corrected data.

Figure 27B:
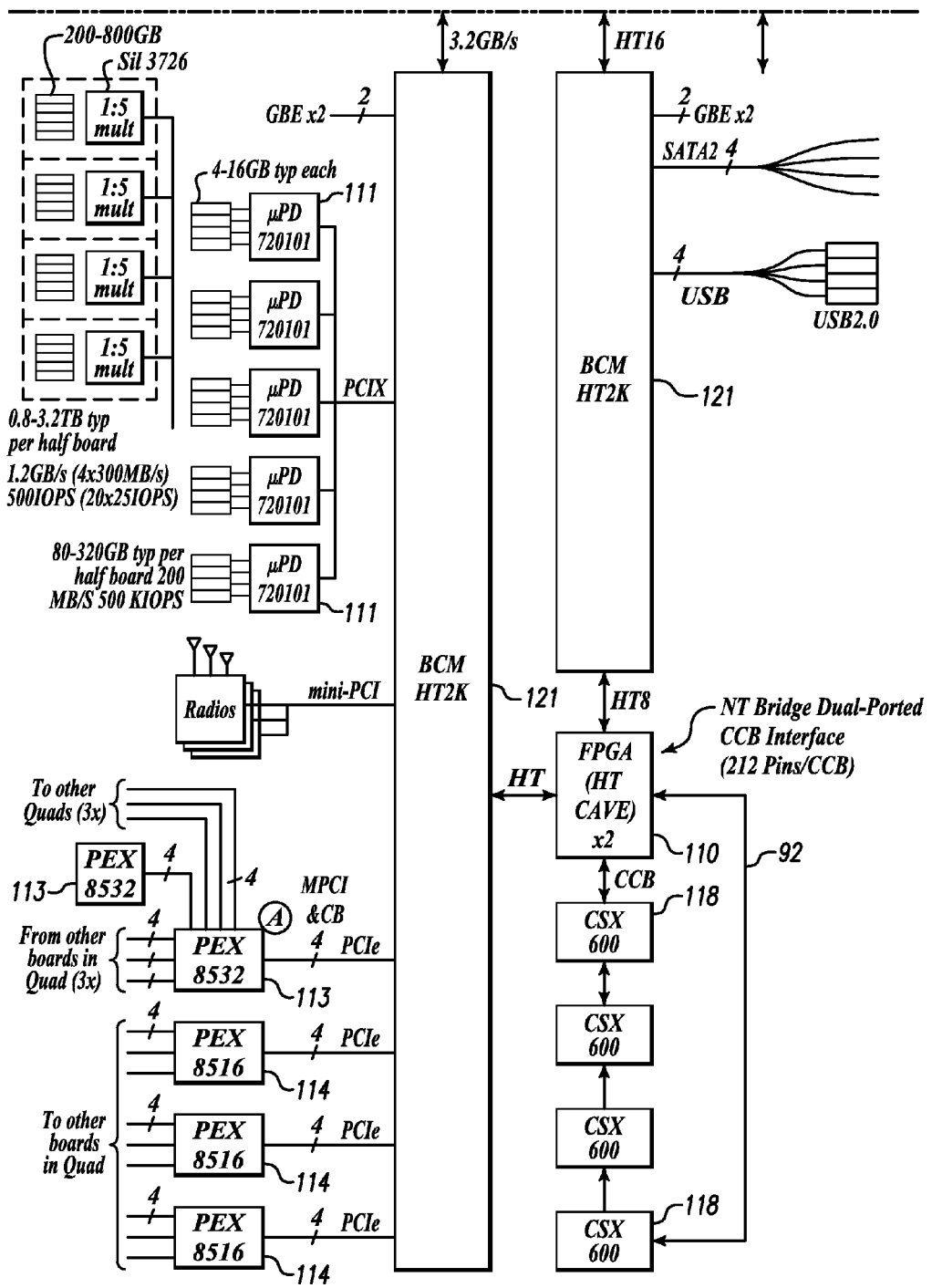

Each PUMP 107 can deliver a 64-byte cache line refill in a single memory access, using a single minimal HT packet. A multi-line cache refill can require the same number of accesses as cache lines, which provides a 4× throughput improvement over a dual-channel memory configuration— plus another dimension of error correction—and the data still fits in a single HT packet. Since the processors 100, 102 mostly operate out of their own local dual-channel memory banks, there is a surplus of memory bandwidth, and this is used to support accelerators within the PUMP 101 or 107 as well as accelerators connected to the PUMP (such as the ClearSpeed chips, e.g., CSX600, that connect via the ClearConnect Bus 92, as depicted in FIG. 19 and FIG. 27B).

Each PUMP also has several banks of 72-bit ECC-protected NVRAM 105 (e.g., MRAM, FeRAM or F-RAM, etc.), some of which are likely be implemented on stacked daughterboards attached to the CHARM module via stacking connectors (1 or 2 banks per stack). The appropriate buffer sizes depend on the typical currently available chips, which, for MRAM, are currently limited to on the order of 128K×8 each, so each bank would have a capacity on the order of 1 MB.

Figure 42:
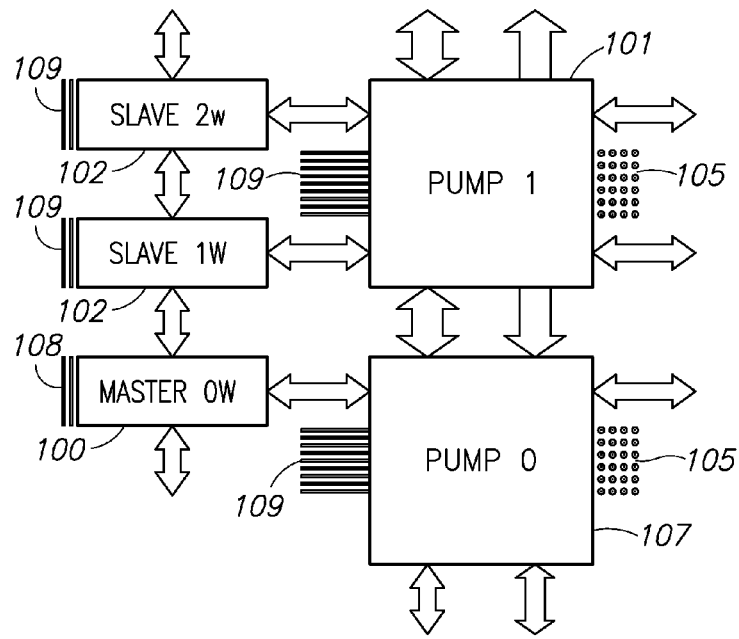
FIG. 42. CHARM Module Primary Memory Uses (Alternate Embodiment)

Refer to FIG. 42. CHARM Module Primary Memory Uses (Alternate Embodiment)

Because it need only be large enough for an appropriate "working set," each processor's local memory 109 can be implemented with components that trade off density for speed, while optimizing for the economic "sweet spot." From the perspective of a processor's memory controller and/or MMU, this local memory 109 is the processor's "main memory" (or, in the case of the Opteron processor, a slice of it), and it can serve this purpose well as long as it is significantly larger than the largest cache supporting it.

From the system's viewpoint, however, such processor-local memory 109 is just another cache level (CPU-matched dual-channel pairs of high-performance DIMMs are intended to serve somewhat like an external process-local L3 cache, or L4 cache if the CPU already has an actual L3 cache), whereas the PUMP's memory 109 better fulfills the role of "main memory." In the case of coherent processor-to-PUMP HT links, each processor 100 or 102 thinks the PUMP's memory 109 belongs to a peer processor 100 or 102, so it can be accessed directly via HT bus requests. Otherwise, virtual memory page faults in a processor's local-but-small physical memory 109 can normally be satisfied from the PUMP's large aggregate physical memory (e.g., like the aggregated blocks 140 depicted in FIG. 43) rather than from an actual disk (the PUMP can emulate a paging disk of arbitrary size, limited only by the overall memory and storage capacity of the entire distributed system).

The PUMP's NVRAM 105 is a somewhat limited resource intended primarily for internal use by the PUMP logic to maintain metadata related to flash and disk-based storage, and to buffer critical data until it can be safely distributed and stored into a higher capacity distributed memory. For example, the associative memory algorithm logic (including the CHARM FASTpage logic) resides in each PUMP. In particular, the FASTpage logic uses NVRAM to persistently maintain the ternary search tree meta data and buffer updates to search tree memory pages before they're written to flash memory (in a preferred embodiment, flash is the primary storage media for persistent associative memory).

8.1 CHARM Concepts
8.1.1 CHARM Object Characteristics
8.1.1.1 Mutable Vs. Immutable Objects One bit of a CHARM object id is used to determine whether or not an object is immutable (i.e., not mutable). An immutable object is one whose content cannot be changed (for any reason).

Once an object becomes immutable it can never again be mutable. A mutable object is essentially an incomplete work in progress—once the work has been completed, the object becomes immutable. For example, transactional contributions from distributed processes building a search tree would all be targeted to the immutable object id of the tree being constructed (the targeted immutable object id would be known to the distributed processes).

Mutable object ids are NOT reusable. After an object has become immutable, the associated mutable object id is no longer valid (except in an audit context), and its use would be automatically detected as a security issue.

8.1.1.2 Transient Vs. Persistent Objects

One bit of a CHARM object id is used to determine whether or not an object is transient (i.e., not persistent). In this context, transient means "temporary" and persistent means "permanent," and these terms may be used interchangeably.

Transient ids are used in two different contexts:
1. Whenever an object id is needed for an intermediate result that need not be (i.e., cannot be) persistently stored.
2. Whenever an object id is needed for a persistent (i.e., permanent) result that may or may not already exist but, in either case, is not yet known. Any number of transient ids may be mapped to the same persistent id.

Transient ids are ultimately reusable, but only after their previous use has been verifiably flushed from the system. Active transient ids are managed (issued and revoked) in large-ish blocks to minimize overhead.

8.1.1.3 Mutability Vs. Persistence

Legitimate uses exist for all four combinations of mutability and persistence, but there are constraints on where the associated objects may be stored, as indicated in Table 4:

TABLE 4

Combinations of Mutability and Persistence

| T/P | M/I | Description | Uses and Where Stored |
|---|---|---|---|
| 0 | 0 | Transient Mutable | Temporary objects (volatile RAM only) |
| 0 | 1 | Transient Immutable | Aliased permanent objects (online NV only) |
| 1 | 0 | Persistent Mutable | In-work permanent objects (online NV only) |
| 1 | 1 | Persistent Immutable | Completed permanent objects (anywhere) |

Transient Mutable (T/P=0, M/I=0) objects are used only for temporary, discardable objects and can only be stored in volatile RAM (CHARM cannot allow them to be stored in persistent storage, including NVRAM). For security reasons, all decrypted objects fall into this category (no object can be stored in the clear, ever)—which means that a first-pass deletion of all in-the-clear objects can occur instantaneously by de-powering (i.e., removing the power from) the volatile RAM where they're temporarily stored. (In a preferred embodiment, the memory is re-powered after a brief period and at least secondary and tertiary passes through the volatile memory occur, in order to write "white noise" patterns into the memory, in keeping with the security assumptions stated elsewhere, which anticipate the possibility that an attacker has significant state-sponsored resources for accessing high-value assets. More passes may be specified in the applicable security policy.).

Transient Immutable (T/P=0, M/I=1) objects are really temporary aliases for Persistent Immutable (T/P=1, M/I=1) objects whose object ids are not yet (and might never be) known locally. Such objects are kept in online NVRAM rather than RAM, but cannot be stored in nearline storage. If the Persistent Immutable id becomes known locally, it subsumes every occurrence of the Transient Immutable id, which is immediately released. A Transient Immutable id may also be revoked without ever mapping it to a Persistent Immutable id. A bidirectional mapping is maintained such that given either the Transient Immutable object id or a Persistent Immutable object id, the other(s) can be determined, until such time as the Transient Immutable object id has been flushed from the system.

Persistent Mutable (T/P=1, M/I=0) objects are those which are destined to become immutable, but are not yet complete. Such objects are kept in online NVRAM rather than RAM, but cannot be stored in nearline storage.

Persistent Immutable (T/P=1, M/I=1) objects are those which are already complete and can never be changed. Each version of an externally supplied artifact, for example, has its own Persistent Immutable object id. Every Persistent Immutable object has a corresponding message digest that serves as its digital "fingerprint." A bidirectional mapping is maintained such that given either the Persistent Immutable object id or the message digest, the other can be determined.

8.1.2 Storage & Communications—Slices and Slivers

Due to the thresholding and FEC scheme used, only "slices" and "slivers" of pre-compressed data are stored. As described below, a "slice" is a fraction of the original data, and a "sliver" is a fraction of a "slice."

Given an object or other data to be stored (or communicated), it can be divided up into k fractions of the whole, such as k packets, or k "slices." In a preferred embodiment, a cryptographic message digest (its dna_tag) is computed for the object to be stored (which may or may not be in the clear), and then the object is compressed and encrypted, at which point a second, "outer" cryptographic message digest is computed for the encrypted result and concatenated to the encrypted result, which concatenation then becomes the basis for the FEC encoding process described below, by treating it as the "original data" and dividing it k ways, i.e., into k slices. Thus, reconstruction of this "original data" from its k slices (or their FEC-encoded siblings) does not actually make the original in-the-clear data available, but only a compressed, encrypted (and therefore still secure) isomorphism of it. Successful reconstruction of the still-encrypted data from its k slices can be verified only if the key used to generate the "outer" cryptographic message digest is known, along with the length of the digest.

Given a systematic (n,k) FEC code, the original k slices of data are used to encode up to n redundant "slices," any k of which is sufficient to reconstruct the original data. Since a systematic (n,k) code is used, the original k slices (which are included in the set of n slices) are also sufficient to reconstruct the original data.

In a preferred embodiment, no more than one slice of data from a single object is allowed to be stored on a particular device, precluding the loss of more than one of an object's slices due to a single device failure or theft. Note that multiple slices (each from a different object) may be stored on each device, without penalty.

In a preferred embodiment, any node or device entrusted with a slice can further encode the data for sub-distribution using an (n',k') FEC code, thereby encoding up to n' redundant "slivers," any k' of which is sufficient to reconstruct the original slice. Slivers are particularly useful for highly distributed "nearline" storage, such as when data is distributed to non-trusted devices (PC-based storage, servers, or any SERVANT, or device running or emulating a SERVANT).

In a preferred embodiment, no more than one sliver of data from a single object is allowed to be stored in a single data-handling unit (e.g., a disk sector, file, or record, etc.), precluding the loss of more than one of an object's slivers due to localized hard or soft failures (e.g., bad disk sector, corrupted file, etc.).

The number of slices or slivers that can be co-located in the same facility and/or within a geographic region is constrained to be less than some policy-specified threshold. Thus, the capacity required on a particular device, or at a particular facility, is only a fraction of what would be required to store an arbitrary object.

As a performance enhancement (but at the risk of decreased survivability, depending on the exact configuration and policy-specified thresholds), SHADOWS nearline activities can include co-locating slices of new versions of objects with slices of recent versions of the same objects, by combining them into volumes or clusters. When a particular object is recalled from storage, all or part of the corresponding sliver volume can be retrieved all at once, it order to reduce latency, especially in the case where the versions are related through reversible delta-compression operations.

Note: As a consequence of its FEC-based slicing and associated constraints, SHADOWS storage needs no separate disk defragging procedures.

8.1.3 CHARM—FEC Pseudo-Random Ordinals (PRO) Encoding Concept

In a preferred embodiment, CHARM uses FEC (forward error correction), and specifically systematic codes such Reed-Solomon (RS), Cauchy Reed-Solomon (CRS), and/or others, with encoders and decoders implemented in software and/or hardware. A key property of the systematic (n,k) codes in CHARM is that, given a set of n redundantly "encoded" data packets (or other chunks of data), any k of them are sufficient to decode and thereby reconstruct the original data (k<n).

If a Reed-Solomon code variant (or similar) is used, where n packets are generated and any k of them can enable reconstruction of the original data, then the redundancy can be given as $r=(n-k)$, and the code can support up to r "erasures" (missing packets where it is known which packets are missing), or r/2 errors (where some packets are in error, but which ones they are is unknown). In CHARM, storage-based data and data-in-transit tend to require only erasure correction (because there are other means for identifying missing or corrupted packets), whereas volatile memory-based data tend to require full error detection.

In CHARM, FEC is applied in multiple dimensions, with different parameters, as appropriate to the purpose and nature of the data, which may differ, for example, among the various contexts associated with local vs. distributed data, transient vs. persistent data, mutable vs. immutable data, data in transit vs. data at rest, public data vs. private data, etc. Other considerations and requirements may apply as well, such as requisite levels of security, integrity, availability, persistence, survivability, etc.

In general, the higher the required levels of redundancy for a particular context, the larger the value of n is likely to be, relatively speaking. Also, the higher the required levels of security for a particular context, the larger the value of k is likely to be, relative to a particular value of n, where (k<n).

When using the known Luigi Rizzo FEC algorithms with 8-bit wide symbols (i.e., a Galois Field GF(p^w) where p=2 and w=8, as described by Rizzo in 1997, which implies a maximum of n=p^w=2^8=256), up to n=256 packets can be generated for any given chunk of data in such a way that any k packets out of the 256 is sufficient to reconstruct the original data.

Because Rizzo's algorithm is based on a systematic code, the first k packets of the n=256 maximum can be directly aggregated to represent the original data without decoding. The remaining 256−k packets (or n−k packets, in general) contain redundant data in accordance with the selected FEC algorithm. If any of the first k packets are missing, any packets from the remaining 256−k may be substituted, but FEC decoding must occur in order to reconstruct the original data.

For decoding efficiency, it is preferable to use only the original k packets, if available, thereby completely avoiding the FEC decoding algorithm. However, left as-is, this would reduce security somewhat, because data could be reconstructed with less effort by an attacker (by not adding FEC decoding to the cryptographic burden).

The Scrutiny Pseudo-Random Ordinals (PRO) encoding concept is to pseudo-randomly distribute the original k packets among the n=256 packets. A key associated with (but, in a preferred embodiment, distinct from) the data's underlying security key can be used to seed a PRNG. When the key is known, the ordinal positions of the k original packets can be determined directly, allowing aggregation without the overhead of FEC decoding (assuming all the original k packets are available).

The same technique can be applied to group the remaining 256−k packets according to accessibility (locale, storage level, etc.). For example, the next most-accessible m packets can be distributed among the remaining 256−k packets in exactly the same way.

Note that the PRNG sequence-generation algorithm must automatically skip over (and not emit) duplicate ordinals within a given sequence, which implies that memory must be associated with sequence generation (in order to keep track of which ordinals have been emitted). A Bloom filter would be excellent in this respect, since it is both compact and relatively opaque (which aids its resistance to analysis and attack), yet the lack of a particular entry corresponding to a candidate ordinal is clear evidence that the candidate is not a duplicate of a previously occurring ordinal. The presence of a matching entry, however, is an indication that the candidate "might" be a duplicate of an ordinal that has occurred already, so the candidate can simply be skipped in favor of a new candidate.

8.1.4 CHARM—Representation of Infinite Precision Floating Point Numbers

In the CHARM implementation of infinite precision floating point numbers, each number is a transreal value, and thus, in addition to the set of integers and real numbers, also includes +/−infinity and NULL. In a preferred embodiment, the implementation is further enhanced to include a small set of signed, infinite precision, symbolic constants such as (pi) and e, along with a small set of others, plus a means for referring to an extended set of mathematical and/or scientific constants (typically, irrational numbers, i.e., numbers which can only be written as a never-ending, non-repeating decimal fraction, and thus cannot be written in the form of a fraction where the numerator and denominator are both integers) which are generally known in the art.

In a preferred embodiment, the CHARM infinite precision floating point representation requires variable length word size on 1-byte boundaries, with at least an 8-bit word (1 byte), which may be represented as having bits numbered from 0 to 7, left to right. The first bit is the sign bit, 'S', the second bit is the exponent extension flag, 'e', the third bit is the exponent bit, 'E', the fourth bit is the fraction extension flag, 'f', and the final four bits are the fraction bits, 'FFFF':

S e E f FFFF
0 1 2 3 4567

When e=0, no exponent extension is required (i.e., there are no additional exponent bytes).

When e=1, the next byte begins a field of 1 or more exponent extension bytes (signed LEB128 format).

When f=0, no fraction extension is required (i.e., no additional fraction bytes).

When f=1, the byte after the exponent extension, if any, begins a field of 1 or more fraction extension bytes (unsigned LEB128 format).

When e=0 and E=0, the value of the exponent is 0 (i.e., the fraction is also unnormalized and contains an integer value); a single byte may contain the signed values 0 to 15 (the sign bit applies).

When e=0 and E=1 (E_MAX) and f=0, the value of the exponent is 0 and the fraction field (FFFF) represents special values (the sign bit S differentiates all values, and all FFFF field values except 0 and 1 are signed), as follows:

| FFFF Field | Special Value |
| --- | --- |
| 0 | NULL/Nullity (unsigned) or Rational_Number_Indicator |
| 1 | RESERVED for OID Indicator or BLOB Indicator. |
| 2 | RESERVED for Extended_Constant_Flag (extended constant code to follow). |
| 3 | RESERVED |
| 4 | Euler (gamma) = 0.57721566490153286060651209008240243104215930... |
| 5 | log (2) = 0.69314718055994530941723212145817656807550013436025... |
| 6 | log (pi) = 1.14472988584940017414342735135305871164729481291531... |
| 7 | sqroot (2) = 1.41421356237309504880168872420969807856967187537694... |
| 8 | sqroot (e) = 1.64872127070012814684865078781416357165377610071014... |
| 9 | sqroot (pi) = 1.77245385090551602729816748334114518279754945612238... |
| 10 | log (10) = 2.30258509299404568401799145468436420760110148862877... |
| 11 | e = 2.71828182845904523536028747135266249775724709369995... |
| 12 | pi = 3.14159265358979323846264338327950288419716939937510... |
| 13 | e ^ e = 15.15426224147926418976043027262991190552854853685613... |
| 14 | e ^ pi = 23.14069263277926900572908636794854738026610624260021... |
| 15 | INFINITY (signed) |

When the FFFF field value is 0, the special value is NULL or Nullity (unsigned) when S=0, and Rational_Number_Indicator when S=1 (ratio of integers to follow). (Note: Rational numbers can be represented by a ratio of integers, i.e., a pair of numbers corresponding to a numerator and a denominator. The Rational_Number_Indicator byte indicates that a pair of numbers follows, each of which is a variable-length signed integer.).

When the FFFF field value is 1, the special value is RESERVED for OID_Indicator when S=0 (OID to follow), and for BLOB_Indicator when S=1 (BLOB descriptor & content to follow). (Note: An OID is a variable-length value in a format somewhat similar to the numeric format. The E (exponent) field is replaced by a T (type) field, and the F (fractional) field is replaced by an I (identifier) field. Specific field values are also different. In the case of a Perspex matrix, the OID can be dereferenced, resulting in a value compatible with the expected numeric value. A BLOB descriptor is a variable-length value in a format somewhat similar to the numeric format (followed by the described content). The E (exponent) field is replace by a T (type) field, and the F (fractional) field is replaced by a C (content) field. Specific field values are also different. In the case of a Perspex matrix, the BLOB content can be decoded resulting in a value compatible with the expected numeric value.).

When e=1 in the first byte, then one or more of the following bytes contribute to the exponent, where the first bit of each such byte indicates whether additional bytes are required, and the other 7 bits of the byte are appended to the right of previous exponent bits (beginning with the 'E' bit in the first byte).

Likewise, when f=1 in the first byte, then one or more of the bytes following the exponent extension bytes, if any, contribute to the fraction, where the first bit of each such byte indicates whether additional bytes are required, and the other 7 bits of the byte are appended to the right of previous fraction bits (beginning with the four 'F' bits in the first byte).

```
0 1 2 3 4567
S e E f FFFF (eEEEEEEE)(eEEEEEEE) ... (eEEEEEEE)
            (f FFFFFFF)(f FFFFFFF) ... (f FFFFFFF)
```

8.1.4.1 Example Determinations of Represented Values

The value 'V' represented by the word may be determined as follows:

If e=0 and E=1 and F is 0, and S is 0, then V=Nullity (Note: "Nullity" is unsigned; minus Nullity cannot occur. Nullity is something like NaN ("Not a number"), but better defined - essentially a NULL value for numbers.).
If e=0 and E=1 and F is 0, and S is 1, then V=(the ratio of integers specified by the following number pair)
If e=0 and E=1 and F is 1, and S is 0, then V= (the value of the dereferenced OID)
If e=0 and E=1 and F is 1, and S is 1, then V= (the value of the dereferenced BLOB descriptor and content)
If e=0 and E=1 and F is 2, and S is 0, then V= (+) (the extended constant indexed by the following integer)
If e=0 and E=1 and F is 2, and S is 1, then V= (−) (the extended constant indexed by the following integer)
If e=0 and E=1 and F is 3, then V= (TBD) [Note: This value of F is RESERVED]
If e=0 and E=1 and F is 4, and S is 0, then V= (+) (Euler's Constant = 0.577215664901532...)
If e=0 and E=1 and F is 4, and S is 1, then V= (−) (Euler's Constant = 0.577215664901532...)
... (and so on)
If e=0 and E=1 and F is 11, and S is 0, then V= (+) e (2.718281828459045235360...)
If e=0 and E=1 and F is 11, and S is 1, then V= (−) e (2.718281828459045235360...)
If e=0 and E=1 and F is 12, and S is 0, then V= (+) pi (3.14159265358979323846...)
If e=0 and E=1 and F is 12, and S is 1, then V= (−) pi (3.14159265358...)
... (and so on)
If e=0 and E=1 and F is F_MAX, and S is 0, then V= (+) Infinity
If e=0 and E=1 and F is F_MAX, and S is 1, then V= (−) Infinity
If e>0 then V= $(-1)^{**}S * 2^{**} (E) * (1.F)$ where "1.F" is intended to represent the binary number created by prefixing F with an implicit leading 1 and a binary point.
If e=0 and E=0 and F is nonzero, then V= $(-1)^{**}S * F$
If e=0 and E=0 and F is ZERO, then V= 0 (regardless of S, which is always normalized by masking it to 0 also)

8.1.4.2 Comparison to IEEE Double Precision Floating Point

Unlike the CHARM floating point format, the IEEE double precision floating point standard representation (prior art) requires a 64-bit word, which may be represented as numbered from 0 to 63, left to right. The first bit is the sign bit, S, the next eleven bits are the exponent bits, 'E', and the final 52 bits are the fraction 'F':

```
0 1            11 12                                    63
S EEEEEEEEEEE FFFFFFFFFFFFF ... FFFFFFFFFFFFFFFFFF
```

The value V represented by the word may be determined as follows:

If E=2047 and F is nonzero, then V=NaN ("Not a number")
If E=2047 and F is zero and S is 1, then V=−Infinity
If E=2047 and F is zero and S is 0, then V=Infinity
If 0<E<2047 then V= $(-1)^{**}S * 2^{**} (E-1023) * (1.F)$
where "1.F" is intended to represent the binary number created by prefixing F with an implicit leading 1 and a binary point.
If E=0 and F is nonzero, then V=$(-1)^{**}S * 2^{**} (-1022) * (0.F)$ These are "unnormalized" values.
If E=0 and F is zero and S is 1, then V= −0
If E=0 and F is zero and S is 0, then V= 0

Whereas frequently occurring small values (e.g., −15 to +15) require only 1 byte in the CHARM format, 8 bytes are required in the IEEE double-precision floating point format (4 bytes are required in the IEEE single-precision format, which is otherwise not discussed here). Furthermore, whereas larger or less frequent values occupy only as many bytes as required for their actual representation in the CHARM format, but as many bytes as are needed can be used (including the representation of rational numbers), the IEEE floating point format is fixed at 8 bytes, regardless of whether 8 bytes is too many, or not enough.

8.1.4.3 CHARM Implementation of Perspex Transreal Values

CHARM, and particularly, PUMP and CORE, may include Perspex processing within its native capabilities. A Perspex matrix is a matrix of 16 numbers arranged in 4 rows and 4 columns that can be handled as a single operand, with a minimum of 16 bytes (1 byte per number).

In the CHARM (CORE) implementation of Perspex, each number in a Perspex matrix is a transreal value, and thus, in addition to the set of integers and real numbers, must include +/−infinity and nullity (NULL in CHARM). The CHARM implementation is further enhanced to include a small set of signed, infinite precision, symbolic constants such as (pi) and e, along with a small set of others, plus a means for referring to an extended set of constants. The aforementioned math constants are generally known in the art.

8.1.5 CHARM—Word and Phrase Tables 8.1.5.1 Central Concept

In a preferred embodiment, a unique code value is assigned to every unique textual word occurring within selected lexicons anywhere in the system, and the code assigned is determined by word length and frequency of occurrence.

In a preferred embodiment, word phrases are similarly assigned a code value.

In a preferred embodiment, word codes and phrase codes are used to maximize internal compression and throughput.

8.1.5.2 Basic Concepts

1. Lowercase is used as the canonical form of every word.
2. Every word has an unsigned LEB128 code, where longer codes are used for lower frequencies.
3. One-byte codes are reserved for ASCII 0 to 127.
4. The first (16,384-128) two-byte codes are reserved for the most frequently occurring lowercase dictionary words that are three characters or longer.
5. The remaining 16,384 two-byte codes are reserved for the most frequently occurring case-variations (as encountered) of dictionary words that are three characters or longer and already encoded.
6. The first 128 three-byte codes are reserved for ASCII 128 to 255.
7. The next 1,048,512 three-byte codes are reserved for the most frequently occurring lowercase dictionary and corpus words that are three characters or longer and not already encoded.
8. The remaining 1,048,512 three-byte codes are reserved for the most frequently occurring but not yet encoded case-variations (as encountered) of dictionary and corpus words that are three characters or longer and already encoded.
9. The first half of the 268,435,456 four-byte codes, the first half of the 34,359,738,368 five-byte codes, and the first half of each distinct length of the successive multi-byte codes are reserved for additional lowercase words in arbitrary order (as they're encountered, for instance).
10. The second half of the 268,435,456 four-byte codes, the second half of the 34,359,738,368 five-byte codes, and the second half of each distinct length of the successive multi-byte codes are reserved for the most frequently occurring but not yet encoded case-variations (as encountered) of dictionary and corpus words that are three characters or longer and already encoded.
11. No database entries are required for ASCII values 0 to 255.
12. Canonical entries (i.e., lowercase words) are defined by their code, the associated text string, and a list of non-canonical entries.
13. Non-canonical entries (i.e., mixed-case and uppercase words) are defined by their code, the code of the associated canonical entry, and a variable-length bit pattern (LEB128) that defines which characters need to be uppercase (one case bit per text character).

8.2 PUMP—Parallel Universal Memory Processor

In a preferred embodiment, a MASTER processor 100 assigns virtualized computing, storage, and communications resources to a set of SLAVE processors 102 over which it has authority, and HANDLER (Host Abstraction for Named Devices & Layered Executable Resources) logic in the PUMP 101, 107 implements the physical interfaces of these resources.

In a preferred embodiment, the HANDLER interfaces and logic are implemented within the SLAVE PUMP devices 101 to which the SLAVE processors 102 are attached, such that the HANDLER hardware provides functionality similar to a software-based isolation kernel. In a preferred embodiment, the HANDLER's hardware implementation supports dedicated per-process registers and FIFO devices that enable user-space input/output without system call overhead, within the security constraints set by the MASTER 100.

In a preferred embodiment of the CHARM PUMP subsystem, memory accessible by the PUMP (and via the PUMP), can be protected by the PUMP's ability to maintain complementary states in memory—a technique where memory locations are invisibly toggled to and from their complementary states such that each state has a duty cycle of approximately 50% (which means that an adversary gaining physical access cannot determine previous contents after a power-off).

In a preferred embodiment, the FASTpage process is implemented in hardware as a CORE engine, within one or more PUMP devices 101, 107, and also in software that executes on MASTER, SLAVE, and SERVANT processors. In a preferred embodiment of SHADOWS, the FEC codecs are implemented as part of the CORE functions embedded in the PUMP devices. While all the CHARM algorithms can be implemented in software, in a preferred embodiment they are also implemented in hardware, in the CHARM PUMP.

See (also) glossary entries for: CHARM, Delta Compression, PUMP, RLE.

Figure 43:
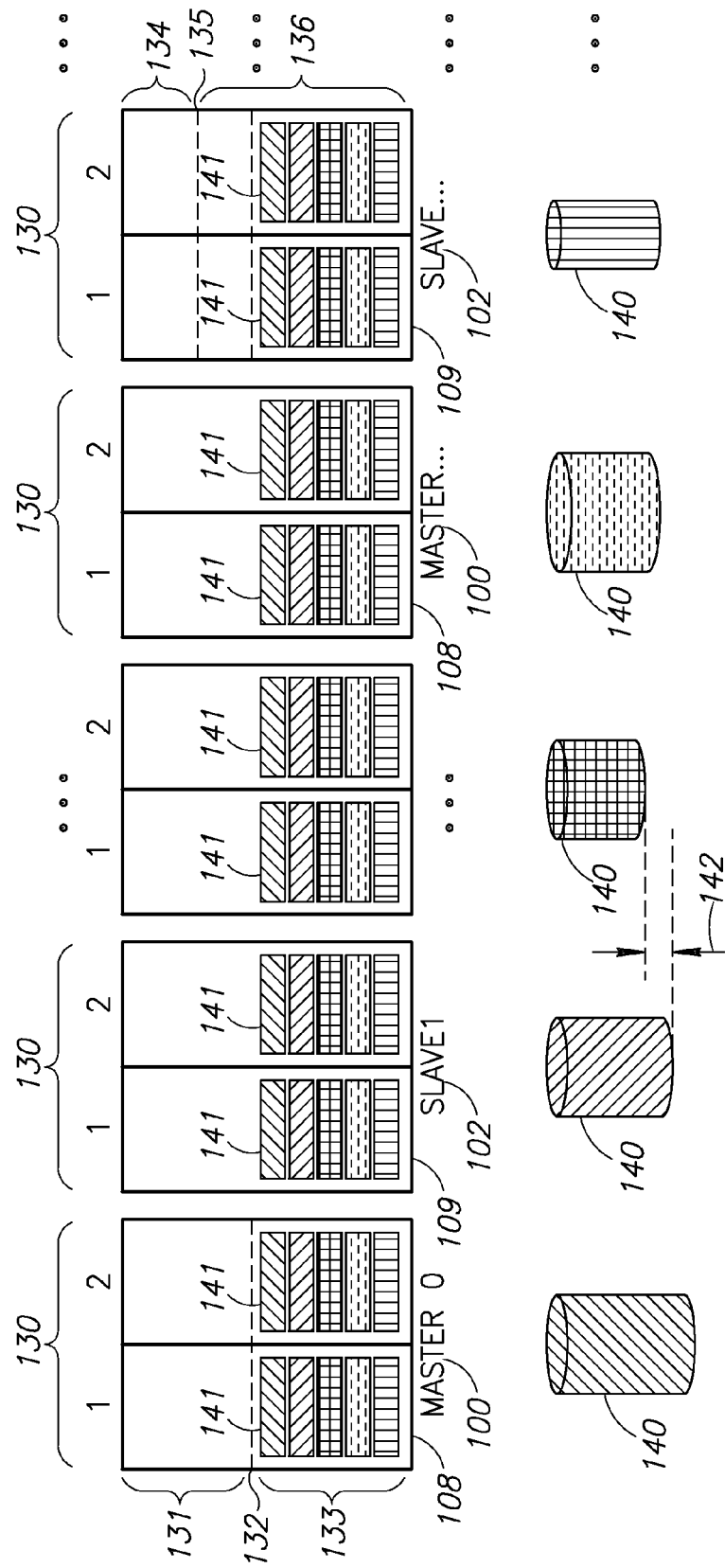
FIG. 43. PUMP-Controlled Per-Process Memory Slices, & Use of Distributed Memory Controllers FIG. 44. PUMP—Local Space Allocation FIG. 45. PUMP—HT Quasi-Switch Implemented with HT Tunnel FIGS. 46A, B, & C. PUMP—HT Quasi-Switch—Stackability & Possible Configurations FIG. 47. Preferred Embodiment of PEERS on CHARM Lobe FIG. 48. SCRAM—Partial Inter-Quadrant Switch Fabric Cross-Connections (Preferred Embodiment)
Figure 44:
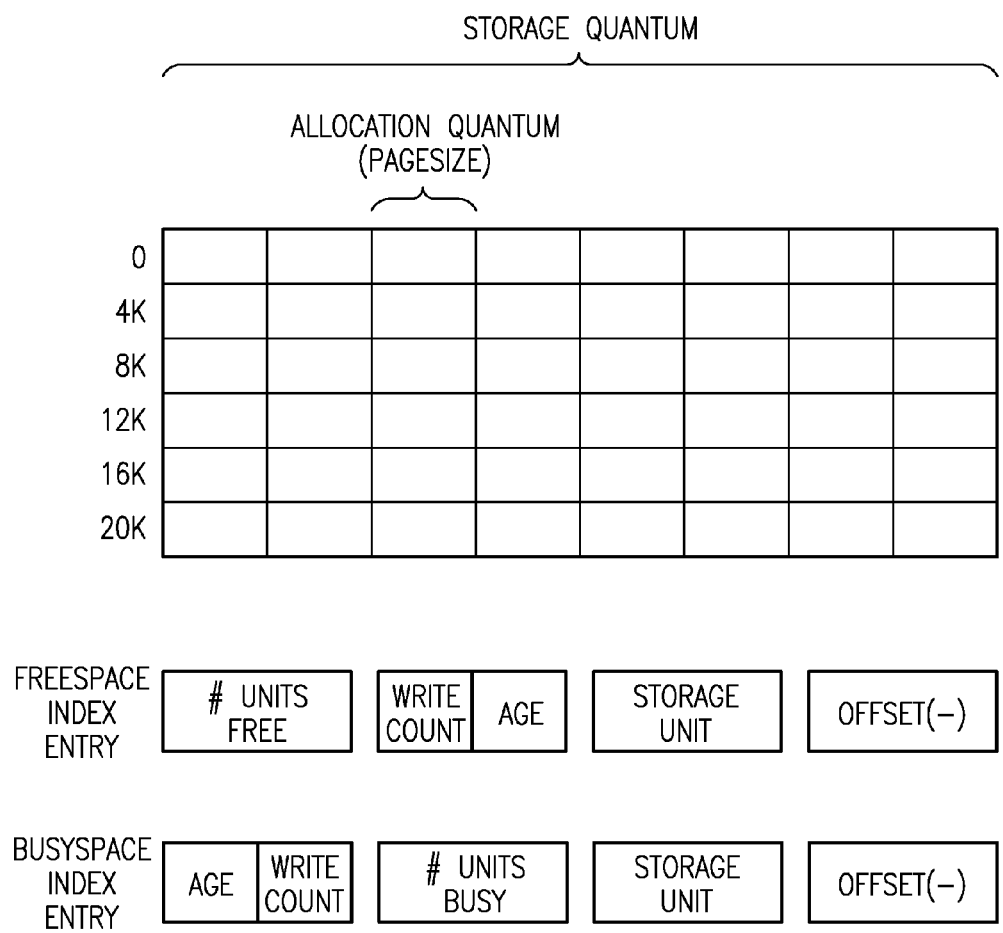

Refer to FIG. 43. PUMP-Controlled Per-Process Memory Slices, & Use of Distributed Memory Controllers Refer to FIG. 44. PUMP—Local Space Allocation As noted in the earlier description of FIG. 20, the multi-channel memory controllers in the MASTER CPU/SMP 100 "belong" to the PUMP 107, which allocates capacity and bandwidth between CPU and PUMP memory; the multi-channel memory controllers of all the SLAVE CPU/SMPs 102 "belong" to the SLAVE PUMPs 101 (the MASTER PUMP 107 delegates to the SLAVE PUMPs 101), which allocate capacity and bandwidth between local (CPU) memory and PUMP memory. As noted in the earlier description of FIG. 42, virtual memory page faults in a processor's local-but-small physical memory 109 can normally be satisfied from the PUMP's large aggregate physical memory (e.g., like the aggregated blocks 140 depicted in FIG. 43) rather than from an actual disk (the PUMP can emulate a paging disk of arbitrary size, limited only by the overall memory and storage capacity of the entire distributed system).

FIG. 43 depicts PUMP-controlled per-processor memory slices, taking advantage of distributed memory controllers accessible via each MASTER CPU 100 and SLAVE CPU 102. In the example of FIG. 43, there are two independent memory channels 130 per processor. Region 131 represents "normal" local memory 108 or 109 "owned" by a processor 100 or 102, whereas region 133 represents the portion of processor-local memory "owned" by a PUMP 101 or 107 (not shown), which FEC-encodes and stores the memory slices 141 from other processors, typically encrypted. Moving the "threshold" 132 upward, say to a new position 135, would give less memory 134 to the local processor 100 or 102, but more memory 136 for storing slices 141 to the PUMP 101 or 107, and vice-versa. The ownership threshold 132 may be determined by need, policy, or other criteria, and can change dynamically, if need be.

Access to the PUMP's aggregated memory regions 133 can occur through DMA, PIO, messaging, etc., either as virtualized system (main) memory or as high speed working storage, but is always presented as an aggregate 140 to a processor 100 or 102 through action of a PUMP 101 or 107 (not shown). Available resources need not be equally allocated to the various processors 100, 102 as depicted in FIG. 43 by the allocation delta 142. Also, although each processor is depicted as having its own allocation 140, that need not be the case. There could also be one or more shared allocations 140, or some combination of shared and private allocations 140. Each allocation 140 can be encrypted or in the clear.

The high-speed working storage 140 of FIG. 43 is presented to a processor by the PUMP 101 or 107 (not shown). The speed (latency) is affected by proximity of the memory controllers involved, and the HT paths involved. The PUMP function is not restricted to a particular interface or other means of allocating memory and making it available to processors (or for its own use). For example, a PUMP can present a disk storage (block device) interface, a malloc( )-style heap allocation interface, or both, or something else entirely. Whatever interfaces are presented or emulated, they would continue to be available even in the face of multiple processor and/or memory channel failures, up to the limits of the erasure code rate then in use (and that rate can be changed dynamically to reflect a new post-failure configuration).

Any number of processors 100, 102 and associated memory channels 108, 109 may participate, and they need not be homogeneous to any particular degree, nor do they need to be co-located. Thus processors may differ in type, ECC support, memory channel count and/or width, etc., as well as location. However, all these factors bear on both performance and survivability of stored information.

Figure 45:
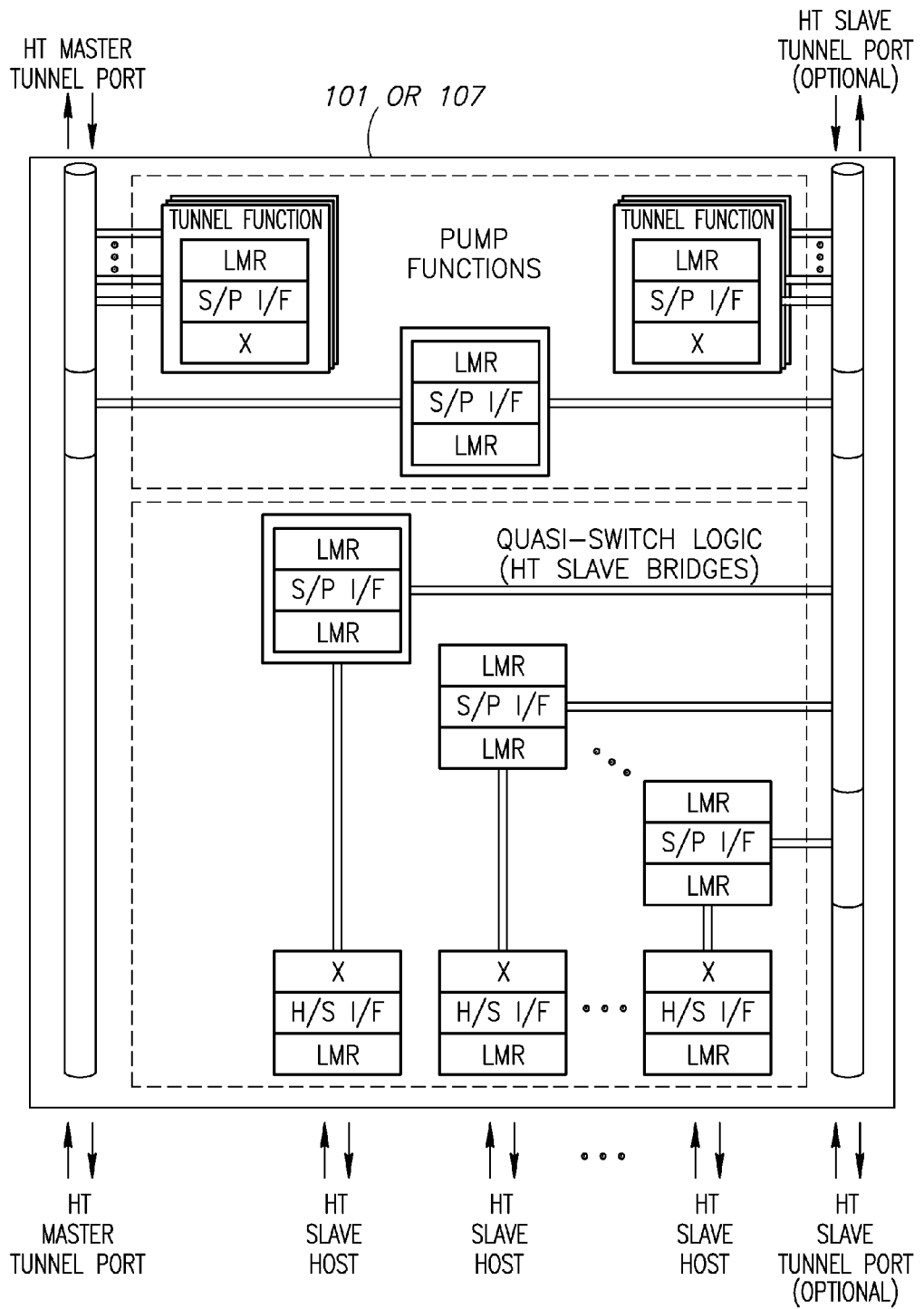

Refer to FIG. 45. PUMP—HT Quasi-Switch Implemented with HT Tunnel

FIG. 45 depicts the implementation of HT switching and tunnel functions of a PUMP 101 or 107. There are two MASTER tunnel ports (one for each end of the externally accessible MASTER tunnel), so the device may be daisy-chained up. The MASTER tunnel port is also bridged to a second tunnel (the SLAVE tunnel) which is at least internal, but optionally may be externally accessible for expansion (i.e., via one or two optional SLAVE tunnel ports). Further, a multiplicity of SLAVE host ports are implemented as HT caves that are bridged to the SLAVE tunnel; these have local logic functions, some of which are implemented remotely (e.g., as SLAVE tunnel functions, MASTER tunnel functions, or elsewhere outside the local tunnels). (When such a device implements eight SLAVE host ports, it may be referred to as an Octoplexer). SLAVE host port functionality includes the implementation or emulation of all interfaces that will be made accessible via an attached host's HT interface (including BIOS, remote memory, block devices such as disk and flash, network interfaces, etc.), all under the auspices and control of the associated MASTERs. Functionality needed primarily by external devices accessing the MASTER tunnel port is implemented as MASTER tunnel functions. Functionality needed primarily by external devices accessing the SLAVE tunnel port via bridged SLAVE host ports is implemented as port-specific cave functions if not shared, or as SLAVE tunnel functions if shared by multiple SLAVE host ports. Since the pair of tunnels is bridged, and the SLAVE host ports are bridged to the SLAVE tunnel, some of the various PUMP functions (tunnel and cave functions implemented via PUMP logic) are directly or indirectly accessible from either tunnel. However, because all the tunnel functions are implemented on the same device, there are numerous split-logic functions where part of the interface implemented at one port may be connected by logic directly to its mating logic at a different interface, bypassing some or all of the bridges. For example, a MASTER may access the MASTER tunnel to set a register value that is to be seen by a host attached to a SLAVE host port; the logic in the associated MASTER tunnel function may interface directly to the associated cave or SLAVE tunnel functionality, bypassing at least the MASTER-tunnel-to-SLAVE-tunnel bridge.

Figure 46A:
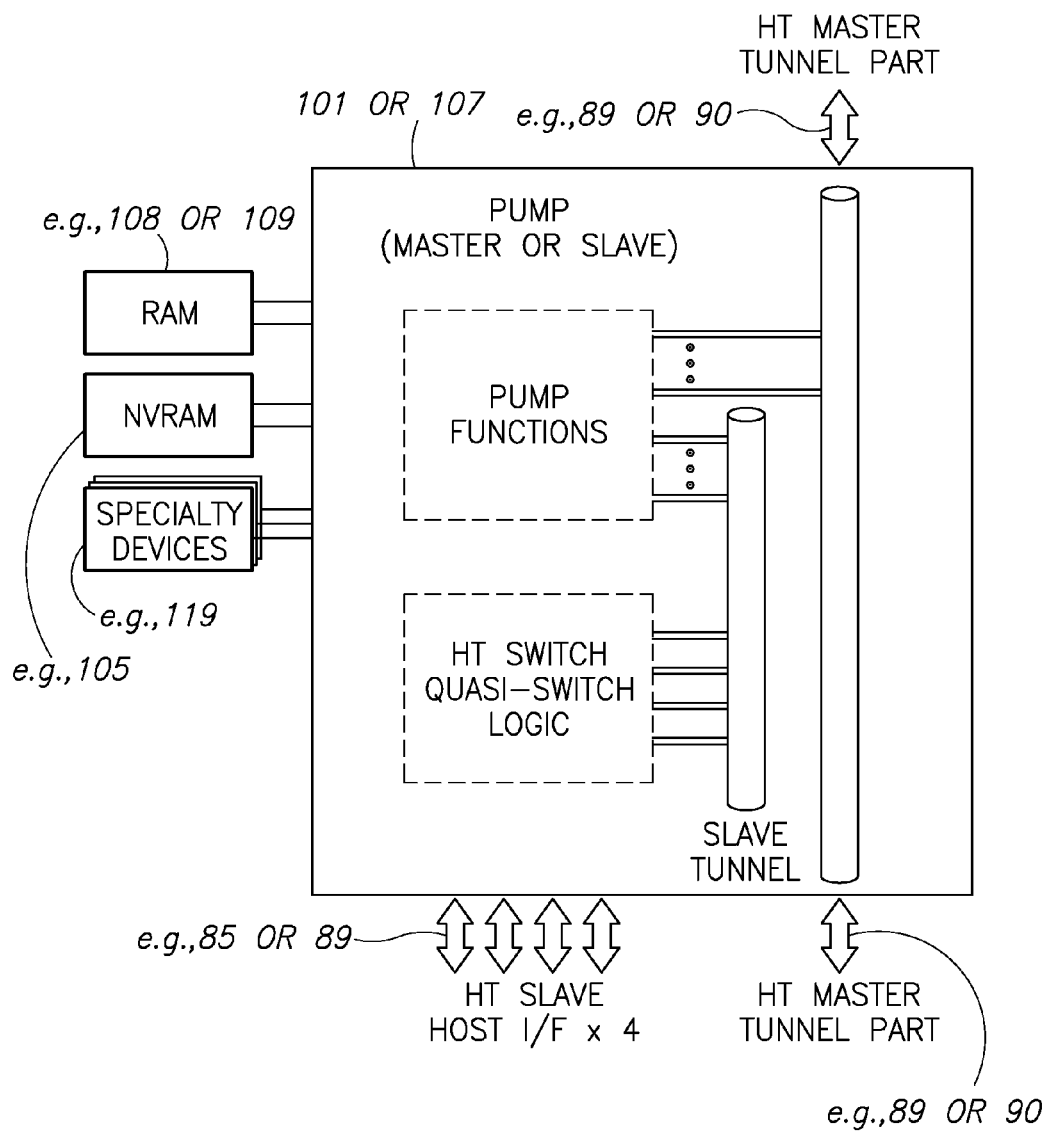

Refer to FIGS. 46A, B, & C. PUMP—HT Quasi-Switch—Stackability & Possible Configurations FIG. 46A depicts an implementation of the PUMP device (HT Quasi-Switch) of FIG. 45, where the SLAVE tunnel is not externally accessible, thus it has only two accessible tunnel ports 89 or 90 of unstated width. Also depicted are four HT links 85 or 89 of unstated width that serve as HT caves, for the purposes of connecting four HT-compatible host processors (each such processor sees itself as interfacing to a standard HT I/O configuration, similar to that found in a single-CPU server or personal computer). The PUMP functions block provides the logic to implement or emulate the interfaces needed to service the attached SLAVE host processors, and to implement the interfaces for any attached memory 108 or 109, NVRAM 105, as well as any specialty devices (e.g., communications device 119).

Figure 46B:
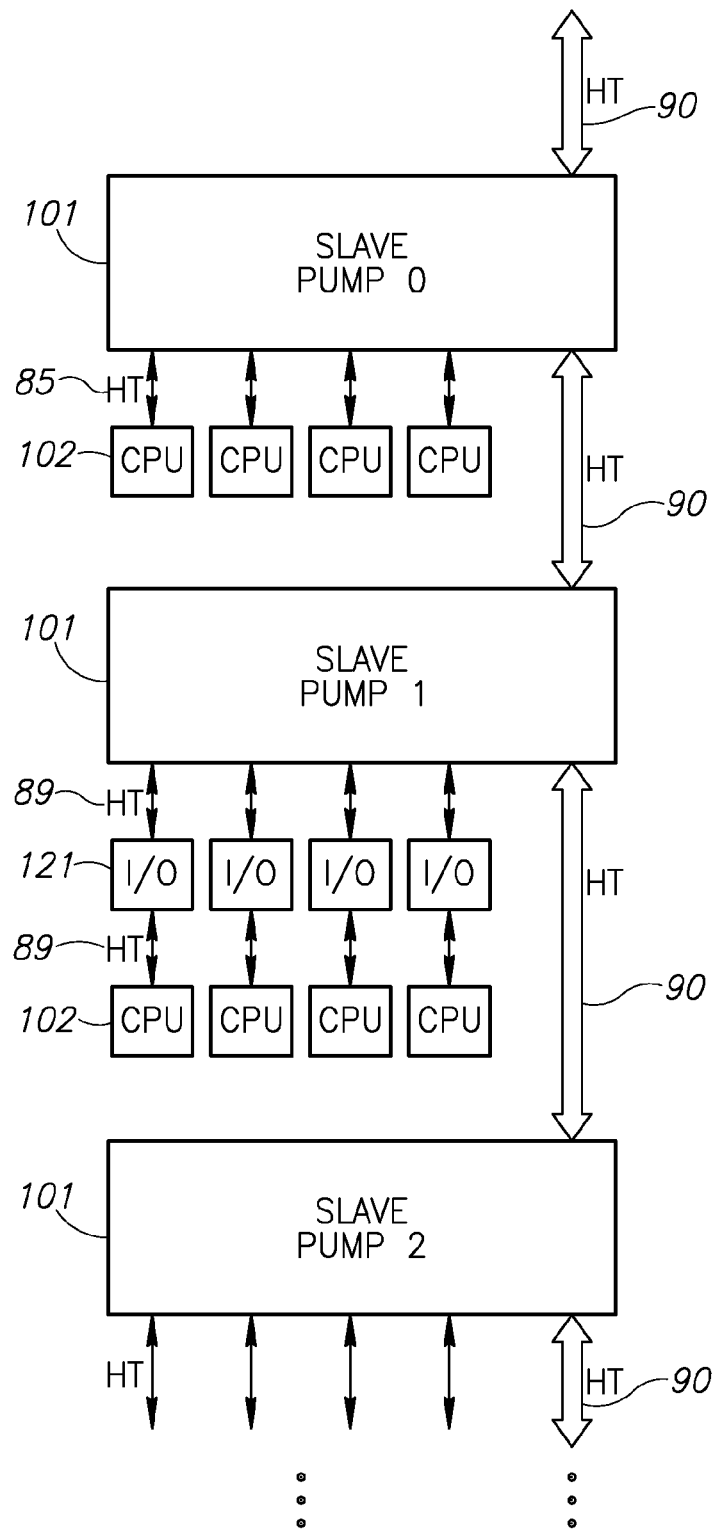

FIG. 46B depicts three instances of the PUMP device 101 from FIG. 46A, daisy-chained via their MASTER tunnel ports 90. Whereas the uppermost device 101, SLAVE PUMP 0, depicts four directly attached SLAVE host processors 102, the middle device 101, SLAVE PUMP 1, depicts four SLAVE host processors 102 that each connect indirectly through an individual I/O bridge 121 that connects directly to the middle device 101.

Figure 46C:
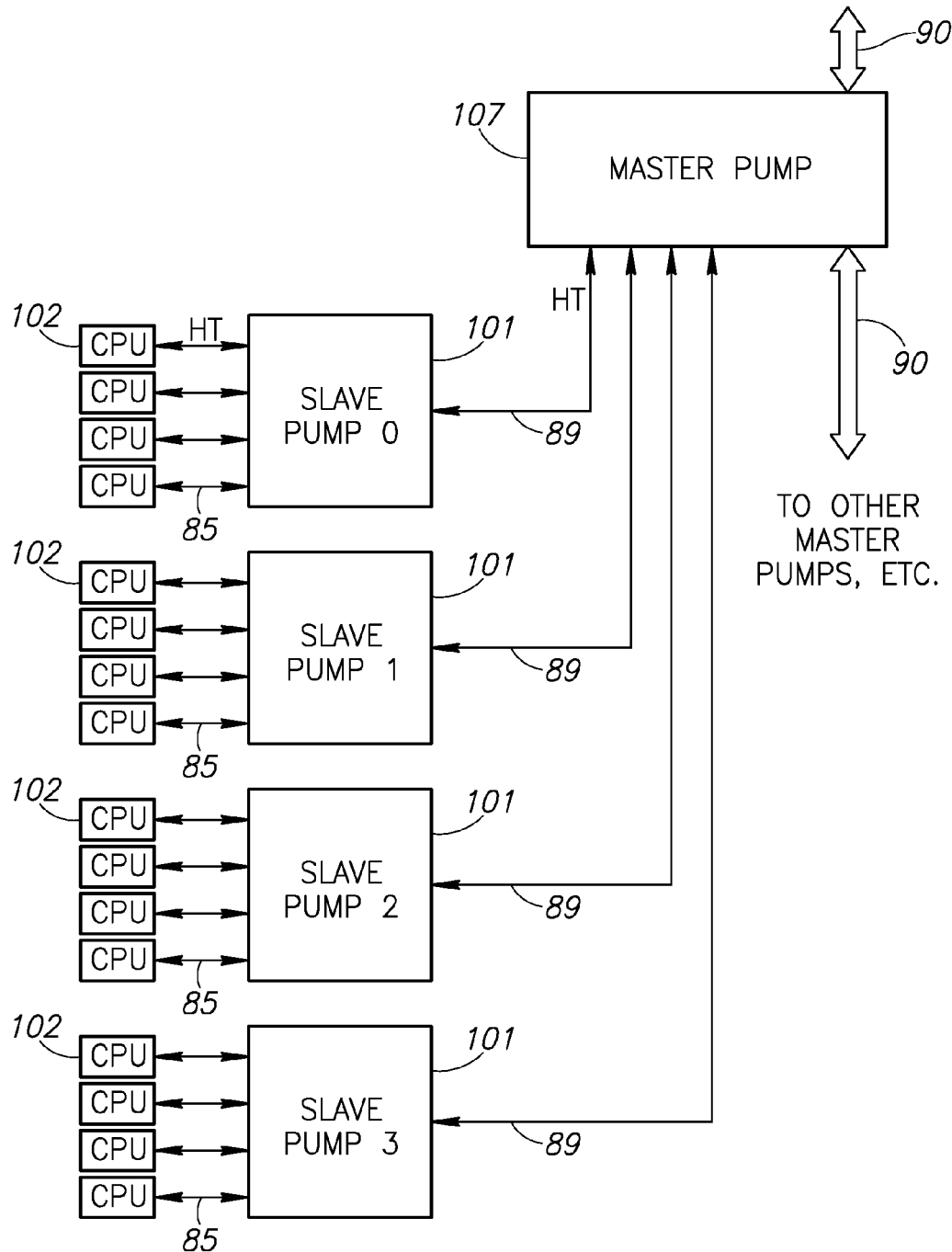

FIG. 46C depicts five instances of the PUMP device 101 or 107 from FIG. 46A, arranged in a simple tree. Four of the devices are configured as SLAVE PUMPs 101, and each of the PUMPs 101 also has four SLAVE host processors 102 attached as in FIG. 46B. As depicted, each of the SLAVE PUMPs 101 uses one of its two MASTER tunnel ports 89 (leaving the other tunnel port unconnected) to connect with one of the four SLAVE host ports on the MASTER PUMP 107. As depicted, both of the MASTER tunnel ports on the MASTER PUMP 107 are unencumbered.

8.3 PEERS—Packet Engines Enabling Routing & Switching

Figure 47:
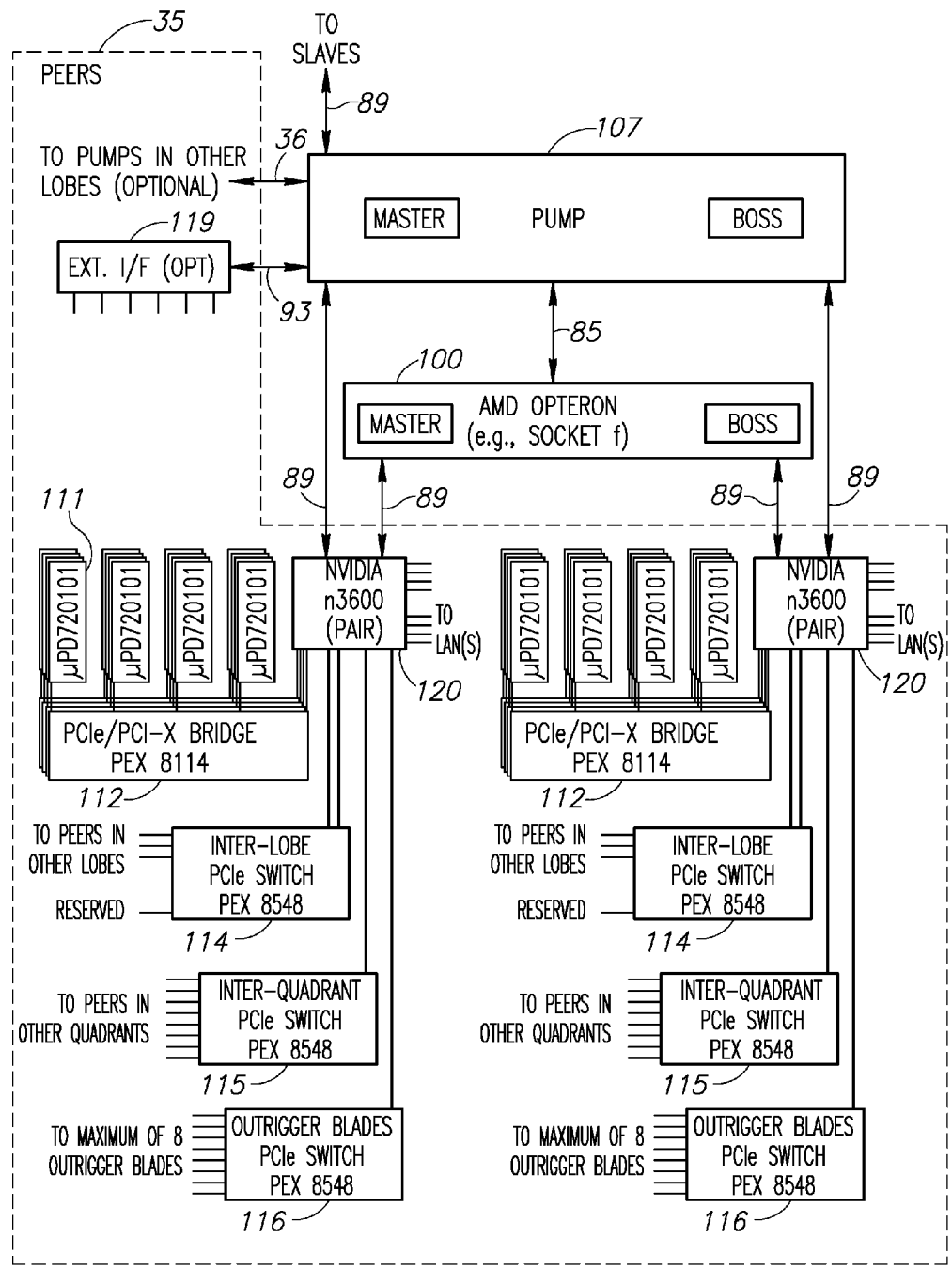

Refer to FIG. 47. Preferred Embodiment of PEERS on CHARM Lobe

8.3.1 Overview

FIG. 47 depicts a specific dual-switching-fabric implementation of PEERS, as would be contained within one lobe from one quadrant of a SCRAM node (there are four such lobes in each quadrant). The CPU 100 and PUMP 107 blocks depicted here are intended only to indicate PEERS connectivity, and are external to PEERS itself.

This particular implementation assumes the use of a processor configuration including at least 2 external HyperTransport interfaces 85 available (1 for each of the 2 independent switch fabrics). Any AMD Opteron processor trivially meets this requirement. However, a nearly identical configuration can be achieved with a single external HyperTransport interface 85 (meaning that any processor 100 with a HyperTransport interface may do, not just an AMD Opteron), as long as the HyperTransport-bridge chips selected (e.g., the nVidia chips 120 in the implementation above) implement a HyperTransport tunnel (dual bi-directional interfaces on the bridge chip 120, like 85 and 89, so they can be daisy-chained). In this example, a pair of nVidia n3600 chips 120 are already daisy-chained for each fabric, so a processor with only one HyperTransport link would require the same number of chips, but with all four of them (two pairs) in the same daisy chain.

Many variants of this PEERS implementation 35 are possible (including the use of entirely different components, and alternative connections and numbers of connections at its external interfaces), but there are a number of distinctive features that are common to an acceptable PEERS implementation, and these are noted in section 8.3.2.

Logically, each lobe has a PEERS switching & routing fabric, but in a preferred embodiment there are actually several redundant fabrics working together in an active/active configuration. In a preferred embodiment, each lobe has at least a dual fabric working in conjunction with other lobes and quadrants that also have at least a dual fabric.

8.3.2 Principle of Operation

There are at least two independent PEERS 35 switching fabrics servicing a particular Lobe's processor/PUMP configuration. In a preferred embodiment, HyperTransport is used to connect the processor/PUMP configuration to each PEERS fabric, which is primarily PCI Express (PCIe) to simplify off-board switching and routing of input/output (IO), so the primary connection to PEERS 35 is via one or more HyperTransport Bridge/Tunnel interface chips 120, which connect directly to the processor(s) 100 and PUMP(s) 107. Each HyperTransport interface is bidirectional and also double-ended (allowing configuration and control from either end).

In the configuration of FIG. 47, a representative pair of nVidia n3600 chips 120 is daisy-chained to achieve a sufficient number of bridged HyperTransport-to-PCIe connections (56 lanes) for each fabric. The particular chip pair also includes additional IO (12 SATA lanes, 4 GBE ports, and 20 USB ports) that improve the economics of the system by being available "for free" and thereby eliminating the need for some chips that may otherwise be needed.

The 12 SATA lanes from each fabric (24 lanes total) are distributed (not shown here) to the 8 Outrigger Blade positions as follows: 4 distinguished blade positions each receive a set of 4 lanes (i.e., from each of 4 lobes, for a total of 16 lanes per distinguished blade position), and all 8 blade positions each receive 1 lane (i.e., from each of 4 lobes, for a total of 4 lanes in any blade position). This supports a low-cost configuration with 8 JBOD ("just-a-bunch-of-disks") storage blades where all 8 blades can each have 4 high-capacity full-size (3.5") SATA drives, or alternatively, 4 can have 4 full-size SATA drives and 4 can have 16 small-form-factor (2.5") SATA drives.

Each of the 4 GBE ports is connected to a separate 5-port GBE switch chip (not shown), with 1 such chip for each of the 4 lobes in a quadrant, leaving 1 unused switch port which is then provided as an external port. This allows all 4 lobes in a quadrant to invisibly monitor and share the load for each external GBE port, and each quadrant externalizes 4 such ports (1 per lobe).

The 20 USB ports on each pair of nVidia n3600 chips 120 are distributed to a set of 20 internal USB connectors that provide low-latency access to (cheap) flash-based storage. Up to four PCIe/PCI-X bridges 112 (e.g., PEX 8114) account for 8 PCIe lanes from the pair of nVidia n3600 chips 120 in each fabric.

Each of the bridges 112 supports 4 NEC mPD720101 USB 2.0 host controllers 111, each of which provides a root hub with 5 downstream-facing ports, for a total of 80 additional USB ports per fabric, or 160 additional USB ports per lobe. For modularity, each set of 80 additional USB ports would typically be on a separate PCB would could be optionally omitted from a particular configuration (say, to achieve cost savings).

By default, the CHARM technology (discussed elsewhere) stores only fractional, compressed, encrypted, FEC-encoded data on each flash drive and disk drive, using multiple lobes and quadrants (plus external nodes) to distribute the information.

In each fabric of a preferred embodiment, 16 PCIe lanes from the pair of nVidia n3600 chips 120 (8 from each chip) are connected to a PCIe switch 114 (e.g., PEX 8548) whose primary purpose is to provide an 8-lane communications path to each of the 3 other lobes in the same quadrant that the lobe under discussion is in. A reserve of 8 additional PCIe lanes is provided and may be flexibly configured as needed using 1 to 4 ports (e.g., 8×1, 4×2, 4×1+2×2, 2×4, 4×1+1×3, 1×4, etc.). There is one such PCIe switch 114 for each of the lobe's switch fabrics.

In each fabric of a preferred embodiment, 16 PCIe lanes from 1 chip in the pair of nVidia n3600 chips 120 (i.e., all 16 lanes from 1 chip) are connected to a PCIe switch 115 (e.g., PEX 8548) whose purpose is to provide a 4-lane communications path to the 4 other lobes in each of the 2 other quadrants (for a total of 8 lobes). There is 1 such PCIe switch 115 for each of the lobe's switch fabrics.

In each fabric of a preferred embodiment, 16 bidirectional PCIe lanes from 1 chip in the pair of nVidia n3600 chips 120 (i.e., all 16 lanes from 1 chip) are connected to a PCIe switch 116 (e.g., PEX 8548) whose purpose is to provide a 4-lane communications path to each of the 8 Outrigger Blades that share the same quadrant the as the lobe under discussion. There is one such PCIe switch 116 for each of the lobe's switch fabrics. In this preferred embodiment, then, each of the 8 Outrigger Blades is therefore directly connected to each of the four lobes in the same quadrant via a 4-lane communications path on each of the lobe's switch fabrics. Given just 2 switch fabrics as depicted above, this means each blade has 16 lanes (4 lanes to each lobe) on each of 2 fabrics, for a total of 32 bidirectional lanes. At this writing, readily available parts allow for a rate of 2.5 Gbps in each direction, per lane, aggregating to a 32-lane total of 80 Gbps (8 GB/second) in each direction, per Outrigger Blade. In the relatively near term, this can double to a per-blade total of 160 Gbps (16 GB/second) each way as the newest PCIe standard (5 Gbps per lane) is implemented and deployed, and this embodiment may likely enjoy further speed increases over time. (Note that the per-lane PCIe rates described in this paragraph also apply everywhere else that PCIe is named).

In a preferred embodiment, HyperTransport is used to connect the processor/PUMP configuration 100 and 107 in each lobe to at least one external interface chip 119 (e.g., CRAY Seastar, or Seastar2, etc.), which may be vendor-specific and/or proprietary, and which may be used to interconnect any number of SCRAM nodes with each other, and/or with other systems. In the case of one or more SCRAM nodes acting in the role of an intelligent storage server, for example, to a much larger CRAY supercomputer, in a preferred embodiment a minimum of four SeaStar-based interfaces would be available per quadrant, and each would offer 6 high-speed links with a sustained bidirectional throughput of 6 GB/second (by comparison, a fast FC link—such as a SAN interface—is 4 Gbps, which is more than an order of magnitude slower).

8.3.3 Inter-Quadrant Connectivity

Figure 48:
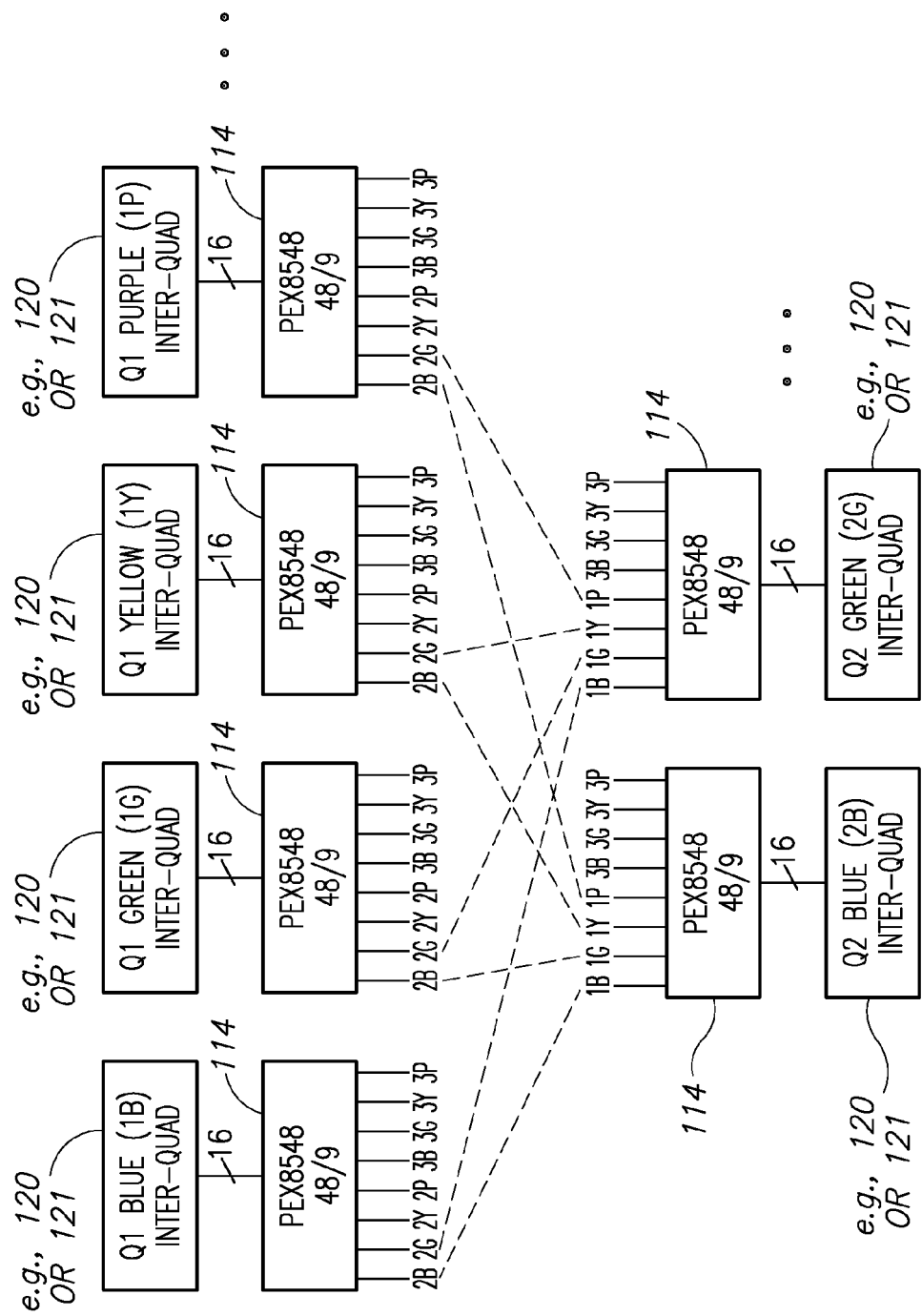

Refer to FIG. 48. SCRAM—Partial Inter-Quadrant Switch Fabric Cross-Connections (Preferred Embodiment)

FIG. 48 depicts a sample of PEERS single-fabric cross-connections between the four lobes of quadrant 1 and two of the lobes of quadrant 2, the pattern of which may be easily seen to extrapolate to all four lobes of all four quadrants. As depicted, the lobe interfaces 120 or 121 are multi-ported PCIe endpoints such as an HT-to-PCIe bridge, a portion of whose ports are connected to a PCIe switch 114, such as the PEX8548.

8.3.4 Inter-Lobe Connectivity

Figure 49:
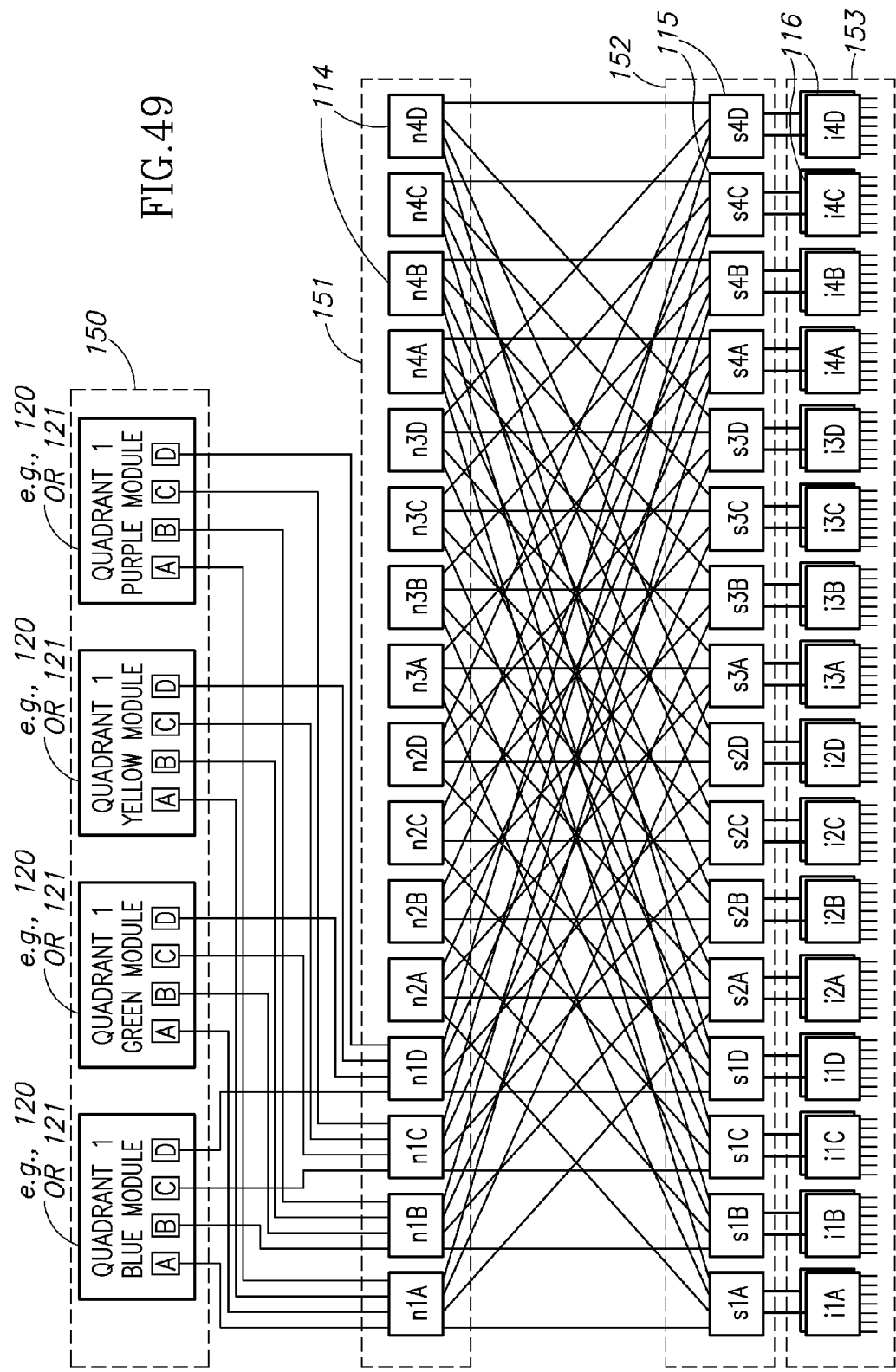
FIG. 49. SCRAM—Inter-Lobe Switch Fabric (Alternate Embodiment #1)

Refer to FIG. 49. SCRAM—Inter-Lobe Switch Fabric (Alternate Embodiment #1)

As depicted in FIG. 49, the 4 interfaces labeled A,B,C,D on each of the Quadrant 1 modules are available with COTS hardware, on a single-chip system I/O controller 120 or 121, such as the Broadcom HT-2100 (121). In the preferred embodiment, at least four independent switch fabrics are desired, with 4 or more aggregated links to each fabric. Although fewer or more links and fabrics can be used, a minimum of 4 provides robustness and enables graceful degradation in the case of hardware faults or failures. In the figure above each line depicted between the blocks represents either 4 or 8 aggregated links.

For the purposes of both incremental cost scalability and graceful degradation, in the preferred embodiment, the design is intentionally partitioned in such a way that adding modules to the system also increases the capacity for communication among the modules. This is accomplished by ensuring that the necessary fraction of the total capacity is directly available on each module, in contrast with the usual practice of placing the switching fabric on its own modules. Although the wiring of the switch fabric is more complex (especially between the "North" 151 and "South" 152 switches) than would be otherwise necessary, in the preferred embodiment the complexity can be relegated to an entirely passive wiring harness, flex circuit, or PCB.

The HT-2100 (121) has 24 PCIe links with support for up to 5 PCIe controllers, and can thus offer up to 5 independent ports, of which only 4 are needed in the preferred embodiment. Two controllers would each aggregate 8 PCIe links and two would each aggregate 4 PCIe links, using a total of 24 links (out of 24 possible), but only 4 of the 5 available controllers.

The 4 interfaces labeled A,B,C,D above correspond to the 4 PCIe controllers to be used (such as 4 of the 5 available on an HT-2100), and would each comprise either 4 or 8 aggregated PCIe links. Each of the 4 controllers would be connected to a different switch fabric chip (all 4 or 8 of the links assigned to a particular PCIe controller would connect to the same switch fabric chip).

The HT-2100 has two HyperTransport ports (16×) with an integrated tunnel. In a preferred embodiment, the HT-2100 would be interposed on the HyperTransport interface between two Scrutiny PUMP devices 101 or 107, or alternatively, between a MASTER CPU 100 and a PUMP 101 or 107, or between two MASTER CPUs 100.

In an alternate embodiment, there is a multiplicity of fabrics interconnecting the lobes and quadrants, and for each fabric there are 4 interfaces labeled A,B,C,D on each of the Quadrant 1 lobes (depicted above, and likewise for the lobes not depicted) that can be implemented via a single system I/O controller chip 120 or 121, such as the Broadcom HT-2000.

The number of interfaces (and lanes per interface) is highly dependent upon the particular combination of HyperTransport-to-PCIe bridge chips 120 or 121 used. As an example, the HT-2000 has two HyperTransport ports (16× and 8×) with an integrated tunnel. Given a homogeneous combination of HT-2000 chips, for example, the upstream 16× HyperTransport port would be connected to the processor array, and the downstream port to an optional HyperTransport device (not shown). The HT-2000 also has 17 PCIe lanes with support for up to 4 controllers. In this example, the 4 controllers would each aggregate 4 PCIe lanes, for a total of 16 lanes used. Thus, the 4 interfaces labeled A,B,C,D above would each have its own PCIe controller and each interface would comprise 4 aggregated PCIe lanes. Each of the 4 PCIe controllers would be connected to a different PCIe switch fabric chip (each set of 4 lanes would connect to the same switch fabric chip), as depicted.

8.4 FLAMERouter—Firewall, Link-Aggregator/Multiplexer & Edge Router

Figure 50:
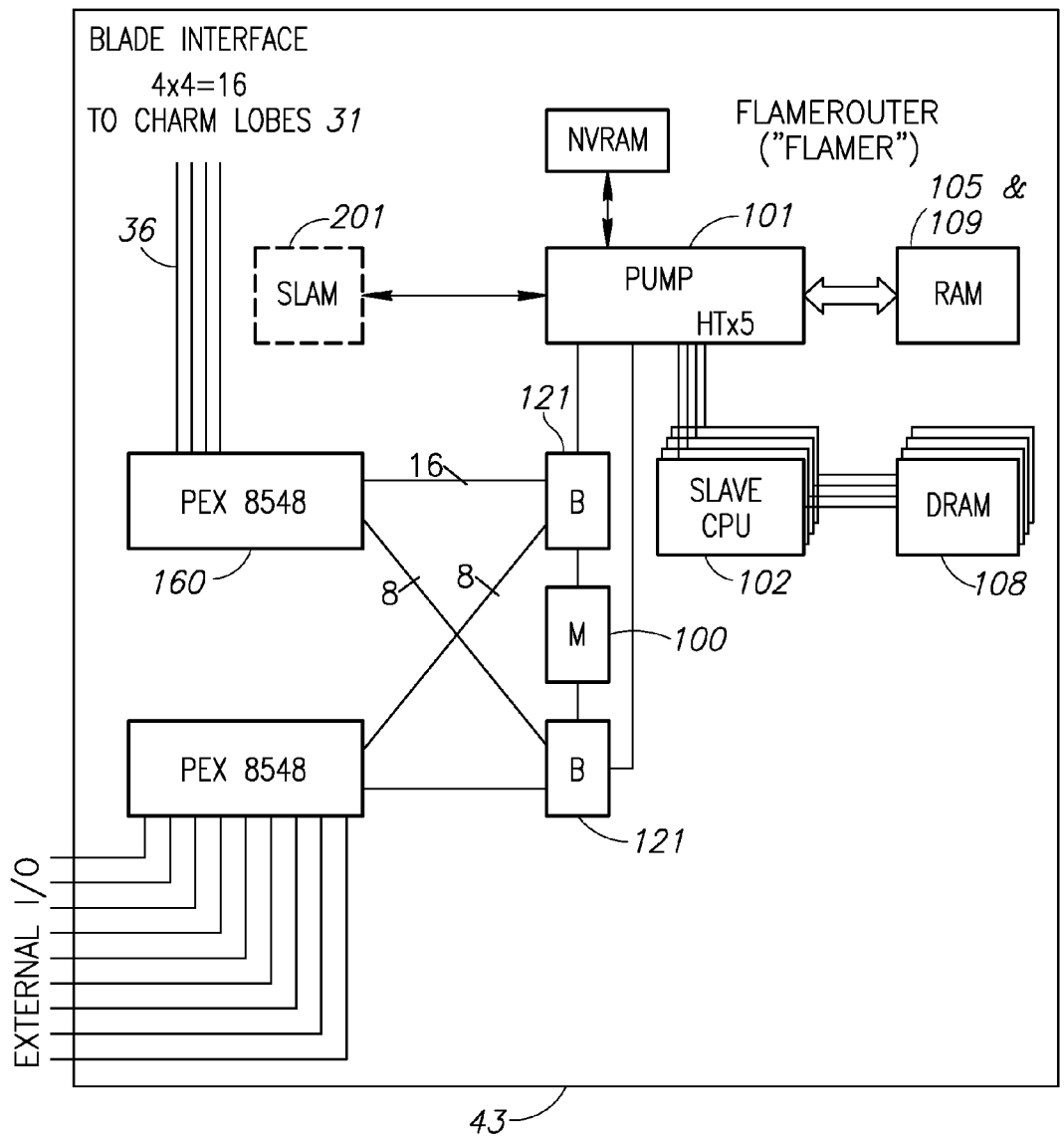
FIG. 50. FLAMERouter—Basic PCI-Express Configuration

Refer to FIG. 50. FLAMERouter—Basic PCI-Express Configuration

Figure 51:
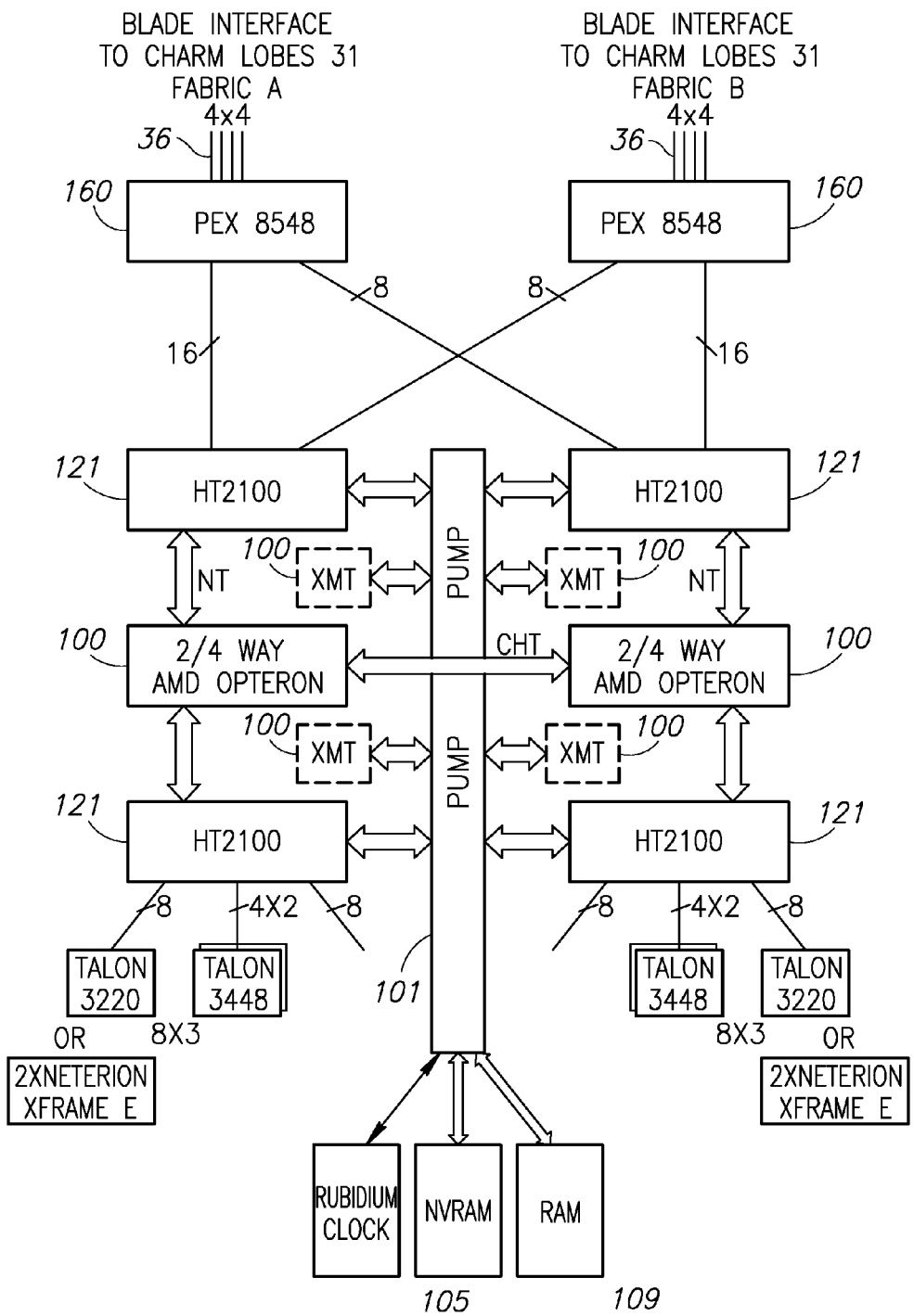
FIG. 51 FLAMERouter Blade—Opteron

Refer to FIG. 51 FLAMERouter Blade—Opteron

Figure 52:
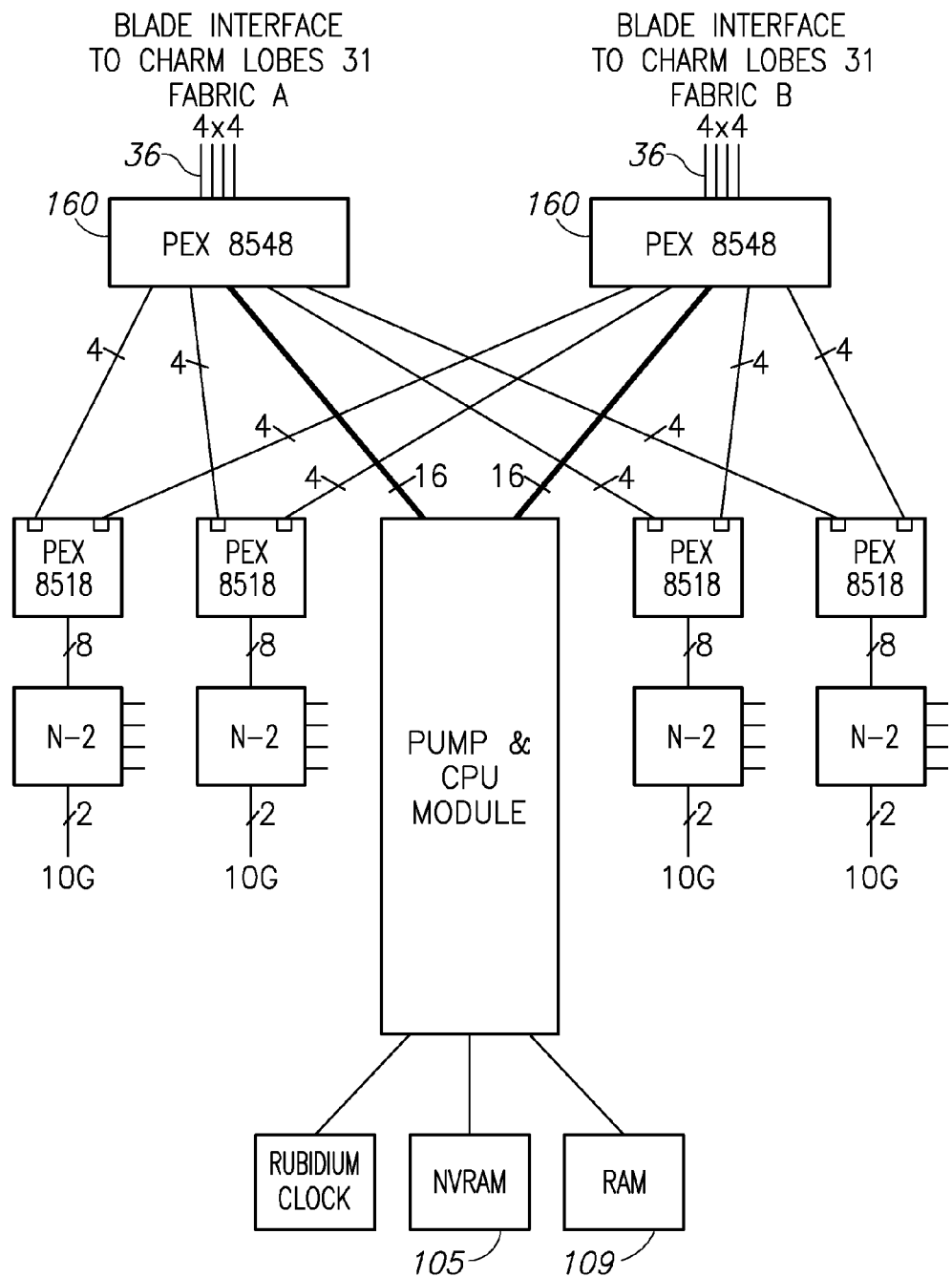
FIG. 52. FLAMERouter Blade—Niagara-2

Refer to FIG. 52. FLAMERouter Blade—Niagara-2

Figure 53:
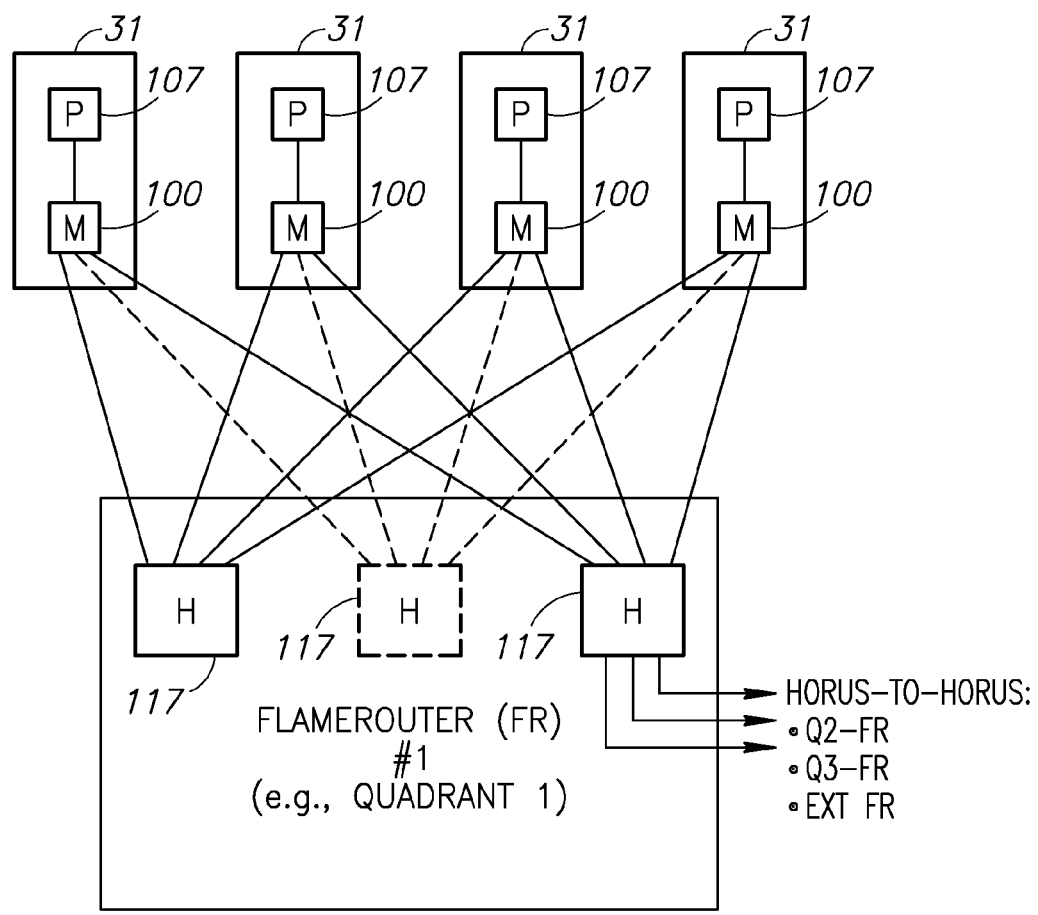
FIG. 53. FLAMERouter Blade—Interface to MASTERs

Refer to FIG. 53. FLAMERouter Blade—Interface to MASTERs

As depicted in FIG. 50, a basic quad-fabric PCIe FLAMERouter configuration as a blade includes a PCIe-based blade interface 36 with links to four different switch fabrics (four lanes per fabric, for a total of 16 lanes). These links interface to the rest of the blade through a PCIe switch 160, such as the PEX8548, which terminates redundantly in a pair of tunneling HT-to-PCIe bridges 121. As depicted, each bridge 121 connects both to a MASTER CPU 100 and a SLAVE PUMP 101 having a multiplicity of SLAVE CPUs 102 attached. In the absence of specific requirements, the specific configuration of CPUs 100, 102 and PUMPs 101, 107 is not particularly critical; example alternatives are depicted in FIG. 51, FIG. 52, and FIG. 53. FIG. 51 depicts a dual-Opteron setup, with doubly redundant PCIe interfaces to the CHARM lobes 31 via PCIe switches 160, while FIG. 52 depicts the same doubly redundant PCIe interfaces as FIG. 51, but with a quad-processor configuration based on Niagara-2 ("N-2") processors. FIG. 53 depicts an arbitrary FLAMERouter processor configuration where the interface to the CHARM lobes 31 of the main system is based on the Horus HyperTransport device 117.

As depicted in FIG. 50, the bridges 121 also connect to a second PCIe switch that provides multiple interfaces to high-speed external I/O as appropriate.

Due to timing requirements in its implementation of communications protocols (e.g., RUSH, RECAP, UNCAP), the FLAMERouter is a consumer of high-accuracy PPS (pulseper-second) signals. For this reason, a Rubidium clock module (such as the commercially available Symmetricom X-72) could be optionally placed on the blade as part of a SLAM module 201 (which would synthesize a PPS signal that is also synchronized and phase-locked with international time signals available from GPS and other satellites, terrestrial radio, etc.). In a preferred embodiment, however, the composite PPS signal source(s) would be located more centrally in the system chassis, with the PPS signals distributed to blades such as the FLAMERouter.

8.5 FIRE—Fast Index & Repository Emulator

Figure 54:
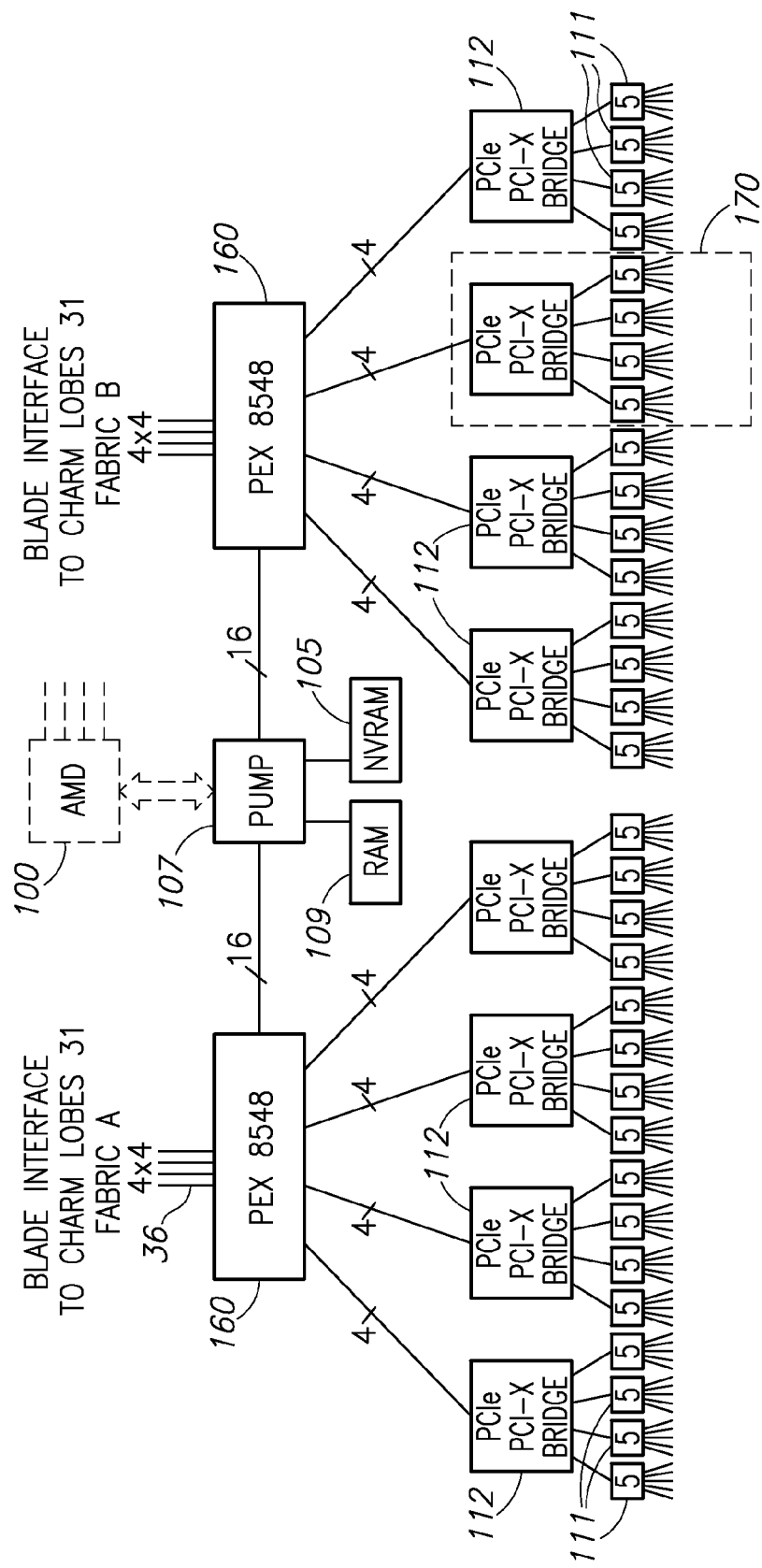
FIG. 54. FIREdrive Blade ("FIREblade")

Refer to FIG. 54. FIREdrive Blade ("FIREblade")

Figure 55:
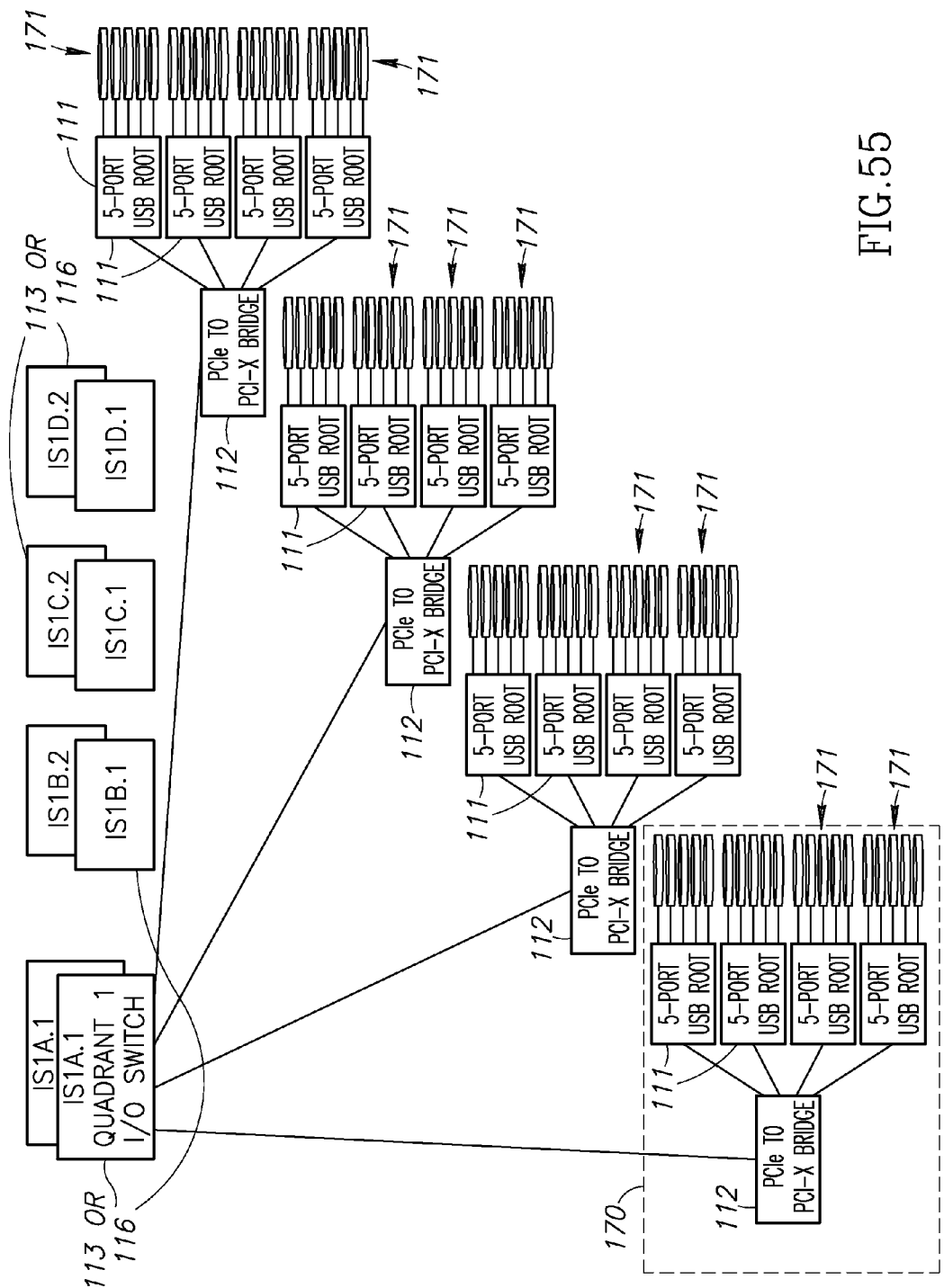
FIG. 55. SCRAM—I/O Switch Interface to USB Flash Memory (Preferred Embodiment)

Refer to FIG. 55. SCRAM—I/O Switch Interface to USB Flash Memory (Preferred Embodiment)

Figure 56:
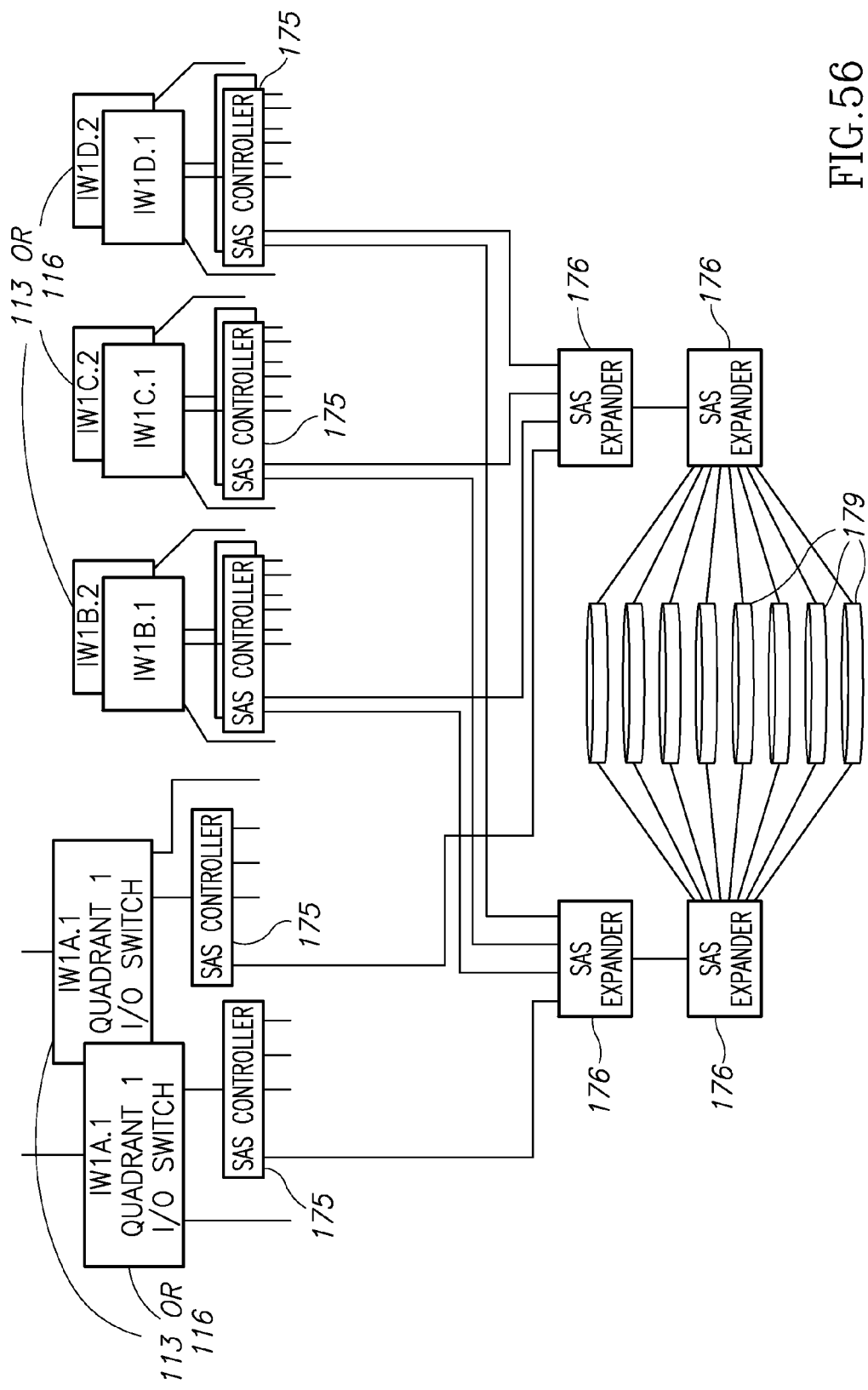
FIG. 56. SCRAM—I/O Switch Interface to SAS Subsystems (Alternate Embodiment)
Figure 58:
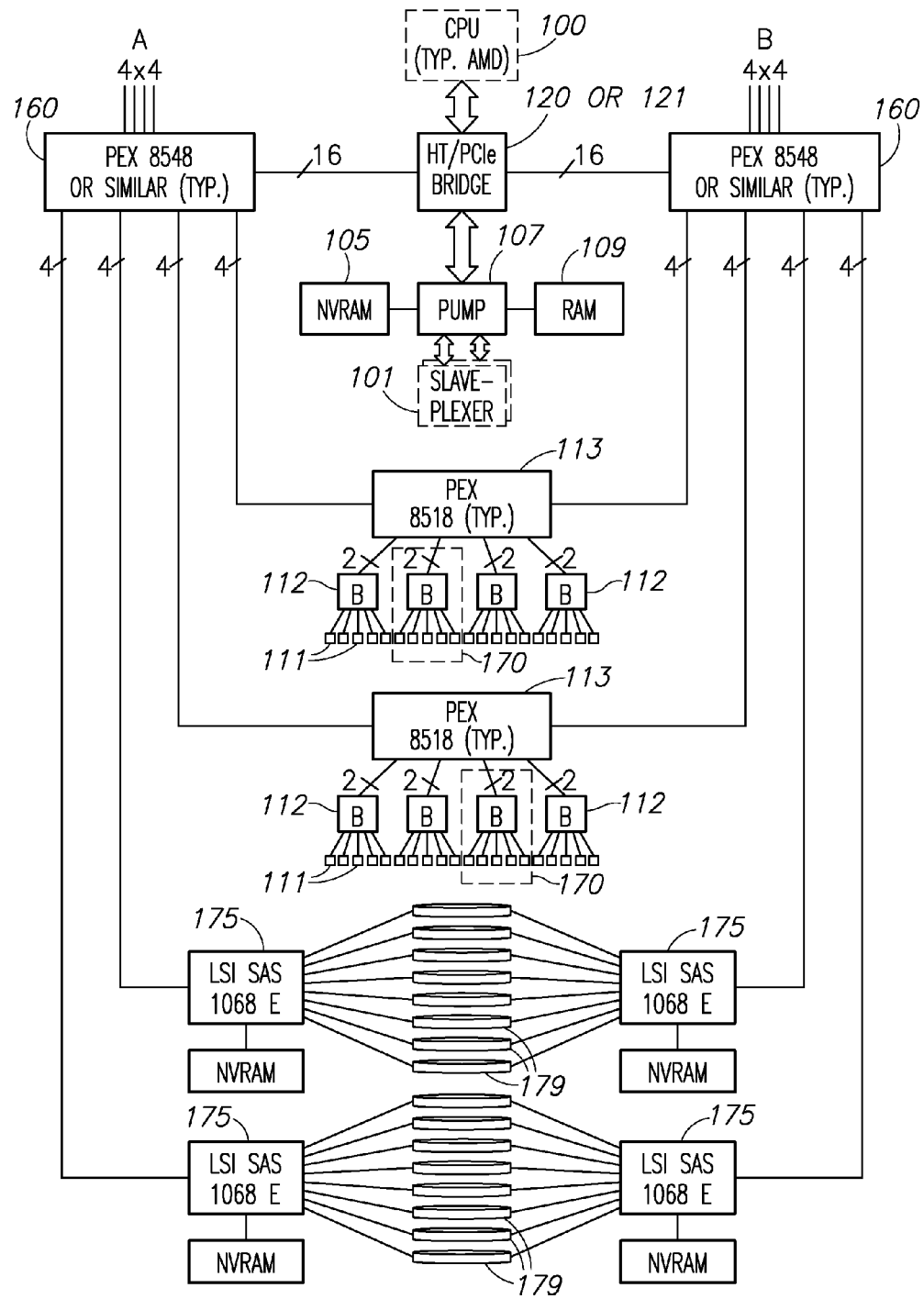

The FIREdrive referred to in FIG. 54 (blade configuration) and FIG. 55 (internal configuration) is essentially a highly parallel SSD-based data storage system, tuned to massively parallel transactions. FIG. 54 depicts the same doubly redundant PCIe interfaces as FIG. 51 and FIG. 52, but for a FIREdrive blade containing USB flash memory, rather than a FLAMERouter networking blade. FIG. 55 depicts an alternative view of the same USB flash memory subsystems, but interfacing to internal I/O switch interfaces 113 or 116 rather than blade interfaces 160. A key distinction between the blade implementation of FIG. 54 and the internal implementation of FIG. 55 is that the blade has local intelligence with a MASTER CPU 100 and a MASTER PUMP 107, and associated RAM 109 and NVRAM 105 (this local intelligence may also be implemented as depicted in FIG. 58). As depicted in both FIG. 54 and FIG. 55, each I/O switch 160, 113, or 116 supports 4 USB flash drive subsystems 170, for a total of 8 USB flash drive subsystems 170 per CHARM lobe 31. (Note: In addition to the 4 PCIe-to-PCI-X bridges 112 depicted in FIG. 55, each switch 113 or 116 also supports 2 SAS controllers as depicted in FIG. 56, and these may alternatively be replaced with additional USB flash drive subsystems 170, to double the aggregate I/O performance and storage capacity. Each subsystem 170 has 20 USB flash drives (each on its own USB channel). With 4 CHARM lobes 31 per each quadrant 30 (as depicted in FIG. 5), each quadrant 30 thus has 32 such USB flash drive subsystems, for a total of 640 internal USB flash drives per quadrant, with a total per-quadrant capacity of 1.2 TB using 2 GB drives, 2.5 TB using 4 GB drives, 10 TB with 16 GB drives, or 40 TB with 64 GB drives. The key performance driver is the large number of independent channels acting in parallel, rather than the relative performance or capacity of individual flash drives. If sufficiently slow USB flash devices are used, multiple devices may be used per USB device channel without overloading the channels.

Read Performance: 640 drives/quadrant @ 25 MBps (assuming somewhat better-than-average USB flash drives of any storage capacity)=16 GBps (128 Gbps) per quadrant. The performance constraint here is each individual USB flash drive and link, not the aggregate bandwidths along the other communications paths. Write Performance: 640 drives/quadrant @ 10 MBps (minimum)=6.4 GBps (49 Gbps) per quadrant, or 147 Gbps sustained throughput per chassis. The overall read/write performance thus enjoys linear speedups in sync with device performance; with a "better" device (e.g., 50% faster), overall write performance would also be approximately 50% higher, at 9.6 GBps minimum per quadrant (based on 15 MBps typical, per drive). IOPS Performance @ 4 KB: Assuming 4 KB per IO and a conservative 10 MBps per drive for both read & write, each drive would be capable of about 2500 IOPS. 640 drives/quadrant @ 2500 IOPS/drive=1.6 million IOPS per quadrant or over 4.8 million IOPS per 3-quadrant chassis. These rates compare favorably with the 7680 IOPS per quadrant achievable with high-performance SAS drives, which are 166× slower. IOPS Performance @ 1 KB: When using smaller I/O sizes the number of IOPS increases accordingly. For example, a normal SHADOWS FASTpage index may access 1 KB increments, rather than 4 KB increments, so the number of IOPS per quadrant would increase by 4×, to 6.4 million IOPS per quadrant (assuming 640 channels per quadrant). Furthermore, given a "better" USB flash drive (say, for example, 23 MBps vs. 10 MBps, assuming 80% reads and 20% writes), this could improve further by a factor of 2.3×, to more than 14 million IOPS per quadrant. (Note that some of the better USB flash drives claim speeds of up to 34 MBps read and 21 MBps write).

Note that these approximations of I/O rates are tied to the read/write access speeds of the USB flash drives, regardless of the storage capacity of the drives. Thus, small, cheap flash drives can be very effective for improving throughput. Since the system was designed to accommodate a very large number of flash drives, high capacities can be achieved by aggregating many small, cheap drives with contention-free access paths.

Affordability (2007): A single quadrant fully populated with 640 cheap 2 GB flash drives ($15 each in 2007) would yield more than 1.2 TB of flash memory performing 1.6 million IOPS for under $10,000. If high-performance 4 GB drives were used instead (about $30 each), a single quadrant would yield 2.5 TB of flash for under $20,000. However, the better drives are also at least twice as fast (23 MBps vs. 10 MBps, assuming 80% reads and 20% writes), so the performance would double to 3.2 million IOPS for the same $20,000. Although this discussion contrasts the capacities achievable using 2 GB and 4 GB USB flash drives (yielding 1.2 TB and 2.5 TB of storage, respectively, per quadrant), these are by no means the maximum capacities. Rather, these capacities represent a "sweet spot" where useful capacity is available at a reasonable price. As 8 GB and larger flash drives move into the sweet spot, the increased flash-based total capacity is enough to match the total capacity available when using high-performance SAS 64 GB hard disk drives (2007). However, in terms of IOPS, the flash drives are orders of magnitude faster. Even in 2007, however, flash drives are available in capacities up to 64 GB per drive, and these would increase the flash-based storage capacity to more than 40 TB per quadrant.

8.6 NEAR—Nearline Emulation & Archival Repository 8.6.1 Central Concept

Nominally (excluding internal self-maintenance activities), at most one minimally redundant logical copy of the nearline data is normally spun up anywhere in the system; extra redundant storage is spun down. In a preferred embodiment, the duty cycle approaches a limit of k/n, where the storage is FEC-encoded with an (n,k) erasure code that is used to establish redundancy, and where the survival of any k of the n fragments is sufficient to guarantee successful retrieval. Nearline storage is maintained on a spun-down basis.

8.6.2 Basic Concepts

1. In a preferred embodiment, SHADOWS NEARdrives are used only for nearline storage, and contain only immutable objects (and more precisely, only encrypted, FEC-encoded fragments of objects).

2. Storage drives are preferably dual-ported, or connect to a dual- or multi-ported multiplexer.

3. Drives are usually spun down, especially those used by SHADOWS. In a preferred embodiment, after a drive is no longer needed for the current session (i.e., after hand-off has occurred, but prior to actual spin-down), the drive's SMART data is analyzed to characterize its failure potential, and then partly based on the results, the drive is tested further, maintained, and possibly repaired, under automated control. Afterward, it is spun down. Additional detail on this process appears in a later section.

4. At least two local physical drives are distinguished as the active drives. Each user's space is available as a compressed, secure (encrypted) virtual volume on these drives. The drives are "owned" and managed by separate MASTERs on separate system boards.

5. Active user space is always duplexed/mirrored across the active drives, which optionally spin down when idle (in a preferred embodiment, this is the default behavior), but with a fairly long delay period (modified dynamically by predictive heuristics that track user behavior).

6. Only a portion of any drive is available as active space (say, for example, 200 GB out of 300 GB total).

7. All data in user space is also pushed to the SHADOWS network in accordance with the SLA and policy, preferences, etc.

8. In the event of an active drive failure, one of the non-active drives may be immediately spun up and synchronized. During synchronization, data equivalent to that normally retrieved from the failed drive (i.e., FEC-encoded fragments, etc.) may be sought from the SHADOWS network as needed.

9. All writes intended for non-active drives may be queued onto the active drives. When a safe (i.e., adequately short, but not too frequent) delay has elapsed for a particular non-active drive, it may be spun up and synchronized with the active drives (which may then be cleared of queued data).

10. Non-active drives may be spun up occasionally for data retrieval, if the information cannot be retrieved from other sources (e.g., flash memory, active drives, etc.).

11. The active drives cache mutually exclusive entries (objects) that already exist on the non-active drives. In a preferred embodiment, this is complemented by the presence of flash-based (or equivalent) caching of high-demand objects, also on a mutually exclusive basis. Mutual exclusivity maximizes the caching effect—preventing redundant caching enables more objects to be cached in a given amount of space.

12. The active drives redundantly cache all objects that do not exist on the non-active drives. Such objects are also cached in higher levels of memory and storage, at least until safely distributed and stored in accordance with storage policy (and any applicable SLAs).

13. Periodically (and with a fairly long period), the active drives may be rotated (one at a time), so that, except initially, there is always an "old one" and a "new one." The long period minimizes start/stop cycles, and the rotation levels the wear and MTTF.

14. If a system board fails, its buddy assumes its role and spins up one of its non-active drives (making it active), then queues its buddy's data to its own newly active drive. Although it could potentially write directly to its buddy's drive (if dual-ported), the point is that its buddy might not really be dead, and conflict is to be avoided. A buddy's drives can be read-accessed at any time, however, if necessary.

15. If further analysis determines that a buddy has truly failed (and this requires voting, etc., and coordination via BOSS), a system board can indeed take over the buddy's drives, after consensus (under the auspices of BOSS) has put the buddy into a "fenced" state such that it "can do no harm."

16. During high-performance activities, such as when the nearline storage system is needed to behave like an "online" storage system, more (perhaps all) drives may be spun up (but staggered to reduce inrush current) in order to obtain an amplified striping effect.

8.6.3 NEARdrive—Preferred Embodiments

Refer to FIG. 56. SCRAM I/O Switch Interface to SAS Subsystems (Alt. Embodiment)

Figure 57:
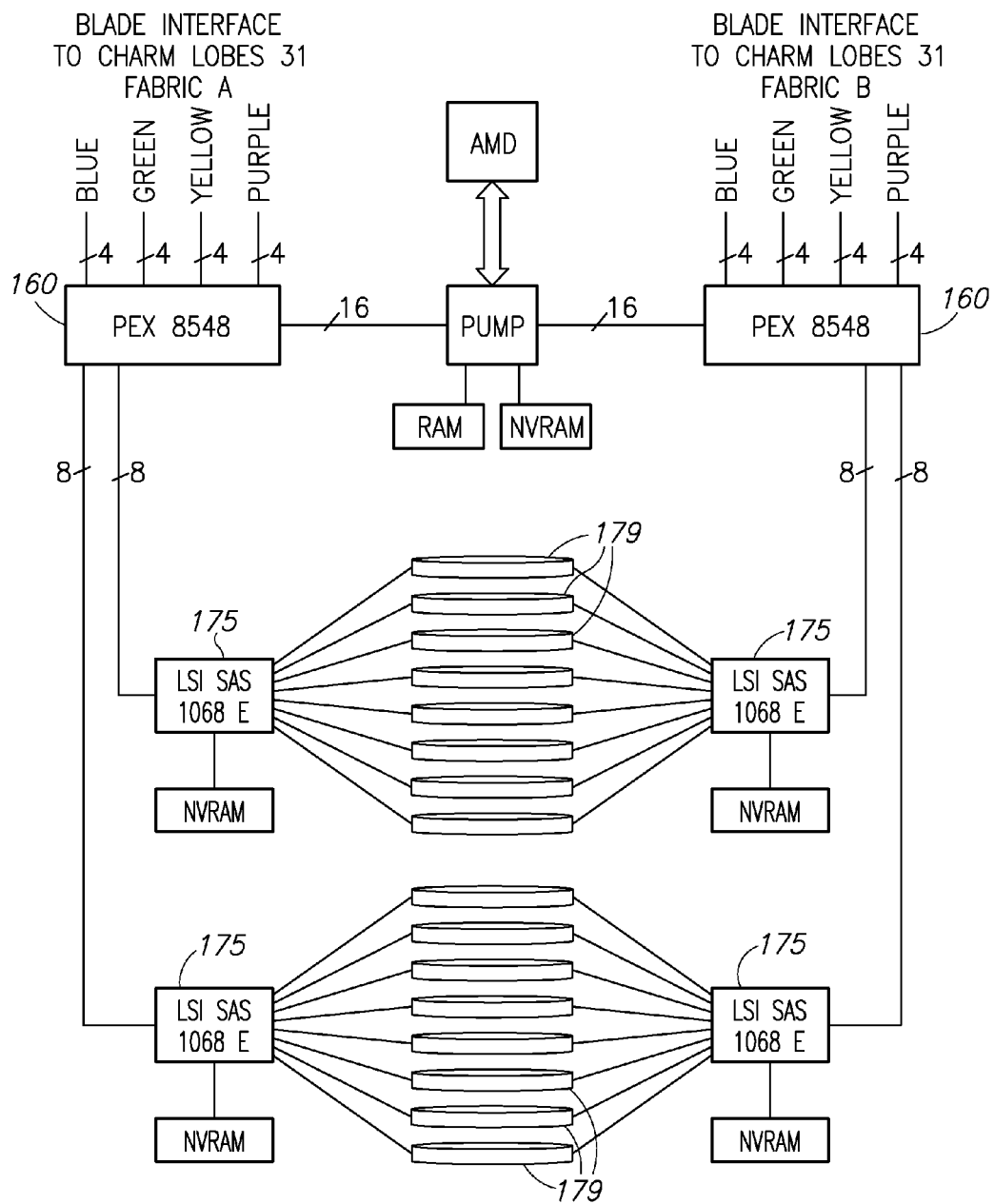
FIG. 57. Outrigger Blades—NEARdrive Blade (NEARdrive or NEARblade) Configuration FIG. 58. Outrigger Blades—NEARFIRE Blade (Hybrid of NEARblade & FIREblade) Configuration FIG. 59. FACTUAL—Intercepting a SHADOWS Native Process FIGS. 60A & B. FRAME Technology Overview FIG. 61. SLAM—SCADA, Logging, & Authorization Module (Possible Embodiment)

Refer to FIG. 57. Outrigger Blades—NEARdrive Blade ("NEARblade") Configuration

The NEARdrive referred to 8.6.2 and depicted in FIG. 56 (internal configuration) and FIG. 57 (blade configuration) is essentially a high-density disk-based data storage array, tuned for maximizing survivability of massive amounts of long-term data. Because the disk drives devices are often spun down, the apparent behavior of the NEARdrive seems to emulate that of "nearline" drives. FIG. 56 depicts an internal configuration similar to that of FIG. 55, but for disk-drive devices rather than USB flash drives. FIG. 57 depicts the same data blade-oriented PCIe interfaces as FIG. 54, but for a NEARdrive blade containing disk drives, rather than a FIRE-drive blade containing USB flash memory. A key distinction between the blade implementation of FIG. 57 and the internal implementation of FIG. 56 is that the blade has local intelligence with a MASTER CPU 100 and a MASTER PUMP 107, and associated RAM 109 and NVRAM 105 (this local intelligence may also be implemented as depicted in FIG. 58). As depicted in both FIG. 56 and FIG. 57, each I/O switch 160, 113, or 116 supports at least 2 SAS controllers 175, each with 4 arrays of 8 dual-ported drives 179, for a total of 8 drive arrays (64 drives) accessible to each CHARM lobe 31. (Note: Each switch 113 or 116 depicted in FIG. 56 also supports 4 USB flash drive subsystems 170, in addition to the 2 SAS controllers 175 shown, and these may alternatively be replaced with additional SAS controllers and drive arrays to double the aggregate I/O performance and storage capacity of the SAS drive arrays). FIG. 56 depicts the use of a pair of back-to-back SAS Expander devices 176 so that each port of each drive in an 8-drive array has an interface to each of a quadrant's 4 CHARM lobes 31. In the NEARdrive blade configuration depicted in FIG. 57, SAS Expanders are not used; the SAS Controllers 175 interface directly to the doubly redundant blade interface switches 160, and these interface directly to each of the quadrant's 4 CHARM lobes 31, just as other blades 40 do (see FIG. 51, FIG. 52, FIG. 54). As depicted in FIG. 56 and FIG. 57, each 8-drive SAS array is accessible by any CHARM lobe 31 via any of 4 independent switch fabrics 160, 113, or 116, over either the "West" switches (shown) or the "East" switches (not shown). Each quadrant supports any mix of 64 dual-ported internal SAS or SATA disk drives, organized as 8 arrays of 8 drives each, for a raw capacity of 9.3 TB per quadrant with 146 GB SAS drives (12.8 TB with 200 GB SATA drives). The "West" I/O switches 113 or 116 shown in FIG. 56 support 4 such 8-drive arrays, with the "East" switches supporting the other 4 arrays. Since any of a quadrant's 4 CHARM lobes 31 can access any of the quadrant's 64 disk drives, any 3 of the 4 lobes 31 can fail without losing access to any of its 64 drives.

Three primary preferred NEARdrive embodiments are envisioned as most useful, a small, vacuum-sealed steel can, a "full-sized" storage "blade" or module, and a "Mini" version that has approximately the same dimensions as a single full-sized 3.5-inch disk drive:

| | |
|---|---|
| NEARdrive Blade ™ | Multi-fabric PCIe interface, with $2^n$ drives ($2 <= n <= 16$) |
| NEARdrive Mini ™ | SAS and/or SATA interface(s), with $2^n$ drives ($2 <= n <= 3$) |
| NEARdrive Can ™ | SAS and/or SATA interface(s), with $2^n$ drives ($2 <= n <= 3$) |

8.6.3.1 NEARdrive Blade™

In a preferred embodiment, NEARdrive Blade implementations for the following storage configurations would be typical:

| Configuration | Description |
|---|---|
| 4-drive, Low cost | 4 matching full-size (3.5 inch) SAS or SATA drives, any capacity |
| 4-drive, Hybrid | 4 matching full-size (3.5 inch) NEARdrive Mini drives, any capacity |
| 16-drive, Typical | 16 matching 2.5 inch SAS or SATA drives |
| 16-drive, Hybrid | 16 matching 2.5 inch drives (4 SAS, 12 SATA) |

In a preferred embodiment, each NEARdrive Blade has the same form factor, with the approximate dimensions of 7"H× 2.5"W (thick)×9"D. This is sufficient to accommodate up to four full-sized (3.5 inch) drives or at least 16 small form factor (SFF) drives (2.5" or smaller).

In a preferred embodiment, sufficient ports are available so that the drives on each NEARdrive Blade may be single-ported or dual-ported (up to 300 Gbps each in the current state of the practice, but this is not limited by the invention).

Each NEARdrive Blade includes redundant SAS controllers, such that dual-ported drives are connected to independent controllers and switches within the blade.

Each NEARdrive Blade may optionally configured to be "intelligent," with its own NEARdrive controller and switching logic, which case it has its own local MASTER (and possibly includes CHARM processing logic), or it may be "switched only," in which case it operates under the control of a nearby MASTER.

8.6.3.2 NEARdrive Mini™

Each NEARdrive Mini typically comprises a NEARdrive controller, and either four matching 2.5-inch SAS/SATA drives or eight matching smaller SAS/SATA drives. With eight smaller drives, a hybrid configuration such as 4 SAS and 4 SATA drives is possible.

Each NEARdrive Mini has a conceptual or actual "buddy" (which may not be available).

Each NEARdrive Mini is responsible for its own 4 or 8 drives, but can, in a preferred embodiment, directly access the 4 or 8 drives of its buddy.

8.6.3.3 NEARdrive Can™

In a preferred embodiment, NEARdrive Can implementations for the following storage configurations would be typical:

| Configuration | Description |
|---|---|
| 4-drive, Low cost | 4 matching 2.5" SAS or SATA drives, any capacity |
| 6-drive, Hybrid | Same as above, plus 2 matching 1.8" SATA drives |
| 8-drive (double-height) | 8 matching 2.5" SAS or SATA drives, any capacity |
| 12-drive, Hybrid | Same as above, plus 4 matching 1.8" SATA drives |

Each NEARdrive Can has the same form factor, with the approximate dimensions of 3.25" diameter×6"H (12"H for double-height can). The standard height can is sufficient to accommodate at least 4 small form factor (SFF) drives (2.5" or smaller), plus 2 smaller 1.8" drives (optional).

In a preferred embodiment, each NEARdrive Can communications interface comprises a single 12-lane data connector that can support any combination of single-ported or dual-ported drives (up to 300 Gbps each in the current state of the practice, but this is not limited by the invention) requiring 12 ports or less. The number of lanes supported is arbitrary and can be reduced or increased as necessary, of course. In the preferred embodiment, one of the goals is to maximize the data throughput and IOPS during peak periods, which requires a minimum of 1 lane per physical drive (2 for dual-ported drives).

In an alternate embodiment that minimizes the host interface requirements, the number of connector lanes is reduced to 1 or 2, and 1 or 2 multiplexers are embedded inside the NEARdrive Can. The multiplexers allow switching between the contained disk drives based on software control mechanisms (SATA or SAS protocols).

Each NEARdrive Can requires an upstream host adapter channel for each lane in the data connector.

Each NEARdrive Blade may optionally configured to be "intelligent," with its own NEARdrive controller and switching logic, which case it has its own local MASTER (and possibly includes CHARM processing logic), or it may be "switched only," in which case it operates under the control of a nearby MASTER.

8.6.4 NEARdrive Thermal Stabilization to Avoid Thermal Stress

Given the data from the Google study of 100,000 disk drives, we draw somewhat different conclusions than those of the authors with regard to the effect of temperature on the annual failure rate (AFR) of disk drives in a data center environment. Our view of the Google data is that it indicates that the lowest failure rates occur in the moderate temperature range of 30° C. to 45° C., and particularly in the range 35° C. to 40° C. The Google authors conclude that at such moderate temperature ranges it is likely that there are other effects which affect failure rates much more than temperature, and we concur.

The Google authors further observe that temperatures outside this moderate range tend to increase the failure rate. While it is obvious that increased temperatures can increase the failure rate, they had no explanation for why lower temperatures would also apparently increase the failure rate. However, the problematic lower average temperatures cited (15° C. to 30° C.) seem unlikely to occur in spinning drives in a busy data center—it is far more likely that the lower average temperatures indicate the occurrence of thermal cycling (such as what would occur when systems or drives are powered up and down, or when drives are spun down by BIOS power saving settings). Since there is no apparent electronics phenomenon that would account for an increase in failure rate due to such moderately reduced temperatures (in fact, moderate temperature reductions are normally expected to decrease the failure rate of electronic devices), it is far more likely that the significantly increased failure rate is due to thermally induced stress. (Note: In fact, intentionally induced thermal stress is a primary technique used during accelerated life cycle testing to force failures.).

In a preferred embodiment, the NEAR technology can be integrated with the SHADOWS RUBE technology (described elsewhere), so that a working fluid is actively circulated through the NEARdrive (Blade or Mini) and among its components, in order to provide thermal stabilization and thereby minimize thermal stress. (Note: RUBE (Recuperative Use of Boiling Energy) is part of the FRAME (Forced Recuperation, Aggregation & Movement of Energy) subsystem.). In a preferred embodiment, the boiling point of the working fluid is 34° C. (at STP, and slightly higher at mildly elevated pressures, making the effective range approximately 34° C. to 40° C.), and the RUBE technology supplies an appropriate combination of liquid and vapor according to how much cooling or heating is needed. If the NEARdrive components approach or exceed a target temperature, they act as a heat source and are efficiently cooled by the fluid as it changes phases; on the other hand, if the components drop below this temperature (such as when they are spun down), they act as a heat sink and are efficiently kept heated by the fluid as it phase-changes the other direction—thus, the fluid greatly increases thermal stability. When drives are spun up after a period of non-use, they are already warmed up and ready to go without thermal stress.

8.6.5 NEARdrive Thermal Stabilization to Prevent Thermally Induced Read Errors

Another important impact of NEARdrive's thermal stabilization, with respect to drive reliability, has less to do with outright drive failure and more to do with preventing read errors in the first place. Thermal variation can affect the relative head alignment between writing and reading operations. If the head is directly aligned with the track, performance is relatively good; as the head moves off-track, the performance drops markedly as the magnetic remnant components of previously written data are read back along with the newly-written signal, leading to the potential for increased read errors. Thermal stabilization helps to sidestep this particular threat vector.

8.6.6 Periodic Analysis of Drive SMART Data

Industry-standard disk drives provide various self-monitoring signals that are available through the SMART standard interface. SMART detects and reports on various indicators of reliability. SMART enables a host processor to receive analytical information from the disk drive that may be useful for anticipating failures.

Industry-based empirical analysis of a very large number of drives in a well characterized data center environment indicates that some signals appear to be more relevant to the study of failures than others, and this is confirmed by the Google study referred to in the previous section.

In a preferred embodiment, the NEARdrive analysis of SMART data available from each disk drive focuses first on indicators whose "critical threshold" values were established with high confidence (>95%) by the Google study, as summarized in Table 5:

TABLE 5

SMART Indicators with High-Confidence Critical Threshold Values

| Indicator Description | Critical Threshold | Observed Consequence |
| --- | --- | --- |
| Background surface scans | Scan Errors >0 | 39x as likely to fail <=60 days |
| Background scrubbing | Offline Reallocs >0 | 21x more likely to fail <=60 days |
| Suspected bad sectors | Probational Count >0 | 16x more likely to fail <=60 days |
| Sectors remapped OTF | Realloc. Count >0 | 14x more likely to fail <=60 days |

The Google study noted, however, that it is unlikely that SMART data alone can be effectively used to build models that predict failures of individual drives, given that over 36% of all failed drives had zero counts on all four of these SMART variables. Thus, while a non-zero count is highly predictive of imminent failure of the corresponding drive, a zero count does not ensure that all is well. However, the NEAR technology can put this information to good use, as described in section 8.6.8.

8.6.7 Predictive Statistical Properties of Disk Drive Failures

In a 2006 study of large-scale supercomputer clusters and ISPs, CMU researchers analyzed the data from a 765-node supercomputer cluster with 3,060 CPUs, 3,060 DIMMs, 765 motherboards, 3,406 disk drives, and other components— over a 5-year period (the useful life of a disk drive). The CMU researchers were able to draw a number of important conclusions (which are applied in a novel way by the NEAR technology, as described in section 8.6.8):

Disk drive failure was the third most likely cause of node outage, accounting for 16% of such failures, with approximately 90% of the drive failures being permanent, and thus requiring time-consuming and expensive repair actions. Although CPU failures and DIMM (memory) failures accounted for more node outages (44% and 29%, respectively), they were "only" transient failures mostly triggered by parity errors that required "just" a reboot to bring the failed node back up. (Note: According to the CMU researchers, the number of errors was too large to be corrected by the embedded ECC. This fact is particularly relevant for SHADOWS, since it provides further justification for the SHADOWS ECC and FEC-based error correction strategies, described elsewhere.).

Comparing the relative frequency of hardware component failures that required replacement, the four known hardware components that failed most frequently, in descending order, were disk drives (30.6%), memory (28.5%), CPUs (12.4%), and motherboards (4.9%). (Note: From our own experience with memory systems, we believe that the failure-induced memory replacement rates are likely to be artificially high, since DIMMs are often replaced in an attempt to stem an unexpectedly high number of ECC errors, despite the fact that the errors are actually transient and can only be overcome by improving the ECC correction capability, which is the very premise of Chipkill-style ECC, with its hundred-fold reduction in uncorrectable errors. It is very likely that with an appropriate level of ECC, memory failure rates would drop significantly below CPU failure rates, which is highly intuitive, since CPUs tend to run hot and are more likely to suffer from thermal-induced failures. In the event that inferior ECC does not sufficiently account for the memory failure rates, there is a strong likelihood that memory overheating is a significant factor, and such a problem usually must be dealt with as a design consideration.). Miscellaneous and unknown replacements accounted for another 14.4%.

Even during the first few years (<3 years) of a system's lifetime, when wear-out is not expected to be a significant factor, the datasheet MTTF and observed MTTF can vary by as much as a factor of 6.

Contrary to common and proposed models, disk drive failures don't enter steady state after the first year of operation. Instead, failure rates seem to steadily increase over time.

Early onset of wear-out seems to have a much stronger impact on lifecycle failure rates than infant mortality, even when considering only the first 3 or 5 years of a system's lifetime. The underrepresentation (in datasheets) of the early onset of wear-out is a much more serious factor than the underrepresentation of infant mortality.

Disk drive failures exhibit significant levels of autocorrelation and long-range dependence, so their statistical properties do not form a Poisson process as is commonly assumed. The failure rate in one time interval is predictive of the failure rate in the following time interval. Thus, a week that follows a week with a "small" number of failures is more likely to see a small number of failures than a week that follows a week with a "large" number of failures.

Disk drive failures are not realistically modeled by an exponential distribution as is commonly assumed, but rather, are characterized by higher levels of variability and decreasing hazard rates (the empirical distributions are fit well by a Weibull distribution with shape parameter less than one). The decreasing hazard rate function predicts that the expected remaining time until the next failure grows with the time since the last failure. (Note: This contrasts with the prediction under an exponential distribution, where the expected remaining time stays constant.). It is observed, for example, that right after a failure, the expected time until the next failure is around 4 days. After surviving for 10 days without failures, the expected remaining time until the next failure grows from 4 days initially to 10 days. After surviving a total of 20 days without failures, the expected time until the next failure grows to 15 days.

8.6.8 Load-Shifting Away from Failed and At-Risk Drives

In a preferred embodiment of the NEAR technology, the highly predictive non-zero SMART data counts referred to in section 8.6.6 and inferences from the findings summarized in section 8.6.7 both mandate and enable direct preventive action (rather than only remedial action) for the corresponding drive, in advance of drive failure. In particular, such a drive can be (and should be) treated exactly as if it has just encountered an actual failure, with the exception that the drive may not have actually failed yet, and that such actual failure may in fact be preventable, or at least deferrable.

In a preferred embodiment of the NEAR technology, a predicted or actual drive failure causes the data storage and retrieval responsibilities of the failed or "at-risk" drive to be immediately shifted to other drives. In a preferred embodiment, if said responsibilities cannot be shifted for all at-risk drives relatively immediately, then load-shifting occurs for any failed drives first, and the relative risk among the at-risk drives can be used to determine the load-shifting order among the at-risk drives. In a preferred embodiment, the at-risk drives may be prioritized by the relative risk apparently (but not actually) implied by their relative SMART Indicator values, with consideration given to other indicators and risk information that may be available.

In a preferred embodiment, failed or at-risk drives are left spun up, if possible, and then subjected to a pre-spin-down drive analysis and maintenance cycle as described in section 8.6.9. For each drive, if the cycle is successful, the drive is spun down the same as if no SMART errors or failure had been detected, and it is left in the normal drive rotation for later use. For any drive where the cycle is unsuccessful, including mechanical failure or burn-out, the drive is permanently de-powered and taken out of the normal drive rotation.

In a preferred embodiment of the NEAR technology, the highly predictive non-zero SMART data counts referred to in section 8.6.6 can be used in conjunction with any observed failures to trigger an elevated risk level, by predicting the increased relative risk of disk drive failures, especially among those drives sharing one or more common dependencies (e.g., same module, same thermal environment, same vibrational environment, same power environment, same EMP environment, etc.).

In particular, if any drive (e.g., in a NEARdrive Blade or NEARdrive Mini) has experienced an actual failure, or such a failure is (or was) predicted by a non-zero count for any of the four SMART Indicators listed in Table 5, then there is an increased risk that some number of other drives (at the very least, those with mutual dependencies) may fail as well, within the predictive time period.

In a preferred embodiment of the NEAR technology, this situation triggers a drive analysis and maintenance cycle for each of the drives in the collective group (e.g., those in the affected drive rotation). One-by-one, the data storage and retrieval responsibilities of each such drive is immediately shifted to other drives that are known-good or otherwise not at risk. If the cycle is successful, the drive under test is restored to normal operation and left in the normal drive rotation for immediate or later use. For any drive where the cycle is unsuccessful, including mechanical failure or burn-out, the drive is permanently de-powered and taken out of the normal drive rotation.

8.6.9 Pre-Spin-Down Drive Analysis and Maintenance

In a preferred embodiment of the NEAR technology, an automated pre-spin-down drive analysis and maintenance of every disk drive is executed on a periodic basis as described herein, and also executed when triggered in accordance with proactive risk management activity such as that described in 8.6.8.

It is generally accepted among knowledgeable intelligence professionals that it is effectively impossible to "sanitize" (i.e., "securely erase") disk storage locations by simply overwriting them, no matter how many overwrite passes are made or what data patterns are written. Each track contains an image of everything ever written to it, but the contribution from each "layer" gets progressively smaller the further back (in time) it was made.

Although we conceptualize writing each bit to a disk drive as either a logical one or a zero, the actual effect is closer to obtaining a 0.95 when a zero is overwritten with a one, and a 1.05 when a one is overwritten with a one. Normal disk circuitry is set up so that both these values are read as ones, but using specialized algorithms, drive capabilities, and/or specialized circuitry, it is possible to determine the information stored in previous "layers" (i.e., due to previous writes). In a preferred embodiment of the NEAR technology, this fact is exploited by painstakingly microstepping the drive and reading and rereading the signal from the analog head electronics (essentially oversampling it by rereading tracks with slightly changed data threshold and window offsets and varying the head positioning by a few percent to either side of the track), synthesizing the oversampled waveform, and analyzing it in software (possibly with the help of reconfigurable or dedicated logic) to generate an "ideal" read signal and subtract it from what was actually read, leaving as the difference the remnant of the previous signal (i.e., the "recovered" data).

As each sector is sampled, its apparent content is saved, so that it can be restored or moved as needed:

In the case of a sector with read errors, meaning that the current data is unreadable by normal means, the analysis process essentially described in the previous paragraph is used to determine what the sector's data should have been (i.e., what it used to be, before the errant bits occurred). (Note: Unlike offline intelligence analysis which can take advantage of sophisticated equipment to recover data from multiple previous writes, the NEARdrive recovery analysis is limited by the sensitivity and precision of the drive electronics, and thus, under normal circumstances, can recover only the previous layer.). Once this is known, the sector can be carefully re-written, this time with improved margins (or moved, if its present location needs to be mapped out as "bad sector"), thereby completing the recovery and heading off the risk of future read errors.

In the case of a sector having no errors, the sector can still be carefully re-written with improved margins, thus proactively heading off the risk of future read errors.

The aforementioned process can easily be combined with, or replaced by, other data recovery algorithms and processes known in the industry, as appropriate, in order to enhance the survivability of the data stored via the NEAR technology, and without detracting from its most important properties, namely, the capability to recover from some number of otherwise unrecoverable errors, the capability to proactively prevent some number of errors that may otherwise be encountered, and the capability of accomplishing said error recovery and error prevention on a fully automated basis without encountering any unplanned downtime or interruption of service.

8.6.10 On-the-Fly Drive Analysis and Maintenance

In a preferred embodiment of the NEAR technology, a disk read error (i.e., one that has not yet caused the corresponding drive to be labeled as having failed) triggers an "on-the-fly" drive analysis and maintenance cycle that is limited to the immediate sector(s) corresponding to the read error, beginning with the errant sector, while also triggering the full drive analysis process as described in the previous section. The idea is to attempt to complete the current access, even if a delay is required. Because every NEARdrive stores only fragments of objects, and a sector error can affect at most one such fragment, the analysis-induced delay cannot add any latency to the overall storage/retrieval operation, except in the case where it corresponds to the "swing vote" (i.e., an extremely unlikely scenario involving multiple failures, where no other fragments are available to help complete the operation).

8.6.7 NEARFIRE—Hybrid Blade with NEAR & FIRE

Refer to FIG. 58. Outrigger Blades—NEARFIRE Blade (Hybrid of NEARblade & FIREblade) Configuration As depicted in FIG. 58, a NEARFIRE hybrid blade is simply a configuration that incorporates a FIREdrive as described in section 8.5 and depicted in FIG. 54, along with a NEARdrive as described generally in section 8.6 (and specifically in section 8.6.3) and depicted in FIG. 57, all on a single blade. In a preferred embodiment, the local intelligence depicted in FIG. 54 and FIG. 57 (implemented by a MASTER CPU 100 and a MASTER PUMP 107) is augmented by the introduction of an HT-to-PCIe bridge 120 or 121, and more importantly, a SLAVE PUMP 101 (with associated SLAVE CPUs 102, not shown).

9 CORE™—Computation, Optimization, & Reasoning Engines

CORE refers to a collection of "engines" whose purpose is to encapsulate and securely execute high-performance and/or hardware-assisted general purpose implementations of critical compute-intensive processes, to minimize latency, maximize overall throughput, and reduce operational costs. (Note: All of these technologies (see Table 6) are intended for hardware or software implementation. The specific engines (e.g., FACTUAL, FASTpage) are typically closely associated with other systems, and may thus be further described in those contexts).

Table 6 CORE Technology Summary—Technology Name & Summary Description

FACTUAL A process-oriented memoization ("memo table") capability that retrieves previously computed, "vetted" results for arbitrary deterministic processes and functions. All values that can affect the output (including the identification of the exact process and any parameters) are provided as input, along with a timeout value and a list intended recipients, and a signed and certified result will be sent to them. FACTUAL implements a race ("looking up" vs. "recomputing" vetted results), but lookup typically starts before the request even reaches the head of the request queue for the target process. In the event a process starts due to timeout, if there's a "hit" and the looked-up result becomes available in time, it is used to check the process. Misses cause no penalty.

FASTpages A novel persistent, page-oriented hybrid of ternary search tree (TST) and digital TRIE for the purpose of implementing a high-density, high-performance persistent associative memory.

RECAP A proprietary protocol used by MASTERs to communicate with other MASTERs, and with any SLAVEs under their control.

RUSH A proprietary asynchronous communications protocol that can stand alone or be tunneled over existing WAN protocols (whether synchronous or asynchronous). RUSH is used as the primary carrier protocol among FLAMERouters, MARSHALs, and client-side ScrutinyAgent software. RUSH can directly incorporate flows from the RECAP and UNCAP protocols.

UNCAP The proprietary protocol used for communication between MASTERs and SERVANTs (i.e., untrusted nodes).

BELIEF Uses Bayesian reasoning to understand causal relationships, provide diagnostic and prognostic information and recommendations, according to a dynamically changing internal belief system.

9.1 FACTUAL—Frequency-Adaptive Computation Table & Use-Adaptive Lookup

Figure 59:
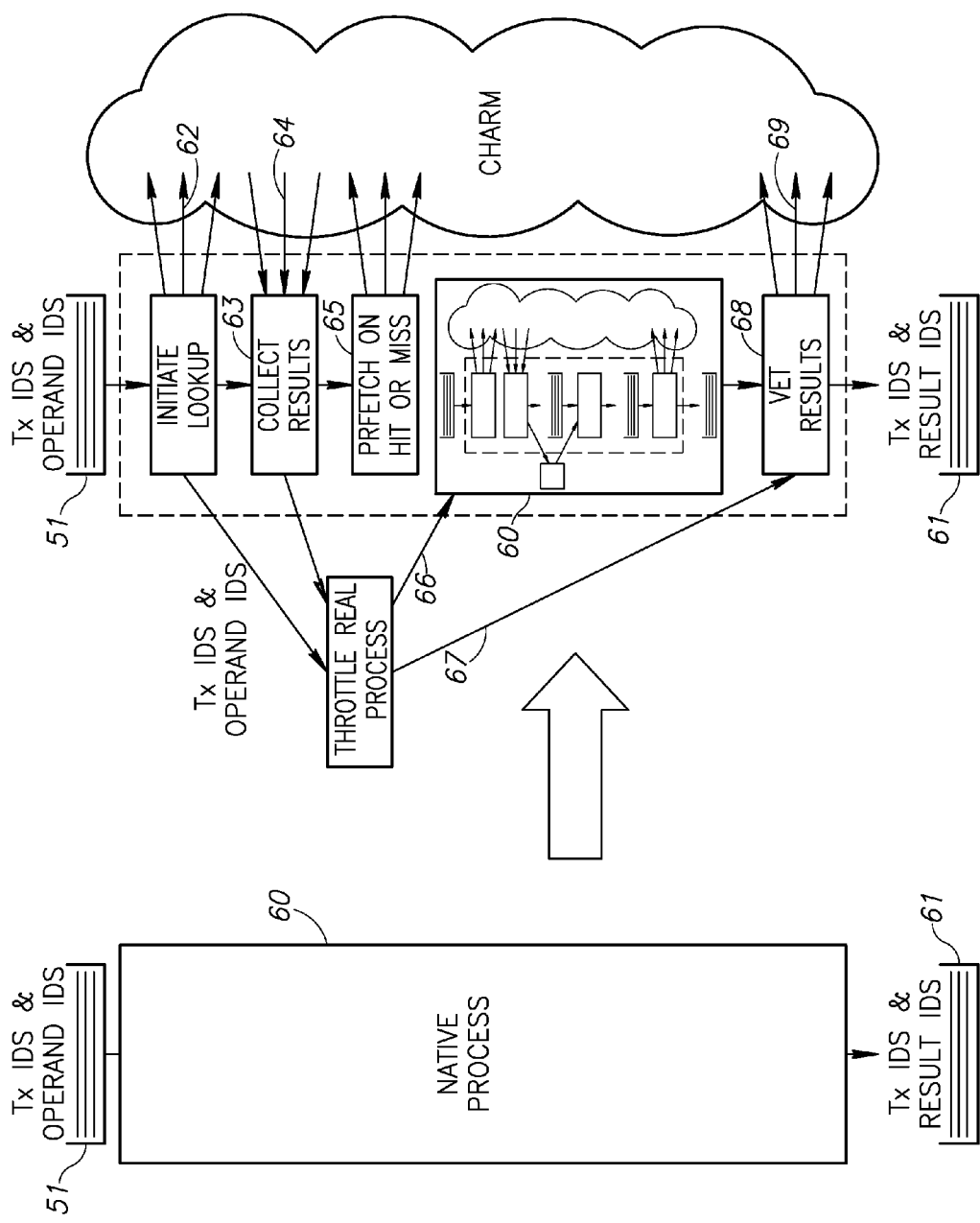

Refer to. FIG. 59. FACTUAL—Intercepting a SHADOWS Native Process

FACTUAL capability is a "memoization" system designed to operate at global scale and supercomputing speed, with the high levels of security and survivability commensurate with the SHADOWS infrastructure. "Memoization" is essentially the capability of looking up known results of deterministic processes and/or functions rather than recomputing them from scratch.

Because each SHADOWS artifact and each process has its own identity, whenever a deterministic process or function accepts a particular set of input values and produces a deterministic set of output values, we can treat the set of input values and the specific process identity as a new artifact having an identity of its own. We can likewise treat the set of output values as an artifact, with an identity. "Memoization" then becomes a conceptually simple matter of establishing a "pairing" between the input/process identity and the output identity, such that any already-known output can be looked up and identified. Thus, given any input/process identity, it can be determined (through a lookup) whether the result has been previously computed, and if so, what its identity is.

Teams are used to perform the processing required to arrive at previously unknown results, and to reach consensus on "vetted" results prior to memoization (which is particularly important for FACTUAL, because memoized results can be reused as authoritative results that sidestep process execution). As with any artifact, the various content and identities associated with memoized results need to be stored, which involves teams on a SHADOWS-wide basis, as does the lookup of memoized results.

If it cannot be readily determined (on a local basis) whether a memoized result exists, the problem to be solved is queued for processing, but can normally be dequeued if a vetted, memoized result is obtained prior to the start of execution. A memoized result that is obtained after execution has already started can be used as a test oracle to verify the result, thereby serving as a built-in system integrity check. Memoization of results, and whether to use lookup of memoized results, is context-specific and configurable at the process level or process-family level. In general, lookups of memoized results may not be utilized when such lookups consume more resources than would be required to simply recompute the results, unless such lookups reduce a local processing load by shifting the lookup elsewhere. The lookups of memoized (and therefore already-known) results are also vetted, by virtue of the fact that lookups (like other operations) are handled by geographically distributed teams that are difficult to attack. Not only must a distributed team reach consensus on the identity of the memoized result, but other distributed teams are typically involved in moving a copy of the content of the identified result to where it is needed, and in all cases the recipient(s) can determine the degree to which consensus was reached in each step. The availability of memoized results is also very helpful in cases of Byzantine failure that would otherwise hamper the achievement of vetted results.

As noted in section 7.3.1, "Load-Balancing SHADOWS Native Processes," in general, SHADOWS native processes 60 do not push data around as loads are shifted and requests are made, etc. Instead, IDs are pushed around, and if a process actually needs the associated data, it can request it (on a "pull" basis), or, if there are no other operands, just forward the request to the team that owns the data (resources permitting). The act of pushing an ID, however, has the effect of putting the team owning the associated data on notice that it may be needed soon, essentially identifying the ID as a speculative prefetch opportunity.

As previously noted, in its simplest form, a SHADOWS native process 60 has an input queue 51 and an output queue 61, as depicted in FIG. 59, on the left. Ignoring security issues, the input queue 51 accepts tuples of the form {TxID, Operand ID List}, performs the work of the process which is to generate one or more Result IDs, then enqueues them for distribution. The transaction id (TxID) ties the Operand IDs (received as input) to the Result IDs associated with the processing results.

The FACTUAL system works as depicted in FIG. 59, on the right, by intercepting the input queue 51 before it is seen by the aforementioned native process 60 (i.e., the one described earlier in section 7.3.1, which is depicted above as a thumbnail illustration at 60). The input queue 51 accepts tuples of the form {TxID, Operand ID List}. An interior lookup process immediately fires off requests 62 to find out if the current process (which must be deterministic) has previously computed a result for the Operand IDs, requesting that the results (i.e., a "hit" with results, or a "miss" with nothing) be sent along to a specific destination team responsible for collecting results 63 (which may be the current team or some other one). A message including the {TxID, Operand ID List} tuple is also sent to the specified "collect results" destination team 63 to put it on notice that data for the particular TxID may soon be arriving (unexpected data can trigger defensive behavior), and to the team responsible for throttling the actual execution of the process if already-computed results aren't found "soon enough" (note that the throttling team is co-located with the actual execution process, and has read and update access to its input queue). As lookup results 64, if any, are received, they are collected and a "hit" or "miss" is determination is made, with a message 65 to that effect being sent to the team responsible for throttling the actual execution of the native process 60, and also to a "prefetch" process (if the result is a hit, then the ID of the results is known, but not the actual results, so the prefetch sends a speculative prefetch message to the appropriate team; if the result is a miss, then a (non-speculative) prefetch message with the {TxID, Operand ID List} tuple is sent to the appropriate team, because the team responsible for actual process execution may be requesting the operands shortly).

When the team responsible for throttling the actual execution of the native process 60 receives the {TxID, Operand ID List} tuple, it immediately enqueues it internally to the co-located execution process input queue 66. If a "hit" message 65 occurs, the inline input queue 66 is checked. If processing has not started, the entry is dequeued because the result is already known. If the processing has already started, it is left to run, and its result can be verified against the known result. In any case, the "hit" message 65 can be forwarded to the "Vet Results" process team 67. If the co-located execution completes, its results 68 are also forwarded to the "Vet Results" process team. Validated results can be placed into the normal process output queue 61. If results were calculated that were previously not seen, they can be posted for update 69, in order to support a future computation.

9.2 FASTpage (Fast Associative Search Tree, pageable)

9.2.1 Key Definitions

Child. A node of a tree referred to by a parent node. Every node, except the root, is the child of some parent.

Internal node. A "simple" node of a tree that has one or more child nodes; equivalently, a node that is not a leaf. All FASTpage internal nodes are allocated beginning with an ordinate of 0 and incrementing their ordinate value, and therefore exhibit heap-like growth behavior (this is depicted by example in Table 7 through Table 17).

Node. (1) A unit of reference in a data structure. Also called a vertex in graphs and trees. (2) A collection of information which must be kept at a single memory location.

String. A list of characters, usually implemented as an array. Informally a word, phrase, sentence, etc. Since text processing is so common, a special type with substring operations is often available. Note: The term "string" usually refers to a small sequence of characters, such as a name or a sentence. The term "text" usually refers to a large sequence of characters, such as an article or a book.

Tree. (1) A data structure accessed beginning at the root node. Each node (including the root) is either a leaf or an internal node. An internal node has one or more child nodes and is called the parent of its child nodes. All children of the same node are siblings. Contrary to a physical tree, the root is usually depicted at the top of the structure, and the leaves are depicted at the bottom. (2) A connected, undirected, acyclic graph. It is rooted and ordered unless otherwise specified.

Trie. (pronounced "tree"). Also: "Digital Search Trie." A tree for storing strings in which there is one node for every common prefix. The strings are stored in extra leaf nodes. Note: The name comes from reTRIEval and is pronounced, "tree."

Root. The distinguished initial or fundamental node of a tree. The only node which has no parent.

Parent. The tree node conceptually above or closer to the root than a particular node (the child node) and which has a link to the child node.

Leaf. A node in a tree, but without any children. In a FASTpage index, a leaf is also a "compound" node that may include both an external reference (i.e., the proper data of a "leaf") and also an internal reference (i.e., a "follow-on" reference to the next internal node). Note: Every node in a tree is either a leaf or an internal node. All FASTpage leaf nodes ("compound" nodes) are allocated beginning with an ordinate of 255 and decrementing their ordinate value, and therefore exhibit stack-like growth behavior (this is depicted by example in Table 7 through Table 17).

9.2.2 Central Concept

The idea behind FASTpage™ is to create a fast, highly scalable, associative memory mechanism that can adapt to the information to be remembered, in order to optimize both time and space. Each FASTpage implementation supports an arbitrary number of independent local search spaces, limited only by local storage capacity. Each FASTpage search space may be individually defined to be either transient or persistent, with individually specifiable survival requirements.

In essence, FASTpage™ is a fast, efficient associative memory mechanism that can also persist indefinitely. Although the persistence properties of a FASTpage index may be achieved via any common data storage means, the concept is designed to capitalize on the very high performance of solid state disk (SSD) drives (and SSD-accelerated storage systems) in general, and the Scrutiny® FIRE and NEAR technologies in particular. (Note: FIRE (Fast Index & Repository Emulator) is the technology underlying a FIREblade™ or FIREdrive™. It provides high-performance all-electronic, long-term data storage that is immune to mechanical wear and vibration (including seismic events). The stored data is safe from intruders even if stolen. The number of read/write accesses per second is orders of magnitude faster than hard disk drives. NEAR (Nearline Emulation & Archival Repository) is the technology underlying a NEARblade™ or NEARdrive™. It provides high-capacity, electronically assisted long-term data storage that is subject to minimal mechanical risk (including wear, vibration, and seismic events), due to significantly reduced mechanical duty cycle. The stored data is safe from intruders even if stolen. The number of read and/or accesses per second is orders of magnitude faster than unassisted hard disk drives.). In a preferred embodiment, FASTpage indexes takes advantage of minimal NVRAM resources (for meta data) and efficiently uses flash memory to amplify its high performance. (Note: NVRAM, or Non-Volatile Random Access Memory, tends to be expensive and of fairly low capacity, and is therefore somewhat of a precious resource. A key NVRAM property is that it usually supports an unlimited number of read/write cycles and potentially long-term data retention—always long enough to survive a reboot, and sometimes as long as 10 years.). The fact that flash memory can typically endure only a limited number of write-cycles is fully accommodated within the internal FASTpage mechanisms (which cannot approach such limits, by design), yet does not negatively impact FASTpage indexes in any way. FASTpage indexes can also take full advantage of storage mechanism that have no such write-cycle limitations.

The FASTpage concepts as described in this brief assume a strictly local implementation (no distributed properties are described). However, any FASTpage implementation can participate in higher level distributed architectures, such as SHADOWS and CHARM (of which FASTpage is a component), and can beneficially replace the hash-based search algorithms of DHTs (distributed hash tables). (Note: CHARM (Compressed Hierarchical Associative Relational Memory) is itself a component of SHADOWS (Self-Healing Adaptive Distributed Organic Working Storage). Given a FASTpage implementation that is participating in such a distributed architecture, then each FASTpage search space can also participate, on an individually selectable basis, in a higher-level, distributed search space.

FASTpage indexes can be implemented relatively easily in hardware or software, while avoiding the negative attributes of various traditional associative search mechanisms. Nonetheless, the FASTpage mechanism was inspired by the respective individual benefits normally attributed to memory tries, binary search, binary trees, splay trees, ternary search trees, hash tables, distributed hash tables, and Bayer-tree variants. (Note: The three most well-known variants of Bayer trees are commonly known as B−trees, B+trees, or B*trees.). In particular, the ternary search tree (TST) serves as the conceptual jumping-off point for understanding the FASTpage search concepts.

9.2.3 Basic Concepts

1. FASTpage indexes combine the properties of a ternary search tree (TST) and a digital search trie (spelled "Trie," but pronounced "tree"), taking advantage of their in-memory search performance, while adding persistence with a page-sized storage unit (typically a convenient multiple of a 512-byte sector).

2. TST concepts are central to FASTpage, especially the property that "not found" conditions in string searches are determined, on average, faster than equivalent searches with a hash table. Also important is that, unlike hash tables, FASTpage requires no reorganization to accommodate growth.

3. Unlike traditional TSTs, a FASTpage TST requires only 4 bytes per internal node (1 byte for each of the four indices: split, left, equal, right). Each FASTpage page has sufficient capacity for exactly 256 nodes, so that each index can refer to any node. A typical FASTpage TST page requires only 1 KB of space of memory or storage.

4. Trie algorithms are known for their extremely fast in-memory search speeds, but at the expense of explosive sparse memory requirements. When the set of keys is sparse, i.e. when the actual keys form a small subset of the set of potential keys, as is very often the case, many (most) of the internal nodes in the Trie have only one child, which wastes memory. FASTpage Trie pages usually start out as FASTpage TST pages, however, and these may be densely populated (each node requires only about 4 bytes on average, which is perhaps one-third the space of a classic TST node). When sufficient leading-byte diversity exists, the TST is converted to a Trie.

5. FASTpage attempts to diversify the nodes on a page (given a common string up to a particular character position), with the ultimate goal of collecting all of their descendents into a Trie node. A FASTpage TST page is converted to a FASTpage Trie page at the point when the leading byte of its first node corresponds to the lowest possible byte value (in the associated set of possible keys) and the number of keys with diverse but contiguously sequential leading bytes in the same node exceeds a threshold. Any nodes with non-contiguous leading bytes are allowed to remain in the Trie page, but are moved to their respective "proper" locations (based on their leading byte value).

6. As part of the conversion from a FASTpage TST page to FASTpage Trie page, any successor keys based on non-leading bytes (regardless of whether their corresponding predecessors were contiguous) are relegated to their respective lower-level successor pages.

7. A "complete" FASTpage Trie page is obtained when the highest-valued possible differing byte is also included in the contiguous sequence. Any byte at that position can then serve as an 8-bit index into the FASTpage Trie page, and thus it can be used to directly obtain a reference or pointer to the appropriate descendent page.

8. Once a "complete" FASTpage Trie page is created, it becomes immutable (never changes). Immutability of Trie pages provides significant performance benefits for caches and survivability benefits for limited-write devices such as flash-based storage.

9. FASTpage metadata can be embedded in each page, but in a preferred embodiment is stored elsewhere. In particular, the metadata is maintained in a separate set of pageable, persistent storage (co-located with the corresponding FASTpage pages) that can be indexed by the FASTpage page number.

10. Each FASTpage page has an associated metadata descriptor comprising a page type (e.g., TST, Trie, etc.), page size (optional), node size (e.g., 4 or 8 bytes), reference size (e.g., 2, 4, 8, or 16 bytes), the most-significant portion held in "common" by the majority of leaf node reference addresses, current indices for the stack and heap, access control & security barrier information, data validation information (optional), and one or more indicators of progress toward TST-to-Trie conversion.

11. The metadata describing most-significant "common" portion, if any, of external references associated with the majority of leaf nodes on the page is used to factor out the common portion, which typically reduces leaf node memory requirements by half, thereby allowing more nodes to be stored and increasing the page density.

12. All of the FASTpage pages at a particular location may be subordinated to pages held elsewhere, such that the location itself (to an arbitrary level of detail) may comprise a portion of the actual search key. One effect of this is that of natural key partitioning. Another effect is storage space conservation by not having to store (or process) a portion of a key that is held in common by all the keys at a particular location.

13. Leaf nodes are not fixed in size, but may consume 1 or 2 (or more) 4-byte entries, as required, in order to contain their variable-length external reference information (plus a 1-byte follow-on index to an internal node). A single 4-byte entry contains a 1-byte internal index plus a 1-, 2-, or 3-byte external reference. A double 4-byte entry (8 bytes) contains a 1-byte internal index plus a 4-, 5-, -6, or 7-byte external reference. Similarly, a triple 4-byte entry (12 bytes) can contain up to an 11-byte external reference, and so on. In a preferred embodiment, numerical references are encoded with a variable-length unsigned LEB128 binary number (1 bit per byte is a flag, with 7 bits per byte of numerical information, so each byte contributes a factor of $2^7$ (128) to the addressable range). (Note: LEB128 is a relatively well known data format that refers to a "Little Endian Base 128" integer with 128 possible values per byte.).

9.2.4 Key Application Areas

Because a FASTpage index is associative, it can serve wherever there is a need for an arbitrary n-to-m mapping (e.g., 1-to-1, 1-to-many, many-to-1, many-to-many), which corresponds to a very large application space. Although a FASTpage index excels with keys of any size, it is particularly well-suited to long and/or variable-length keys that may be problematic for other lookup means.

Here is a non-exhaustive list of some examples of applications where a FASTpage index may be optimal, both in-memory and on disk:

1. Replacement for almost any hash table.
2. Replacement for any disk-based index.
3. Replacement of any of several conventional indexes with a single FASTpage. index.
4. Metadata and configuration data storage and lookup.
5. Identification, authentication, and ACL (access control list) functions.
6. File system/directory lookups.
7. Symbol table and other dictionary functions.
8. Memo tables (a special type of cache for looking up previously computed, "memoized" results).
9. "Longest-match" IP-routing tables.
10. DNS (domain name system) forward and reverse lookup functions.
11. Blacklisting and whitelisting functions.
12. LDAP (lightweight directory access protocol) lookup functions.
13. Full-text search, content management functions.
14. Data-squashing functions.
15. Data aggregation, sorting, and grouping functions.
16. CBR (case-based reasoning) case look-ups.
17. CAM (content-addressable memory).
18. CAS (content-addressable storage).

Almost any hash table can be replaced with a FASTpage index (it may be contra-indicated only for fixed-size tables with pre-optimized "perfect hash" keys). (Note: A FASTpage index is about the same speed as a hash table for a successful lookup, but often much faster for an unsuccessful lookup, especially with long keys (this is important, because hash tables are often used to determine that a key is not present). Unlike a hash table, a FASTpage index can traverse key information in sorted order (forwards or backwards) and perform "nearest match" searches. Unlike a hash table, a FASTpage index never needs wholesale reorganization to account for growth. A FASTpage index maintains high-density key pages to optimize time and space, and becomes even more efficient over time as FASTpage TST pages are converted to FASTpage Trie pages.).

Disk-based indices such as those based on B–trees, B+trees, or B*trees may generally be replaced with FASTpages. (Note: A key goal of disk-based indexes is to reduce the number of disk accesses required to locate a key, since disk access is usually a major performance bottleneck. Accordingly, their disk-based index nodes tend to be "fat" and contain many keys, in order to minimum the number of fetches required. Likewise, a FASTpage index contains many keys, but is much smaller and finer-grained by design, so as to be able to cache many more nodes that have a high probability of relevance. Although a FASTpage index may potentially incur more logical disk accesses, one should expect less actual (physical) disk I/O overall, because of the higher probability that useful nodes are cached early on. Also, because flash memory is the primary FASTpage persistence mechanism (by design), in a preferred embodiment the FASTpage lookup rate in a very large database will easily exceed that of a typical disk-based index by as many as several orders of magnitude.).

9.2.5 Application Considerations

File System Applications. FASTpage keys are variable-length, and can be of any length, without penalty, so hierarchical file systems can be implemented without arbitrarily restricting the length of file names and directories (folders), and each directory (or folder) can contain any number of entries. Because FASTpage keys are variable-length, without restriction, it is possible to implement path names of unlimited length, such that there is just a single index for an entire file system. Nonetheless, a typical approach would be to implement a "nested" index where each directory (or folder) has its own secondary FASTpage index, because it offers a number of advantages (the discussion of which are outside the scope of this document).

Fully Indexed Database Applications. A FASTpage index can be substituted wherever a traditional database index can be used, such as on an index-per-field and/or index-per-key basis, for each table. With a FASTpage index, it is also quite reasonable to index EVERY field or column, rather than just a selected few, in every table, with a single database-level index. In a preferred embodiment, a single FASTpage index can easily be used to subsume other indexes by prefixing each key value with both a table identifier and a field or column identifier. (In a preferred embodiment, each table identifier, and each field or column identifier would be a variable-length numeric value, typically only one byte, that is mapped to the corresponding table name, or field or column name, respectively. As a prefix to the key value, each identifier itself would only be stored once in a FASTpage index, due to its inherent key compression properties; each such identifier would be common to all key values appearing after it.). In a FASTpage index, any table identifier, field/column identifier, and any unique values are automatically factored out and stored only once. By so doing, a multi-table search can be carried out easily, and tables not containing a particular field or column cannot contain the associated field or column identifier and thus can yield no relevant records. Likewise, fields containing null values naturally occupy no space at all, and if none of the records in a table have a value for that field, even the identifier itself need not be stored (a search for that field, or values in that field, can yield no relevant records). When the key values associated with a particular field or column are defined to be UNIQUE (not duplicated), the result of each successful record-oriented database index search is typically a record number or row number; for object-oriented databases, the result of each successful index search is typically an object identifier. However, when DUPLICATE key values are allowed, the result of both record-oriented and object-oriented database search is either a reference to an array (or list) of record/row numbers or object identifiers, respectively, or a recursive reference to secondary FASTpage index containing further order-related information (e.g., GROUP BY).

Compressed Database Applications. In addition to using one or more FASTpage indexes to replace traditional database indexes, they can also be used to achieve significant database compression (a technique used in Scrutiny's CHARM technology). The idea is to achieve compression by factoring out the "vocabulary" associated with a particular database. One way to achieve this is to create a non-duplicated index of key values comprising the vocabulary of the database, including at least all non-BLOB, non-numeric values, but possibly numeric values as well. In a preferred embodiment, the key value is prefixed by a data type identifier before index insertion (which means search keys need to be prefixed likewise). As each non-duplicate key value is inserted into the vocabulary index, a variable-length code (e.g., LEB128) is automatically assigned based on its predicted or actual likelihood of occurrence (frequency), such that the highest-frequency key values may be assigned the shortest codes, and vice-versa. (Note: Unless codes are specially assigned, this means that results cannot be sorted or grouped alphanumerically by vocabulary codes (which are assigned by probable frequency). Instead, once the results are available, the vocabulary codes can be mapped back to traditional data values for grouping, sorting, and presentation purposes.). A reverse-mapping entry is also inserted. Once the vocabulary is mapped, all database values can be replaced by their vocabulary codes, and the database becomes compressed, and speedier. It is a policy decision as to whether speculative vocabulary insertions may be allowed (not recommended). It may make sense to use a representative corpus to extract a useful vocabulary. Either way, if a key is not in the vocabulary, then by definition, it cannot be in the database either. Likewise, if a key is found in the vocabulary, but has no external reference, then it is nonetheless not (yet) in the database. However, if a key is found in the vocabulary, and there is an external reference, then it refers to a secondary FASTpage index that reveals all matching database locations via follow-keys {table code, field or column code, record or object id}.

Relational Database Applications. Given the compressed database application environment of the previous paragraph, it would be straightforward to construct an RDBMS (relational database management system) over it. Most importantly, SQL (structured query language) queries would need to be translated to incorporate the appropriate vocabulary coding, so that any corresponding FASTpage indexes can be properly searched. Data manipulations (e.g., joins) occur normally, except that coded values are used, which generally makes the searches much faster. If the database is fully indexed (recommended), search results can be MUCH faster. Eventually, in many cases the search results must be mapped back from their encoded values to their traditional equivalents, for presentation purposes.

Content Management Applications. A FASTpage index is well-suited to full-text indexing in general, and indexing of arbitrary content in particular, since its variable-length keys with leading compression provide a great deal of flexibility. Some of the same techniques described above for compressed databases are also directly applicable to content management, regardless of whether the content repository is a file system, a database management system, or something else. The vocabulary compression technique is particularly useful, since it also allows search keys to be mapped from vocabulary words to coded "concepts." Concept-coding and tagging can supplement simple text searching by incorporating thesauri and other external concept-oriented information that can help a searcher optimize precision and recall. External classifiers and reasoning engines can also contribute key pairs for a given chunk of content. In addition to using a FASTpage index for key data, multiple temporary FASTpage indexes can be used during content analysis and also during queries for quickly cross-matching and correlating interim results.

High-Security Applications. A FASTpage index is well-suited to high-security applications for two primary reasons: 1) designed-in, fine-grained access control, and 2) elimination of the need to retrieve the target records and/or objects to process queries and make security determinations. MAC (mandatory access control) and/or DAC (discretionary access control) security "barriers" can be inserted into the stored key information (as part of the key itself) in one or more various locations, according to the desired effect. (Note: The security "barrier" is a special coded token that the FASTpage index can discern from the otherwise expected bytes in an index key sequence. When security barriers are enabled at a particular level of granularity, there is a 1-bit overhead to flag the security barrier at that level. Thus, a table-level barrier will incur an overhead of one bit per table, even if a particular table has no barrier. Barriers are available for at least the following levels: database, table, field or column, data type, vocabulary code, and target, e.g., data or external reference.). In a database application, for example, a security barrier "token" can be inserted into the key just before a table identifier (e.g., before each table identifier, or perhaps just one of them), and this would have the effect of "skipping over" any table that should be invisible to a particular query (based on the security context of the query itself). Similar security barriers (which are tied to security policy) may be placed at other important locations within any key, and also within the area containing the target of any key, as well as being associated with all keys on a particular FASTpage index page and/or its descendents. It is typical that database systems which offer very fine-grained access control policies (e.g., "only personnel reps can view salaries over $30,000") must first fetch the candidate target records in order to determine which records are in scope for a particular query (assuming the non-security criteria are otherwise met). FASTpage allows "fully indexed" information, and one useful consequence of this is that all access-oriented security decisions can be made before the corresponding records and/or objects are actually retrieved (i.e., before their risk of exposure becomes increased by accessing them).

9.2.6 Implementation Considerations

Synchronous/Blocking vs. Asynchronous/Non-Blocking/Queued Interface. The FASTpage processes can be implemented completely in software or hardware as an API (application programming interface) comprising synchronous (blocking) function calls or system calls. In a preferred embodiment, however, a software implementation would comprise a set of asynchronous (non-blocking) message-oriented transactional services accessible via a queued messaging interface, and a hardware implementation would comprise at least a non-blocking, transactional, packet-oriented queued interface such as might be implemented with PCI Express or HyperTransport (e.g., with retrieval requests, posted writes).

Software vs. Hardware. In a preferred embodiment, the FASTpage processes would be implemented in both software and hardware, due to their overall utility. The idea is to standardize on FASTpage indexes and use them wherever they're applicable. General purpose CPUs would use software implementations when appropriate (especially for temporary or transient indexes), but would also have access to hardware-accelerated implementations. The hardware implementations would be a shared resource, accessible to multiple processors, and would largely be responsible for all persistent data. (Note: In a preferred embodiment, multiple FASTpage processes would be instantiated within each PUMP (Parallel Universal Memory Processor) device (described elsewhere). The PUMP device which would initially be implemented with reconfigurable logic (e.g., FPGA or "Structured ASIC").

Local vs. Distributed Operation. In a preferred embodiment (e.g., the SHADOWS™ infrastructure), all persistent data may be distributed over a large number of globally distributed processes and devices that cooperate to effect a secure, survivable, persistent, associative memory with significant computing power. In such a context, the data may be both encrypted and widely scattered in such a way as to render all persistent data unusable as stored (i.e., if stolen it would be worthless). Quite a bit of the local processing may take place on encrypted data, without bringing it into the clear. Each local node may have partial responsibility, however, for some fraction of the global key space that it must process in the clear, even if it appears scrambled (scrambled data does not present a significant hurdle for a well-funded, sophisticated attacker). Such in-the-clear data may be created only as needed, and may exist only in protected, volatile memory that may be erased on demand, such as when an attacker or intruder is detected. In general, due to the highly distributed nature of the preferred embodiment, any in-the-clear data captured by an attacker at one or even a few locations would be of little utility.

Compression. A FASTpage index enjoys leading key compression quite naturally. Also, from a disk space viewpoint, many keys may be stored on each page, so pages can be densely rather than sparsely populated. Furthermore, space usage in general may be quite low, because internal references are all page-relative, and external references may be variable-length.

In a preferred embodiment, the page-relative internal references consume $w$ bits each, thus a search node consumes $(4w/8=w/2)$ bytes and $2^w$ such nodes are accommodated on each page, where the page size is determined as $((2^4)*w/2)$ bytes, which simplifies to $w*(2^{(w-1)})$ bytes. Leaf nodes require $(w/2)$ bytes in the normal case (1 byte for a follow-on internal reference and up to $((w/2)-1)$ bytes per short external reference, and up to $(w-1)$ bytes per long external reference.

In a preferred embodiment, the page-relative internal references consume only 8 bits (one byte) each ($w=8$), thus a "simple" search node ("simple node") consumes only 4 bytes (rather than the 13 bytes required by a "traditional" ternary search tree) and up to 256 such nodes are accommodated on each 1K (1024-byte) page. Leaf nodes are "compound" nodes that also require 4 bytes in the normal case (1 byte for a follow-on internal reference and up to 3 bytes of external reference), or multiples of 4 bytes if more addressing capacity is required. In a preferred embodiment, a multiple of 4 bytes is allocated as needed, where 1 byte is used for a follow-on internal reference, with the remaining bytes available for a variable-length, LEB128-encoded external reference (i.e., a multiple of 4 bytes may be allocated, and allocated-but-unused bytes are simply ignored). In an alternative embodiment, a fixed number of bytes may be allocated (still a multiple of 4 bytes), where 1 byte is used for a follow-on internal reference, with the remaining bytes dedicated for a fixed-width external reference.

In an alternate embodiment, the page-relative internal references may be extended from 1 byte to $w$ bits each ($w>8$), in order to allow for more nodes per page, and larger page sizes.

In an alternate embodiment, the page-relative internal references may be reduced from 1 byte to $w$ bits each ($w<8$), in order to allow for fewer nodes per page, and smaller page sizes.

In a preferred embodiment, the page-relative internal references are specified on a per-page basis to $w$ bits each, in order to flexibly and dynamically determine the nodes per page, and the page size, for a specific application scenario.

In a preferred embodiment, each FASTpage index page has an associated offset (somewhat like a base address) that can be added to any external references to extend them.

Security Barriers. In a preferred embodiment, an LEB128-like code would be used to identify tables, fields or columns, etc., within an index key, where one bit of an 8-bit byte is used as a "stop" bit for variable-length values, with the consequence that only 7 bits per byte remain for data, yielding $2^7$ or 128 possible values (hence the name). When a security barrier is enabled at a particular level in such an embodiment, the LEB128-like code would be replaced with a similar but modified code where the first byte is special, by virtue of having a bit dedicated to flag the presence of a security barrier, and with the rest of the bytes, if any, being LEB128-like, as before. With the extra flag bit dedicated to the security barrier, the first byte can now take on only $2^6$ or 64 possible values. When the security barrier flag is NOT SET, it means that the byte sequence is NOT a security barrier, and is therefore processed normally. When the security barrier flag IS SET, it means that the first byte (i.e., the one containing the security barrier flag) and any continuation bytes, collectively comprise a byte sequence that represents a security barrier, and accordingly identifies a security policy that must be complied with—after which (i.e., if and only if the security policy is complied with) the next immediately following byte sequence may be processed normally (up to the next security barrier, if any).

9.2.7 FASTpage Example

In the following example, a series of tables (Table 7 through Table 17) is used to depict how a series of words is in inserted into a FASTpage index. The table name indicates the word whose insertion is depicted, and the table itself depicts the content of the depicted index. Note that each table has an upper part containing "simple" internal nodes, with a column HEADER to identify what the upper data represents, and a lower half containing "compound" leaf nodes, if any, with a column FOOTER to identify what the lower data represents. In this example, each simple node has a 4-byte allocation comprising a tuple containing the subject character and internal child references, i.e., {Char, Left, Middle, Right}. Each compound leaf node has a variable-length allocation comprising a tuple containing {SimpleNodeOffset, ExternalReference}. By definition, whenever an internal reference is less than the value of NextAvailableSlotForSimpleNode (a page-relative metadata variable), it refers to (points to) a simple node. By definition, whenever an internal reference is greater than the value of NextAvailableSlotForCompoundNode (another page-relative metadata variable), it refers to (points to) a compound node.

TABLE 7

Empty Index (No Content):

| Offset | Char | Left | Middle | Right |
|---|---|---|---|---|
| 0 | <== NextAvailableSlotForSimpleNode is 0 (slots 0 to 255 are available) | | | |
| ... | (1 to 254 are also empty and were omitted for clarity) | | | |
| 255 | <== NextAvailableSlotForCompoundNode is 255 | | | |
| Offset | FollowOn | --- External Reference --- | | |

TABLE 8

Add the word "doggone":

| Offset | Char | Left | Middle | Right | REMARKS |
|---|---|---|---|---|---|
| 0 | d | — | 1 | — | Add "d" & point to "o" |
| 1 | o | — | 2 | — | Add "o" & point to "g" |
| 2 | g | — | 3 | — | Add "g" & point to "g" |
| 3 | g | — | 4 | — | Add "g" & point to "o" |
| 4 | o | — | 5 | — | Add "o" & point to "n" |
| 5 | n | — | 6 | — | Add "n" & point to "e" |
| 6 | e | — | 255 | — | Add "e" & point to tuple 255 (internal & external references) |
| 7 | <== NextAvailableSlotForSimpleNode is 7 (slots 7 to 254 are available) | | | | |
| ... | (8 to 253 are also empty and were omitted for clarity) | | | | |
| 254 | <== NextAvailableSlotForCompoundNode is 254 | | | | |
| 255 | 0 | Ext(6) | | | Ref key ends at offset 6 ("doggone") |
| Offset | FollowOn | --- External Reference --- | | | |

Note 1:
FollowOn = 0 means "no more internal refs".
Note 2:
Ext(k) stands for the external reference associated with the key entry ending at offset k.

TABLE 9

Add the word "dogma":

| Offset | Char | Left | Middle | Right | REMARKS |
|---|---|---|---|---|---|
| 0 | d | — | 1 | — | Found "d" |
| 1 | o | — | 2 | — | Found "o" |
| 2 | g | — | 3 | — | Found "g" |
| 3 | g | — | 4 | 7 | "m" > "g" (add "m" to right child) |
| 4 | o | — | 5 | — | (no change) |
| 5 | n | — | 6 | — | (no change) |
| 6 | e | — | 255 | — | (no change) |

TABLE 9-continued

Add the word "dogma":

| Offset | Char | Left | Middle | Right | REMARKS |
|---|---|---|---|---|---|
| 7 | m | — | 8 | — | Add "m" & point to "a" |
| 8 | a | — | 254 | — | Add "a" & point to tuple 254 |
| 9 | <== NextAvailableSlotForSimpleNode is 9 (slots 9 to 253 are available) | | | | |
| ... | (10 to 252 are also empty and were omitted for clarity) | | | | |
| 253 | <== NextAvailableSlotForCompoundNode is 253 | | | | |
| 254 | 0 | Ext(8) | | | Ref key ends at offset 8 ("dogma") |
| 255 | 0 | Ext(6) | | | Ref key ends at offset 6 ("doggone") |
| Offset | FollowOn | --- External Reference --- | | | |

Note 1:
FollowOn = 0 means "no more internal refs".
Note 2:
Ext(k) stands for the external reference associated with the key entry ending at offset k.

TABLE 10

Add the word "doge":

| Offset | Char | Left | Middle | Right | REMARKS |
|---|---|---|---|---|---|
| 0 | d | — | 1 | — | Found "d" |
| 1 | o | — | 2 | — | Found "o" |
| 2 | g | — | 3 | — | Found "g" |
| 3 | g | 9 | 4 | 7 | "e" < "g" (add "e" to left child) |
| 4 | o | — | 5 | — | (no change) |
| 5 | n | — | 6 | — | (no change) |
| 6 | e | — | 255 | — | (no change) |
| 7 | m | — | 8 | — | (no change) |
| 8 | a | — | 254 | — | (no change) |
| 9 | e | — | 253 | — | Add "e" & point to tuple 253 |
| 10 | <== NextAvailableSlotForSimpleNode is 10 (slots 10 to 252 are available) | | | | |
| ... | (11 to 251 are also empty and were omitted for clarity) | | | | |
| 252 | <== NextAvailableSlotForCompoundNode is 252 | | | | |
| 253 | 0 | Ext(9) | | | Ref key ends at offset 9 ("doge") |
| 254 | 0 | Ext(8) | | | Ref key ends at offset 8 ("dogma") |
| 255 | 0 | Ext(6) | | | Ref key ends at offset 6 ("doggone") |
| Offset | FollowOn | --- External Reference --- | | | |

Note 1:
FollowOn = 0 means "no more internal refs".
Note 2:
Ext(k) stands for the external reference associated with the key entry ending at offset k.

TABLE 11

Add the word "dogfood":

| Offset | Char | Left | Middle | Right | REMARKS |
|---|---|---|---|---|---|
| 0 | d | — | 1 | — | Found "d" |
| 1 | o | — | 2 | — | Found "o" |
| 2 | g | — | 3 | — | Found "g" |
| 3 | g | 9 | 4 | 7 | "f" < "g" (follow left child to "e") |
| 4 | o | — | 5 | — | (no change) |
| 5 | n | — | 6 | — | (no change) |
| 6 | e | — | 255 | — | (no change) |
| 7 | m | — | 8 | — | (no change) |
| 8 | a | — | 254 | — | (no change) |
| 9 | e | — | 253 | 10 | "f" > "e" (add "f" to right child) |
| 10 | f | — | 11 | — | Add "f" & point to "o" |
| 11 | o | — | 12 | — | Add "o" & point to "o" |

TABLE 11-continued

Add the word "dogfood":

| Offset | Char | Left | Middle | Right | REMARKS |
|---|---|---|---|---|---|
| 12 | o | — | 13 | — | Add "o" & point to "d" |
| 13 | d | — | 252 | — | Add "d" & point to tuple 252 |
| 14 | <== NextAvailableSlotForSimpleNode is 14 (slots 14 to 251 are available) | | | | |
| ... | (15 to 250 are also empty and were omitted for clarity) | | | | |
| 251 | <== NextAvailableSlotForCompoundNode is 251 | | | | |
| 252 | 0 | Ext(13) | | | Ref key ends at offset 13 ("dogfood") |
| 253 | 0 | Ext(9) | | | Ref key ends at offset 9 ("doge") |
| 254 | 0 | Ext(8) | | | Ref key ends at offset 8 ("dogma") |
| 255 | 0 | Ext(6) | | | Ref key ends at offset 6 ("doggone") |
| Offset | FollowOn | --- External Reference --- | | | |

Note 1:
FollowOn = 0 means "no more internal refs".
Note 2:
Ext(k) stands for the external reference associated with the key entry ending at offset k.

TABLE 12

Add the word "dog":

| Offset | Char | Left | Middle | Right | REMARKS |
|---|---|---|---|---|---|
| 0 | d | — | 1 | — | Found "d" |
| 1 | o | — | 2 | — | Found "o" |
| 2 | g | — | 251 | — | Found "g", move old entry (3) to tuple 251 as internal reference, then add external ref |
| 3 | g | 9 | 4 | 7 | (no change) |
| 4 | o | — | 5 | — | (no change) |
| 5 | n | — | 6 | — | (no change) |
| 6 | e | — | 255 | — | (no change) |
| 7 | m | — | 8 | — | (no change) |
| 8 | a | — | 254 | — | (no change) |
| 9 | e | — | 253 | 10 | (no change) |
| 10 | f | — | 11 | — | (no change) |
| 11 | o | — | 12 | — | (no change) |
| 12 | o | — | 13 | — | (no change) |
| 13 | d | — | 252 | — | (no change) |
| 14 | <== NextAvailableSlotForSimpleNode is 14 (slots 14 to 250 are available) | | | | |
| ... | (15 to 249 are also empty and were omitted for clarity) | | | | |
| 250 | <== NextAvailableSlotForCompoundNode is 250 | | | | |
| 251 | 3 | Ext(2) | | | FollowOn = 3 (follow on), Ref key ends at offset 2 ("dog") |
| 252 | 0 | Ext(13) | | | Ref key ends at offset 13 ("dogfood") |
| 253 | 0 | Ext(9) | | | Ref key ends at offset 9 ("doge") |
| 254 | 0 | Ext(8) | | | Ref key ends at offset 8 ("dogma") |
| 255 | 0 | Ext(6) | | | Ref key ends at offset 6 ("doggone") |
| Offset | FollowOn | --- External Reference --- | | | |

Note 1:
FollowOn = 0 means "no more internal refs";
FollowOn = f (f > 0) means ("continue from f").
Note 2:
Ext(k) stands for the external reference associated with the key entry ending at offset k.

TABLE 13

Add the word "golf":

| Offset | Char | Left | Middle | Right | REMARKS |
|---|---|---|---|---|---|
| 0 | d | — | 1 | 14 | "g" > "d" (add "g" to right child) |
| 1 | o | — | 2 | — | (no change) |
| 2 | g | — | 251 | — | (no change) |
| 3 | g | 9 | 4 | 7 | (no change) |
| 4 | o | — | 5 | — | (no change) |
| 5 | n | — | 6 | — | (no change) |
| 6 | e | — | 255 | — | (no change) |
| 7 | m | — | 8 | — | (no change) |
| 8 | a | — | 254 | — | (no change) |
| 9 | e | — | 253 | 10 | (no change) |
| 10 | f | — | 11 | — | (no change) |
| 11 | o | — | 12 | — | (no change) |
| 12 | o | — | 13 | — | (no change) |
| 13 | d | — | 252 | — | (no change) |
| 14 | g | — | 15 | — | Add "g" & point to "o" |
| 15 | o | — | 16 | — | Add "o" & point to "l" |
| 16 | l | — | 17 | — | Add "l" & point to "f" |
| 17 | f | — | 250 | — | Add "f" & point to tuple 250 |
| 18 | <== NextAvailableSlotForSimpleNode is 18 (slots 18 to 249 are available) | | | | |
| ... | (19 to 248 are also empty and were omitted for clarity) | | | | |
| 249 | <== NextAvailableSlotForCompoundNode is 249 | | | | |
| 250 | 0 | Ext(17) | | | Ref key ends at offset 17 ("golf") |
| 251 | 3 | Ext(2) | | | FollowOn = 3 (follow on), Ref key ends at offset 2 ("dog") |
| 252 | 0 | Ext(13) | | | Ref key ends at offset 13 ("dogfood") |
| 253 | 0 | Ext(9) | | | Ref key ends at offset 9 ("doge") |
| 254 | 0 | Ext(8) | | | Ref key ends at offset 8 ("dogma") |
| 255 | 0 | Ext(6) | | | Ref key ends at offset 6 ("doggone") |
| Offset | FollowOn | --- External Reference --- | | | |

Note 1:
FollowOn = 0 means "no more internal refs";
FollowOn = f (f > 0) means ("continue from f").
Note 2:
Ext(k) stands for the external reference associated with the key entry ending at offset k.

TABLE 14

Add the word "ghost":

| Offset | Char | Left | Middle | Right | REMARKS |
|---|---|---|---|---|---|
| 0 | d | — | 1 | 14 | "g" > "d" (follow right child to "g") |
| 1 | o | — | 2 | — | (no change) |
| 2 | g | — | 251 | — | (no change) |
| 3 | g | 9 | 4 | 7 | (no change) |
| 4 | o | — | 5 | — | (no change) |
| 5 | n | — | 6 | — | (no change) |
| 6 | e | — | 255 | — | (no change) |
| 7 | m | — | 8 | — | (no change) |
| 8 | a | — | 254 | — | (no change) |
| 9 | e | — | 253 | 10 | (no change) |
| 10 | f | — | 11 | — | (no change) |
| 11 | o | — | 12 | — | (no change) |
| 12 | o | — | 13 | — | (no change) |
| 13 | d | — | 252 | — | (no change) |
| 14 | g | — | 15 | — | Found "g" (follow middle to "o") |
| 15 | o | 18 | 16 | — | "h" < "o" (add "h" to left child) |
| 16 | l | — | 17 | — | (no change) |
| 17 | f | — | 250 | — | (no change) |
| 18 | h | — | 19 | — | Add "h" & point to "o" |
| 19 | o | — | 20 | — | Add "o" & point to "s" |

TABLE 14-continued

Add the word "ghost":

| Offset | Char | Left | Middle | Right | REMARKS |
|---|---|---|---|---|---|
| 20 | s | — | 21 | — | Add "s" & point to "t" |
| 21 | t | — | 249 | — | Add "t" & point to tuple 249 |
| 22 | <== NextAvailableSlotForSimpleNode is 22 (slots 22 to 248 are available) | | | | |
| ... | (23 to 247 are also empty and were omitted for clarity) | | | | |
| 248 | <== NextAvailableSlotForCompoundNode is 248 | | | | |
| 249 | 0 | | Ext(21) | | Ref key ends at offset 21 ("ghost") |
| 250 | 0 | | Ext(17) | | Ref key ends at offset 17 ("golf") |
| 251 | 3 | | Ext(2) | | FollowOn = 3 (follow on), Ref key ends at offset 2 ("dog") |
| 252 | 0 | | Ext(13) | | Ref key ends at offset 13 ("dogfood") |
| 253 | 0 | | Ext(9) | | Ref key ends at offset 9 ("doge") |
| 254 | 0 | | Ext(8) | | Ref key ends at offset 8 ("dogma") |
| 255 | 0 | | Ext(6) | | Ref key ends at offset 6 ("doggone") |
| Offset | FollowOn | | External Reference | | |

Note 1:
FollowOn = 0 means "no more internal refs"; FollowOn = f (f > 0) means ("continue from f").
Note 2:
Ext(k) stands for the external reference associated with the key entry ending at offset k.

TABLE 15

Add the word "gopher":

| Offset | Char | Left | Middle | Right | REMARKS |
|---|---|---|---|---|---|
| 0 | d | — | 1 | 14 | "g" > "d" (follow right child to "g") |
| 1 | o | — | 2 | — | (no change) |
| 2 | g | — | 251 | — | (no change) |
| 3 | g | 9 | 4 | 7 | (no change) |
| 4 | o | — | 5 | — | (no change) |
| 5 | n | — | 6 | — | (no change) |
| 6 | e | — | 255 | — | (no change) |
| 7 | m | — | 8 | — | (no change) |
| 8 | a | — | 254 | — | (no change) |
| 9 | e | — | 253 | 10 | (no change) |
| 10 | f | — | 11 | — | (no change) |
| 11 | o | — | 12 | — | (no change) |
| 12 | o | — | 13 | — | (no change) |
| 13 | d | — | 252 | — | (no change) |
| 14 | g | — | 15 | — | Found "g" (follow middle to "o") |
| 15 | o | 18 | 16 | — | Found "o" (follow middle to "l") |
| 16 | l | — | 17 | 22 | "p" > "l" (add "p" to right child) |
| 17 | f | — | 250 | — | (no change) |
| 18 | h | — | 19 | — | (no change) |
| 19 | o | — | 20 | — | (no change) |
| 20 | s | — | 21 | — | (no change) |
| 21 | t | — | 249 | — | (no change) |
| 22 | p | — | 23 | — | Add "p" & point to "h" |
| 23 | h | — | 24 | — | Add "h" & point to "e" |
| 24 | e | — | 25 | — | Add "e" & point to "r" |
| 25 | r | — | 248 | — | Add "r" & point to tuple 248 |
| 26 | <== NextAvailableSlotForSimpleNode is 26 (slots 26 to 247 are available) | | | | |
| ... | (27 to 246 are also empty and were omitted for clarity) | | | | |
| 247 | <== NextAvailableSlotForCompoundNode is 247 | | | | |
| 248 | 0 | | Ext(25) | | Ref key ends at offset 25 ("gopher") |
| 249 | 0 | | Ext(21) | | Ref key ends at offset 21 ("ghost") |
| 250 | 0 | | Ext(17) | | Ref key ends at offset 17 ("golf") |
| 251 | 3 | | Ext(2) | | FollowOn = 3 (follow on), Ref key ends at offset 2 ("dog") |
| 252 | 0 | | Ext(13) | | Ref key ends at offset 13 ("dogfood") |
| 253 | 0 | | Ext(9) | | Ref key ends at offset 9 ("doge") |
| 254 | 0 | | Ext(8) | | Ref key ends at offset 8 ("dogma") |
| 255 | 0 | | Ext(6) | | Ref key ends at offset 6 ("doggone") |
| Offset | FollowOn | | External Reference | | |

Note 1:
FollowOn = 0 means "no more internal refs"; FollowOn = f (f > 0) means ("continue from f").
Note 2:
Ext(k) stands for the external reference associated with the key entry ending at offset k.

TABLE 16

Add the word "golfer":

| Offset | Char | Left | Middle | Right | REMARKS |
|---|---|---|---|---|---|
| 0 | d | — | 1 | 14 | "g" > "d" (follow right child to "g") |
| 1 | o | — | 2 | — | (no change) |
| 2 | g | — | 251 | — | (no change) |
| 3 | g | 9 | 4 | 7 | (No change; Rows 4 through 11 have been omitted for display purposes) |
| 12 | o | — | 13 | — | (no change) |
| 13 | d | — | 252 | — | (no change) |
| 14 | g | — | 15 | — | Found "g" (follow middle to "o") |
| 15 | o | 18 | 16 | — | Found "o" (follow middle to "l") |
| 16 | l | — | 17 | 22 | Found "l" (follow middle to "f") |
| 17 | f | — | 250 | — | Found "f" (follow middle to tuple 250) |
| 18 | h | — | 19 | — | (no change) |
| 19 | o | — | 20 | — | (no change) |
| 20 | s | — | 21 | — | (no change) |
| 21 | t | — | 249 | — | (no change) |
| 22 | p | — | 23 | — | (no change) |
| 23 | h | — | 24 | — | (no change) |
| 24 | e | — | 25 | — | (no change) |
| 25 | r | — | 248 | — | (no change) |
| 26 | e | — | 27 | — | Add "e" & point to "r" |
| 27 | r | — | 247 | — | Add "r" & point to tuple 247 |
| 28 | <== NextAvailableSlotForSimpleNode is 28 (slots 28 to 246 are available) | | | | |
| ... | (29 to 245 are also empty and were omitted for clarity) | | | | |
| 246 | <== NextAvailableSlotForCompoundNode is 246 | | | | |
| 247 | 0 | | Ext(27) | | Ref key ends at offset 27 ("golfer") |
| 248 | 0 | | Ext(25) | | Ref key ends at offset 25 ("gopher") |
| 249 | 0 | | Ext(21) | | Ref key ends at offset 21 ("ghost") |
| 250 | 26 | | Ext(17) | | Change from FollowOn = 0 to FollowOn = 26 to add more (point to "e"), but don't change external reference; Ref key ends at offset 17 ("golf") |
| 251 | 3 | | Ext(2) | | FollowOn = 3 (follow on), Ref key ends at offset 2 ("dog") |

TABLE 16-continued

Add the word "golfer":

| Offset | Char | Left | Middle | Right | REMARKS |
|---|---|---|---|---|---|
| 252 | 0 | | Ext(13) | | Ref key ends at offset 13 ("dogfood") |
| 253 | 0 | | Ext(9) | | Ref key ends at offset 9 ("doge") |
| 254 | 0 | | Ext(8) | | Ref key ends at offset 8 ("dogma") |
| 255 | 0 | | Ext(6) | | Ref key ends at offset 6 ("doggone") |
| Offset | FollowOn | External Reference | | | |

Note 1:
FollowOn = 0 means "no more internal refs"; FollowOn = f (f > 0) means ("continue from f").
Note 2:
Ext(k) stands for the external reference associated with the key entry ending at offset k.

TABLE 17

Add the word "crypt":

| Offset | Char | Left | Middle | Right | REMARKS |
|---|---|---|---|---|---|
| 0 | d | 28 | 1 | 14 | "c" < "d" (add "c" to left child) |
| 1 | o | — | 2 | — | (no change) |
| 2 | g | — | 251 | — | (no change) |
| 3 | g | 9 | 4 | 7 | (No change; Rows 4 through 18 have been omitted for display purposes) |
| 18 | h | — | 19 | — | |
| 19 | o | — | 20 | — | (no change) |
| 20 | s | — | 21 | — | (no change) |
| 21 | t | — | 249 | — | (no change) |
| 22 | p | — | 23 | — | (no change) |
| 23 | h | — | 24 | — | (no change) |
| 24 | e | — | 25 | — | (no change) |
| 25 | r | — | 248 | — | (no change) |
| 26 | e | — | 27 | — | (no change) |
| 27 | r | — | 247 | — | (no change) |
| 28 | c | — | 29 | — | Add "c" & point to "r" |
| 29 | r | — | 30 | — | Add "r" & point to "y" |
| 30 | y | — | 31 | — | Add "y" & point to "p" |
| 31 | p | — | 32 | — | Add "p" & point to "t" |
| 32 | t | — | 246 | — | Add "t" & point to tuple 246 |
| 33 | <== NextAvailableSlotForSimpleNode is 33 (slots 33 to 245 are available) | | | | |
| ... | (34 to 244 are also empty and were omitted for clarity) | | | | |
| 245 | <== NextAvailableSlotForCompoundNode is 245 | | | | |
| 246 | 0 | | Ext(32) | | Ref key ends at offset 32 ("crypt") |
| 247 | 0 | | Ext(27) | | Ref key ends at offset 27 ("golfer") |
| 248 | 0 | | Ext(25) | | Ref key ends at offset 25 ("gopher") |
| 249 | 0 | | Ext(21) | | Ref key ends at offset 21 ("ghost") |
| 250 | 26 | | Ext(17) | | FollowOn = 26 (follow on), Ref key ends at offset 17 ("golf") |
| 251 | 3 | | Ext(2) | | FollowOn = 3 (follow on), Ref key ends at offset 2 ("dog") |
| 252 | 0 | | Ext(13) | | Ref key ends at offset 13 ("dogfood") |
| 253 | 0 | | Ext(9) | | Ref key ends at offset 9 ("doge") |
| 254 | 0 | | Ext(8) | | Ref key ends at offset 8 ("dogma") |
| 255 | 0 | | Ext(6) | | Ref key ends at offset 6 ("doggone") |
| Offset | FollowOn | External Reference | | | |

Note 1:
FollowOn = 0 means "no more internal refs"; FollowOn = f (f > 0) means ("continue from f").
Note 2:
Ext(k) stands for the external reference associated with the key entry ending at offset k.

9.3 RECAP—Reliably Efficient Computation, Adaptation, & Persistence 9.3.1 RECAP—Resource-Sharing Concepts Load-balancing and other resource-sharing information is shared as typed block data in standard heartbeat messages. The information content and frequency of distribution varies according to a hierarchy of "granularity" that reflects the degree of locality most affected by the information.

9.3.1.1 Hierarchical Granularities of Locality

In a preferred embodiment, SHADOWS recognizes several hierarchical granularities of locality that can be configured as required to appropriately represent resource distributions, and comprising at least the following notional levels of granularity along a spectrum: Machine (more fine-grained), Site, Neighborhood, Community. Region, World (less fine-grained).

In this discussion, "Machine" may be taken to be the most fine-grained locality, because it is sufficient for teaching purposes, but there are usually also finer-grained localities, and the same principles apply (the hierarchy actually extends in both directions). For example, in a preferred embodiment, the Machine (which is a SCRAM node that is described elsewhere) comprises a set of Quadrants, each of which comprises a set of Lobes and an optional set of Blades, where each Lobe (and optionally any Blade) comprises at least one MASTER and typically at least one SLAVE, and both MASTERs and SLAVEs are typically multi-core processors.

9.3.1.2 Information Roll-Up by Locality

Sharing of intra-locality-specific load-balancing information occurs within each hierarchical granularity, and sharing of summarized load-balancing information occurs by pushing it to the next less-fine-grained level. [Note: In a preferred embodiment, this information sharing is implemented with secure multicasting wherever and whenever such multicasting is feasible, for efficiency, and with secure "simulated" multicasting otherwise.]

For example, within a specific Machine (e.g., among the multiple processors of a multiprocessor machine), information sharing is more fine-grained (i.e., more detail and shared at a higher frequency) than across the Site containing the Machine, or the Neighborhood containing the Site, etc. Similarly, within a "Neighborhood," information sharing is more fine-grained than across the Community containing the Neighborhood, or the Region containing the Community, etc.

Every Machine shares load and resource information with its Site at a relatively high frequency (compared to the summarization of the Site's information). Likewise, every Site shares load and resource information with its Neighborhood at a relatively high frequency, compared to the summarization of the Neighborhood's information, and so on.

Accordingly, load-balancing information is fresher within a Machine than within a Site or Neighborhood, but fresher within a Neighborhood than within a Community, and so on.

9.3.1.3 Scope of Information Roll-Ups

Note that the information roll-up technique described here is not limited to load-balancing information, but is generally applicable to other information related to resource-sharing, and is especially useful for quantified classification of resource availability (i.e., relative capacity available rather than relative current load). Resource information can also be much finer-grained than the available of a general resource such "computing capacity"—it may extend, for example, to the capacity for handling a very specific task, or to the level of energy production, fuel reserves, network bandwidth, etc. The resulting information is particularly actionable when used in conjunction with "Think Globally, Act Locally" decision-making processes such as those used by the MASTER (described elsewhere) to determine its immediate propensity to offload tasks through delegation vs. handling them locally vs. volunteering to take on even more tasks.

9.3.1.4 Regularity of Information Roll-Ups

On an event-driven basis, every Machine shares only significant changes in its load or resources, where significance is statistically designated by, for example, a change in quartile. In a preferred embodiment, load classification by quartile is used, and each quartile class is represented by just two bits. By using quartiles, changes in classification occur relatively slowly and provide natural hysteresis, which is very desirable. When a quartile change does occur, it represents a substantive (and therefore usually actionable) change in load classification. Causal factors (e.g., load spike, failed CPU, etc.) may optionally be shared if known, and if allowed/required by policy, at the cost of increased communication overhead (in a preferred embodiment, such information is not shared generally, but rather, is shared only with those processes, or other entities, that have a "need to know").

On a periodic basis, every Machine re-establishes a baseline for its load and available resources, by sharing fine-grained information with its Site (which includes its partner), and by keeping track of information shared by affiliated Machines ("peers") within its Site. Thus, every Machine has Machine-level load info for all its peers (by definition, all the affiliated Machines within its Site).

On a predetermined basis (in a preferred embodiment, round-robin turn-taking is used, determined by assigned time slot), each Machine also summarizes its Site's load info and shares it with both its Site (i.e., with all the peer Machines for whom it is summarizing information) and with its Neighborhood (i.e., with all the Sites that are peers of its Site). Each Machine takes a turn periodically, in order to amortize the overhead across the Site's multiple Machines). The summary includes a list (expressed or implied) of the Site's Machines and their Machine indices, ranked by quartile (in a preferred embodiment, quartile is used, but other classifications schemes are usable).

This summarization process occurs at each hierarchical level. Thus, every Machine has access to summarized Machine-level load and resource information for every affiliated Machine in the Site, and Site-level information for every affiliated Site in the Neighborhood, and Neighborhood-level information for every affiliated Neighborhood in the Community, and so on.

9.3.1.5 Sharing the Overhead Associated with Creating Roll-Ups

In a preferred embodiment, a multiplicity of peers at each level, but representing only a portion of the peers at that level (say, n of them), is responsible for each roll-up operation. Each such peer uses the same information basis to independently create a roll-up dataset (which should be identical to those created by the other n−1 participating peers). The dataset is then compressed, encrypted, sliced, and FEC-encoded with a systematic (n,k) code, such that any k of the slices (where k<=n) is sufficient to retrieve the dataset. Each of the n peers share only one slice, which means that the threshold value k (which may vary with context) determines how many correct slices have to be received to reconstruct the dataset. This technique (which, in a preferred embodiment, is also used in other contexts) contributes to Byzantine fault-tolerance, since up to n−k faulty contributors can be ignored (however, the SELF and BOSS subsystems take note of such failures).

9.4 RUSH—Rapid Universal Secure Handling

9.4.1 Central Concept

An "untrusted node" such as an end-user PC or non-Scrutiny server (also referred to as the "subject machine") can be configured with SHADOWS software processes that enable its participation in the SHADOWS supercomputing infrastructure. Any PC or server machine, regardless of its "PC" or "server" label can serve as both a SHADOWS client (for one or more end-users) or as a SHADOWS server.

9.4.1.1 Who can Talk with Whom?

No end-user software processes running on an untrusted node are ever allowed to communicate with the SHADOWS infrastructure directly. All communication must take place via one or more agent processes (SHADOWS agents) installed and/or executing on the user's machine. Table 18 identifies some of the key communications and process actors.

TABLE 18

Communications & Process Actors

| Process, Type | Long Name |
|---|---|
| DELEGATE, Agent | Distributed Execution via Local Emulation Gateway |
| FLAMERouter, Agent | Firewall, Link-Aggregator/Multiplexer & Edge Router |
| MARSHAL, Agent | Multi-Agent Routing, Synchronization, Handling & Aggregation Layer |
| RUSH, Protocol | Rapid Universal Secure Handling |
| RUSHrouter, Agent | Rapid Universal Secure Handling router |
| SERVANT, Agent | Service Executor, Repository, & Voluntary Agent -- Non-Trusted |
| SHADOWS, System | Self-Healing Adaptive Distributed Organic Working Storage |
| UNCAP, Protocol | Untrusted Node Computation, Aggregation, & Persistence |

In particular, non-SHADOWS software (e.g., user applications) can communicate only with local SHADOWS DELEGATEs, which in turn communicates only with its local RUSHrouter. Locally installed SHADOWS SERVANTs (SERVANT agents), if any, can also communicate with the local RUSHrouter, which is responsible for all external communications. The user-local RUSHrouter further implements one or more MARSHAL roles that communicate with their assigned MARSHAL teams (more on this later) via one or more wide-area networks (WANs). Each MARSHAL may also communicate with other "nearby" MARSHALs as specifically instructed by its MARSHAL team. The MARSHAL team communicates amongst itself and with other MARSHAL teams as necessary and permitted, in order to reach the WAN-facing FLAMERouters of the "back-end" SHADOWS infrastructure (which themselves act as MARSHALs, such that a "mere" MARSHAL doesn't actually know when or if it is actually communicating with a FLAMERouter).

9.4.1.2 Quid Pro Quo SLA

The SHADOWS infrastructure consists of a widely distributed cloud of dedicated "back-end" supercomputing and storage nodes, augmented by a collection of user-supplied computing and storage resources ("untrusted nodes"). The back-end supercomputing and storage nodes provide the resources necessary to achieve a basic level of service under the terms of a basic service level agreement (SLA).

However, users can extend this basic service via "Quid Pro Quo" SLA, which provides a means to leverage the actual capacity of their local resources. For example, a user typically consumes much less than 10% of the available computing capacity over a 24-hour period, leaving more than 90% unused, and therefore—wasted. Under the terms of the Quid Pro Quo SLA, and with the support of the SHADOWS infrastructure, a user can not only take advantage of nearly 100% of the available capacity, but can do so when it is needed most. The combination of a Quid Pro Quo SLA and the SHADOWS infrastructure essentially allows a user to "bank" the unused or unneeded resources and recall them on demand.

For example, we can measure compute time in CPU-seconds, CPU-minutes, or CPU-hours. Compiling a simple software source code file might consume 100% of a CPU for anywhere from a fraction of a second to several minutes. However, compiling an operating system like Linux with, say, 17,000 files might take 3 hours or more on a fast machine, and the CPU might not be at 100% the whole time, depending on the speed of the machines disk drives. For the sake of discussion, let's say that compiling Linux locally requires 180 CPU-minutes (3 hours at 100% CPU, and we'll ignore the number of CPUs, CPU speed, disk speed, etc., for now). Under the terms of the Quid Pro Quo SLA, if the SHADOWS infrastructure had already been able to take advantage of 180 CPU-minutes of idle computing resources on the user's machine, then the user would have "banked" sufficient resources to recall them all at once and apply them to a single task (all on an automated basis). In this case, the task of compiling Linux would be carried out by the Quid Pro Quo-augmented SHADOWS infrastructure, which means that all 17,000 files would be compiled in parallel, with the user-specified options, and the results returned to the user's machine. The compilation itself might take only a second or two, but let's just say "less than a minute" (rather than 3 hours), which is a significant speedup, and would exhaust the banked 180 CPU-minutes all at once. Additional resources would be consumed for communicating and storing requests and results, but this is also done optimally under the SHADOWS infrastructure.

A user's computation and data storage resources cannot be trusted by the SHADOWS infrastructure, which mandates special processes in order to achieve the high level of security required. This extra processing creates an overhead that must be accounted for in the Quid Pro Quo SLA, but otherwise provides the same benefits (high security and data integrity) to the user contributing the resource as for other users.

When talking about "untrusted nodes" in the context of the SHADOWS infrastructure, it is useful to distinguish between the foreground processing, background processing, and communications processing that occurs locally—i.e., on the subject machine (e.g., the user's PC, or a server belonging to the user's employer). In this context, foreground processing refers to any SHADOWS processing that is performed locally to satisfy the immediate request(s) of a bona fide user. Background processing refers to any SHADOWS processing that is performed locally to satisfy the Scrutiny SHADOWS Quid Pro Quo SLA) associated with the subject machine. Communications processing refers to any local processing and communications required to satisfy the combined communications needs of foreground processing or background processing.

9.4.1.3 Foreground Processing

End-user software applications can integrate with the SHADOWS infrastructure through a SHADOWS DELEGATE, which is essentially an application-specific proxy, or gateway, that provides the necessary interface. The user-facing side of the DELEGATE implements one or more APIs (application programming interfaces) and/or protocols needed by the user's software applications (and to be provided by SHADOWS). Examples would include various file systems, version control systems, database managements systems, directory systems, email systems, instant messaging, VoIP, etc.

In general, each DELEGATE provides a single, minimalist user-facing API that implements a particular API and/or protocol. For example, one DELEGATE might implement the MAPI email/messaging protocol, while another DELEGATE implements the IMAP email/messaging protocol. If IMAP isn't needed, then the IMAP DELEGATE is not installed. Likewise, if the user needs both the proprietary Oracle DBMS and the open source MySQL DBMS to be available, then the appropriate DELEGATE can be installed for each.

Regardless of the user-facing API or protocol implemented by a particular DELEGATE, the SHADOWS-facing side of the DELEGATE implements the SHADOWS RUSH protocol. Thus, the DELEGATE is essentially a protocol and data translation process interposed between a user's software application and the SHADOWS infrastructure. In each case, the user's software application depends on some functionality external to itself (which is "normally" provided by another local or remote software application or service), and it is the role of the appropriate DELEGATE to emulate that functionality. The DELEGATE itself rarely implements the functionality on its own, but rather, simply provides bi-directional translations of requests and responses, while communicating with the SHADOWS infrastructure to do most of the actual work.

A DELEGATE need not be installed as a service on the subject machine—it may run on-demand as an application. For example, a software developer could locally run a "compiler" from a make file. The actual compiler can be replaced with a DELEGATE that is responsible for the compilation, but which securely communicates with the SHADOWS infrastructure to do the actual work and return exactly the same results that would have been returned by the local compiler, but with improvements in one or more dimensions (e.g., less elapsed time, deeper analysis, etc).

Note that if a user requests that changed files be automatically archived to the SHADOWS infrastructure, this is still considered foreground processing (although it may occur at reduced priority), because it is requested by the user, on behalf of the user.

9.4.1.4 Background Processing

First, note that very little, if any, background processing occurs except under the terms of the Quid Pro Quo SLA.

In the SHADOWS infrastructure, background processing on an entrusted node is always carried out by a SERVANT agent (or simply, SERVANT). Using the UNCAP protocol, instructions and data are sent from the SHADOWS infrastructure back-end via FLAMERouter(s) to multiple MARSHALs, across WANs, to the RUSHRouter-acting-as-MARSHAL on the subject machine. The RUSHrouter routes the communications to the SERVANT, which acts on the received instructions and data. In general, all or some of the data is cached in a local associative memory structure, but portions may be also be stored persistently (only as directed) in a specific encrypted container intended for that purpose. In general, the encrypted persistent store contains insufficient information to accomplish any task, including basic data retrieval. The UNCAP protocol depends heavily on forward error correction (FEC) and bits of information supplied only on an as-needed, JIT basis. Most UNCAP instructions to a SERVANT are provided in terms of operators (actions to take) and operands (specified objects on which to operate), and the information necessary to construct either one may not arrive until just before it is needed, at which point it is cached in memory rather than stored persistently.

FEC is also used to return actual results of a particular operation. For results that seem to be novel, FEC can be used (as instructed) to encode any results, which may be partially cached and partially stored, and—more importantly—only partially returned to the SHADOWS infrastructure (or forwarded elsewhere as requested). By using FEC, each SERVANT sends only a fraction of the result, taking advantage of the almost-always-smaller-uplink-capacity associated with the subject machine, while taking also taking advantage of the almost-always-larger-downlink-capacity of the target recipient by receiving an aggregation of inputs from diverse SERVANTs. The ability to capitalize on asymmetric uplink/downlink capacities is particularly beneficial for communicating interim results among a large collection of SERVANTs, under the direct control of the SHADOWS infrastructure. Corrupt and/or unresponsive SERVANTs are easily detected and worked around by the combination of FEC and encryption, among other techniques. SERVANTs are not provided with communication capability except that required to communicate with their local (interior) MARSHAL.

One of the operations of a SERVANT process is to launch a subordinate SERVANT process and register it with its MARSHAL (the subordinate SERVANT must also register directly). The subordinate SERVANT process "executable" is first created from cached and/or stored objects (just like any other result), under the auspices of the SHADOWS infrastructure. Once the synthesis is approved, it is then launched as a separate request (which also requires concurrence of the local RUSHrouter, which cannot withhold concurrence unless something isn't quite right). The local MARSHAL may kill any local SERVANT process, and may also causes its own virtual machine to be restarted (by crashing itself, if need be). SERVANT processes may thus be created and deleted on the fly, but each is completely expendable. In fact, from the SHADOWS infrastructure viewpoint, every aspect of a user's machine is expendable.

Background processing is always subordinate to foreground processing, and thus the SERVANT may relinquish control whenever there is foreground processing to do (which could be due to any DELEGATE, or any other application under user control).

9.4.1.5 Communications Processing Actors

When servicing users, RUSH is the only visible protocol after the user's application programming interface (API) up to and including the SHADOWS FLAMERouter. On the user side, the API is terminated locally by the associated resident DELEGATE process, which serves as a stateful protocol translator (API to RUSH) and application gateway. Here's a typical interface sequence: UserApp <via API> DELEGATE <via RUSH> RUSHrouter <via RUSH> MARSHAL <via RUSH> MARSHAL <via RUSH> MARSHAL <via RUSH> FLAMERouter <via RECAP> MASTER Note that the FLAMERouter on the server side has an embedded MASTER, and can fully terminate the RUSH protocol. The FLAMERouter's MASTER can communicate with other internal MASTERs using RECAP.

When a user's machine (or actually, a SERVANT on the user's machine) is servicing SHADOWS, the UNCAP protocol is tunneled through RUSH, such that RUSH is still the only visible protocol: SERVANT <via RUSH> RUSHrouter <via RUSH> MARSHAL <via RUSH> MARSHAL <via RUSH> MARSHAL <via RUSH> FLAMERouter <via UNCAP & RECAP> MASTER In this scenario the SHADOWS SERVANT natively uses the RUSH protocol, so no user API is involved. On the server side, which is actually the originating end, UNCAP, which is tunneled over RUSH, is used to direct the SERVANT. RECAP traffic occurs only between the MASTER and the FLAMERouter (which has an embedded MASTER), but does not propagate to RUSH.

9.4.2 RUSH—Dynamic Inter-Site Path Characterization

The SHADOWS infrastructure frequently needs to take advantage of one-way links (unicast or multicast), because requiring a return path imposes an unnecessary constraint on the system. Thus, all route planning is based on one-way routes. This also turns out to be very advantageous when asymmetric links are to be used, such as ADSL. In any case, RUSH models all bidirectional links as two unidirectional links, because the presence of one direction (e.g., reception) does not imply the correct functioning of the other (e.g., transmission). This same principle holds for radio frequency and optical traffic used for RUSH communications.

Given a need for one-way communication between two SHADOWS sites A and B, there are likely to be multiple paths (each consisting of one or more links), any or all of which could apparently be utilized. The effect of actually selecting and utilizing one particular path over another may have significant consequences in terms of delay, cost, and/or reliability.

Any link that is defined in terms of one or more usage and/or capacity thresholds (e.g., bursting limits, capacity windows, etc.) is modeled in SHADOWS as a set of related sub-links, each defined by its own set of thresholds. Given a set of sub-links, the links must be labeled in ascending order of sequential use (e.g., A1 is used before A2, etc.).

The SHADOWS infrastructure dynamically characterizes the paths (especially the major ingress/egress points, and intermediate SHADOWS nodes) between its various sites, and creates a plan for each site that allocates one-way traffic (to each possible destination site) along its outbound links, in such a way as to globally optimize the use of each link. The allocation of traffic is dynamic in that it may be re-planned on a periodic or event-driven basis, but is almost always event-driven (expiration of a plan is considered an event, as is any major perturbation in SHADOWS network status).

Route planning generally strives to achieve several potentially conflicting goals. Conflicts among goals may not occur (or may be of no consequence) as long as link utilization stays below some "bottleneck" threshold. One of the desirable side effects of route planning is to identify and monitor actual or potential inter-site bottlenecks in the SHADOWS network, and to recommend (or ideally, to execute) provisioning changes.

For route-planning purposes, at any point in time there is a set of parameters that statistically characterizes a particular path from site A to site B, and this set depends on a similar set of parameters that characterizes each of the links in the path. The statistical path (and link) parameters comprise at least some combination of the following:

Plan Expiry (timestamp)
Capacity Remaining RMS & Variance (MB)

Drawdown Rate RMS & Variance (MB/h)
Utilization RMS & Variance %
Packet Loss RMS & Variance %
Latency RMS & Variance (ms)
Jitter RMS & Variance (ms)
Transit Time RMS & Variance (s/MB)
Operational Cost ($/MB)
Infrastructure Cost ($/MB)

9.4.3 RUSH—Energy Considerations for Routing

Energy usage is a key consideration for survivability, especially for systems that must continue to operate when the utility power grid is down, and for systems that routinely operate off-grid. Although a given site may load-shed to an extreme degree, such as getting rid of all processing and storage tasks, leaving only communications (in order to avoid a potential network partition), there can still be a critical shortage of energy, especially if prolonged periods must be endured.

Communications, and particularly, transmissions can be highly consumptive of sparse energy resources. For that reason, SHADOWS (and specifically, the RECAP and RUSH protocols) considers energy use as an optionally advantageous part of its resource information. The RUSH protocol, in particular, considers energy usage in its routing algorithms, such that during certain resource scenarios, routing occurs in such a way as to maximize network coverage while minimizing energy usage. In this context, the overriding goal is to conserve as much energy as possible, but expend as much energy as necessary to prevent a network partition.

In a preferred embodiment of the SHADOWS infrastructure, each SHADOWS site has multiple external communication channels that connect it directly or indirectly to all other SHADOWS sites via a diverse variety of networks (VLAN, WAN, WLAN, etc.) over a combination of optical, wired, terrestrial wireless, and satellite wireless links. Normally, only a few of these links (as few as one) is needed to prevent a network partition. In a strictly site-local energy crisis, survival of the site (preventing a network partition) may be a simple matter of choosing the link with the lowest power requirement. However, in the case of a site whose presence is pivotal in keeping several other sites connected, the problem is more complex. Such a problem could occur, for example, if the local site is the only survivor capable of connecting two parts of a mesh, and both of the parts depend on the local site for WAN connectivity. In this case, the system uses the minimum number of links needed (at appropriate power levels) to safely prevent a network partition, and the determination of a minimalist configuration requires understanding of the present nearby network topology, since lower power can potentially be achieved by introducing more hops and a potentially more indirect path, thereby trading away minimal latency, or by taking advantage of packets that can be directly overheard (at a given power level) by nodes beyond the next hop.

In a preferred embodiment, the power requirements for data transmission are determined and normalized into an energy cost per 512-byte packet. Other packet sizes are possible, but 512 bytes is used as a normalization unit since it is a convenient and frequently occurring size in the SHADOWS infrastructure, in anonymization networks, various real-time protocols, and so forth.

9.4.4 RUSH—Inter-Node Messaging Plan

A SHADOWS inter-node messaging plan is a means for globally optimal use of locally available network communications links, while dynamically adapting to a frequently changing network state.

Inter-node messaging plans are created and maintained in quasi-real-time, and are sufficiently event-driven to account for network perturbations and state changes. However, "event-driven" doesn't mean "message-driven." Plans are not calculated on demand according to current outbound message load. Rather, a single plan is expected to apply to a very large number of messages, so that the amortized computational overhead can be relatively small.

Each messaging plan accommodates the both the recommended outbound link capacity and maximum outbound link capacity of a particular node. When plan recommendations are approached and/or exceeded, actionable messages occur to request automated workload-shifting and/or provisioning requests.

A messaging plan for one-way A-to-B communications is simply, for each QoS priority, a list of next-hop links (or sub-links) that are to be used, along with the percentage of data that is to be sent via each link.

Example: The messaging plan data structure for point A (the origin of a one-way communication from point A to point B) is conceptually similar to the following:

```
Plan Expiry={timestamp}
Origin=A
    Destination=B
        QoS=1
            {Link 1, 45%}
            {Link 2, 23%}
            {Link 3, 20%}
            {Link 5, 11%}
            {Link 6, 1%}
        QoS=2
            {Link 3, 50%}
            {Link 4, 28%}
            {Link 5, 9%}
            {Link 2, 8%}
            {Link 1, 6%}
        QoS=3
            ...
    Destination=C
        QoS=...
    Destination=...
Origin=B
    Destination=A
        QoS=...
    Destination=C
        QoS=...
    Destination=...
...
```

9.4.5 RUSH—Pre-Validation of Session Traffic

9.4.5.1 Central Concept

The idea is to pre-validate session setup traffic in a way that shifts the burden of proof (and the overhead of verifying that proof) away from the SHADOWS infrastructure, while simultaneously challenging inbound traffic originators in a manner that mitigates the threat of DDoS, improves auditability, and minimizes the use of SHADOWS resources.

9.5.5.2 Basic Concepts

1. SHADOWS presents itself as a small target on a slowly moving "tar baby"
2. Bona fide SHADOWS clients can easily hit the target, others cannot
3. SHADOWS can separate hits from misses with very little overhead
4. Attempts that miss the target tend to stick to the "tar baby" with little SHADOWS overhead

9.4.5.2.1 A Slow Target on a Slowly Moving "Tar Baby"

On networks used to enable and facilitate automated communications with "new" or previously unconnected entities ("supplicants"), a beacon is transmitted that allows legitimate devices to sync up with, and connect to, the SHADOWS network, in order to initiate additional steps in an identification and authentication process. A very important aspect of the SHADOWS beaconing mechanism is that the burden of proof is shifted away from SHADOWS to the devices desiring a connection. Although it may appear from the description below that there is significant overhead on the SHADOWS side, it is illusory, because the computations occur so rarely (no more often than once per tens or hundreds of seconds) and are then amortized over, say, thousands of inbound connections. The outbound beacon fragments are multicast (or returned in special Hashcash-enabled DNS requests), and require little transmission overhead.

Beacons provide a low-overhead defense layer intended to quickly obtain a pre-validation estimate that answers the question: "friend or foe?" If the estimated answer is "foe," then it's actually definitive, and low-overhead traffic management techniques can be used to cause each such connection attempt to get "stuck" (usually for a long time as determined by SHADOWS, or by security policy, but generally for long enough to decimate a DDOS attack). If the estimated answer is "friend," then enough access is allowed such that the next level of verification is possible.

In a preferred embodiment, beacons are used for "almost" all initial communications with the SHADOWS network (security policy determines the degree to which none, some, or all of the initial communications depends on successful use of beaconed information.), but different beaconing tactics are used to help limit access to different resources. If beacons are in use to limit access to a resource, then the resource cannot be accessed successfully without first interpreting the beacons correctly.

In a preferred embodiment, a sequence of beacons is transmitted via a multiplicity of time-varying communications channels, with legitimate beacons camouflaged among bogus beacons, both on a given channel, and also among different channels. In a preferred embodiment, the mix of communications channels used for beacon transmissions changes over time, so that at any point in time a variety of legitimate channels is available for hearing a mix of legitimate and bogus beacons, along with a variety of channels where only bogus beacons are heard. Any listening device can potentially hear the beacons, but only bona fide communications partners can understand and easily separate the legitimate beacons from the bogus beacons—doing so requires both detailed process/protocol knowledge typically built into hardware, and also knowledge of several public and private cryptographic keys. In the next two paragraphs, the values of s, p, and d—referred to respectively in the context of 1-of-s, 1-of-p, and 1-of-d—are all values that can be computed by a supplicant based on a reasonably accurate knowledge of time, and a completely correct knowledge of the aforementioned process/protocol. The correct values of s, p, and d are needed to select from among the sets of cryptographic keys that are supposedly known to the supplicant.

In the SHADOWS network, a legitimate beacon comprises the current date, current time, a nonce, and a 1-of-s digital signature associated with the SHADOWS time-keeping authority (a BOSS team). Although the nonce value is, by definition, a random value, it is tracked internally, and must be used by successful supplicants. A bogus beacon is very similar, except that the nonce field and digital signature are both filled with random data values that are not tracked, and where the nonce field is guaranteed to differ from any currently legitimate nonce value.

Prior to transmission, a legitimate beacon is encrypted with a 1-of-p private key associated with the SHADOWS beacon service, then with a 1-of-d private keys associated with supplicants devices (many supplicant devices share the same 1-of-d keys, so these aren't the same as the actual—and unique—private keys assigned to such devices).

Prior to transmission, a bogus beacon is similarly encrypted, but with any randomly selected 1-of-p private key associated with the SHADOWS beacon service except for the presently correct one, then with any randomly selected 1-of-d private keys associated with supplicants devices except for the presently correct one.

Finally, the legitimate beacon is divided into k packets and FEC-encoded into n legitimate beacon packets with a (n,k) erasure code. One or more bogus beacons are similarly FEC-encoded into bogus beacon packets.

After encoding, the legitimate n beacon packets are then transmitted periodically, one at a time, on the various legitimate beacon channels, at a dynamically determined rate and transmission pattern, interspersed with bogus beacon packets with a dynamically determined (and appropriate) percentage of packets going over each legitimate channel. The bogus beacon packets are also transmitted over one or more of the currently non-legitimate beacon channels.

When a bona fide communications partner is ready to initiate communications with the SHADOWS network, it first obtains a reasonably reliable estimate of the current date and time (rounded to the nearest minute), and then uses it to compute a message digest of a sequence comprising data from the following tuple:
  date and time
  1-of-s known public keys associated with the SHADOWS time-keeping authority (where s is a function of the current date and time)

9.4.5.2.2 Easy Target for Bona Fide Clients, but not Others

Secret knock: increasingly sophisticated pattern involving: sync, knowledge, crypto, client-side burden, stickiness.

Client-side burden of proof is essentially effortless and invisible to bona fide clients.

9.4.5.2.3 Low-Overhead Classification of Inbound Hits and Misses

Classification as self vs. non-self begins with: address/port, protocol, date/time, Hashcash, consistency, public/private key.

"Close" doesn't count in pre-validation classification.

A low-saturation Bloom filter can be used to partially validate RUSHRouter traffic against virtual channel combinations that occur, by detecting those which are clearly invalid. The idea is to use a Bloom filter at the network edge to reject bogus traffic without further processing. If traffic appears bogus (e.g., attempted communication on an invalid virtual channel is detected via a Bloom filter), then by definition it is bogus (there are no false negatives). However, if traffic appears legitimate, it requires further validation.

9.4.5.2.4 Originators of Target Misses Risk Getting Stuck

The SHADOWS infrastructure actively manages inbound traffic, including throttling it as necessary to insure that the SLAs for various classes of service are maintained. Traffic that is apparently or actually bogus has an associated class of service (below all others), and thus is also actively managed, which includes deciding whether and to what extent connections and/or packets can be dropped, bandwidth-reduced, delayed by latency, de-prioritized, etc.

Attackers may be able to compromise client-side components to various degrees, and thus may be able to get "closer" to hitting a particular target more quickly.

Although some clients may get further along in the pre-validation process than others, they and their traffic are internally classified as "non-self" (i.e., originated by an attacker) as soon as pre-validation fails. Pre-validation may be allowed to continue temporarily after such a failure (as though no failure occurred) in order to mask the step in which the failure occurred and/or to collect additional information that may be useful for characterizing an attack or attacker. In no case, however, can continued pre-validation (after a failure) lead to successful validation.

9.4.5.3 Process Overview

RUSHrouters (and other SHADOWS entities) use the RUSH protocol, which takes advantage of a SHADOWS-specific flavor of directed spread-spectrum addressing (DSSA) to balance the communications load across multiple virtual channels while also helping to validate RUSH traffic. (Note: A similar technique can be used with certain types internal traffic, with suitably adapted DSSA configuration parameters.). DSSA exhibits an apparently random "hopping around" behavior that cannot be replicated without knowledge of the configuration parameters and cryptographic keys used to generate the behavior. Incorrect hopping behavior triggers SELF reporting and likely escalation.

In conjunction with DSSA, the RUSH protocol also takes advantage of a distributed efficiently amortizable CPU cost-function with no trap-door (e.g., a Hashcash-like algorithm) in order to reduce the risk of DDoS by creating an asymmetric initialization burden (i.e., the client-side RUSH protocol initiator has a much greater burden than the server-side connect point).

The need for further validation if the traffic appears legitimate is partly due to the inherent properties of Bloom filters (which could be easily circumvented with a FASTpage index, at higher resource cost), but mostly due to the fact that the RUSH protocol's DSSA hopping behavior is intended to be a low-overhead, front-end mechanism that simply helps to determine "friend" or "foe" at the network edge. Thus, it is like the a series of secret handshakes that must succeed before other, more costly, validation tests are attempted (e.g., exchanging digital credentials initially, but also just the ongoing encryption and decryption associated with routine communications). (Note: A relatively static (large window) set of DSSA configuration parameters can be used prior to authentication (these may be somewhat vulnerable, but still create a useful entry barrier. Another set of DSSA configuration parameters can be issued and used after authentication.). Also, because the hopping behavior is ongoing, it serves as a low-cost mechanism to help assure continuous traffic validation (there's no point in using cryptographic techniques to validate a message if one already knows it cannot be valid).

The presence of bogus traffic is a direct indication to SELF that one or more "non-self" communications agents are engaging (or attempting to engage) in unauthorized communications with the SHADOWS infrastructure.

RUSHrouters obtain sets of DSSA configuration parameters from the MARSHALs to which they connect (under the auspices and control of a MASTER-led team), and they do so using Byzantine agreement (see also: BOSS). Every agent may have its own parameters, but, in general, multiple agents (a non-unity fraction of the total) may safely share the same parameters (without knowing it), thus reducing the number of concurrent parameter sets that must be maintained on the server side.

In the SHADOWS implementation of DSSA for protocol validation, the DSSA configuration parameters include an internal seed value to be used in conjunction with a high-quality PRNG to generate sets of sequences of destination addresses, ports, and nonces that drive the adaptive "hopping" behavior of communications based on the RUSH protocol. (Note: A nonce is a randomly chosen value, different from previous choices, inserted in a message to protect against replays.). The DSSA configuration parameters also include the percentage of communications (of each type) to be transmitted via each channel, and approximate time-windows, along with a mask that specifies which fields are required during the specified time window (those not required are "don't care'). Note that the DSSA configuration parameters are relatively long-lived (e.g., perhaps minutes or hours), compared to the durations of each DSSA "hop" (e.g., seconds).

The destinations are aware of the specific DSSA configuration parameters for each set of RUSHrouters that shares parameters (each set may include any number of RUSHrouters). At any point in time, the concurrently active DSSA configuration parameters for each set of RUSHrouters can be aggregated into a single Bloom filter, or into one of several Bloom filters, as long as they share the same parameter definitions and format. The ability to merge Bloom filters enables the set of concurrently active DSSA configuration parameters to be both maintained individually (so that obsolete ones can be deleted and new ones can be added), and also combined into a merged filter that can be used for rapid traffic validation.

The DSSA parameters to be reflected in the Bloom filter may include any or all of the following:
Nonce
RUSHrouter group number
Source MAC
Source IP
Source Port
Destination MAC
Destination IP
Destination Port
Operation Requested
Note that, for security reasons, these parameters are suggestive, rather than being precisely defined here.

DSSA parameters not reflected in the Bloom filter may include any or all of the following:
Transmission Timestamp
Receipt Timestamp
When checking for a bogus message, if any of the Bloom filter bits are zero (FALSE), the message is guaranteed to be bogus, so validation processing can cease as soon as zero bits are detected. If all of the bits are set (TRUE), the message is likely legitimate, but further processing is required before validation can be confirmed.

9.4.6 RUSH—Using Bloom Filters to Pre-Validate RUSH Traffic 9.4.6.1 Central Concept A low-saturation Bloom filter can be used to partially validate RUSHRouter traffic against virtual channel combinations that occur, by detecting those which are clearly invalid. The idea is to use a Bloom filter at the network edge to reject bogus traffic without further processing. If traffic appears bogus traffic (e.g., attempted communication on an invalid virtual channel is detected via a Bloom filter), then by definition it is bogus (there are no false negatives). However, if traffic appears legitimate, it requires further validation.

9.4.6.2 Basic Concepts

1. SHADOWS presents itself as a small target on a slowly moving "tar baby."
2. Bona fide SHADOWS clients can easily hit the target, others cannot.
3. SHADOWS can separate hits from misses with very little overhead.

4. Attempts that miss the target tend to stick to the "tar baby" with little SHADOWS overhead.

RUSHrouters (and other SHADOWS entities) use the RUSH protocol, which takes advantage of a SHADOWS-specific flavor of directed spread-spectrum addressing (DSSA) to balance the communications load across multiple virtual channels while also helping to validate RUSH traffic. DSSA exhibits an apparently random "hopping around" behavior that cannot be replicated without knowledge of the configuration parameters and cryptographic keys used to generate the behavior. Incorrect hopping behavior triggers SELF reporting and likely escalation.

In conjunction with DSSA, the RUSH protocol also takes advantage of a distributed efficiently amortizable CPU cost-function with no trap-door (e.g., a Hashcash-like algorithm) in order to reduce the risk of DDoS by creating an asymmetric initialization burden (i.e., the client-side RUSH protocol initiator has a much greater burden than the server-side connect point).

The need for further validation if the traffic appears legitimate is partly due to the inherent properties of Bloom filters (which could be easily circumvented with a FASTpage index, at higher resource cost), but mostly due to the fact that the RUSH protocol's DSSA hopping behavior is intended to be a low-overhead, front-end mechanism that simply helps to determine "friend" or "foe" at the network edge. Thus, it is like the a series of secret handshakes that must succeed before other, more costly, validation tests are attempted (e.g., exchanging digital credentials initially, but also just the ongoing encryption and decryption associated with routine communications). Also, because the hopping behavior is ongoing, it serves as a low-cost mechanism to help assure continuous traffic validation (there's no point in using cryptographic techniques to validate a message if one already knows it cannot be valid).

The presence of bogus traffic is a direct indication to SELF that one or more "non-self" communications agents are engaging (or attempting to engage) in unauthorized communications with the SHADOWS infrastructure.

RUSHrouters obtain sets of DSSA configuration parameters from the MARSHALs to which they connect (under the auspices and control of a MASTER-led team), and they do so using Byzantine agreement (see also: BOSS). Every agent may have its own parameters, but, in general, multiple agents (a non-unity fraction of the total) may safely share the same parameters (without knowing it), thus reducing the number of concurrent parameter sets that must be maintained on the server side.

In the SHADOWS implementation of DSSA for protocol validation, the DSSA configuration parameters include an internal seed value to be used in conjunction with a high-quality PRNG to generate sets of sequences of destination addresses, ports, and nonces that drive the adaptive "hopping" behavior of communications based on the RUSH protocol. The DSSA configuration parameters also include the percentage of communications (of each type) to be transmitted via each channel, and approximate time-windows, along with a mask that specifies which fields are required during the specified time window (those not required are "don't care"). Note that the DSSA configuration parameters are relatively long-lived (e.g., perhaps minutes or hours), compared to the durations of each DSSA "hop" (e.g., seconds).

The destinations are aware of the specific DSSA configuration parameters for each set of RUSHrouters that share parameters (each set may include any number of RUSHrouters). At any point in time, the concurrently active DSSA configuration parameters for each set of RUSHrouters can be aggregated into a single Bloom filter, or into one of several Bloom filters, as long as they share the same parameter definitions and format. The ability to merge Bloom filters enables the set of concurrently active DSSA configuration parameters to be both maintained individually (so that obsolete ones can be deleted and new ones can be added), and also combined into a merged filter that can be used for rapid traffic validation.

The DSSA parameters to be reflected in the Bloom filter may include any or all of the following:
Nonce
RUSHrouter group number
Source MAC
Source IP
Source Port
Destination MAC
Destination IP
Destination Port
Operation Requested Note that, for security reasons, these parameters are suggestive, rather than being precisely defined here.

DSSA parameters not reflected in the Bloom filter may include any or all of the following:
Transmission Timestamp
Receipt Timestamp When checking for a bogus message, if any of the Bloom filter bits are zero (FALSE), the message is guaranteed to be bogus, so validation processing can cease as soon as zero bits are detected. If all of the bits are set (TRUE), the message is likely legitimate, but further processing is required before validation can be confirmed.

9.4.7 RUSH—Time Stamping & Synchronization, Effects of Congestion, Tampering & Attack SHADOWS RUSHrouters running on user PCs and/or servers receive digitally signed beacons with embedded time signals in packets originating from the SHADOWS network at variable, but regular intervals. (Note: Any computing system containing a SHADOWS non-trusted component (e.g., DELEGATE, SERVANT) must also include at least one RUSHrouter to facilitate communication with the SHADOWS infrastructure. In a preferred embodiment, each outbound channel interface (e.g., a physical network interface, wireless adapter, etc.) has a dedicated RUSHrouter operating in its own VM; a separate RUSHrouter, also in its own VM, serves as the default gateway for the host computer, interfacing any hosted applications to the SHADOWS infrastructure by appropriately routing communications through the RUSHrouters that control the channel interfaces. Also, in a preferred embodiment, the time signals originate from a set of "stratum 1" NTP time servers embedded within SHADOWS machines (e.g., sites with SCRAM nodes), since these have internal atomic clocks (with crystal-controlled backup clocks) and are designed to survive and remain accurate in the absence of national or international time sources (e.g., GPS satellites). Alternatively, any "stratum 1" NTP time server will do.). The data to be uploaded regarding security events originating at the user's PC, such as a scanning a fingerprint scan or reading a SmartCard, is timestamped with both the local time and the last n SHADOWS time signals received (where n is a configurable parameter, but usually n>=2 for authentication-oriented security events). Thus, the time associated with a security event can be guaranteed to be accurate within an epsilon that is controlled by the interval between SHADOWS time signals, unless corruption is detected.

9.4.7.1 Local Tampering and Attack

By considering the local time at a user's PC as well as one or more SHADOWS time stamps, SHADOWS can more easily detect local attempts to defeat security (such by adjusting a PC's clock and/or interfering with network transmissions). Heartbeat events supply clues here also, based on whether any are missing, especially in the same timeframe that a security event occurs.

9.4.7.2 Network Congestion and Attack, with Local Detection and Response

During known or extended periods of network congestion, or in order to conserve bandwidth or server capacity, local RUSHrouters (which also have some ability to locally detect attempted local security breaches) can be instructed (ultimately by the SHADOWS SELF and BOSS functionality) as to how they are to respond.

For instance, a RUSHrouter may fail silently (i.e., force a crash or restart of itself and/or any SHADOWS components, shut down the user's PC or server, etc.), or report back to the SHADOWS network with a specified set of information, or some combination thereof. The RUSHrouter's ability to respond is also influenced to a large degree by whether the RUSHrouter itself has been corrupted, or just the platform upon which it is operating. In the case of a RUSHrouter implemented within a self-contained VM (which is a preferred embodiment), the RUSHrouter may continue to operate normally, despite corruption in its physical host.

If the SERVANT is accompanied by, and associated with, a RUSHrouter (described elsewhere), which may also be implemented within a self-contained virtual machine, then in some configurations all of the physical host's communication may be directed toward the RUSHrouter (acting as the default gateway), and inbound communication may be directed to the RUSHrouter as a DMZ machine. In either or both of these scenarios, the RUSHrouter accompanying the local SHADOWS SERVANT(s) can act locally and defensively to mitigate malicious outbound behavior by the physical host, and inbound malicious traffic targeted at the physical host (or at the SERVANT(s), for that matter), and thereby possibly enable the SERVANT(s) to continue operating.

Self-detected corruption always causes a SERVANT to fail silently.

9.4.8 RUSH—Example RUSH Messages (subset)
Application Messages
Apply Apply transform to message (all outputs are transient)
Infrastructure Messages
Cache Prefetch id(s) but do NOT forward them
Fetch Fetch id(s) and forward them
Prefetch Prefetch id(s) and forward them
Reassign Reassign new transient id(s) to NEW persistent id(s)
Resolve Resolve new transient id(s) to EXISTING persistent id(s)
Ingres-Egress Messages
Upload Upload inbound data
Demux Demultiplex message(s) from other(s) and forward them
Mux Multiplex message(s) into other(s) and forward them
Input type T1
Output type T2
N-way INPUT Rendezvous on common TX
Input n1 of m1 instances of type T1, n2 of m2 instances of type T2, etc.
N-way OUTPUT Split
Output n1 instances of type T1, n2 instances of type T2, etc.

Every message type is associated with a Process Input Control List (PICL), a Process Output Control List (POCL), and a set of corresponding access control masks.

The PICL identifies each process that is allowed to input the message type, and the POCL identifies each process that is allowed to output it. Each input (or output) access control mask is a variable-length bitstring with one bit allocated for every process specified in the PICL (or POCL).

Access Control Mask Types:

| Input Message Mask (IMM) | Configuration-dependent |
| Input Access Mask (IAM) | Access privileges-dependent |
| Input Preferences Mask (IPM) | Preferences-dependent |
| Output Message Mask (OMM) | Configuration-dependent |
| Output Access Mask (OAM) | Access privileges-dependent |
| Output Preferences Mask (OPM) | Preferences-dependent |

There is exactly one IMM and one OMM for each message type in the system. The IMM and OMM are each represented by a quasi-static value that can vary only when the system is reconfigured in one or more of the four following ways:
1. Add one or more additional processes
2. Disable one or more existing processes
3. Enable one or more existing (but disabled) processes
4. Remove one or more existing processes There is one ICM and one OCM for each subscriber, for each message type in the system. Each ICM (OCM) mask has the same number of bits as the corresponding IMM (OMM), which associates each bit with a specific process. The IPM and OPM masks are each represented by a quasi-static value that can vary only when the subscriber changes her or his effective preferences in some way.

9.5 VOCALE—Vocabulary-Oriented Compression & Adaptive Length Encoding 9.5.1 Key Definitions Atomic Word. A variable length sequence of characters comprising the largest word or partial word which can be encoded and handled as a single unit. Examples: "My" "Dog" "has" "fleas".

Compound Word. A single word comprised of a sequence of two or more atomic words, such that the sequence encountered hints at more complexity than would normally be encoded as a single atomic word. Examples:

"MyDogHasFleas" "JSmith43" "iVarName" "Max_Val"

Permanently Assigned Token (PAT). A variable-length, unique identifier that is permanently assigned to a particular data value, with the characteristics that the length of the PAT is relatively shorter than the length of the data value it identifies, and thus can be used to uniquely represent the relatively longer data value. A PAT is always at least four bytes in length, but has no natural maximum size (although it can be artificially constrained).

Vocabulary-Relative Token (VoRT). A variable-length, unique identifier (implemented as an unsigned LEB128 integer) that is permanently assigned either to a raw data value, or to a particular PAT, with the characteristics that the length of a VoRT is relatively shorter than the length of the PAT it is associated with, if any, and thus can be used to uniquely represent the relatively longer PAT. A VoRT is always at least one byte in length, but less than four bytes in length (i.e., always shorter than a PAT).

Leader Byte. The first byte in an atomic word.
Trailer Byte. The last byte in an atomic word.
Vocabulary. A specific, associatively addressable collection of token-pairs where each pair contains both a PAT and a VoRT. Partial pairs are not allowed (i.e., for every PAT in the vocabulary there must be a VoRT, and vice-versa). Given either a PAT or a VoRT, the vocabulary can be queried to determine its mate within the vocabulary, providing that such a pairing exists. (Note: A pairing either exists or not; there are no unpaired (singleton) entries.). There can be any number of vocabularies, and each has a permanent, unique identifier which serves to identify its namespace (VoRT values can overlap among vocabularies, so whenever VoRTs are used, the identifier of the vocabulary they're relative to must be specified).

9.5.2 Central Concept

The idea is to enable the creation of a level of indirection between a document and its word indices by referencing every encoded document element to a particular vocabulary whenever appropriate. In subsequent usage (e.g., such as when compressing a document), there may be multiple concurrent vocabularies for each document (a variable number of bits in the first byte of each compression tag provide for on-the-fly vocabulary switching).

Note: The concepts described here do not relate to an individual document, but rather, to an entire corpus or lexicon. Individual documents or other artifacts can then be specified, synthesized, analyzed, and/or compressed relative to the available vocabularies.

9.5.3 Basic Concepts

1. Virtual Global Word List. A list of globally unique words is maintained, such that every word ever encountered is added to a "virtual" global list and given a permanently assigned token (PAT) in the system. The PAT is the "long" mechanism for uniquely specifying a word using a variable-length identifier. Each PAT is at least 4 bytes in length and specifies exactly one word. Responsibility for list updates is distributed globally among SHADOWS MASTER teams (partitioning is such that every possible word belongs to exactly one MASTER team, and that team is responsible for adding new words to the team's partition of the global word list, assigning a PAT, and distributing the new {word, PAT} tuple to the various SHADOWS sites, so they can update their non-authoritative local copies of the "virtual" global world list. (Note: This distribution responsibility includes both initial distribution as words are added, and on-demand distribution as local copies of the global list are discovered to need "new" words added. Note that on-demand distribution includes words that are truly new as well as existing words the site did not know about, for whatever reason. Actually, the local copy of the global word list is authoritative for words that are present in the list, but not words that are absent.). In a preferred embodiment, each list (as described here) is maintained via a distributed FASTpage index.

2. Virtual Local Copy of Virtual Global Word List. In the same way that the "virtual" global word list is distributed globally among SHADOWS MASTER teams, a "virtual" local copy of that list is distributed locally (i.e., at a site, or within a neighborhood) among local SHADOWS MASTER teams, so that each such team is responsible for maintaining (and searching) a specific partition of the local copy on behalf of the other MASTERs in that locale. If a local word search in the correct partition doesn't yield a matching {word, PAT} tuple, then the locally responsible team passes the word to the responsible global team. In a preferred embodiment, each list (as described here) is maintained via a distributed FASTpage index.

3. Encryption of Tuples. In a preferred embodiment, the {word, PAT} tuples are encrypted prior to insertion into the list. In this case, a target word or PAT to be searched for must first be encrypted, and then the encrypted value is sought.

4. Multiple Vocabularies. There may be many vocabularies, the point of which is to enable words that occur together naturally to also occur together in a vocabulary (any word may occur in multiple vocabularies, however). Vocabularies are particularly useful for data compression, and for creating implicit relationships among artifacts. (Note: The mere fact that two artifacts share the same vocabulary serves as a point of commonality.). In a preferred embodiment, each vocabulary (as described below) is maintained via a distributed FASTpage index. From a process perspective, the team-based handling of vocabularies exactly parallels the handling of the virtual global word list, as described in 1, 2, and 3 above (the actual teams, partitioning, and encryption may differ, as appropriate).

5. Vocabulary-Specific Encoding. Rather than storing the actual word in each vocabulary, the word's associated PAT is stored instead. To add a word to a vocabulary, a relatively short vocabulary-specific code (a VoRT) is assigned to the word (or rather, to the relatively longer PAT associated with the word, resulting in a {VoRT, PAT} tuple that is simply inserted into the vocabulary, analogously to the process in 1, 2, and 3 above.

6. Most Valuable Characters. Each vocabulary also includes a list of the 63 most frequently used (or otherwise most valuable) characters (which may include multibyte Unicode characters) in that vocabulary, each of which is assigned a 6-bit non-zero code (see Leader Byte, below).

7. Structure of a PAT. The first byte in a PAT is the "leader" byte, and the last byte is the "trailer" byte. In a PAT of n bytes (where n>3), the first n−1 bytes describe the "root" word or stem, and the following "trailer" byte describes the details (suffix, capitalization, accents, etc.).

8. Compound Words. In the case of an irregularly capitalized word like "ScrutinyAgent," it is encoded as a single PAT sequence describing a compound word. The PAT sequence is formed by juxtaposing each PAT of the individual words comprising the compound word with its counterparts, in the same relative order as the parts of the compound word, and setting the compound word bit in each individual word but the last.

9. Leader Byte. The leader byte determines how the data immediately following it is encoded. The allocation of information in the leader byte is as follows: 1 bit—Numeric flag (indicates whether the atomic word is a number or an alphabetic string); 6 bits—either a signed LEB64 Numeric value (0-63) which may be combined with subsequent signed LEB128 bytes to form a number of arbitrary precision, or a Small Alphabet" character (any of the 63 "most valuable" characters, or if not, then a null value as an "escape" to indicate that the next byte—which may be any 8-bit value—contains the first character in place of the 6-bit value); 1 bit—Last-byte flag (i.e., signals the last byte of an atomic word in the case where the leader byte is the only byte, including the Small Alphabet scenario where the next byte stands in as the first byte). Each vocabulary can optionally specify the associated 63-character alphabet, each character of which has a 6-bit identifier that can represent an arbitrary Unicode character (even a multi-byte character) within a single leader byte.

10. Trailer Byte. The trailer byte describes the details (suffix, capitalization, accents, etc.) of how the preceding bytes of the word are to be interpreted, and what the suffix is, if any. By simply ignoring the trailer byte, a word-oriented operation can compare canonical word roots. The allocation of information in the trailer byte is as follows: 2 bits—Capitalization specification (irregular, lower, first only, upper); 4 bits—Normal but vocabulary-specific word-suffix specification (such as, "ed", "ee", "er", "es", "ie", "ies", "ing", "or", "y", etc.); 1 bit—Compound word flag (includes next word); 1 bit—Last-byte flag (i.e., signals last byte of an atomic word).

11. Overlapped Vocabulary Namespace. In a preferred embodiment, the first 2 bytes of a PAT overlap with the 2-byte namespace allowed for each vocabulary, which allows 1 or 2 bytes per word and uses 1 bit per byte to signal continuation (thus, such a vocabulary is limited to 16K of the most valuable words).

12. Tri-Word Phrases. In a preferred embodiment, a dictionary of three-word phrases is maintained. Each three-word phrase is represented as a sorted tuple {smallest PAT, middle PAT, largest PAT, trailer byte}, where 3 bits of the trailer byte are needed to specify the order of the words encountered (there are 6 possible orderings relative to the default sorted order). There would be a pairing of a phrase-PAT value with a triplet of sorted word-PAT values. Searching for a word-PAT triplet would return a phrase-PAT value (with trailer byte), if one exists. Searching for a phrase-PAT value with trailer byte would return a triplet of sorted word-PAT values, if one exists. Searching for a phrase-PAT value without a trailer byte would return all the corresponding triplets of sorted word-PAT values, if any. There can only be 3!=6 such triplets, at most.

9.6 UMA—UpdateMovingAverages(iValue)

One of the CORE methods implemented in a PUMP device is that associated with the UpdateMovingAverages(iValue) message.

In a preferred embodiment, the CORE method corresponding to the UpdateMovingAverages(iValue) uses a 16-byte data structure (4 of them fit in a 64-byte cache line, and 32 of them fit in a 512-byte sector). The data structure comprises a set of bit fields, as follows:

| | |
|---|---|
| RawDataArray | 7 bytes (8 nibbles + 4 nibbles + 2 nibbles) |
| Sums, Indexes | 3 bytes (7 + 6 + 5 bits and 3 + 2 + 1 bits, respectively) |
| CycleCounts | 4 bytes (16 + 16 bits, but reducible if more fields are needed) |
| Averages | 2 bytes (4 averages, 4-bits each: WMA, CMA, RMA, & HMA) |
| TOTAL | 16 bytes |

As should be apparent to anyone skilled in the art, the format (including specific fields, field widths, and number of data points, etc.) and resulting space requirements of the 16-byte data structure were chosen for convenience and are somewhat arbitrary; the essence of the process is easily adaptable to other formats and space requirements.

The UpdateMovingAverages(iValue) method is stateless; it uses the integer parameter iValue (modulus 2n, where n=4) to update the object data structure. Specifically, the data structure contains the information necessary to maintain a circular buffer of 8 raw data points (with an index to indicate where the head/tail interface is) that drives the current moving average (CMA), as well as a quadruple of slower-moving "recent moving averages" (RMA), and a pair of the "historical moving averages" (HMA). The RMA and HMA are essentially averages of averages; after every so many cycles of updating the CMA's 8 raw data points, the RMA is updated with the CMA, and after every so many cycles of the updating the RMA's data points, the HMA is updated with the CMA.

The update frequency of the CMA is driven by the frequency of the UpdateMovingAverages(iValue) message sent. With each invocation, the oldest data point is dropped and the newest is added, and a new CMA is calculated. The CMA has an associated 12-bit CMA cycle count that is incremented every time the CMA buffer index wraps around to zero (i.e., after every 8th CMA update). Whenever this occurs, the set of 4 "recent moving average" (RMA) data points is updated with the latest CMA, dropping the oldest RMA data point in the process, and a new RMA is then calculated. Likewise, the RMA has an associated 12-bit RMA cycle count that is incremented every time the RMA cycle count wraps around to zero (i.e., after every 4th RMA update). Whenever this occurs, a pair of 2 "historical moving average" (HMA) data points is updated with the latest RMA, dropping the oldest HMA data point in the process, and a new HMA is then calculated.

In addition to the three moving averages, a "weighted moving average" (WMA) is also calculated, and this occurs with every invocation of the UpdateMovingAverages (iValue), according to the following formula:

$$WMA=(2*CMA+RMA+HMA)/4$$

which is equivalent to:

$$WMA=(CMA+CMA+RMA+HMA)>>2$$

This means that the 8 most recent data points carry 50% of the weight, with 25% going to the recent moving averages, and 25% to the historical moving averages. In operation, all four averages (WMA, CMA, RMA, HMA) are available and can be used as needed.

9.6.1 UMA Pseudocode

```
definition: object MovingAverages  // Note: Field widths conveniently chosen for 16-byte structure size
   visible fields
       WMA                field of 4 bits as unsigned    // Weighted Moving Average
       CMA                field of 4 bits as unsigned    // Current Moving Average
       RMA                field of 4 bits as unsigned    // Recent Moving Average
       HMA                field of 4 bits as unsigned    // Historical Moving Average
   hidden fields
       CMAdata    field of 32 bits as array [8] of unsigned    // Last 8 CMA updates
       RMAdata    field of 16 bits as array [4] of unsigned    // Last 4 RMA updates
       HMAdata    field of 8 bits as array [2] of unsigned     // Last 2 HMA updates
       CMAsum field of 7 bits as unsigned      // Running total of CMA
       RMAsum field of 6 bits as unsigned      // Running total of RMA
       HMAsum field of 5 bits as unsigned      // Running total of HMA
```

```
                             -continued
updates
                CMAindex field of 3 bits as unsigned      // Next CMA position to
update
                RMAindex field of 2 bits as unsigned      // Next RMA position to
update
                HMAindex field of 1 bits as unsigned      // Next HMA position to
update
                CMAcycles field of 16 bits as unsigned // Wrap-around CMA counter
(update RMA when = 0)
                RMAcycles field of 16 bits as unsigned // Wrap-around RMA counter
(update HMA when = 0)
                end definition
                method: Update( iValue : field of 4 bits as unsigned)     // Note:
Constructor initializes all fields to 0
                CMAsum −= ( CMAdata[ CMAindex ]; // Drop last slot value from sum
                CMAsum += ( CMAdata[ CMAindex ] = iValue ); // Update slot &
update sum
                CMA = CMAsum >> 3; // Divide new sum by 2^3=8 to re-average
                if CMAindex == 0
                    if CMAcycles == 0
                        UpdateRMA( iValue );
                    endif
                    CMAcycles = (CMAcycles + 1) % (2^16);// Increment with 16-bit
wrap-around
                endif
                CMAindex = ( CMAindex + 1 ) % 16; // Increment index with 4-bit
wrap-around
                end method
                private method: UpdateRMA( iValue : field of 4 bits as unsigned)
                RMAsum −= ( RMAdata[ RMAindex ]; // Drop last slot value from sum
                RMAsum += ( RMAdata[ RMAindex ] = iValue ); // Update slot & sum
                RMA = RMAsum >> 2; // Divide new sum by 2^2=4 to re-average
                if RMAindex == 0
                    if RMAcycles == 0
                        UpdateHMA( iValue );
                    endif
                    RMAcycles = ( RMAcycles + 1) % 16;// Incr with 4-bit wrap-
around
                endif
                RMAindex = ( RMAindex + 1 ) % 4; // Incr index with 2-bit wrap-
around
                end method
                private method: UpdateHMA( iValue : field of 4 bits as unsigned)
                HMAsum −= ( HMAdata[ HMAindex ]; // Drop last slot value from sum
                HMAsum += ( HMAdata[ HMAindex ] = iValue );       // Update slot
& sum
                HMA = HMAsum >> 1; // Divide new sum by 2^1=2 to re-average
                HMAindex = ( HMAindex + 1) % 2; // Increment index with 1-bit
wrap-around
                end method
```

10 FRAME (Forced Recuperation, Aggregation & Movement of Energy)

Figure 60:
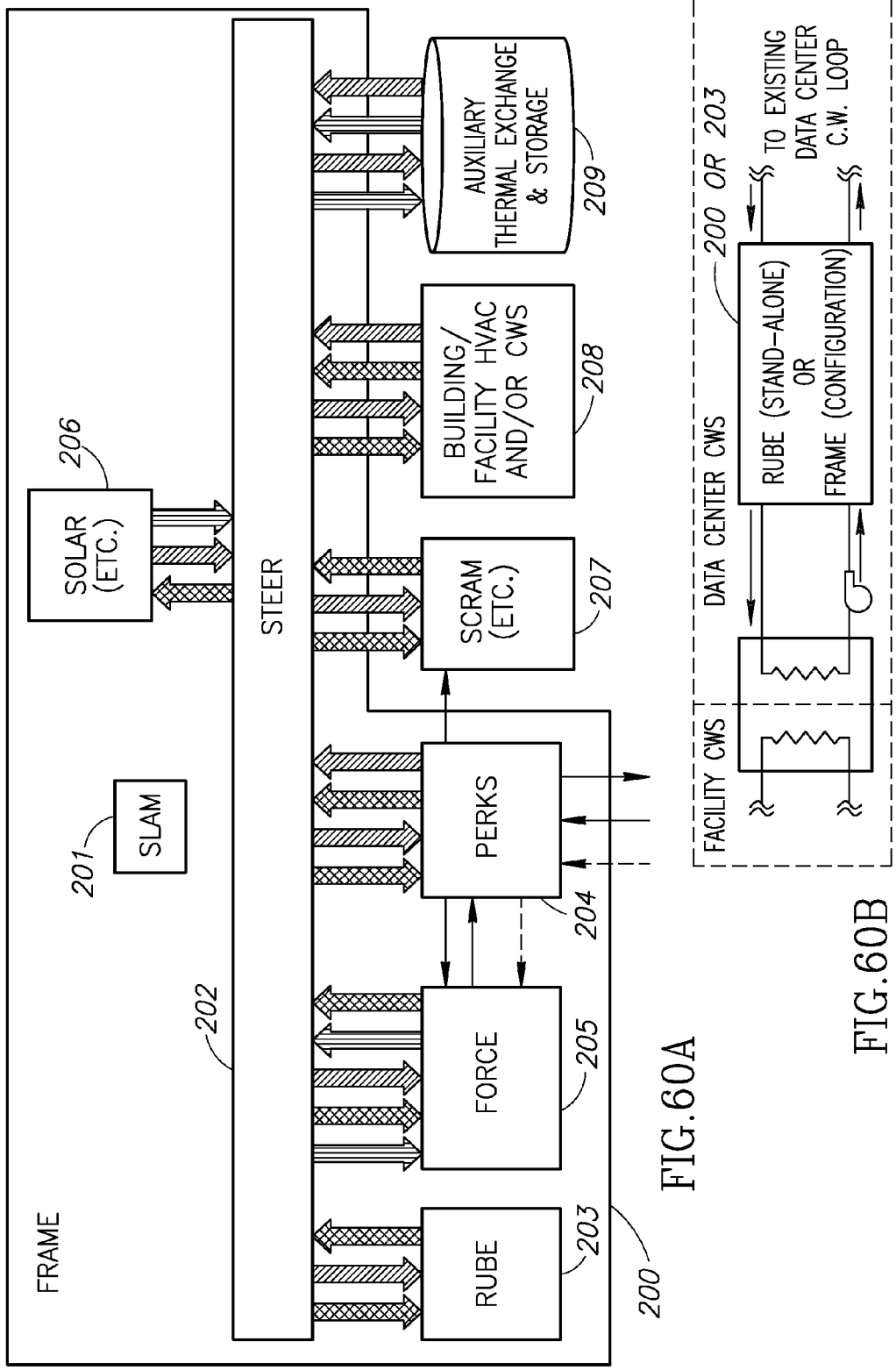

Refer to FIGS. 60A & B. FRAME Technology Overview

The FRAME 200 subsystem comprises the following identifiable sub-subsystems (abbreviated with acronyms) as means, and these are depicted in FIG. 60A:

SLAM 201 (SCADA, Logging, Analysis & Maintenance)
STEER 202 (Steerable Thermal Energy Economizing Router)
RUBE 203 (Recuperative Use of Boiling Energy)
PERKS 204 (Peak Energy Reserve, Kilowatt-Scale)
FORCE 205 (Frictionless Organic Rankine Cycle Engine)
SOLAR 206 (Self-Orienting Light-Aggregating Receiver)

FRAME 200 is an energy production and/or peak-shaving energy management subsystem whose goal is to reduce operational costs and enhance or enable survivability. FRAME 200 may significantly reducing the energy required to operate a heat-dissipating system (such as a computing system), through the recuperative use of energy in general, and by time-shifting the generation and consumption of power to the most effective and/or efficient time-frames.

The FRAME subsystem 200 may acquire energy renewably when possible and appropriate, use energy efficiently to generate power, conserve energy through recuperation and recycling, and efficiently maintain energy storage reserves. FRAME is described here with respect to the "node" with which it is associated.

FRAME 200 may significantly reduce the energy required to operate a heat-dissipating system (such as a computing system in general, and in particular the SCRAM subsystem 207 depicted in FIG. 60A, through the recuperative use of energy in general, and by shifting the generation and consumption of power to the most effective and/or efficient timeframes. FRAME 200 may also reduce the cost of energy required for operation, by selecting from among the available energy sources and including economic considerations.

The basic idea underlying FRAME 200 is to maximize the survivability of a site (for example, a computing and/or communications facility, whether manned or unmanned) by adaptively minimizing its dependence on external energy sources and supplies. FRAME 200 does so with an integrated, automated system that controls and provides energy generation, consumption, conservation, and storage, along with automated interfaces for external replenishment and repair (thereby minimizing human attention and energy expenditures as well).

In essence, FRAME 200 is like a highly integrated "cogeneration" power plant that is internal to the local node—that is, the node which directly depends on FRAME for power. As depicted in FIG. 60A, the box labeled "SCRAM (etc.)" represents just such an example (where the SCRAM apparatus implements the primary functionality of the node containing both SCRAM and FRAME, and where said functionality is also the node's primary power consumer). SCRAM 207 is described in section 5.

However, FRAME 200 and its dependent node are actually co-dependent, because FRAME 200 also depends on the node for waste energy. Maximal power optimization is possible through co-operation by design and integration (which are static) and co-operation by cooperative collaboration (which are dynamic) while the system is running. In a preferred embodiment, parts of FRAME 200 are so tightly integrated with the dependent node so as to significantly blur the boundaries between producing and consuming subsystems, because of their symbiotic relationships (such as exists between FRAME's RUBE sub-subsystem 203 and the SCRAM subsystem 207 to which it connects, via STEER 202, as further described in section 10.3).

More precisely, FRAME 200 is a power production and/or peak-shaving energy management subsystem whose goal is to enhance or enable survivability. In at least some contexts, economy of operation is a fringe benefit rather than the primary driver. By design, survivability and availability are primary drivers, with economy of operation being a consequence of meeting two key survivability constraints:

1. Effective conservation of available energy
2. Independence from the need for timely maintenance and repair Survivability is enhanced by significantly reducing operational costs (especially labor and energy costs) of both the local node and some larger system (with which the local node is typically associated, and in which the local node typically plays a part).

Summary of FRAME Subsystems

FRAME 200 comprises some combination of six primary subsystems, as depicted in FIG. 60A; these are summarized below, and described in their respective sections:

SLAM 201: A subsystem that may monitor, track, and control a node's physical environment (including energy production, storage, and consumption), maintain system time and geolocation, authenticate and communicate with maintenance staff, and "call home." The SLAM apparatus 201 is described more fully in section 10.1.

STEER 202: A subsystem of manifolds, valves, and motive devices that may be computer-controlled, and that may work somewhat like a crossbar switch, in order to dynamically control working fluid flow in a manner that may optimize the exchange of thermal energy between working fluids of different temperatures in such a way as to meet specific goals for the availability of the working fluids at specified temperature ranges. The STEER apparatus 201 is described more fully in section 10.2.

RUBE 203: A subsystem that may recuperate thermal energy ("boiling energy," in the form of heated working fluids) from "hot spots" and "warm spots" that may be exchanged for cooled working fluids, with the thermal energy ("heat") being transferred elsewhere (where it may be put to good use). The RUBE apparatus 203 is described more fully in section 10.3.

PERKS 204: The PERKS apparatus 204 may capture excess or low-cost energy from a multiplicity of sources (e.g., opportunistically, such as when it is cheapest or most readily available) and store it for later (i.e., time-shifted) use, such as during peak periods (e.g., when power is relatively more expensive or less available). In a preferred embodiment, as depicted in the context of FIG. 60A, the PERKS apparatus 204 may intermediate the supplies of fuels and/or electrical power from external sources (including, for example, from, or via, a facility in which it may be located or co-located), storing a portion of the associated flow in convenient form and passing along the rest to internal consumers (other subsystems).

FORCE 205 As depicted in FIG. 60A, the FORCE apparatus 205 is a kilowatt-scale (e.g., 0.5 KW to 50 KW) modified Rankine cycle heat engine that may comprise some combination of various heat sources, working fluids (including at least one appropriate organic working fluid for two-phase liquid/vapor operation), vaporizer, superheaters, low-temperature/low-pressure vapor turbines, generators and/or alternators, recuperators, desuperheaters, preheaters, dehumidifiers, condensers, subcoolers, and interfaces to STEER apparatus 202. In a preferred embodiment, the primary object of the FORCE apparatus 205 may be to convert externally supplied electrical energy, chemical energy (e.g., one or more types of fuel), and/or thermal energy (e.g., heat contained in some type of working fluid) into electrical energy and/or thermal energy that may then be provided as an output to other subsystems. In a preferred embodiment, said electrical energy may be output directly to the PERKS apparatus 204 for subsequent further conversion, storage, and/or distribution. In a preferred embodiment, high-quality thermal energy may be provided as an output in addition to, or in lieu of, electrical energy. In a preferred embodiment, said thermal energy may be output to the STEER apparatus 202 for subsequent further transport, conversion, storage, and/or distribution. The FORCE apparatus 205 is described more fully in section 10.5.

SOLAR 206 The SOLAR apparatus 206 comprises some combination of apparatus for tracking and/or concentrating solar energy and directing it to a receiver, where it may be collected and converted to thermal energy and transferred to a working fluid. In a preferred embodiment, the SOLAR apparatus 206 may also comprise a STEER apparatus 202 interface for accepting and delivering working fluid to one or more companion subsystems (e.g., the RUBE apparatus 203, or FORCE apparatus 205, etc.). The SOLAR apparatus 206 is described more fully in section 10.6.

The HVAC, CWS, and other non-storage thermal interfaces 208 to the FRAME means, as depicted in FIG. 60A, are described with the RUBE apparatus 203, in section 10.3.

10.1 SLAM—SCADA, Logging, Analysis & Maintenance

Figure 61:
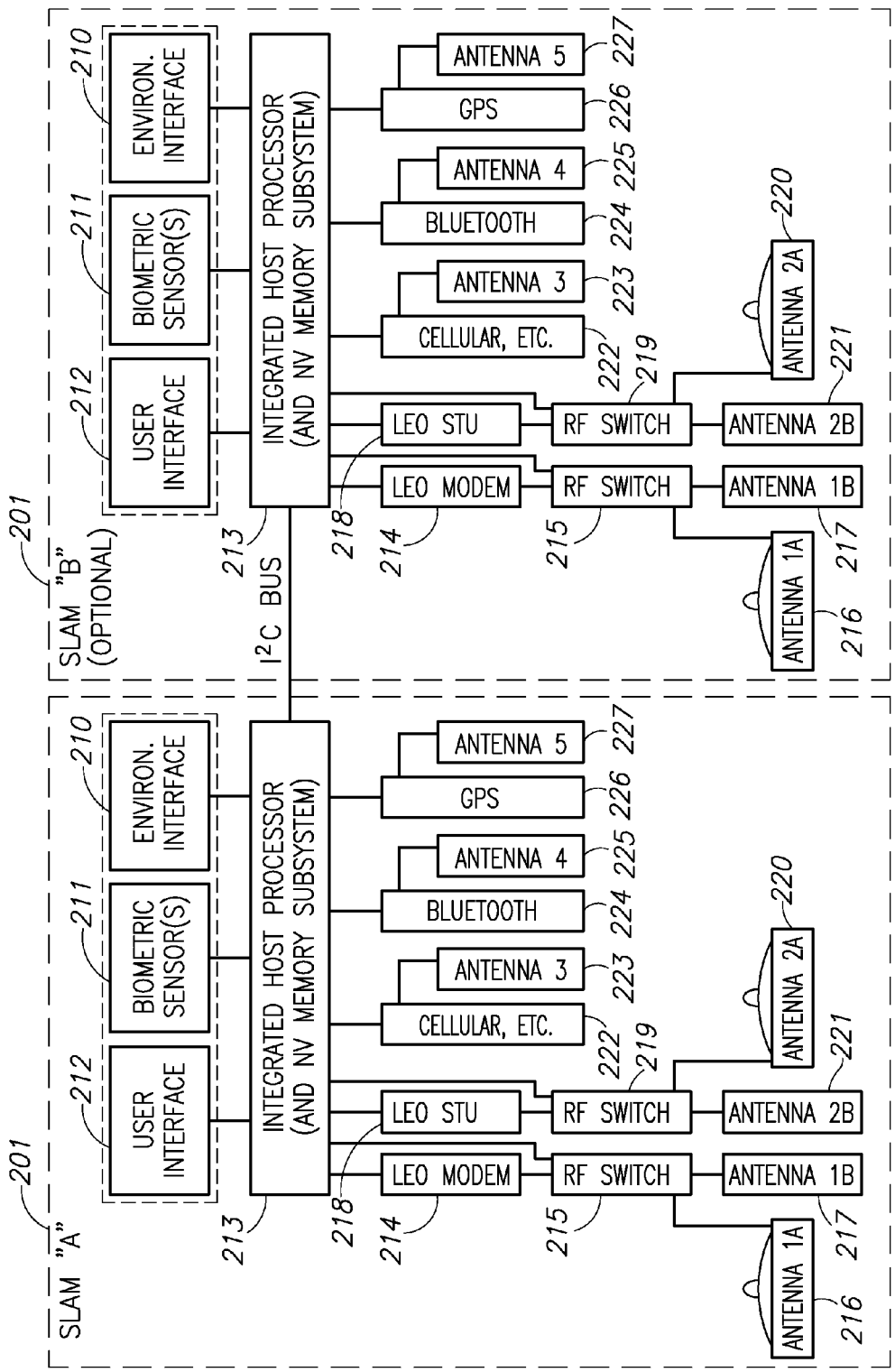

Refer to FIG. 61. SLAM—SCADA, Logging, & Authorization Module (Possible Embodiment)

SLAM 201: A subsystem that may monitor, track, and control a node's physical environment (including energy production, storage, and consumption), maintain system time and geolocation, authenticate and communicate with maintenance staff, and "call home."

In a preferred embodiment, when the SELF (see section 7), FRAME (see section 10), DEFEND (see section 12), and/or WARN (see section 13) subsystems are present, the SLAM apparatus 201 may integrate with one or more of them to implement cooperative functionality. In a preferred embodiment, the SLAM apparatus 201 may be an integral part of the FRAME subsystem 200.

In a preferred embodiment, the SLAM apparatus 201 may comprise a multiplicity of SLAM devices, each of which may independently provide the full functionality of the SLAM apparatus.

In a preferred embodiment, a SLAM device may implement the SELF functionality described in section 7. In a preferred embodiment, at least one host processor within a SLAM device implementing the SELF functionality described in section 7 may specifically be enabled for the role of candidate MASTER and/or MASTER as described in section 7.3.

In a preferred embodiment, when a SLAM device is embedded into a SCRAM system (where it may be reasonably secure from a physical point of view, and where it may have nearby MASTERs to communicate with, including other SLAM devices), then it may have or acquire internal MASTER and BOSS capabilities that become enabled, as described in section 7, in which case individual SLAM devices—or the SLAM apparatus 201 as a whole—may participate in system-wide security decisions.

In a preferred embodiment, SLAM devices comprising the SLAM apparatus 201 may be sufficient, through cooperation, Byzantine agreement logic (as described in section 7.2), and mutual agreement that may result, to enable each other to become MASTERs as described in section 7.3, even absent the participation of non-SLAM MASTERs and non-SLAM "Candidate MASTERs."

In a preferred embodiment, when a SLAM device becomes a MASTER as described in section 7.3, it may delegate work to others, including to other SLAM devices, and thus offload a portion of its tasks. In a preferred embodiment, offloaded tasks may typically include those which may be compute-bound (e.g., analysis and optimization). In this way, SLAM devices may take advantage of the computational capabilities inherent in the system of which they may be a part.

In a preferred embodiment, the SLAM apparatus 201 depicted in FIG. 60A may comprise decision-making, control and supervisory functions to oversee the operation of the FRAME 200 subsystem, as well as non-FRAME subsystems to which FRAME may be connected. SLAM 201 may also participate in the monitoring, tracking, and control of other (i.e., non-FRAME) subsystems that depend on the FRAME apparatus within the local node. SLAM 201 may be involved in the interfaces to external subsystems such as Facility HVAC/CWS facilities 208 and External Thermal Exchange/Storage facilities 209.

In a preferred embodiment, the SLAM apparatus 201 depicted in FIG. 60A monitors, tracks, and controls (to the extent possible) the physical environment of the node incorporating the FRAME apparatus 200, including controlling the sibling FRAME subsystems (i.e., STEER 202, RUBE 203, PERKS 204, FORCE 205, and SOLAR 206) comprising said FRAME apparatus 200 as described herein. In a preferred embodiment, SLAM provides optionally advantageous SCADA (supervisory control and data acquisition) functions, particularly with respect to establishing and maintaining the proper system thermal parameters and power generation/usage parameters, in order to optimize the use of the system's energy resources.

In a preferred embodiment, the SLAM devices 201 of the local node may collaborate with, and coordinate with, the SLAM devices in other nodes, both local and remote, in order to enhance survivability of both the local node and the SHADOWS network as a whole.

In a preferred embodiment, the SLAM apparatus 201 depicted in FIG. 60A may provide steering and/or other control signals (not shown) to the STEER apparatus 202 flow control devices, in order to optimize the temperature and pressure ranges associated with each of its embedded manifolds and pseudo-reservoirs. The SLAM apparatus 201 may interact with other subsystems, and especially other FRAME subsystem components (i.e., 203 through 206), to carry out the desired energy resource usage policies. In a preferred embodiment, said control signals may be generated through cooperation among MASTERs (and especially SLAM devices 201 that are MASTERs), Byzantine agreement logic (as described in section 7.2), and mutual agreement that may result Byzantine agreement with respect to said control signals. In this way, there may be increased assurance that the said control signals can maximize system survivability and optimize the overall operation of the system.

In a preferred embodiment, the SLAM apparatus 201 depicted in FIG. 60A may contain a crystal-controlled oscillator for maintaining relatively accurate time in the absence of external time synchronization signals. In a preferred embodiment, said apparatus may synchronize with a GPS or other satellite-originated signal and also with an external PPS (pulse-per-second) signal such as that available with a local or remote atomic (e.g., Rubidium- or Cesium-based) clock, and which may provide a reconciled PPS output (not shown). In a preferred embodiment, high-quality PPS inputs may originate with a commercially available miniature atomic clock module that may be internal to, and integrated with, the local SCRAM system 207.

In a preferred embodiment, a SLAM device 201 may be equipped with geolocation devices, radio devices, and/or other devices that may be capable of acquiring or approximating the current time, location, and bearing through unidirectional or bidirectional communications from external sources, including LEO (low-earth orbit) or MEO (mid-earth orbit) satellites, communications towers, wireless access points, homing beacons, and other signal transmitting or transceiving devices. In a preferred embodiment, information acquired or inferred from said external geolocation sources may serve to inform a SLAM device's "belief" as to the current time, location, and bearing (as well as its confidence in said "belief"), and the SLAM device 201 may use said belief to synchronize internal timekeeping and geolocation devices accordingly.

In a preferred embodiment, a SLAM device 201 may be equipped with internal timekeeping and geolocation devices that may be capable of approximating the current time, location, and bearing even in a "GPS-denied" environment. In a preferred embodiment, said internal geolocation devices may comprise a combination of oscillators, electronic compasses, inertial reference units, three-axis accelerometers, and other suitable devices as may be available.

In a preferred embodiment, SLAM's three-axis accelerometers may sense movement and may thus be able to determine orientation of the system of which the SLAM 201 may be a part, as well as the direction and rate of movement, if any. In a preferred embodiment, SLAM's magnetic compass (magnetometer) may help.

In a preferred embodiment, said accelerometers may also be useful for sensing vibration (which may include vibration due to failed or failing components), physical attacks and/or other impacts to the equipment, and seismic P-waves (which may provide sufficient warning, often on the order of a few seconds or tens of seconds), and may therefore enable the triggering of some emergency action. In a preferred embodiment, if the WARN and/or LISTEN subsystems are present (not part of FRAME 200), the SLAM 201 may integrate with them in order to exchange sensory inputs and analyses (threat, time, location, accelerometer readings, etc.), and may also cooperate on monitoring and/or maintenance functions.

In a preferred embodiment, various sensory input signals may be made available simultaneously to multiple SLAM devices 201 and MASTERs 100 and 107, such that Byzantine agreement with respect to the correctness of said signals may be reached through cooperation among MASTERs (and especially SLAM devices 201 that are MASTERs), Byzantine agreement logic (as described in section 7.2), and mutual agreement that may result from Byzantine agreement with respect to said sensory input signals. In this way, there may be increased assurance that the said sensory input signals can maximize system survivability and optimize the overall operation of the system.

In a preferred embodiment, SLAM devices 201 may provide monitoring and tracking of high-value assets, said assets normally being the system itself or a subsystem to which a SLAM device may be attached or with which it may be co-located.

In a preferred embodiment, a SLAM device 201 may be equipped with one or more communications channels that enable external communications, including communications with authorized personnel. In a preferred embodiment, said communications channels include a combination of wired and wireless channels suitable for secure communications with authorized personnel, and with other authorized systems (which may include the ability to "call home" to one or more authorized destinations to report intrusion attempts, geolocation, system status, asset-tracking information, or other authorized information).

One possible embodiment of a SLAM device configuration 201 is depicted in FIG. 61. In an alternate preferred embodiment, there may be no actual "SLAM device," but rather the various SLAM I/O devices may be distributed among the system's existing electronics modules, for example, with the SLAM device's processing responsibilities relegated to tasks or processes or virtual machines that may execute as part of the inherent workload of other processors within the system of which the SLAM device would otherwise be part.

In a preferred embodiment, when a SLAM device 201 is embedded into a SCRAM subsystem 207, the preferred means of communications with maintenance personnel may be via a suitably equipped personal computer, PDA, or other device having reliable means of biometric sensory inputs (e.g., fingerprint, iris, etc.) for authentication—over a multiplicity of secure wired and/or wireless channels, each such channel bearing a portion of the data stream with independent encryption keys. In an alternative embodiment, any acceptably secure communications devices and/or channels may be utilized for said purpose.

10.2 STEER—Steerable Thermal Energy Economizing Router

STEER 202: A system of manifolds, valves, and motive devices that may be computer-controlled, and that may work somewhat like a crossbar switch, in order to dynamically control working fluid flow in a manner that may optimize the exchange of thermal energy between working fluids of different temperatures in such a way as to meet specific goals for the availability of the working fluids at specified temperature ranges.

In a preferred embodiment, the STEER apparatus 202 depicted as part of the FRAME subsystem in FIG. 60A may comprise dynamically reconfigurable "plumbing" interconnectivity, such that some or all of the fluid-based devices that may comprise its sibling subsystems (such as pumps, heat exchangers, etc.), may be adaptively and dynamically connected, disconnected, reconnected, and/or operated in reconfigurable patterns that may achieve particular purposes at a particular point in time. In a preferred embodiment, such reconfigurations and operations may occur under the control of the SLAM apparatus 201, so that thermal energy may be optimally routed to the various devices in the system with minimized energy loss or waste.

The STEER apparatus 202 comprises a combination of pipes, tubes, joints, manifolds, and valves (a combination of fixed and statically or dynamically adjustable valves, under system control as necessary) that may collectively work somewhat like a crossbar switch, in order to dynamically control working fluid flow between various sources and sinks of thermal energy, mixing working fluid of different temperature ranges as needed to meet specific goals for moving compatible working fluids in accordance with appropriate temperature and pressure ranges.

In the depiction of FIG. 60A, only three broad (and non-specific) temperature ranges are shown as examples (depicted by each arrow to or from STEER 202 having one of three different cross-hatch patterns), but in principle as many ranges as needed may be used, with separate means provided for each type of working fluid and operating regime. The key limitation driving the mixing may be the conservation of energy (inputs and outputs), and the need to blend changing temperatures and pressures adaptively while respecting the desired operating ranges (which may vary over time). Note that although the STEER apparatus 202 is depicted as a "centralized" box in FIG. 60A in order to better visualize its role conceptually, in a preferred embodiment its components may be conveniently distributed around the local system, in order to more easily co-locate them with their associated devices and connectors.

10.2.1 STEER—Latching Digital Flow Rate Control Valve

Figure 62:
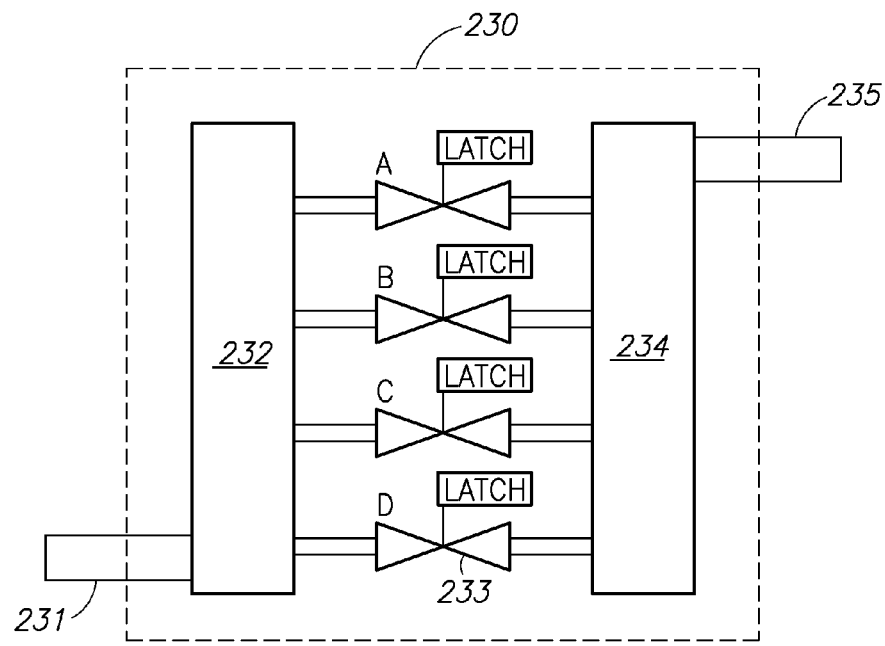
FIG. 62. STEER—Latching Digital Rate Control Valve Example

Refer to FIG. 62. STEER—Latching Digital Rate Control Valve Example

In order to control the rate of flow to various devices by using control signals from the SLAM apparatus 201 depicted in FIG. 60A, the STEER apparatus 202 may incorporate a "Latching Digital Flow Rate Control Valve" apparatus 230 (hereafter, simply "Rate Control Valve"), an example of which is depicted in FIG. 62.

As depicted in FIG. 62, in a preferred embodiment, each Rate Control Valve 230 comprises a set of binary latching valves 233 that may be individually latched open or closed, and at least a common inlet manifold 232 with inlet connection 231, a common outlet manifold 234 with outlet connection 235, along with signaling connections (e.g., depicted in FIG. 62 as "A," "B," "C," and "D")—and optionally, sensory connections (not shown)—appropriate to each binary latching valve 233.

In a preferred embodiment, the inlet connection 231 and outlet connection 235 may be arranged to be on diagonally opposite sides of the Rate Control Valve 230 (i.e., in a "reverse return" configuration) such that the path from connection 231 to connection 235 through any individual valve in the set of binary latching valves 233 is the same length as the path through any other such individual valve in the set.

In a preferred embodiment, a Rate Control Valve 230 may comprise magnetic latching valves as binary latching valves, specifically to conserve electrical energy, since they can be automated, yet relatively little electrical energy may be required to operate them, and only then to toggle them from one position (e.g., open or closed) to the other (e.g., closed or open, respectively). In an alternative embodiment, one or more non-latching valves or motor valves may be substituted instead. In yet another alternative embodiment, which may not be fully automatable, one or more manually operated valves may be substituted.

In a preferred embodiment, a Rate Control Valve 230 may be constructed by connecting the inlets of a set of N binary latching valves 233 to a common inlet manifold, and connecting the outlets of said binary latching valves to a common outlet manifold. The example depicted in FIG. 62 comprises a set of four binary latching valves 233, so for this example, N=4. A truth table for this example, depicting the flow rates for the various input combinations, is depicted in Table 19.

In a preferred embodiment, the individual binary latching valves 233 may be selected or constructed to accommodate the working pressures associated with their intended use, and to ensure suitability with respect to the requisite control signaling and any relevant sensory requirements.

In a preferred embodiment, a Rate Control Valve 230 may be constructed such that the aggregate flow rates of the binary latching valves 233 are the constraining factor. In an alternative embodiment, something else may be the constraining factor. In either embodiment, given a Rate Control Valve 230 containing a set of N binary latching valves 233 (N>0) that are functioning correctly, the rate of flow may be controllable into N+1 binary steps over a range of 0% to 100%, with a step size equal to (100%/N). For example, a Rate Control Valve 230 comprising four binary latching valves (i.e., N=4) may have five (4+1=5) steps ranging from 0% to 100%, at 25% intervals (100%/4=25%), corresponding to flow rates of 0%, 25%, 50%, 75%, and 100%, with built-in redundancy for all intermediate steps (but not for the zero-flow and full-flow settings). In a preferred embodiment, redundancy for the zero-flow and full-flow settings may be created straightforwardly using known modular redundancy techniques (e.g., such as TMR, or triple modular redundancy).

TABLE 19

STEER Latching Digital Flow Rate Control Valve - Flow-Rate Truth Table

| Effect of Control Variables | A | B | C | D |
|---|---|---|---|---|
| 0% flow (off) | Off | Off | Off | Off |
| 25% flow | Off | Off | Off | On |
| 25% flow | Off | Off | On | Off |
| 25% flow | Off | On | Off | Off |
| 25% flow | On | Off | Off | Off |
| 50% flow | Off | Off | On | On |
| 50% flow | Off | On | Off | On |
| 50% flow | Off | On | On | Off |
| 50% flow | On | Off | Off | On |
| 50% flow | On | Off | On | Off |
| 50% flow | On | On | Off | Off |
| 75% flow | Off | On | On | On |
| 75% flow | On | Off | On | On |
| 75% flow | On | On | Off | On |
| 75% flow | On | On | On | Off |
| 100% flow | On | On | On | On |

Given a set of suitable binary latching valves 233, constructed and configured as taught here, the signaling connections may then be used to force the individual binary latching valves to a desired state, according to the flow rate desired. When all the binary latching valves are actually closed, the corresponding flow rate is zero, which is clearly a trivial case. When all the binary latching valves 233 are commanded closed, the corresponding flow rate may be zero, which is to say, there is some possibility that at least one individual valve in the set may fail open. In a preferred embodiment, apparatus that requires variable flow and also—for example, assured zero flow and/or full flow—may be created straightforwardly using known TMR (triple modular redundancy) techniques.

In a preferred embodiment, when all the individual binary latching valves 233 are open, the corresponding flow rate of the Rate Control Valve 230 may be constrained by whichever flow rate is most constraining—i.e., the rates of the inlet and/or outlet connections to their respective manifolds, the rates of the manifolds themselves, or the aggregate flow rates of the open binary latching valves.

In a preferred embodiment, the optional sensory signals of the individual binary latching valves may be used to determine whether each particular valve is properly opened or closed. In an alternative preferred embodiment, a flow sensor may be used to determine the aggregate flow, thereby allowing the proper functioning of the binary latching valves to be inferred. In yet another preferred embodiment, both techniques may be used together, in order to increase confidence that the actual state is known.

In the case of individual binary latching valve malfunction, significant redundancy accrues as N becomes larger, and this is a fringe benefit of making the controllable flow rates increasingly fine-grained (i.e., smaller increments). In particular, a valve that refuses to open (or close) can be worked around by opening (or closing) a different one instead. The special case of zero flow and full flow, however, cannot be made redundant without additional valves and a different configuration. Nonetheless, it is straightforward (and known in the art) to accommodate the two special cases, if necessary, through modular redundancy, where the entire Rate Control Valve 230 is treated as a single modular device.

In a preferred embodiment of the STEER apparatus 202 depicted in FIG. 60A, the Rate Control Valves 230 are monitored and controlled by the SLAM means 201, and TMR (triple modular redundancy), which is known in the art, is used to implement a high-availability configuration of Rate Control Valves 230 when system criticality warrants it.

10.2.2 STEER—Parallel-Series Reconfigurator

Figure 63:
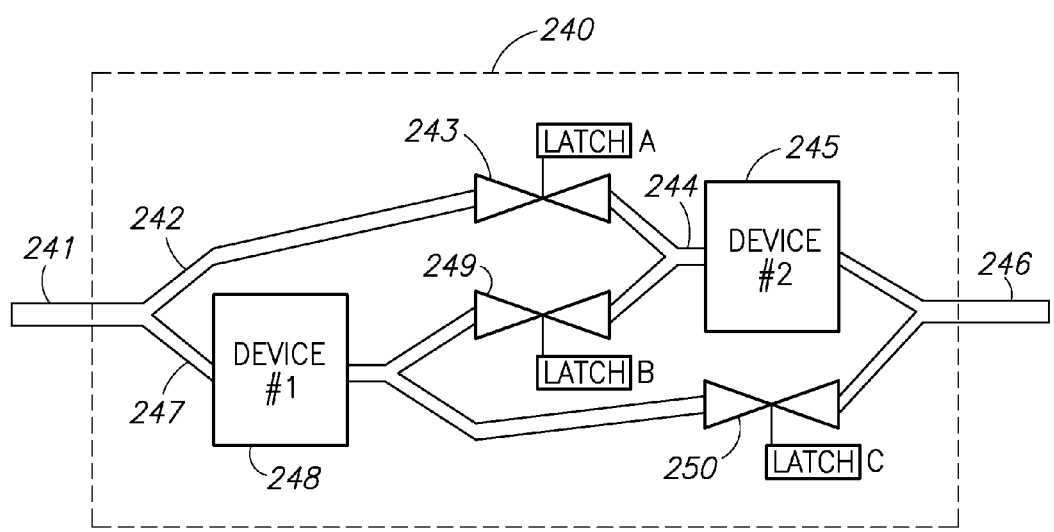
FIG. 63. STEER—Parallel-Series Reconfigurator Fluid Connectivity

Refer to FIG. 63. STEER—Parallel-Series Reconfigurator Fluid Connectivity

Figure 64:
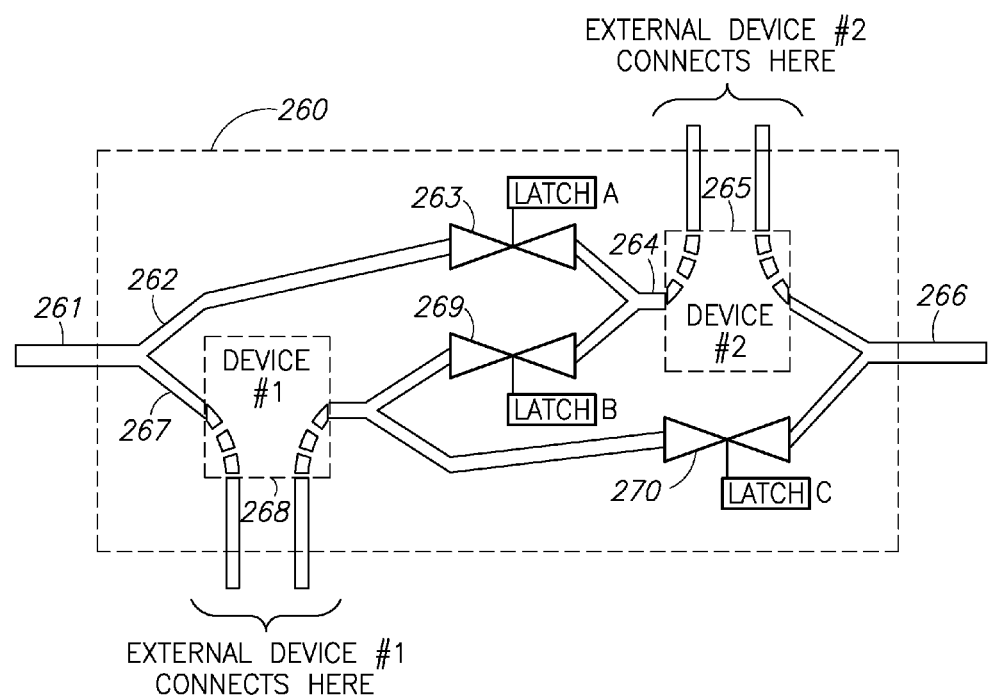
FIG. 64. STEER—Parallel-Series Virtual Reconfigurator Fluid Connectivity

Refer to FIG. 64. STEER—Parallel-Series Virtual Reconfigurator Fluid Connectivity In a preferred embodiment, in order to dynamically reconfigure the flow to various fluid-based devices without actually modifying the physical plumbing connections, for example by using control signals from the SLAM apparatus 201 depicted in FIG. 60A, the STEER apparatus 202 incorporates one or more "Parallel-Series Reconfigurator" devices 240 (hereafter, each is simply called a "Reconfigurator"). For simplicity, in a preferred embodiment, each Reconfigurator 240 supports only two devices, and larger configurations may be supported by treating each two-device Reconfigurator 240 as a single device that can be substituted into a separate Reconfigurator 240 apparatus operating at a higher level. In an alternate embodiment, and with increased complexity, additional devices may be supported within a single Reconfigurator 240 by introducing additional control variables as desired and defining the appropriate control states.

In a preferred embodiment, with fluid-handling components connected as depicted in FIG. 63, each Reconfigurator 240 comprises a set of three binary latching valves (i.e., valves that are latchable in either the open or closed position and require no electrical power to sustain their presently latched setting, as depicted by 243, 249, and 250 in FIG. 63), and four devices suitable for splitting and/or merging liquid flows (e.g., "Y" couplings, "T" couplings, manifolds, etc., such as those depicted by 244 and 246, for example, in FIG. 63), optional check valves (not shown), along with signaling connections (e.g., depicted in FIG. 63 as "A," "B," and "C" on latching valves 243, 249, and 250, respectively)—and optionally, sensory connections (not shown)—appropriate to each binary latching valve.

In the Reconfigurator 240 depicted in FIG. 63, the flow enters at 241. In a preferred embodiment, the flow capacity at entry point 241 and exit point 246 are normally at least equal to the aggregate capacity of the branches that split from 241 into points 242 and 247, and ultimately, the branches that merge again at point 246. In a preferred embodiment, the branches at 242 and 247, and all other internal flow points, including latches 243, 249, and 250, are each at least equal to the flow capacity of the greater of the flow capacities of Device #1 [248] and Device #2 [245]. In a preferred embodiment, flow capacities of Device #1 [248] and Device #2 [245] may be identical.

In a preferred embodiment, a Reconfigurator 240 may comprise magnetic latching valves as binary latching valves 243, 249, and 250, specifically to conserve electrical energy, since they can be automated, yet relatively little electrical energy may be required to operate them, and only to toggle them from one position (e.g., open or closed) to the other (e.g., closed or open, respectively). In an alternative embodiment, one or more non-latching valves or motor valves may be substituted instead. In yet another alternative embodiment, which may not be fully automatable, one or more manually operated valves may be substituted.

In a preferred embodiment, a Reconfigurator's configuration may be determined by a truth table such as one having three binary control variables (i.e., logical control inputs), and thus having eight (2^3=8) possible states, of which five are generally valid (the other three states are not normally needed, but may be used for special circumstances or unusual devices). Table 20 depicts a truth table relating to the configuration of FIG. 63, corresponding to three latch-control variables and eight possible configuration states.

In an alternative preferred embodiment, one or more of the individual binary latching valves depicted in FIG. 63 may each be substituted with a Latching Digital Flow Rate Control Valve apparatus 230 as described in section 10.2.1 (an example of which is depicted in FIG. 62). While such substitution may make the configuration significantly more complex conceptually, it may be modeled easily and may afford opportunity to provide additional dynamic balancing of system flows, including the possibility of taking advantage of one or more partial-flow configurations listed in Table 20.

TABLE 20

STEER Parallel-Series Reconfigurator - Latch-Control Truth Table

| Effect of Latching Variables | A | B | C |
|---|---|---|---|
| No flow: | Off | Off | Off |
| Flow through Device #1 only | Off | Off | On |
| SERIES FLOW through Devices #1 and #2 | Off | On | Off |
| Full flow thru Device #1, partial thru Device #2 | Off | On | On |
| Flow through Device #2 only | On | Off | Off |
| PARALLEL FLOW through Devices #1 & #2 | On | Off | On |
| Partial flow thru Device #1, full thru Device #2 | On | On | Off |
| Partial flow thru Devices #1 & #2, with bypass | On | On | On |

In a preferred embodiment, a Reconfigurator 240 may be used to dynamically "re-plumb" a mated pair of devices (e.g., Device #1 [248] and Device #2 [245] of FIG. 63) from a parallel configuration (i.e., A=On, B=Off, C=On) to a serial configuration (i.e., A=Off, B=On, C=Off), or vice-versa. In a preferred embodiment, other combinations may be useful, as indicated in Table 20. In a preferred embodiment, said dynamic reconfiguration may be automated and/or unattended.

For example, a pair of pumps presently operating in parallel to maximize flow rate may be dynamically configured to operate in series instead, perhaps in order to increase pressure as part of a work-around for a failed (or failing) downstream component. In this particular example one might expect such a reconfiguration to cause the flow rate to be reduced, as is commonly the case, but this is not necessarily so, because in a preferred embodiment, the FRAME apparatus 200 (of which the STEER apparatus 202 taught here may be a part) may comprise variable-speed pumps wherever pumps are used. Thus, the tradeoff may be increased power consumption by the affected pumps, rather than necessitating a change in operating pressures and/or flows. There is, of course, the possibility that there would be no tradeoff at all, such as in the case where a reduced flow rate is a feature of the intended reconfiguration (such as with a modified power usage profile).

As another example, a pair of heat exchangers that are operating in series to maximize the heat exchange for a particular scenario, may be dynamically configured to operate in parallel instead, perhaps in order to decrease pressure drop to compensate for a failed upstream pump, or valve, etc., or to simply achieve a different energy consumption rate, or a different thermal profile.

In a preferred embodiment of the STEER apparatus 202 depicted in FIG. 60A, multiple Reconfigurators 240 may be combined as necessary to achieve nearly arbitrary parallel-series combinations. For example, in an environment where the energy availability, power requirements, cooling load, ambient temperature, etc., are all changing dynamically, and possibly dramatically, it may be very difficult to "tune" the system to a configuration that is optimal using conventional means. However, the use of Reconfigurators 240 may enable dynamic reconfiguration and tuning of the system to match changing real-world requirements (for example, in conjunction with external control logic, such as may be provided by SLAM apparatus 201 depicted in FIG. 60A.

In a preferred embodiment, a specific type of Reconfigurator 240 may be constructed as an assembly of a pair of mated devices, plus other requisite parts, such that the resulting assembly may be seen as having a single fluid input and a single fluid output, along with a set of control and/or sensory signals, and having the function of a single device whose characteristics at a point in time are equivalent to the pair of mated devices operating in one of the desired configurations (which may be a subset of those technically possible).

In an alternate preferred embodiment, a specific type of Reconfigurator 240 may be constructed as an assembly of a pair of non-mated devices, plus other requisite parts, such that the resulting assembly may be seen as having a single fluid input and a single fluid output, along with a set of control and/or sensory signals, and having the function of a single device whose characteristics at a point in time are equivalent to the pair of non-mated devices operating in one of the desired configurations (which may be a subset of those technically possible).

In an alternative preferred embodiment, as depicted in FIG. 64, a generalized Virtual Reconfigurator 260 may be constructed without actually embedding or otherwise including the devices 265 and 268, but rather, by providing two extra pairs of inlet/outlet connections to accommodate a pair of said devices that are external and may be attached later, plus the other requisite parts previously described, such that the resulting assembly has a single fluid input and a single fluid output, along with a set of control and/or optional sensory signals, plus two pairs of inlet/outlet connections for the two devices to be attached later.

10.3 RUBE—Recuperative Use of Boiling Energy

Figure 65:
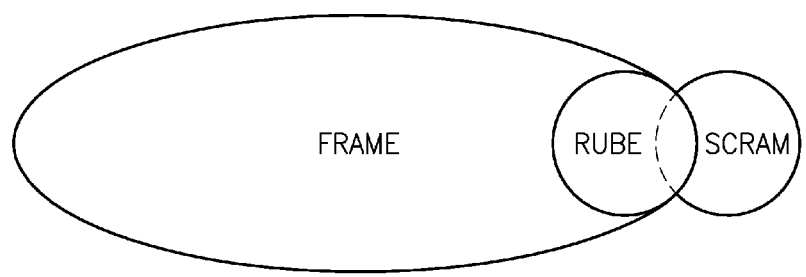
FIG. 65. RUBE—Venn Diagram Depicting Overlap Between RUBE and SCRAM

Refer to FIG. 65. RUBE—Venn Diagram—Overlap Between RUBE & SCRAM

RUBE 203: A subsystem that may recuperate thermal energy ("boiling energy," in the form of heated working fluids) from "hot spots" and "warm spots" that may be exchanged for cooled working fluids, with the thermal energy ("heat") being transferred elsewhere (where it may be put to good use).

The RUBE apparatus 203 depicted as part of the FRAME subsystem 200 in FIG. 60A may comprise devices for recuperating, transferring, and exchanging thermal energy contained in working fluids, and these may be referred to hereafter as "RUBE devices."

In a preferred embodiment, the RUBE apparatus 203 may be co-located and closely integrated with its thermal energy sources and sinks. Said sources and sinks may be any devices which may emit or absorb thermal energy, respectively, to be recuperated, transferred, and/or exchanged by RUBE.

In a preferred embodiment, origins of said "boiling energy" may be co-located subsystems that may need to be kept to specific desired (or maximum) operating temperatures or temperature ranges—and typically, these may be subsystems which also generate waste heat that otherwise may ordinarily need to be rejected from the system.

In a preferred embodiment, the RUBE apparatus 203 may be tightly integrated with a combination of power-dissipating components such that the cooling of temperature-sensitive components can be aided through the thermal energy contributed by relatively hotter and/or potentially less temperature-sensitive components.

In a preferred embodiment, the RUBE apparatus 203 depicted as being part of the FRAME subsystem 200 in FIG. 60A may be tightly integrated with the SCRAM apparatus 207 described in section 5. In another preferred embodiment, the RUBE apparatus 203 is also integrated with the FORCE apparatus 205. In still another preferred embodiment, the RUBE apparatus 203 may also integrated with the SOLAR apparatus 206 described in section 10.6. In a preferred embodiment, the RUBE apparatus 203 may be integrated with external sources of thermal energy, which may include sources of energy that may otherwise be wasted.

In a preferred embodiment, the RUBE apparatus 203 may use a relatively low-temperature phase-change working fluid to recuperate thermal energy, and as a medium for transferring thermal energy. In a preferred embodiment, such as for electronics thermal stabilization applications, the working fluid is preferentially a non-flammable, non-ozone depleting, low-GWP, organic dielectric fluid with a boiling point between 20° C. and 40° C., and a useful upper limit of at least 125° C., such as 1-methoxy-heptafluoropropane ($C_3F_7OCH_3$), which is practically non-toxic and currently not regulated for transport or use. Other suitable working fluids may include, for example, $C_5F_{12}$, $C_6F_{14}$, $C_4F_9OCH_3$, $C_4F_9CH_3$, $C_4F_9OC_2H_5$, and $C_4F_9C_5H_5$, as well as others, and may also include combinations of said fluids, some of which may not be organic dielectric fluids having boiling points within the exemplary range. In a preferred embodiment, the working fluid expands substantially when heated and vaporizes easily.

In a preferred embodiment, the RUBE apparatus 203 may integrate with and/or connect to a variety of thermal energy sources and sinks over a wide temperature range, but there may be others external to the RUBE apparatus 203 that may be accessible via the STEER apparatus 202.

As depicted in FIG. 60A, and in addition to the thermal energy it may directly recuperate thermal energy from the subsystems with which it integrates, RUBE devices 203 may accept working fluids that are relatively cool (well below the fluid's boiling point, but nowhere near freezing) for its own use, and may deliver working fluids that are relatively warm (at or below the fluid's boiling point). In a preferred embodiment, the RUBE apparatus 203 may accept working fluid from the STEER apparatus 202 depicted in FIG. 60A, for cooling purposes.

Internally, the temperatures to which the RUBE apparatus 203 may be exposed may be well above the working fluid's boiling point. In a preferred embodiment, it is an object of the RUBE apparatus 203 to provide integral sources and sinks for said thermal energy within non-FRAME subsystems to which the FRAME apparatus 200 may be connected and integrated (and of which it may be a part). In a preferred embodiment, the SCRAM 207 apparatus depicted in FIG. 60A, and in the Venn diagram of FIG. 65, may exemplify one such non-FRAME subsystem. In the Venn-diagram of FIG. 65, the overlapping areas between the two circles (depicting RUBE 203 and SCRAM 207) represent interfaces and integrations that may exist between various RUBE 203 and SCRAM 207 devices, such as where a SCRAM 207 heat source may mate with a RUBE 203 heat sink, for example. However, thermal sources and sinks may also occur within RUBE's sibling FRAME subsystems (i.e., SLAM 201, STEER 202, PERKS 204, and FORCE 205), and these may be opportunistically utilized by RUBE 203.

In a preferred embodiment, RUBE 203 may exchange working fluids with its sibling FRAME 200 subsystems only via the STEER 202 apparatus depicted in FIG. 60A, rather than directly, and so may take advantage of any available thermal sources and sinks, including those external to the node itself, that are under the control of the SLAM apparatus 201 and accessible via the STEER 202 apparatus.

In a preferred embodiment, RUBE 203 may utilize a relatively low-temperature phase-change working fluid in conjunction with heat exchanger surfaces that may promote heterogeneous nucleation, so that it may more easily acquire and recuperate heat energy ("boiling energy") from hot spots and warm spots for immediate or subsequent reuse.

In a preferred embodiment, recuperated "boiling energy" heats and expands the working fluid, which, by natural convection or thermosiphon, or in conjunction with a vapor injection mechanism, may implement a type of thermal pump or thermocompressor that may deliver motive force that may circulate or help to circulate said working fluid. "Boiling energy" in this context refers to energy that may be immediately used immediately (or stored for later use) and that may help effect a liquid/vapor phase-change, without approaching the working fluid's critical heat flux. In a preferred embodiment, said vapor injection mechanism may also implement a phase, temperature, and pressure conversion capability suitable for merging streams of working fluid that may differ in phase, temperature, and/or pressure. In a preferred embodiment, said stream-merging and conversion capability may be utilized by the STEER 202 apparatus depicted in FIG. 60A.

In a preferred embodiment, recuperated energy heats and expands the working fluid (possibly involving a complete or partial phase-change, depending on the temperature and pressure), which, in conjunction with optional vapor injection and adequate subcooling, may create a motive force that may help to circulate the working fluid among system components. In a preferred embodiment, said circulated working fluid may help to thermally stabilize the system, to further extract reusable energy for immediate reuse or storage, and/or to efficiently reject waste energy without overly subcooling the working fluid.

In a preferred embodiment, a relatively small, continuous, positively pressurized liquid flow may be maintained among selected subsystems or components, which may be ensured via one or more low-power pumps, in order to prevent dryout, eliminate local hot spots, and assure thermal stability—as an asset-protection mechanism that may serve to reduce or eliminate dependency on thermal expansion, nucleation and vapor injection as the only motive forces. In a preferred embodiment, said pump(s) may operate at reduced power levels or may be powered off completely when the required flow can be maintained without them.

In a preferred embodiment, said low-power pumps may be of a high-reliability variable-voltage direct-current sealless magnetic type, most preferably with a spherical ceramic bearing or other means of minimizing friction and mechanical wear, thereby contributing to reliability and availability. In a preferred embodiment, said low-power pumps may be configured to be at least doubly or triply redundant, partly due to their role as an asset-protection mechanism.

10.3.1 RUBE—Heat Energy Recuperation Cycle Overview

Figure 66:
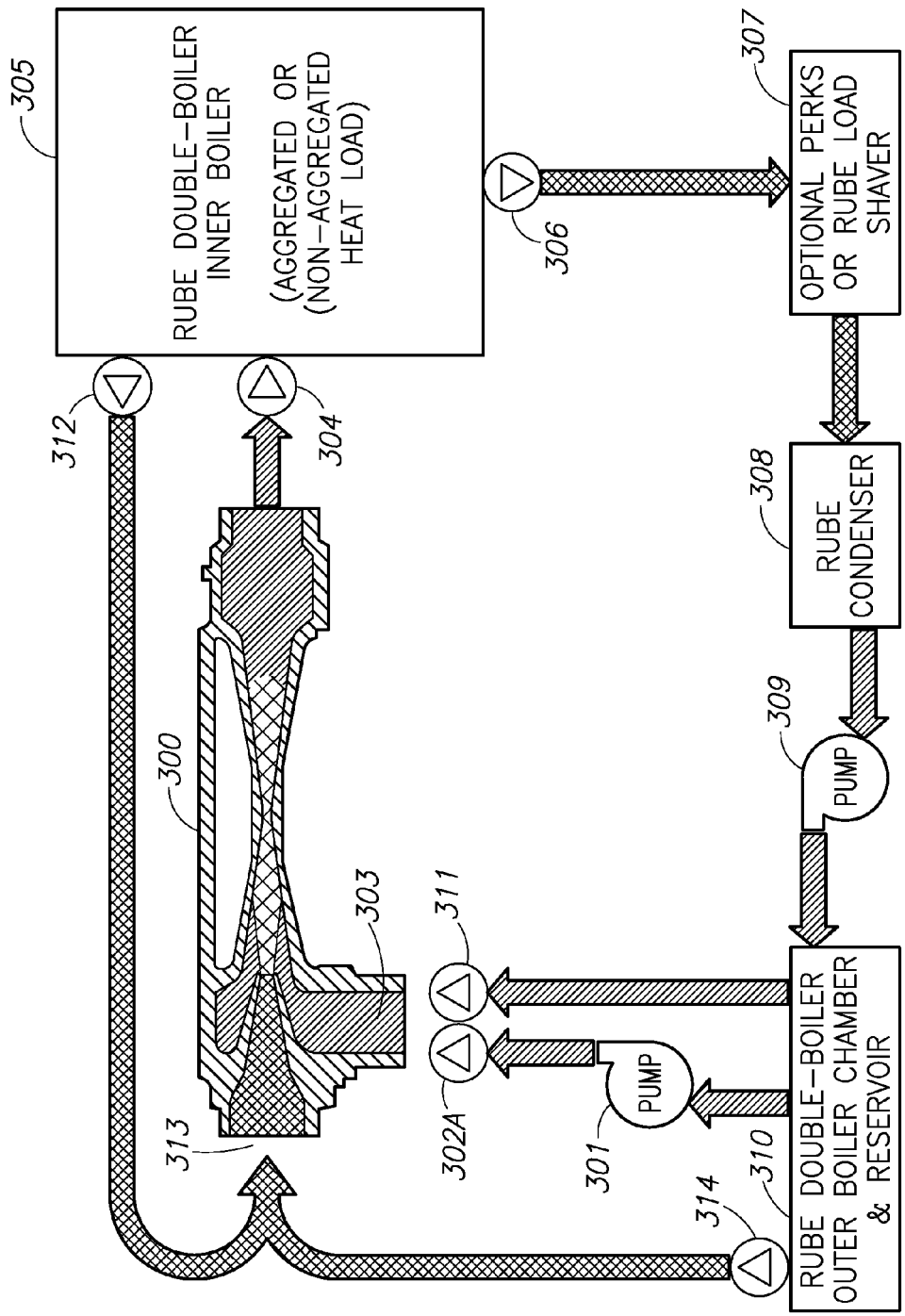
FIG. 66. RUBE—Heat Energy Recuperation Cycle Overview, v.1

Refer to FIG. 66. RUBE—Heat Energy Recuperation Cycle Overview, v.1

Figure 67:
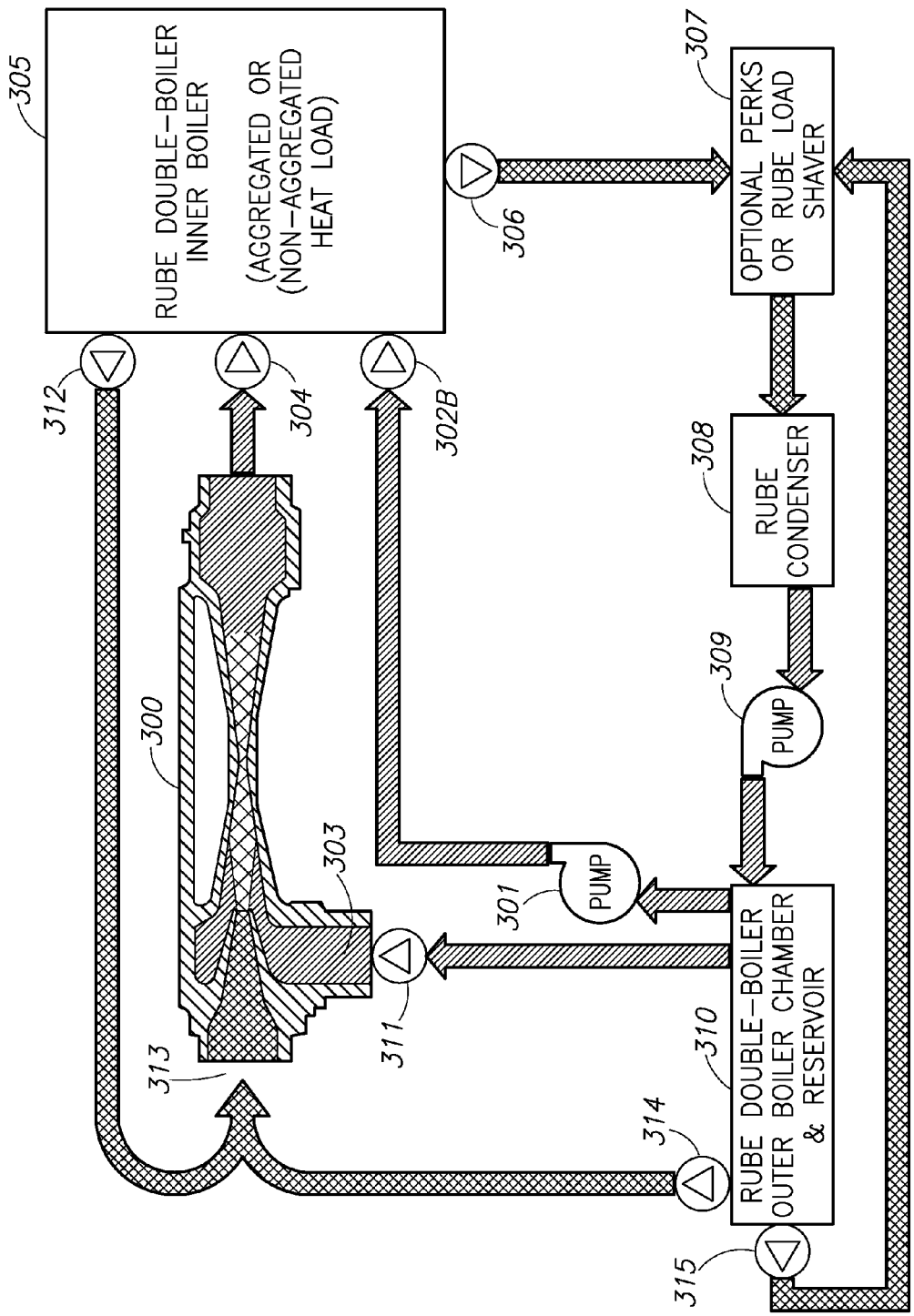
FIG. 67. RUBE—Heat Energy Recuperation Cycle Overview, v.2
Figure 68:
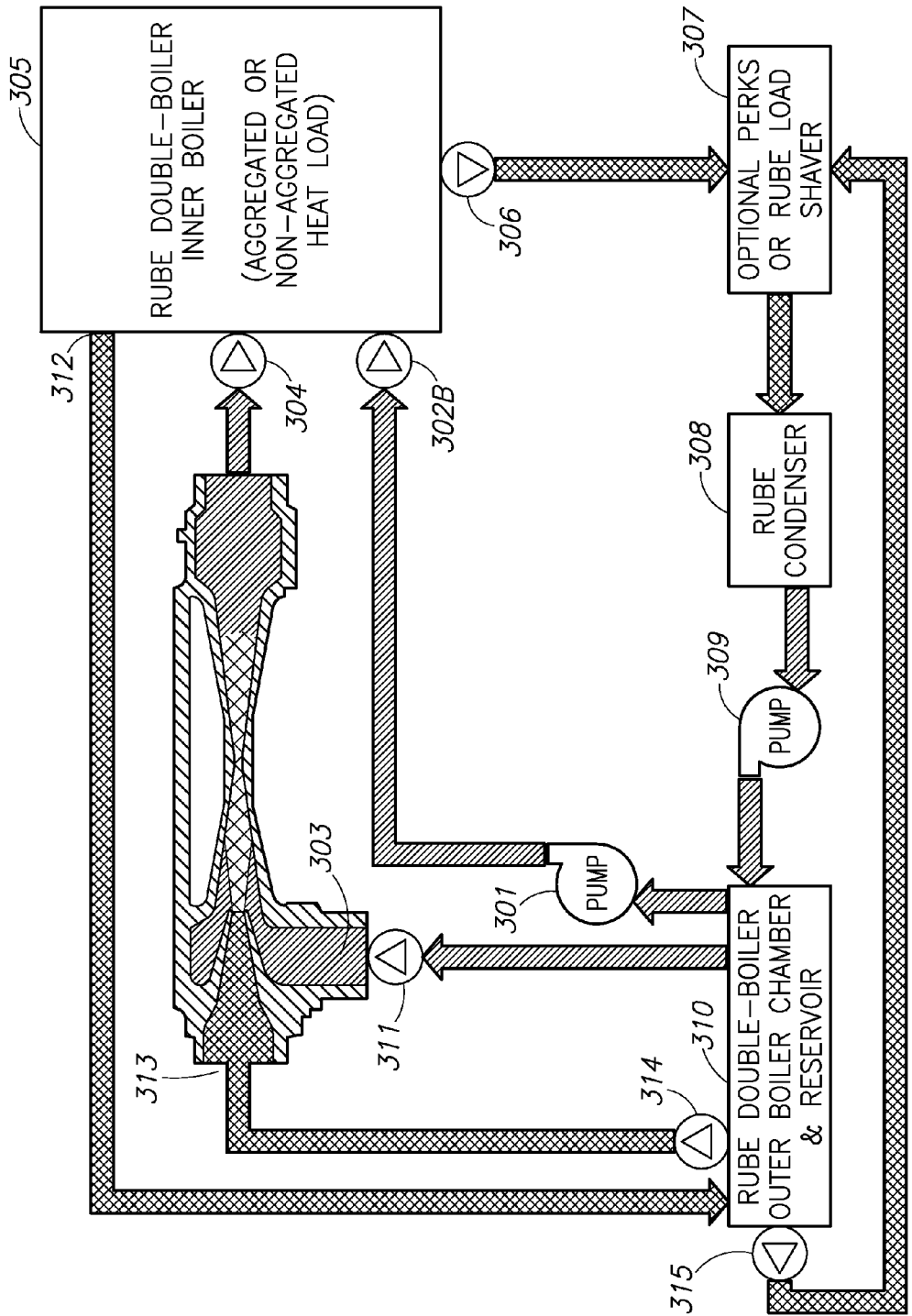
FIG. 68. RUBE—Heat Energy Recuperation Cycle Overview, v.3

An overview of the RUBE Heat Energy Recuperation Cycle is depicted in FIG. 66, FIG. 67, and FIG. 68 for three different preferred embodiments, labeled "v.1," "v.2," and "v.3" for convenience within the next three subsections.

In a preferred embodiment common to all three embodiments described, the RUBE Double-Boiler Inner Boiler 305 preferentially receives relatively cooler working fluid because it contains a combination of potentially temperature-sensitive and/or high-heat-flux electronic devices whose respective operating temperature ranges must be appropriately maintained in order to retain the optionally advantageous properties of the system. The RUBE Double-Boiler Inner Boiler 305 is part of the RUBE Double-Boiler described in 10.3.2, and is further described in 10.3.3.

In a preferred embodiment common to all three embodiments described, the RUBE Double-Boiler Outer Boiler Chamber & Reservoir 310 receives relatively warmer working fluid because it contains a combination of potentially temperature-insensitive and/or low-heat-flux electronic devices whose respective operating temperature ranges are sufficiently lax as to need no extraordinary attention in order to retain the optionally advantageous properties of the system. The RUBE Double-Boiler Outer Boiler Chamber & Reservoir 310 is part of the RUBE Double-Boiler described in 10.3.2.

10.3.1.1 RUBE—Heat Energy Recuperation Cycle Overview, v.1

In the following description of a preferred embodiment, labeled for convenience as "RUBE Heat Energy Recuperation Cycle v.1" and depicted in FIG. 66, any of the devices may each be replaced by a multiplicity of units with the same or altered characteristics, plumbed in series or parallel so as to modify flow or pressure as desired, or to effect an optimal use of a variety of heat or cold sources of differing characteristics. In a preferred embodiment, said devices may be part of and/or integral to the STEER apparatus 202 depicted in FIG. 60A, and thus may be dynamically reconfigurable.

As depicted in FIG. 66, the flow control valves 302, 304, 306, 311, 312, and 314 may each be either a simple check valve (the minimum requirement), or an optional hybrid apparatus ("hybrid flow control valve") comprising a check valve combined with some type of tap valve, proportional valve, or other means of flow control that can be used to optimally balance the system, and which may be optionally dynamically controllable, for example via integration with the STEER apparatus 202 depicted in FIG. 60A, or via other electronic and/or computer-controlled mechanisms.

In a preferred embodiment, said flow control valves may be deployed on aggregated flows as depicted above, or alternatively, on individual flows when a multiplicity of one or more of the devices are present. In a preferred embodiment, the optional hybrid flow control valves may be present only if they're under the control of a system monitoring and control function, in which case it may be presumed that some combination of temperature, pressure, and/or flow sensors may also be placed at appropriate points to provide feedback to the system monitoring and control function.

As depicted in FIG. 66, pump 301 pulls working fluid from the RUBE Double-Boiler outer boiler chamber & reservoir 310 and pushes it through flow control valve 302 into the liquid inlet 303 of the RUBE Vapor Injector, out the delivery outlet, and through another flow control valve 304 into the RUBE Double-Boiler inner boiler apparatus 305, which may add heat to the fluid and may cause it to partially or fully evaporate. The heated working fluid, which may be any combination of liquid and vapor, then may exit the inner boiler apparatus 305 through either or both of two flow control valves 306 and/or 312, where it may proceed along either or both of the two downstream paths, following the path of least resistance (determined pseudo-statically by the configuration, or dynamically when hybrid flow control valves are present).

In an alternate preferred embodiment (not shown), the output of pump 301 may connect to a dynamically controllable splitter or diverter valve (not shown), one of whose outputs may connect as previously described to flow control valve 302, and the other of which may connect into an additional inlet (not shown) on the RUBE condenser apparatus 308, in order to mitigate the risk associated with the possibility that all working fluid circulating to the inner boiler apparatus 305 may be inadvertently leaked into the outer boiler chamber & reservoir 310, thereby bypassing the RUBE condenser apparatus 308. In a variant of said alternative preferred embodiment, a check-valved separate pump (not shown) may comprise the bypass mechanism. In either of said alternative preferred embodiments, fluid may be cooled and/or condensed directly from the outer boiler chamber & reservoir 310, which may thereby allow the system to function (at a lower efficiency) and/or survive for a longer period.

From flow control valve 306 the working fluid and/or vapor may flow into the optional PERKS or RUBE load-shaver apparatus 307 if present, and then into the condenser apparatus 308, or else into the condenser apparatus 308 directly. In the RUBE condenser apparatus 308, any vapor present may condense to fluid and may return via pump 309 to the outer boiler chamber & reservoir 310, where it may be circulated and preheated in preparation for repeating the cycle through pump 301, and/or through the pump bypass path directly into flow control valve 311.

From flow control valve 312 the working fluid and/or vapor may flow into the vapor inlet 313 of the RUBE Vapor Injector where it may be mixed with liquid working fluid from liquid inlet 303. When little or no vapor is present, the RUBE Vapor Injector may simply serve as a mixer, with no particular contribution to thermal efficiency, and this situation may occur when the system is operating at sufficiently low power levels that the working fluid is still below its boiling point after leaving the inner boiler apparatus 305 (this may be the normal startup scenario—the energy recuperation apparatus may be initialized to begin the flow of working fluid before power may be applied to the inner boiler apparatus 305). Under high-power scenarios, and/or with sufficient pressure in the outer boiler chamber & reservoir 310, vapor may vent through flow control valve 314 into vapor inlet 313.

When sufficient vapor is presented at the vapor inlet 313 of the RUBE Vapor Injector, so as to activate its normal "vapor injection" operating mode (as described in section 10.3.4), a suction may be created at liquid inlet 303 and a positive pressure may be created at the delivery outlet, which may cause working fluid to flow from flow control valves 302 and/or 311 according to the path of least resistance.

Depending on the actual working temperatures and pressures within the system, including the settings of the flow control valves 306, 312, and/or 314, it may be possible to power-down pump 301 while retaining the full operation of the system, thereby adding to the overall efficiency of the system. In the case of a powered-down pump 301, it may also be possible to close flow control valve 302 (i.e., if it is an optional hybrid as described earlier), thereby preventing flow-induced wear on pump 301 (even though such wear may be minimal).

10.3.1.2 RUBE—Heat Energy Recuperation Cycle Overview, v.2

In the following description of the embodiment depicted in FIG. 67, the operation is nearly identical to that of FIG. 66, except for an altered path between the outer and inner boilers (from the outer boiler to inner boiler) of the RUBE Double-Boiler apparatus, depicted as 310 and 305, respectively, and the inclusion of an optional recuperative vapor path from said outer boiler 310 to the optional PERKS or RUBE Load Shaver 307 if present, or to the RUBE Condenser 308 otherwise.

Refer to FIG. 67. RUBE—Heat Energy Recuperation Cycle Overview, v.2

In the following description of a preferred embodiment, labeled for convenience as "RUBE Heat Energy Recuperation Cycle v.2" and depicted in FIG. 67, any of the devices may each be replaced by a multiplicity of units with the same or altered characteristics, plumbed in series or parallel so as to modify flow or pressure as desired, or to effect an optimal use of a variety of heat or cold sources of differing characteristics. In a preferred embodiment, said devices may be part of and/or integral to the STEER apparatus 202 depicted in FIG. 60A, and thus may be dynamically reconfigurable.

As depicted in FIG. 67, the flow control valves 302, 304, 306, 311, 312, 314, and 315 may each be either a simple check valve (the minimum requirement), or an optional hybrid apparatus ("hybrid flow control valve") comprising a check valve combined with some type of tap valve, proportional valve, or other means of flow control that can be used to optimally balance the system, and which may be optionally dynamically controllable, for example via integration with the STEER apparatus 202 depicted in FIG. 60A, or via other electronic and/or computer-controlled mechanisms.

In a preferred embodiment, said flow control valves may be deployed on aggregated flows as depicted above, or alternatively, on individual flows when a multiplicity of one or more of the devices are present. In a preferred embodiment, the optional hybrid flow control valves may be present only if they're under the control of a system monitoring and control function, in which case it may be presumed that some combination of temperature, pressure, and/or flow sensors may also be placed at appropriate points to provide feedback to the system monitoring and control function.

As depicted in FIG. 67, two paths feed the RUBE Double-Boiler Inner Boiler 205. In a first path, pump 201 may pull working fluid from the RUBE Double-Boiler Outer Boiler Chamber & Reservoir 310 and push it through flow control valve 311 into the RUBE Double-Boiler inner boiler apparatus 305. In a second path, a combination of pressure from RUBE Double-Boiler Outer Boiler Chamber & Reservoir 310 and suction induced by RUBE Vapor Injector at liquid inlet 303 may pull working fluid from the RUBE Double-Boiler Outer Boiler Chamber & Reservoir 310 through flow control valve 302 into the liquid inlet 303 of the RUBE Vapor Injector, out the delivery outlet, and through a flow control valve 304 into the RUBE Double-Boiler inner boiler apparatus 305.

The RUBE Double-Boiler inner boiler apparatus 305 may add heat to the working fluid and thereby cause it to partially or fully evaporate. The heated working fluid, which may be any combination of liquid and vapor, then exits the inner boiler apparatus 305 through either or both of two flow control valves 306 and/or 312, where it may proceed along either or both of the two downstream paths, following the path of least resistance (determined pseudo-statically by the configuration, or dynamically when hybrid flow control valves are present).

From flow control valve 306 the working fluid and/or vapor may flow into the optional PERKS or RUBE load-shaver apparatus 307 if present, and then into the condenser apparatus 308, or else into the condenser apparatus 308 directly. In the RUBE condenser apparatus 308, any vapor present can condense to fluid and return via pump 309 to the outer boiler chamber & reservoir 310, where it can provide cool fluid to pump 301 and/or RUBE Vapor Injector 303 (via flow control valve 302), and also be circulated, preheated, and/or vaporized, in which case it can exit through flow control valve 314 into the vapor inlet 313 of the RUBE Vapor Injector 303.

From flow control valve 312 the working fluid and/or vapor may flow into the vapor inlet 313 of the RUBE Vapor Injector where it may be mixed with liquid working fluid from liquid inlet 303. When little or no vapor is present, the RUBE Vapor Injector may simply serve as a mixer, with no particular contribution to thermal efficiency, and this situation may occur when the system is operating at sufficiently low power levels that the working fluid may still be below its boiling point after leaving the inner boiler apparatus 305 (this may be the normal startup scenario—the energy recuperation apparatus may be initialized to begin the flow of working fluid before power may be applied to the inner boiler apparatus 305).

In a preferred embodiment, under high-power scenarios, and/or with sufficient pressure in the outer boiler chamber & reservoir 310, vapor may vent through flow control valve 314 into vapor inlet 313.

When sufficient vapor is presented at the vapor inlet 313 of the RUBE Vapor Injector, so as to activate its normal "vapor injection" operating mode (as described in section 10.3.4), a suction may be created at liquid inlet 313 and a positive pressure may be created at the delivery outlet, which may cause working fluid to flow from flow control valve 312 into the RUBE Double-Boiler inner boiler apparatus 315] via flow control valve 314.

Depending on the actual working temperatures and pressures within the system, including the settings of the flow control valves 306, 312, and/or 314, it may be possible to power-down pump 301 while retaining the full operation of the system, thereby adding to the overall efficiency of the system. In the case of a powered-down pump 301, it may also be possible to close flow control valve 311 (i.e., if it is an optional hybrid as described earlier), thereby preventing flow-induced wear on pump 301 (even though such wear may be minimal).

10.3.1.3 RUBE—Heat Energy Recuperation Cycle Overview, v.3

In the following description of the embodiment depicted in FIG. 68, the operation is nearly identical to that of FIG. 67, except for the addition of a new path between the outer and inner boilers (from the inner boiler to outer boiler) of the RUBE Double-Boiler apparatus, depicted as 305 and 310, respectively; the elimination of both the flow control valve at 312 and the path from 312 to RUBE Vapor Injector 313, leaving an altered feed path to the RUBE Vapor Injector, depicted as the path from 314 to 313.

Refer to FIG. 68. RUBE—Heat Energy Recuperation Cycle Overview, v.3

In the following description of a preferred embodiment, labeled for convenience as "RUBE Heat Energy Recuperation Cycle v.3" and depicted in FIG. 68, any of the devices may each be replaced by a multiplicity of units with the same or altered characteristics, plumbed in series or parallel so as to modify flow or pressure as desired, or to effect an optimal use of a variety of heat or cold sources of differing characteristics. In a preferred embodiment, said devices may be part of and/or integral to the STEER apparatus 202 depicted in FIG. 60A, and thus may be dynamically reconfigurable.

As depicted in FIG. 68, the flow control valves 302, 304, 306, 311], 314, and 315 may each be either a simple check valve (the minimum requirement), or an optional hybrid apparatus ("hybrid flow control valve") comprising a check valve combined with some type of tap valve, proportional valve, or other means of flow control that can be used to optimally balance the system, and which may be optionally dynamically controllable, for example via integration with the STEER apparatus 202 depicted in FIG. 60A, or via other electronic and/or computer-controlled mechanisms.

In a preferred embodiment, said flow control valves may be deployed on aggregated flows as depicted above, or alternatively, on individual flows when a multiplicity of one or more of the devices are present. In a preferred embodiment, the optional hybrid flow control valves may be present only if they're under the control of a system monitoring and control function, in which case it may be presumed that some combination of temperature, pressure, and/or flow sensors may also be placed at appropriate points to provide feedback to the system monitoring and control function.

As depicted in FIG. 68, two paths feed the RUBE Double-Boiler Inner Boiler 305. In a first path, pump 301 may pull working fluid from the RUBE Double-Boiler Outer Boiler Chamber & Reservoir 310 and push it through flow control valve 311 into the RUBE Double-Boiler inner boiler apparatus 305. In a second path, a combination of pressure from RUBE Double-Boiler Outer Boiler Chamber & Reservoir 310 and suction induced by RUBE Vapor Injector at liquid inlet 303 may pull working fluid from the RUBE Double-Boiler Outer Boiler Chamber & Reservoir 310 through flow control valve 302 into the liquid inlet 303 of the RUBE Vapor Injector, out the delivery outlet, and through a flow control valve 304 into the RUBE Double-Boiler inner boiler apparatus 305.

The RUBE Double-Boiler inner boiler apparatus 305 may add heat to the working fluid and thereby cause it to partially or fully evaporate. The heated working fluid, which may be any combination of liquid and vapor, then exits the inner boiler apparatus 305 through either or both of two flow control valves 306 and/or 312, where it may proceed along either or both of the two downstream paths, following the path of least resistance (determined pseudo-statically by the configuration, or dynamically when hybrid flow control valves are present).

From flow control valve 306 the working fluid and/or vapor may flow into the optional PERKS or RUBE load-shaver apparatus 307 if present, and then into the condenser apparatus 308, or else into the condenser apparatus 308 directly. In the RUBE condenser apparatus 308, any vapor present can condense to fluid and return via pump 309 to the outer boiler chamber & reservoir 310, where it can provide cool fluid to pump 301 and/or RUBE Vapor Injector 303 (via flow control valve 202), and also be circulated, preheated, and/or vaporized, in which case it can exit through flow control valve 314 into the vapor inlet 313 of the RUBE Vapor Injector.

From the RUBE Double-Boiler inner boiler apparatus 305 the working fluid may can exit under pressure at point 312 and flow directly into the main reservoir of the outer boiler apparatus 310. The omission of a flow control valve at point 312 is an intentional departure from the preferred embodiment described in the previous section (10.3.1.2). Keeping in mind that the inner boiler apparatus 305 is actually contained within the outer boiler apparatus 310, the omission of a flow control valve at point 312 (which may actually represent a multiplicity of control valves) enables the path from the inner boiler apparatus 305 to the outer boiler apparatus 310 to simply be a pattern of convenient egress points (e.g., "holes") in the inner boiler apparatus 305.

In a preferred embodiment, some or all of the egress points from the inner boiler apparatus 305 can be distributed over the interfacing surfaces of the inner boiler apparatus 305 so as to evenly (or otherwise) distribute the escaping fluid into the outer boiler apparatus 310, thereby improving turbulence and enhancing the mixing of fluid temperatures with the outer boiler apparatus 310, while also reducing or smoothing the thermal gradients that may otherwise be present within the outer boiler apparatus 310.

In a preferred embodiment, some or all of said egress points, particularly those most likely to handle relatively hotter working fluid (and thus relatively higher vapor content) from the inner boiler apparatus 305 can be preferentially distributed over the interfacing surfaces of the inner boiler apparatus 305 so as to distribute the fluid with relatively higher vapor content into specific areas of the outer boiler apparatus 310. In a preferred embodiment, said specific areas are those where the escaping fluid is less likely to encounter relatively cooler fluid (which would have a cooling and/or condensing effect), thereby improving the rate at which working fluid is converted to vapor, which consequently increases the pressure within the outer boiler apparatus 310, which may beneficially raise the boiling point of the working fluid and/or increase the motive force available at the vapor inlet 313 of the RUBE Vapor Injector (the latter may occur only if the fluid is allowed to vent through flow control valve 314 into vapor inlet 313).

In a preferred embodiment, under high-power scenarios, and/or with sufficient pressure in the outer boiler chamber & reservoir 310, vapor may vent through flow control valve 314 into vapor inlet 313.

When sufficient vapor is presented at the vapor inlet 313 of the RUBE Vapor Injector, so as to activate its normal "vapor injection" operating mode (as described in section 10.3.4), a suction may be created at liquid inlet 303 and a positive pressure may be created at the delivery outlet, which may cause working fluid to flow from flow control valve 302 into the RUBE Double-Boiler inner boiler apparatus 305 via flow control valve 304.

Depending on the actual working temperatures and pressures within the system, including the settings of the flow control valves 306, 312, and/or 314, it may be possible to power-down pump 301 while retaining the full operation of the system, thereby adding to the overall efficiency of the system. In the case of a powered-down pump 301, it may also be possible to close flow control valve 311 (i.e., if it is an optional hybrid as described earlier), thereby preventing flow-induced wear on pump 301 (even though such wear may be minimal).

10.3.2 RUBE—Double Boiler

The RUBE Double-Boiler apparatus is part of a closed-loop system, that, in a preferred embodiment, is connected to other components as depicted in FIG. 66, FIG. 67, and FIG. 68, corresponding to three different preferred embodiments of the RUBE Heat Energy Recuperation Cycle described in section 10.3.1.

Each RUBE Double-Boiler apparatus comprises one or more "inner boiler" units and an "outer boiler," such that the former are fully enclosed within the latter, in order to maximize the recuperation of heat energy (thermal energy) dissipated by the aggregation of enclosed heat sources, and optionally, to separate the recuperated heat energy into two or more "grades" according to desired or observed temperatures.

In a preferred embodiment common to all three embodiments described in section 10.3.1, the RUBE Double-Boiler Inner Boiler apparatus preferentially receives relatively cooler working fluid, while the RUBE Double-Boiler Outer Boiler Chamber & Reservoir receives relatively warmer working fluid.

In a preferred embodiment, potentially temperature-sensitive and/or high-heat-flux electronic devices whose respective operating temperature ranges must be appropriately maintained in order to retain the optionally advantageous properties of the system are preferentially placed within an inner boiler (or at least have their "hot" surfaces within an inner boiler). Consequently, potentially temperature-insensitive and/or low-heat-flux electronic devices (i.e., those devices whose respective operating temperature ranges are sufficiently lax as to need no extraordinary attention in order to retain the optionally advantageous properties of the system) are placed within the enclosing outer boiler.

In an alternative preferred embodiment, without special concern for temperature sensitivity (such as when the components under consideration are not particularly temperature-sensitive), the relatively "hot" heat sources (e.g., those components with a relatively higher heat flux, such as CPUs and point-of-load power regulator components) are preferentially placed within the inner boiler (or at least have their "hot" surfaces within an inner boiler), and the "warm" heat sources (i.e., those components with a relatively lower heat flux, such as DRAM and flash memory chips) are placed within the enclosing outer boiler.

Both inner and outer boilers may be pressure vessels intended to withstand a maximum of 7-bar operating pressures (100 PSI) under normal conditions, plus a margin of safety. Unintentional leaks within an inner boiler cause only a reduction in efficiency, but leaks in the outer boiler can cause a loss of working fluid and a subsequent reduction in local survivability. In a preferred embodiment the normal operating pressure for both the inner and outer boilers does not exceed 2 bar, and may be substantially less.

In a preferred embodiment, it is optionally advantageous for the RUBE Double-Boiler Outer Boiler Chamber & Reservoir to have a somewhat vertical orientation with a distinct "top" having a vapor dome to simplify the collection of vapor evolving from the working fluid.

In a preferred embodiment, such as for electronics thermal stabilization applications, the working fluid may be an organic dielectric fluid with a boiling point between 20° C. and 40° C., such as 1-methoxy-heptafluoropropane ($C_3F_7OCH_3$). Other working fluids may also be suitable, some examples of which are listed in section 10.3. In a preferred embodiment, the working fluid expands substantially when heated and vaporizes easily.

In a preferred embodiment, the RUBE Double-Boiler apparatus has an outer shell of cast aluminum (although other construction methods and materials are possible), and its external shape and form factor are such that it can mate with guide channels extruded into a vertically oriented cylindrical or partly cylindrical aluminum extrusion designed to contain a multiplicity of RUBE Double-Boiler units.

Given the aforementioned vertically oriented extrusion, in a preferred embodiment, the intent is to be able to easily align and slide the RUBE Double-Boiler apparatus from the extrusion upper opening, downward into the extrusion until it reaches a bulkhead, where couplings and connectors on the bottom of the Double-Boiler apparatus mate with complementary couplings and connectors within the extrusion. In an alternate embodiment, the RUBE Double-Boiler apparatus aligns and slides downward from the extrusion upper opening, into the extrusion until it reaches a mechanical stop; at that point a lever or cam means accessible from the top can be exercised such that it pulls the RUBE Double-Boiler apparatus toward a nearby vertical interior wall, such that couplings and connectors on the side of the RUBE Double-Boiler apparatus mate with complementary couplings and connectors on the extrusion's interior wall.

In a preferred embodiment, the RUBE Double-Boiler apparatus is a pressure-sealed, field-replaceable unit having blind-mating, quick-disconnect inlet and outlet couplings with double EPDM seals, and capable of operating at 100 PSI, such as those available from Colder (the extrusion would contain mating couplings). (Note: Although other seal materials are possible, EPDM is preferred for its compatibility with the preferred working fluid.).

In a preferred embodiment, the RUBE Double-Boiler apparatus is also electrically sealed and EMP-hardened, having blind-mating, quick-disconnect electrical connectors with a multiplicity of conductors appropriate for the ingress and egress of electrical power feeds and various high-frequency signals such as are common in computer and telecommunications devices.

In a preferred embodiment, the RUBE Double-Boiler apparatus connects to a "bottom plane," "mid-plane," or "backplane," or equivalent connector arrangement in the vertical extrusion by means of a proprietary, pin-free connector, and having the property of providing an extremely high quality, nearly noise-free connection. In an alternate embodiment, the same connector arrangement is used, but is placed on the side (or back) of the RUBE Double-Boiler apparatus, rather than on the bottom. See also: RUBE, RUBE Inner Boiler.

Figure 69:
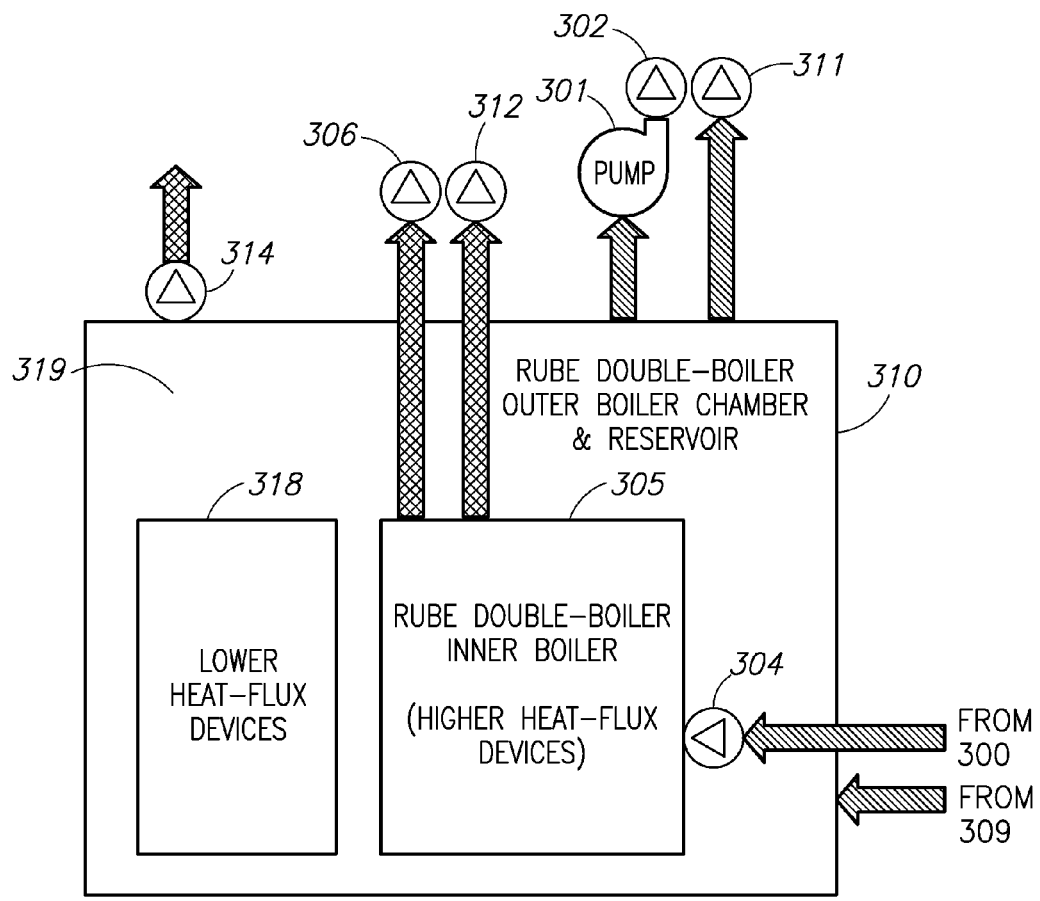
FIG. 69. RUBE—Double Boiler—Outer Boiler

Refer to FIG. 69. RUBE—Double Boiler—Outer Boiler

Figure 70:
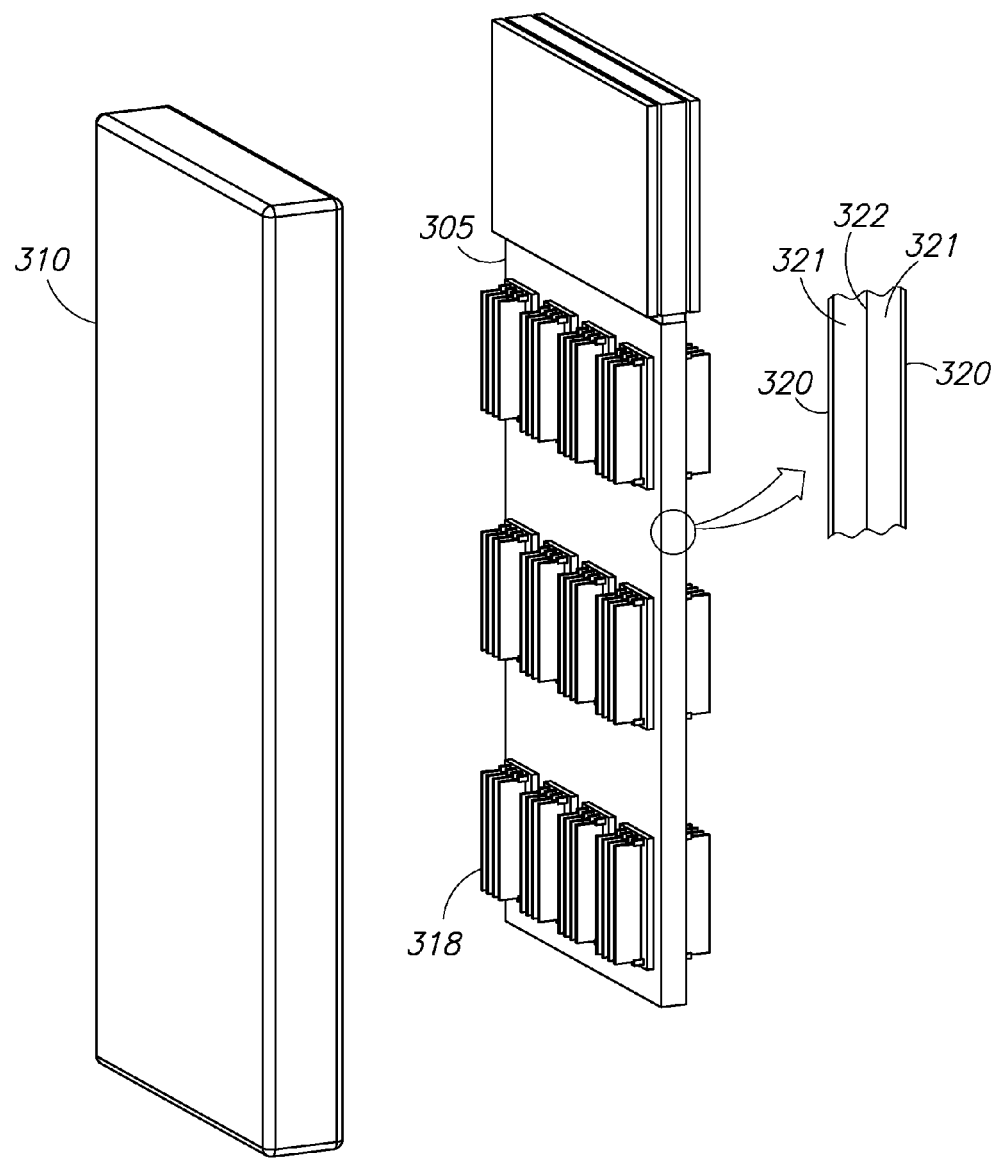
FIG. 70. RUBE Double Boiler—Outer and Inner Boiler Assembly Concept

Refer to FIG. 70. RUBE Double Boiler—Outer and Inner Boiler Assembly Concept FIG. 69 is intended to further clarify the relationship of the inner and outer boilers. It uses the same numbering as the previous figure. Although a preferred embodiment may include multiple inner boilers, only one is depicted here, for clarity.

In a preferred embodiment of the RUBE Double Boiler, an example of which is depicted in FIG. 70, the outer boiler 310 shown on the left is a pressure vessel containing a dielectric working fluid, with the electronics module shown on the right.

Figure 72:
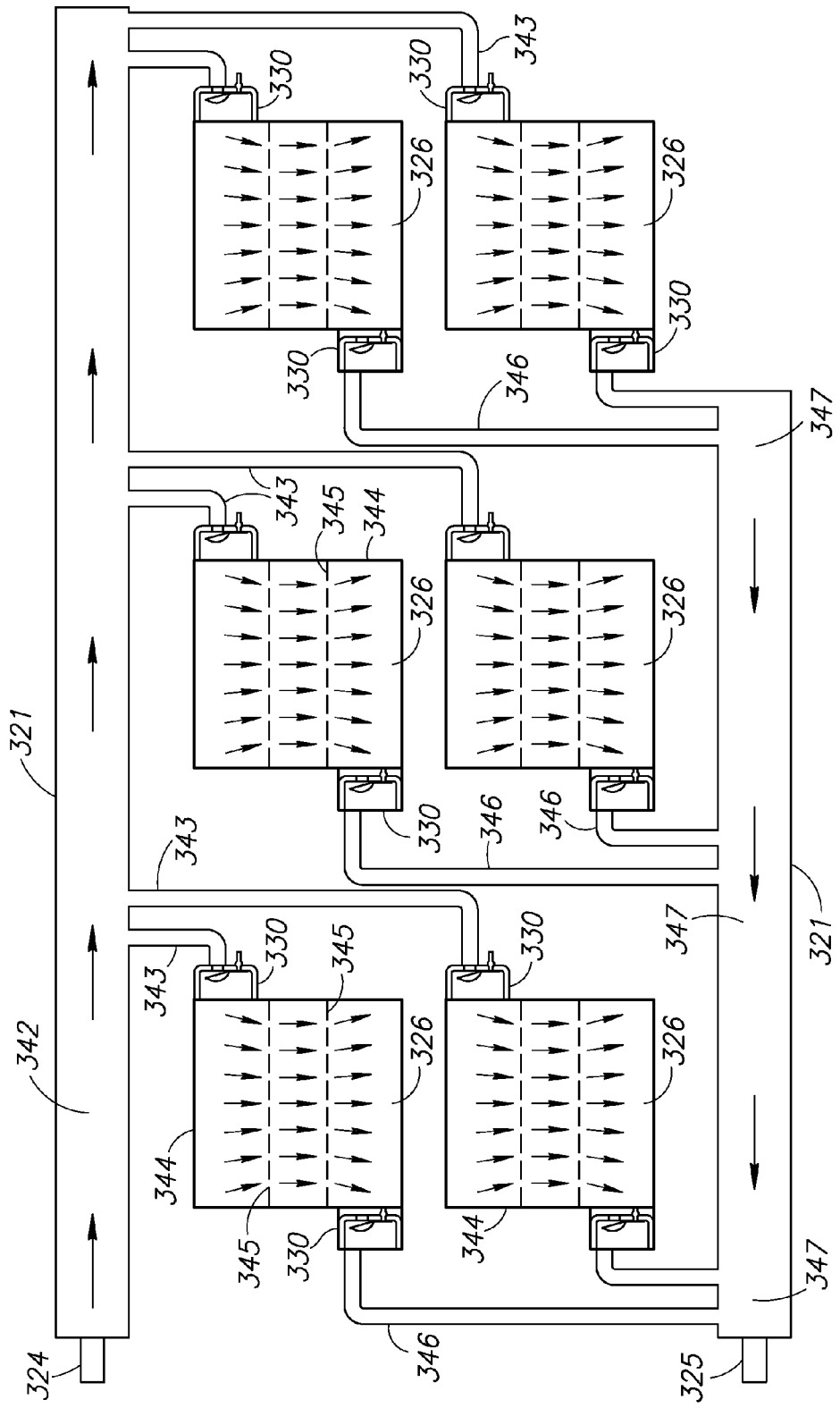
Figure 73:
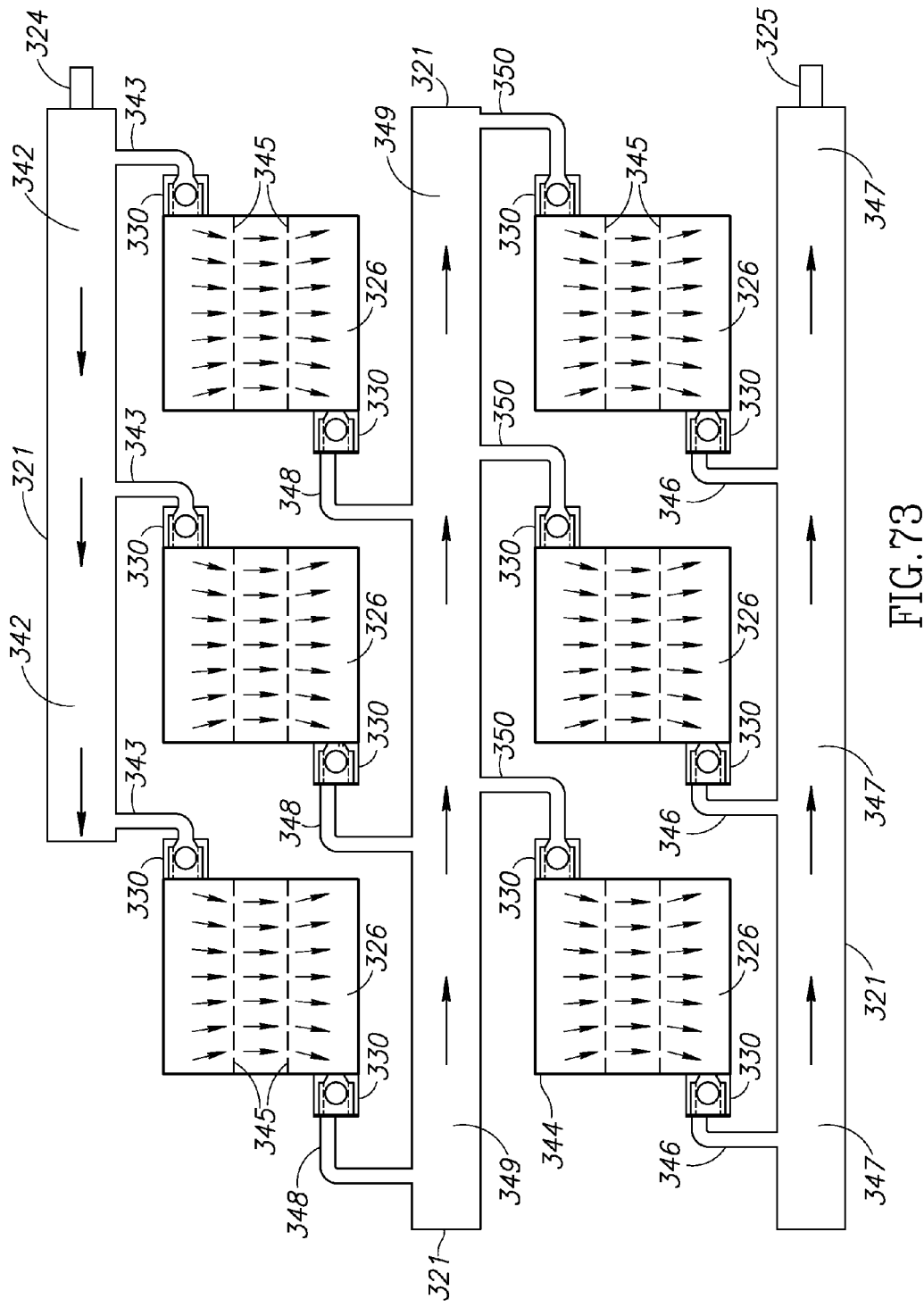

In the example of FIG. 70, the memory modules 318 depicted are representative of electronics that are immersed in the working fluid of the outer boiler 310. Notice that they appear on both sides of the assembly. However, they're not on opposite sides of the same PCB, but rather on two different PCBs 320 mounted back-to-back with a manifold assembly 305 between them. In a preferred embodiment, the reverse side of each PCB 320 depicted contains "hot" chips like CPUs, etc., and these are placed back-to-back with a two-piece manifold assembly 305 between them, comprising an "inner boiler" as depicted in further detail in FIG. 66, FIG. 67, and FIG. 68. In a preferred embodiment, said manifold components 321 may be injection-molded or cast, etc., for economy of manufacturing, although they may instead be machined or fabricated via alternative means. In a preferred embodiment, one or more fluid-compatible pressure-sealing mechanisms are placed at the seam 322 between the back-to-back manifold components 321 in such a manner as to aid the operation of the "inner boiler" as depicted generally in FIG. 66, FIG. 67, and FIG. 68, and specifically to aid in flow control as depicted in FIG. 72 and FIG. 73; to this end, a void is provided for said seal or seals in the manifold manufacturing process. In a preferred embodiment, said seal or seals are auto-routed and placed as a step of the manifold component 321 manufacturing process (i.e., rather than inserting one or more O-ring type seals at a later point in time, e.g., during the assembly of manifold assembly 305).

In the example of FIG. 70, heat exchangers 326 affixed to the "hot" chips are immersed in the path of turbulent working fluid moving through the manifold assembly or "inner boiler." As a special example, the devices located at the top (which is located for convenience only, and need not be at a particular location or orientation) in FIG. 70 may represent two-sided modules that may be "extra hot" and/or "heat tolerant" (e.g., a modular high-density power supply device) and participate in the inner boiler just like the other hot chips. However, in this example, one surface of the module may face the inner boiler, while the other faces the outer boiler, so that device cooling (or fluid heating, if you have the boiler's point of view) may occur from both sides at the same time.

10.3.3 RUBE—Inner Boiler

Figure 71A:
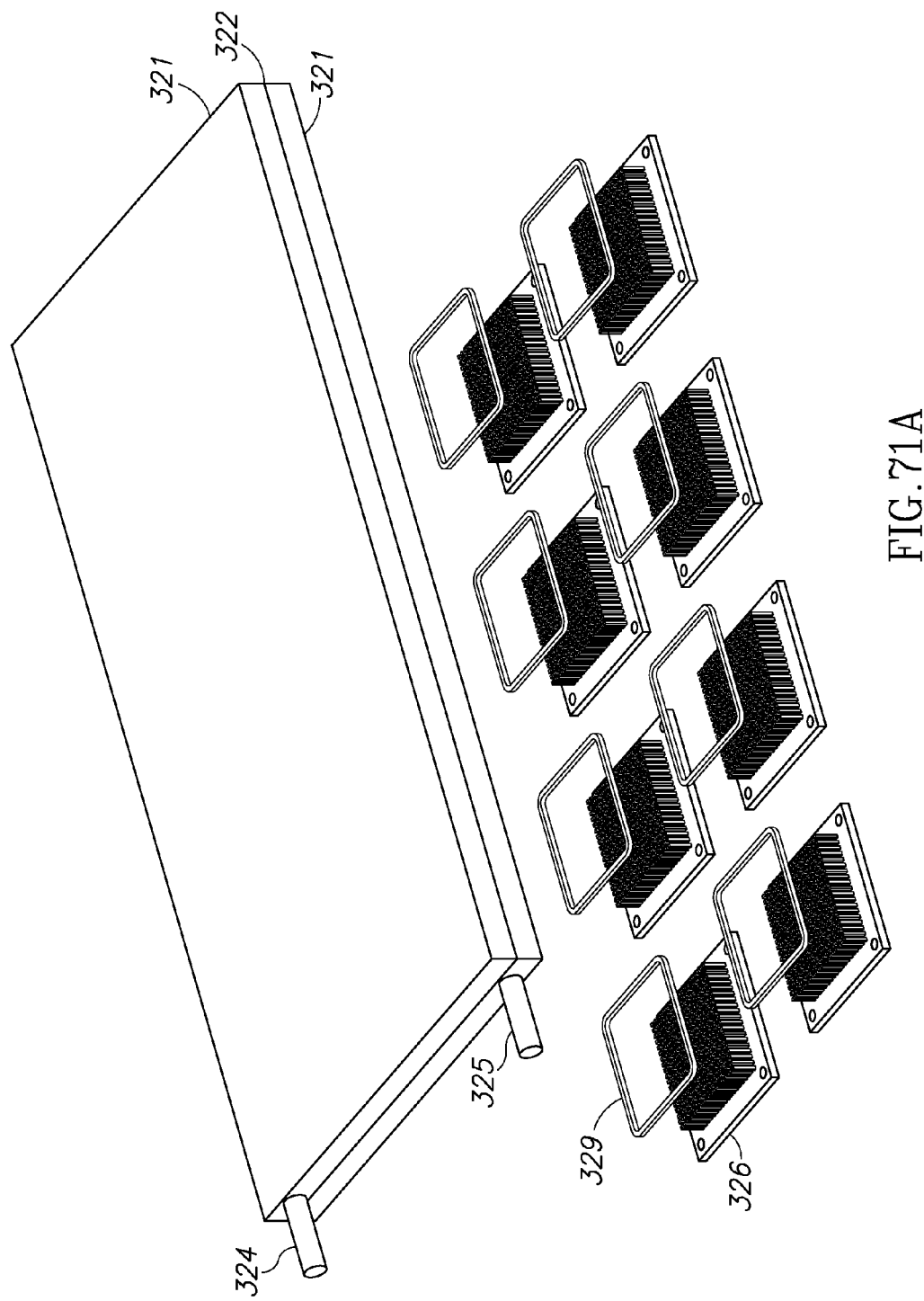
FIGS. 71A, B, & C. Example of a Possible Configuration of RUBE—Inner Boiler Apparatus FIG. 72. RUBE—Inner Boiler Apparatus—Basic Fluid Flow Concept FIG. 73. RUBE—Inner Boiler Apparatus—Advanced Fluid Flow Concept FIG. 74. Prior Art—Steam Injector Concept FIG. 75. The RUBE Vapor Injector—Principle of Operation FIGS. 76A, B, C & D. SUREFIRE Mini-Silo—Unmanned Underground Supercomputing (Preferred Embodiment for a Single SCRAM Machine)

Refer to FIGS. 71A, B, & C. Example of a Possible Configuration of RUBE—Inner Boiler Apparatus Refer to FIG. 72. RUBE—Inner Boiler Apparatus—Basic Fluid Flow Concept Refer to FIG. 73. RUBE—Inner Boiler Apparatus—Advanced Fluid Flow Concept In a preferred embodiment, the primary objective of the RUBE Inner Boiler apparatus is to ensure that the maximum case temperatures (Tcase) of high-heat-flux heat-producing devices do not exceed particular thresholds, in order to ensure that the devices do not produce more heat than their individual or collective desired target thresholds. The importance of this cannot be overstated, because the ability to stay below said thresholds enables drastic reductions in power consumption for an entire class of integrated circuit devices. The idea here is that avoiding energy waste preemptively is a great improvement over recuperating a portion of the energy that would otherwise be wasted.

Figure 71B:
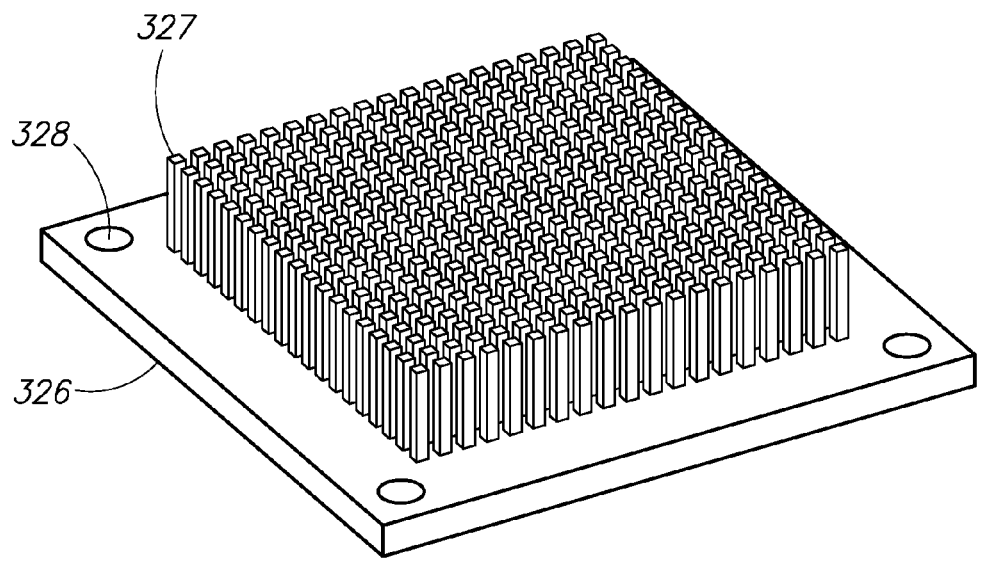

In a preferred embodiment, the secondary objective of the RUBE Inner Boiler apparatus is to recuperate thermal energy dissipated by the electronic devices contained within, so that said energy may be put to good use rather than wasting it (e.g., by rejecting it to the environment as heat). FIG. 70 and FIG. 71 depict the basic mechanical concept of the inner boiler, namely, that there is an assembly or other mechanism capable of containing and isolating a set of selected heat-producing chips from those not selected, while preferentially cooling said selected chips by efficiently circulating working fluid to them, recuperating the heat energy they emit, and passing the heat energy downstream for reuse.

In a preferred embodiment, the inner surfaces RUBE Double-Boiler's inner boiler apparatus 305 comprise one or more check-valved manifold and heat exchanger mechanisms (eight are partially depicted in FIG. 71A, while six are partially depicted in FIG. 72 and FIG. 73). In a preferred embodiment, said mechanisms may be injection-molded or cast for economy of manufacturing, although they may instead be machined or fabricated via alternative means. In a preferred embodiment, each outer wall of the manifold assembly 305 is a two-piece manifold shell 321 capable of serving as part of a sealed pressure vessel, housing the remainder of the assembly's components, and having thermal access to heat-producing components located on a PCB 320 fastened or otherwise attached to the major outer surface of each half 321 of the two-piece manifold 305. In a preferred embodiment, said thermal access may be provided by openings manufactured into the major outer surface of each half of the two-piece manifold (no such openings are depicted in FIG. 71A, however).

Figure 71C:
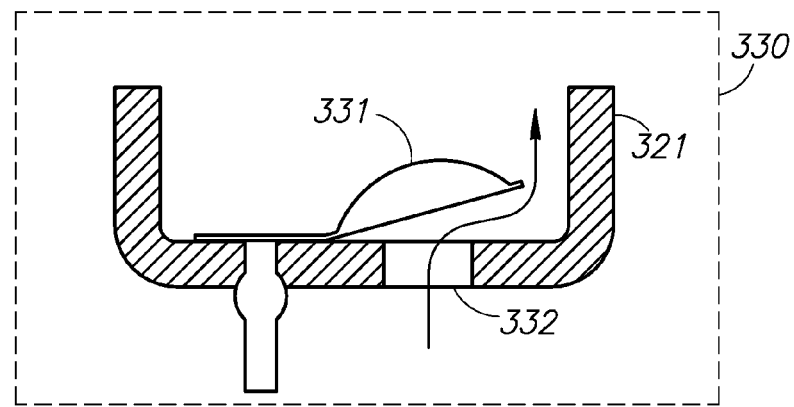

In a preferred embodiment partially depicted in FIG. 71A, said assemblies may comprise any number of heat-exchanger seals 329, baseplate heat exchangers 326 (an example is shown, but many commercial off-the-shelf units are suitable, including those with non-rectangular shapes), heat-producing devices (not shown, but typically electronics devices on a PCB 320), and optional backing/pressure plates to aid in providing clamping force (such as may be placed on the outside of a PCB 320, but also not shown). In a preferred embodiment, the check-valved manifold 305 further comprises a liquid inlet 324, vapor and liquid outlet 325, two-piece injection-molded manifold chamber 321 with one or more seams and seals 322 between them, inlet and optional outlet check-valves (either as individual components, or individually constructed as part of a machined, cast, or injection-molded channel with an attached check-valve 330 such as a flapper valve as depicted in FIG. 71C and FIG. 72, or ball-and-spring as depicted in FIG. 73, or other low-cracking force alternative) for each baseplate heat-exchanger 326, and suitable molded-in working fluid flow guides and channels within the two-piece injection-molded manifold chamber 321.

In a preferred embodiment, the RUBE Inner Boiler accommodates the cooling of devices that may, for the purposes of this discussion, be conveniently categorized as either "temperature-sensitive" or "non-temperature-sensitive." In this context, the former refers to devices whose operating characteristics (e.g., power dissipation) may vary considerably over their specified allowable temperature ranges, whereas the operating characteristics of the latter do not. The two categories of devices typically coexist and may be colocated, thus necessitating a strategy for dealing with both their respective needs within the same RUBE Inner Boiler (nonetheless, there may be multiple instances of the RUBE Inner Boiler, and they may operate independently with differing devices and/or at differing temperatures).

In a preferred embodiment, the working fluid flows within a RUBE Inner Boiler are configured such that the temperature-sensitive devices receive priority servicing, in order to specifically drive such devices toward the desired operating characteristics and/or thresholds (i.e., by forcing such devices to operate within a specific sub-range of the otherwise allowable range). As a second priority, the non-temperature-sensitive devices are then serviced (i.e., only after the needs of the temperature-sensitive devices have been met). At all times, both categories of devices must be kept within their respective operating temperature ranges, and preferably, well below the upper end of their individual ranges.

The types of temperature-sensitive devices for which the RUBE Inner Boiler is well-suited tend to be commercially available in multiple speed and temperature grades, such as integrated circuits (e.g., a CPU or "processor" having temperature-variable power dissipation, where increased operating temperature results in increased power dissipation). In general, higher speed devices produce more heat than their otherwise equivalent counterparts, and cost more than their lower speed counterparts. Furthermore, devices that consume less power (and produce less heat) cost more than their otherwise equivalent (and in particular, speed-equivalent) counterparts. Thus, high-speed, low-power components tend to cost the most. Also, the devices with the highest speeds are often unavailable as low-power devices, and certainly not in the lowest power grades (by definition). Finally, the fastest devices often have variable power dissipation, as depicted in Table 21 for three different processors, a commodity-priced device ("A") intended for consumer-class PCs and two much more expensive premium devices ("B" and "C") intended for server-class computers, where "B" is a standard temperature device, and "C" is a low-power (and higher-priced) "premium" device.

In Table 21, which depicts three different temperature-sensitive processors, the desired power dissipation targets for (say, 40 watts or less) are flagged with an asterisk. All power dissipation values shown are rounded to the nearest integer.

TABLE 21

Specified Power Dissipation of Three Different Processors at Various Case Temperatures

| Tcase Max (° C.) | Processor "A" Power (W) | Processor "B" Power (W) | Processor "C" Power (W) |
|---|---|---|---|
| 49 | 22* | 28* | 13.2* |
| 51 | 28* | 36* | 17* |
| 53 | 34* | 44 | 20* |
| 55 | 41 | 52 | 24* |
| 57 | 47 | 60 | 28* |
| 59 | 53 | 68 | 32* |
| 61 | 59 | 76 | 36* |
| 63 | 66 | 84 | 40* |
| 65 | 72 | 92 | 43 |
| 67 | 78 | 95 | 47 |
| 69 | 84 | N/A | 51 |
| 71 | 89 | N/A | 55 |

Although the allowable upper limit of temperature range is specified in Table 21 to be at least 67° C. for all three of this example's target processors (Tcase Max is 71° C. for processors "A" and "C", and 67° C. for processor "B"), the temperature sub-ranges required to keep the processor operating at a power dissipation target of 30 watts or less would be defined more strictly (e.g., Tcase Max must be no more than about 51° C. for processors "A" and "C", and 49° C. for processor "B"). Thus, in this example, flows within the RUBE Inner Boiler would be prioritized to ensure that the more restrictive temperature subrange is achieved, by way of directing the least-heated working fluid to the higher-priority temperature-sensitive devices first (e.g., one or more processors as described in this example), and to the lowest-priority, non-temperature sensitive devices last. If there are multiple, significantly differing temperature ranges among the devices, those with the highest maximum ranges are placed last within their category (e.g., a non-temperature-sensitive device with an upper operating limit of 70° C. would receive working fluid before another non-temperature-sensitive device with an upper operating limit of 100° C.), so that the working fluid can absorb maximal heat energy (without endangering the corresponding devices) before exiting the RUBE Inner Boiler.

Table 21 illustrates that a power dissipation target of, for example, under 30 watts can only be achieved by holding the processor's maximum case temperature (Tcase) value to 51° C. for processor "B", and 49° C. for processors "A" and "C". This is precisely the primary goal of the RUBE Inner Boiler, which in a preferred embodiment, uses a phase-change working fluid that has a normal boiling point of 34° C. Under increased operating pressure the boiling point can go up somewhat while remaining well under a Tcase of 49° C., and we can use this fact to great advantage when rejecting heat to a warm ambient environment or heat sink (for example, by rejecting heat into the return loop of a chilled water system, which contains water that has already been heated, and thus will be further heated by the SHADOWS FRAME/RUBE system, thereby improving the efficiency of the chilled water system's external cooling devices). The reverse is also true; the boiling point can be reduced if the internal operating pressure is reduced, and we use this fact to increase the temperature delta between the boiling point and the target device temperature.

Furthermore, it is clear that the RUBE Inner Boiler enables any of the processors depicted in Table 21 to be selected (and still meet the example's "under-30-watt" goal), which means that lower cost devices can be used without penalty. And finally, while not depicted specifically in this table (which is speed agnostic), it may mean that the highest speed device can be used, if desired, which—in this example—is only available in a commodity part (rather than as a premium-priced, lower-power-dissipation part).

The RUBE Inner Boiler is also a means for recuperating the heat energy dissipated by the relatively high-heat-flux heat-producing devices so that, to the extent practical, it can be converted downstream to usable mechanical and/or electrical energy. In this case, the ability to reject the heat energy to ambient is not a RUBE consideration at all, since RUBE can serve to preheat working fluid for an optional downstream power production system, thereby increasing overall system efficiency.

Basic Fluid Flow Concept

The RUBE Inner Boiler basic fluid flow concept is depicted in FIG. 72. The inner boiler apparatus is colocated with the "hot" surfaces (the surfaces with the largest heat flux) of the most temperature-sensitive "hot" devices and "hottest" of the heat-producing devices, which are so arranged that such placement is possible with a minimum pressure drop, minimum (or otherwise convenient) number of manifolds, or other possibly constraining criteria. In this basic scenario, devices may be differentiated as to whether or not they are within the inner boiler apparatus, or outside of it. Devices within the inner boiler apparatus may be relatively undifferentiated from each other with respect to how the basic flow accounts for any possible temperature sensitivities they may have (i.e., whether one device is more temperature sensitive than other).

In a preferred embodiment, once normal steady-state operation is reached, working fluid vapor may be expelled through outlet 325 and little or no liquid is present. Liquid working fluid is forced into liquid inlet 324, where it is equitably distributed within the manifold chamber 342 and 343 to each heat exchanger's 326 inlet check valve 330, which it can then enter, since the working fluid is under pressure.

For each heat exchanger 326, once the working fluid passes the corresponding inlet check valve 330, it enters the volume 344 enclosing heat exchanger 326, where it circulates among the heat exchanger's fins, pins, or other heat exchange surfaces 327 (see FIG. 71B), possibly with the aid of optional flow-directing baffles 345. Depending on the then-current temperature and pressure, the working fluid may acquire heat energy, causing all or part of it to evaporate.

In a preferred embodiment, such as for electronics thermal stabilization applications, the working fluid may be an organic dielectric fluid with a boiling point between 20° C. and 40° C., such as 1-methoxy-heptafluoropropane ($C_3F_7OCH_3$). Other working fluids may also be suitable, some examples of which are listed in section 10.3. In a preferred embodiment, the working fluid expands substantially when heated and vaporizes easily. Since the inlet between 343 and 344 is check-valved, this expansion greatly pressurizes the volume 344 enclosing the heat exchanger 326, and the working fluid is expelled through the optional outlet check-valve 330 (where it makes its way via outlet manifold chambers 346 and 347 to outlet 325), thereby creating a partial vacuum within the volume 344 enclosing heat exchanger 326 (which helps to pull in more liquid working fluid). The hotter the system gets, the higher the pressure at which it can operate due to thermodynamically induced motive forces, up to the maximum desired target temperature of the various heat-producing devices, or the maximum allowable enclosure pressure, or the useful upper limit of the working fluid, whichever is most constraining.

Advanced Fluid Flow Concept

The inner boiler apparatus is colocated with the "hot" surfaces (the surfaces with the largest heat flux) of the most temperature-sensitive "hot" devices and the "hottest" of the heat-producing devices, which are so arranged that such placement is possible with a minimum (or otherwise convenient) number of manifolds.

In keeping with the primary goal of driving the temperature-sensitive devices toward a specific temperature threshold, the internal routes of the working fluid may be configured to encounter these devices prior to encountering the non-temperature-sensitive devices.

In a preferred embodiment, partly depicted in FIG. 73, the inner boiler apparatus is oriented vertically (although it is depicted horizontally here, for convenience) such that both the liquid inlet 324 and vapor and liquid outlet 325 are at the top. This allows gravity to aid in the flow of working fluid to temperature-sensitive components, and takes advantage of natural upwardly motive forces due to vapor escaping the hotter, non-temperature-sensitive components. It works similarly to the embodiment of FIG. 72, but with extra manifold chambers 348, 349, and 350 between devices at different operating temperatures.

In a preferred embodiment, once normal steady-state operation is reached, working fluid liquid and vapor may be expelled through outlet 325 and little or no liquid may be present. Liquid working fluid is forced into liquid inlet 324, where it is equitably distributed to the most heat-sensitive components as described in the Basic Fluid Flow Concept for FIG. 72 (represented by the upper half of FIG. 73), up to the point where the working fluid exits the volume 344 enclosing the heat exchanger 326. At that point the working fluid is expelled through the optional outlet check-valve 330 (where it makes its way via interior manifold chambers 348, 349, and 350 to the inlet of a downstream heat exchanger), thereby creating a partial vacuum within the volume 344 enclosing the upstream heat exchanger 326 (which helps to pull in more liquid working fluid to the temperature-sensitive component).

The working fluid traverses the interior manifold chamber 349 and 350 to the inlet check valve 330 of a downstream heat exchanger 326 (associated with an even "hotter" or "less temperature-sensitive" component), which it can then enter, since the working fluid is still under pressure.

For each downstream heat exchanger 326, once the working fluid passes the interior chamber 349 and on into the corresponding chamber 350, then into inlet check valve 330, it subsequently enters the downstream volume 344 enclosing heat exchanger 326, where it circulates among the heat exchanger's fins, pins, or other heat exchange surfaces 327 (see FIG. 71B), possibly with the aid of optional flow-directing baffles 345. Depending on the then-current temperature and pressure, the working fluid can acquire heat energy from the even "hotter" or "less temperature-sensitive" component, thus expanding significantly and causing all or part of the fluid to evaporate.

Since the inlet between 350 and 344 is check-valved, this expansion greatly pressurizes the downstream volume 344 enclosing the heat exchanger 326, and the working fluid is expelled through the optional outlet check-valve 330 (where it makes its way via outlet manifold chambers 346 and 347 to outlet 325), thereby creating a partial vacuum within the downstream volume 344 enclosing heat exchanger 326 (which helps to pull in more liquid working fluid). The hotter the system gets, the higher the pressure at which it can operate due to thermodynamically induced motive forces, up to the maximum desired target temperature of the various heat-producing devices, or the maximum allowable enclosure pressure, or the useful upper limit of the working fluid, whichever is most constraining.

In a preferred embodiment, one set of manifolds operates in the 30° C. to 40° C. range for a particular class of heat-producing electronic chips, while another set operates simultaneously in the 90° C. to 110° C. range for a different class of heat-producing electronic chips. The same working fluid is used for both—in fact, the cooler system can "feed" the hotter system (however, this may require a boost in pressure, which may be accomplished externally via pumps, or via the RUBE Vapor Injector, or a combination thereof. See also: Critical Heat Flux, Heat Flux, RUBE, RUBE Double-Boiler, RUBE Vapor Injector.

10.3.3.1 Description of Assembly

In a preferred embodiment, the RUBE Double-Boiler's inner boiler apparatus 305 comprises one or more check-valved manifold chambers 344 (six are depicted in FIG. 71A, FIG. 72, and FIG. 73), each with any number of heat-exchanger seals 329, baseplate heat exchangers 326 (an example is shown, but many commercial off-the-shelf units are suitable, including those with non-rectangular shapes), heat-producing devices (not shown, but typically electronics devices on a PCB 320), and backing/pressure plates to aid in providing clamping force (such as would be placed on the reverse side of a PCB, but also not shown). The check-valved manifold assemblies further comprise a liquid inlet 324, vapor and liquid outlet 325, two-piece injection-molded manifold chamber 305 and 321 with one or more seals between them, an inlet and outlet check-valve pair (either as individual components, or individually constructed as an injection-molded channel with an attached check-valve means such as a ball-and-spring or flapper as depicted by FIG. 71C for each baseplate heat-exchanger 326, and suitable molded-in or otherwise fabricated working fluid flow guides and channels within the two-piece manifold chamber 321.

In a preferred embodiment, each heat exchanger 326 is of a suitable design and construction (in conjunction with the design of the corresponding injection-molded or otherwise fabricated manifold cavity) so as to promote nucleation of an impinging working fluid, and of suitable size and thickness (which may vary among the potentially diverse or otherwise non-homogeneous mix of heat exchangers within the inner boiler apparatus) so that when the manifold assembly is mounted and secured to the PCB or other apparatus containing heat-producing devices, each heat exchanger 326 is pressed directly and firmly against its corresponding heat-producing device, and fully covers the primary high-heat-flux surface of the device.

In an alternate embodiment, fewer check valves are used, possibly omitting either the individual ingress or egress check valves (or both) in favor of a single shared ingress or egress check valve, respectively, or possibly eliminating such valves altogether.

In an alternate embodiment, all or some of the mechanical check valves are substituted with, or augmented by, electrical or electro-mechanical valves (for example, from the class of valves that are similar to those used in fuel injection systems to control flow).

In a preferred embodiment, care is exercised to ensure that all seals in this assembly are compatible with the selected working fluid. In a preferred embodiment, such as for electronics thermal stabilization applications, the working fluid may be an organic dielectric fluid with a boiling point between 20° C. and 40° C., such as 1-methoxy-heptafluoropropane (C3F7OCH3), in which case the seals preferentially comprise EPDM having minimal plasticizer content (ideally zero). Other working fluids may also be suitable, some examples of which are listed in section 10.3, and selection of other such fluids should be accompanied by analysis and selection of fluid-appropriate seal materials. Each heat exchanger seal 329 may be clamped between the two-piece manifold chamber 321 and the heat exchanger 326. In a preferred embodiment, the heat exchanger 326 may be attached to the two-piece injection-molded manifold chamber 321 by suitable screws or other fasteners, using the 4 corner holes 328. In a preferred embodiment, in order to improve reliability and maintainability, and to reduce manufacturing costs, the two-pieces of the manifold chamber 321 may be injection molded out of Black Acetal (Delrin), which allows mass production, and thus economies of scale. In a preferred embodiment, "rapid injection molding" may be used to manufacture low volumes of the manifold chambers 321, in order to reduce costs and lead times.

10.3.3.2 Baseplate Heat Exchanger

In a preferred embodiment, primary heat transfer from hot surfaces or "hot spots" is effected via a baseplate heat-exchanger 326, which is attached to the underlying hot surfaces (e.g., integrated circuit chip packages, or other heat exchange surfaces) by means of an epoxy having the properties of compatibility with any organic solvents that may used during manufacturing, compatibility with the working fluid used during operation, high temperature resistance, resistance to repeated thermal cycling, and exceptionally high thermal conductivity.

In a preferred embodiment, the baseplate heat-exchanger 326 comprises a commodity "water block" baseplate of high quality, such as the CNC-machined C110 copper baseplate that is a component of the commercially available Swiftech (www.Swiftech.com) Apogee GT water block (patent pending), which has a thickness of 3 mm to promote a high surface compliance factor. The commercially available Koolance (www.Koolance.com) family of water blocks may be similarly acceptable. Such water blocks are typically designed using CFD (computational fluid dynamics) to specifically increase surface area, coolant velocity, and surface compliance (with its mating hot surface), while minimizing thermal resistance, pressure drop, and cost.

In an alternative embodiment, a custom baseplate heat-exchanger 326 can be used to achieve specific packaging, heat transfer, weight, cost, availability, manufacturing, or other goals, in accordance with necessary design trade-offs, without diverging from the concept taught here.

In a preferred embodiment, it is desirable to apply special coatings or textures to the baseplate heat-exchanger 326 in order to improve surface area and increase the number of nucleation sites for the phase-change working fluid. In a preferred embodiment, the baseplate is treated by acid etching (such as to achieve a rough 40-60 grit, possibly in combination with other treatments, including those which are mechanical or optical rather than chemical), in order to create a large number of microfeatures on all surfaces, thereby further increasing the surface area available for heat exchange. On the surfaces exposed to phase-change working fluid, this also serves to promote nucleate boiling.

In an electronics application, such as a computing system, the hottest surfaces are typically associated with the electronic chips with the highest transistor counts (CPUs, FPGAs, switches, network interfaces, radios, etc.), and also with various power-handling devices.

In a preferred embodiment with phase-change working fluid both inside and outside the manifold (the manifold and electronics are immersed in it), the working fluid can fill any minute gaps between the hot surfaces and the baseplate, and then boil off, which means that surface compliance is much less important than it would be in a conventional implementation (such as one requiring thermal grease, which is specifically omitted here). Because a preferred baseplate is CNC-machined from copper (and then possibly gold-plated in an alternative embodiment), different thicknesses can easily be created if needed, to accommodate potentially different heights of hot surfaces to be mated with. This allows a fixed manifold profile to be used, with any variability shifted to differing baseplate heights as necessary.

10.3.4 RUBE Vapor Injector

Figure 74:
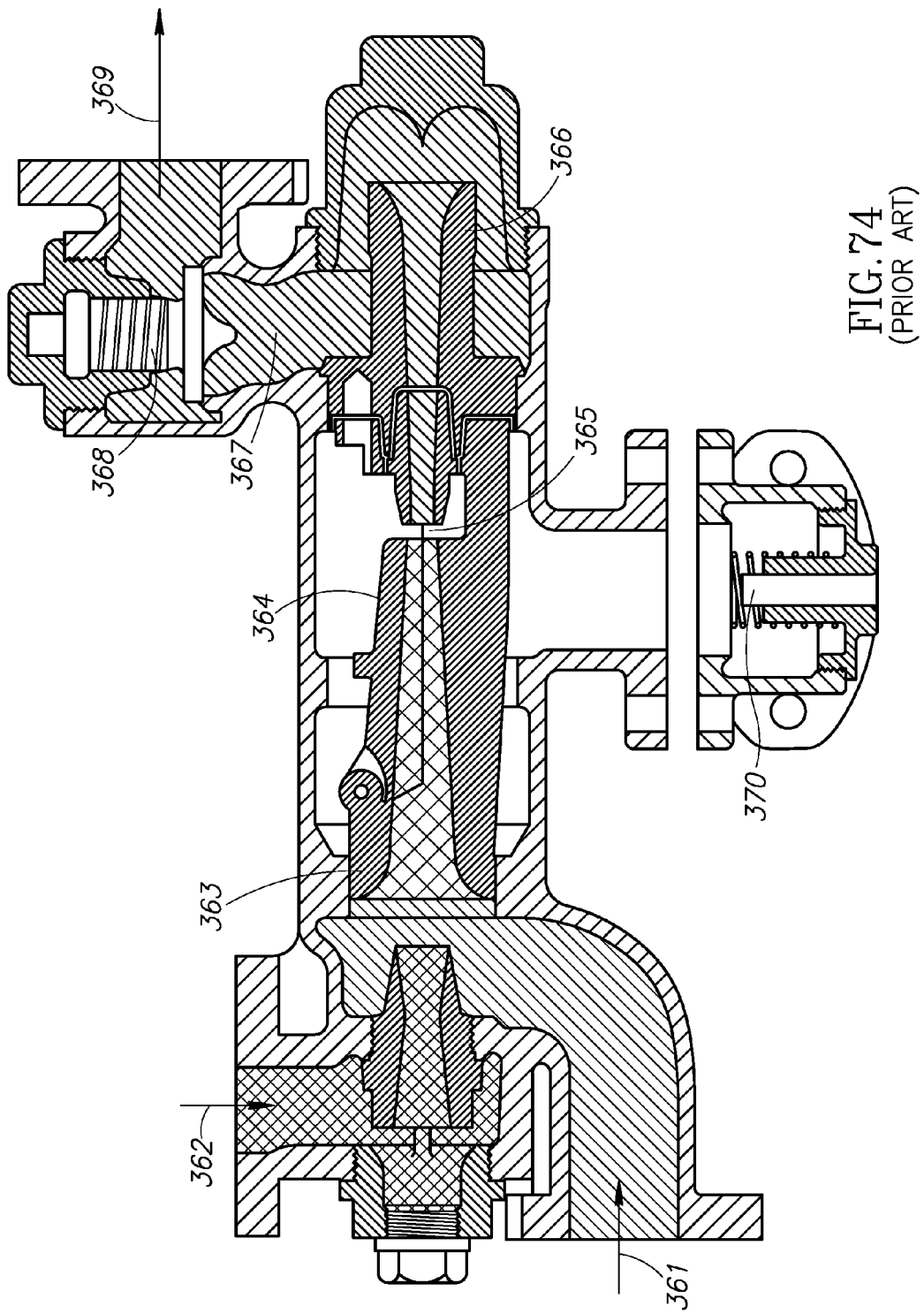

Refer to FIG. 74. Prior Art—Steam Injector Concept

Inspired by the Gifford Steam Injector invented in 1858, a variant of which is depicted in FIG. 74 (PRIOR ART), the RUBE Vapor Injector is a means to: 1) maintain a thermal load (the "boiler") within a desired temperature range, and 2) recuperate as much energy as possible from the heat dissipated by the load, in order to convert the recuperated heat energy into mechanical energy (specifically, pressure energy) that can be used as motive force to reduce or eliminate the energy that would otherwise be needed for circulation pumps in a phase-change heating, cooling, and/or power generation system.

In a preferred embodiment, such as for electronics thermal stabilization applications, the working fluid may be an organic dielectric fluid with a boiling point between 20° C. and 40° C., such as 1-methoxy-heptafluoropropane (C3F7OCH3). Other working fluids may also be suitable, some examples of which are listed in section 10.3. In a preferred embodiment, the working fluid expands substantially when heated and vaporizes easily. See also: RUBE, RUBE Double-Boiler, RUBE Inner Boiler in the glossary.

10.3.4.1 How the RUBE Vapor Injector Differs from Prior Art

Compared to a steam injector (prior art), as generically represented by FIG. 74 (a commercial unit):

The steam injector was designed to operate at high temperatures (e.g., superheated steam, 300° F. to 700° F.+); the RUBE Vapor Injector operates at considerably lower temperatures (e.g., typically from 90° F. saturated vapor up to 250° F. or so for superheated vapor).

The steam injector requires superheated steam; the RUBE Vapor Injector does not.

The steam injector requires an overflow gap; the RUBE Vapor Injector has no overflow gap.

The steam injector requires an overflow valve ("clack valve") and waste pipe; the RUBE Vapor Injector has neither overflow valve nor waste pipe.

The steam injector fails (overflows and vents externally) if conditions are not close to "perfect;" the RUBE Vapor Injector continues to function (possibly suboptimally), no matter what.

The steam injector is designed to vent to the atmosphere; the RUBE Vapor Injector does not vent externally, but rather, is part of a closed-loop system.

The steam injector requires an attending engineer or control mechanism; the RUBE Vapor Injector does not.

Compared to an eductor, ejector, or jet pump ("eductor"):

The eductor has no thermodynamic effect; the RUBE Vapor Injector has primarily thermodynamic effects.

The eductor's primary (only) effect is due to Venturi effect; the RUBE Vapor Injector sees this as a beneficial—but secondary—effect with a relatively minor performance contribution.

The eductor construction must be "tuned" to achieve the Venturi effect at a specific set of pressure and flow parameters, and doesn't work at other settings; the RUBE Vapor Injector functions well over a relatively wider set of parameters, and always beneficially.

10.3.4.2 The RUBE Vapor Injector—Principle of Operation

Figure 75:
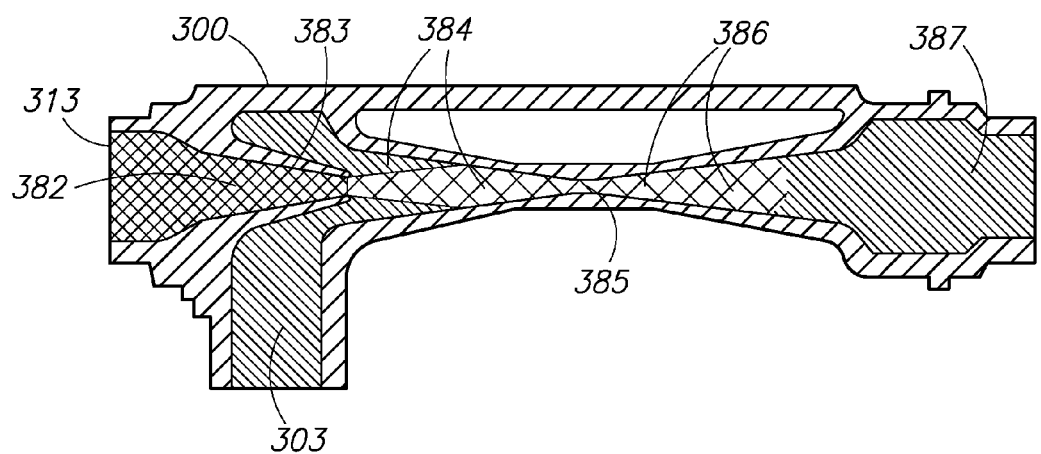

Refer to FIG. 75. The RUBE Vapor Injector—Principle of Operation

In essence, the RUBE Vapor Injector comprises three cones (vapor cone 382, combining cone 384 and delivery cone 386), with a throat or bottleneck 385 between the latter two (but specifically no overflow gap or overflow valve). The idea is to use a jet of working fluid vapor, when available, to augment the flow of working fluid into the boiler, heating it up in the process.

In a preferred embodiment, such as for electronics thermal stabilization applications, the working fluid may be an organic dielectric fluid with a boiling point between 20° C. and 40° C., such as 1-methoxy-heptafluoropropane (C3F7OCH3). Other working fluids may also be suitable, some examples of which are listed in section 10.3. In a preferred embodiment, the working fluid expands substantially when heated and vaporizes easily.

Working fluid (with a boiling point below the desired upper threshold) enters at check-valved liquid inlet 313 (it is initially pumped, but once the process gets going, the working fluid is actually sucked from the inlet 303, due to the thermodynamic effect of the partial vacuum created by condensing vapor in step C, and to a lesser extent, the Venturi effect). Depending on the actual thermodynamic conditions (which in a preferred embodiment, is actively monitored and controlled), the feed pump(s) may continue to operate, but at a reduced load.

Vapor from check-valved vapor inlet 382 enters the converging vapor cone where partial condensation occurs, a partial vacuum is created and pressure energy is converted into velocity (kinetic) energy, resulting in a high velocity jet at the nozzle of vapor cone 383, but with a drop in pressure.

High velocity vapor from the nozzle of the vapor cone 383 enters the converging combining cone 384 where the vapor contacts and thoroughly mixes with liquid working fluid, resulting in a high vacuum as complete condensation occurs. (With a preferred working fluid, such as methoxy-nonafluorobutane, the volume of the vapor is more than 100 times greater (about 116× for methoxy-nonafluorobutane) than the volume of the preferred working fluid from which it was produced, so when condensation occurs in the combining cone 384, vapor returns to liquid with a typical reduction in volume of more than 100:1, resulting in a partial vacuum, which provides suction at liquid inlet 382.)

In combining cone 384 the vapor's kinetic energy is transferred to the liquid which results in a jet of heated liquid rushing through the throat of the combining cone 384 and into the divergent delivery cone 386. Note that, unlike the steam injector depicted in FIG. 74 (PRIOR ART), there is no overflow gap 365, and thus no overflow outlet, or downstream overflow valve 370.

The diverging shape of the delivery cone 386 converts the kinetic energy of the heated liquid into pressure energy that is at least slightly higher than boiler pressure, which traverses delivery pipe 387 and opens the check-valved flow of working fluid for downstream delivery, even against a backpressure.

Disabling conditions such as insufficient vapor speed, imperfect vapor condensation (say, due to overly warm fluid at liquid inlet 313 or an overly hot valve body), cannot occur in the RUBE vapor injector, because its function is to optimize the energy required for pumping, rather than to enable pumping in the first place. On the other hand, the hotter the load becomes, the more efficiently the RUBE vapor injector operates, and the greater "free" motive force it supplies. Working fluid can always be delivered to the delivery outlet 387 if it is supplied at either inlet 303 or 313. Because the RUBE vapor injector requires much less precision than a steam injector, it is expected to be relatively cheaper to manufacture (less precision machining, if any).

10.3.5 RUBE Air-Cooled Subcooler

In a preferred embodiment, a facility that provides air-based equipment cooling (for example, via HVAC ductwork and/or CRAC-cooled raised-floor plenums) connects to the FRAME means directly via an air-cooled RUBE air-cooled subcooler heat-exchanger apparatus. This connection can occur in three different ways:

The RUBE apparatus can reject additional heat into the hot return side of the facility system (increasing overall efficiency) before the air or fluid is actually returned, rather than creating an additional load on the cold supply side of the facility system). In another preferred embodiment, the facility connects to the FRAME means or directly (or indirectly through a heat exchanger) into an embodiment of the STEER apparatus 202 to which an embodiment of the RUBE apparatus 203 is optionally attached.

10.3.6 RUBE Liquid-Cooled Subcooler

Refer to FIG. 60B RUBE/FRAME Interface to Chilled Water System (CWS)

An energy production and/or peak-shaving energy management capability whose goal is to reduce operational costs and enhance or enable survivability. FRAME works by significantly reducing the energy required to operate a heat-dissipating system (such as a computing system), through the recuperative use of energy in general, and by time-shifting the generation and consumption of power to the most effective and/or efficient time-frames.

Typically, the chilled-water system (CWS) 208, is one of three basic designs (constant volume, variable volume with constant evaporator flow, or variable primary flow), but all ultimately provide both a chilled water source and a warm water return. In a typical CWS 208, a chiller cools water to between 40° F. and 45° F. (4° C. and 7° C.). The chilled water is distributed throughout the facility in a piping system and connected to local cooling units as needed. Typically, a CWS-cooled datacenter also distributes chilled underfloor air via raised flooring; in this case the local cooling units may include a number of CRAC (computer room air conditioning) units comprising heat exchangers and air movers; these move air over heat exchanger coils that have chilled water circulating through them, thus chilling the air.

In a preferred embodiment, given a FRAME subsystem (means) operating with an interface to a co-located facility 208 as depicted in FIG. 60A, where the facility is using air conditioning (e.g., CRAC or HVAC) or chilled water for cooling datacenter-like heat loads (e.g., a "post-use" chilled water return temperature of 80° F. to 85° F. or less), the facility can route some portion (possibly all) of its return air or return water directly or indirectly into a FRAME means, as depicted in FIG. 62B.

RUBE Condenser may operate stand-alone (air-cooled) in ambient environments exceeding 100° F.

RUBE Condenser may tap into the return (hot side) of datacenter's chilled water loop, just before it returns to chiller.

RUBE Condenser may normally accept hot water (typically 85° F.) being returned to the chiller as its cold input, and transfer additional heat energy to it (which further raises its temperature and increases chiller efficiency).

RUBE Condenser may connect into both sides (chilled supply & hot return) of a chiller loop (or alternatively, air management system), adaptively using both sides for cooling.

RUBE Condenser may use chilled water (supply-side) only as a backup measure to temper overly hot (>100° F.) return water. Alternatively, any small, reliable, energy-efficient compressor can be used (a Stirling cycle compressor would be used in a preferred embodiment) to increase the temperature and pressure of the RUBE Condenser working fluid enough to reject it into the chilled water system's overly hot return water, in which case no connection to the chilled water supply is required.

In a preferred embodiment, the facility connects to the FRAME apparatus 200 directly via a RUBE heat-exchanger apparatus 203, so that the RUBE apparatus 203 can reject additional heat into the hot return side of the facility system (increasing overall efficiency) before the air or fluid is actually returned, rather than creating an additional load on the cold supply side of the facility system). In another preferred embodiment, the facility connects to the FRAME apparatus 200 or directly (or indirectly through a heat exchanger) into an embodiment of the STEER apparatus 202 to which an embodiment of the RUBE apparatus 203 is optionally attached.

In another preferred embodiment, facilities with roof access or other access to outside air, or with access to a ground loop, can easily reject heat energy while completely avoiding the additional energy cost associated with a CWS or HVAC system 208 (FRAME 200, and specifically, the RUBE apparatus 203, gives up its waste heat at least partially via phase-change, which is thermally efficient since no compressor would be required for ambient temperatures up to 90° F. or more). Of course, where applicable, the waste heat could also be put to good use in other facility heating or preheating applications (hot water heating, snow removal, etc.). The waste heat temperature optionally available from FRAME can be significantly higher (by 10° F. to 30° F. or more) than typical data center waste heat, and therefore may be potentially more useful.

In a facility using CRAC units (or equivalently for this description, centralized air conditioning without chilled water), chilled air is typically forced under a computer room raised floor to where it is needed, with warmed return air moved back to the CRAC unit via a path near the ceiling (in a well-designed system, there may also be hot and cold aisles, but these have no bearing on this description). In a preferred embodiment, the FRAME means is connected to said facility CRAC units in the warm "return-air" path, where the warm air provides a cooling effect that is utilized by the FRAME's RUBE liquid-to-air condenser means, while also raising the average temperature of the air that is actually passed on to said CRAC units. In an alternate preferred embodiment, the FRAME means is connected to the facility CRAC units in the cold-air path, where the air provides a cooling effect that is utilized by the RUBE liquid-to-air condenser, in a manner not unlike typical air-cooled datacenter equipment. In another preferred embodiment, the FRAME means is connected to the facility CRAC units in both the cold-air and warm "return-air" paths, with one or more dynamically controllable dampers that provide selectivity as to which air source path is primary, and to what degree, so as to be capable of accepting control inputs that allow the relative quantities of cooling air directed to the FRAME means, and thereby regulating the temperature of the input air. In a preferred embodiment, said dampers are controlled by the SLAM apparatus 201 depicted in FIG. 60A.

A setup similar to CRAC units can used with the HVAC (Heating, Ventilation, & Air Conditioning) units often deployed in buildings (other than datacenters), except that traditional HVAC systems tend to utilize duct work rather than depending on a raised floor with underfloor air movement. Nonetheless, in a preferred embodiment, the FRAME means is connected to a facility HVAC system with the same set of air source constraints (i.e., warm return air, cold air, or dynamically selectable) as for a system based on one or more CRAC units, but using ductwork rather than underfloor spaces for the cold air supply.

Given a facility that uses a chilled water system (CWS) for cooling, and which optionally also has CRAC units comprising heat exchangers with air movers, in a preferred embodiment the connection of the FRAME means to the air system can be strictly optional, substituting instead a connection to the CWS itself, with the FRAME means emulating a CRAC unit, either directly, or via a liquid-to-liquid heat exchanger.

Given a facility that uses a chilled water system (CWS) 208 for cooling, but which provides only CRAC units comprising heat exchangers with air movers without providing for chilled water distribution to non-CRAC units, in a preferred embodiment the FRAME means to the air system can be strictly optional, substituting instead a connection to the chilled water system itself, either directly, or via a liquid-to-liquid heat exchanger.

Given a facility that uses a CWS for cooling, and has no air movers, said FRAME means connects to the chilled water system itself, either directly, or via a liquid-to-liquid heat exchanger. Typically, the CWS is one of three basic designs:

Constant volume chilled water system

Variable volume chilled water system with constant evaporator flow

Variable primary flow chilled water systems (VPF)

In a preferred embodiment, the FRAME apparatus 200 is connected to the facility CWS units in the warm "return-water" path, where the warm return water provides a cooling effect that is utilized by the FRAME's RUBE condenser means, while also raising the average temperature of the air that is actually passed on to said CRAC units. In an alternate preferred embodiment, the FRAME means is connected to the facility CRAC units in the cold-air path, where the air provides a cooling effect that is utilized by the RUBE condenser, in the same way as typical air-cooled datacenter equipment. In another preferred embodiment, the FRAME means is connected to the facility CRAC units in both the cold-air and warm "return-air" paths, with one or more dynamically controllable dampers that provide selectivity as to which path is primary, and to what degree, so as to regulate the temperature and quantity of cooling air directed to the FRAME means. In a preferred embodiment, said dampers are controlled by the SLAM apparatus 201 depicted in FIG. 60A.

10.4 PERKS—Peak Energy Reserve, Kilowatt-Scale

PERKS is hybrid energy system combining UPS with a peak-shaving system that directly captures excess or low-cost energy from a multiplicity of sources (when it is cheapest or most readily available) and stores it for later reuse, such as during peak periods (when power is most expensive or less available). Unlike a UPS which remains charged "just in case," the PERKS capability continually captures and discharges stored energy "just in time," as needed, so as to reduce the overall energy cost and maximize full-processing availability. Depending on capacity and load, PERKS may also serve as an extended runtime UPS.

External Thermal Exchange/Storage. In a preferred embodiment, thermal energy can be transferred to or from working fluids by pre-heating or pre-chilling them, respectively, at convenient points in time, and storing said fluids into their respective locations, in preparation for their subsequent use (i.e., at a later time).

In a preferred embodiment, relatively "hot" working fluid, preheated or otherwise obtained from a source of relatively low-grade heat (e.g., above 85° C.) can be stored externally in an insulated tank or other low heat-loss storage means 209, and such storage can be connected to the STEER apparatus 202 directly or indirectly via a heat exchanger means, then subsequently used to directly or indirectly supply thermal energy to the FORCE apparatus 205 as a means to help generate electrical power on demand. In a preferred embodiment, an engineered fluid with a relatively low boiling point (e.g., 93° F.) is used as the working fluid for temperatures up to approximately 260° F. In an alternative preferred embodiment, a non-toxic, high-grade, low-vapor-pressure, low-viscosity thermal oil (e.g., such as Paratherm®) is used for thermal energy storage and transfer for fluid temperatures up to approximately 650° F.

In a preferred embodiment, relatively "cold" working fluid, pre-chilled or otherwise obtained from a source of at least low-grade cold (e.g., below 15° C.) can be stored in an insulated tank or other low heat-gain storage means. In a preferred embodiment, an engineered phase-change working fluid is used directly for this, especially if very low temperatures are available to justify the expense (such fluids are often pumpable to below minus 100° C., but are relatively expensive). In an alternative embodiment, a more conventional (and less expensive) water/glycol solution or other suitable fluid is used. In a preferred embodiment, an engineered phase-change working fluid have a very low freezing point (e.g., below minus 100° C.) is stored directly, and maintained at a temperature well below the ambient temperatures anticipated to occur subsequently.

In a preferred embodiment, opportunistic thermal sinks (e.g., cool or cold ambient air, ground loops, liquid tanks, etc.) can be used directly (e.g., as is) or indirectly (by cooling an intermediate working fluid) to subcool or otherwise "pre-cool" working fluids that can be stored in an insulated tank or other low heat-gain storage means, and such storage can be connected to the STEER apparatus 202 directly or via a heat exchanger means, then subsequently used to optimally supply thermal cooling in a low-cost, time-shifted manner. In a preferred embodiment, a combination of ground loops and underground liquid tanks serves not only to optimally supply thermal cooling (by virtue of the intentional subterranean surface area), but also serves as an important storage means.

PERKS As depicted in the context of FIG. 60A, the PERKS apparatus 204 directly captures excess or low-cost energy from a multiplicity of sources (e.g., opportunistically, such as when it is cheapest or most readily available) and stores it for later (i.e., time-shifted) use, such as during peak periods (e.g., when power is relatively more expensive or less available). In a preferred embodiment, to directly capture available electrical energy, batteries based on nano-structured lithium titanate spinel oxide (LTO) electrode materials (which replace the graphite electrode materials found in negative electrodes of conventional Li-Ion batteries) are used, in order to achieve a high capacity battery array with a high cycle life (thousands for full-depth battery charge/discharge cycles), quick charge and discharge without heat issues or out-gassing, and relative insensitivity to ambient temperatures (with no safety issues, and no need to consume energy to control the ambient temperatures seen by the batteries). In an alternative preferred embodiment, zinc-bromine-based flow batteries are used, and these can source warm working fluid and sink both warm working and cool working fluid to maintain the desired electrolyte temperature range. In alternative embodiments, other battery technologies are also feasible, with commensurate enhancements or reductions in specific parameters.

In a preferred embodiment, as depicted in FIG. 60A, the PERKS apparatus 204 typically exchanges working fluids that are relatively warm (at or below the fluid's boiling point, which may be only 93° F. in a preferred embodiment) or cool (i.e., well below the fluid's boiling point, but nowhere near freezing), but these are primarily related to internal operation rather than as sources of thermal energy to be stored. In an alternate embodiment, more extreme temperature ranges (e.g., relatively hot and/or cold) may be accepted, thermally stored, and subsequently delivered, thereby providing an energy reserve in thermal form.

10.4.1 Electrical Power Conditioning and Electrical Energy Storage

Wind energy is another form of solar energy, and often tends to peak during daylight hours (diurnal cycle) due to solar heating, with dips in wind energy at night (nocturnal cycle). Many SUREFIRE sites may be intentionally located where wind energy can be taken advantage of, even if only on a small scale. Wind energy can be used to directly generate electricity for immediate use, and excess electrical energy can be used to charge a PERKS battery array (which can later provide electrical power on demand). Because wind speed is highly variable, wind turbines tend to generate variable-voltage, variable-frequency AC power ("wild AC"), which is subsequently "conditioned" (i.e., rectified to DC, and then optionally inverted back to "stable" AC, with optional voltage and/or phase-changes along the way). All of the power conditioning actions that generate heat must normally viewed as a source of energy loss, and thus, a loss of efficiency.

In the Scrutiny SUREFIRE system, however, most or all of the power conditioning apparatus (such as PERKS 204, described elsewhere) is colocated with (or near) the other electrical loads in the system, so that any generated (and otherwise lost) heat energy associated with power conditioning may be recuperated and reused. For example, whereas the alternators frequently found in turbomachinery and wind turbines typically provide local rectification (i.e., within the alternator itself), in a preferred embodiment remotely located SUREFIRE alternators output only "wild AC," with any necessary rectification taking place within the confines of FRAME energy recapturing apparatus 200. This provides three significant benefits: 1) the alternators are simpler, lighter, and potentially more reliable, 2) the wild AC may typically incur much lower distribution losses than rectified DC, which is especially important for wind turbines atop a tall tower (or otherwise located such that power distribution is a consideration), and 3) the heat energy generated by rectification may be recuperated rather than being lost.

For another example, battery charge/discharge cycles also typically generate heat, and this heat must normally be rejected from the system, while also maintaining battery temperatures within strict limits for optimum life, and ensuring that excessive discharge (e.g., more than 50% discharged, typically) doesn't occur. However, in a preferred embodiment of the PERKS 204 subsystem, a commercially available ZBB (zinc-bromine battery) flow battery array may be colocated with the electrical loads, and the heat energy from its charge/discharge cycles is recuperated. Not only does this conserve energy, but the ZBB array becomes highly tolerant of ambient temperature swings, and by its nature, can be routinely discharged to 0% (i.e., 100% discharged) without damage. Furthermore, during periods with no charge/discharge activity, heat energy from the various other parts of the system (already described) can be used to maintain, for "free", a thermal stable environment for the ZBB array, whose electrolyte freezes at 10° C. (50° F.), and which operates best in the temperature range 26° C. (80° F.) to 32° C. (90° F.), with an absolute operating range of 21° C. (70° F.) minimum to 49° C. (120° F.) maximum. In a preferred embodiment, thermal stability of temperature-sensitive battery array is maintained by via thermal and sensory interfaces to STEER apparatus 202, in order to recuperate and redirect heat energy by sourcing or sinking it as appropriate.

The PERKS subsystem 204 uses the power from the SCRAM 207 subsystem's multi-rail redundant AC power supplies to charge batteries when everything is fine (i.e., when power is available and failures are not excessive), thereby requiring no additional capacity.

10.5 FORCE—Frictionless Organic Rankine Cycle Engine

As depicted in FIG. 60A, the FORCE apparatus 205 is a kilowatt-scale (e.g., 0.5 KW to 50 KW) modified Rankine cycle heat engine that may comprise the following in some combination: electrical energy sources, fuel or chemical energy sources, thermal energy sources, low-temperature/low-pressure vapor turbines, generators or alternators, heaters, working fluids (including at least one appropriate organic working fluid for two-phase liquid/vapor operation), heat exchangers (including, for example, vaporizers, superheaters, recuperators, desuperheaters, heaters, preheaters, dehumidifiers, condensers, and subcoolers), insulation, reflectors, sensors, valves, manifolds, pumps, miscellaneous plumbing apparatus, etc.

In a preferred embodiment, the FORCE apparatus 205 may interface with the SLAM apparatus 201 depicted in FIG. 60A for some or all of its control and/or sensory inputs and outputs.

In a preferred embodiment, the FORCE apparatus 205 may interface with the STEER apparatus 202 depicted in FIG. 60A for some or all of its working fluid inputs and outputs, where said working fluids provide a controllable means for thermal energy exchange. In a preferred embodiment, the FORCE apparatus 205 may interface and integrate with the STEER apparatus 202 depicted in FIG. 60A for some or all of the internal connectivity (i.e., the working fluid inputs and outputs among its internal subsystems), where said working fluids provide a controllable means for thermal energy exchange. In an alternative preferred embodiment (i.e., not involving the STEER apparatus 202 depicted in FIG. 60A), the FORCE apparatus 205 may interface directly or indirectly to the various apparatus depicted in FIG. 60A for some or all of its working fluid inputs and outputs, where said working fluids provide a controllable means for thermal energy exchange (not depicted).

In a preferred embodiment, the FORCE apparatus 205 may interface with the PERKS apparatus 204 depicted in FIG. 60A for some or all of its electrical energy fuel inputs and outputs and/or chemical energy (e.g., fuel) inputs. In an alternative preferred embodiment, the FORCE apparatus 205 may interface with the SCRAM apparatus 207 depicted in FIG. 60A for some or all of its electrical energy outputs (not depicted).

In a preferred embodiment, a primary object of the FORCE apparatus 205 is to convert externally supplied electrical energy, chemical energy (e.g., one or more types of fuel), and/or thermal energy (e.g., heat contained in some type of working fluid) into electrical energy and/or thermal energy that may then be provided as an output to other subsystems. In a preferred embodiment, said electrical energy may be output directly to the PERKS apparatus 204 for subsequent further conversion, storage, and/or distribution. In a preferred embodiment, high-quality thermal energy may be provided as an output in addition to, or in lieu of, electrical energy. In a preferred embodiment, said thermal energy may be output to the STEER apparatus 202 for subsequent further transport, conversion, storage, and/or distribution.

In a preferred embodiment, the FORCE apparatus 205 depicted in FIG. 60A may comprise closed-loop thermodynamic circuits involving a single phase-change working fluid that may be interchanged among the various subsystems of the FRAME apparatus depicted in FIG. 60A. In a preferred embodiment, such as when FORCE is integrates with electronics thermal stabilization applications, the working fluid may be an organic dielectric fluid with a boiling point between 20° C. and 40° C., such as 1-methoxy-heptafluoropropane ($C_3F_7OCH_3$). Other working fluids may also be suitable, some examples of which are listed in section 10.3. In a preferred embodiment, the working fluid expands substantially when heated and vaporizes easily.

In a preferred embodiment, the FORCE apparatus 205 depicted in FIG. 60A may be augmented with additional closed-loop thermodynamic circuits involving one or more non-phase-change working fluids that may be interchanged among selected subsystems of the FRAME apparatus depicted in FIG. 60A. In a preferred embodiment, one said non-phase-change working fluid may be a thermal oil with a low vapor pressure (e.g., less than 5 PSIA) within a full operational temperature range of, for example, 49° C. (120° F.) to 315° C. (600° F.), such as commercially available Paratherm NF® heat transfer fluid (available from Paratherm Corp., 4 Portland Road, West Conshohocken Pa. 19428 USA).

10.5.1 FORCE Turboalternator

In a preferred embodiment, the vapor turbine and generator or alternator may be combined into a single turboalternator or turbogenerator unit (hereafter referred to as a "turboalternator" for simplicity)—an integrated unit comprising a turbine and a generator-or-alternator, such that the combination shares a common direct-drive shaft (i.e., the turbine shares the same shaft with the alternator or generator, forcing them to spin together).

In a preferred embodiment, said turboalternator may be constructed so as to have only one moving part, that being the shared shaft, such that during operation the shared shaft may rotate at an essentially constant ("fixed") rate in the range of 50,000 to 250,000 RPM, and during said rotation may float hydrodynamically on a vapor layer created by its foils, thus implementing quasi-frictionless "vapor bearings" or "gas bearings" that may need no lubrication or maintenance (wear occurs only during spin-up and spin-down, such as when the rotational speed drops below a particular physical threshold, that may be, for example, equivalent to 3% of its normal fixed rate, at which point the foils of the turboalternator may begin to incur friction). In a preferred embodiment, said turboalternator may be designed and constructed, using techniques known to those skilled in the art, so as to enable on the order of 25,000 to 50,000 spin-up/spin-down cycles without maintenance, and an operating life on the order of 100,000 hours (more than 11 years of continuous operation).

In a preferred embodiment, the turbine portion of said turboalternator may be of the radial inflow type, specifically designed, using techniques known to those skilled in the art, so as to work well with a selection from among the preferred superheated working fluids, preferred inlet temperatures (e.g., 120° C. to 160° C.), and preferred pressure ranges (e.g., 3 bar to 8 bar), and with an electrical load range appropriate for the intended purpose, such that the characterizations of both the design point and selected "off-design" points may be known, and such that the relationship between inlet pressure and output power may be sufficiently understood, so as to enable proper control.

In a preferred embodiment, said turboalternator may be designed to operate at a specific, fixed rotational rate subrange within an overall range of 50,000 to 250,000 RPM, while allowing both the differential pressure (i.e., the difference between inlet pressure and outlet pressure) and the electrical load to vary under external control, as long as the fixed rotational rate within said subrange is maintained (i.e., a control function may be required so that, for example, if the electrical load is reduced, then the differential pressure may also be reduced (e.g., by reducing the inlet pressure, as is common practice), in order to ensure that the specified fixed rotational rate range is not exceeded). In a preferred embodiment, the differential pressure may be reduced by some combination of decreasing the inlet pressure and/or increasing the outlet pressure (e.g., by creating backpressure downstream of the turboalternator outlet), thereby increasing the range of external control options available. Referring to FIG. 60A, in a preferred embodiment said external control may be provided by a combination of the SLAM apparatus 201 and the STEER apparatus 202.

In a preferred embodiment, the system may comprise a multiplicity of said turboalternators, having the same, similar, or widely differing capacities, so that a control function within the system of which said turboalternators are a part may dynamically reconfigure and control said turboalternators in order to meet the needs of said system at a point in time. Referring to FIG. 60A, in a preferred embodiment said control function may be provided by a combination of the SLAM apparatus 201 and the STEER apparatus 202.

In a preferred embodiment, a family of turboalternators (hereafter "turboalternator family") may be designed and constructed to accept a variable set of working fluids with a range of compatible properties. In a preferred embodiment, said turboalternator family may be optimally designed for organic working fluids, and most preferentially an organic dielectric fluid with a relatively low boiling point between, for example, 20° C. and 40° C., such as 1-methoxy-heptafluoropropane ($C_3F_7OCH_3$). Other suitable working fluids may include, for example, $C_5F_{12}$, $C_6F_{14}$, $C_4F_9OCH_3$, $C_4F_9CH_3$, $C_4F_9OC_2H_5$, $C_4F_9C_5H_5$, and $CCl_2FCH_3$, as well as others, and may also include combinations of said fluids, some of which may not be organic dielectric fluids having boiling points within the exemplary range.

In an alternative embodiment, said turboalternator family members may be constructed at low cost by using off-the-shelf radial turbine and bearings means (for example, by repurposing a suitable mass-produced refrigerator compressor turbine and operating it in reverse such that it effectively becomes a radial inflow turbine). In said alternative embodiment, the availability of suitable components may severely constrain the turboalternator design and construction of said family members, especially with respect to performance, efficiency, cycle life, and runtime.

In a preferred embodiment, said turboalternator family comprises a set of relatively miniature "nanoturbine" turboalternator units at the 10 KW, 1.5 KW, and 500-watt electrical output design points (many other design points are possible, including both much larger and much smaller power outputs, and may be selected according to intended use), operating with a common design-point inlet temperature of 125° C., an outlet temperature exceeding 100° C., an inlet pressure of approximately 6 bar (87 PSIA), and an outlet pressure of approximately 1 bar (14.5 PSIA), with overall efficiency (i.e., that being the product of adiabatic efficiency, mechanical efficiency, and alternator or generator efficiency) typically greater than 60%. (Note: We use the "nanoturbine" label to denote a class of turbine machinery that is quantitatively smaller than the turbine machinery commonly referred to as "microturbines," rather than to denote the class of still smaller turbine machines that one might fabricate by integrating mechanical elements, sensors, actuators, and electronics on a common silicon substrate, using microfabrication technology commonly referred to as MEMS (Micro-Electro-Mechanical Systems). To maintain a monotonically decreasing machine class nomenclature, a MEMS-based machine would most probably be referred to as a "picoturbine," which is the label used herein. The mass flow rates, outlet temperatures, rotational speeds, and relative outputs at off-design points (e.g., at 5 bar, 4 bar, etc.) may vary widely among the family members, due to their inherent differences in electrical output and anticipated loads; Table 22 provides an approximate cross-family characterization that may be achieved for said preferred embodiment, at said design points.

TABLE 22

FORCE Turboalternator Family Differences for a Preferred Embodiment

| | | | |
|---|---|---|---|
| Approx. Output at 6 bar: | 10 KW | 1.5 KW | 0.5 KW |
| Approximate Mass flow: | 600 g/s | 100 g/s | 35 g/s |
| Approximate RPM: | >60,000 | >60,000 | 100,000 |

In a preferred embodiment, said turboalternator families may output alternating current (AC) rather than rectifying it to direct current (DC), thereby avoiding rectification when AC is an acceptable output (and also avoiding, in this case, an unnecessary, energy-wasting conversion), or enabling rectification to occur remotely or at some distance from the turboalternator (for example, in order to simplify recapturing of waste heat energy from rectification). In a preferred embodiment, said turboalternator families output single-phase "wild AC," or alternating current (AC) voltage where neither the voltage nor the current is constant; but for a given AC frequency, both the voltage and current may vary from one power output level to another. For example, as the power output increases, the current may increase while the voltage decreases, as is depicted in Table 23 for one of the members of said turboalternator family. In said embodiment, the output frequency (e.g., 1000 Hz) may be a direct consequence of, and therefore as stable as (i.e., as constant as) the turboalternator's actual rotational rate (e.g., 50,000 RPM). In an alternative preferred embodiment, an AC-to-DC rectification circuit may be co-located with, or attached to, the turboalternator.

TABLE 23

FORCE Turboalternator Family - Examples of "Wild AC" Electrical Outputs

| | Power | Voltage | Current |
|---|---|---|---|
| At Design Point: | 100% | 84% | 100% |
| At Off-Design Point #1: | 92% | 85% | 91% |
| At Off-Design Point #2: | 58% | 89% | 55% |
| At Off-Design Point #3: | 30% | 92% | 27% |
| At Off-Design Point #4: | 0% | 100% | 0% |

In an alternative preferred embodiment, a turboalternator family may be constructed using (e.g., by using known MEMS microfabrication techniques in conjunction with known turbomachinery design principles) that comprises a set of quantitatively smaller "picoturbine" turboalternator units at the 10-watt, 1.5-watt, and 500 milliwatt electrical output design points (many other design points are possible, and may be selected according to intended use), operating with a common design-point inlet temperature of 125° C., outlet temperature exceeding 100° C., inlet pressure of up to 8 bar (116 PSIA), and outlet pressure of 1 bar (14.5 PSIA). (Note: We use the "picoturbine" label to denote a class of turbine machinery that is quantitatively smaller than the turbine machinery we refer to as "nanoturbines.")

10.5.2 FORCE Post-Turboalternator Recuperator

The FORCE Post-Turboalternator Recuperator (hereafter, simply "recuperator" when unambiguous) is a counter-current heat exchanger whose purpose is to recuperate the thermal energy remaining in the still-superheated working fluid after an upstream turboalternator has reduced the pressure of said fluid. The temperature of the fluid at the recuperator's inlet is effectively equal to the temperature of the fluid at the turboalternator's outlet.

In the art, the turbine component of a turboalternator is modeled as an adiabatic process (i.e., one in which no heat is gained or lost by the system) that accomplishes work by converting a pressure differential into mechanical energy (which the alternator/generator component subsequently converts into electrical energy). However, in the real world, "adiabatic" process efficiency is less than 100%, so some heat may be lost, and this partly accounts for a difference in the working fluid temperatures between the turbine's inlet and outlet, with the outlet seeing a reduced temperature. In a preferred embodiment, the turboalternator family described in 10.5.1 may have a common inlet temperature of approximately 125° C. (257° F.) and an outlet temperature of approximately 100° C. (212° F.) or more, which may subsequently be the lowest temperature at the recuperator's inlet.

In a preferred embodiment, the recuperator accepts a superheated working fluid in approximately the 100° C. (212° F.) to 125° C. (257° F.) temperature range as the "hot stream" to be cooled, and accepts working fluid in liquid and/or saturated vapor form in approximately the 20° C. (68° F.) to 40° C. (104° F.) temperature range as the "cold stream" to be heated.

In a preferred embodiment, such as for electronics thermal stabilization applications, the working fluid may be an organic dielectric fluid with a boiling point between 20° C. and 40° C., such as 1-methoxy-heptafluoropropane (C3F7OCH3). Other working fluids may also be suitable, some examples of which are listed in section 10.3. In a preferred embodiment, the working fluid expands substantially when heated and vaporizes easily.

In a preferred embodiment, said hot and cold streams use the same type of working fluid and are intentionally part of the same circuit, thus enabling the convenient mixing of streams to accomplish specific objectives. In an alternative preferred embodiment, said hot and cold streams use the same type of working fluid, but are not part of the same circuit (i.e., the hot and cold streams cannot mix under normal circumstances).

In a preferred embodiment, a flat-plate heat exchanger with adequate surface area and not excessive pressure drop may be used to implement a FORCE Post-Turboalternator Recuperator. In an alternative embodiment, some other fluid-compatible heat exchanger with adequate surface area and not excessive pressure drop may be used.

FORCE The FORCE apparatus 205 is a kilowatt-scale (e.g., 0.5 KW to 50 KW) turboalternator means (e.g., one or more differential pressure "heat engines" with mechanically coupled alternators or generators) and heat source means—designed and configured such that it can accept relatively low-temperature (e.g., 95° C. to 130° C.), low-pressure (e.g., 3-8 bar) working fluid (e.g., in a preferred embodiment, from the STEER apparatus 202) in order to generate electrical power (in a preferred embodiment, the output is "wild AC"). In a preferred embodiment, the slightly cooled (e.g., by 20° C. to 30° C.), pressure-reduced (e.g., to 1-bar) working fluid is returned to the STEER apparatus 202, where it can be mixed and/or redistributed where needed in order to efficiently recuperate its residual heat energy. In an alternative embodiment, the slightly cooled working fluid is routed through a heat exchanger means in order to reject unwanted heat energy to another system, or to the ambient environment, etc.

In a preferred embodiment involving the FORCE nanoturbine system 205, a multiplicity of nanoturbines may be used when the total heat energy available exceeds the capacity of a single unit, and/or to achieve a specific level of redundancy (e.g., in order to achieve an availability threshold).

In alternative preferred embodiment, the FORCE nanoturbine system 205 indicated above can be combined (e.g., in a fixed configuration, or dynamically via the STEER apparatus) with one or more FPSE (Free Piston Stirling Engine) devices, such that waste heat still present in the nanoturbine outlet stream is captured and used to heat one or more FPSE devices (which convert the heat to mechanical energy and can therefore do useful work, including the generation of electricity). In yet another alternative embodiment, one or more FPSE devices take the place of single or multiple FORCE nanoturbine devices as described above.

10.6 SOLAR—Self-Orienting Light-Aggregating Receiver

SOLAR™. Self-Orienting Light-Aggregating Receiver. In a preferred embodiment, a system using a relatively low-temperature phase-change working fluid to receive heat energy from the sun for immediate use (in which case it acts as a "boiler") or subsequent use, and especially for the primary purpose of generating electricity. In an alternative embodiment, a system using a relatively low-vapor-pressure working fluid (for example, an appropriate Paratherm thermal oil) to receive heat energy from the sun for immediate or subsequent use. The heat energy in this context refers to energy that can be immediately used immediately (or stored for later use) to effect or help effect a liquid/vapor phase-change, such as occurs, by design, in a "boiler." Received energy heats and expands the phase-change working fluid (which may have been preheated via RUBE, above), and which, in conjunction with optional vapor injection (see RUBE Vapor Injector, described elsewhere) in the "boiler" feed circuit, and in conjunction with a FORCE nanoturbine or FPSE (Free Piston Stirling Engine) in the "boiler" output circuit, can be used to accomplish work, and particularly, to generate electricity.

SOLAR The SOLAR apparatus 206 comprises some combination of means for tracking and/or concentrating solar energy and directing it to a receiver means where it is collected and converted to thermal energy and transferred to a working fluid. In a preferred embodiment, the SOLAR apparatus 206 may also comprise a STEER apparatus 202 interface for accepting and delivering working fluid to one or more companion subsystems (e.g., the RUBE apparatus 203, or FORCE apparatus 205, etc.).

In an alternate preferred embodiment, a means such as the FORCE apparatus 205, or a subset of it, may be co-located with (and possibly connected directly to) the SOLAR apparatus 206 in order to directly generate electrical power without the potential thermal energy losses associated with transporting working fluid. In another preferred embodiment, the SOLAR apparatus 206 may comprise some combination of concentrating and non-concentrating photo-voltaic (PV) means for generating electrical power, accompanied by a means for recuperating thermal energy from said PV means (and while also beneficially reducing the operating temperature of the PV means). In a preferred embodiment, the means for recuperating thermal energy from said PV means may be provided by incorporating a RUBE recuperator assembly 203 into the SOLAR apparatus 206. In still another preferred embodiment, one or more, and possibly all, of the aforementioned energy capture and power generation means may be present, allowing for dynamic reconfiguration and repurposing of the energy collection means and maximum flexibility in the generation and distribution of power from said energy. In a preferred embodiment, the SOLAR apparatus 206 may also comprise a thermal energy dissipation device or apparatus (e.g., a radiator or heat exchanger) for dissipating thermal energy (e.g., through radiation, convection, and/or conduction) to the environment. In a preferred embodiment, said thermal dissipation device or apparatus may take advantage of exposed metallic surfaces associated with the SOLAR apparatus 206. In a preferred embodiment, said exposed metallic surfaces may include multi-use surfaces capable of providing an optically reflective and/or light-concentrating surface on one side, and dissipative and/or physically protective surface on the other side. In a preferred embodiment, the SOLAR apparatus 206 may comprise a means for reorienting said multi-use surfaces such that at least one configuration may protect the solar energy receiver while enabling simultaneous thermal energy dissipation. In a preferred embodiment, the SOLAR apparatus 206 comprises a means for reorienting said multi-use surfaces such that one configuration may track the sun while reflecting and concentrating solar energy onto a receiver means, while also still enabling thermal energy dissipation.

10.6.1 SOLAR Parabolic Dish for Concentrating Solar Power—Back-of-the-Envelope Calculations In a preferred embodiment, each SHADOWS site—and to a lesser extent, any arbitrary datacenter—is equipped with one or more SHADOWS SOLAR concentrating solar power systems, in order to increase survivability, and to decrease dependence on fuel reserves during off-grid operation.

The sun occupies 32 minutes of arc (i.e., approximately 0.53 degrees) and is not a point source. The sun's 0.53 degree source is a good match for a 2.4 meter (8-foot) parabolic dish having an aperture area of 4.5 m2 (i.e., (pi*(1.2 m)2)=4.5 m2, approximately) and a 3 db beamwidth of 0.71° (C-band).

If such a dish is covered with (or composed of) a highly reflective material (in the optical sense) and used as a parabolic solar reflector, this corresponds to a theoretical maximum of about 4.5 KW of collectible solar energy (given a solar insolation of 1000 W/m2 and a tracking system to keep the dish "on sun"). The 2.4M dish is the largest low-cost one-piece dish available. Larger dishes are disproportionately more expensive, both in CAPEX (capital expense) and OPEX (operational expense), and require significant labor and logistics just to handle them. (Of course, a multiplicity of smaller, low-cost dishes could also be used, such as the 24-inch diameter polished aluminum dishes from Edmunds Scientific).

Normally the aperture opening where the feedhorn would be (if the parabolic dish were used as an antenna) is around 1 inch (2.54 cm) in diameter for a 2.4M dish, corresponding to a focal area of about 5.08 cm2 (0.000508 m2). This is corresponds to a solar concentration ratio of almost 9,000 suns ((4.5−0.000508)/0.000508=8,857). The maximum solar concentration feasible with today's most advanced concentrator PV cells is about 1000 suns, so we would need to defocus to a concentration of "only" 1000 suns. In a preferred embodiment, defocusing would be achieved partly (probably mostly) by moving the receiver away from the focal point (and away from the dish, for our purposes), and in an alternative embodiment, partly by using a highly reflective (97.4%) material that is slightly diffuse (e.g., spacesuit material, which is reflective but does not have a mirror finish).

In another alternative preferred embodiment, a Cassegrain reflector apparatus is used, where each parabolic reflector is accompanied by an hyperbolic subreflector at the focus point, which reflects back through an opening in the center of the parabolic reflector, and directs light onto the concentrator PV cells and other apparatus (cooling, etc.) situated behind into the parabolic reflector. Depending on the materials used for the hyperbolic subreflector, and the precision and quality of finish, it could be sized to approximate the natural focal area of the parabolic dish (in which case it would need to efficiently reflect a solar flux of almost 9,000 suns), or in a preferred embodiment would be sized (and shaped) to be slightly defocused, so as to reflect a solar flux approximately equal to, or slightly greater than, the maximum solar flux to be handled by the concentrator PV cells (allowing for "oversplash," which is discussed further below), after taking into account the hyperbolic subreflector efficiency. In a preferred embodiment, the hyperbolic subreflector is highly polished, but mass-produced, and would likely become extremely hot (i.e., beyond the melting point of the subreflector) without active cooling—therefore, in such an embodiment, the subreflector would be treated as an intended receiver of heat energy, and active cooling would be achieved by transferring the heat energy to an intermediate heat transfer fluid (described further below).

Assuming that we defocus to 1000 suns, the defocused "hot spot" area must be approximately equal to S (m2), where:

$(4.5-S)/S ==1000$ $=>4.5-S=(1000*S) \mathrm{m}^2$ $=>4.5=(1000*S)+S \mathrm{m}^2$ $=>4.5=1001*S \mathrm{m}^2$ =>$S=4.5/1001\ m^2$ =>$S=0.004496\ m^2$ =>$S\sim0.0045\ m^2$ =>$S\sim 45\ cm^2$(which corresponds to a circular approximately 3 inches in diameter)

At a solar insolation of 1000 W/m^2 (or about 100 W/cm^2), Spectrolab's Improved Triple-Junction (ITJ) PV cells, for example, are estimated to achieve an efficiency of at least 28%, or 28 W/cm^2. Ignoring reflector efficiency for now, with a cell area of 45 cm^2 this corresponds to 1260 W of direct PV-generated power (28*45=1260). Most of the remaining solar energy (100%–28% leaves about 72%) is either absorbed by the PV cells or reflected from the PV cells and absorbed by the enclosing receiver's "black body" interior. Either way, this leaves about 3240 W of collected heat energy (4500 W–1260 W=3240 W) that must be removed from the receiver via a heat transfer fluid. Spectrolab's ITJ PV cells can operate at 1000 suns only if they're on a ceramic substrate that is actively cooled to around 105° C. (221° F.) or less, which can be trivially accomplished via liquid cooling and rejecting the waste heat to the air or into a ground loop, or to some other heat sink. Note: Some concentrating PV cells are maximally efficient at other intensities (e.g., 500 suns), and the effect is that of reducing intensity is to allow further defocusing, which creates a large area (possibly allowing more cells), but also possibly reducing their cooling requirements. It is typically not possible to direct concentrated light onto "only" the PV cells—and any such "oversplashed" light causes local heating wherever it touches, so in a preferred embodiment, a high-quality black body is used as a secondary receiver of heat energy, in order to capture it for downstream use.

In a preferred embodiment, however, the waste heat from the PV system above (and, in the case of an embodiment having an actively cooled Cassegrain subreflector, any heat the subreflector produces via absorption and transfer to a working fluid) is used to directly or indirectly drive a FORCE nanoturbine 205, as part of an integration of the SHADOWS supercomputing system or other heat-producing subsystem(s) with our local power generation capability.

A preferred embodiment comprises a combination of said PV system with a FORCE low-temperature closed-loop nanoturbine system), along with a supercomputing or other heat-producing subsystem(s) whose waste heat serves to preheats and partly or completely vaporizes the phase-change working fluid. In a preferred embodiment, the working fluid may be an organic dielectric fluid with a boiling point between 20° C. and 40° C., such as 1-methoxy-heptafluoro-propane (C3F7OCH3). Other working fluids may also be suitable, some examples of which are listed in section 10.3. In a preferred embodiment, the working fluid expands substantially when heated and vaporizes easily.

The hotter the various component parts of the system can be allowed to get, the higher the pressure at which the thermal system can operate, up to the maximum desired pressure (in a preferred embodiment based on the FORCE nanoturbine, the maximum desired pressure is that which is required as the turbine's inlet pressure, which is only 3 to 6 bar) and/or target temperature of the heat-producing devices, or the useful upper limit of the working fluid, whichever is lower. In a preferred embodiment, one or more sets of RUBE "manifolds" (described elsewhere) in the supercomputer or other heat-producing subsystem(s) preferably operates in the 30° C. to 40° C. range for a particular class of heat-producing electronic chips (in order to maximize reliability and minimize the power dissipation that occurs due to "leaky" transistors as such chips approach their maximum TDP temperatures, the avoidance of which requires maintaining Tcase well below that), while another set operates simultaneously (and safely) in the 90° C. to 110° C. range for a different class of heat-producing electronic chips (the PV devices described fall into the latter range, along with certain power supply components and other devices). Any waste heat captured from the "oversplash" of concentrated light is expected to be below 130° C. if the preferred phase-change fluid is used, and possibly well above that if an intermediate heat transport fluid is used. In a preferred embodiment, the same working fluid is used for all three temperature ranges—in fact, the cooler system can "feed" the hotter systems (however, this would typically require a boost in inlet pressure for the downstream "hotter" systems, which can be accomplished externally via pumps, or via the RUBE Vapor Injector (described elsewhere).

In a preferred embodiment of our low-temperature closed-loop FORCE nanoturbine system, we can either use the phase-change working fluid directly to cool the PV cells to 105° C. or less, or we can use an intermediate heat transfer/transport fluid with a very low vapor pressure (for example, a thermal oil such as Paratherm®) to transport the heat to a point where it can be transferred to the phase-change fluid via a heat exchanger. The choice of fluids (and whether to use an intermediate heat transport fluid) is largely driven by the proximity of the FORCE nanoturbine to the PV cells. In a preferred embodiment, the PV cells, FORCE nanoturbine, and power-consuming/heat-producing subsystem(s) are all colocated, and no intermediate heat transport fluid is necessary for heating. In an alternative embodiment, an intermediate fluid is used to actively cool the PV cells to 105° C. (221° F.) or less while heating the intermediate heat transport fluid to around 93° C. (200° F.), and then using it to preheat and/or "boil" the phase-change working fluid for the nanoturbine system. The intermediate heat transport fluid may be used immediately and/or stored thermally for later use, depending on the volume available, the operational status of the FORCE nanoturbine system, immediate electrical power demand, etc. Normally, however, the intermediate heat transport fluid is supplied directly to the FORCE nanoturbine (which, in a preferred embodiment is colocated with the SOLAR collector apparatus), thereby eliminating the energy loss that would occur if the nanoturbine were located further away.

Depending on the temperature of the "cold source" (e.g., cooling water or other intermediate heat transport fluid, which could range, for example, from 24° C. (55° F.) down to −18° C. (0° F.), or lower, according to climate, season, etc.), the Carnot efficiency of the nanoturbine ranges from a typical 24% to an infrequent 34% or more. Thus, ignoring SOLAR collector efficiency for now, and also ignoring energy recuperated elsewhere in the system, the typical nanoturbine power available from a single 2.4-meter solar reflector dish would range from ~775 W (24% of 3240 W) to ~1100 W (34% of 3240 W). However, for each solar reflector that generates heat from the sun there is also an electrical load that generates heat, and in a preferred embodiment this heat is collected and used to preheat the working fluid supplied to the PV cells. As a consequence, at least 2200 W per reflector must be added to the energy provided to the nanoturbine system, raising the pre-Carnot figures from 3240 W to 5740 W (3240+2500=5740). Recalculating the theoretical nanoturbine output based solely on Carnot efficiency yields a range of ~1375 W (24% of 5740 W) to ~1950 W (34% of 5740 W).

10.6.2 Non-Concentrating Solar Power Considerations

Operating principles similar to those described in section 10.6.1 also hold for simpler, non-concentrating PV arrays, and to a lesser extent, for non-PV arrays. To the extent such systems are not self-orienting (i.e., sun-tracking), they typically must be oriented toward the equator and angled to match the latitude, plus or minus a few degrees. From a SHADOWS viewpoint, two key considerations are that:

1) Due to their non-concentrating nature, and therefore lower efficiency per square foot of collector area, such array tend to be much larger than their concentrating (e.g., SOLAR) counterparts, and therefore may require more sun-facing area than is readily available (or affordable).

2) Due to their size (relative to a SOLAR/BLOOMER dish array, for example) such arrays may not be able to be easily protected from weather and other external risks.

Heat absorption can be an issue for non-concentrating PV arrays, since they tend to operate more efficiently at cooler temperatures, and in any case, the absorption of heat implies wasted energy. Depending on the specifics of a particular non-concentrating PV array, and the importance of collecting energy relative to the cost of doing so, active cooling based on FRAME/RUBE technology may be very appropriate.

Non-PV solar arrays are designed specifically to collect heat energy, and thus fit quite naturally with FRAME/RUBE technology. Depending on the availability of adequate space for a non-PV solar array, integration with FRAME/RUBE technology may be very appropriate.

10.6.3 SOLAR Parabolic Dish for Concentrating Solar Power—Candidate Phase-Change Working Fluids

| PROPERTIES | C3F7OCH3 | n-Pentane | Fluorinert® FC-72 |
|---|---|---|---|
| Boiling Point | 34° C. | 36° C. | 50-60 (56)° C. |
| Pour Point | −122.5° C. | −130° C. | −90° C. |
| K Viscosity (cs) | 0.32 @ 25° C. | — | 0.42 @ 20° C. |
| Abs Viscosity (cp) | 0.47 | — | 0.64 |
| Vap. Pressure (PSI) | 7.8 @ 20° C. | 8.28 @ 20° C. | 4.5 @ 20° C. |
| Density (kg/m3) | 1400@ 25° C. | 624@ 25° C. | 1680@ 25° C. |
| Specific Gravity | 1.6 | 0.626 | 1.7 |
| Mol. Weight (g/mol) | 200 | 72.2 @ 25° C. | |
| Spec. Heat (J/(kg ° C.)) | 1300 | 1668 | 1100 |
| Heat of Vap.@BP (J/g) | 142 | — | 88 |
| Dielec. Strength (kV) | ~40 | — | 38 |
| Flash Point | N/A | −49° C. | N/A |
| Flammability | Nonflammable | Highly Flammable | Nonflammable |

(Note: Flash point is an indication of the combustibility of the vapors of a substance, and is defined as the lowest temperature at which the vapor can be ignited under specified conditions. Flash point is clearly related to safety.)

10.6.4 FORCE Nanoturbine Considerations

Assuming maximum insolation, and ignoring reflector inefficiency (and other system inefficiencies) for now, the maximum total power available from a single solar reflector, including recuperation of energy from its corresponding load, is in the range of ~2635 W (1260+1375) to ~3210 W (1260+1950). Thus, during periods of high insolation, a single reflector provides slightly more power than its corresponding 2500 W load, with a system efficiency in the range of 58% (2635/4500) to 71% (3210/4500). Excess electrical energy is used to charge a commercially available battery array (for example, a zinc-bromine battery array), which can then provide power on demand—both peak-shaving and backup power when it cannot be otherwise generated.

Energy storage, whether thermal or electrical, is an important part of the SUREFIRE concept. However, even during periods of high insolation, a single solar reflector doesn't provide enough excess capacity for storage (except to provide ride-through for passing clouds, etc.). In general, each 2500 W continuous load requires at least a second solar reflector dish, nanoturbine, etc. By associating a FORCE nanoturbine with a solar reflector, it is simple to scale out the power capacity on a plug-and-play basis, making it easy to provide excess daytime/good weather capacity that can be stored for later use. Even when there is no sunshine, the heat collected from electrical loads can be stored thermally for later use, and/or used to pre-heat an intermediate heat transport fluid, a portion of which is subsequently heated (as necessary) by a fuel-fired boiler (e.g., such as one that burns fuel, whether renewable or not), and then used to vaporize the selected phase-change working fluid that feeds the FORCE nanoturbine.

Figure 76A:
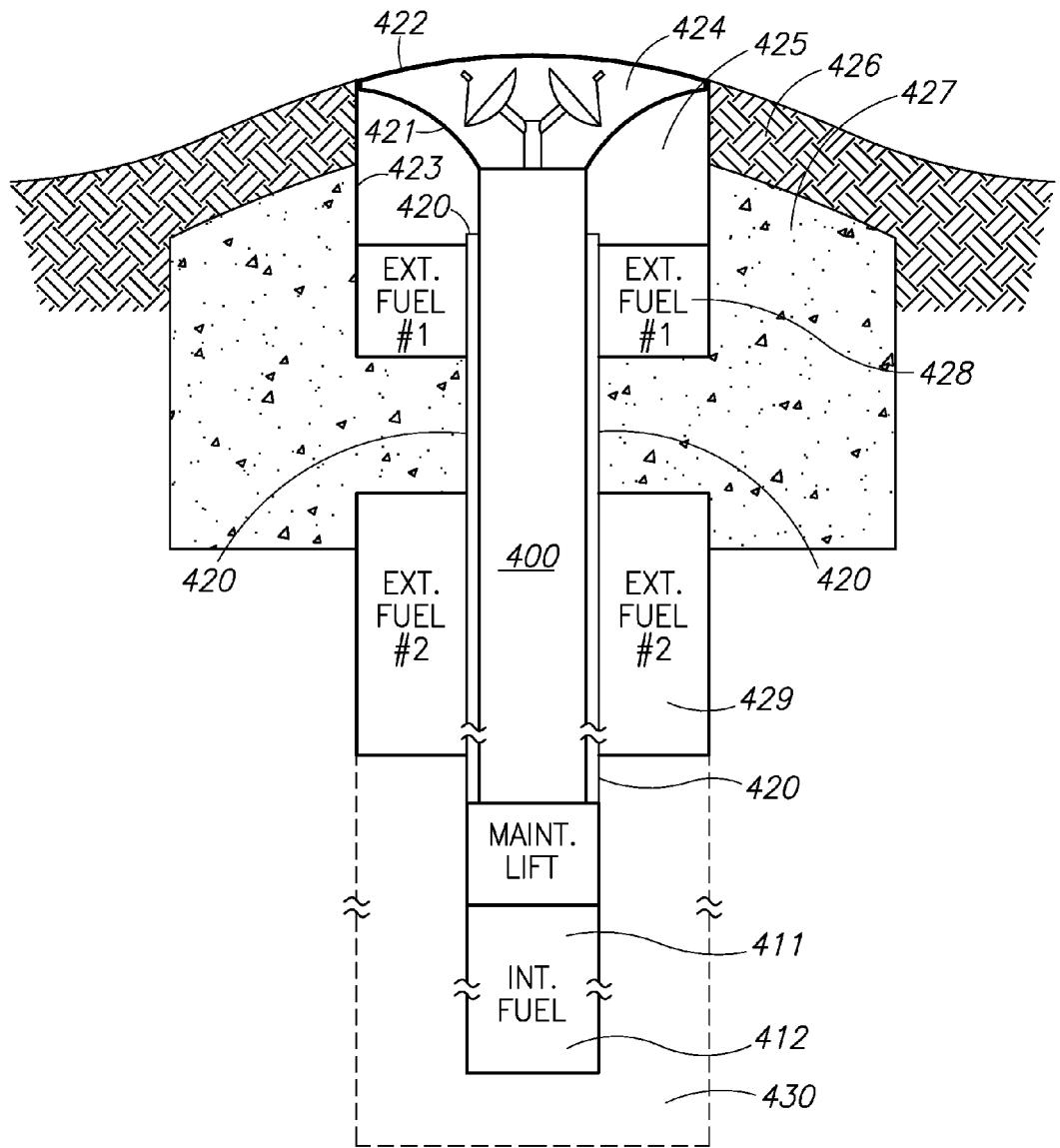

11 SUREFIRE—Survivable Unmanned Renewably Energized Facility & Independent Reconfigurable Environment Refer to FIGS. 76A & B. SUREFIRE Mini-Silo—Unmanned Underground Supercomputing Refer to FIG. 77. SUREFIRE—Unmanned Single-Level Underground Vault (Alternate Embodiment)

The are numerous SUREFIRE site configurations possible, in order to provide the basis of meeting a diverse set of needs. In general, technologies taught in one example configuration are implicitly applicable to the others. The three exemplary configurations described, each with its own unique properties, are:

SUREFIRE Mini-Silo (a preferred embodiment)
SUREFIRE Single-Level Underground Vault (an alternate embodiment)
SUREFIRE Multi-Level Underground Vault (an alternate embodiment)

11.1 SUREFIRE Mini-Silo

Figure 76B:
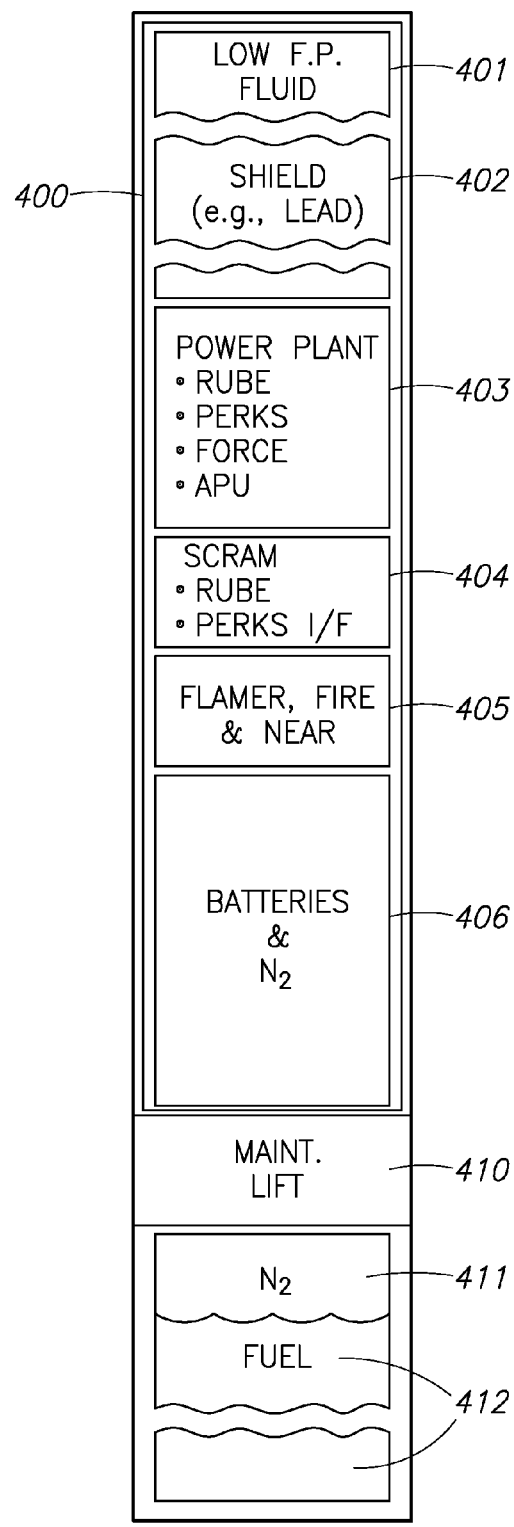
Figure 76C:
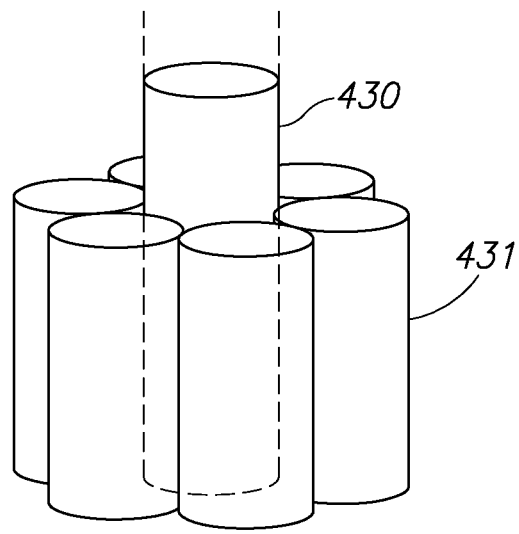

A preferred embodiment for housing a single SCRAM machine is an underground mini-silo as depicted in FIG. 76A, FIG. 76B, and FIG. 76C. The SCRAM machine is contained within the telescopic cylinder 400 in FIG. 76A, and specifically within area 404 as depicted in FIG. 76B. The SUREFIRE Mini-Silo is a preferred embodiment, because by design its minimal configuration would enjoy the lowest cost of the three example configurations if deployed in volume, which would enable affordable, widespread deployment. The packaging of all of its major components is tailored especially to a silo configuration (a cylindrical shape approximately 3 feet in diameter). The SUREFIRE Mini-Silo can be configured to support various levels of performance in the 0.5 TFLOPS to 10 TFLOPS range, per silo. It may be optionally co-located with an expendable tower such as the LISTEN monopole 500 described in 13.1 and depicted in FIG. 86 (which see).

As depicted in FIG. 76A, the mini-silo's externally visible footprint is due to the radome top 422. In a preferred embodiment, the radome 422 and sub-radome wall 421 have a maximum diameter of approximately 8 to 10 feet and are constructed of a combat composite having the significant properties of radio-transparency, sufficient strength to withstand both positive and negative high pressures (F5 tornadoes, passing waves from nuclear blasts, etc.). The radome 422 material of FIG. 76A has the same specifications as the radome surface 605 material in FIG. 118 (which see), and is similarly resistant to high-velocity ammunition, cutting torches, etc. The specific radome dimensions, including the resultant size and volume of the antenna bay 424, are somewhat antenna dependent. FIG. 76A depicts the radome as being at ground level when closed (within an earth berm 426 in this example), but the radome 422 is attached to the top of telescopic silo assembly 400, and may thus be elevated above ground level (by the maintenance lift equipment 410 depicted directly below assembly 400 in FIG. 76B) for service if required. An internal fuel tank 412, approximately 3 feet in diameter and of arbitrary height, is situated directly below the maintenance lift 410. The fuel capacity of internal tank 412 is somewhat more than 52 gallons per vertical foot. In a preferred embodiment, a pressurized nitrogen blanket 411 occupies the void created as the tank is emptied, in order to maintain a nearly oxygen-free environment for the selected fuel.

Figure 76D:
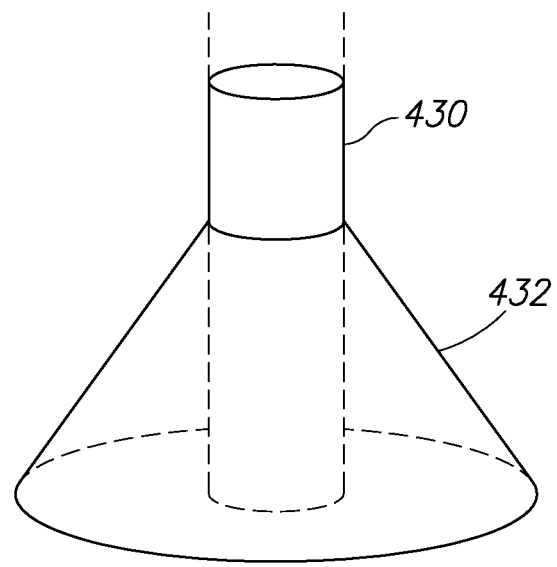

A pair of cylindrical steel shells 420 and 423 provide the main fixed in-ground assembly, which includes an upper donut-shaped external fuel tank 428, all of which is set in reinforced concrete. In a preferred embodiment, donut-shaped fuel tank 428 (also labeled as EXT. FUEL #1) is about 18 inches in height, 8 feet in diameter, with a 3-foot diameter "donut hole" for the silo apparatus 400 to pass through. If attacked successfully, fuel tank 428 will yield at most 500 gallons of fuel. A second external fuel tank 429 (also labeled as EXT. FUEL #2) is of arbitrary height, 8 feet in diameter, with a 3-foot diameter "donut hole" for the silo apparatus to pass through (for the vertical portion of tank 429 that overlaps the 3-foot diameter silo area). External tank 429 has a fuel capacity of at least 325 gallons per vertical foot. As depicted in FIG. 76A, the portion 430 of EXT. FUEL #2 that extends deeper than the bottom of internal fuel tank 412, if any, has no donut-hole pass-through and thus has an even higher fuel capacity of at least 375 gallons per vertical foot. FIG. 76C and FIG. 76D depict additional external storage 431 and 432, respectively, that may be clustered underground around tank 430 for arbitrarily increased capacity. All of the fuel tanks may be pressured with nitrogen blankets, and the same or different fuels may be stored in the different tanks 412, 428, and 429/430, 431 and/or 432.

FIG. 76B depicts the major subsystems of silo apparatus 400. As depicted, a reservoir of low freezing point fluid 401 occupies the uppermost area, with the area 402 directly below area 401 comprising various shielding mechanisms. A multifuel power plant 403 is situated at the next level down, and includes a number of the FRAME 200 subsystems described in FIG. 60A (e.g., RUBE 203, PERKS 204, and FORCE 205), in order to recuperate energy and minimize the use of fuel. The SCRAM supercomputing area 404 includes RUBE 203 and interfaces to RUBE 204, in order to recuperate waste heat generated by SCRAM 207. The network switching and router (FLAMERouter) gear is located in area 405 directly below the SCRAM module 404, and is not unlike FLAMERouter described in section 8.4. Area 405 also contains the various data storage devices and mechanisms (e.g., FIREdrives, and NEARdrives, as described in sections 8.5 and 8.6, respectively). The area 406 just above the maintenance lift 410 is where an array of high-capacity, high-cycle life batteries is kept, along with nitrogen bottles for pressuring fuel tanks with a nitrogen blanket.

11.2 SUREFIRE Single-Level Underground Vault

Figure 77:
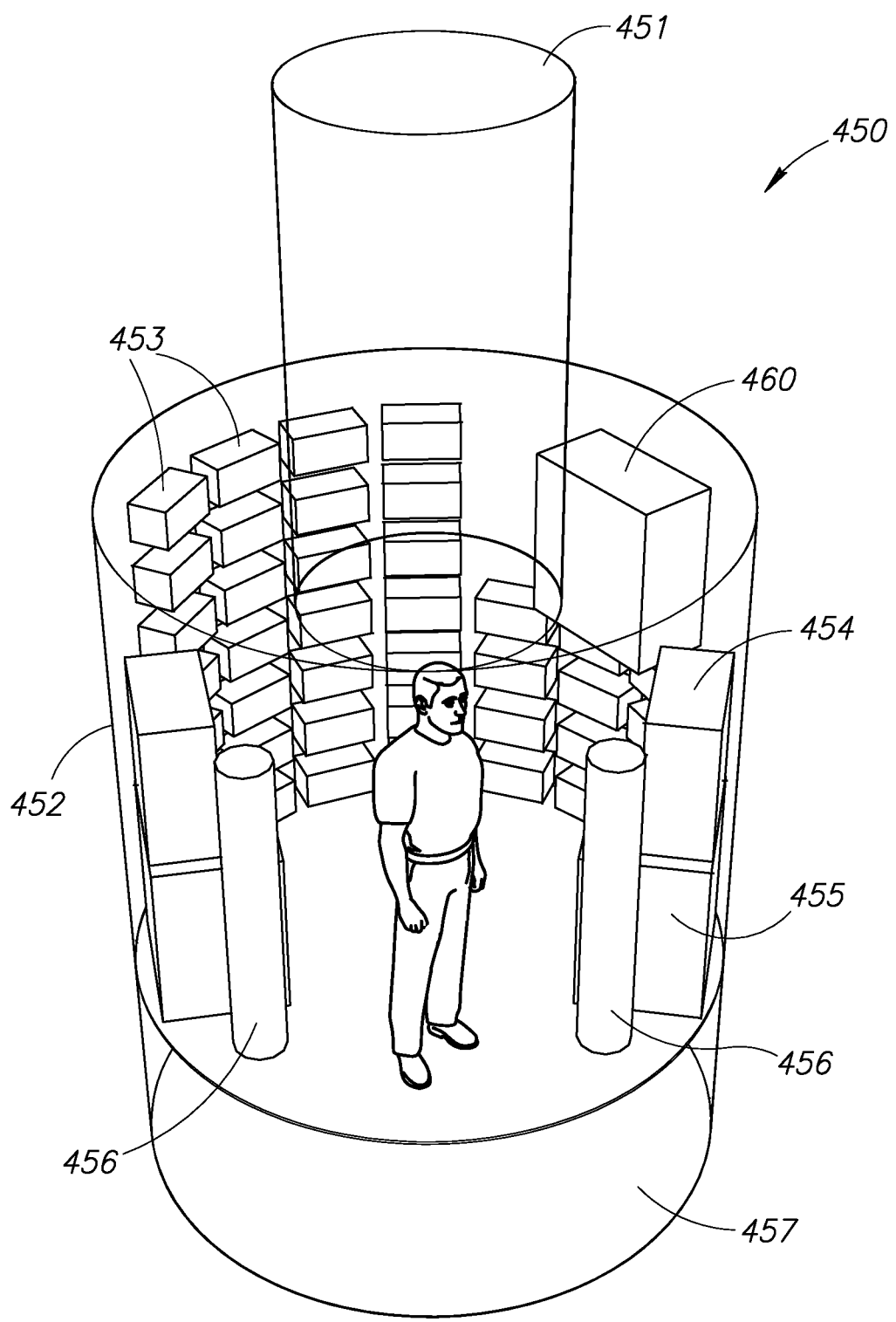
FIG. 77. SUREFIRE—Unmanned Single-Level Underground Vault (Alternate Embodiment)

The SUREFIRE Single-Level Underground Vault depicted in FIG. 77 is an alternate embodiment—a larger diameter silo—that may be affordably produced in fairly low quantities (relative to the SUREFIRE Mini-Silo), and is able to accommodate a higher degree of conventional equipment than the SUREFIRE Mini-Silo. The SUREFIRE Single-Level Underground Vault is especially well-suited to supercomputing accompanied by significant radio communications (the silo itself serves as the base for relatively lightweight communications towers such as the expendable LISTEN monopole 500 described in 13.1 and depicted in FIG. 86). The SUREFIRE Single-Level Underground Vault can be configured to support various levels of performance in the 0.5 TFLOPS to 10 TFLOPS range, per silo.

The simple unmanned underground vault depicted in FIG. 77 has a nominal fuel capacity of 2000+ gallons of biofuel (e.g., B100), but can easily be extended to 20,000 gallons or more (the bio-oil storage capacity needs to be extended by approximately the same factor, say, to 300 gallons). The fuel capacity limitation has little to do with storage (which can easily be extended further), and is mostly tied to the predicted unattended lifetime of the generation equipment, which in this case is anticipated to limit the need for fuel to about 20,000 gallons. Assuming an off-grid or dead-grid situation with no help from external renewable energy sources (i.e., no-wind and no-sun—such as could occur in a possible "nuclear winter" scenario), the nominal fuel capacity of 2000+ gallons would allow for four months of full-power operation, and more than 3 years in low-power mode supporting communications and relatively little computing. Intermediate power modes, of course, have other run times.

On reason that this embodiment is an alternate, rather than preferred, is because the fueled power generation capability is based on a redundant pair of small, modified liquid-cooled diesel engines, and although they are very durable, they suffer from the normal wear factors associated with diesel engines.

In a preferred embodiment, the fuel is B100 (100% biodiesel, such as per ASTM D6751-06b, January 2007), which has high lubricity and many general other beneficial properties (including being less toxic than table salt, non-polluting, biodegradable, and safe to handle). Since fuels like diesel and B100 are generally not stored for longer than 6 months, special care must be taken to ensure their longevity. In a preferred embodiment, the B100 is never exposed to oxygen from the point of its manufacture (which includes the addition of a special antioxidant) to delivery and storage (where the tanks are maintained with a nitrogen blanket). Sufficient nitrogen is on site to maintain the nitrogen blanket as the fuel is expended. If and when the site is replenished with fuel, the nitrogen must be replenished as well.

In order to run the diesel engines unattended, they are modified to be self-oiling, from a relatively large reservoir (30 gallons of bio-oil for 2000 gallons of stored fuel, and proportionately more for large fuel storage capacities). The oil in the engines never needs to be changed, because as the lubricating bio-oil is pumped through the engines, a tiny portion of it is continuously bled off and injected into the fuel feed. The bleed-off/injection-rate is high enough to approximate an aggressive oil-change regimen, and low enough that the oil injected into the fuel feed causes no combustion issues. Note that the bio-oil actually increases the site's fuel capacity somewhat, since the oil is combusted along with the fuel. If and when the site is replenished with fuel, the bio-oil must be replenished as well.

The air filtration system is also modified, so that a high level of external air contaminants is assumed for a period of time (after which the level return to more normal values), and so that the filtration area is sufficient to approximate an aggressive filter-change regimen, for a period that corresponds to the maximum run time for the given supply of fuel. Depending on the source of external air contaminants, and whether they can be detected or predicted, the site's control logic can simply opt to not run the generator for a period of time, until the air clears (the site can drop to a 0.5 TFLOPS rate and run on battery power alone for 24 hours or more). If and when the site is replenished with fuel, the air filtration must be replenished as well.

The diesel generators' liquid cooling systems are modified to use the biofuel itself as the coolant, so no extra storage for coolant is required. The fuel from the main fuel storage is pulled into a local storage loop that is temperature-controlled. The two primary heat sources are the site's electronics and the power-generation equipment. The cold source is the earth itself, which maintains a fairly stable temperature in the 45° F. to 65° F. range in the U.S. (depending on latitude) at depths below 10 feet or so. Ground loops (which, in a preferred embodiment may simply be attached to the metal walls of the vault) are used to exhaust actual waste heat. However, before heat energy is considered as waste, it is first used to heat the fuel supply itself to the desired maintenance range. The engine coolant is preferentially circulated first through loops in the fuel tank (and among those, preferentially near the fuel pump feed point, in order to reduce its viscosity, and then those on any "cold" walls of the tank), and then any other ground loops. Once coolant is separated from the stored fuel, it is never again directly mixed with the stored fuel (heating the fuel to 160° F. as engine coolant triggers an eventual degradation of the fuel), so it becomes trapped in the soon-to-be-burned coolant/fuel-supply loop. Since the coolant is burned as fuel, it is replenished from storage at a rate equal to its consumption.

The biofuel can also be used as a secondary working fluid to cool the site's electronics, via a liquid-to-liquid heat exchanger (one liquid is the electronics working fluid, such as C3F7OCH3, and the other side is biofuel, which can be directly circulated from the tank). This has the effect of gently adding heat to the fuel storage, which is designed to continually lose heat to the earth through the exterior walls.

Another reason that the depicted embodiment is an alternate, rather than preferred, is because the battery backup capability (as may be apparent in the figure) is based some combination of several conventional battery technologies, most of which suffer from an inability to tolerate a 100% depth of discharge and a potentially restrictive maximum number of charge/discharge cycles. In a preferred embodiment, the battery backup capability would be based on a large-scale zinc-bromine battery system, which can tolerate 100% depth-of-discharge indefinitely, and thousands of charge/discharge cycles. Other viable alternatives include chemistries based on nickel-zinc, nickel-iron, lithium iron-phosphate, lithium-ion/lithium-polymer, nickel-hydrogen (used in satellites), or silver-zinc.

This type of site, although it is unmanned and unattended, has the potential for intruders, and has extensive identification and authentication controls, and other intrusion prevention features. In the event of intrusion, the DEFEND system provides internal defenses that include (but are not limited to) visual and auditory discomfort, smoke, and non-lethal electrification.

In a preferred embodiment of this type of site, the power system would be based on PERKS, which substitutes heat engines for combustion engines, with significantly increased efficiency, resulting in lower fuel consumption and longer runtime for a given fuel reserve. Note that, to the extent that other power systems are available such as PERKS, in addition to diesel engines, the priority use of heat (both from the electronics and from the diesel engines) is to generate power and do peak shaving via the PERKS heat engines (which can accept waste heat from numerous sources). In this scenario, the only heat put into the fuel storage tank is the minimal heat to be rejected from the heat engines cycles, plus any additional heat needed, if any, to maintain the minimum target fuel storage temperature.

11.3 SUREFIRE Multi-Level Underground Vault

The SUREFIRE Multi-Level Underground Vault is an alternate embodiment—also in a silo configuration—that is likely to require a somewhat substantial level of site engineering and preparation prior to deployment. A typical deployment scenario would be underneath (literally) a commercial-class wind turbine (100 KW or more). While the basic design is straightforward to replicate, its site preparation may not be, due to the facility depth and likely permitting issues. The SUREFIRE Multi-Level Underground Vault can be configured to support various levels of performance in the 2 TFLOPS to 50 TFLOPS range, per silo.

11.3.1 SUREFIRE Colocated with a Wind Turbine (Preferred Embodiment)

Figure 78:
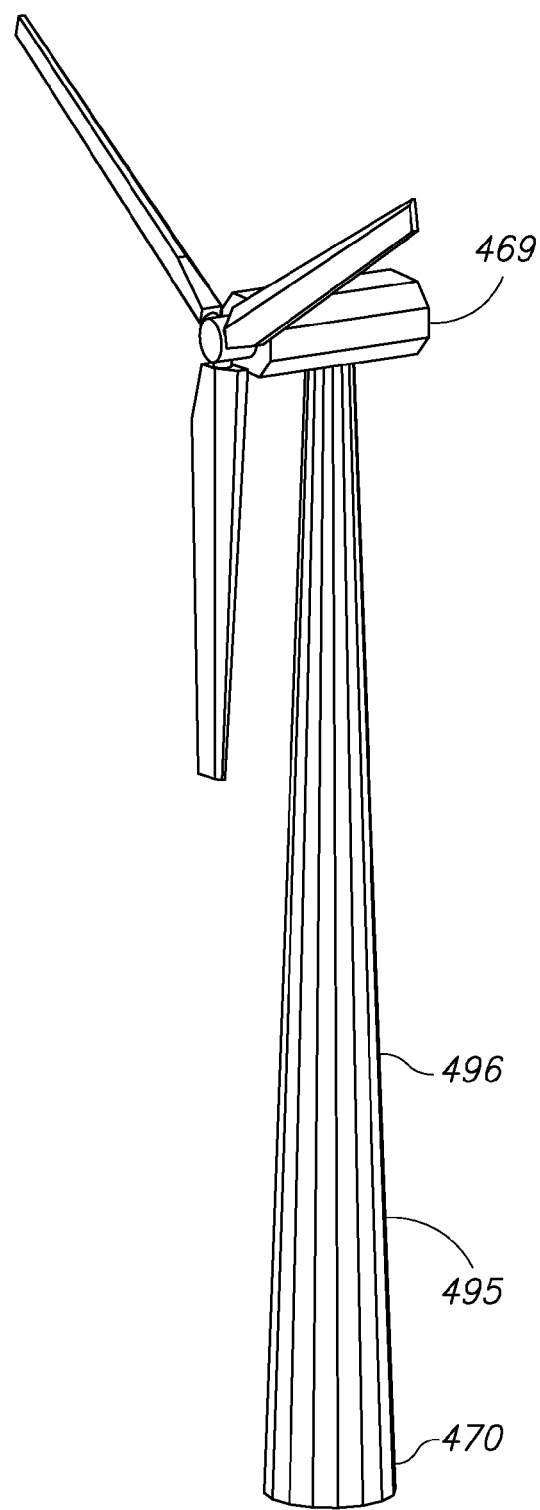
FIG. 78. SUREFIRE Colocated with a Wind Turbine Tower (Exemplary)

Refer to FIG. 78. SUREFIRE Colocated with a Wind Turbine Tower (Exemplary)

Figure 79:
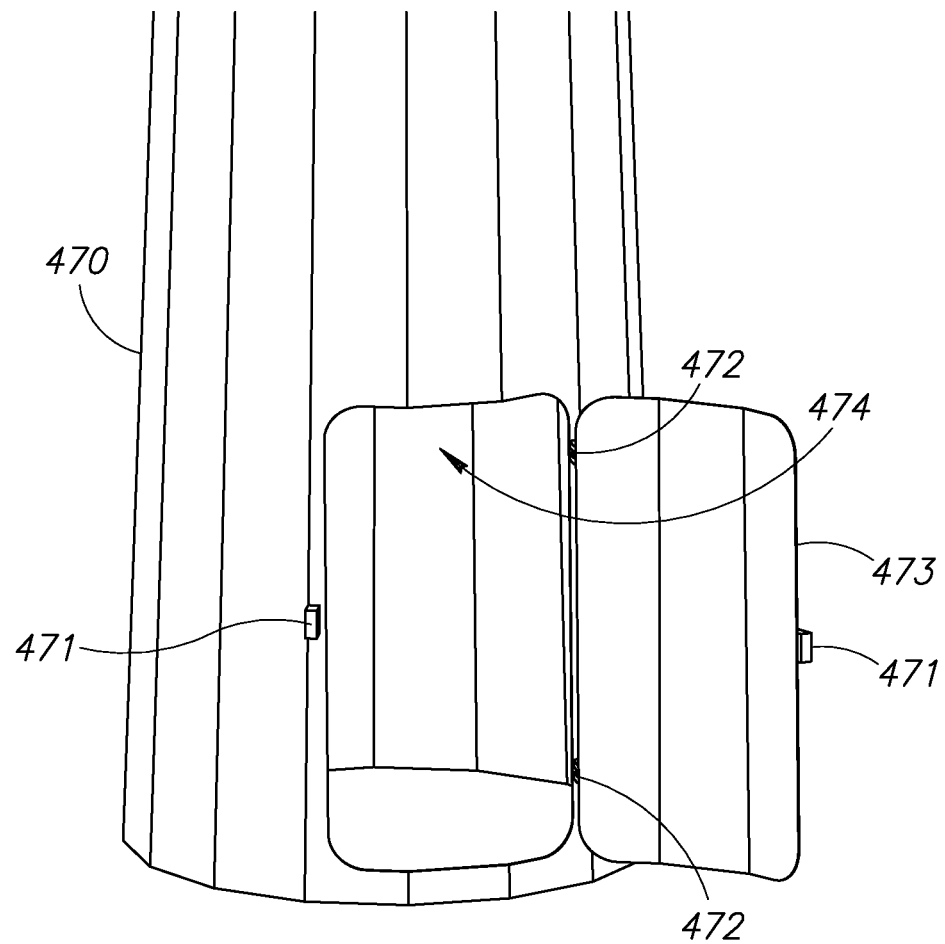
FIG. 79. SUREFIRE 9' Diameter Steel Tower (Exemplary)—Outer Door Open
Figure 80:
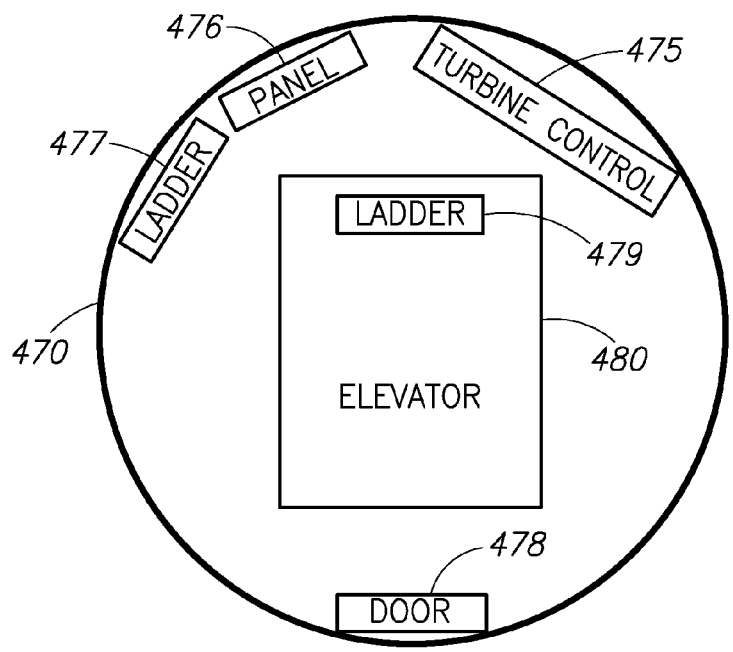
FIG. 80. SUREFIRE Tower—Ground-Level Layout (Preferred Embodiment)

Refer to FIG. 79. SUREFIRE 9' Diameter Steel Tower (Exemplary)—Outer Door Open Refer to FIG. 80. SUREFIRE Tower—Ground-Level Layout (Preferred Embodiment)

Figure 81:
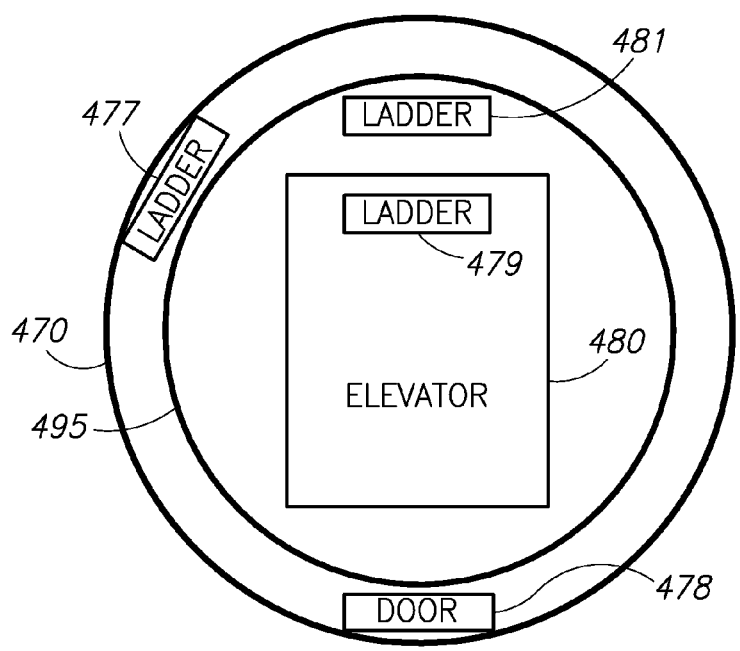
FIG. 81. SUREFIRE Tower—First Upper Level Layout (Preferred Embodiment)

Refer to FIG. 81. SUREFIRE Tower—First Upper Level Layout (Preferred Embodiment)

Figure 82:
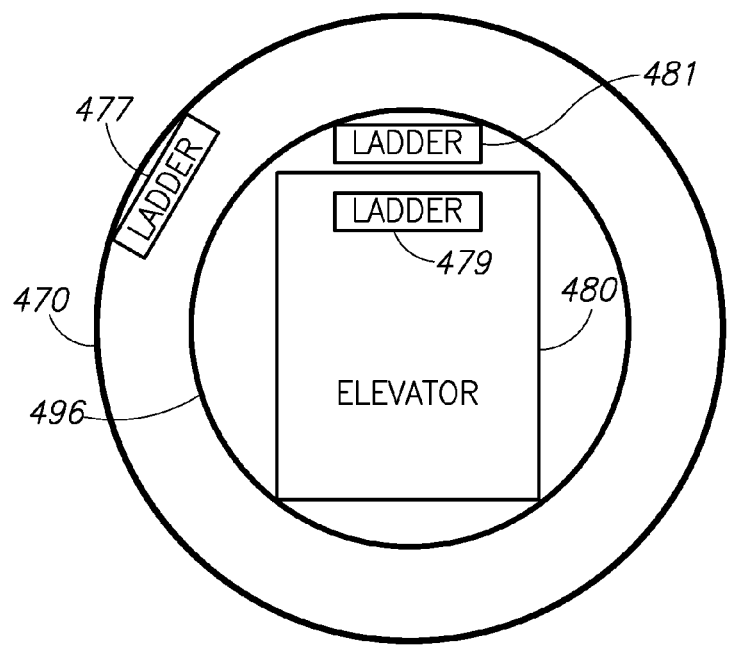
FIG. 82. SUREFIRE Tower—Second Upper Level Layout (Preferred Embodiment)

Refer to FIG. 82. SUREFIRE Tower—Second Upper Level Layout (Preferred Embodiment)

Figure 83:
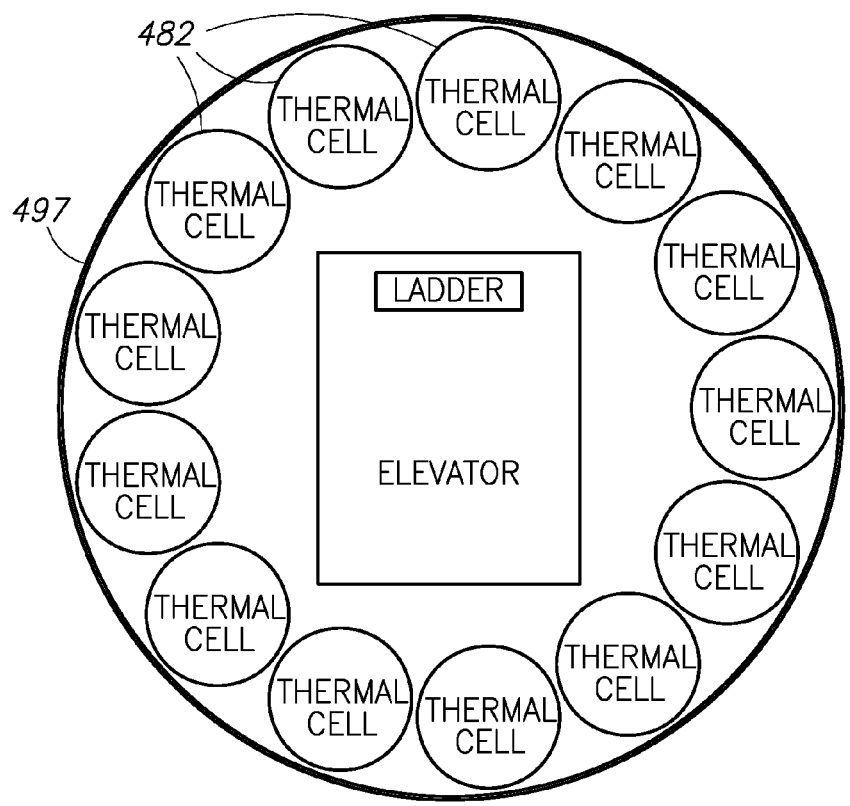
FIG. 83. SUREFIRE Tower—First Lower Level Layout (Preferred Embodiment)

Refer to FIG. 83. SUREFIRE Tower—First Lower Level Layout (Preferred Embodiment)

Figure 84:
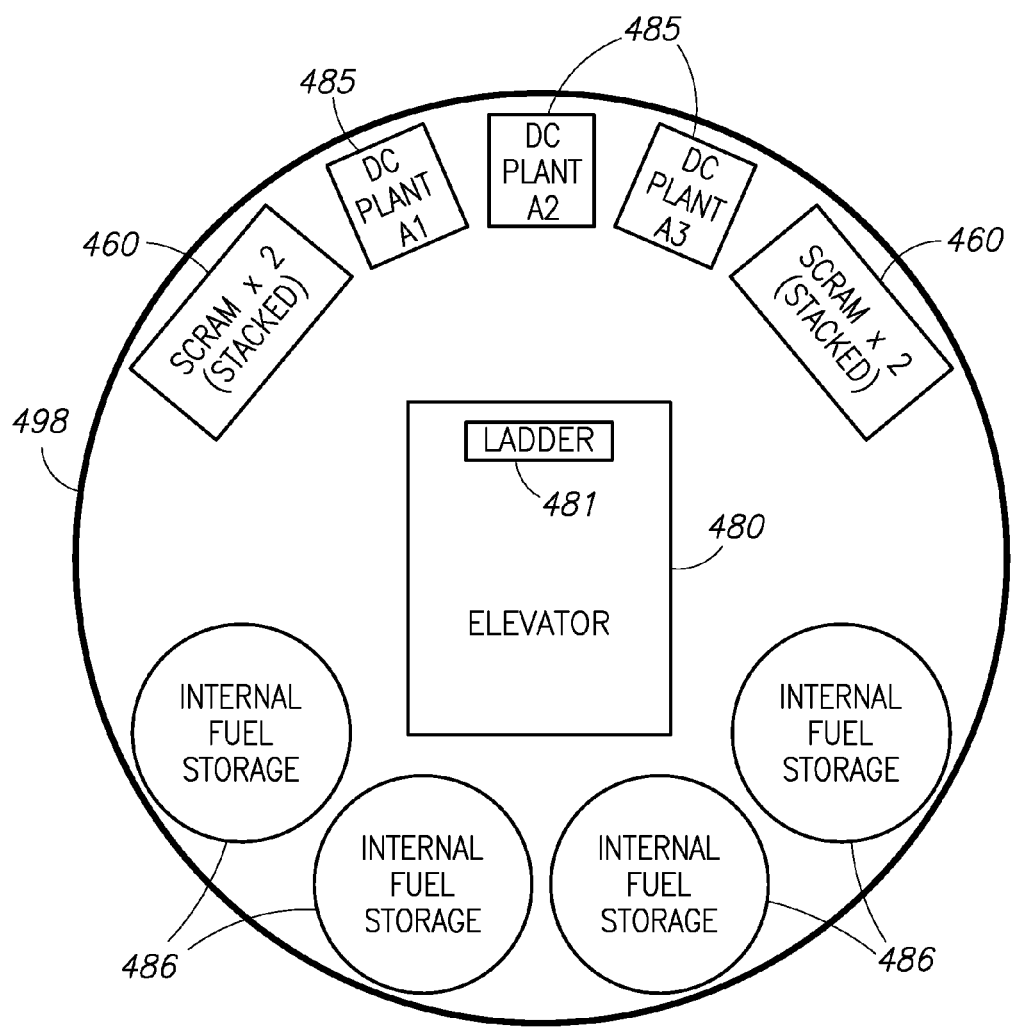
FIG. 84. SUREFIRE Tower—Second Lower Level Layout (Preferred Embodiment)

Refer to FIG. 84. SUREFIRE Tower—Second Lower Level Layout (Preferred Embodiment)

Figure 85:
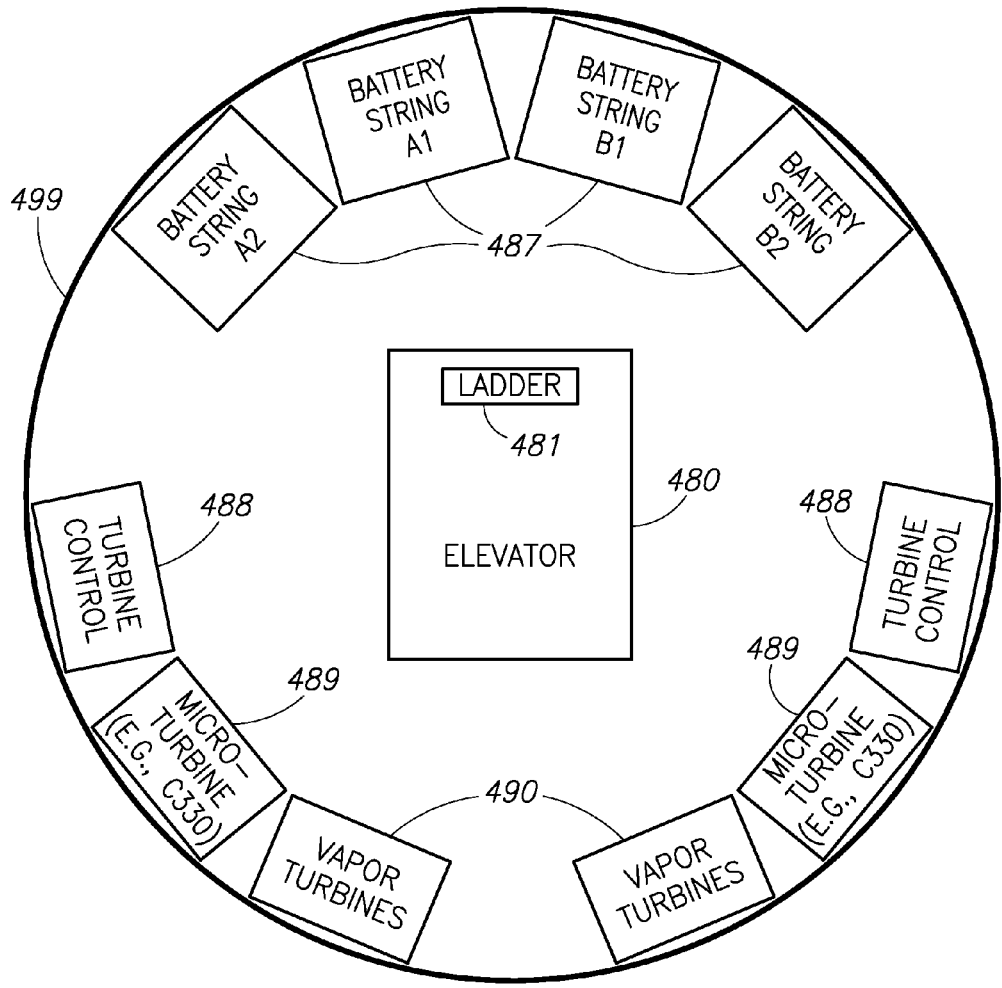
FIG. 85. SUREFIRE Tower—Third Lower Level Layout (Preferred Embodiment)

Refer to FIG. 85. SUREFIRE Tower—Third Lower Level Layout (Preferred Embodiment)

SUREFIRE Tower—First Lower Level (Thermal Energy Storage)

Excessive unused (or unusable) wind turbine power must be diverted to an appropriate load, or the wind turbine must be shut down. In a preferred embodiment, rather than simply divert unused energy, the energy may be captured in thermal cells, in the form of heat energy transferred to a suitable thermal medium (e.g., water, thermal oil, etc.) for storage. The heat may later be transformed back to electrical energy (this may be done by the PERKS subsystem).

As an example, assume the maximum energy to divert and capture is 108 KW (480 VAC 3-phase), which is the maximum output of a particular wind turbine. Normally, however, the energy would normally be significantly less than 60 KW. Software can control the combination of cells used for any particular storage event.

Assumptions:
Each cell is modified 80-gallon hot water tank (94% storage efficiency)
108 KW wind turbine max output to be diverted & captured
Each cell has dual 5500-watt elements (240 VAC)
Each cell can handle 11 KW maximum
N+3 configuration requires 13 cells
12 cells @ 9 KW=108 KW (1 spare)
11 cells @ 9.8 KW=108 KW (2 spares)
10 cells @ 10.8 KW=108 KW (3 spares)

In this example, each cell can present a maximum electrically dissipative load of 11,000 watts (2 elements at 5500 watts each), which means it can capture energy at the maximum rate of 11,000 joules/second (1 watt=1 joule/second). If the two elements in each cell are wired in series, one cell can occupy each phase of the load, so cells can be used in groups of three (we assume this for now).

Assuming the water is initially at 86° F. and can be heated to 200° F., delta T=114° F. At 8.1 pounds per gallon, 80 gallons of water weighs 648 pounds. The energy capacity of the cell is thus 648 pounds*114F=73,872 pound-degrees F., which is 77,920,186 joules. At a fill rate of 11,000 joules/ second, the maximum capacity can be reached in 7083.6532 seconds, or about 1.96 hours. This means that the thermal cell can absorb 11 KW in 1.96 hours, which is 21.6 KWH of energy. At 94% storage efficiency, said apparatus can recuperate at most 20 KWH of what we store. At 48 VDC, this corresponds to 424 amp-hours (AH). Assuming a water source temperature of 200° F. and a sink temperature of 55° F., the theoretical maximum Carnot efficiency is 38%, which means our 424 AH dwindles to a maximum of 161 AH. With a rectifier efficiency of 93%, this further dwindles to 150 AH. Thus, a set of 3 cells has a capacity of 3*150 AH=450 AH @ 48 VDC. 12 cells together have a collective capacity of 1800 AH, which is roughly the same capacity as a 1600 AH battery string (but for less than 30% of the cost).

12 DEFEND—Deterrent/Emergency Force Especially for Node Defense

The DEFEND system is intended for use with SUREFIRE sites, which are unmanned and unattended by design.

In a preferred embodiment, in sites where DEFEND is deployed with SUREFIRE, the two are highly integrated, along with the WARN system (in an alternative embodiment, DEFEND and/or WARN may be add-on systems).

In order to mitigate the risks associated with the potential for intruders, SUREFIRE sites may have extensive identification and authentication controls, and other intrusion prevention features, and, in a preferred embodiment, these may integrate with the DEFEND system, potentially triggering various defenses.

In a preferred embodiment, the DEFEND subsystem may be integrated with, and informed by, the WARN system. DEFEND may actively protect the overall system from intruders, including through the use of physical mechanisms where appropriate. Note that stored and in-process information at a SUREFIRE site can be safe from theft and misuse due to the properties of CHARM (as described in section 8), even if the DEFEND system is unable to prevent or deter a particular attack.

In the event of intrusion, the DEFEND system may provide internal defenses that include (but are not limited to) mantraps, visual, auditory, and other sensory discomfort, smoke, and non-lethal (unless use of lethal force is authorized and appropriate) directed energy and/or electrification. In a preferred embodiment, these and other defenses may be deployed as needed in accordance with applicable security policy.

13 WARN—Weather & Advance Risk Notification

WARN is an automated threat detection, assessment, and recommendation system (based on multiple sensors and diverse data feeds) that advises the DEFEND system (and potentially, external parties) with actionable information as to the nature and severity of threats. WARN works in conjunction with the BELIEF system and LISTEN system, and other active sensor systems not discussed here. WARN's responsibilities include the acquisition and generation of actionable information that can be used to dynamically shift critical information processing loads away from threatened or other high-risk areas, such as those which routinely occur as natural hazards.

Most of the area of the contiguous 48 states is at substantial risk for at least one hazard (earthquake, volcanic, etc.), and some areas are at risk for several. The remaining areas are subject to other hazards (e.g., winter storms, blizzards, ice storms, hail, or drought).

The WARN system incorporates technology to generate actionable information for various threats, including tornadoes and other severe storms, which can nicely complement existing lightning and tornado-detection means. The WARN system design uses multi-sensor fusion in conjunction with Bayesian reasoning to dynamically determine a joint probability distribution for various threats and risks, based on all available risk information (including data feeds) and known cause/effect relationships.

The WARN system technology can provide an additional detection means to complement existing tornado detection means. When major Internet peering points are overlayed onto a map of tornado risk areas, it may be seen that a number of these peering points lie within high risk areas. With existing practice, destruction of a peering point can severely cripple Internet communication for dependent clients. The WARN technology is designed to detect tornado and certain other risks, so that the SHADOWS infrastructure can proactively and dynamically adapt to changing conditions, such as the risk of loss of a peering point, and continue to honor its information processing commitments.

The WARN system enables the SHADOWS infrastructure to proactively take appropriate measures, based on perceived and actual threats. As can be seen by similarly overlaying selected major Internet peering points onto a map of lightning risk areas, a number of these peering points lie within high risk areas. Although lightning protection systems are widely deployed in practice, the realities are that no exposed structure is safe from a direct lightning strike. In addition to accepted lightning protection practices, the WARN technology is designed to detect lightning, so that the SHADOWS infrastructure can proactively minimize the risk of a direct strike by collapsing external structures during periods of greatest risk, getting them out of harm's way.

By using sensors with a long "stand-off" range, the Scrutiny LISTEN system (part of WARN) may enable sites at lower risk to compensate for sites at highest risk, without going offline.

Datacenter services must survive earthquakes, as well as tornadoes and other threats. Because earthquake detection technology provides little or no warning of an impending event, seismic risk has been an important factor in the design of the SHADOWS infrastructure. For example, almost all data storage and retrieval operations (which are handled by the CHARM system as described in section 8) occur without the use of spinning hard disk drives, or with minimal use, especially in high-risk areas.

The CHARM system (described in section 8) enables the SHADOWS infrastructure to store, retrieve, and process information without relying on spinning disk drives.

13.1 LISTEN—Locate, Identify, & Scrutinize Threats Emerging Nearby

Figure 86:
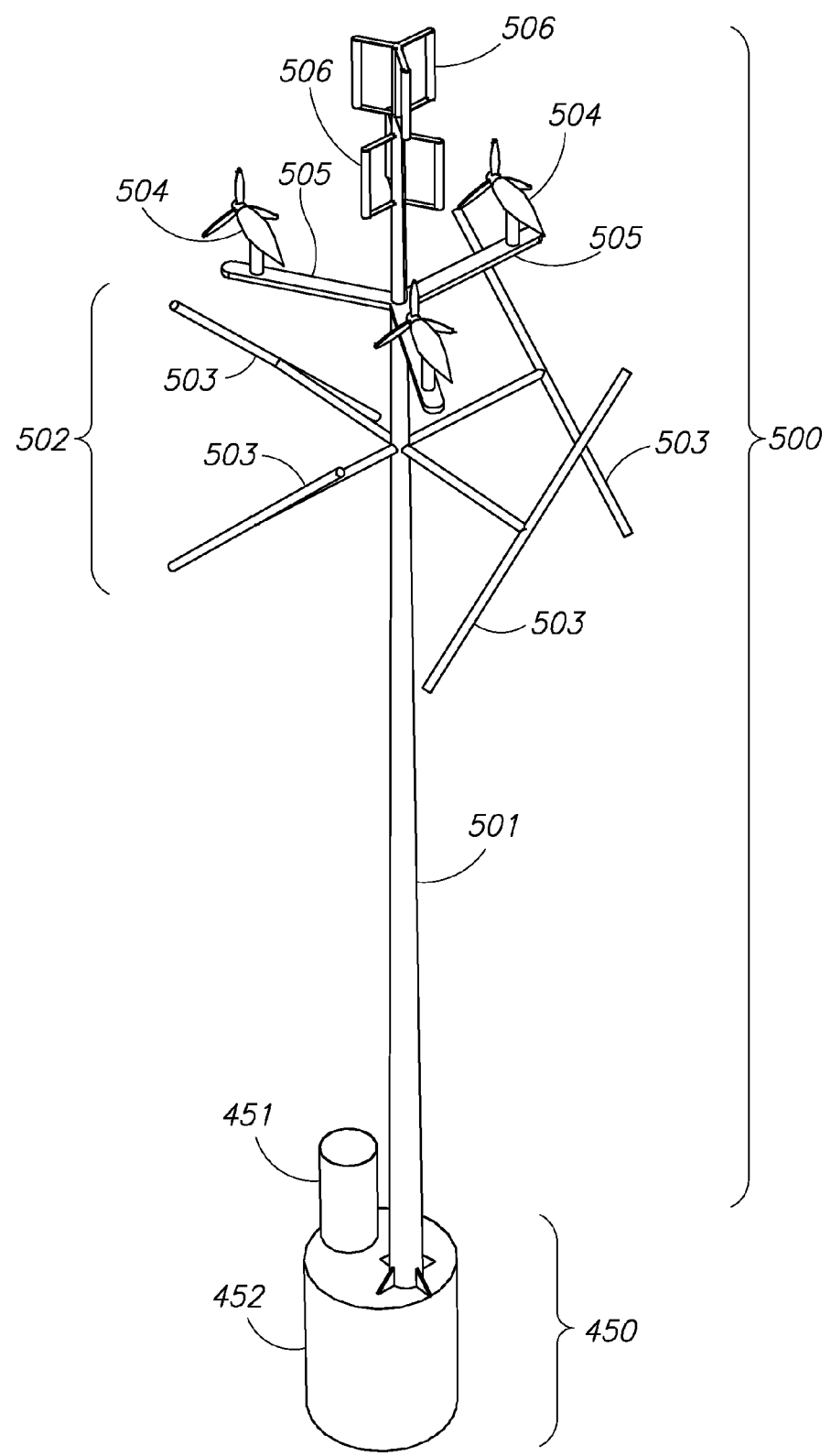
FIG. 86. SUREFIRE Vault with Expendable LISTEN Monopole

Refer to FIG. 86. SUREFIRE Vault with Expendable LISTEN Monopole

Figure 118:
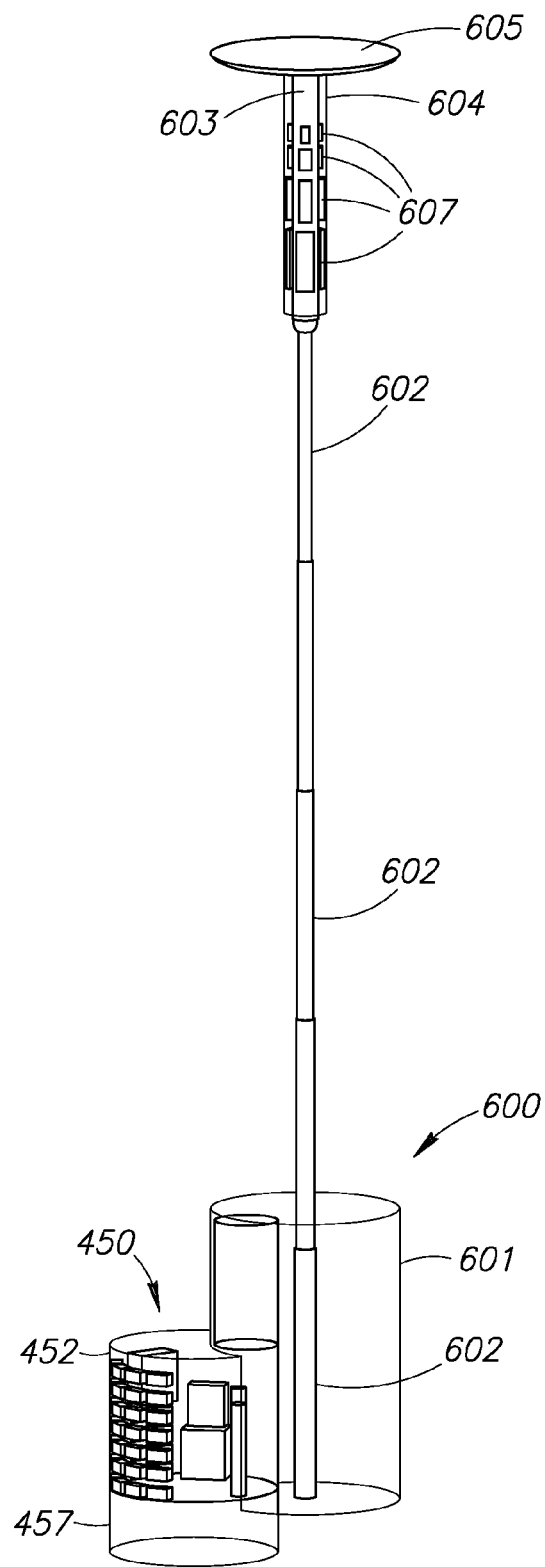
FIG. 118. WARN System—PODIUM Telescoping LISTEN Sensors (Preferred Embodiment)

The LISTEN subsystem provides sensory input to the WARN system, including visual, infrared (IR), seismic, and radio frequency (RF) data that may be used alone or in conjunction with a Bayesian belief system (and historical data) to provide early warning, detection, and tracking of certain threats, including in particular, severe storms, and especially tornadoes. FIG. 86 depicts a preferred embodiment of a LISTEN monopole-based configuration 500 with top-mounted apparatus for severe storm detection (it also provides communications). In a preferred embodiment, fixed monopole 501 is a radio-transparent composite material with a typical length (height) of approximately 60 feet, with an attached Lindenblad antenna array 502, a multiplicity of HAWT-type (depicted) or VAWT-type (not shown) small wind turbines 504 on masts 505, along with various communications antennas 506. The monopole 501 and the equipment array 502, 503, 504, 505, 506 attached atop it are relatively "expendable" compared to that contained in the underground SURE-FIRE vault 450 (see FIG. 77 for details) to which it typically attaches. A non-expendable, survivable telescopic mast 602 and equipment apparatus 604, 605 are depicted in FIG. 118 and FIG. 119 (which see); to avoid destruction (e.g., by tornado, hurricane, seismic events, etc.), the mast 602 and attached equipment 604, 605 retract into a protected configuration that is either underground (FIG. 118) or mobile (FIG. 119). Visual and IR input may be provided by any combination of integrated video and/or IR camera sensing circuitry and/or commercial camera apparatus (not depicted in FIG. 86). Seismic input may be provided primarily by accelerometers and inertial navigation system (INS) components embedded in the SLAM subsystem described in section 10.1, as well as by commercial seismic detection apparatus.

The primary focus of this section is to describe the design of two types of specialized antenna systems (Moxon Rectangle and Lindenblad) capable of collecting RF data that may be optimally used in the detection and tracking of severe storms, especially tornadoes. In a preferred embodiment, in order to maximize the accuracy and precision for storm-detection purposes, said antenna systems need to operate in the frequency range of 30 to 60 MHz, and preferentially in the range 49 to 59 MHz, and most preferentially at the target storm signal frequencies of 49 MHz, 52.25 MHz, and 59 MHz—and, in the case of a single-frequency-only constraint, at 52.25 MHz. As described here, these antenna systems are designed to have a stand-off range in excess of 30 miles, so in addition to improving the survivability of potentially threatened SHADOWS sites, there is potential to provide life-saving early warning (e.g., of actual tornadoes and/or lightning) for nearby communities (especially those within stand-off range, but also any that may lie within an oncoming storm track).

13.1.1 Direction-Finding Options: The Moxon Rectangle, Doppler Arrays, & Adcock Arrays Refer to FIG. 87. Two DF Scenarios: With and Without Bearing Ambiguity Refer to FIG. 88. Critical Azimuth Bearings Relative to DF with a Horizontal Antenna Refer to FIG. 89. A Basic 4-Antenna Doppler Antenna System Refer to FIG. 90. The Basic Doppler Direction-Finding Relationships Refer to FIG. 91. Adcock Direction-Finding Basics Several direction-finding (DF) options are relevant to radio-frequency (RF) based storm detection and tracking as need by LISTEN, each with advantages and disadvantages.

13.1.1.1 The Basic Direction-Finding (DF) Scenario

Figure 87:
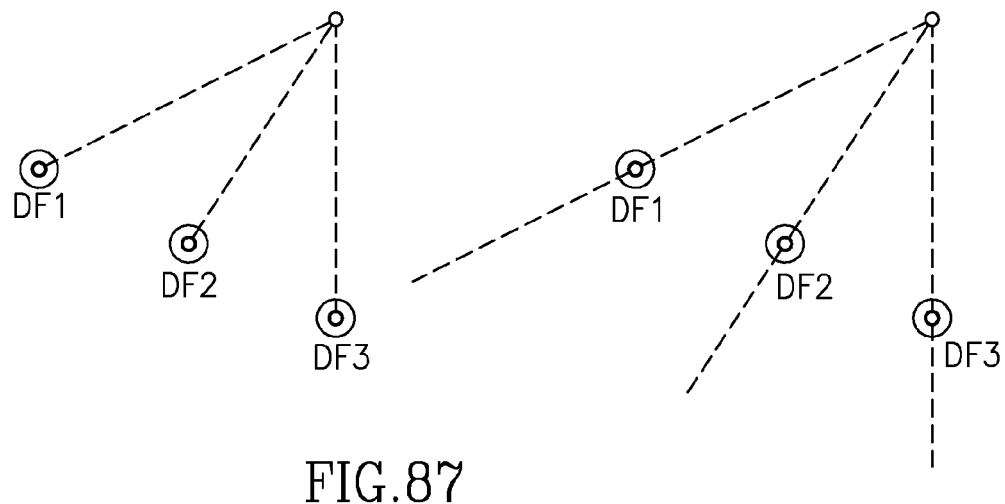
FIG. 87. Two DF Scenarios: With and Without Bearing Ambiguity

In a preferred embodiment, the DF function of LISTEN is to provide bearings to desired target storm signals on 49, 55.25 and 59.75 MHz. There are two basic network systems for arriving at a reliable bearing to and position of a target signal. FIG. 87 shows both options.

Both scenarios presume that the readings from each DF antenna are processed within an interconnected network for correlation. On the left, the system uses mono-directional bearings from each DF antenna to arrive at a position of the target. On the right, the DF antennas are presumed to present a 180° ambiguity of bearing readings. However, correlation by the network center yields one and only one possible target position. Under coordinated computer control, both systems can work equally well. The only limitation of the ambiguous system is when only one DF antenna provides a bearing. In this case, a mono-directional bearing provides at least directional information, although not a position.

13.1.1.2 DF Systems Available

Commercially developed RF-based DF systems are widely available, although the number of candidates may decrease as various makers specialize in systems for certain frequency ranges. HF systems for frequencies up to 30 MHz and capable of handling skip as well as line-of-sight signals have been common for decades. More recently, a number of techniques have appeared for the VHF and UHF range from about 88 MHz upward. The frequency range relevant to LISTEN falls into the somewhat neglected zone on DF concerns.

Commercial makers of DF systems have also focused on military and home-security issues involved in DF work. Hence, there appear to be many more hand-held and vehicular systems than systems designed for permanent installation. An additional factor involved in the main focus of commercial systems is a very high cost per unit. Therefore, one required decision is whether to purchase a vendor offering (as is, or modified for the project), or whether to fabricate the system in-house.

Most commercial systems use vertical polarization in order to arrive at a sharp null or clear phase-difference detection. One of the systems sketched in the following notes uses horizontal polarization for line-of-sight signals. Which polarization is most apt to the nature of the target signals requires a review of existing signal records prior to a final decision. Because polarization may vary, the decision may have to rest of a predominance of polarization rather than a uniform pattern.

Of the available systems, three appear to be most nearly suited to LISTEN. One is the use of the Moxon rectangle to obtain an unambiguous bearing to the target. A second is the use of Doppler techniques for an equally unambiguous bearing to the target. A third is the Adcock system, which provides a 180° bearing ambiguity, but which can be enhanced with a sensing antenna to remove the ambiguity.

13.1.1.3 The Moxon Rectangle

Figure 88:
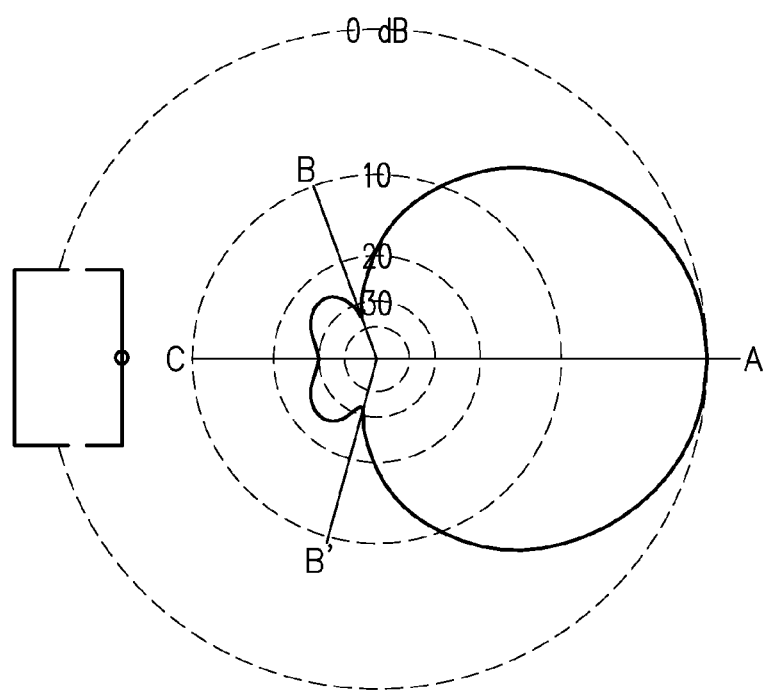
FIG. 88. Critical Azimuth Bearings Relative to Direction-Finding with a Horizontal Antenna FIG. 89. A Basic 4-Antenna Doppler Antenna System FIG. 90. The Basic Doppler Direction-Finding Relationships FIG. 91. Adcock Direction-Finding Basics FIG. 92. Comparative Sizes: Moxon Rectangle and 3-Element Yagi FIG. 93. Comparative Patterns: Moxon Rectangle and 3-Element Yagi FIG. 94. Critical Azimuth Bearings Relative to DF with a Horizontal Antenna FIG. 95. Moxon Rectangle: Critical Dimensions FIG. 96. Why Separate Antennas? Moxon Rectangle Azimuth Patterns at 3 Target Frequencies FIG. 97. Moxon Rectangle Patterns at 30 Feet Above Average Ground FIG. 98. Physical Construction: Tubing Rounding Corner Bends FIG. 99. Physical Construction: Some Preliminary Suggestions FIG. 100. General Layout for Pattern Distortion Tests Using Moxon Rectangles at 1-Wavelength Intervals FIG. 101. Rearward Pattern Distortions Resulting from Vertically Stacking 3 Moxon Rectangles at 1-Wavelength Intervals FIG. 102. General Layout for Pattern Distortion Tests Using Moxon Rectangles at 10-Wavelength Intervals FIG. 103. Moxon Rectangle Plots with an Inline Separation of 10-Wavelength Intervals (200 feet)

FIG. 88 depicts the basic properties of the Moxon rectangle in DF service. A small outline of the Moxon rectangle has been added to the sketch as an orientation to the pattern features. The Moxon rectangle is a horizontally polarized antenna with very low sensitivity to vertically polarized target signals. The antenna sketch and the antenna patterns are correctly aligned relative to each other.

The Moxon rectangle requires the use of the side nulls to obtain a clear bearing to the target signal. In some operating environments, the rear lobes to not have a sufficient null 180° from the forward lobe to provide reliable detection. However, the side lobes are always from 100° to 120° from the main forward direction. This fact allows reliable determination of the forward and rearward direction. A simple process of splitting the difference between these nulls from a rotating antenna—with forward and rearward detection—provides a reliable bearing to the target signal.

By design, and in practice, the Moxon rectangle is oriented and operated vertically, in which case, the rearward null may be deep and unambiguous. However, this mode of operation is neither discussed nor considered here.

The Moxon rectangle has the following list of features and challenges:

1. The antenna can be locally fabricated to precise dimensions for each detection frequency. Its 50-ohm feedpoint impedance allows direct connection to standard cables or receiver input terminals.

2. The antenna size is about 70-75% of a comparable Yagi, so that the antenna can fit within pods planned for the installation.

3. When oriented horizontally, it is responsive to horizontally polarized signals or elliptically polarized signals with a significant horizontal component.

4. When oriented horizontally, antennas above and below the Moxon tend not to affect the position of the side lobes, allowing considerable confidence in the bearings derived from splitting the direction between them.

5. The antenna requires fabrication for specific frequencies used in DF service to ensure that the side lobes are deep enough for reliable bearing determination.

6. The antenna requires rotation through virtually 360° to obtain a bearing.

7. Since the Moxon rectangle has not previously been used horizontally for DF service, there is little applicable field experience, and no commercial product support (including software).

13.1.1.4 Doppler DF Systems

Figure 89:
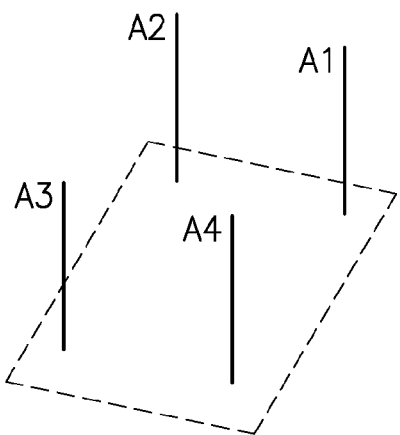

Doppler systems can be as simple or complex has one desires, with as few as four antennas (as shown in FIG. 89), and as many as sixteen. The greater the number of antennas, the greater the system's ability to read out bearings to high accuracy. However, off-the-shelf systems tend to have prices that climb exponentially as the number of antennas increases arithmetically. Behind the cost increase are increases in the receiving equipment complexity and the amount of software needed to arrive at a bearing. Doppler systems provide unambiguous readings.

For simplicity of presentation, the sketch in FIG. 89 depicts only four antennas. Typically, Doppler systems use monopoles (rather than dipoles) spaced less than a quarter-wavelength apart. Larger spacing allows for certain discrepancies to creep into the detection of the phase differences among the antenna. As well, the systems typically use monopoles with a common sheet or screen that forms the ground plane for each antenna and for the system. The function of the common ground plane is also to reduce the effects of objects below the antennas that might interfere with accurate detection. As a consequence, many Doppler systems are specifically designed for service on top of vehicles.

Figure 90:
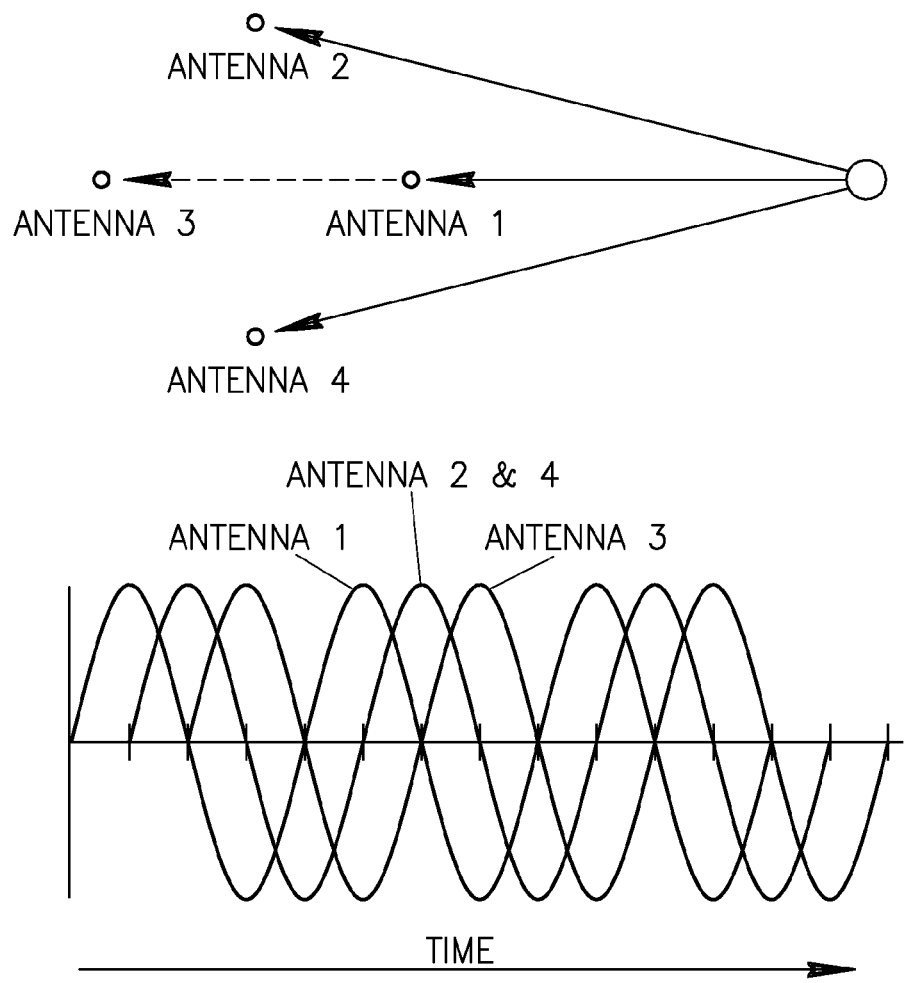

The principles of Doppler system operation appear in FIG. 90. To simplify graphics, the target signal source is aligned with two of the antennas. The graph of phase relationships is not precise, but provides only a general idea of what a Doppler systems detects from each of its four antennas.

Doppler systems typically use one of two systems for detection. The least expensive is a timed sample from each antenna to determine the phase relationship among the received signals.

More complex systems may use independent receiving channels with a common local oscillator chain to preserve all phase relationships. Exact electronics tend to be proprietary, minimizing the available information. Nevertheless, effective Doppler DF systems with limited (10°) accuracy have been constructed by amateur radio operators.

Doppler DF systems have the following list of features and challenges:

1. Doppler systems are vertically polarized and may be ineffective for target signals that are mainly horizontally polarized (thus, Doppler systems may complement horizontally oriented Moxon systems).

2. Doppler systems do not require exact antenna tuning and so are usable over a considerable span of frequencies. The LISTEN requirements would easily fit within the normal range of a Doppler system designed for the center of the range.

3. Doppler antennas have a relatively small X-Y footprint, extending somewhat over a quarter-wave on a side. However, the antennas require vertical space amounting to another quarter-wave, and so would not fit within the relatively flat "pod" (radome) contemplated in a preferred embodiment of LISTEN.

4. Doppler antenna systems do not require rotation, simplifying the mechanical requires at the tower structures.

5. Doppler antennas may be sensitive to conductive structures above the antennas, although they are relatively immune to disturbances from conductive structures below the antennas.

6. Doppler accuracy and the complexity of the antenna, receiving, and computational systems may be directly related.

13.1.1.5 Adcock DF Systems

The second oldest direction-finding system extant uses Adcock antennas, first patented in 1919 (only the use of small loops is older). The system was first developed for use in the HF range with skip signals, although it has also proven effective with ground wave or line-of-sight signals. Today, there are Adcock systems in service for a wide variety of frequencies, primarily within the government and military.

Figure 91:
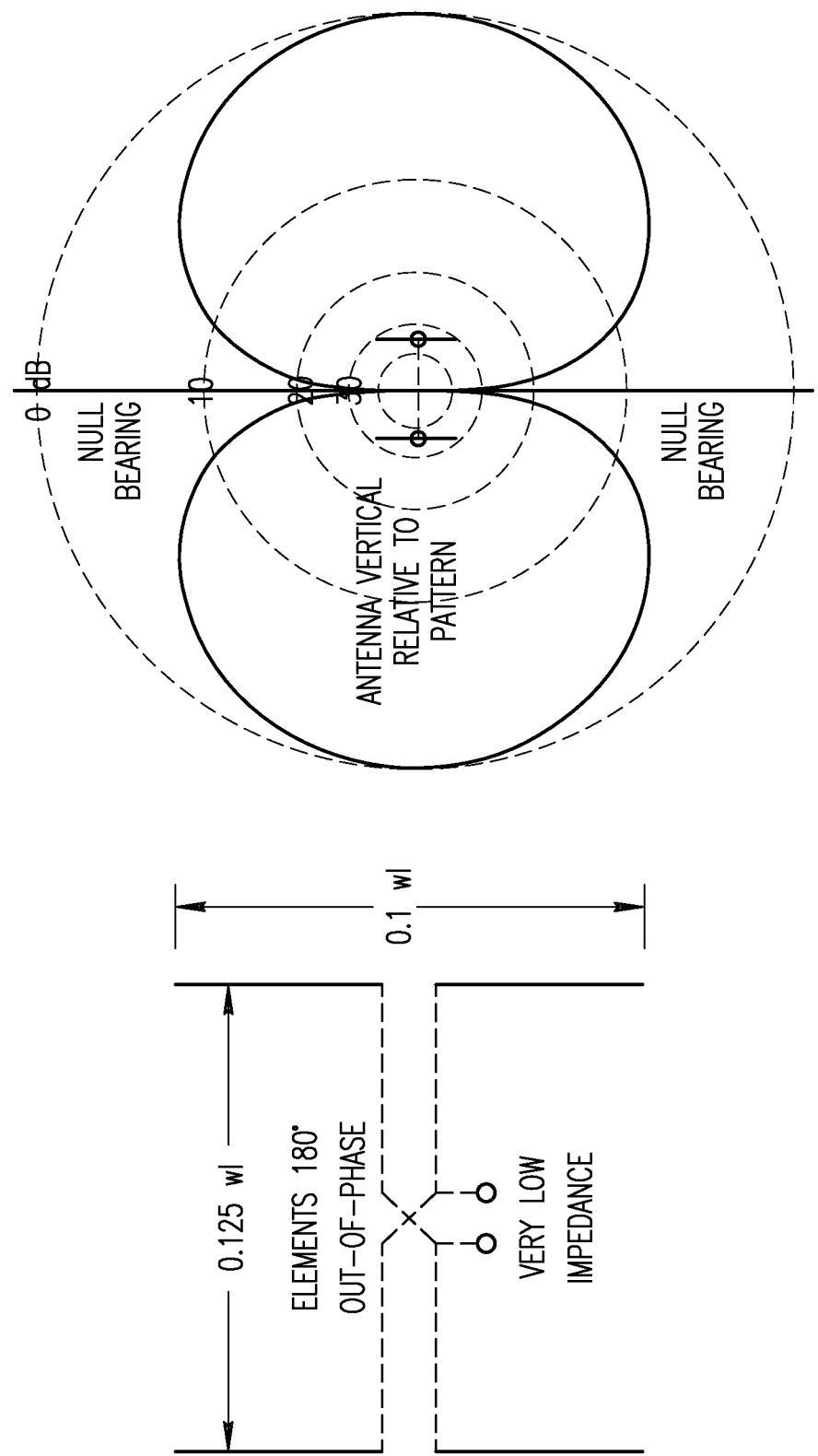

FIG. 91 shows the main components of an Adcock system. On the left is a minimally effective Adcock antenna. The Adcock is a vertically polarized system for line-of-sight signals. Each vertical element can be quite short, and the two antennas can be closely spaced. The antennas are 180° out-of-phase with each other, providing a pattern with two lobes and with two side nulls that are deep and broadside to the plane of the elements. A basic Adcock two-element system is ambiguous relative to the target signal. However, it is possible to add a sensing antenna to provide only one true null. In all cases, the Adcock antenna system is designed to rotate during DF service.

In FIG. 91, the pattern to the right shows the Adcock antenna at its center. However, the actual antenna would be at right angles to the azimuth pattern shown. (Hence, without the graphical distortion to the antenna position, it would not show up at all). The antenna dimensions are not critical, but the elements should be considerably less than half-wavelength apart to avoid the development of additional nulls.

With or without a sensing antenna as a third element, the impedance of the Adcock antenna array is very low. Hence, it requires impedance transformation to raise to the normal equipment levels. This process normally incurs significant signal strength loss that the equipment must restore within its amplification chain. Commercial systems using Adcock principles are available.

The Adcock DF system has the following list of features and challenges:

1. Like Doppler systems, the Adcock system is vertically polarized, with low sensitivity to line-of-sight horizontally polarized signals.

2. The antenna system requires continuous rotation during DF service, with or without the addition of a sensing antenna.

3. The antenna elements form a small package that may easily fit within small RF-transparent pods for weather protection.

4. The relative sensitivity of the Adcock antennas to nearby conductive materials in any direction is unknown. This factor might affect the placement of such a system on the LISTEN tower assemblies.

5. The Adcock antennas exhibit a very low feedpoint impedance and thus require intervening impedance transformation components prior to equipment entry.

6. It is likely that the Adcock system requires specialized receiving equipment, with or without a sensing antenna element, in order to maintain calibration. Hence, such a system may require purchase from a vendor with possibly prohibitive pricing. However, such purchases may reduce the amount of software development necessary for an Adcock-based antenna configuration.

These are only representative of the candidate antennas; the first decisive factor should be the most likely polarization of the target signals for DF work and then a "best compromise" matrix related to goals and constraints.

13.1.2 Moxon Rectangle Directional Beams for 49, 52.25, and 59 MHz

Figure 92:
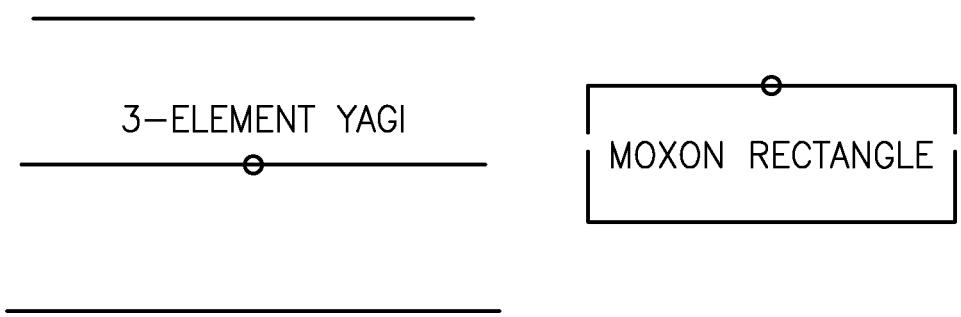

Refer to FIG. 92. Comparative Sizes: Moxon Rectangle and 3-Element Yagi

Figure 93:
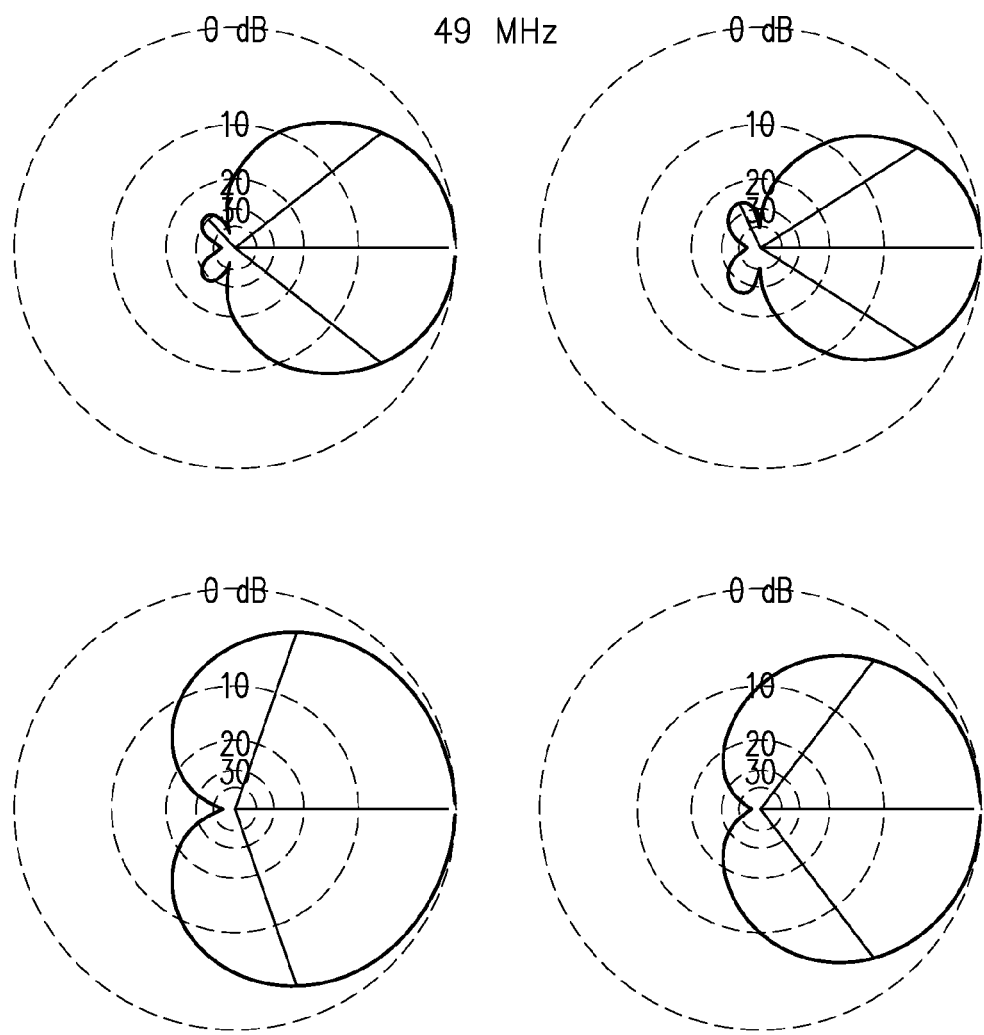

Refer to FIG. 93. Comparative Patterns: Moxon Rectangle and 3-Element Yagi

Figure 94:
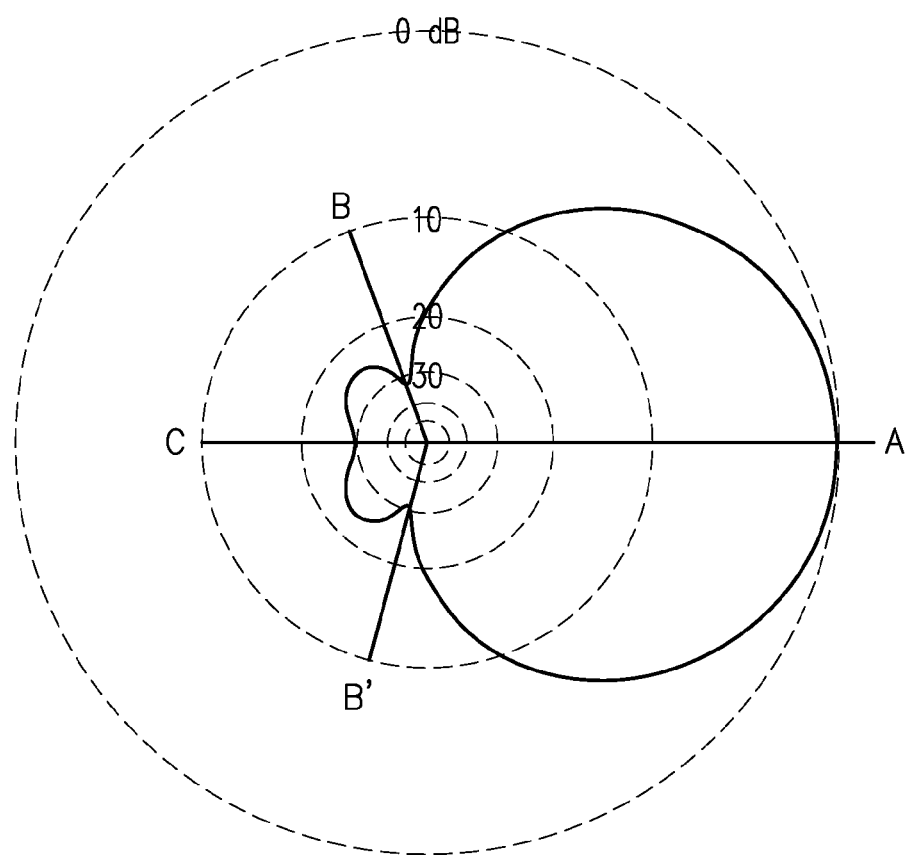

Refer to FIG. 94. Critical Azimuth Bearings Relative to DF with a Horizontal Antenna Refer to FIG. 95. Moxon Rectangle: Critical Dimensions Refer to FIG. 96. Why Separate Antennas? Moxon Rectangle Azimuth Patterns at 3 Target Frequencies Refer to FIG. 97. Moxon Rectangle Patterns at 30 Feet Above Average Ground Refer to FIG. 98. Physical Construction: Tubing Rounding Corner Bends Refer to FIG. 99. Physical Construction: Some Preliminary Suggestions This section provides background on and designs for three Moxon rectangle antennas to be used, in a preferred embodiment, at 49, 52.25, and 59 MHz in a directional detection system that is particularly suited for the detection and tracking of tornados and electrical storms. The designs include electrical dimensions for lightweight 0.375" diameter aluminum elements and preliminary physical construction suggestions for antennas that can be enclosed and rotated within relatively flat (e.g., saucer or Frisbee-shaped), horizontally oriented protective radomes, and pole- or tower-mounted with relatively low wind-loading, such as that of the PODIUM masthead 605 depicted in FIG. 115.

13.1.2.1 Why Moxon Rectangles?

The Moxon rectangle was originally conceived and designed as a vertically oriented two-element directional parasitic beam that employs two forms of element coupling. Like a Yagi-Uda array, elements couple inductively via near fields surrounding parallel elements. In addition, The Moxon rectangle folds its elements toward each other, resulting in additional capacitive coupling between element tips. The resulting array creates a compact two-element structure that achieves a very high front-to-back ratio typically associated only with three-element and larger Yagi-Uda arrays.

FIG. 92 compares (in scale) the physical size of a high-front-to-back-ratio Yagi with a Moxon, where both antennas are designed for 49 MHz, the lowest frequency within the desired target storm signal frequencies, which for the preferred embodiment are 49.0, 55.25, and 59.75 MHz. The Moxon rectangle is shorter from side-to-side. The longest Yagi element is over 120 inches (10 feet) long, while the Moxon's widest dimension is less than 87 inches (7.25 feet). The Yagi requires a 72-inch (6-foot) boom or front-to-rear dimension. The corresponding dimension in the Moxon is just over 32 inches (2.67 feet). With a diagonal measure of less than 7.8 feet, the Moxon therefore easily fits within a protective pod with a diameter of less than 8 feet (such as the PODIUM masthead 605 depicted in FIG. 115).

Although the Yagi exhibits about 1.5-dB higher forward gain than the Moxon, both rear patterns show similarities. The patterns in FIG. 93 are free-space E-plane and H-plane radiation patterns that correspond to the azimuth patterns of both antennas when used horizontally and vertically, respectively. The patterns are not to scale, since each pattern is normalized to place maximum forward gain at the outermost plot ring.

In both cases, the H-plane or vertical pattern shows the deepest single null for unambiguous detection of direction. Both antennas in the horizontal plane show small rearward lobes. The E-plane pattern of the Moxon is nearly cardioidal in this plane, resulting in smaller, narrower rear lobes.

Using either type of antenna for null-based direction finding requires attention to the rear lobe structure. FIG. 94 shows the critical bearings within the horizontal Moxon pattern. The pattern shown is for a Moxon rectangle 30 feet above average ground, the intended use height for the antenna in a preferred embodiment.

Bearing A is the direction of maximum forward gain. This bearing is not generally suited for direction finding, since the lobe is very broad. Consequently, the signal strength would vary almost undetectably over a fairly wide angular span. Bearings B and B' are side nulls. In the Moxon pattern, these bearing occur about 110° from the main forward lobe bearing, in contrast to a value of 90° applicable to virtually all Yagi designs. With respect to null-based direction finding, the side nulls require the system to note and ignore them, since they would produce a false target bearing.

Bearing C occurs 180° from the bearing of the highest forward gain. The rearward pattern and this bearing require close attention. First, the coincidence of bearing C with the highest front-to-back ratio occurs only in properly designed Moxon rectangles (and Yagi arrays). Second, placing an array above ground at a height below about 5 wavelengths reduces the ultimate depth of the rearward null relative to its free-space or theoretical value. In the present case, the 180° front-to-back ratio is close to 30 dB, which is about 6 dB weaker than the rearward lobes at maximum strength. As a consequence, using a null-based antenna in a direction-finding system requires careful design of null-detection, both to avoid falsing on a side null and to find the true bearing of the target at the center null between the rear lobes.

13.1.2.2 Moxon Rectangle Dimensions

Figure 95:
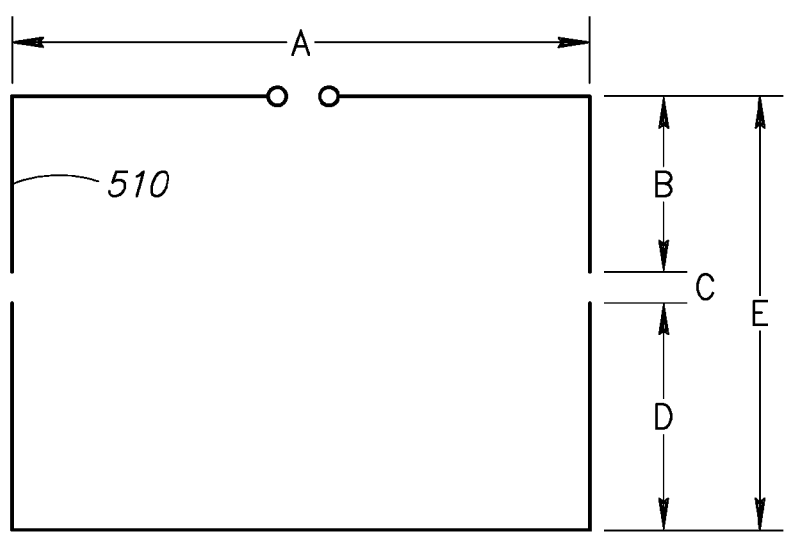

FIG. 95 shows the outline of a Moxon rectangle with the critical dimensions indicated. The Moxon has two elements, a fed driver and a passive reflector. The feedpoint impedance of the antenna is very close to 50 ohms so that the system may use a standard low-loss coaxial cable as the feedline to the relevant electronics. (The corresponding three-element Yagi array has an inherent feedpoint impedance of about 25 ohms and requires the addition of an impedance-matching network or device for compatibility with 50-ohm coaxial cable.)

Dimension A is the total side-to-side width of the array and applies to both the driver and the reflector. Dimension B is the driver fold-back or "tail". The corresponding reflector tail is shown as dimension D. Between the element tips is a gap, dimension C. Of all dimensions associated with the Moxon rectangle, the gap is the most critical one. Physical antennas using a Moxon rectangle design should set the gap within about 0.125" of the design value. The other dimensions are somewhat less critical. Dimension E shows the sum of B, C, and D to indicate the maximum front-to-rear width of the antenna.

For uniformity of performance, including the feedpoint impedance and the frequency of maximum front-to-back ratio, the project requires separate designs for each specified frequency. Table 24 provides the relevant dimensions in inches, feet, and meters (see FIG. 92 for dimension designations). Each section of the table also lists the total length of both the driver and the reflector elements. The feedpoint gap is a part of the driver element. Hence, each half of the driver must be one-half the total element length minus a small amount needed to establish a non-conductive gap between driver halves. The dimensions are derived from a computer-design model and program developed some years back using regression analysis on a large number of optimized test cases. Each set of dimensions has been tested in a NEC-4 model, and these models are available in either .NEC or .EZ format.

TABLE 24

Moxon Rectangle Dimensions for 49, 52.25, and 59 MHz

| Dimension | Inches | Feet | Meters |
| --- | --- | --- | --- |
| Frequency MHz: 49 MHz | | | |
| A | 86.71 | 7.225 | 2.202 |
| B | 11.69 | 0.974 | 0.297 |
| C | 3.83 | 0.319 | 0.097 |
| D | 16.61 | 1.384 | 0.422 |
| E | 32.14 | 2.678 | 0.816 |
| Driver Length (A + 2B) | 110.09 | 9.173 | 2.796 |
| Reflector Length (A + 2D) | 119.93 | 9.994 | 3.046 |
| Frequency MHz: 52.25 MHz | | | |
| A | 81.28 | 6.773 | 2.064 |
| B | 10.91 | 0.909 | 0.277 |
| C | 3.64 | 0.303 | 0.092 |
| D | 15.59 | 1.299 | 0.396 |
| E | 30.14 | 2.512 | 0.765 |
| Driver Length (A + 2B) | 103.10 | 8.592 | 2.619 |
| Reflector Length (A + 2D) | 112.46 | 9.372 | 2.856 |
| Frequency MHz: 59 MHz | | | |
| A | 71.93 | 5.994 | 1.827 |
| B | 9.58 | 0.798 | 0.243 |
| C | 3.31 | 0.276 | 0.084 |
| D | 13.81 | 1.151 | 0.351 |
| E | 26.70 | 2.225 | 0.678 |
| Driver Length (A + 2B) | 91.09 | 7.591 | 2.314 |
| Reflector Length (A + 2D) | 99.55 | 8.296 | 2.529 |

Figure 96:
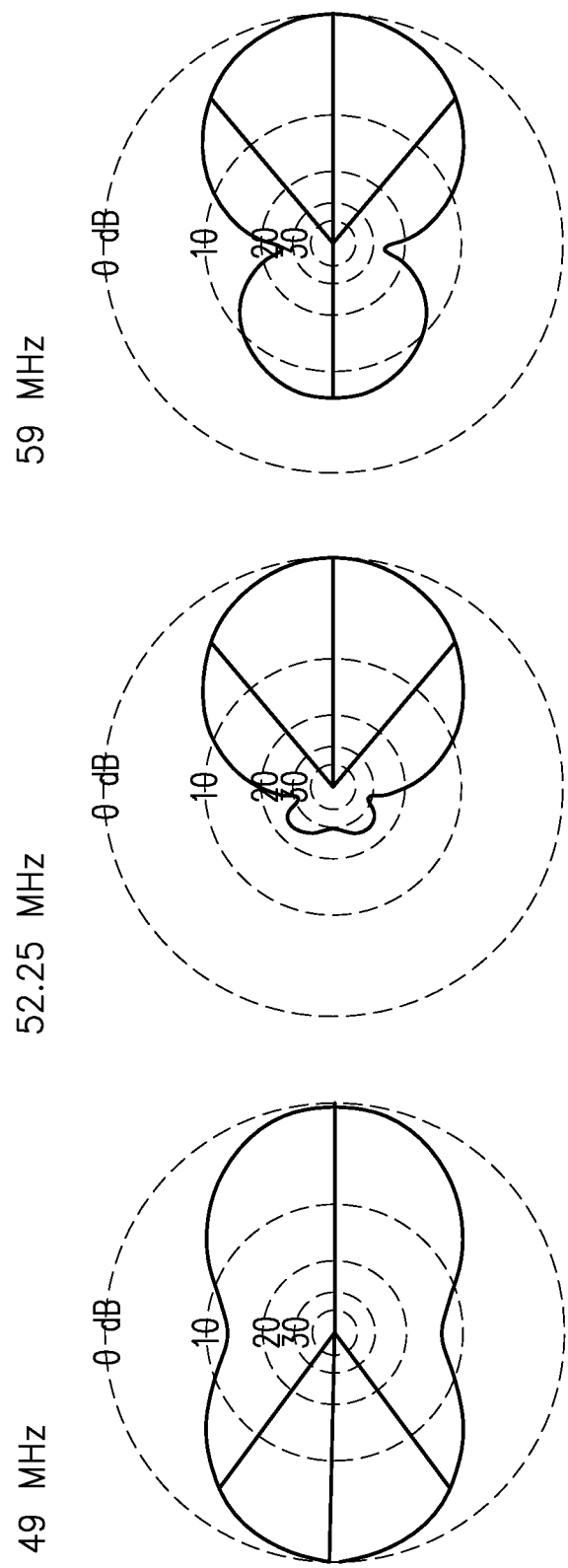

The answer to the question of why the project needs 3 different antennas, one for each frequency, appears in part in FIG. 96. When the 52.25-MHz design is modeled at both 49 and 59 MHz, the other specified storm signal frequencies, the rearward portions of the pattern do not have the characteristics necessary for a null-based direction-finding system. The operating passband for the system is about 18.5%, a figure that exceeds the impedance passband of virtually all directive antennas. The actual operating bandwidth for obtaining a satisfactory rearward null in the pattern is normally very narrow, perhaps 100 kHz and often less. (This limitation applies to both horizontally and vertically oriented antennas). Hence, precise construction is required to obtain the desired performance.

At a height of 30 feet (about 1.5 wavelengths at the specified frequencies), the antenna shows an elevation angle of maximum radiation (also called the take-off or TO angle) of 9°, which is particularly suited to long-range storm detection. For reference, FIG. 97 shows the elevation and the azimuth patterns of the antenna, where the azimuth pattern is at the TO angle. Should there be any question about the detected signal occurring at a high elevation angle relative to the antenna and its elevation lobes, higher angle azimuth patterns may be easily explored. The performance of the antenna at the 30-foot level is adequate for many purposes. The maximum forward gain is 11.7 dBi, with a maximum 180° front-to-back ratio of between 29 and 30 dB. The feedpoint impedance is calculated to be about 53 ohms.

13.1.2.3 Preliminary Construction Steps

The Moxon rectangle is straightforward in terms of construction. In a preferred embodiment, the antenna can be constructed with non-conductive support materials and single lengths of 0.375-inch diameter 6063-T832 aluminum tubing for each half-element. Since the reflector is a continuous or unsplit element, the element halves require a conductive junction. A short (2-inch to 4-inch) section of 0.25-inch diameter rod easily joins the half elements.

The element fold-backs to create the tails require careful fabrication, although a plumber's copper tubing bender is usable. The radius should be large enough to avoid tubing fractures, which are more common with the specified material than with softer materials. A radius bend may distort the dimensions slightly relative to the modeled dimensions, which presume sharp right angles. In a preferred embodiment, as shown in FIG. 98, the distortion may be absorbed into dimension A, since a very slight lengthening of that dimensions tends to simply reduce the feedpoint impedance by a few Ohms. The element ends may be fixed at the specified separation by inserting a non-conductive rod into each tip and using standard fasteners to secure the mechanical connection.

Figure 99:
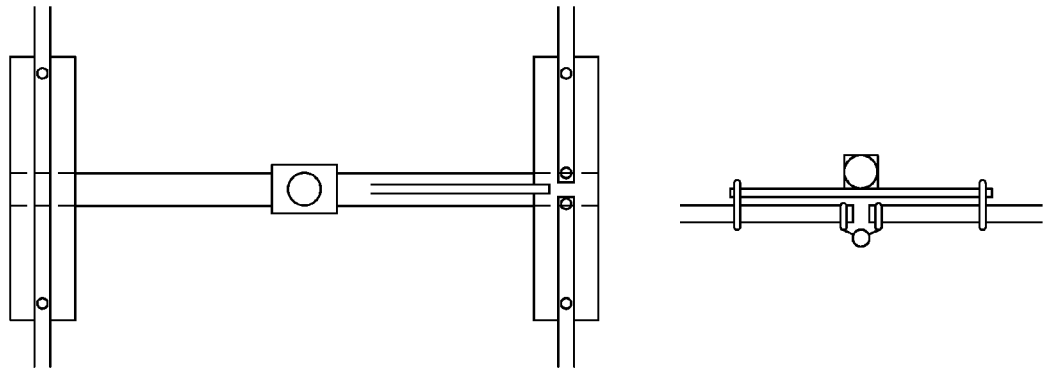

FIG. 99 provides some steps for overall construction, presuming the use of nonconductive materials for the non-electrical components. The main boom may be square or round. However, the hub should form a tee that allows the use of a round mast leading to the rotator.

Each end of the boom should have a plate (about 0.125 inches thick, if the material is as sturdy as polycarbonate) to support and align the elements. A round boom may require mechanical fasteners for the plate connection, but a square boom may allow epoxy to join the boom and plate. Element alignment fasteners should appear near the outer ends of each plate. Driver alignment may be assured despite the gap between halves by inserting a non-conductive rod into the inner ends of each half element. The support plates should be long enough to prevent significant element sag along the unsupported part or their overall length. FIG. 99 specifies a bottom view, meaning that the plates and the element are beneath the boom. This mode of construction generally simplifies aligning the elements in a level plane.

The driver requires a pair of connections between the element halves and the two parts (inner conductor and outer braid) of the coaxial cable. FIG. 99 shows the use of fasteners, although direct conductive bonding may be possible. The connections require two cautions. First, any fasteners used must not be large enough in diameter to sever the non-conductive alignment rod at the driver center. Second, the copper wires of the cable require separation from the aluminum by a stainless-steel washer or other device to prevent electrolysis, which might corrode one or both metals and degrade the electrical continuity at the operating frequencies.

Since the elements extend only 43 inches (maximum at 49 MHz) from the boom, the 0.375-inch diameter tubing should be self-supporting, especially in the absence of wind loads within the protection of the pod (radome). If the elements create a small droop, it can in no way harm the electrical performance of the antenna. At 0.375-inch in diameter, 6063-

T832 aluminum tube weighs about 0.044 pounds per linear foot. Therefore, the weight of each half-element may be less than eight ounces. Total antenna weight may be about two pounds plus the weight of the boom-plate-hub assembly. The designs presented in this section are electrically sound within the limits of normal antenna operation. The construction steps are subject to considerable variation, depending on the exact materials chosen for the antenna support and rotation system.

13.1.3 Contingencies for the Use of Moxon Rectangles as Null-Based DF Arrays

Figure 100:
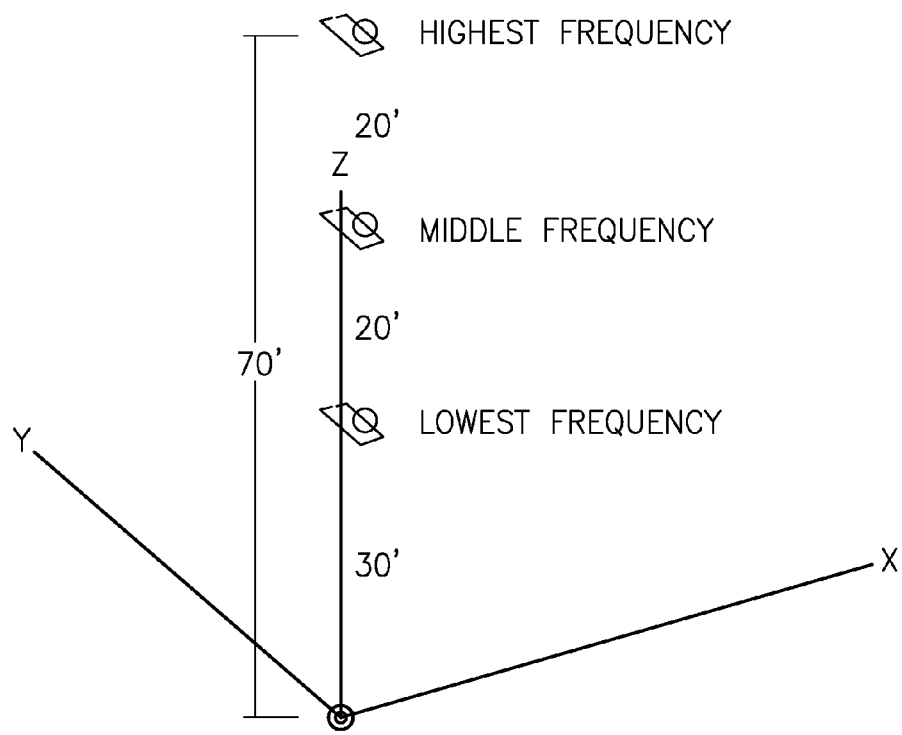
Figure 101:
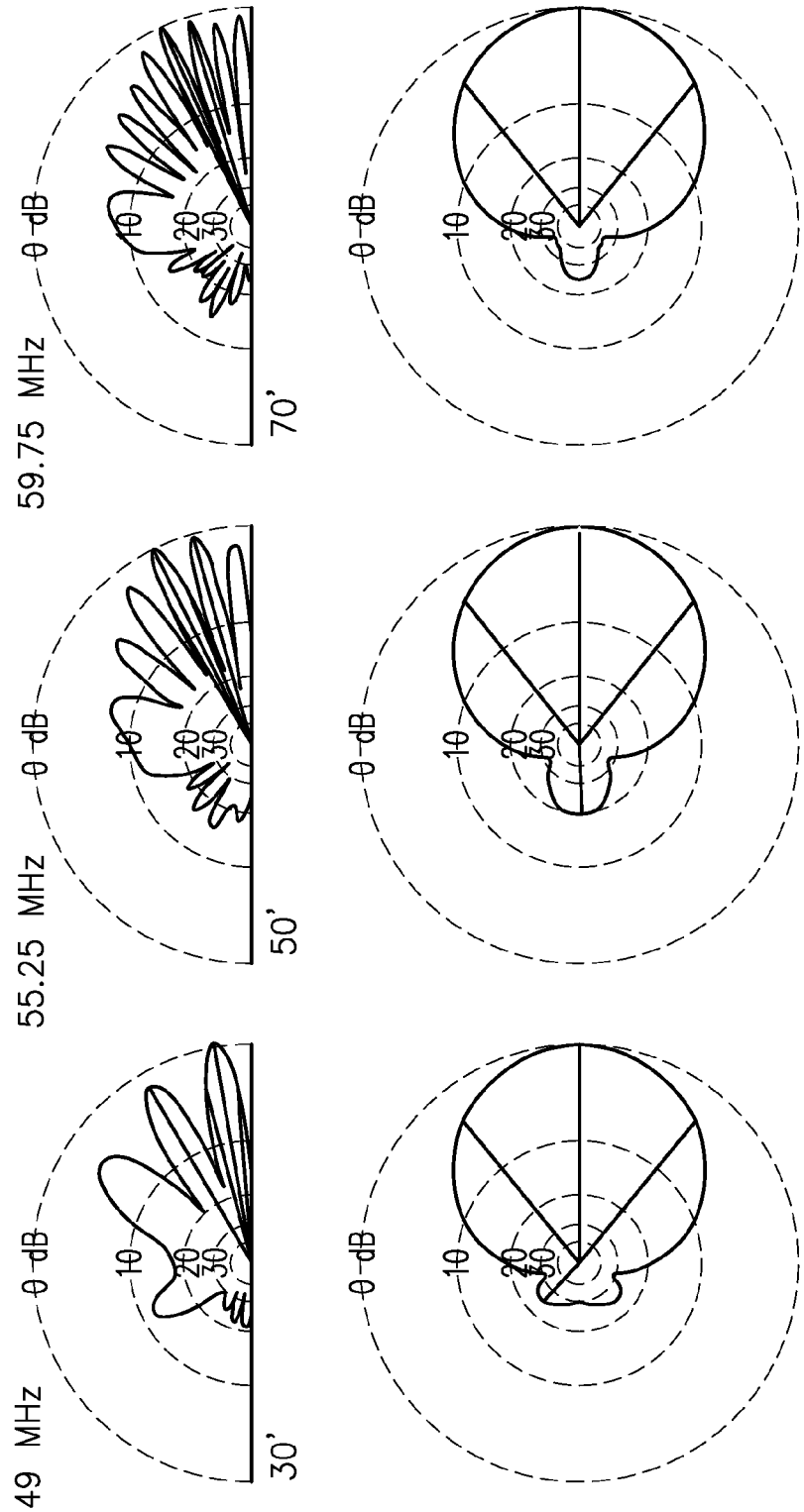

Refer to FIG. 100. General Layout for Pattern Distortion Tests Using Moxon Rectangles at 1-Wavelength Intervals Refer to FIG. 101. Rearward Pattern Distortions Resulting from Vertically Stacking 3 Moxon Rectangles at 1-Wavelength Intervals Refer to FIG. 102. General Layout for Pattern Distortion Tests Using Moxon Rectangles at 10-Wavelength Intervals Refer to FIG. 103. Moxon Rectangle Plots with an Inline Separation of 10-Wavelength Intervals (200 feet)

Figure 104:
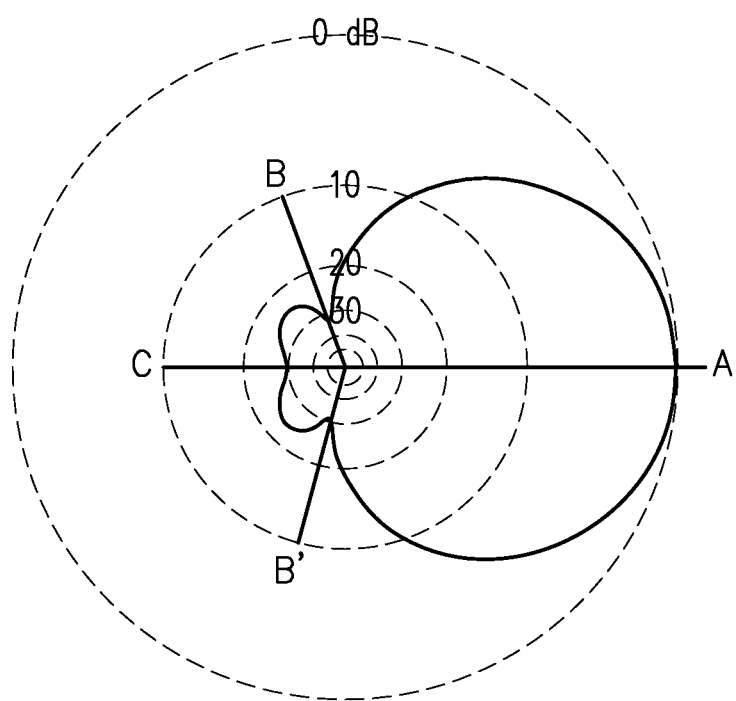
FIG. 104. Critical Azimuth Bearings Relative to Direction-Finding with a Horizontal Antenna FIG. 105. Azimuth Patterns of a Vertical Stack of 3 Moxon Rectangles with 10' Separation FIG. 106. Moxon Rectangle Patterns: Critical Dimensions FIG. 107. A Practical Lindenblad Dipole Array Antenna FIG. 108. Evolution of the Lindenblad Array FIG. 109. Right-Hand and Left-Hand Lindenblad Arrays FIG. 110. Elevation and Azimuth Patterns: Right-Hand and Left-Hand Lindenblads 20 Feet Above Average Ground at 52 MHz FIG. 111. 50-Ohm SWR Curve: 49 to 59 MHz Lindenblad Dipole Array FIG. 112. Relative Proportions of Lindenblad Arrays with Decreasing Element Length and the Addition of T-Type End Caps FIG. 113. Basic Elevation and Azimuth Patterns of the Lindenblad Array FIG. 114. SWR Curves of Full-Length, 75%-Length, and 50%-Length Lindenblad Arrays Relative to Their Self-Resonant Element Impedance FIG. 115. WARN System—PODIUM Telescoping Survivable LISTEN Sensors (Preferred Embodiment)

Refer to FIG. 104. Critical Azimuth Bearings Relative to DF with a Horizontal Antenna Refer to FIG. 105. Azimuth Patterns of a Vertical Stack of 3 Moxon Rectangles with 10 Feet of Separation Refer to FIG. 106. Moxon Rectangle Patterns: Critical Dimensions This section reviews a series of if-then propositions related to the use of Moxon rectangles as the main antenna arrays for null-based direction finding using the target frequencies. Included are minimum vertical and horizontal stacking distances required for use of the 180° rear null as the main null detector, as well as vertical stacking distances that are usable if the bearing is determined by the centered direction between the symmetrically placed deep side nulls.

The technique for determining the required stacking distances involves placing 3 Moxon rectangles within a single NEC-4 model. Each antenna is activated on its own frequency, with the others passive. The resulting radiation pattern represents the direct action of the activated antenna plus the interactions from the nearby presence of the inactive antennas. The result is an accurate portrayal of the transmitting and the receiving pattern of the active antenna at its assigned frequency. The desired target storm signals determine the frequencies used for the antennas, which for the preferred embodiment are 49.0, 55.25, and 59.75 MHz.

13.1.3.1 Contingency 1: Use of the Rear Lobe 180° Null

The following designs rest on the premise that the 180° null relative to the main forward beam bearing is the primary null-detection mode for determining the heading to the desired signal.

Vertical Stacking

The median value for a wavelength within the project passband (49-60 MHz) is about 20 feet, which may be used as a reasonable approximation of wavelength. The maximum practical height for a vertical stack of Moxon rectangles is about 70 feet. If the lowest frequency antenna is placed at 30 feet above ground, then the higher frequency antennas may be stacked at a maximum of one-wavelength intervals above the first antenna. The resulting array has the general appearance shown in FIG. 97.

FIG. 100 presents the elevation and azimuth plots of the patterns of the arrays on each selected frequency. The 49-MHz array is least affected by the presence of the upper antennas. Therefore, it maintains a small null region at 180° from the main forward bearing, as shown in its azimuth plot.

The antennas for the upper two frequencies are adversely affected by the presence of the other antennas in the stack. The elevation patterns give only a small clue to the pattern distortion. The elevation angle of the main or strongest lobe is shifted upward. However, the lowest lobe has normal forward gain. As the azimuth plots show clearly, the influence of the arrays for other frequencies is sufficient to distort the rear lobe structure so that no null region appears at 180° opposite the main forward bearing.

Despite the absence of null region 180° opposite the main forward bearing, the sidelobes remain very deep at more than 30 dB below the forward heading.

If the 180° bearing from the main forward bearing requires a null region in order to accomplish the direction-finding task, vertical stacking may be impractical. For the passband of interest (49-60 MHz), with a median wavelength of about 20 feet, stacking distances of greater than one wavelength per array result in overall array heights that may be extremely high. The added height may present very significant structural challenges.

Horizontal Stacking

Figure 102:
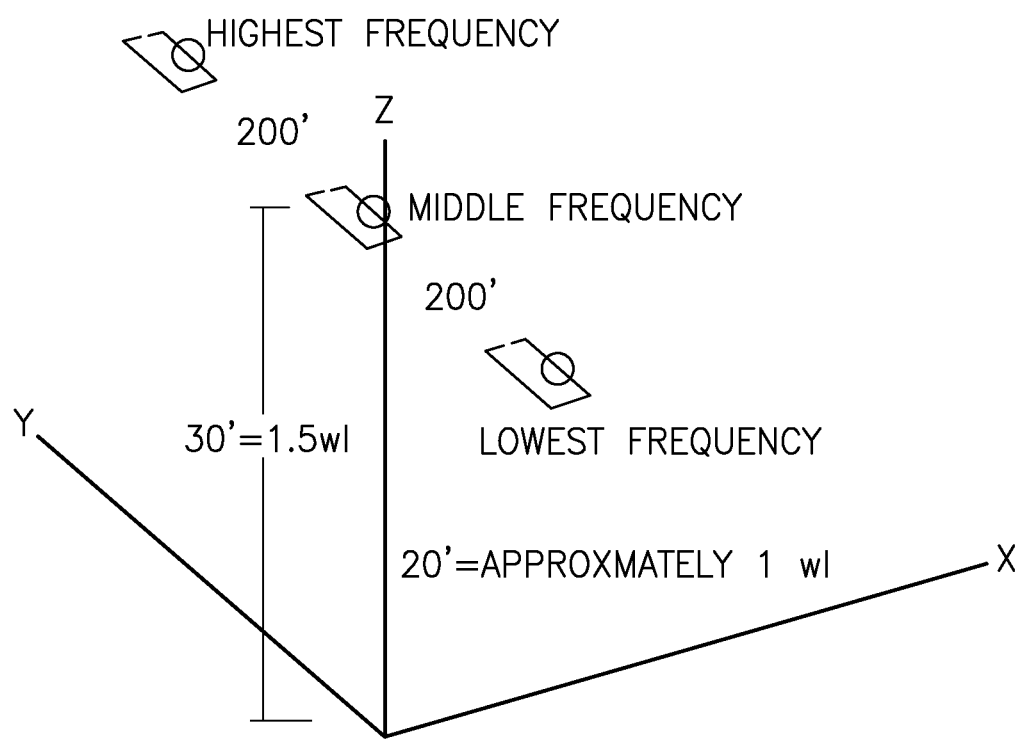

Horizontal separation between the individual Moxon rectangles may be more convenient, since each array might have its own support tower (along with an omnidirectional basic detection antenna). In an alternative embodiment, the arrays may be separated without limit until the individual antennas cease to have azimuth patterns whose main lobes vary from the anticipated direction. FIG. 102 shows the resulting array layout, using a linear set-up.

For minimal pattern distortion, the required separation is about 10 wavelengths or about 200 feet between each antenna. Hence, the total line of antennas requires 400 feet. FIG. 102 depicts the antennas pointed at right angles to the line of arrays. Sampled patterns at both this orientation and with the antennas pointed along the line of arrays yield the results in FIG. 103.

Figure 103:
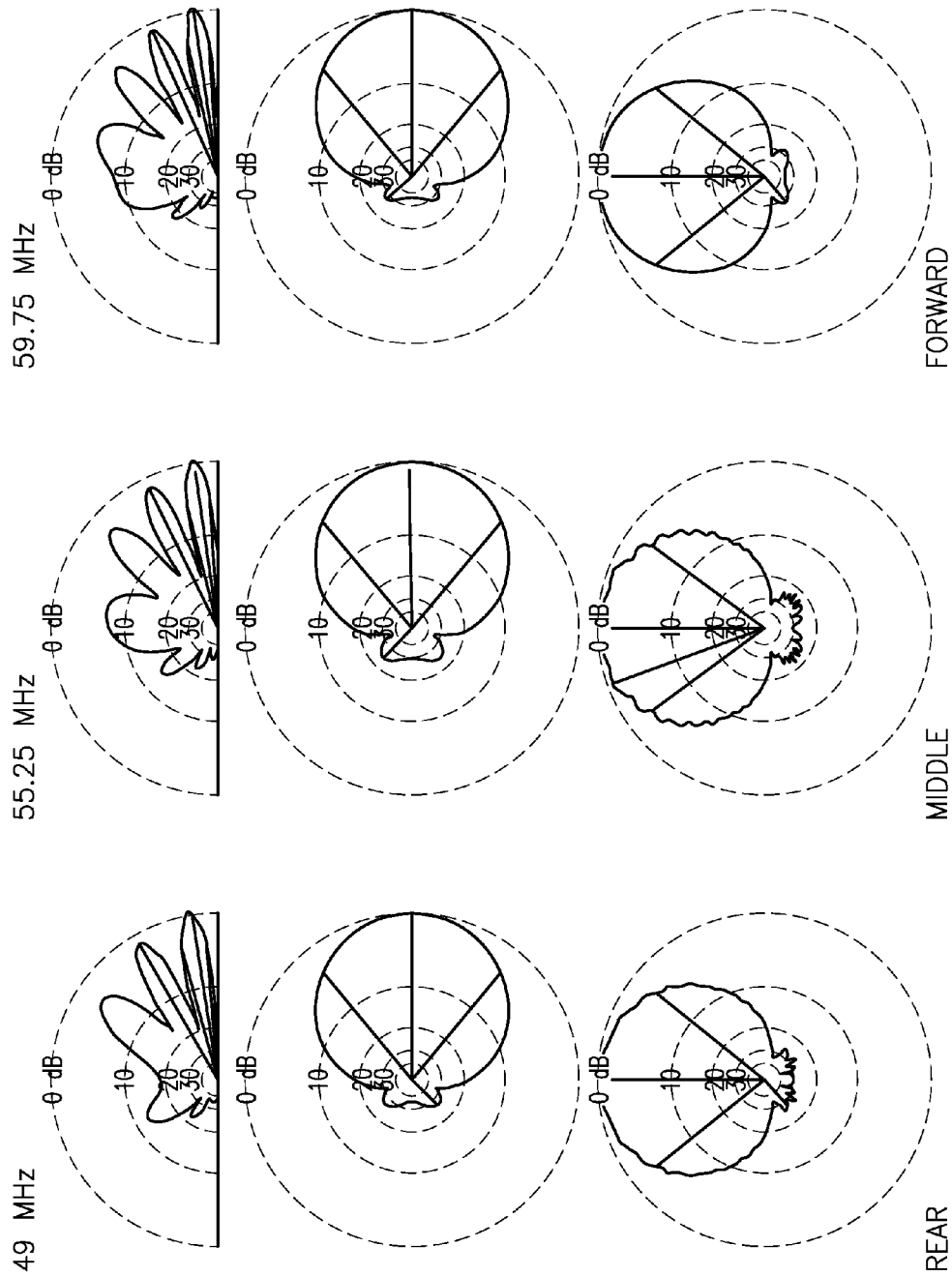

As can be seen in FIG. 103, for angles tangential to the line of arrays, the patterns are normal at each project frequency. The strongest elevation lobe is always the lowest lobe, which falls between 8° and 9° for the 30-foot uniform antenna height. Also, forward gain is uniform, falling between 11.6 and 11.7 dBi. The middle row of azimuth patterns shows completely normal characteristics, with all main headings properly directed and all rearward lobe structures having a 180° null region. When the antennas are pointed along the line of arrays, pattern distortions emerge due to the proximity of the frequencies used. In this sample, the 59.75-MHz beam is in the lead position and points away from the others, so its pattern is completely normal. The absence of influences results from the very high front-to-back ratio of a Moxon rectangle. The remaining two antennas have either one or two antennas ahead of them. Hence, their patterns show distortions. For many communication purposes, the distortions would not be fatal. However, for null-based direction finding, the distortions to the rear lobes make the antennas unreliable in this alignment, even with a spacing of 10 wavelengths between antennas.

13.1.3.2 Contingency 2: Use of the Side Nulls

It is possible to detect the Moxon rectangle side nulls and to take a bearing between the nulls. FIG. 104 provides a typical Moxon rectangle azimuth pattern with the antenna 30 feet above average ground. The left portion of the pattern may be examined in two stages, beginning with the general shaping of the small rear lobes.

The rear lobes show a null region (C) at 180° from the main forward bearing (A). This null is about 5 dB relative to the maximum strength of the two quartering rear lobes. However, the depth of this lobe may vary according to the quality of the ground beneath the antenna, the height above ground, and the presence of other antennas or conductive structures in the vicinity of the antenna. The range of variation in the null depth runs from 0 dB to perhaps 15 dB, depending on the conditions, which are not always fully predictable in advance.

More reliable are the two side nulls in the Moxon rectangle pattern (B and B'). Their depth is virtually always 7 dB or more, relative to the quartering rear lobes, and 30 dB down from the main forward lobe strength. These side nulls also have the advantage of always occurring more than 90° from the main forward heading. As a consequence, one can always unambiguously determine the forward from the rearward direction. The lobes appear between 100° and 120° away from the main forward heading. Under these conditions, the direction of the desired signal is always the center value between the side nulls. One may determine this direction by a simple detection of one null and then finding the other, using either the forward lobe or the rearward lobes as a reference.

The use of the side nulls for direction finding allows a simpler antenna arrangement: a vertical stack. The patterns in FIG. 103 show distortions to the rearward lobes that prevents the use of the 180° null in direction finding. However, in all cases, the side nulls remain intact and are highly usable, with suitable apparatus for side-null direction finding.

Figure 105:
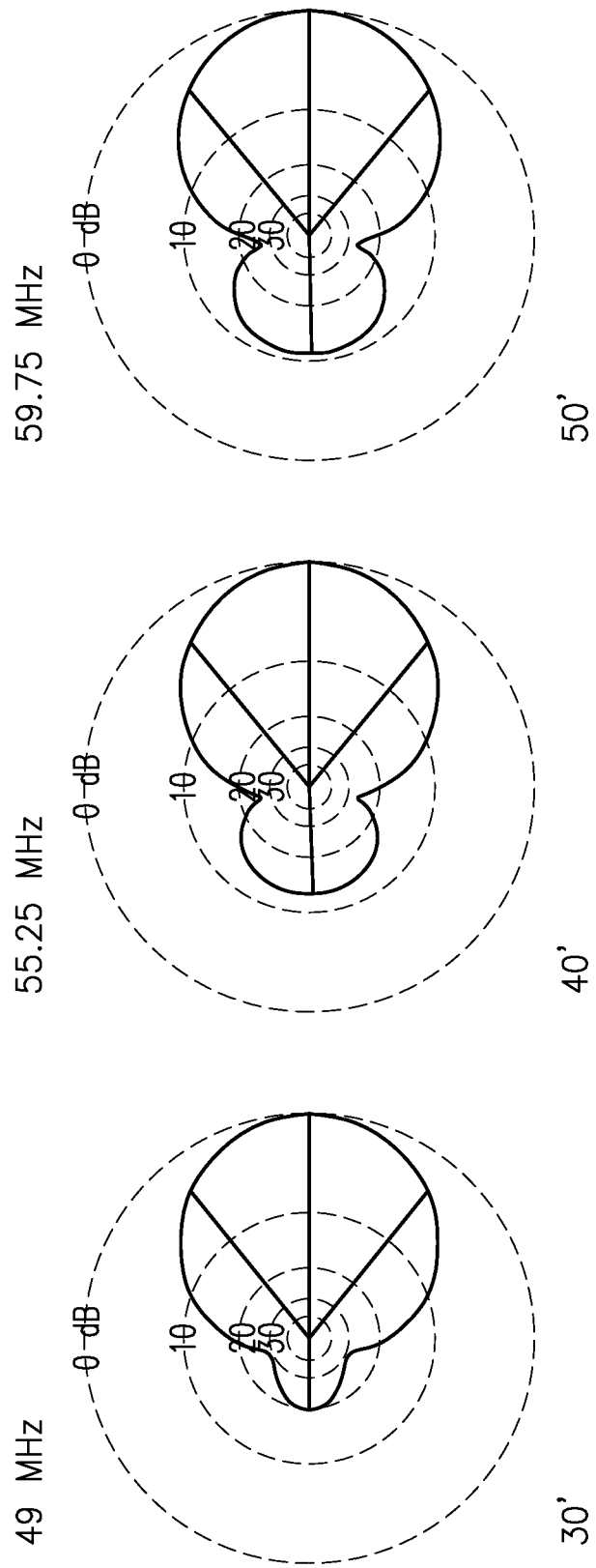

As shown in FIG. 105, even a smaller separation between the antennas in the vertical stack produces usable side nulls. The most shallow null appears in the pattern for the 49-MHz antenna, and its is about 29 dB below the main forward lobe. The use of closer intervals between the antennas in the vertical stack reduces the mast length by half Given apparatus for side-null direction finding, the task of obtaining a target bearing may be divided into two steps. The two steps presume that the fine gradations of the rotation device make rotation a relative slow process. The first step in the bearing process would be to rotate the antenna through a maximum signal strength reading (which would be very broad in angular displacement) and continue rotation until the detection of the first null. Since side nulls occur between 100° and 120° relative to the main forward bearing, one might use this reading and assume an angle of 110°. The result provides a preliminary heading for detection equipment until the rotation is complete with the detection of the second side null. At this point, one may calculate a much more precise target heading and replace the preliminary reading. The initial reading may be accurate to perhaps 5°, while the second may be accurate to about 1°.

Stacking considerations applicable to the Moxon rectangle (and most other directional arrays) are several as used in null-based direction finding. Rearward null techniques require a very widely spaced horizontal arrangement, with potential ambiguities within the relatively shallow 180° null. Side null techniques allow a single vertical stack of antennas with only moderate separation requirements.

13.1.3.3 Amended Dimensions of Moxon Rectangles

Figure 106:
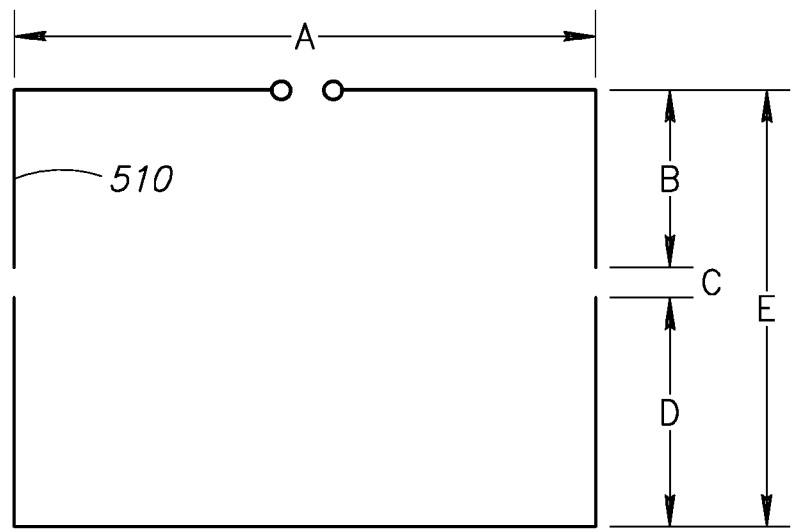

FIG. 106 provides a reference for the dimension designators in Table 25 that follows. These dimensions apply to the target LISTEN frequencies. Revision of the frequencies may require revised dimensions.

TABLE 25

Amended Moxon Rectangle Dimensions for 49, 55.25, and 59.75 MHz

| Dimension | Inches | Feet | Meters |
|---|---|---|---|
| Frequency MHz: 49 MHz | | | |
| A | 86.71 | 7.225 | 2.202 |
| B | 11.69 | 0.974 | 0.297 |
| C | 3.83 | 0.319 | 0.097 |
| D | 16.61 | 1.384 | 0.422 |
| E | 32.14 | 2.678 | 0.816 |
| Driver Length (A + 2B) | 110.09 | 9.173 | 2.796 |
| Reflector Length (A + 2D) | 119.93 | 9.994 | 3.046 |
| Frequency MHz: 55.25 MHz | | | |
| A | 76.85 | 6.404 | 1.952 |
| B | 10.28 | 0.856 | 0.261 |
| C | 3.48 | 0.290 | 0.089 |
| D | 14.75 | 1.229 | 0.375 |
| E | 28.51 | 2.376 | 0.724 |
| Driver Length (A + 2B) | 97.41 | 8.116 | 2.472 |
| Reflector Length (A + 2D) | 106.35 | 8.862 | 2.701 |
| Frequency MHz: 59.75 MHz | | | |
| A | 71.03 | 5.919 | 1.804 |
| B | 9.45 | 0.787 | 0.240 |
| C | 3.27 | 0.273 | 0.083 |
| D | 13.64 | 1.137 | 0.337 |
| E | 26.36 | 2.197 | 0.670 |
| Driver Length (A + 2B) | 89.93 | 7.494 | 2.284 |
| Reflector Length (A + 2D) | 98.31 | 8.193 | 2.497 |

Figure 107:
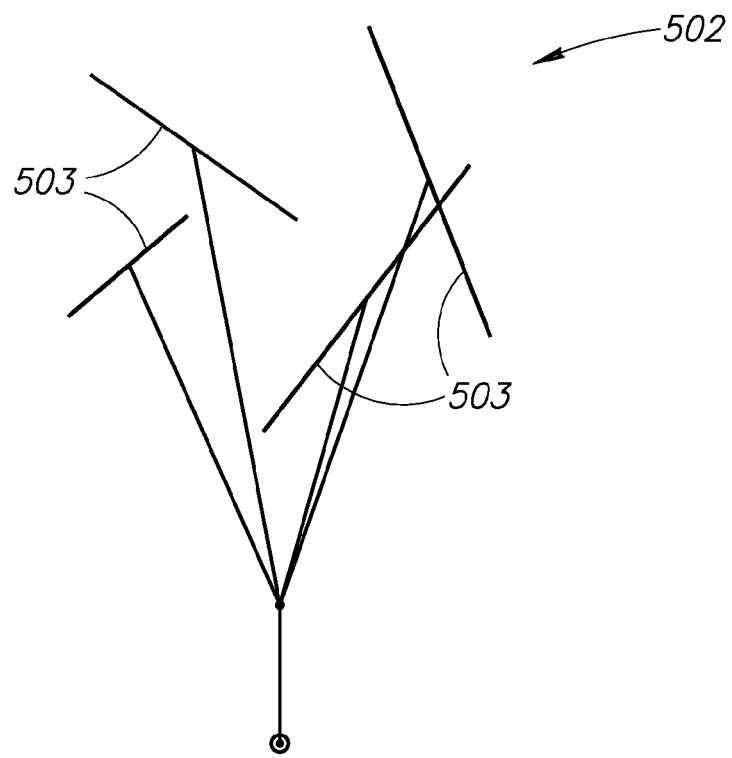

13.1.4 Basic Properties of the Lindenblad Omni-Directional Elliptically Polarized Dipole Array Refer to FIG. 107. A Practical Lindenblad Dipole Array Antenna Refer to FIG. 108. Evolution of the Lindenblad Array Refer to FIG. 109. Right-Hand and Left-Hand Lindenblad Arrays Refer to FIG. 110. Elevation and Azimuth Patterns: Right-Hand and Left-Hand Lindenblads 20 Feet Above Average Ground at 52 MHz Refer to FIG. 111. 50-Ohm SWR Curve: 49 to 59 MHz Lindenblad Dipole Array This section provides background information on the basic properties of the Lindenblad dipole array for omnidirectional service. It should contain enough information to allow an evaluation on whether the antenna is suitable for switching into a Doppler-method direction-finding dipole array.

13.1.4.1 The Basic Lindenblad Structure

The Lindenblad omnidirectional, circularly polarized dipole array consists of four dipoles, each of which is tilted at 45° to the horizontal as one faces the array. For the LISTEN frequencies, each dipole is 106.95 inches and consists of 0.375-inch diameter aluminum tubing (these dimensions may be adjusted for any desired element diameter). FIG. 107 shows the general outlines of a practical Lindenblad array.

In a preferred embodiment, each dipole is a quarter-wavelength from the center of the array—a relatively critical spacing relative to the angle of each dipole. The resonant impedance of each dipole in this configuration is close to 105 ohms. The array feeds each dipole in phase with each other dipole. Therefore, the array requires four lines that are electrically one-half-wavelength. RG-62 coaxial cable is satisfactory for this purpose. With a velocity factor of 0.84, an electrical half-wavelength is about 91.8 inches long. The use of half-wavelength lines ensures that the dipole feedpoint impedance can replicate at the junction of the lines, and the 93-ohm characteristic impedance of the line ensures broadband operation. The net impedance of the four lines in parallel connection at the junction is about 26 ohms. A 35-ohm section of line that is electrically about 80 inches long with a passband center frequency of 54 MHz can provide a broadband match for a main 50-ohm feedline. It is not necessary to specify a particular physical length for the line, since there are several different ways to create a 35-ohm line, ranging from the use of RF-83 cable to paralleling lengths of RG-59, RG-6, and other cables in the 70-ohm to 75-ohm range.

13.1.4.2 Lindenblad Theory of Operation

The Lindenblad design arose in the early 1940s in the search for an antenna that would serve television transmission needs atop the Empire State Building (in New York City, N.Y., USA). Receivers used a variety of antennas in a mix of linear polarizations both vertical and horizontal. The solution would have to radiate a circularly polarized signal in the X-Y plane, that is, parallel to the ground. N. E. Lindenblad developed a solution, but World War II delayed its development.

Figure 108:
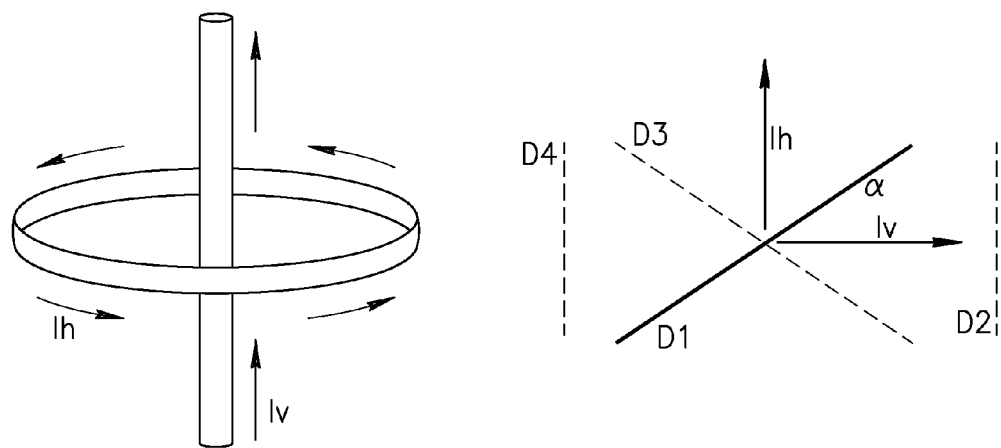

FIG. 108 shows on the left the fundamental principle behind the Lindenblad dipole array. To achieve circular polarization, we need vertically and horizontally polarized components—shown as currents in the wires—such that they result in exactly equal fields at any distance from the antenna in any direction. The sketch shows right-hand circular polarization. The conceptual diagram is almost impossible to realize as a physical antenna. Lindenblad reasoned that an array of tilted dipole, fed in phase, would approximate the ideal situation. The right side of FIG. 108 shows the solution, highlighting one of the four dipoles. If we select the proper angle for the dipole relative to the horizontal ($\alpha$), then the vertical and horizontal components are equal. The design is subject to limitations, since we have facing dipoles. The tilt angle, alpha, depends in part on the distance between facing dipoles. In terms better suited to calculation, the required tilt angle depends upon the radius of the circle connecting the feedpoint positions of the dipoles. Since the fields between adjacent dipoles overlap, the required tilt angle for the dipole also depends on whether we measure fields tangential to the dipole faces or at angles that bisect two dipoles. Table 26 shows a few of the Brown-Woodward tilt-angle calculations.

TABLE 26

Calculated Tilt Angles for Dipoles in a Lindenblad Dipole Array

| Radius | Tilt Angle Relative to the Horizontal | |
|---|---|---|
| In Wavelengths | (Facing Dipole) | (Between Dipoles) |
| 0.0833 | 15° | 15° 22' |
| 0.166 | 30° | 32° 55' |
| 0.25 | 45° | 55° 00' |

In its original configuration, the free-space elevation or theta patterns for the Lindenblad array are quite symmetrical. The slight variation in the patterns facing a dipole and the patterns at 45° to any dipole reflects the requirement for optimizing the tilt angle. In these patterns, the tilt angle is constant at 45°. The phi or azimuth pattern shows a slight squaring, comparable to the pattern of an ordinary turnstile pair of dipoles. Because much of the Lindenblad radiation occurs at relatively low elevation angles, the array produces good gain. Table 27 shows the gain of the array at various heights above ground (as measured in wavelengths). Within the LISTEN passband, a wavelength is about 20 feet. The suggested project antenna height of about 30 feet is therefore about 1.5 wavelengths above ground.

TABLE 27

Critical Performance Data for an Original Lindenblad Array at Various Heights Above Average Ground

| Height (Wavelengths) | Gain (dBi) | Elevation Angle of Peak Gain | Beamwidth (degrees) |
|---|---|---|---|
| 1 | 5.28 | 13 | 16 |
| 1.25 | 5.51 | 11 | 12 |
| 1.5 | 5.72 | 9 | 10 |
| 1.75 | 5.83 | 8 | 9 |
| 2 | 5.96 | 7 | 7 |
| 3 | 6.18 | 5 | 5 |
| 5 | 6.45 | 3 | 3 |
| 10 | 6.73 | 1.5 | 1.5 |

Figure 109:
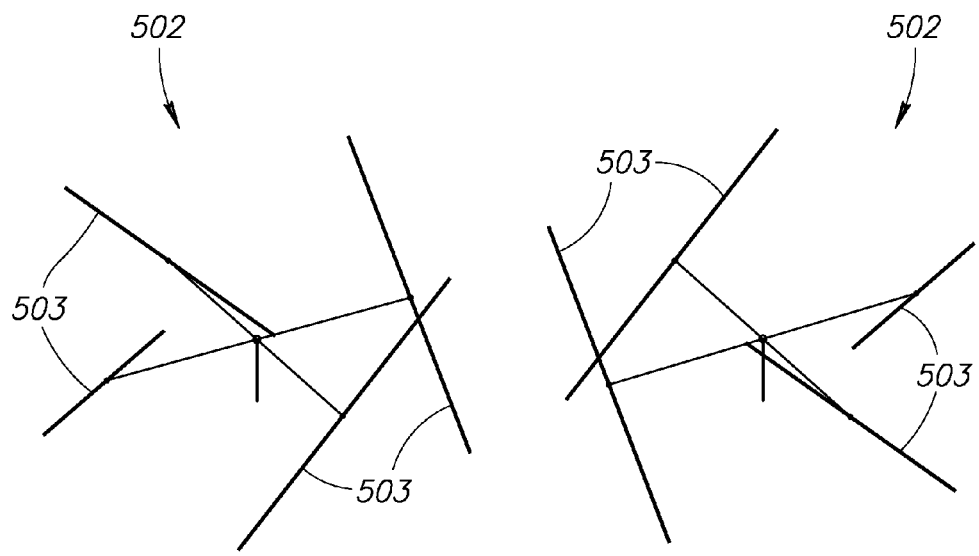

A Lindenblad array may be constructed for either left-hand or right-hand polarization simply by reversing the angle of each dipole, as shown in FIG. 109. However, with regard to an intended use of a preferred embodiment for storm detection and tracking, no information is presently available that would give one mode of circular polarization priority over the other.

Figure 110:
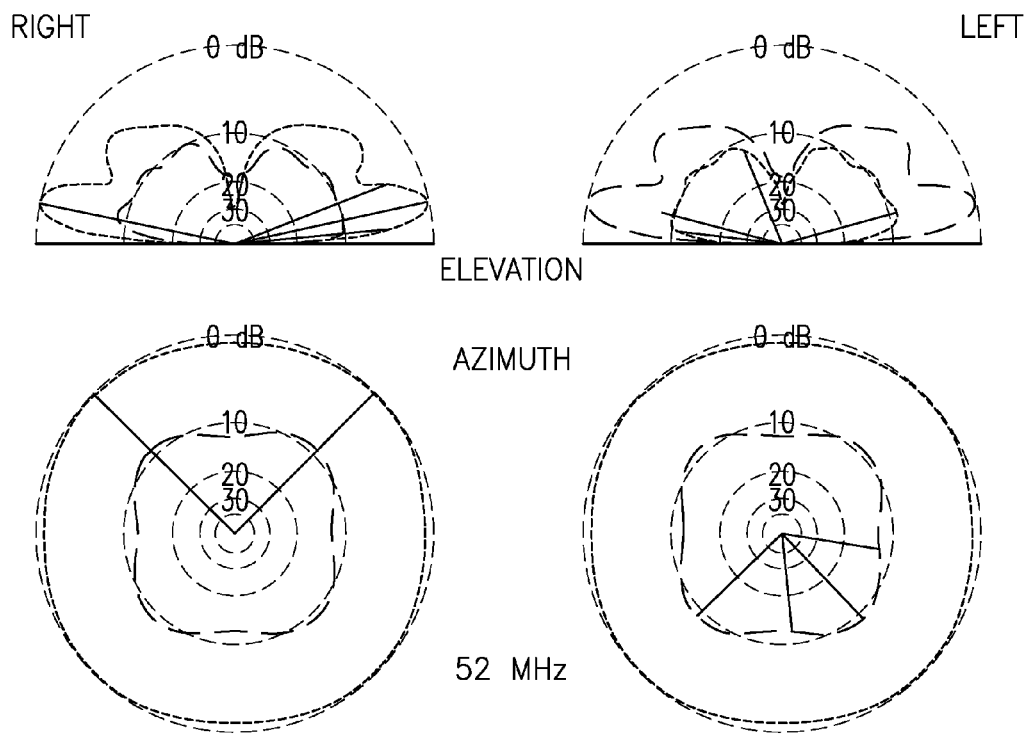

Regardless of the direction of circularity, the Lindenblad's patterns are essentially elliptical with an axial ratio of between 0.45 and 0.55. Although this value is not true circularity, the antenna responds almost equally to sources that are vertically polarized or horizontally polarized. FIG. 110 shows the relative strengths of the left-hand and the right-hand components of the pattern. The dominant mode of circular polarization is at least 10 dB stronger than the opposing mode. The pattern also shows the previously noted slight squaring, although the maximum differential is about 1 dB between maximum and minimum gain.

The selection of frequencies for the patterns is arbitrary (so long as it falls within a project passband of say, between 49 and 59 MHz). The ratio of left- to right-handed polarization is almost constant over the entire passband. Additionally, the patterns show that the Lindenblad radiates little or no energy upward at very high elevation angles. Hence, the antenna is suitable for placement below other antennas with similar frequency ranges. However, the antenna is also suited to independent use.

Figure 111:
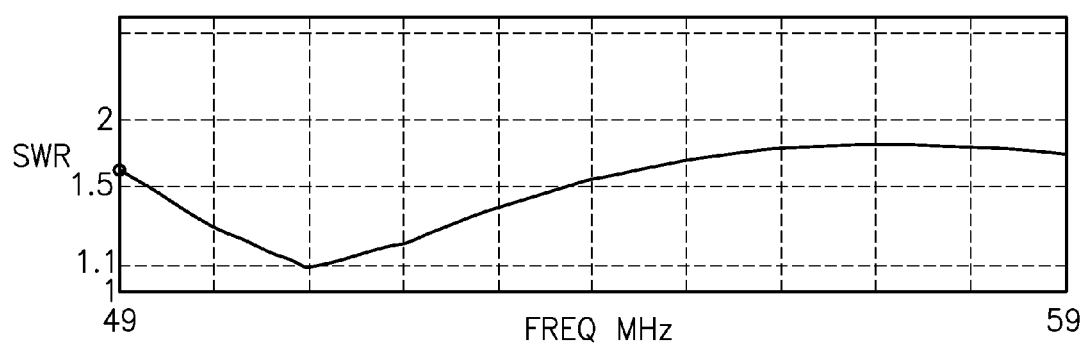

The Lindenblad is not only broadband in its omnidirectional characteristics, but it is also broadband in its feedpoint impedance with the application of proper matching techniques. FIG. 111 shows the 50-ohm SWR curve of the array shown in FIG. 107. As the curve shows, the antenna has considerable reserve capability beyond the frequency limits explored here.

The Lindenblad array as an omnidirectional antenna is capable of handling signals of any polarization for basic signal detection. Since the polarization of these signals is not fully established, an antenna that responds equally to vertical and horizontal linear polarizations seems appropriate to the application. In one embodiment, the Lindenblad may rest below direction-finding antennas at a higher physical level. However, the basic structure of the Lindenblad resembles the array of monopoles often used in Doppler-mode direction finding. In a preferred embodiment, in conjunction with existing Doppler-mode DF, the Lindenblad may be switched into this mode of operation. In a preferred embodiment, the switching point is at the junction of the 4 RG-62 cables. If the quarter-wavelength array radius (one-half wavelength between facing dipoles) is sufficient for the intended application, the Lindenblad can serve both roles: initial signal detection and Doppler-mode determination of its bearing. The savings in both cost and physical complexity are relatively obvious.

Figure 112:
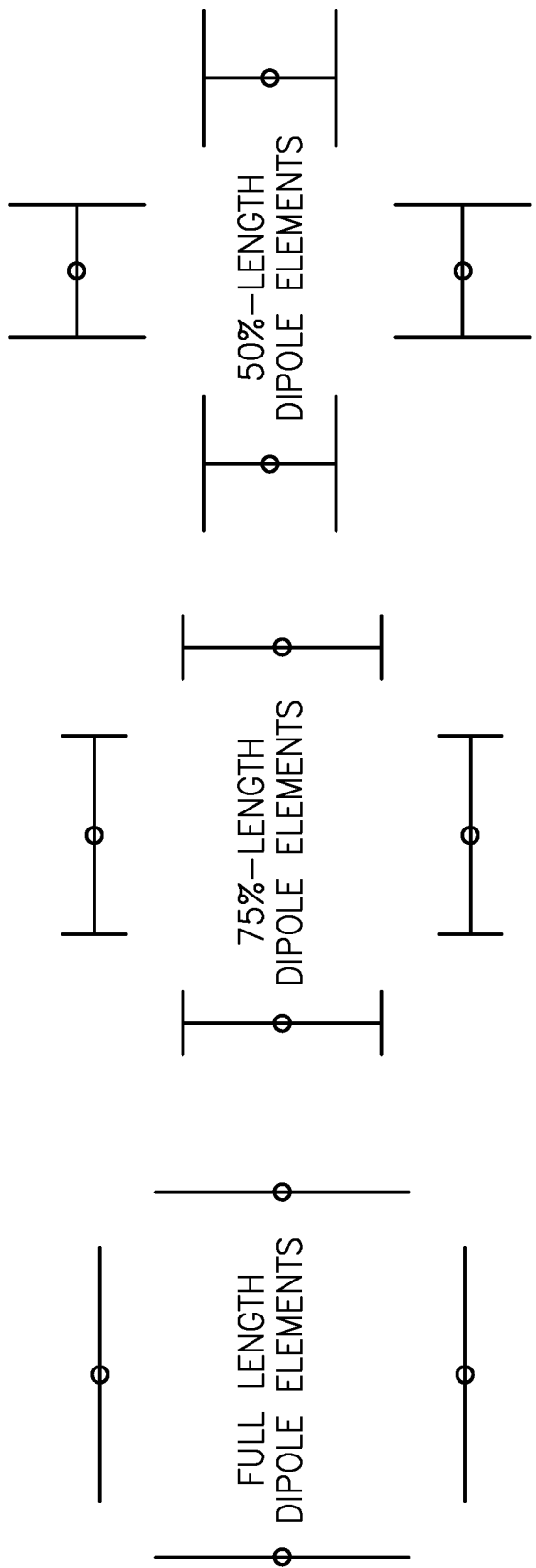

13.1.5 Lindenblad Omni-Directional Elliptically Polarized Dipole Arrays with Full-Length & Shortened-Capped Elements Refer to FIG. 112. Relative Proportions of Lindenblad Arrays with Decreasing Element Length and the Addition of T-Type End Caps Refer to FIG. 113. Basic Elevation and Azimuth Patterns of the Lindenblad Array Refer to FIG. 114. SWR Curves of Full-Length, 75%-Length, and 50%-Length Lindenblad Arrays Relative to Their Self-Resonant Element Impedance This section provides follow-up information to section 13.1.4, which teaches an unadorned Lindenblad array. The modeling test described here evaluates the feasibility of shortening the dipole elements and using end caps to re-establish self-resonance, leading to a preferred embodiment that retains the full-length dipoles (thus rejecting the use of capped elements).

13.1.5.1 The Modeling Test

To evaluate the feasibility of shortening Lindenblad elements by using end hats or caps, the original model of the Lindenblad in section 13.1.4 was reconstructed. Although end hats or caps may consist of any symmetrical structure at the element ends, so long as it is at right angles to the element, T-structures were selected for simplicity. The model remained at 20 feet above average ground, as in the earlier report; however, performance would not change significantly between heights of 20 feet and 40 feet or more. For initial evaluation purposes, the original model's full length elements, 75%-length elements, and 50%-length elements were used as test cases. As depicted in FIG. 112, the modifications result in very different array appearances. The view shown is from the top (or bottom). Therefore, the dipoles themselves are foreshortened by their 45° angle relative to the ground. However, the T-caps are shown full size. Note that the array radius cannot change without a total redesign of the array and a reduction in performance.

Modeling the additional structures is not a small process. Even for a relatively simple model it requires the addition of two wires to each end of each dipole. In addition, various trials are necessary to establish the proper length of the T-caps in order to approximate self-resonance at the design frequency of 54 MHz. Tables 28A and 28B compare the wire structures of the models for full-length elements and for 50%-length elements as a sample of the required additions. For this initial feasibility test, T-cap wire lengths were adjusted in one-inch intervals, so self-resonance is only approximated.

TABLE 28

Comparison: Two Models of Lindenblad Arrays with 0.375-Inch Diameter Dipoles

Table 28A. Model with Full-Length Dipoles

| Segs | X1 | Y1 | Z1 | X2 | Y2 | Z2 |
|---|---|---|---|---|---|---|
| 21 | 37.8128 | 54.6428 | 202.187 | −37.8128 | 54.6428 | 277.813 |
| 21 | −54.6428 | 37.8128 | 202.187 | −54.6428 | −37.8128 | 277.813 |
| 21 | −37.8128 | −54.6428 | 202.187 | 37.8128 | −54.6428 | 277.813 |
| 21 | 54.6428 | −37.8128 | 202.187 | 54.6428 | 37.8128 | 277.813 |

Table 13.5B. Model with 75% Length Dipoles Plus End T-Caps

| Segs | X1 | Y1 | Z1 | X2 | Y2 | Z2 |
|---|---|---|---|---|---|---|
| 5 | 18.91 | 73.6428 | 221.09 | 18.91 | 54.6428 | 221.09 |
| 5 | 18.91 | 35.6428 | 221.09 | 18.91 | 54.6428 | 221.09s |
| 17 | 18.91 | 54.6428 | 221.09 | −18.91 | 54.6428 | 258.91 |
| 5 | −18.91 | 54.6428 | 258.91 | −18.91 | 73.6428 | 258.91 |

TABLE 28-continued

Comparison: Two Models of Lindenblad Arrays with 0.375-Inch Diameter Dipoles

| 5 | −18.91 | 54.6428 | 258.91 | −18.91 | 35.6428 | 258.91 |
|---|---|---|---|---|---|---|
| 5 | −73.6428 | 18.91 | 221.09 | −54.6428 | 18.91 | 221.09 |
| 5 | −35.6428 | 18.91 | 221.09 | −54.6428 | 18.91 | 221.09 |
| 17 | −54.6428 | 18.91 | 221.09 | −54.6428 | −18.91 | 258.91 |
| 5 | −54.6428 | −18.91 | 258.91 | 73.6428 | −18.91 | 258.91 |
| 5 | −54.6428 | −18.91 | 258.91 | −35.6428 | −18.91 | 258.91 |
| 5 | −18.91 | −73.6428 | 221.09 | −18.91 | −54.6428 | 221.09 |
| 5 | −18.91 | −35.6428 | 221.09 | −18.91 | −54.6428 | 221.09 |
| 17 | −18.91 | −54.6428 | 221.09 | 18.91 | −54.6428 | 258.91 |
| 5 | 18.91 | −54.6428 | 258.91 | 18.91 | −73.6428 | 258.91 |
| 5 | 18.91 | −54.6428 | 258.91 | 18.91 | −35.6428 | 258.91 |
| 5 | 73.6428 | −18.91 | 221.09 | 54.6428 | −18.91 | 221.09 |
| 5 | 35.6428 | −18.91 | 221.09 | 54.6428 | −18.91 | 221.09 |
| 17 | 54.6428 | −18.91 | 221.09 | 54.6428 | 18.91 | 258.91 |
| 5 | 54.6428 | 18.91 | 258.91 | 73.6428 | 18.91 | 258.91 |
| 5 | 54.6428 | 18.91 | 258.91 | 35.6428 | 18.91 | 258.91 |

Note the difference in complexity between the two models represented by Tables 28A and 28B. Table 28A requires only 4 rows (one per dipole), and constant 21-inch segments. Table 28B is significantly more complex, requiring 20 rows (5X as many), with both 17-inch and 5-inch segments.

The dimensions for each of the three Lindenblad arrays are listed in Table 29.

TABLE 29

Lindenblad Array Critical Dimensions

| Version | Dipole Length Inches | T-Cap Length +/− Inches |
|---|---|---|
| Full-Length | 106.95 | — |
| 75% Length | 80.22 | +/−9.0 |
| 50% Length | 53.48 | +/−19.0 |

The increment by which the required end-hat grows increases at a faster rate than the reduction in dipole length. Unless operating bandwidth is not a significant performance parameter, dipole lengths below 70% to 75% of full size are not recommended. T-caps are the longest structures required for end-hats. If the number of "spokes" is increased, the length of each spoke decreases up to a limit of about 60 spokes. At this level, the hat performs almost identically to a solid disk with a radius of about one-third the length of each T-spoke. For spoke-type end hats, the use of a perimeter wire connecting the outer ends of the spokes can also reduce the required spoke length.

Figure 113:
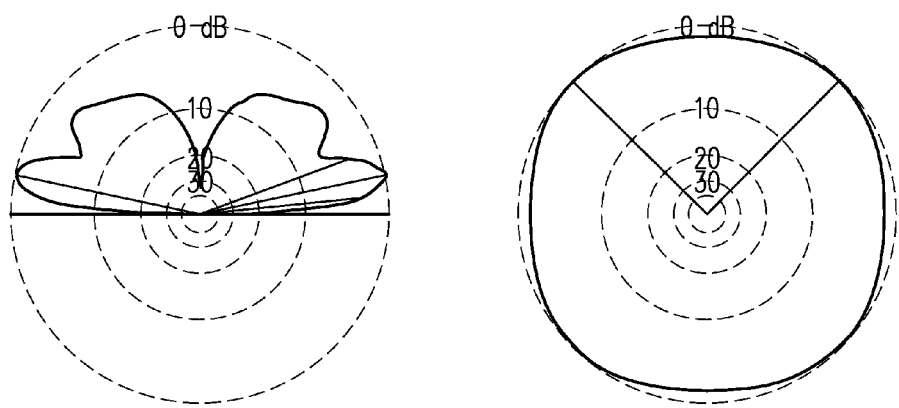

The use of end-hats is the most efficient method of shortening element lengths; that is, it yields the closest approximation of full size performance. However, shorter elements can always produce lower self-resonant impedance values and a narrower operating bandwidth. At the design frequency, the optionally advantageous Lindenblad pattern does not change. FIG. 113 shows a reference pattern, which holds for all three models. The relative squareness of the total far field pattern does not significantly change at the design frequency, and the maximum to minimum gain is steady at about 1 dB. However, there are differences relative to the passband end frequencies. The ratio of right-hand to left-hand circular polarization remains at a constant 8 dB.

Table 30 summarizes the performance of the full-length and 75%-length models at 49, 54, and 60 MHz in order to sample properly the performance change over the anticipated operating passband.

TABLE 30

Modeled Performance Values of Lindenblad Arrays 20 Feet Above Average Ground

| Frequency | Max. Gain | Min. Gain | Dipole Impedance Ω | |
|---|---|---|---|---|
| MHz | dBi | dBi | Resistance | Reactance |
| Full Length Elements | | | | |
| 49 | 4.74 | 3.95 | 84.2 | −77.1 |
| 54 | 5.28 | 4.19 | 105.9 | 1.3 |
| 60 | 5.78 | 4.24 | 136.2 | 90.9 |
| Range Δ | 1.04 | 0.29 | 52.0 | 168.0 |
| 75% Length Elements | | | | |
| 49 | 4.77 | 3.92 | 73.5 | −73.2 |
| 54 | 5.32 | 4.14 | 92.8 | 5.4 |
| 60 | 5.84 | 4.17 | 120.0 | 96.6 |
| Range Δ | 1.07 | 0.25 | 46.5 | 169.8 |

The average gain for the full azimuth sweep does not change significantly with the length of the dipoles. However, as the dipoles are shortened, at the passband edges, the differential between maximum and minimum gain increases. Since the relative circularity of the polarization does not change much, these values may be quite acceptable.

Figure 114:
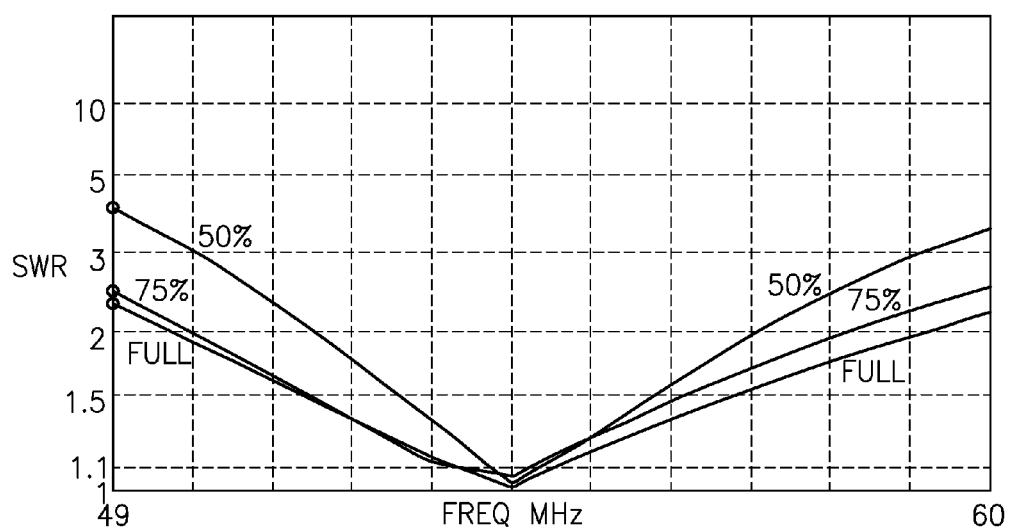

The most notable feature of the shortened and capped dipoles is the narrowing SWR passband. FIG. 114 shows the SWR curves for each version of the Lindenblad. The curves use the self-resonant impedance of each dipole as a reference; the curves use no matching components. The curves are a measure of the shrinking operating bandwidth that accompanies dipole length reduction.

Although the curve for the 75%-length version of the array appears to be usable, it suffers a second problem besides the SWR at the band edges. The full-length dipoles produce a parallel connection impedance of about 26 ohms at the design frequency (54 MHz). This impedance is relatively easily matched across the entire passband to a 50-ohm main feedline. The 75%-length dipoles produce a parallel connection impedance of about 23 ohms, while the comparable impedance for the 50%-length version is about 14 ohms. The lower the parallel-connection impedance, the more difficult it is to achieve an adequate wide-band match to 50 ohms except by complex network means.

The hatted shortened dipole arrays suffer a second disadvantage relative to the full-length version of the array. For all forms of end-hatting, from simple tees to solid-surface disks, the end structures add wind stresses to the dipoles that are larger than the wind stresses from additional dipole length. Hatted dipoles resist the wind from two directions rather than from one (or, more precisely, from four directions rather than two, although the dipole tilt makes the final wind calculations even more complex). Hence, the end structures reduce the durability of the element. In winter, hats may also increase ice loading over and above the level seen on linear elements.

In an alternate embodiment, using hatted versions of the Lindenblad array may be advantageous. However, since the dipole length does not alter the array radius, does not increase performance, and adds both matching and structural complexities, a preferred embodiment may use simple full-length dipoles.

13.2 PODIUM—Pneumatically Operated Directional Intelligent Unmanned Masthead

Figure 115:
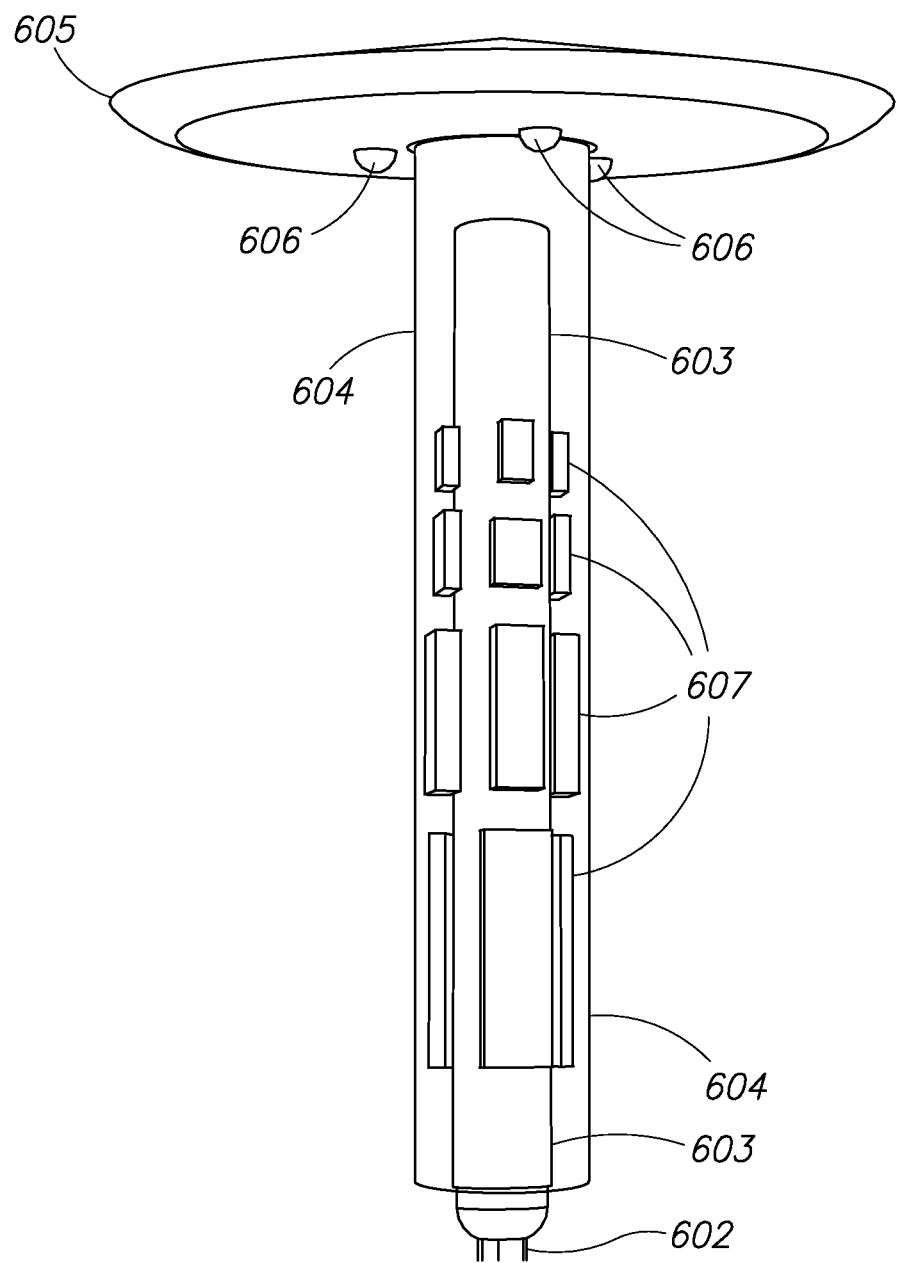

Refer to FIG. 115. WARN System—PODIUM Telescoping Survivable LISTEN Sensors (Preferred Embodiment)

Figure 116:
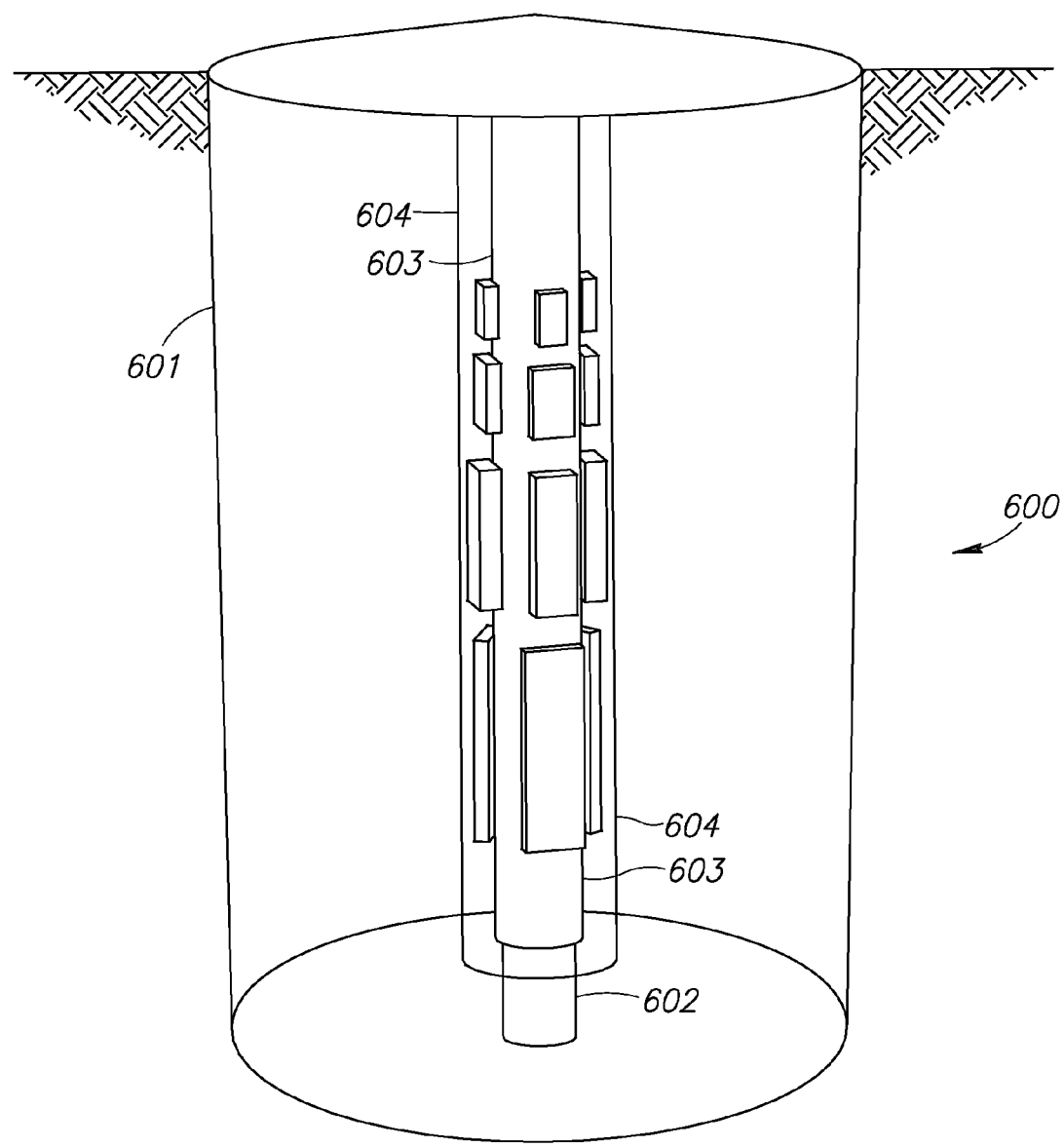
FIG. 116. WARN System—PODIUM and Survivable LISTEN Sensors (Preferred Embodiment)

Refer to FIG. 116. WARN System—PODIUM and Survivable LISTEN Sensors (Preferred Embodiment)

Figure 117:
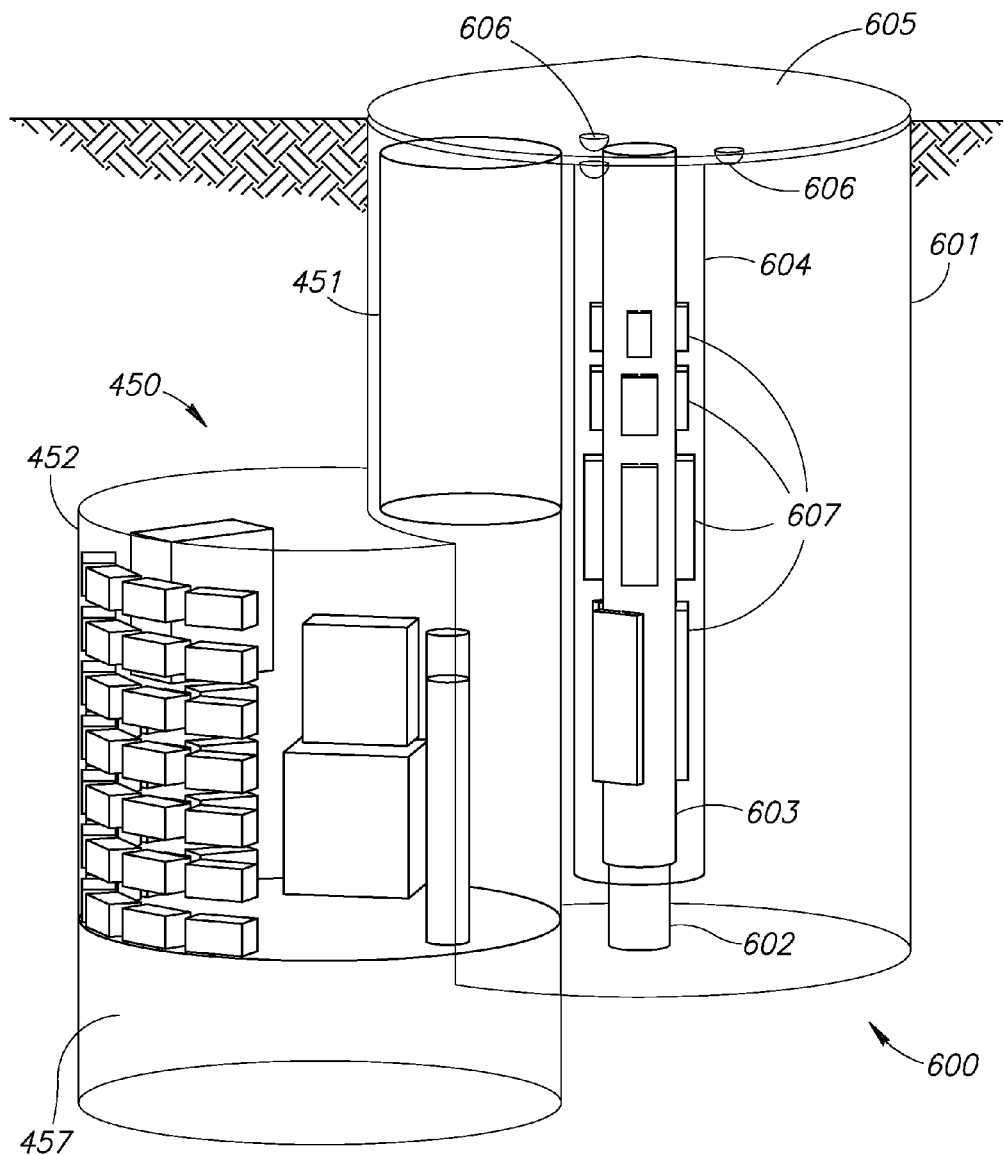
FIG. 117. SUREFIRE Vault with Survivable LISTEN Sensors (Preferred Embodiment)

Refer to FIG. 117. SUREFIRE Vault with Survivable LISTEN Sensors (Preferred Embodiment)

Refer to FIG. 118. WARN System—PODIUM Telescoping LISTEN Sensors (Preferred Embodiment)

Figure 119A:
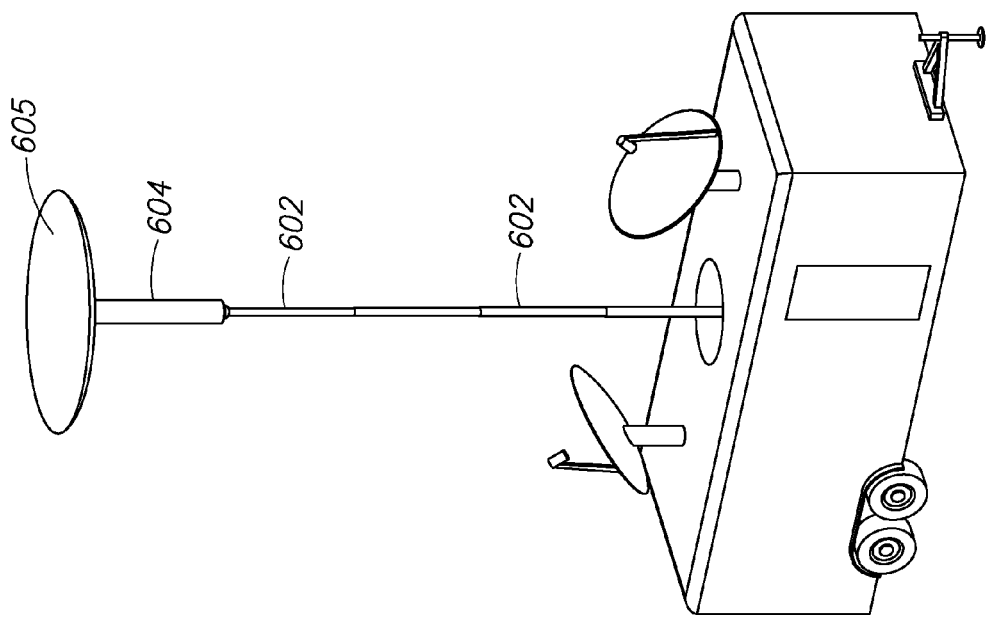
FIGS. 119A & B. PODIUM Telescoping Antenna System—Trailer-Mounted (Preferred Embodiment)
Figure 119B:
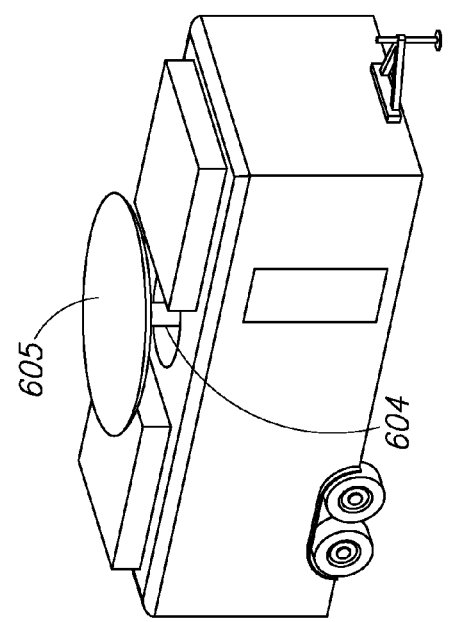

Refer to FIGS. 119A & B. PODIUM Telescoping Antenna System—Trailer-Mounted (Preferred Embodiment)

The invention claimed is:

1. A dynamically reconfigurable computing infrastructure comprising:
    a datacenter; and
    at least one grouping of computing nodes, the computing nodes further comprising:
        (a) a memory;
        (b) at least one processor;
        (c) a first component configured to perform computing and data processing functions which further comprise secure communications and access controls;
        (d) a second component configured to recognize and differentiate between computing nodes and further distinguish between at least one of an authorized object, an unauthorized object, subject, and interaction;
        (e) a third component configured to establish trust between computing nodes and collaborate with computing nodes to establish teams of nodes;
        (f) a fourth component configured to process byzantine agreement logic;
        (g) a fifth component configured to mutually associate nodes contained within the teams of nodes, wherein each such team of nodes is accountable for a portion of the aggregate responsibilities of the computing infrastructure and
        (h) a sixth component configured to timely publish selected aggregated resource information to the teams of nodes.

2. The computing infrastructure of claim 1 further comprising a seventh component configured to determine readiness of a computing node based on at least one of its operational profile and survivability factors.

3. The computing infrastructure of claim 2 further comprising an eighth component configured to delegate responsibilities to nodes with a readiness sufficient to meet service level agreements and operational goals.

4. The computing infrastructure of claim 1 wherein the datacenter further comprises:
    at least one self-contained power subsystem that enables off-grid operation for extended periods using at least one of stored, renewable, and externally supplied non-grid energy sources; and
    a thermal energy transfer system configured to direct energy from a heat source using direct immersion and directed-flow conduction into a low-boiling-point phase-change working fluid, which fluid flows into, through, and out of the datacenter in a closed loop.

5. The computing infrastructure of claim 1, wherein the groupings of computer nodes are dynamically selected and are distributed geographically.

6. The computing infrastructure of claim 1 wherein a computing node further comprises a combination of interconnected and interacting processing devices, the devices further comprising:
    a set of slave devices;
    a set of master devices configured to control of physical and virtual environments seen by the set of slave devices;

a set of memory processing devices controlled by the set of master devices configured to implement and accelerate selected memory-processing functions; and a set of communications devices controlled by the set of master devices configured to implement selected communications functions.

7. The computing infrastructure of claim 6 wherein the set of master devices further controls at least one of power utilization, efficiency, capacity, latency, and throughput of the computing nodes by optimizing a combination of individual variables comprising at least one of device enablement, device bypass, device redundancy, device programming, device modes, device utilizations, device load profiles, device connectivities, device voltages, device operating frequencies, device junction temperatures, working fluid temperatures, working fluid flow rates, working fluid paths, and working fluid pressures.

8. The computing infrastructure of claim 4 further comprising:

a ninth component configured to dynamically and automatically self-modify a computer node's collective operational profile and associated readiness so as to economize operational resources and optimize their collective survivability while maintaining necessary trust relationships, such that if a computing node is no longer trusted in one or more operational roles, it is effectively removed from those roles.

9. The computing infrastructure of claim 8 further comprising:

a tenth component configured to automatically select at least one opportunistic resource, by automatically shifting resource allocation among computing nodes.

10. The computing infrastructure of claim 9 wherein at least one grouping of computing nodes comprises one or more field-replaceable units.

11. The computing infrastructure of claim 10, further comprising:

a high-speed inter-device communications subsystem comprising a plurality of communications mechanisms capable of efficiently and diversely interconnecting the primary components of a computing node to each other and to corresponding devices in other local computing nodes.

12. The computing infrastructure of claim 4 wherein the thermal energy transfer system further comprises routing complementary phases of the phase-change working fluid through a thermal pumping mechanism such that the primarily thermodynamic energy conversion effects of vapor-to-liquid phase-change combine with secondary Venturi effects to create a pressure-based motive force capable of propelling or assisting in propelling the working fluid toward downstream destinations.

13. The computing infrastructure of claim 4 wherein the thermal energy transfer system further comprises routing of at least a segregated portion of the phase-change working fluid through a at least one of a ground loop and underground fluid reservoir.

14. The computing infrastructure of claim 4 wherein the thermal energy transfer system further comprises indirect routing of the phase-change working fluid through the primary circuit of an internal heat exchanger whose secondary circuit handles the flow of an external working fluid into, through, and out of the computer infrastructure to an external heat rejection system further comprising at least one of a heat exchanger for downstream heat uses, chilled water system, cooling tower, dry cooler, and ground-coupled heat exchanger.

15. The computing infrastructure of claim 4 wherein the phase-change working fluid is an organic dielectric fluid with a boiling point between 20° C. and 40° C., such as 1-methoxy-heptafluoropropane ($C_3F_7OCH_3$).

16. The computing infrastructure of claim 1, further comprising:

an energy transfer subsystem configured to capture thermal energy within the plurality of subsystems, such that the captured energy is used for internal power generation.

17. The computing infrastructure of claim 1 further comprises an associative memory that provides associative access to its content.

18. The computing infrastructure of claim 1 wherein the memory further comprises at least one of content compression, persistent content retention and non-persistent content retention.

19. The computing infrastructure of claim 1 further comprising:

an eleventh component configured to selectively perform deterministic results memoization in order to avoid reprocessing inputs to deterministic processes whose results have been previously determined.

20. The computing infrastructure of claim 17 wherein the memory is configured for mandatory access control.

* * * * *